US008296221B1

(12) United States Patent
Waelbroeck et al.

(10) Patent No.: US 8,296,221 B1
(45) **Date of Patent: *Oct. 23, 2012**

(54) METHODS AND SYSTEMS RELATED TO SECURITIES TRADING

(75) Inventors: Henri Waelbroeck, Scarsdale, NY (US); Fred J. Federspiel, Larchmont, NY (US); Stephen Marchini, Larchmont, NY (US); Carla Gomes, New York, NY (US)

(73) Assignee: Alpha Vision Services, LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/198,375

(22) Filed: Aug. 4, 2011

Related U.S. Application Data

(63) Continuation-in-part of application No. 13/071,992, filed on Mar. 25, 2011, and a continuation-in-part of application No. 13/083,956, filed on Apr. 11, 2011, and a continuation-in-part of application No. 13/162,127, filed on Jun. 16, 2011.

(60) Provisional application No. 61/370,711, filed on Aug. 4, 2010.

(51) Int. Cl.
*G06Q 40/00* (2006.01)

(52) U.S. Cl. ........................................ 705/37; 705/38

(58) Field of Classification Search ............... 705/35–40
See application file for complete search history.

(56) References Cited

U.S. PATENT DOCUMENTS 7,860,770 B2 * 12/2010 Ciampi et al. .................. 705/35
8,156,027 B1 * 4/2012 Haddad et al. ................. 705/35

OTHER PUBLICATIONS

U.S. Appl. No. 13/071,992, filed Mar. 2011, Waelbroeck et al.*

* cited by examiner

*Primary Examiner* — Thu Thao Havan
(74) *Attorney, Agent, or Firm* — Cowan, Liebowitz & Latman, P.C.; Steven D. Underwood

(57) ABSTRACT

At least one exemplary aspect comprises a method comprising: (a) receiving electronic data describing a trading order for a market-traded security; (b) checking the data describing the trading order against one or more sets of conditions, and identifying one or more of the one or more sets of conditions that is satisfied; (c) based on the identified one or more of the one or more sets of conditions that is satisfied, identifying a class of trading algorithms appropriate for execution of the trading order; (d) selecting with a processing system one or more trading algorithms from the identified class of trading algorithms, for execution of the trading order; and (e) commencing with the processing system execution of the trading order via the selected one or more trading algorithms; wherein the processing system comprises one or more processors. Other aspects and embodiments comprise related computer systems and software.

22 Claims, 147 Drawing Sheets

Cost Function Around the Minimum

Profile Factors

| | |
|---|---|
| PM | Portfolio Manager John Smith |
| Momentum | Strong (return from the open relative to sector = 87bps) |
| Trend | Reversal (overnight gap = -53bps) |

Impact free return

Impact free return (extended)

Profile Factors

| | |
|---|---|
| PM | Portfolio Manager John Smith |
| Momentum | Strong (return from the open relative to sector = 87bps) |
| Trend | Reversal (overnight gap = -53bps) |

Impact free return

Impact free return (extended)

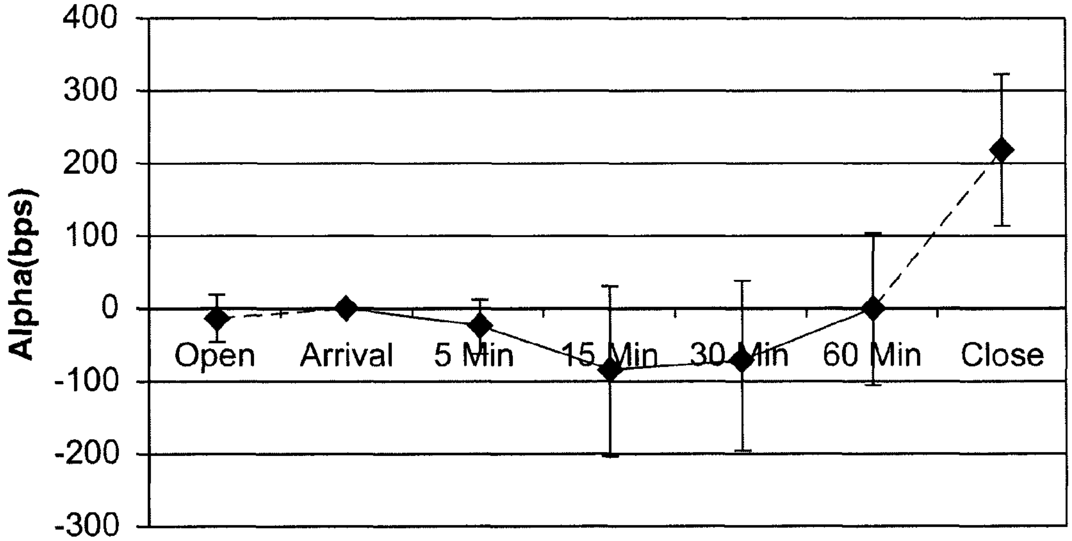
Strategy Overview
| Name | Stage | Strategy |
|---|---|---|
| AlphaS | 1 | 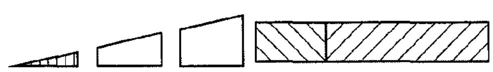 |
| | 2 | Tactical  (>10pct) |
FIG. 29

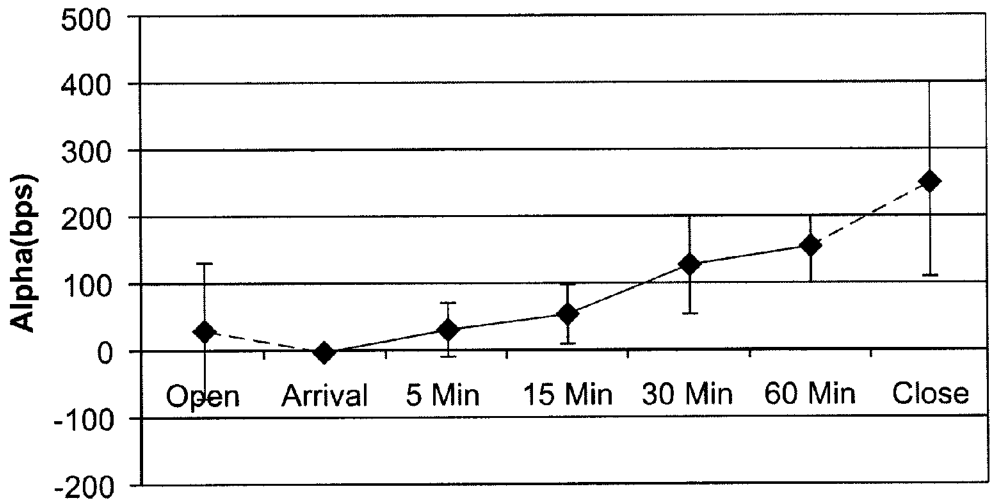
Strategy Overview
| Name | Stage | Strategy |
|---|---|---|
| Trend | 1 | 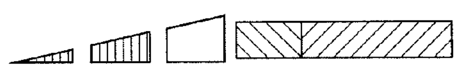 |
| | 2 | Tactical 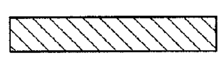 (>7pct) |
FIG. 30

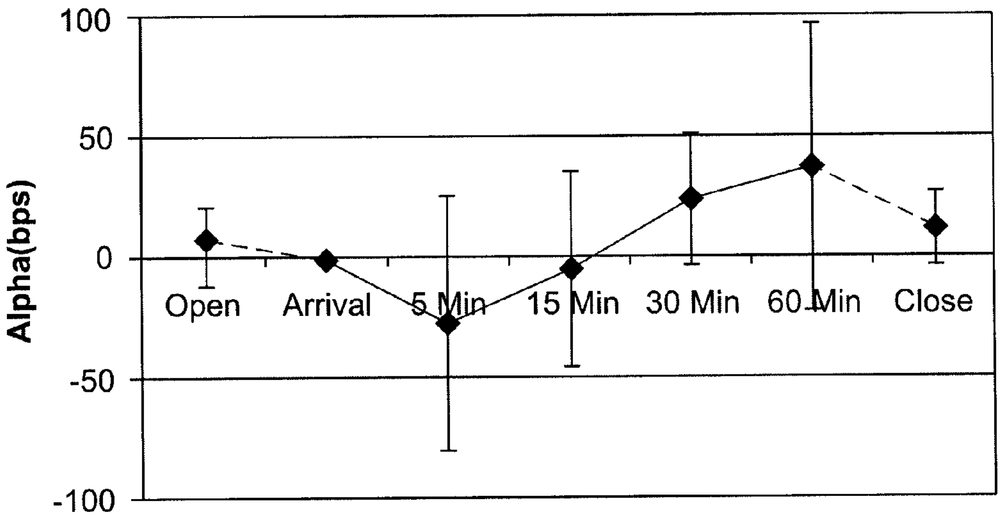
Strategy Overview
| Name | Stage | Strategy |
|---|---|---|
| Revert | 1 | 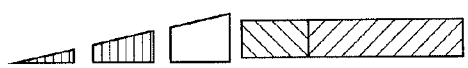 |
| | 2 | Tactical 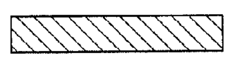 (>1pct) |
FIG. 31

Strategy Overview

| Strategy | PAL | Trader Intervention | Strategy |
|---|---|---|---|
| Munitions Manager | > 25% | Y/N | + Tactical |
| | 15 - 22% | Y/N | + Tactical |
| | 10 - 15% | Y/N | + Tactical |
| | < 10% | Y/N | Tactical |

Block Color Descriptions

Pipeline uses different colors and patterns inside and around the blocks to give you information about orders in Pipeline.

| | | |
|---|---|---|
| Block with a black "dog-ear" in upper left hand corner | CSCO | A block with a black "dog-ear" indicates that it is a symbol pulled from your OMS |
| Orange block | EBAY | A symbol where there has been recent, reasonably priced order activity<br>Activity Alert: Block B/S order for EBAY in Pipeline |
| Block with solid green border | H | A symbol where you have an active buy order |
| Block with hashed green border | MOT | A symbol where you have a buy order that is limited away and is not executable at the midpoint |
| Block with solid red border | TX | A symbol where you have an active sell order |
| Block with hashed red border | ORCL | A symbol where you have a sell order that is limited away and is not executable at the midpoint |
| Yellow block | TWX | A symbol where there is a passive contra to your active order. Clicking on the yellow symbol displays you trade options with that contra<br>Activity Alert: Contra at the Offer in TWX |
| Black block - Contra Targeting | AMZN | A symbol where there is a possible block-sized contra party at the midpoint. Clicking on the black symbol displays your trade options with that contra<br>Activity Alert: Contra at Midpoint in AMZN |
| Yellow block - Liquidity Builder | FITB | A symbol where a large block can be assembled, Click on it to lock in a large block trade at the NBBO or better<br>Activity Alert: Liquidity at the Offer in FITB |
| Gray block with diagonal red hash | GM | A symbol where there is a discrepancy between the quantity Pipeline expected to find in your OMS and what it actually found. You can look at the Event Log for more detail or call the Help Desk at 1-800-680-PIPE (7473) |
| Blue block | TWX | There has been a recent cross in this symbol in the Block Market<br>Activity Alert: Block of TXW traded in Pipeline |
| Block with blue exclamation point | ! INTC | A symbol where you have an order with an Alert. When you see the Alert icon ( ! ), check the Alerts column in your Switch Board for further information on that order |

FIG. 34

| Alpha Loss | Alpha Capture | Market Impact | Speed Impact | Spread | AS | OS | Limit Savings | P/(L) | Opportunity Costs |
|---|---|---|---|---|---|---|---|---|---|
| (4.1) +/- 4.4 | 3.1 +/ -2.5 | (15.2) +/- 1 | (3.5) +/- 0.5 | (3.7) +/- 0.8 | (4.3) +/- 0.9 | 5.8 +/- 1.1 | 19.9 +/- 2.5 | (1.9) +/- 2.9 | (22.7) +/- 3.6 |

Flat avg. shortfall is 46 bps; Sample size=738

Flat avg. shortfall is 44 bps; Sample size=696

Flat avg. shortfall is 45 bps; Sample size=532

Flat avg. shortfall is 43 bps; Sample size=599

Flat avg. shortfall is 11 bps; Sample size=1,227

Flat avg. shortfall is 6 bps; Sample size=1,404

Flat avg. shortfall is 8 bps; Sample size=1,477

Flat avg. shortfall is -4 bps; Sample size=1,444

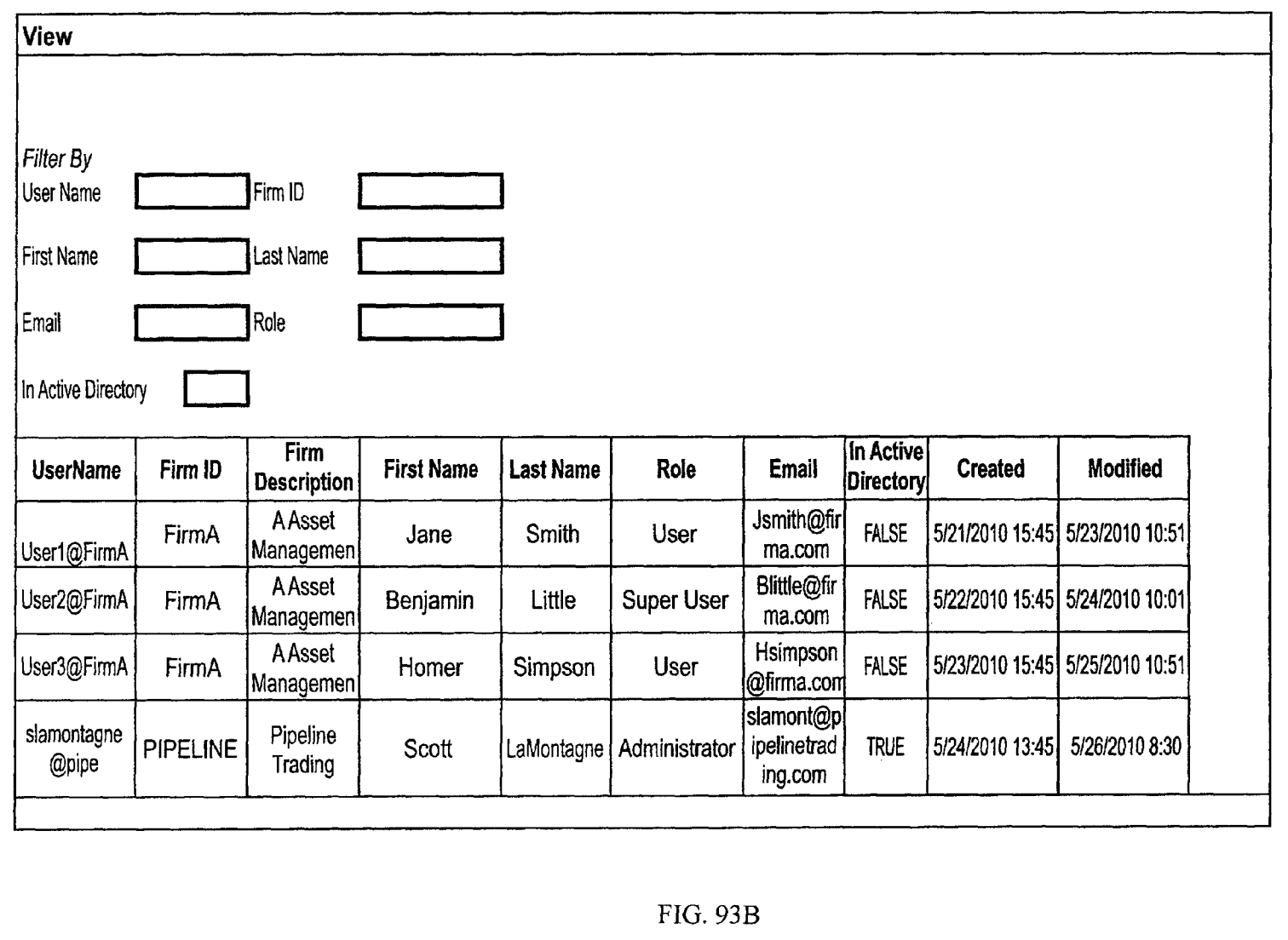

View

*Filter By*

User Name [ ] Firm ID [ ]

First Name [ ] Last Name [ ]

Email [ ] Role [ ]

In Active Directory [ ]

| UserName | Firm ID | Firm Description | First Name | Last Name | Role | Email | In Active Directory | Created | Modified |
|---|---|---|---|---|---|---|---|---|---|
| User1@FirmA | FirmA | A Asset Managemen | Jane | Smith | User | Jsmith@firma.com | FALSE | 5/21/2010 15:45 | 5/23/2010 10:51 |
| User2@FirmA | FirmA | A Asset Managemen | Benjamin | Little | Super User | Blittle@firma.com | FALSE | 5/22/2010 15:45 | 5/24/2010 10:01 |
| User3@FirmA | FirmA | A Asset Managemen | Homer | Simpson | User | Hsimpson@firma.com | FALSE | 5/23/2010 15:45 | 5/25/2010 10:51 |
| slamontagne@pipe | PIPELINE | Pipeline Trading | Scott | LaMontagne | Administrator | slamont@pipelinetrading.com | TRUE | 5/24/2010 13:45 | 5/26/2010 8:30 |

FIG. 93B

Broker-Firm Assignment

Manage

Broker Code [Select]
Firm ID [Select]
Status [Select] Edit

Save

View

*Filter By*
Broker Code Status
Firm ID

| Broker Code | Firm ID | Status | Created |
|---|---|---|---|
| BrokerA | FIrmA | Active | 4/1/2010 |
| BrokerB | FirmA | Active | 5/18/2010 |
| BrokerC | FirmB | Inactive | 5/1/2010 |
| | | | |

FIG. 94

Target Allocations

| Broker | Target Allocation % | Current Trade Day | | Week-to-Date | | Month-to-Date | | Qtr-to-Date | | Year-to-Date | |
|---|---|---|---|---|---|---|---|---|---|---|---|
| | | Volume | % | Volume | % | Volume | % | Volume | % | Volume | % |
| Broker A | 10 | 0 | 0% | 50 | 13% | 200 | 13% | 2,000 | 13% | 20,000 | 13% |
| Broker B | 15 | 30 | 33% | 75 | 20% | 300 | 20% | 3,000 | 20% | 30,000 | 20% |
| Broker C | 20 | 40 | 44% | 100 | 27% | 400 | 27% | 4,000 | 27% | 40,000 | 27% |
| Broker D | 20 | 0 | 0% | 100 | 27% | 400 | 27% | 4,000 | 27% | 40,000 | 27% |
| Broker E | 35 | 20 | 22% | 50 | 13% | 200 | 13% | 2,000 | 13% | 20,000 | 13% |
| Total | 100 | 90 | 100% | 375 | 100% | 1,500 | 100% | 15,000 | 100% | 150,000 | 100% |

Edit / Update

Non Service Bureau

| Broker | Current Day | Week-to-Date | Month-to-Date | Qtr-to-Date | Year-to-Date |
|---|---|---|---|---|---|
| Pipeline | 150 | 500 | 900 | 9,000 | 75,000 |

FIG. 95

Trade Volume

View

*Filter By*

Start Dt [ ] End Dt [ ]

Broker [ ]

View By

Daily
Weekly
Monthly
Qtrly
Yrly
YTD

| Date | Broker A | Broker B | Broker C | Broker D | Broker E | Total |
|---|---|---|---|---|---|---|
| 5/18 | 18,000 | 8,000 | 17,000 | 2,000 | 0 | 45,000 |
| 5/19 | 140,000 | 30,000 | 2,000 | 4,000 | 1,200 | 177,200 |
| 5/20 | 400 | 0 | 500 | 2,000 | 10,000 | 12,900 |
| Total | 158,400 | 38,000 | 19,500 | 8,000 | 11,200 | 235,100 |
| % | 67% | 16% | 8% | 3% | 5% | 100% |

Export

FIG. 96

| | |
|---|---|
| market_cap | int4 |
| max_block_share | float8 |
| max_iday_abs_momentum | float8 |
| max_iday_rel_momentum | float8 |
| max_pal_on_replace | float8 |
| momentum_max | int4 |
| momentum_min | int4 |
| pal_max | float8 |
| pal_min | float8 |
| pm_name | varchar(512) |
| rel_momentum_max | int4 |
| rel_momentum_min | int4 |
| rel_volatility_max | float8 |
| rel_volatility_min | float8 |
| sfall_anomaly_max | float8 |
| sfall_anomaly_min | float8 |
| side | int4 |
| sperad_max | int4 |
| sperad_min | int4 |
| startup_mask | int4 |
| tactical_pullback | int4 |
| volatility_max | float8 |
| volatility_min | float8 |
| Status | int4 |
| CreateTime | timestamp |
| ModifyTime | timestamp |
| CreatedBy | varchar(255) |
| ModifiedBy | varchar(255) |
| uc_filter_name | |

| | |
|---|---|
| reversion | float8 |
| reversion_holdback | float8 |
| Status | int4 |
| CreateTime | timestamp |
| ModifyTime | timestamp |
| CreatedBy | varchar(255) |
| ModifiedBy | varchar(255) |
| uc_stage_name | |

FIG. 103B

Sector

Market Cap

Order Sizes

Flat avg. shortfall is 46 bps; Sample size=738

Flat avg. shortfall is 44 bps; Sample size=696

Flat avg. shortfall is 45 bps; Sample size=532

Flat avg. shortfall is 43 bps; Sample size=599

Flat avg. shortfall is 11 bps; Sample size=1,227

Flat avg. shortfall is 6 bps; Sample size=1,404

Flat avg. shortfall is 8 bps; Sample size=1,477

Flat avg. shortfall is -4 bps; Sample size=1,444

METHODS AND SYSTEMS RELATED TO SECURITIES TRADING

CROSS-REFERENCE TO RELATED APPLICATIONS

The present application claims the benefit of U.S. provisional patent application No. 61/370,711, filed Aug. 4, 2010, and is a continuation-in-part of U.S. patent application Ser. No. 13/071,992, filed Mar. 25, 2011, a continuation-in-part of U.S. patent application Ser. No. 13/083,956, filed Apr. 11, 2011, and is a continuation-in-part of U.S. patent application Ser. No. 13/162,127, filed Jun. 16, 2011. The entire contents of the above-listed applications are incorporated by reference in their entirety into the present disclosure.

INTRODUCTION

As an increasing number of traders turn to post-trade transaction cost analysis (TCA) to measure the quality of their executions, there has been an explosion in the number of TCA product offerings within the financial services sector. However, to date, all of these TCA products have focused on an "after-the-fact" analysis of various measurements of the trading costs that can be attributed to a particular trade, group of trades, a trader, a firm, etc. In addition, historical TCA offerings have lacked sophistication, having been largely limited to benchmark comparisons with large groups of trades based on fairly generic criteria (for example, breaking down averages into buckets by trade size or listing). While these broad and generic comparisons are very common, more often than not they are at best not helpful and at worst counter-productive, as illustrated by the following examples:

The variation in implementation shortfall (IS) performance of different traders on a desk is dominated by differences in their order flow. In contrast, the VWAP benchmark creates arbitrary incentives: it encourages risk-averse traders to spread smaller trades over the day regardless of the urgency of each trade, and for large trades creates an incentive to front-load the execution profile or use buying power to defend price levels to "game" the benchmark. Both practices increase average shortfalls.

Evaluating algorithms based on IS favors algorithms that tend to be used with a tight limit (and therefore can only execute if the market is favorable); paradoxically, the use of tight limits is most common for less-trusted, aggressive algorithms where the trader feels the need for the limit as a safety protection. Vice-versa, the best and most trusted algorithms that traders prefer to use for difficult non-discretionary market orders will never end up at the top of an IS ranking in universe comparisons.

Negotiated block crossing networks have zero shortfalls by definition but leave the trade unfilled when there is no natural contra; opportunistic algorithms and "aggressive in the money" strategies benefit from a similar selection bias. The practice of selectively executing the trades for which a natural contra is available is a great way to win a place at the top of broker rankings.

Universe comparisons of institutional managers promotes the practice of canceling orders in the most difficult trades where the stock is running away, or increasing the size of easier trades. In cases where trade-day performance is correlated to long-term residual alpha, this practice damages the fund's information ratio.

And while TCA based on these ineffective and generic comparisons has become the norm, it is fundamentally limited in its scope because at its foundation it is a static, "backwards-looking," and often highly generic, not to mention one-dimensional, assessment of cost. As a result, even though traders are constantly required to make numerous decisions and weigh countless variables, all of which will have a dramatic impact on the quality and cost of an execution, this very basic and generic foundation of traditional TCA has neither accounted for all of these variables and decisions nor has it offered any tools that allow traders to better assess the impact of their choices or to understand the effect of their decisions in different situations.

For example, on a daily basis, traders need to choose between aggressive and opportunistic (less aggressive) trading strategies. Using the right limit price in relation to the information in a trade can enhance execution quality by selecting execution price points that are more attractive to a given target. Using more patient trading strategies can help reduce impact costs. But if the limit price or speed selection is too passive, it will delay the execution and result in substantial delays and opportunity costs. Other important variables include but are not limited to the optimal choice of algorithm, trading speed, trading venue, order size, time of order entry, time in force etc. Yet while the calculation behind traditional TCA products may penalize a trader for making the wrong choices in any of these selections, they offer no method for understanding the impact of a given choice or suggesting what would have been a better choice.

Furthermore, as explained in greater detail below, because traditional TCA products have neither leveraged the use of predictive analytics nor taken into account an analysis of what the market in a stock would have looked like had the trade or trades in question not occurred (e.g., whether the observed price movements were due to the trading activity associated with the trade in question or to exogenous market events), these static TCA offerings based on generic benchmark comparisons are often unhelpful if not counter-productive.

More specifically, the compromise between impact and opportunity costs requires an understanding of the urgency of the trade, or "short-term alpha." Post-trade analysis too often defines short-term alpha as the average realized returns from the start of trading, ignoring the fact that a large part of this return is caused by market impact from the trade in question. A trader who believes his orders have high urgency will tend to trade aggressively, which causes more impact and therefore reinforces the perception of short-term alpha. The urgency of a trade depends ultimately on the stock's expected performance without executing the trade—or the impact free price estimation.

What has been lacking in the prior art are one or more TCA tools that can help traders understand the costs associated with their trades in a way that decomposes the various components responsible for trade execution outcome, included but not limited to estimating the components of implementation shortfall, which includes but is not necessarily limited to alpha loss, an algorithm's impact, adverse selection and opportunistic savings; as well as the trade-offs associated with the speed of execution, participation rates and limit prices. At least some of such tools would preferably also be capable of adjusting (and reflecting this adjustment) the realized returns for the estimated impact of the execution in question. This adjustment is preferred in order to identify the correct compromise between impact and opportunity, because making the correct inferences entails being able to identify how the price of the stock would have behaved if no trade had taken place. Although not always required, if this step is not taken, the results of the analysis may be spurious, making one believe that the orders require more urgent execution than they actually do. One or more of these tools may also offer the ability to accurately estimate the hypothetical cost that would have been incurred had a different strategy been chosen.

By way of a specific example that shows how one or more exemplary embodiments provide improvements over the prior art, FIG. 36 shows an example of how to decide the optimal trading speed: is it the 20% participation rate that the customer has chosen or an alternative 10% participation rate? The y axis of FIG. 36 is Profit/(Loss) in basis points. The x axis is time. The customer chose a 20% participation rate, and one observes the P/(L) of 20%. The customer has a loss of 15 bps.

Would the customer have had a lower loss if he had picked a 10% participation rate? To answer that question entails simulating the P/(L) the customer would have gotten if the customer had picked the 10% participation rate.

And for that one may:

i) take the observed prices (curve with the triangles);

ii) subtract from observed prices the impact of the execution at 20% to see what the impact-free price is (see dotted curve for Alpha Loss);

iii) calculate the average impact-free price for the execution at 10% (still on the dotted curve for Alpha Loss, but going further to the right in time because an execution at 10% takes more time than an execution at 20%);

iv) to get the P/(L) at 10% one then needs to add to the impact-free price the impact of the execution at 10%

If one did not take impact into account, the only thing that one would notice is that 10% takes more time, and if the stock moves away the customer will incur more losses. If the impact is not taken into account, one will not see how much is saved in impact by lowering the speed. Indeed, in this particular case of FIG. 36, what the customer lost in terms of impact is more than compensated for by what he gains by getting the order done earlier. But the size of the cost and benefits could have been different and the only way to know is by calculating both.

Or, in other words, transaction cost analysis is based on historical data in which what is observed is to some extent affected by the customer's strategies. To make a good assessment of alternative strategies, one may wish to first subtract out the impact of those strategies to then be able to simulate accurately alternative strategies. This applies not only to speed and participation rate analysis but also to limit price analysis.

And finally, in addition to the improvements noted above, one or more exemplary embodiments described herein may also offer the ability to "mine" and analyze historical execution data in a way that actually helps traders interpret their execution data in a manner that is useful for future trade decisions.

Therefore, in order to address these and other limitations of existing TCA products, one or more exemplary embodiments change traditional transaction cost analysis from a static, backward-looking and generic benchmark comparison to a customized, interpretive and dynamic analysis that can analyze and decompose past trades in a way that reflects the range of variables that drive execution outcomes, educate traders as to how their decisions impacted execution outcome, offer specific guidance on how past trades and/or past trade-related decisions could have been improved, and, in some embodiments, using this analysis can either suggest or assign optimal trading strategies for new orders.

Certain exemplary embodiments not only analyze and decompose various components of the execution outcomes associated with a given trade (see, for example, the section herein entitled "Implementation Shortfall Decomposition for Market Orders), but also mine and analyze trade execution data in order to identify characteristics within the orders/trades being analyzed in the form of "trade profiles" that can then be used to classify and manage new orders.

In addition, certain exemplary embodiments also offer the ability to determine what would have been the most appropriate speed(s) and limit price(s) for a particular trade or trades through evaluations of the choices that were made and simulations of alternative choices that could have been made (for examples, see the sections herein entitled "Implementation Shortfall Decomposition for Market Orders," "Exemplary Analysis of Trade Profile," and "Exemplary Report Regarding Trade Profile and Execution Performance," in addition to FIGS. 44-56).

Certain embodiments also use this dynamic historical analysis and the identification of trade profiles in combination with the analysis of optimal execution speed and limit prices to aid in the identification of optimal trading strategies for new orders. Some embodiments may be used to automatically allocate trading strategies to trade profiles and carry out an execution plan (see, for example, U.S. patent application Ser. No. 13/070,852, filed Mar. 24, 2011, and incorporated herein by reference). Also see Appendix A for descriptions of exemplary embodiments that apply the system's ability to use impact free price estimations in a dynamic setting to act as a filter for the association of one or more optimal trading strategies with a given order or set of orders for either user directed initiation or automatic initiation.

In certain exemplary embodiments, incoming orders may be analyzed in light of current market conditions and historical patterns identified through the types of analysis described above, factors most likely to predict impact-free price movement are identified, and an "alpha profile" is assigned to the order. To generate this alpha profile in real-time, one or more exemplary embodiments analyze many (typically, hundreds of) drivers coming from both fundamentals and technical information. These drivers include but are not limited to how the market reacts to news, momentum since the open, overnight gaps, and how a stock is trading relative to the sector. Additional drivers are described below in Table 12. Taking drivers such as those taught herein into account, the service then recommends a trading strategy predicted to maximize alpha capture and minimize adverse selection. The trader can then manually initiate trading or can enable the system to automatically initiate the execution of the trade using the strategy recommendation.

As the trade proceeds, the analytics stream provides updates to one or more users on changes in the alpha outlook, leveraging market feedback from the execution process and feeds including news and real-time order flow analysis. Furthermore, the system constantly looks at differences between the results predicted by the strategy and the actual results. For example, impact anomaly is the difference between actual return and expected return given a pre-trade model. One or more exemplary embodiments of the system may also use predictive switching between algorithms and across venues to minimize implementation shortfall and find liquidity as the trade proceeds.

In addition, one or more exemplary embodiments of the systems and methods described herein give traders an unprecedented amount of information and control regarding the process and operation of the subject system. Most execution platforms on the market today operate as "black boxes": a trader enters an order, but he is given little to no information about how the system processes the order or how it is being executed. While this may protect the trade secrets that drive the operation of the "black box," traders do not like this lack of information and control. Traders want to understand what is going on with the market and their order, especially if the opinion they form about an order differs from the classification produced by a quantitative system. For example, a black box might tell a trader that a given trade is a high urgency trade, but then does not tell him why. Without knowing why the black box is recommending urgency, it is difficult for a trader to understand how to incorporate the system's information into his own thinking in order to take control of the execution.

In order to reconcile these kinds of differences and to have confidence in a "black box," a trader needs to be able to see the factors that drive the quantitative analysis to reconcile the two viewpoints. To address these limitations in the prior art, one or more exemplary embodiments of the subject system employs a graphical interface that provides users with unique insight into the factors behind the strategy assignment and selection for a given order. Then once the system begins to execute an order, an interface may also be used to allow traders to maintain unprecedented control over the system's automated trade execution. At any time, a trader may change speeds, grab a block, or change strategies, thereby allowing him to modulate the system's recommended strategy and actual order executions with his knowledge of factors driving optimal execution strategy.

One exemplary aspect comprises a method comprising: (a) receiving electronic data describing an executed trading order in a market traded security and related trade execution data; (b) calculating with a processing system an impact-free price estimate which estimates a price of the market traded security if the executed trading order had not been executed, wherein the impact-free price estimate is based in part on the data describing the executed trading order; and (c) transmitting data sufficient to describe the impact-free price estimate; wherein the processing system comprises one or more processors.

In one or more exemplary embodiments: (1) the related trade execution data comprises a list of executed fills and partial fills; (2) the list of executed fills and partial fills comprises symbol, price, and time of each fill or partial fill; (3) the calculating with a processing system an impact-free price estimate comprises comparing each fill and partial fill to one or more prevailing market quotes at the times of the fills and partial fills; (4) the method further comprises classifying each fill or partial fill as a passive, aggressive, or intra-spread execution; (5) the calculating with a processing system an impact-free price estimate comprises calculating an estimated accrued price impact based on estimating price impact accrued to a tape transaction time for each fill or partial fill; (6) the calculating with a processing system an impact-free price estimate comprises calculating, for a buy trade, a difference between an observed price and an estimated accrued price impact; (7) the calculating with a processing system an impact-free price estimate comprises calculating, for a sell trade, a sum of an observed price and an estimated accrued price impact; and (8) the data sufficient to describe the impact-free price estimate comprises data sufficient to display one or more actual market prices and corresponding impact-free price estimates.

At least one other exemplary aspect comprises a method comprising: (a) receiving electronic data describing an executed trading order and related trade execution data; (b) calculating with a processing system an impact-free price estimate which estimates an execution price of the executed trading order if the executed trading order had been executed without market impact, wherein the impact-free price estimate is based in part on the data describing the executed trading order; and (c) transmitting data sufficient to describe the impact-free price estimate; wherein the processing system comprises one or more processors.

At least one other exemplary aspect comprises a method comprising: (a) receiving electronic data describing an executed trading order and related trade execution data; (b) calculating with a processing system an expected execution price of the executed trading order if the executed trading order had been executed using a specified algorithm, wherein the expected execution price is the sum of: (1) an impact-free price estimate based in part on the data describing the executed trading order, and (2) estimated market impact given the specified algorithm; and (c) transmitting data sufficient to describe the impact-free price estimate; wherein the processing system comprises one or more processors.

At least one other exemplary aspect comprises a method comprising: (a) receiving electronic data describing a potential trading order in a market traded security and related market data; (b) calculating with a processing system an impact-free price estimate which estimates a price of the market traded security if the potential trading order were not to be executed, wherein the impact-free price estimate is based in part on the data describing the potential trading order; and (c) transmitting data sufficient to describe the impact-free price estimate; wherein the processing system comprises one or more processors.

In one or more exemplary embodiments: (1) the data sufficient to describe the impact-free price estimate comprises an alpha profile; (2) calculating the impact-free price estimate comprises calculation of an average market impact; (3) calculating the impact-free price estimate comprises calculation of incremental impact from fills of portions of the potential trading order; (4) calculating the impact-free price estimate comprises calculation of incremental impact from fills of portions of the potential trading order that take place in specified time segments, and reversion from activity in prior time segments; (5) calculating the impact-free price estimate comprises calculation of net results of price effects of trading portions of the potential trading order during specified time segments; (6) calculating the impact-free price estimate comprises calculation of accrued price impacts for the potential trading order during specified time intervals; (7) calculating the impact-free price estimate when the potential trading order is a buy order comprises subtraction of an accrued price impact from a fill price for each time interval that contains that fill; and (8) calculating the impact-free price estimate when the potential trading order is a sell order comprises addition of an accrued price impact to a fill price for each time interval that contains that fill.

At least one other exemplary aspect comprises a method comprising: (a) receiving electronic data describing a potential trading order and related market data; (b) calculating with a processing system an impact-free price estimate which estimates an execution price of the potential trading order if the potential trading order were to be executed without market impact, wherein the impact-free price estimate is based in part on the data describing the potential trading order; and (c) transmitting data sufficient to describe the impact-free price estimate; wherein the processing system comprises one or more processors.

At least one other exemplary aspect comprises a method comprising: (a) receiving electronic data describing a potential trading order and related market data; (b) calculating with a processing system an expected execution price of the potential trading order if the potential trading order were to be executed using a specified algorithm, wherein the potential execution price is the sum of: (1) an impact-free price estimate based in part on the data describing the potential trading order, and (2) estimated market impact given the specified algorithm; and (c) transmitting data sufficient to describe the impact-free price estimate; wherein the processing system comprises one or more processors.

At least one other exemplary aspect comprises a method comprising: (a) receiving electronic data describing a potential trading order and related market data; (b) calculating with a processing system an expected execution price of the potential trading order if the potential trading order were to be executed using a specified algorithm, wherein the potential execution price is the sum of: (i) an impact-free price estimate based in part on the data describing the potential trading order, and (ii) estimated market impact given the specified algorithm; and (c) commencing execution of the potential trading order using the specified trading algorithm; wherein the processing system comprises one or more processors.

At least one other exemplary aspect comprises a method comprising: (a) receiving electronic data describing an executed trading order in a market traded security and related trade execution data; (b) calculating with a processing system one or more components of execution costs associated with execution of the executed trading order; and (c) transmitting data sufficient to describe the one or more components of execution costs associated with execution of the executed trading order; wherein the processing system comprises one or more processors.

In one or more exemplary embodiments: (1) the data sufficient to describe the one or more components of execution costs is received by a user terminal and displayed via a graphical user interface; (2) the graphical user interface displays the data sufficient to describe the one or more components of execution costs in a format that shows values of one or more of the components; (3) the graphical user interface displays the data sufficient to describe the one or more components of execution costs in a format that shows relative values of two or more of the components; (4) the one or more components of execution costs associated with execution of the executed trading order comprise alpha loss; (5) the one or more components of execution costs associated with execution of the executed trading order comprise market impact; (6) the one or more components of execution costs associated with execution of the executed trading order comprise alpha capture; (7) the one or more components of execution costs associated with execution of the executed trading order comprise adverse selection; (8) the one or more components of execution costs associated with execution of the executed trading order comprise opportunistic savings; (9) the one or more components of execution costs associated with execution of the executed trading order comprise speed impact; (10) the one or more components of execution costs associated with execution of the executed trading order comprise limit savings; (11) the one or more components of execution costs associated with execution of the executed trading order comprise opportunity cost; (12) the one or more components of execution costs associated with execution of the executed trading order comprise spread; and (13) the one or more components of execution costs associated with execution of the executed trading order comprise profit/loss.

At least one other exemplary aspect comprises a method comprising: (a) receiving electronic data describing an executed trading order in a market traded security and related trade execution data; (b) calculating with a processing system cost effect of one or more trade decision factors associated with execution of the executed trading order; and (c) transmitting data sufficient to describe the cost effect of one or more trade decision factors associated with execution of the executed trading order; wherein the processing system comprises one or more processors.

In one or more exemplary embodiments: (1) the one or more trade decision factors associated with execution of the executed trading order comprise limit price; (2) the one or more trade decision factors associated with execution of the executed trading order comprise choice of algorithm; (3) the one or more trade decision factors associated with execution of the executed trading order comprise level of aggression; (4) the one or more trade decision factors associated with execution of the executed trading order comprise choice of broker; (5) the one or more trade decision factors associated with execution of the executed trading order comprise participation rate; (6) the one or more trade decision factors associated with execution of the executed trading order comprise speed of execution; (7) the one or more trade decision factors associated with execution of the executed trading order comprise choice of manual versus automated execution; and (8) the one or more trade decision factors associated with execution of the executed trading order comprise choice of trading strategy.

At least one other exemplary aspect comprises a method comprising: (a) receiving electronic data describing an executed order in a market traded security and related trade execution data; (b) calculating with a processing system a decomposition of execution of the executed limit order into at least a first group of components and a second group of components, the first group of components being related to algorithm performance and the second group of components being related to trader-input parameters for the executed order; and (c) transmitting data sufficient to describe the first group of components and the second group of components; wherein the processing system comprises one or more processors.

In one or more exemplary embodiments: (1) the trader-input parameters comprise level of aggression parameters; (2) the trader-input parameters comprise limit order parameters; (3) the trader-input parameters comprise trading speed; (4) the trader-input parameters comprise participation rate; (5) the data sufficient to describe the first group of components and the second group of components is received by a user terminal and displayed via a graphical user interface; (6) the graphical user interface displays the data describing the first group of components and the second group of components in a format that shows relative values of two or more components in the first group of components and the second group of components; (7) the graphical user interface displays relative values of choices of participation rate and limit price; (8) the graphical user interface displays relative values of selected speed and benchmark speed level; (9) the graphical user interface displays relative values of market impact and alpha capture; and (10) the graphical user interface displays relative values of limit price savings and opportunity costs.

At least one other exemplary aspect comprises a method comprising: (a) receiving electronic data describing an executed trading order in a market traded security and related trade execution data; (b) calculating with a processing system one or more components of implementation shortfall associated with execution of the executed trading order; and (c) transmitting data sufficient to describe the one or more components of implementation shortfall associated with execution of the executed trading order; wherein the processing system comprises one or more processors.

At least one other exemplary aspect comprises a method comprising: (a) receiving electronic data describing an executed trading order in a market traded security and related trade execution data; (b) calculating with a processing system one or more components of profit/loss associated with execution of the executed trading order; and (c) transmitting data sufficient to describe the one or more components of profit/loss associated with execution of the executed trading order; wherein the processing system comprises one or more processors.

At least one other exemplary aspect comprises a method comprising: (a) receiving electronic data describing an executed trading order in a market traded security and related trade execution data; (b) calculating with a processing system one or more components of execution outcome associated with execution of the executed trading order; and (c) transmitting data sufficient to describe the one or more components of execution outcome associated with execution of the executed trading order; wherein the processing system comprises one or more processors.

At least one other exemplary aspect comprises a method comprising: (a) receiving electronic data describing a trading order for a market-traded security; (b) checking the data describing the trading order against one or more sets of conditions, and identifying one or more of the one or more sets of conditions that is satisfied; (c) based on the identified one or more of the one or more sets of conditions that is satisfied, identifying a class of trading algorithms appropriate for execution of the trading order; (d) selecting with a processing system one or more trading algorithms from the identified class of trading algorithms, for execution of the trading order; and (e) commencing with the processing system execution of the trading order via the selected one or more trading algorithms; wherein the processing system comprises one or more processors.

In one or more exemplary embodiments: (1) one or more of the sets of conditions relate to parameters of trading orders; (2) one or more of the sets of conditions relate to current market conditions; (3) one or more of the sets of conditions relate to trading patterns of a market participant placing the trading order; (4) one or more of the sets of conditions relate to minimum or maximum measurements of available liquidity; (5) one or more of the sets of conditions relate to absolute momentum; (6) the step of identifying a class of trading algorithms appropriate for execution of the trading order is based on an impact-free price estimate which estimates a price of the market traded security if the potential trading order were not to be executed; (7) the step of selecting with a processing system one or more trading algorithms from the identified class of trading algorithms for execution of the trading order is based on an impact-free price estimate which estimates a price of the market traded security if the potential trading order were not to be executed; (8) the step of identifying a class of trading algorithms appropriate for execution of the trading order is based on one or more predictive factors; (9) the step of selecting with a processing system one or more trading algorithms from the identified class of trading algorithms for execution of the trading order is based on one or more predictive factors; (10) the step of identifying a class of trading algorithms appropriate for execution of the trading order is based at least in part on polling two or more software agents; (11) each of the two or more software agents is assigned a weight; (12) the step of identifying a class of trading algorithms appropriate for execution of the trading order is based at least in part on receiving input from each of two or more software agents; (13) the input received from each of the two or more software agents is assigned a weight; (14) the step of identifying a class of trading algorithms appropriate for execution of the trading order is based at least in part on relative predicted alpha; (15) the input received from each of the two or more software agents relates to predicted alpha; (16) the method further comprises associating a score with each input received from each of the two or more software agents; (17) the step of identifying a class of trading algorithms appropriate for execution of the trading order is based at least in part on a comparison of the two or more scores; and (18) the method further comprises: (f) checking with the processing system, during execution of the trading order via the selected one or more trading algorithms, status of the trading order and the satisfied set of conditions; (g) if the satisfied set of conditions is no longer being satisfied, checking whether another set of conditions is satisfied; and (h) if the another set of conditions is satisfied, switching with the processing system execution of the trading order to one or more other trading algorithms associated with the another set of conditions.

At least one other exemplary aspect comprises a method comprising: (a) receiving electronic data describing a trading order for a market-traded security; (b) checking the data describing the trading order against one or more sets of conditions, and identifying one or more of the one or more sets of conditions that is satisfied; (c) based on the identified one or more of the one or more sets of conditions that is satisfied, identifying a class of trading algorithms appropriate for execution of the trading order; and (d) transmitting, to the user computer, data sufficient to cause a graphical user display displayed by the user computer to display representations of one or more trading algorithms in the class of trading algorithms appropriate for execution of the trading order, for selection by a user.

In one or more exemplary embodiments, the method further comprises receiving from the user computer a selection of one or more of the one or more trading algorithms for execution of the trading order.

At least one other exemplary aspect comprises a method comprising: (a) receiving electronic data describing a trading order for a market-traded security; (b) checking the data describing the trading order against one or more sets of conditions, wherein each set of conditions in the one or more sets of conditions is associated with one or more trading algorithms, and identifying one or more of the one or more sets of conditions that is satisfied; (c) selecting with a processing system one or more trading algorithms associated with the one or more of the one or more sets of conditions that is satisfied, for execution of the trading order; and (d) commencing with the processing system execution of the trading order via the selected one or more trading algorithms; wherein the processing system comprises one or more processors.

Other aspects and embodiments comprise related computer systems and software, as will be understood by those skilled in the art after reviewing the present description.

corresponding to each k-interval, considering zero risk aversion.

Figure 19:
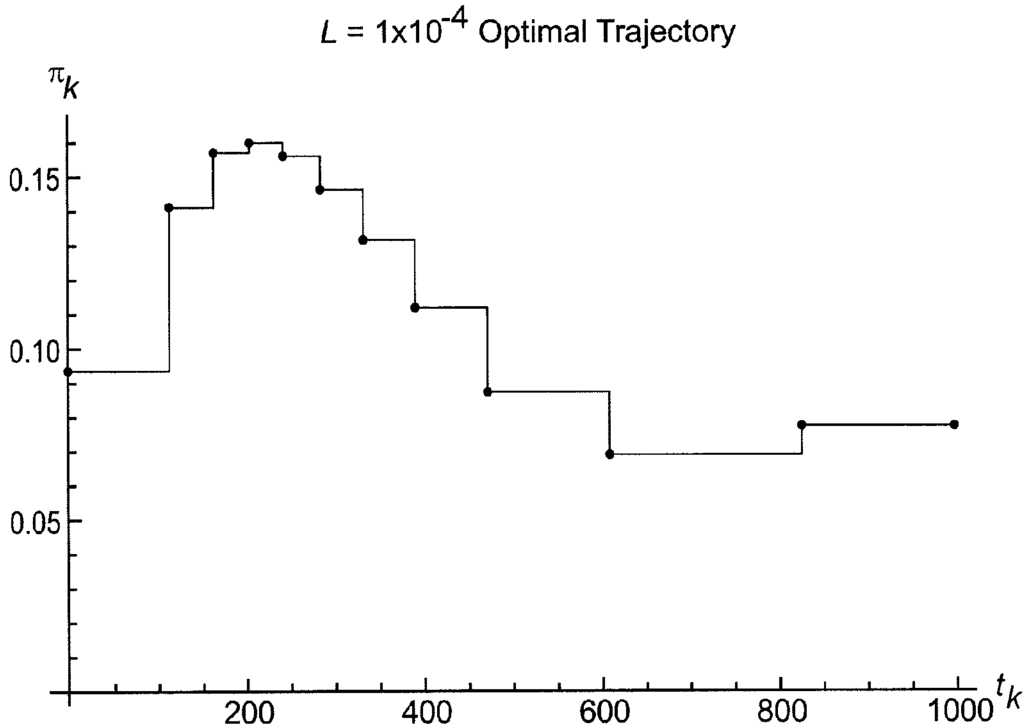

FIG. 19 depicts p participation rate in function of the transactional time, $$t_k = \sum_{i=1}^{k} \pi_i^{-2},$$

corresponding to each k-interval, considering risk aversion $L=1\times10^{-4}$.

Figure 20:
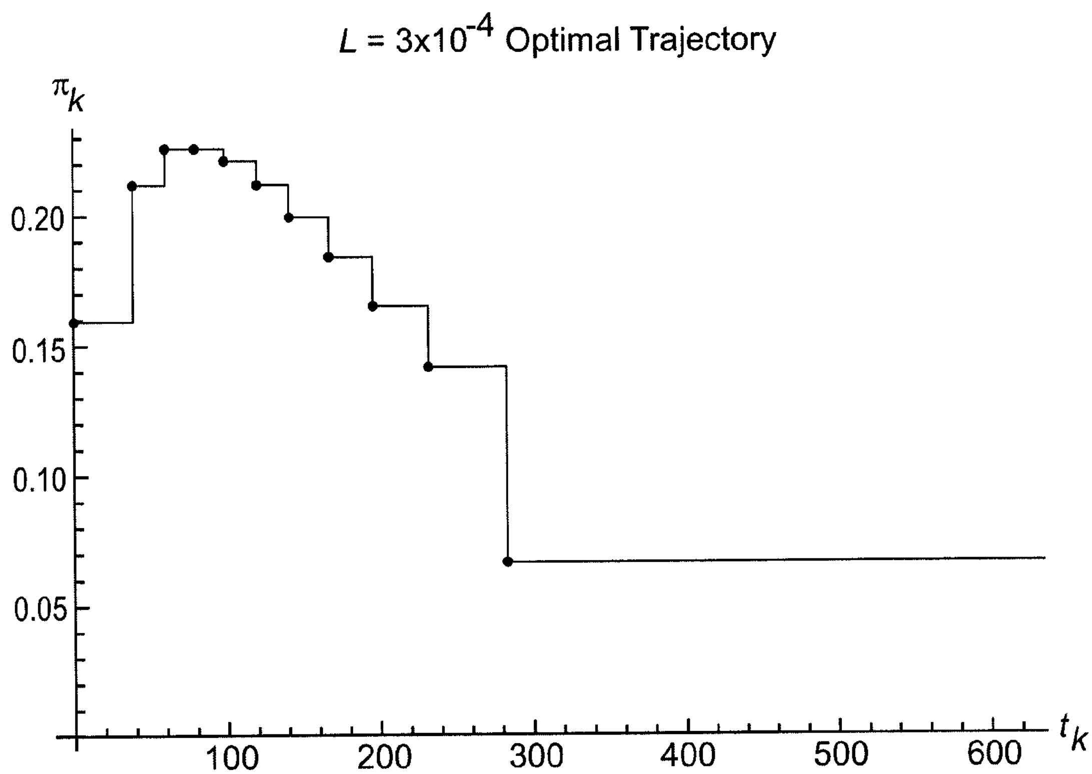

FIG. 20 depicts participation rate in function of the transactional time, $$t_k = \sum_{i=1}^{k} \pi_i^{-2},$$

corresponding to each k-interval, considering risk aversion $L=3\times10^{-4}$.

Figure 21:
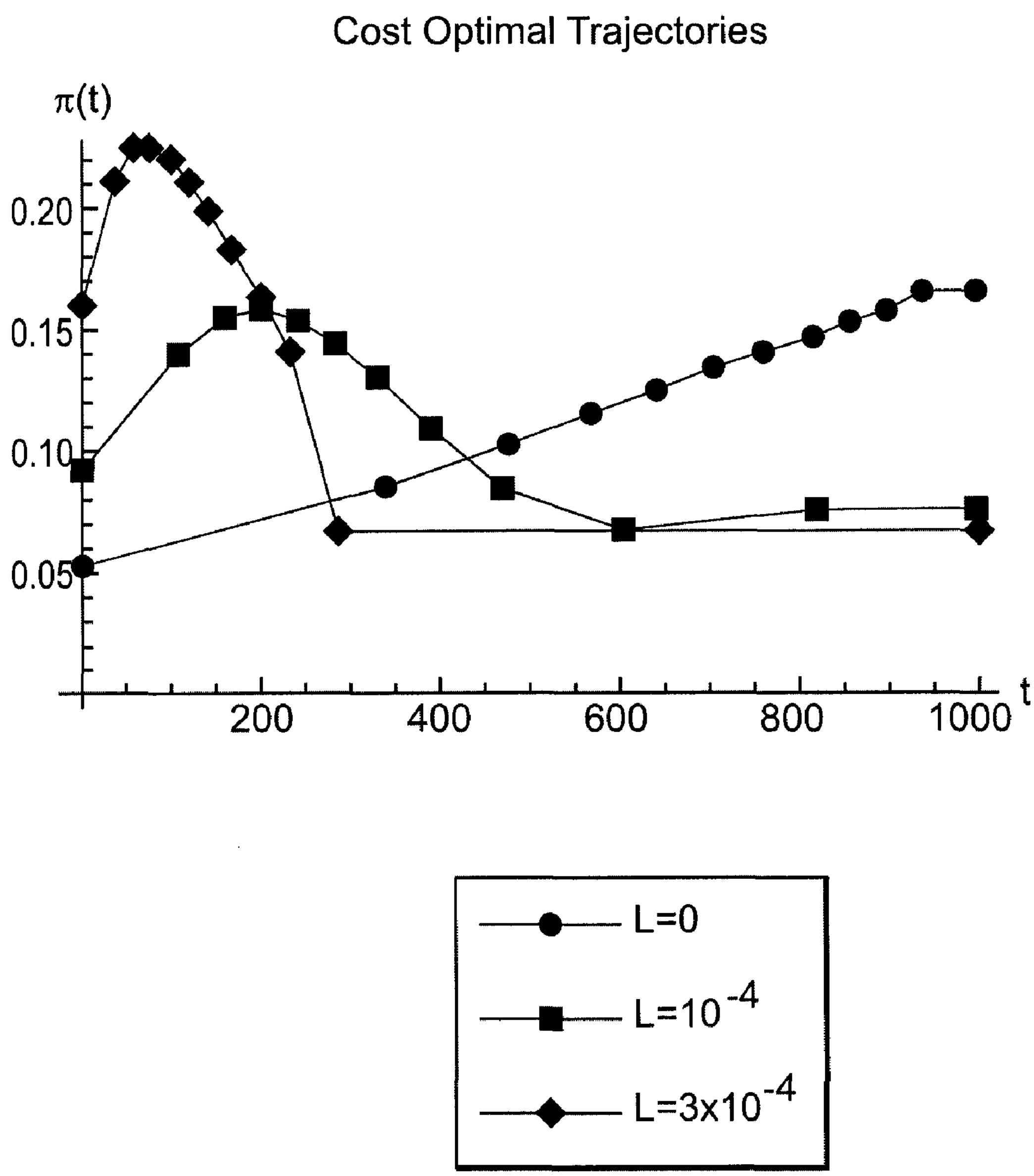

FIG. 21 depicts a comparative graph for the different values of the risk aversion in the quadratic approximation or continuum.

Figure 22:
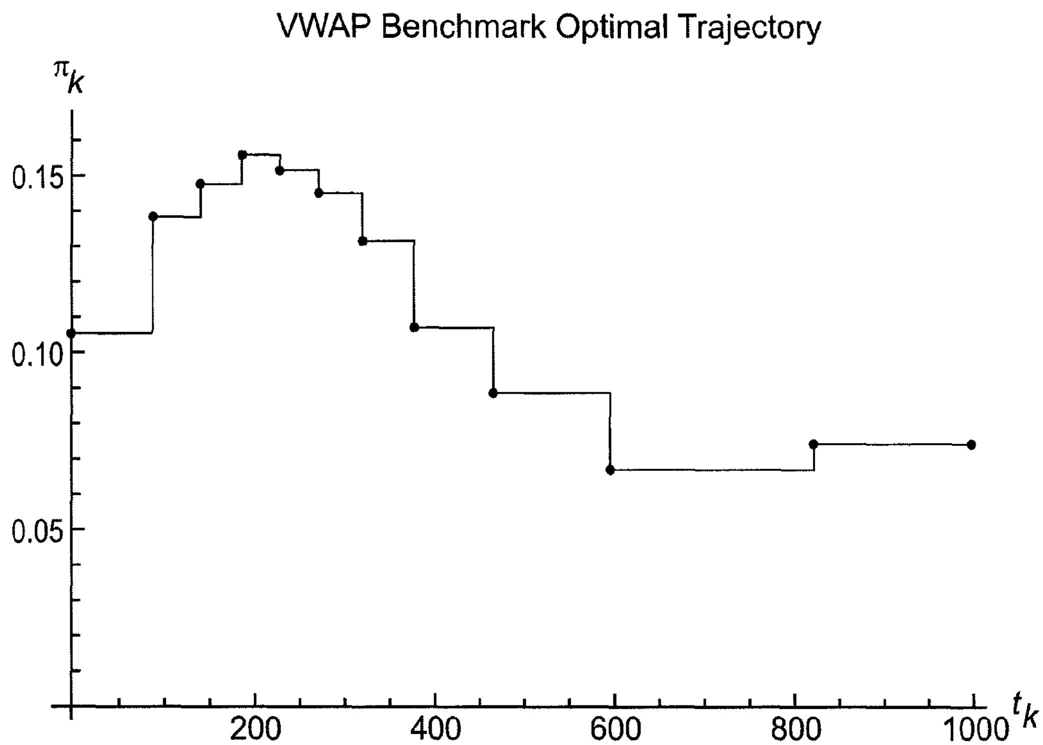

FIG. 22 depicts a graph of participation rate versus transactional time for a VWAP-optimal solution.

Figure 23:
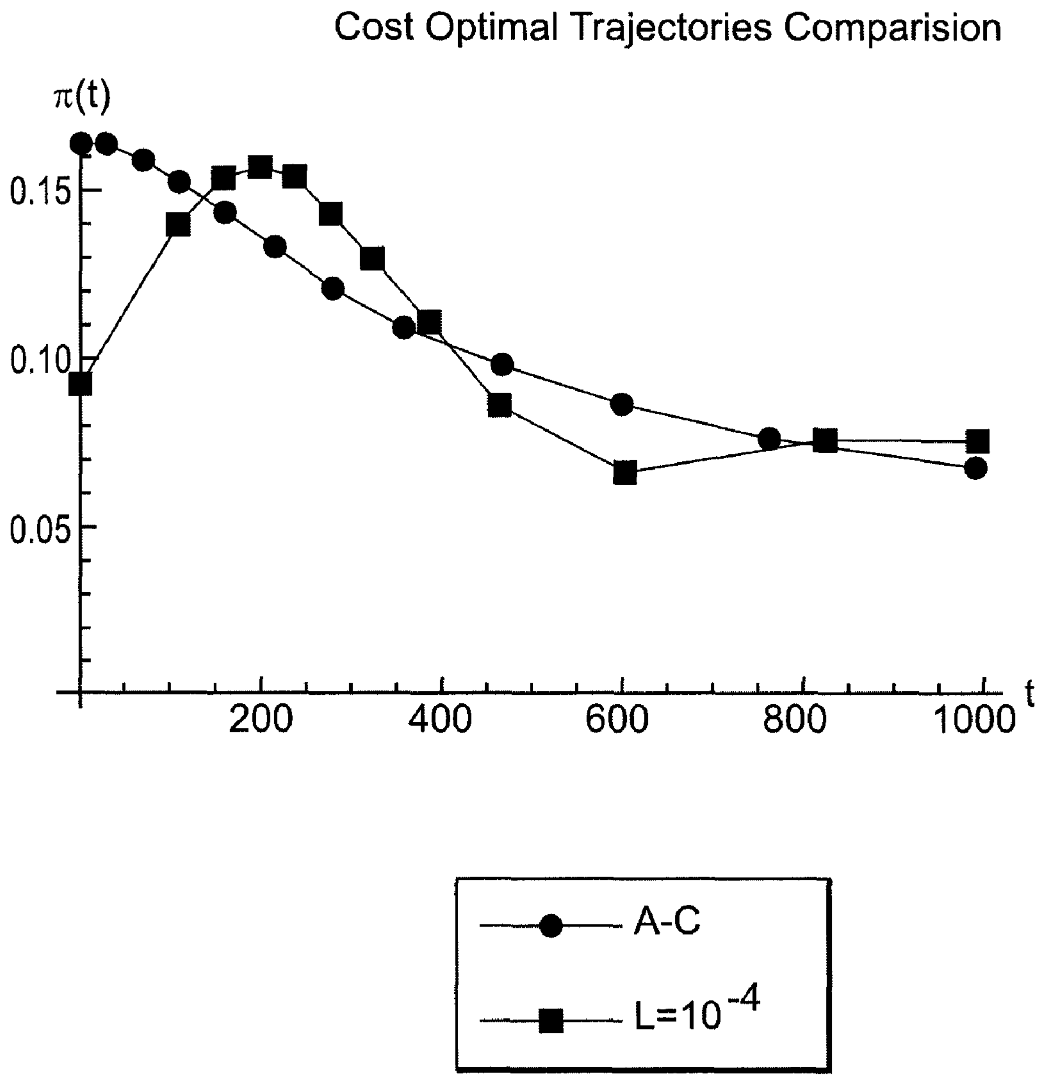

FIG. 23 depicts a comparative graph of the cost optimal trajectories in function of the transactional time.

Figure 24:
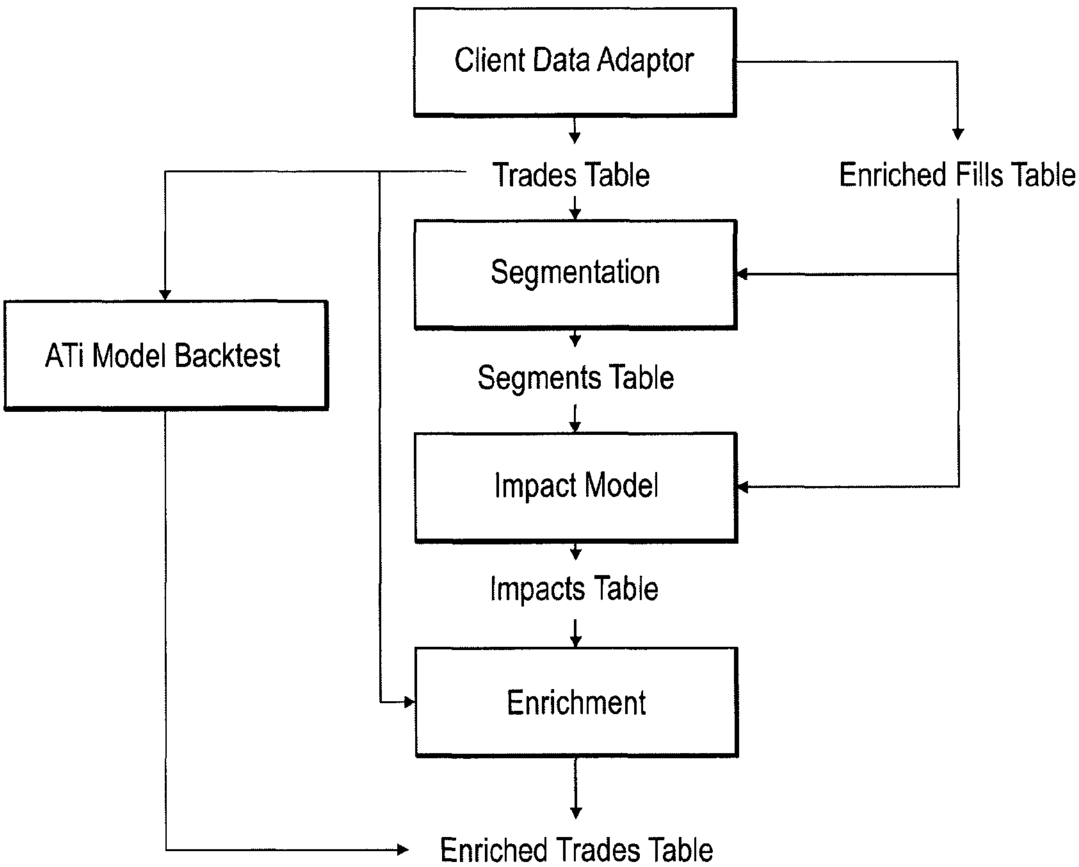

FIG. 24 depicts certain exemplary processes and tables.

FIGS. 25-28 depict exemplary alpha profile displays.

FIGS. 29-32 depict exemplary trading strategy displays.

Figure 33:
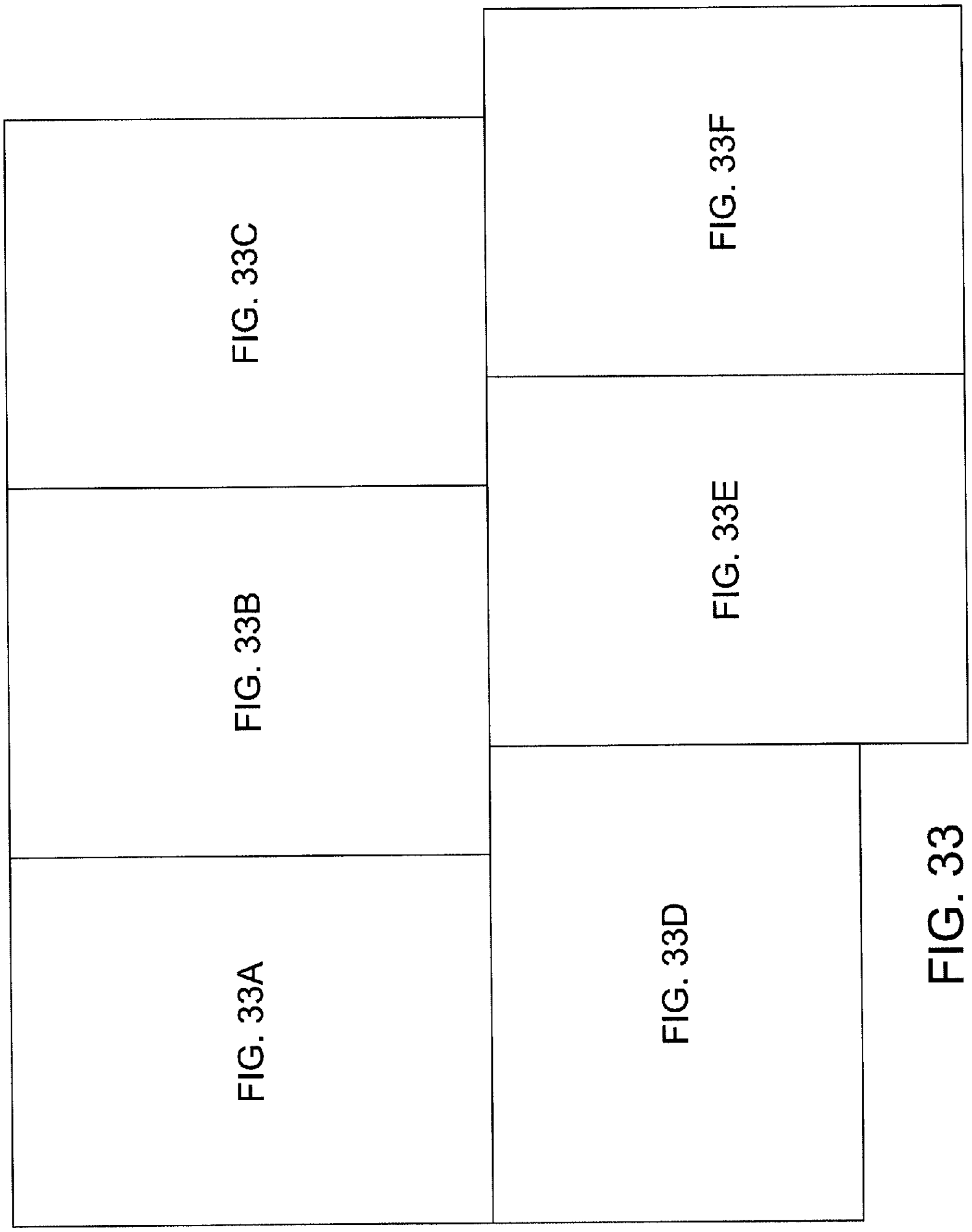
Figure 33A:
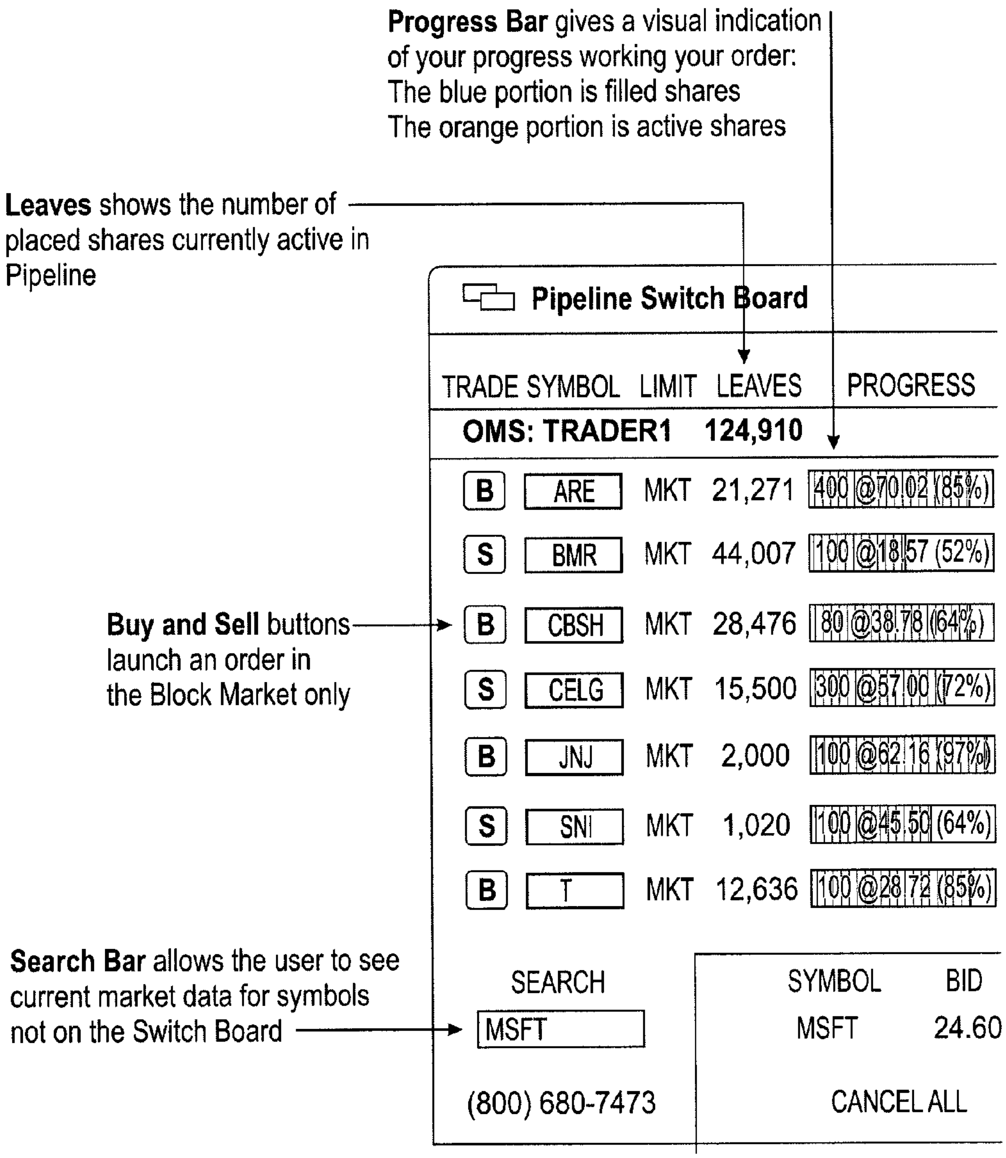
Figure 33B:
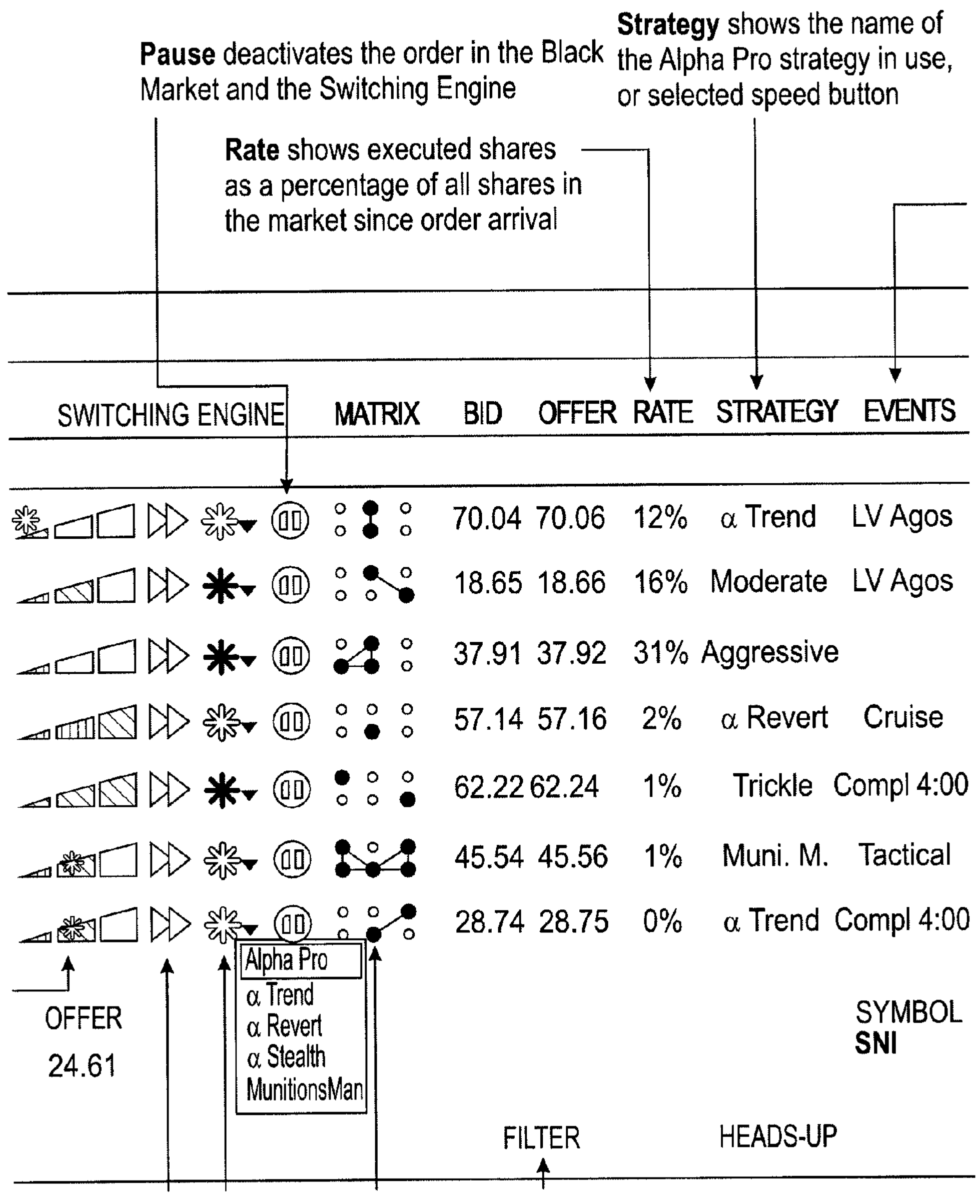
Figure 33C:
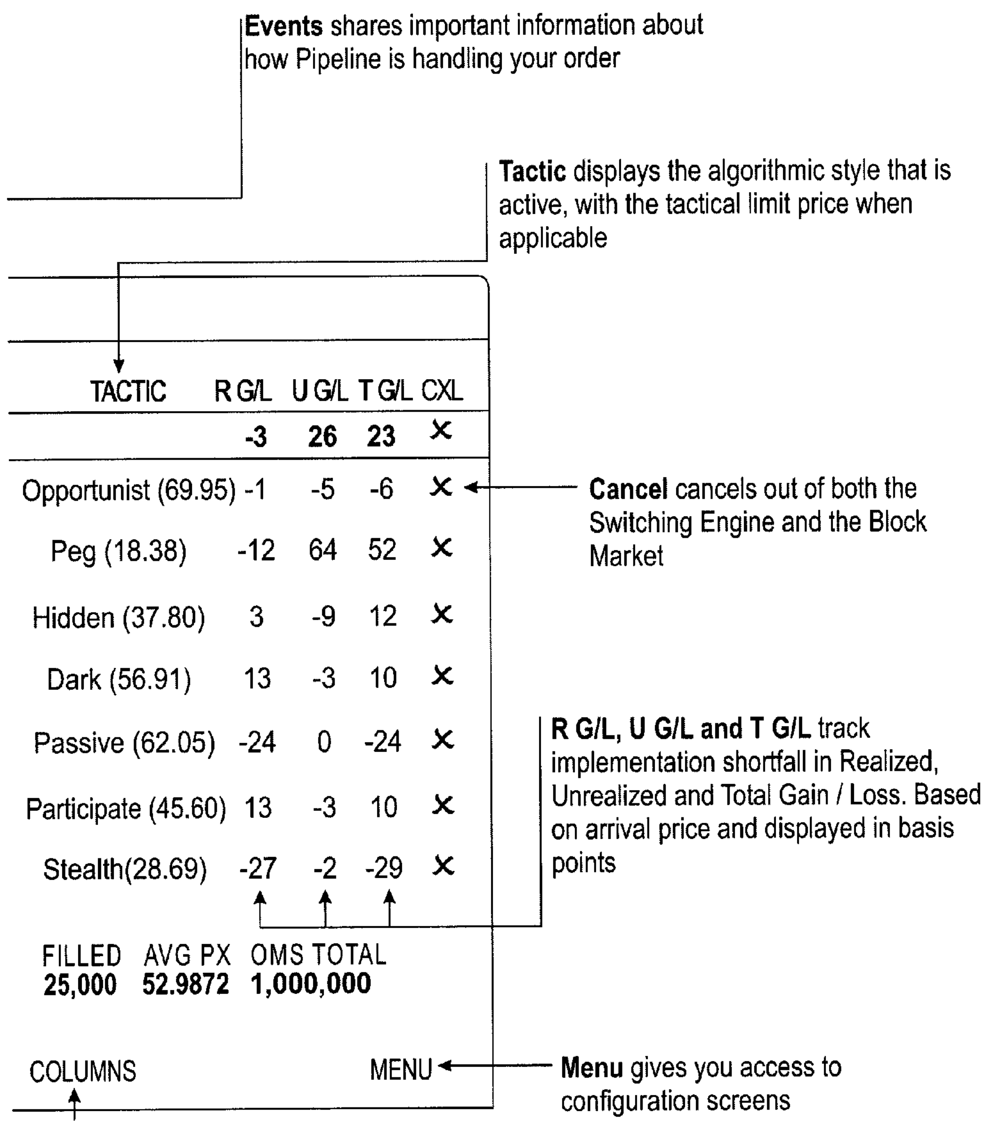
Figure 33D:
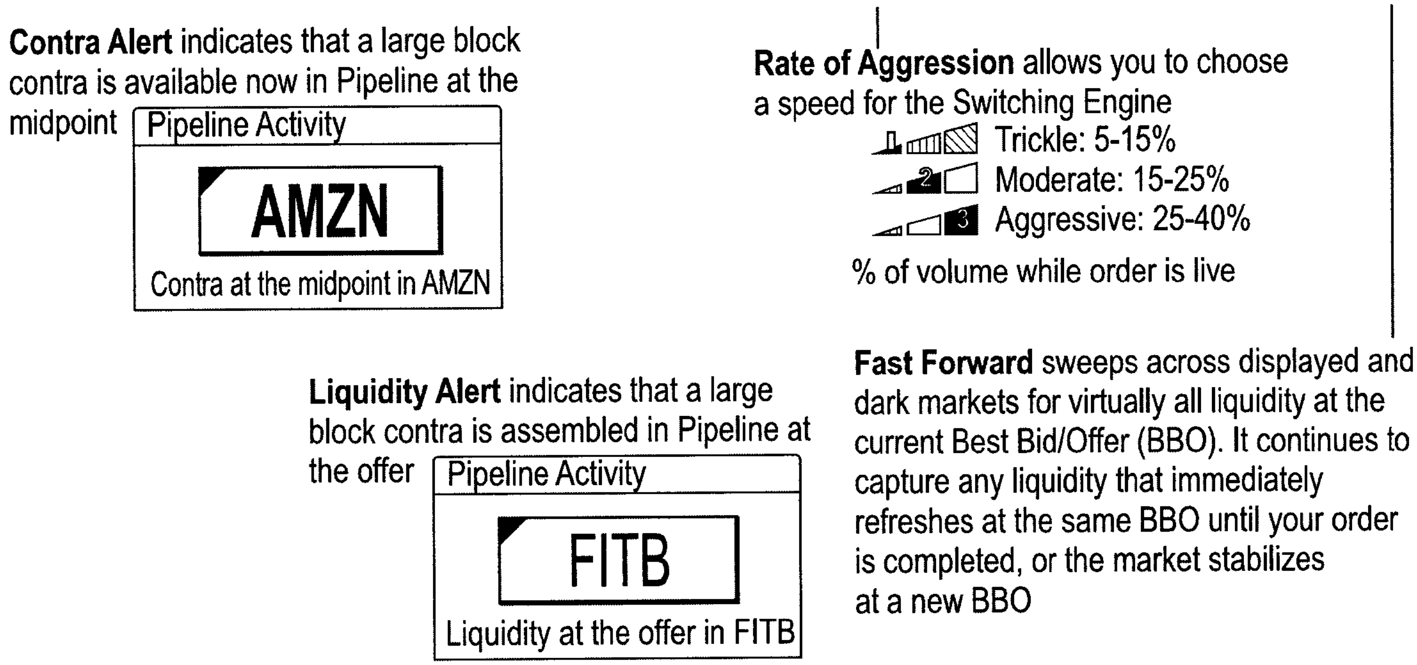
Figure 33E:
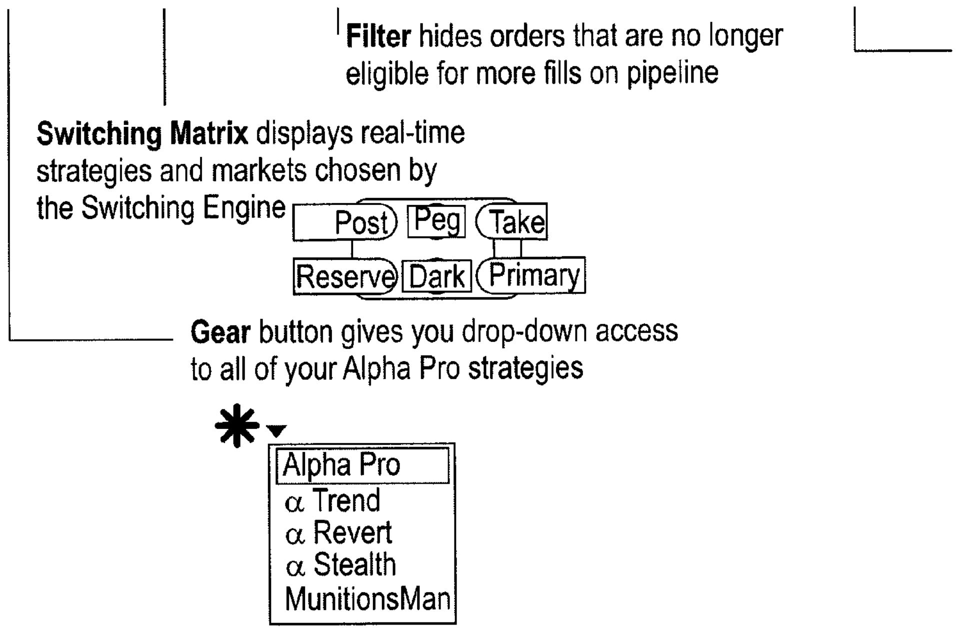
Figure 33F:
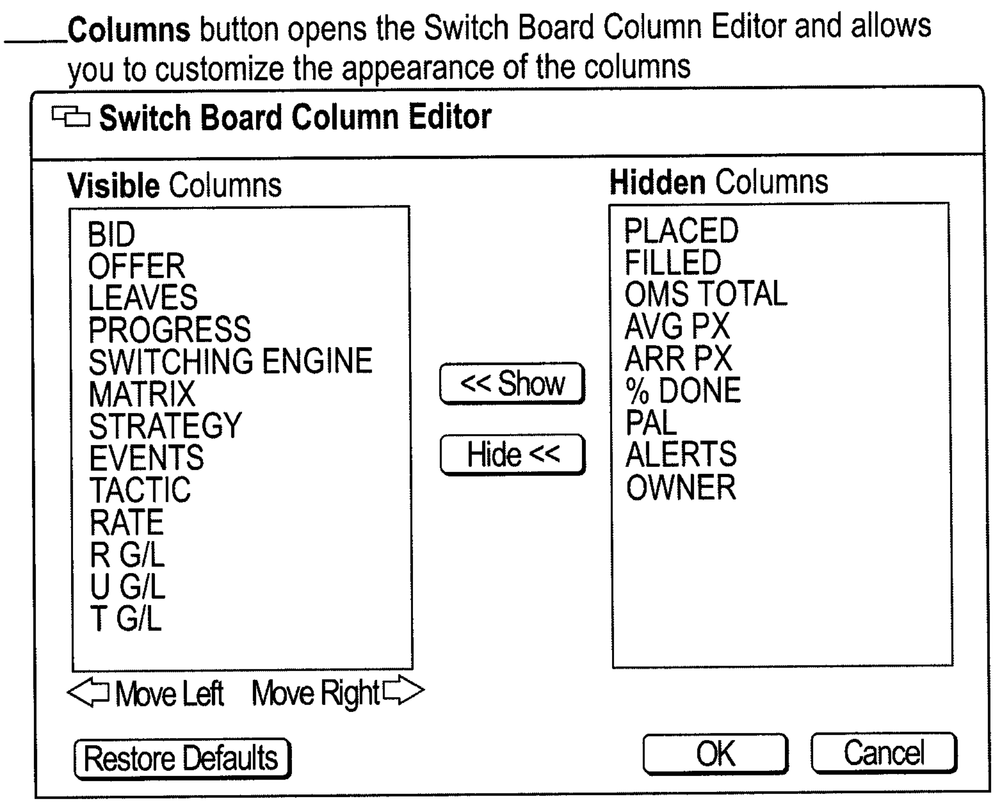

FIG. 33 depicts an exemplary graphical user interface that may be used with one or more aspects or embodiments.

FIG. 34 provides an exemplary block color description.

Figure 35:
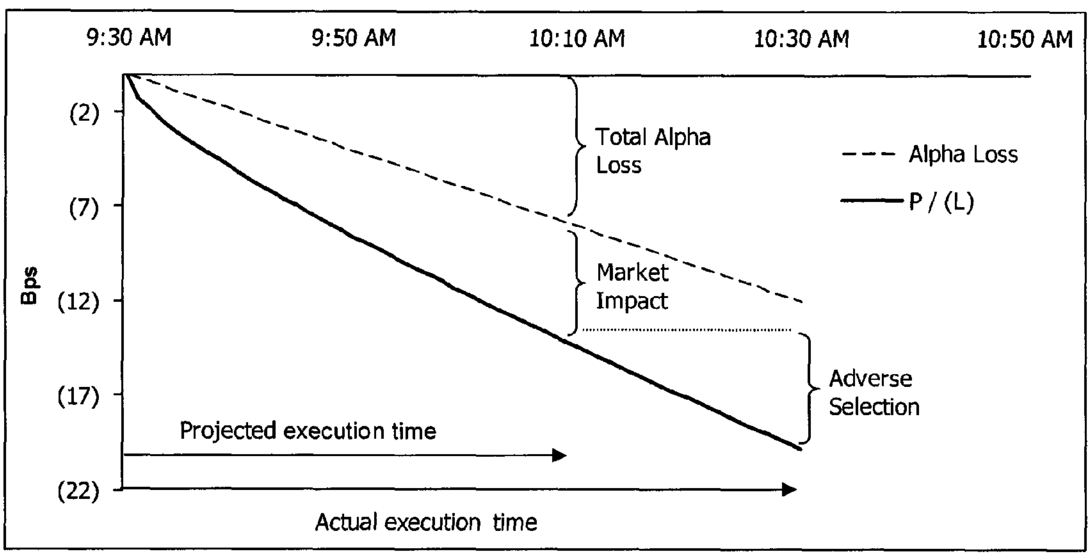

FIG. 35 depicts an example with the main components of implementation shortfall in terms of Profit/(Loss).

Figure 36:
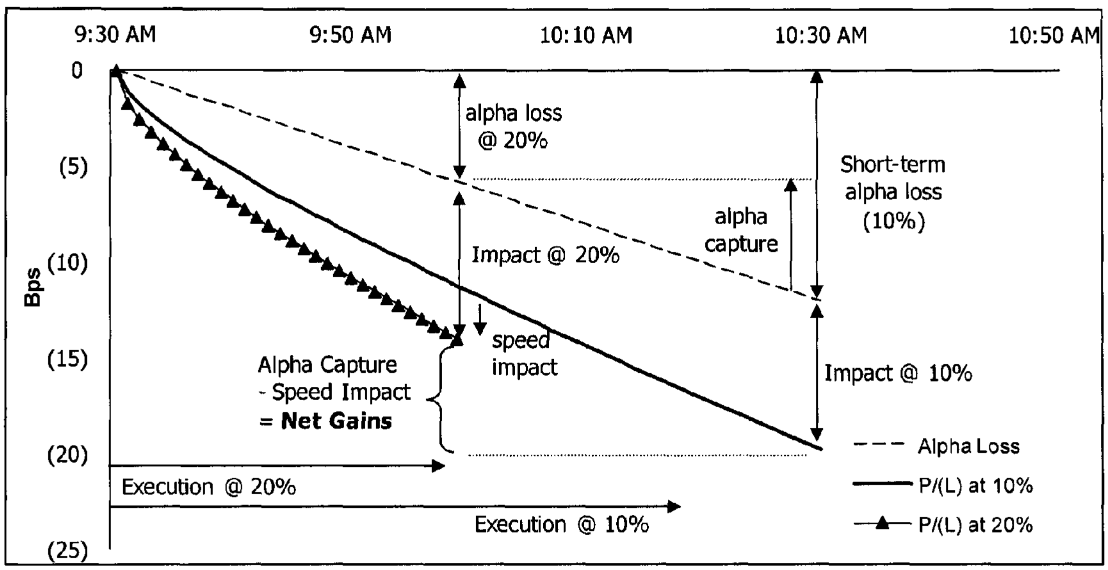

FIG. 36 illustrates trade-off between market impact and alpha capture for two speeds.

Figure 37:
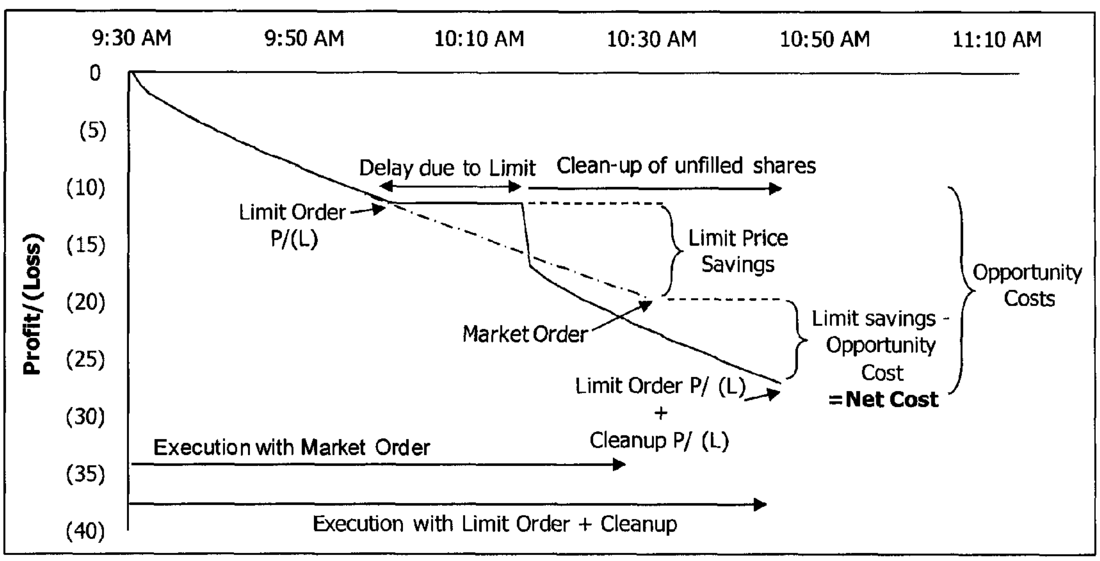

FIG. 37 illustrates trade-off between limit price savings and opportunity costs.

Figure 38:
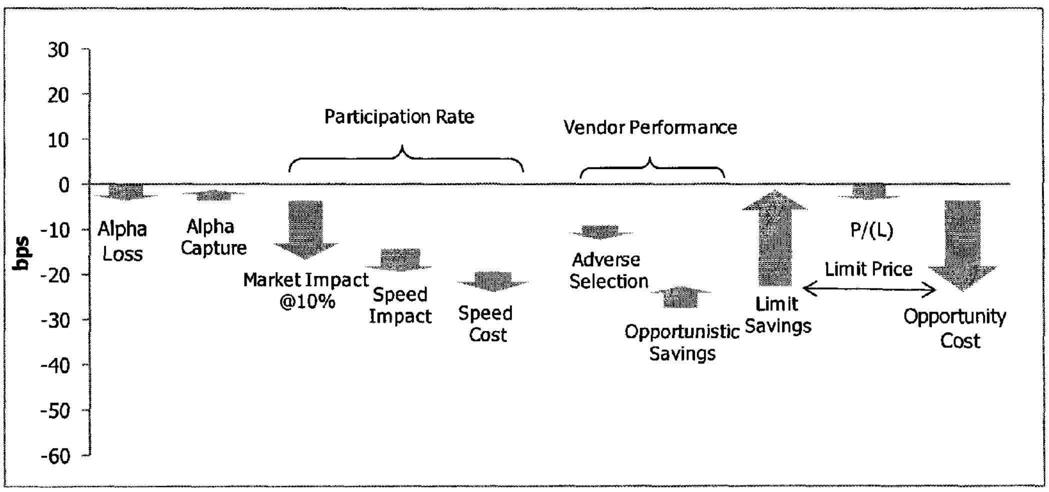

FIG. 38 depicts an example of value-weighted P/(L) decomposition for limit orders (in bps).

Figure 39:
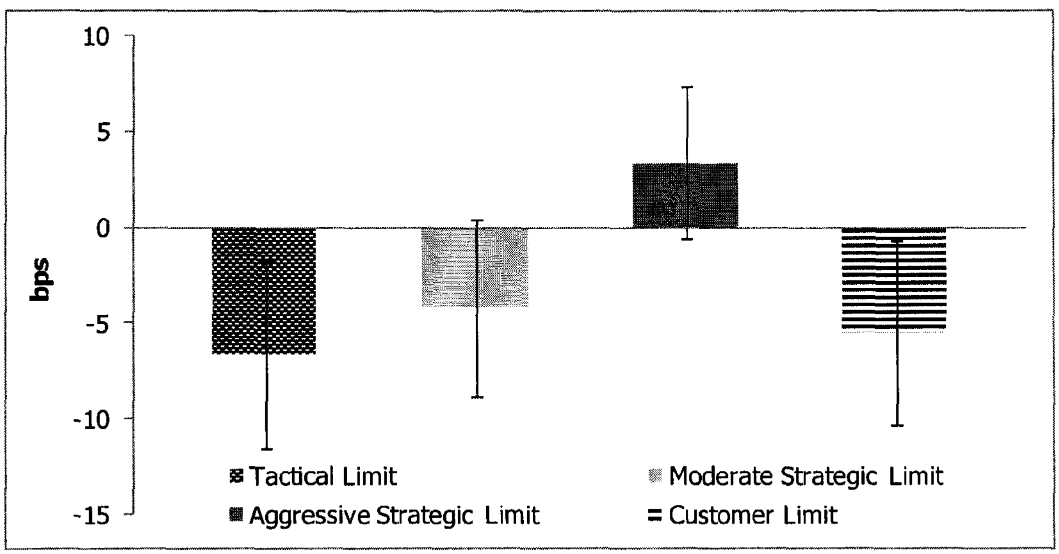

FIG. 39 illustrates an example of net limit price savings over market orders.

Figure 40:
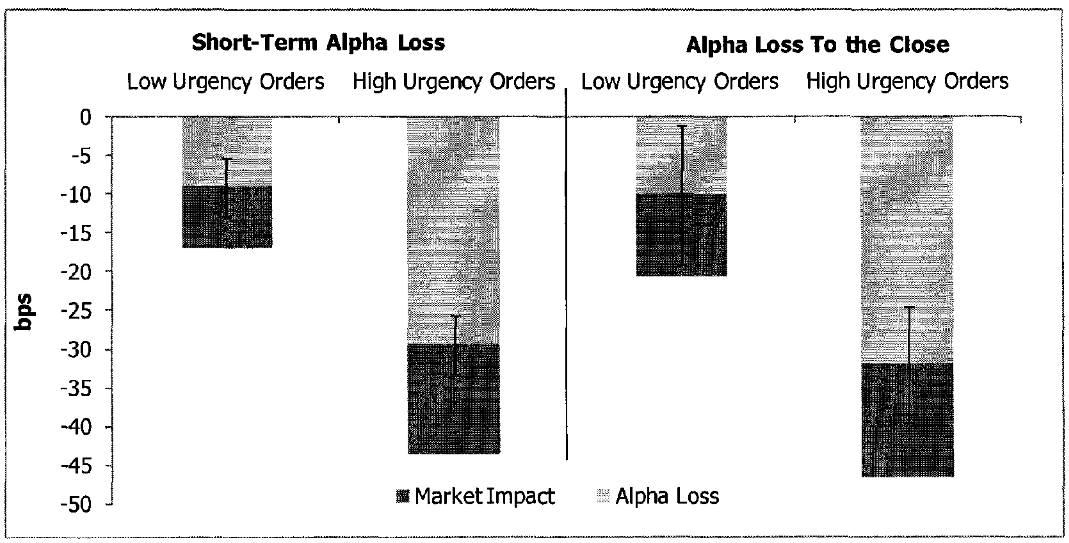
Figure 41:
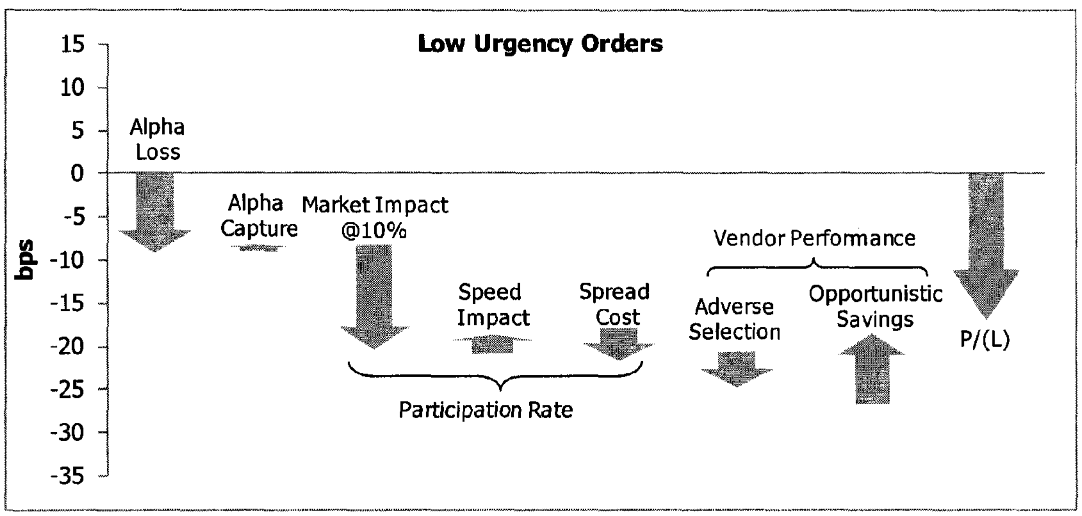
Figure 42:
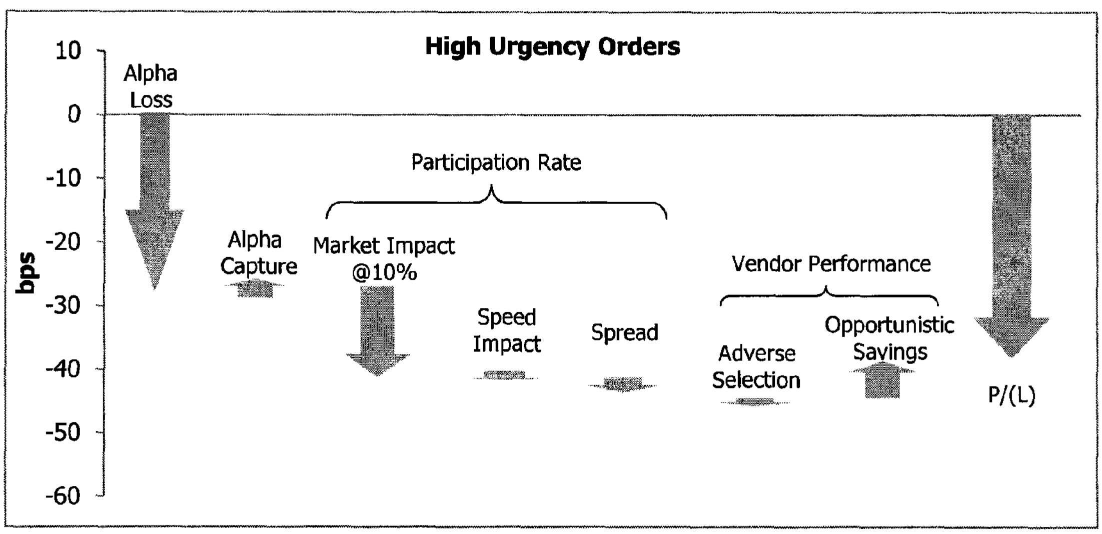

FIGS. 40-42 illustrate exemplary order flow analysis.

Figure 43:
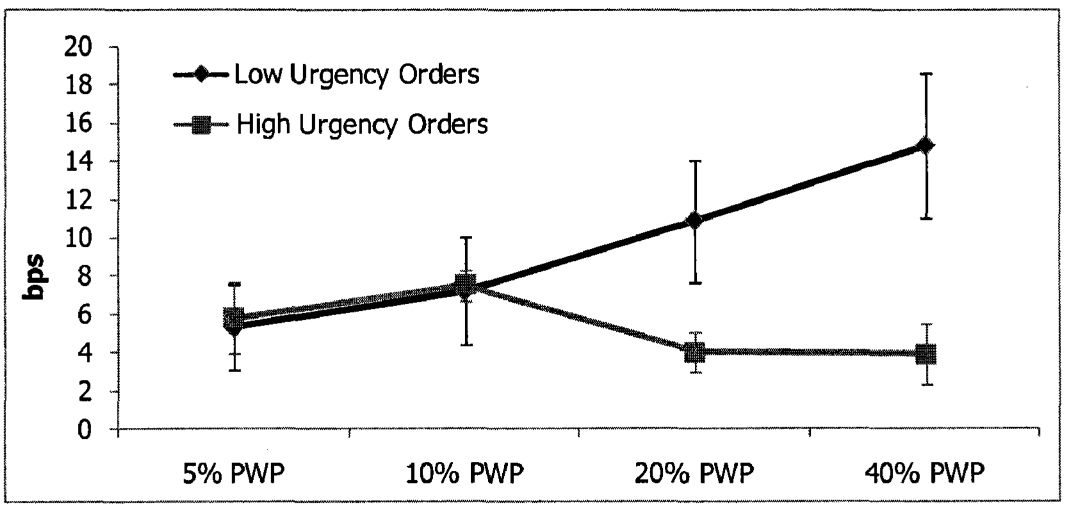

FIG. 43 illustrates an example of cost of benchmark speed levels versus selected target rate.

FIGS. 44-47 depict exemplary results of trades greater than 1% ADV.

FIGS. 48-51 depict exemplary results of trades less than 1% ADV.

Figure 52:
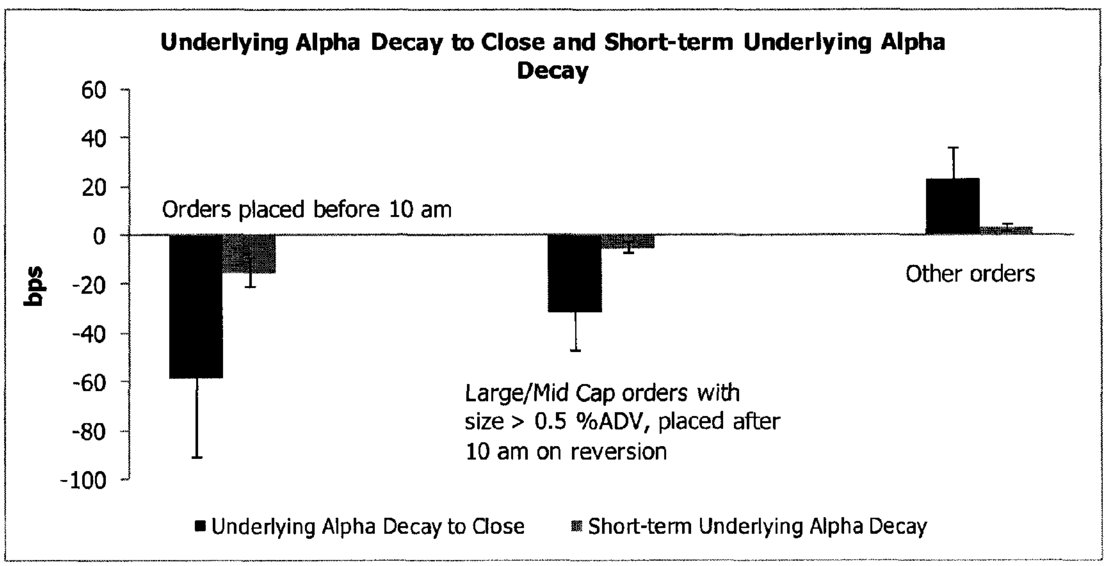

FIG. 52 illustrates underlying alpha decay to close and short-term underlying alpha decay.

Figure 53:
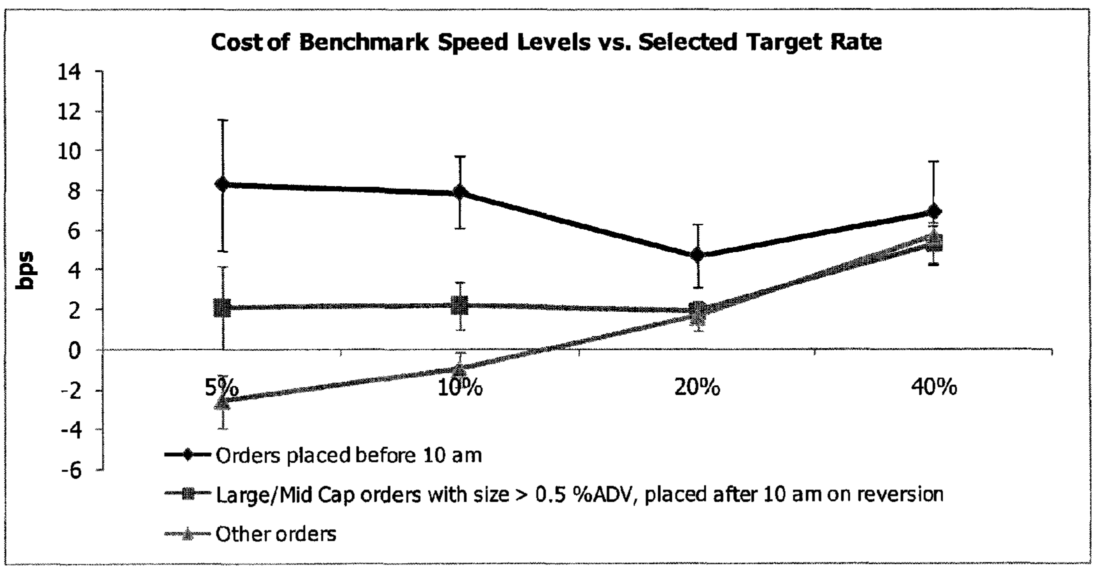

FIG. 53 illustrates cost of benchmark speed levels versus selected target rate.

Figure 54:
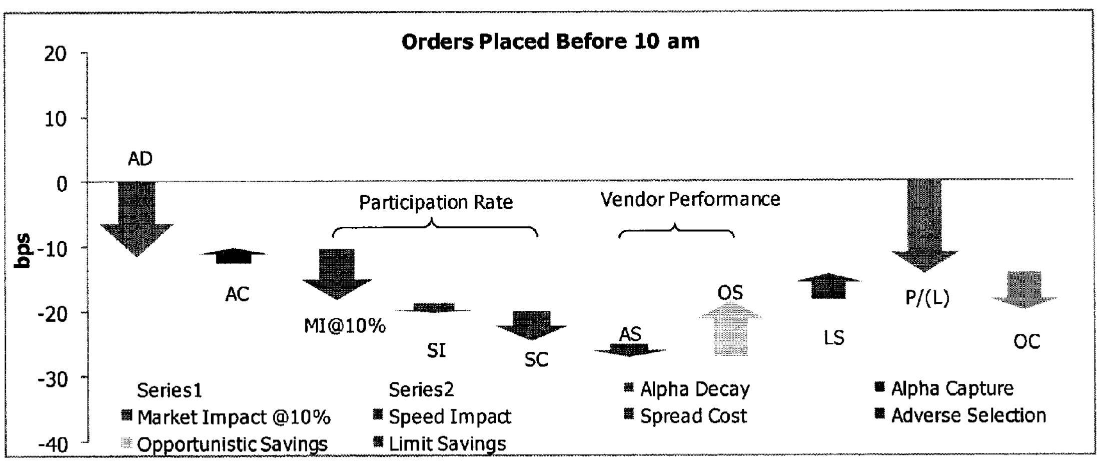

FIG. 54 illustrates various parameters related to orders placed before 10 a.m.

Figure 55:
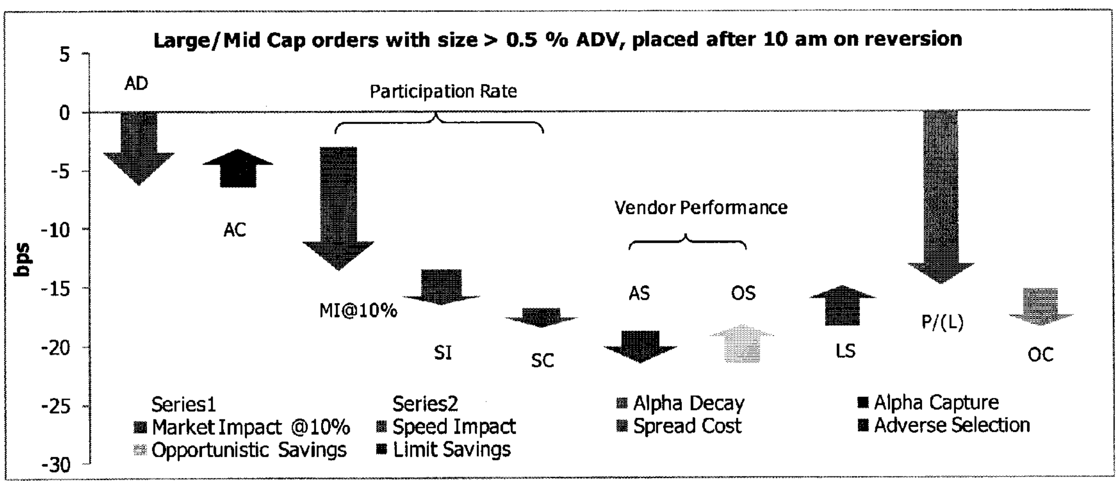

FIG. 55 illustrates various parameters related to large/mid cap orders with size greater than 0.5% ADV, placed after 10 a.m. on reversion.

Figure 56:
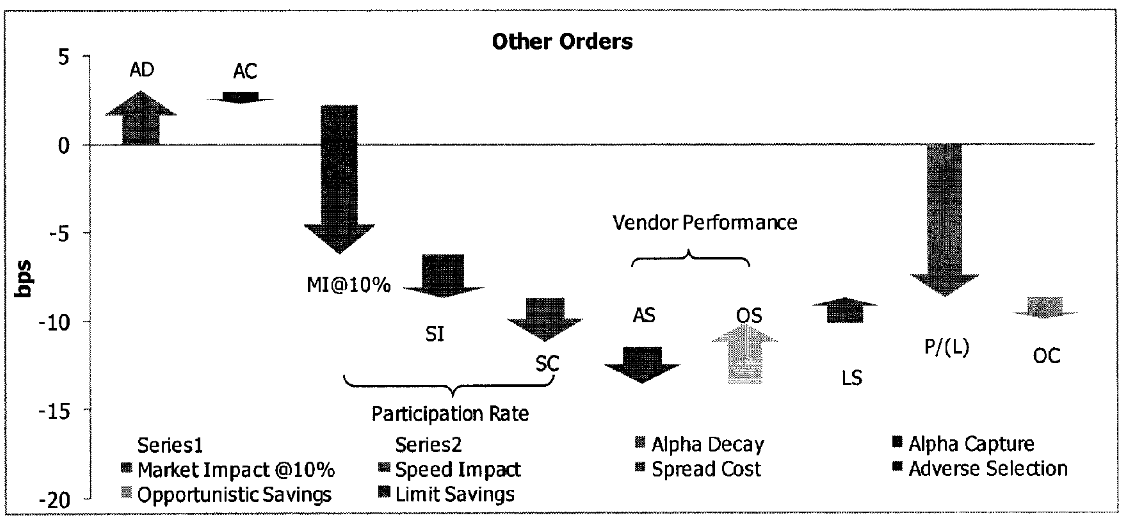

FIG. 56 illustrates various parameters related to other orders.

Figure 57:
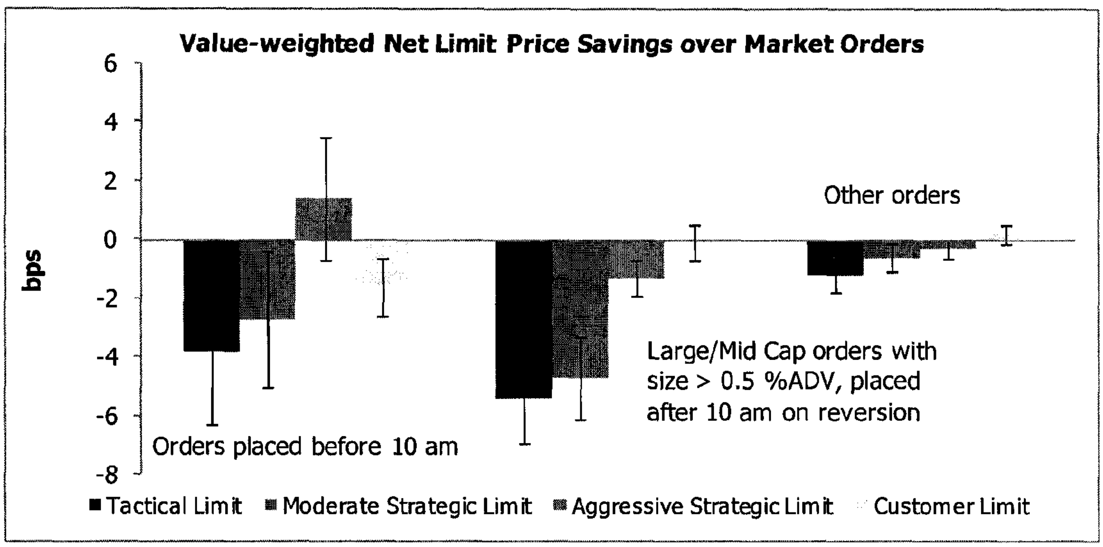

FIG. 57 illustrates value-weighted net limit price savings over market orders.

Figure 58:
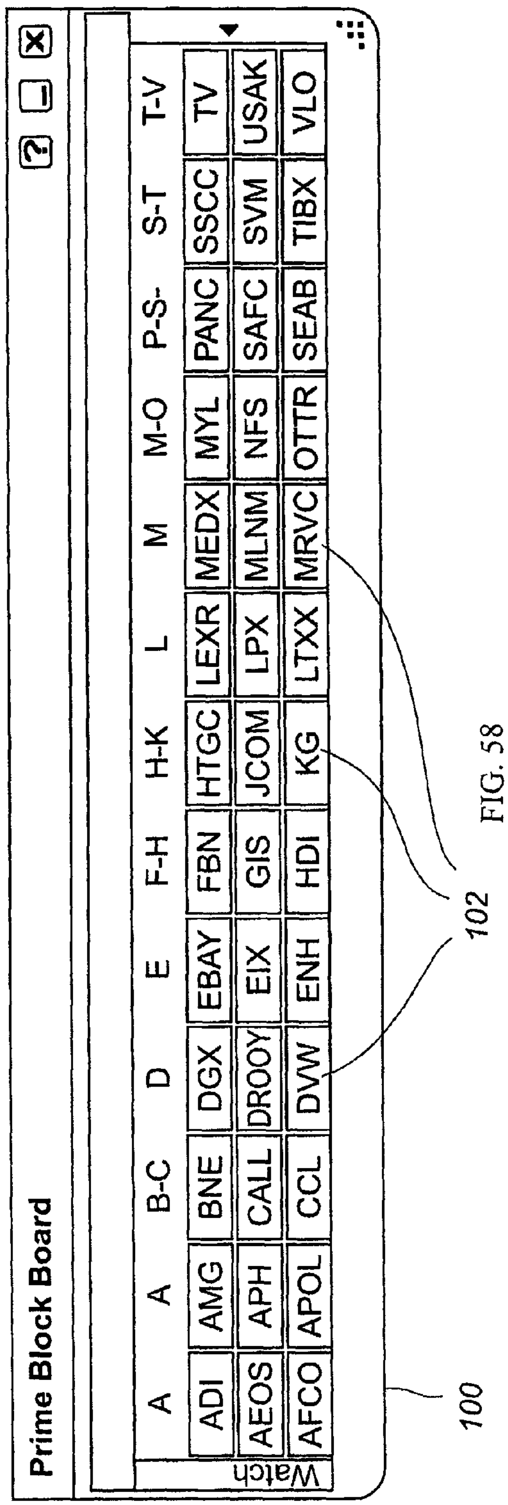

FIG. 58 shows a watch list having symbols representing securities.

Figure 59:
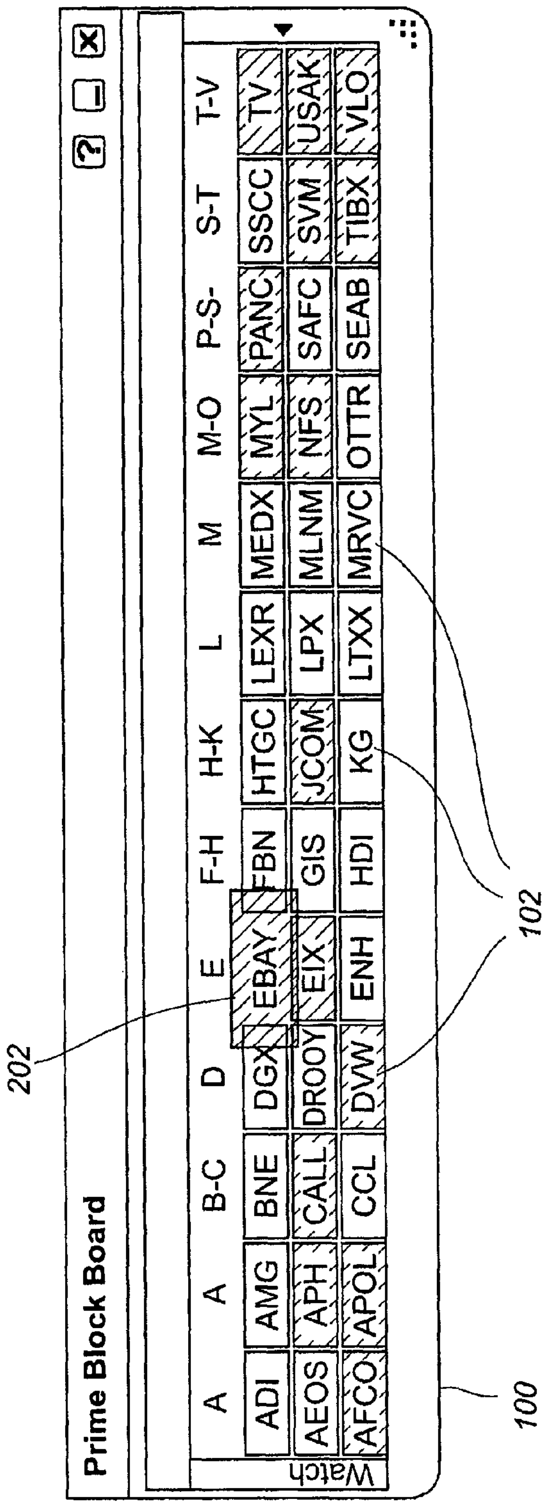

FIG. 59 shows the watch list of FIG. 58, except with an enlarged symbol.

Figure 60:
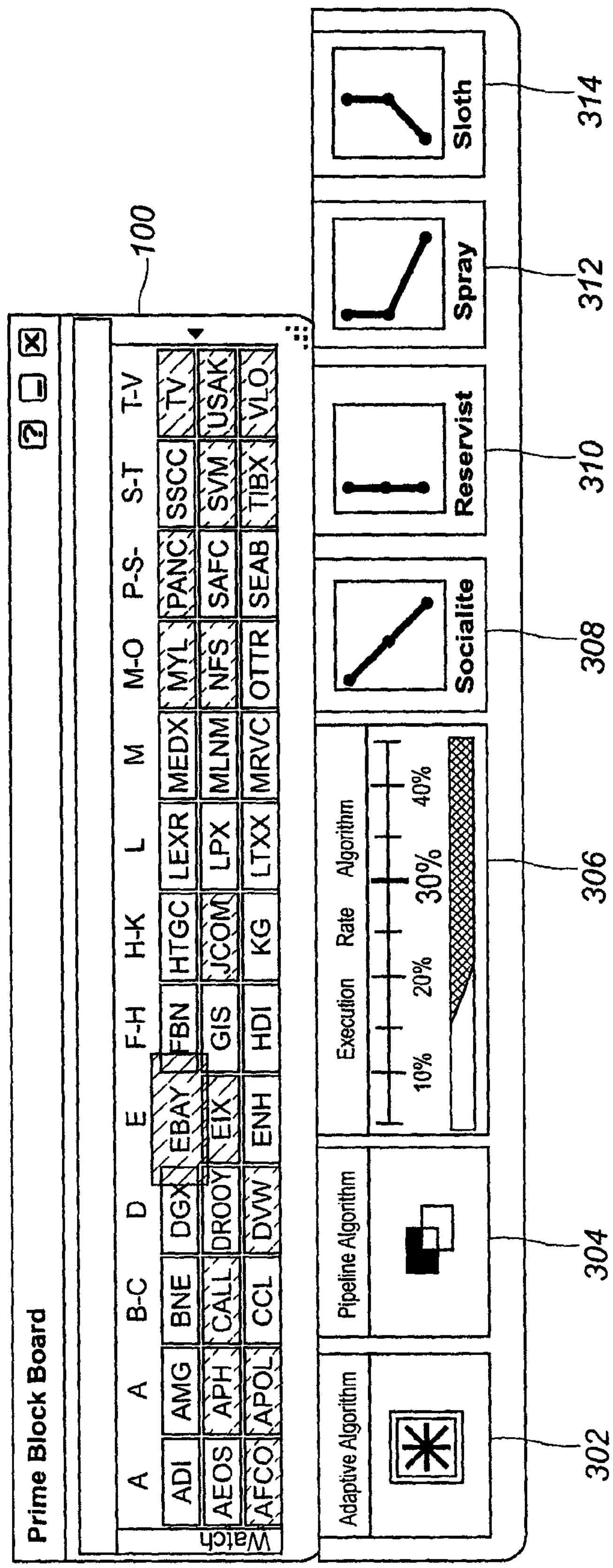

FIG. 60 shows a dashboard.

Figure 61:
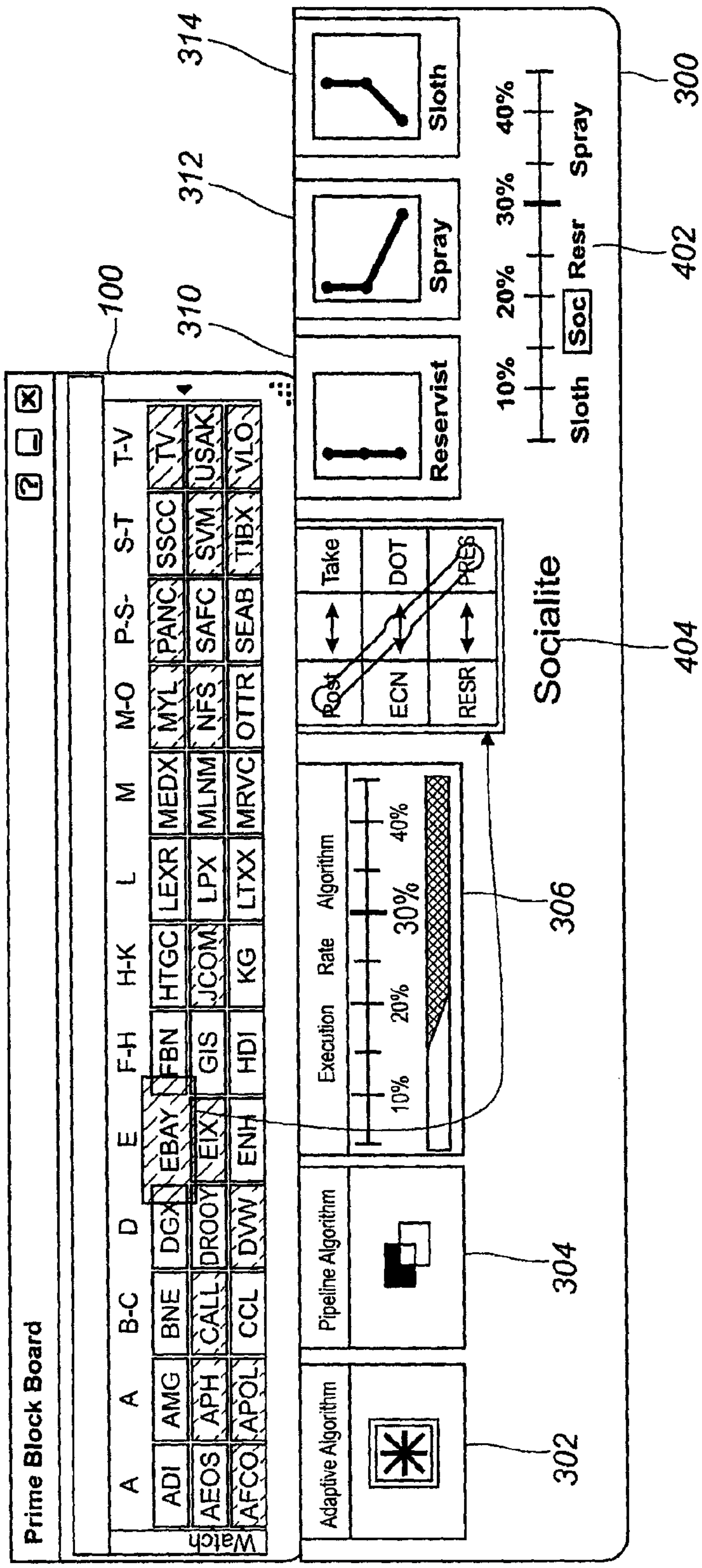

FIG. 61 shows the dashboard of FIG. 60 with a behavior matrix and a display of execution rates for a selected tactical algorithm.

Figure 62:
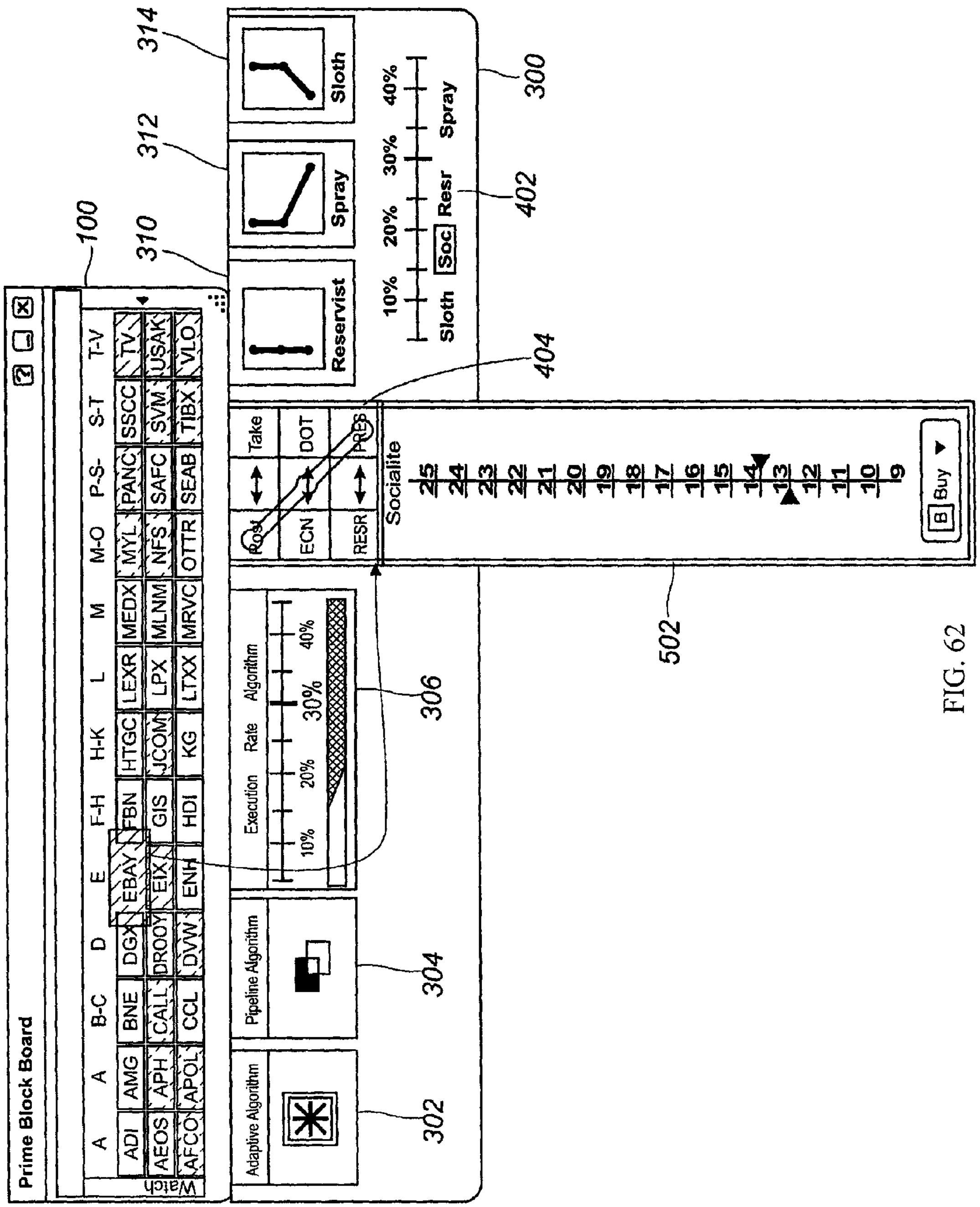

FIG. 62 shows the dashboard with a fishbone (i.e., a dynamic, vertical price scale).

Figure 63:
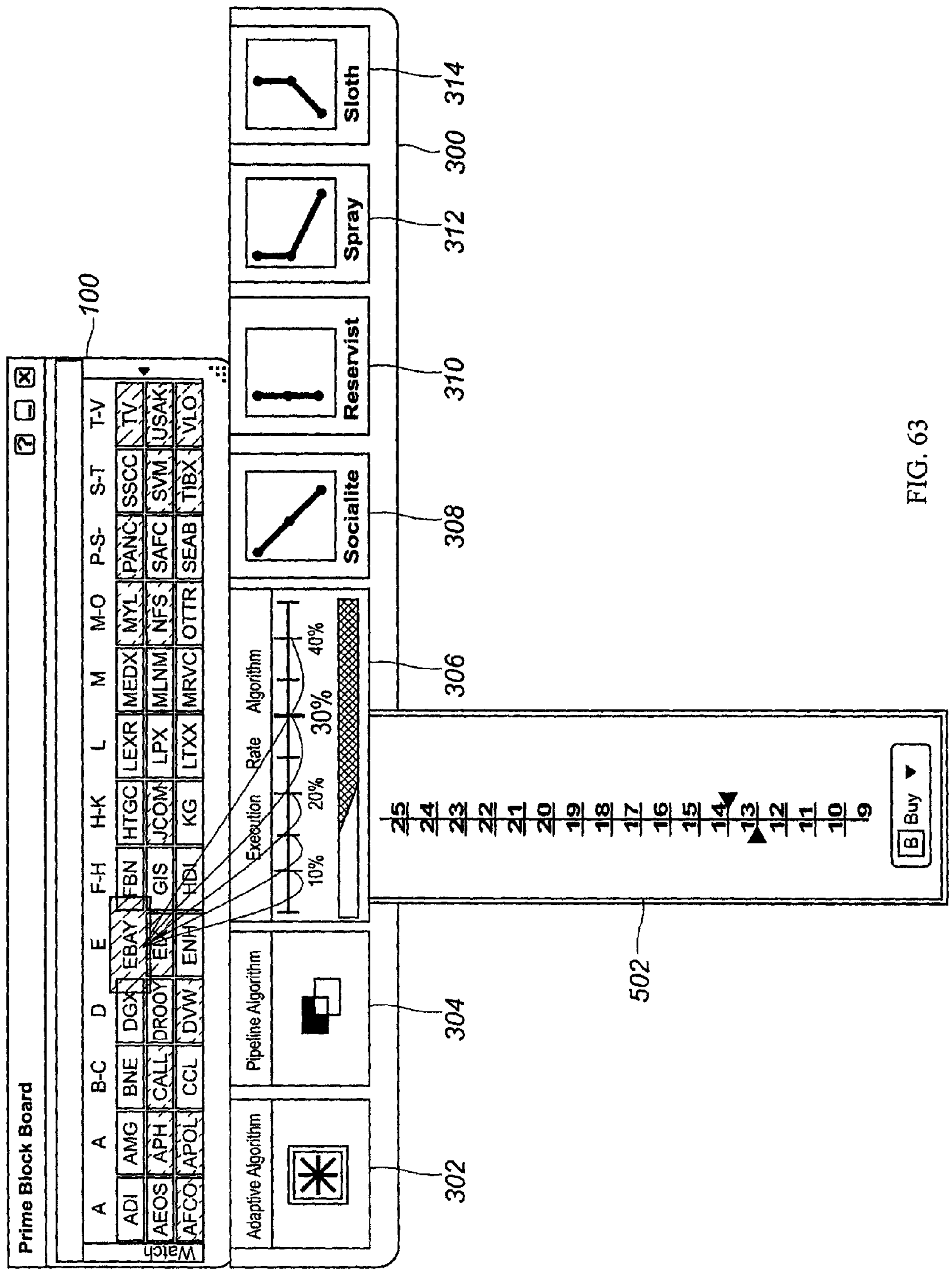

FIG. 63 shows an operation of dropping a symbol on a desired participation rate to launch the fishbone for a participation rate algorithm.

Figure 64:
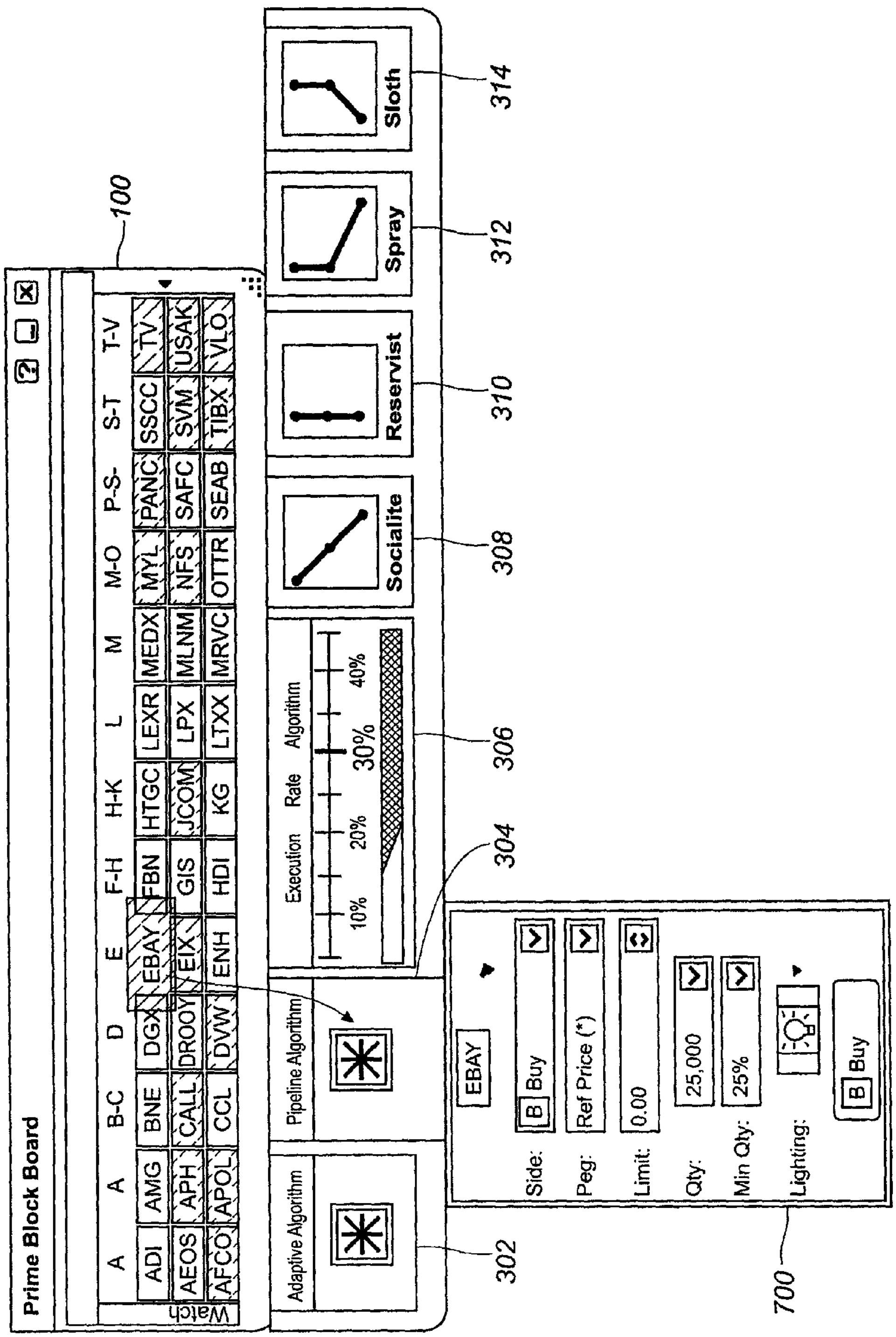

FIG. 64 shows an operation of dropping a symbol on the pipeline algorithm to launch an order-entry box.

Figure 65:
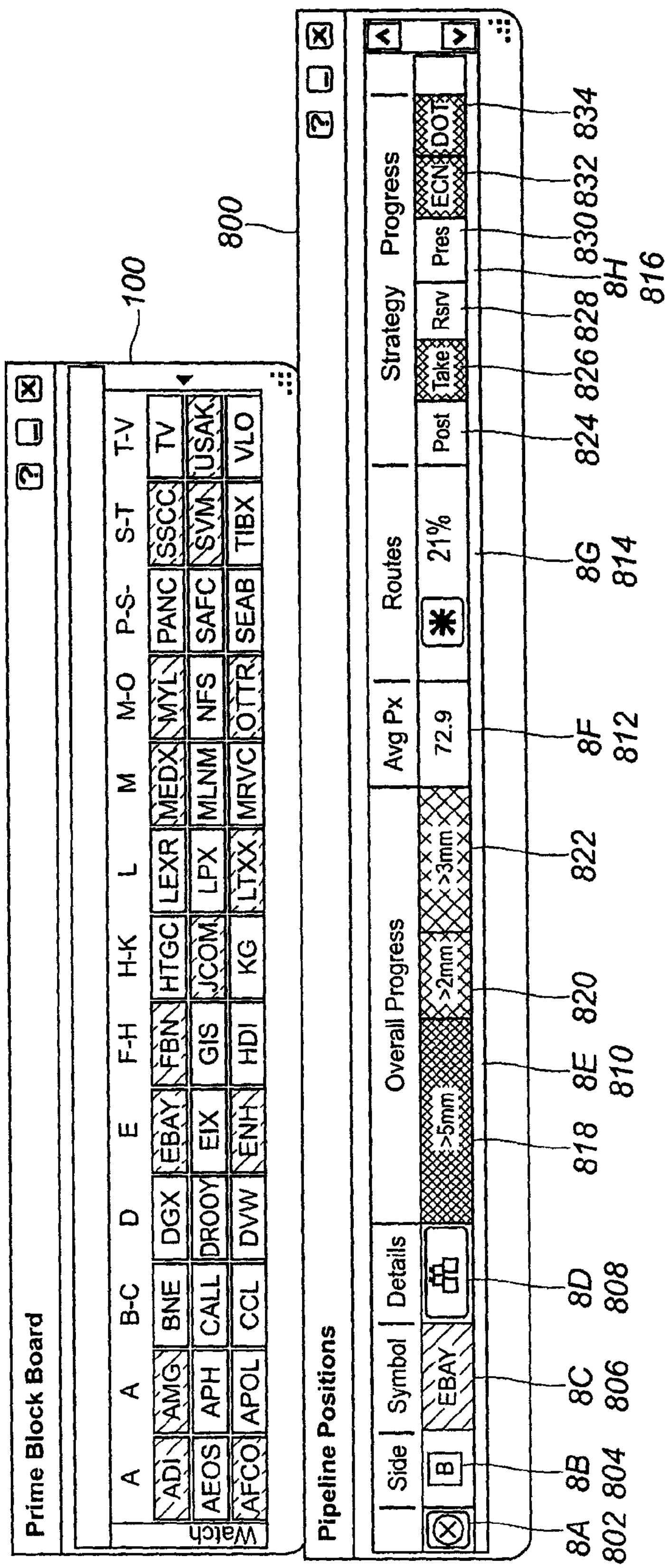

FIG. 65 shows a positions window.

Figure 66:
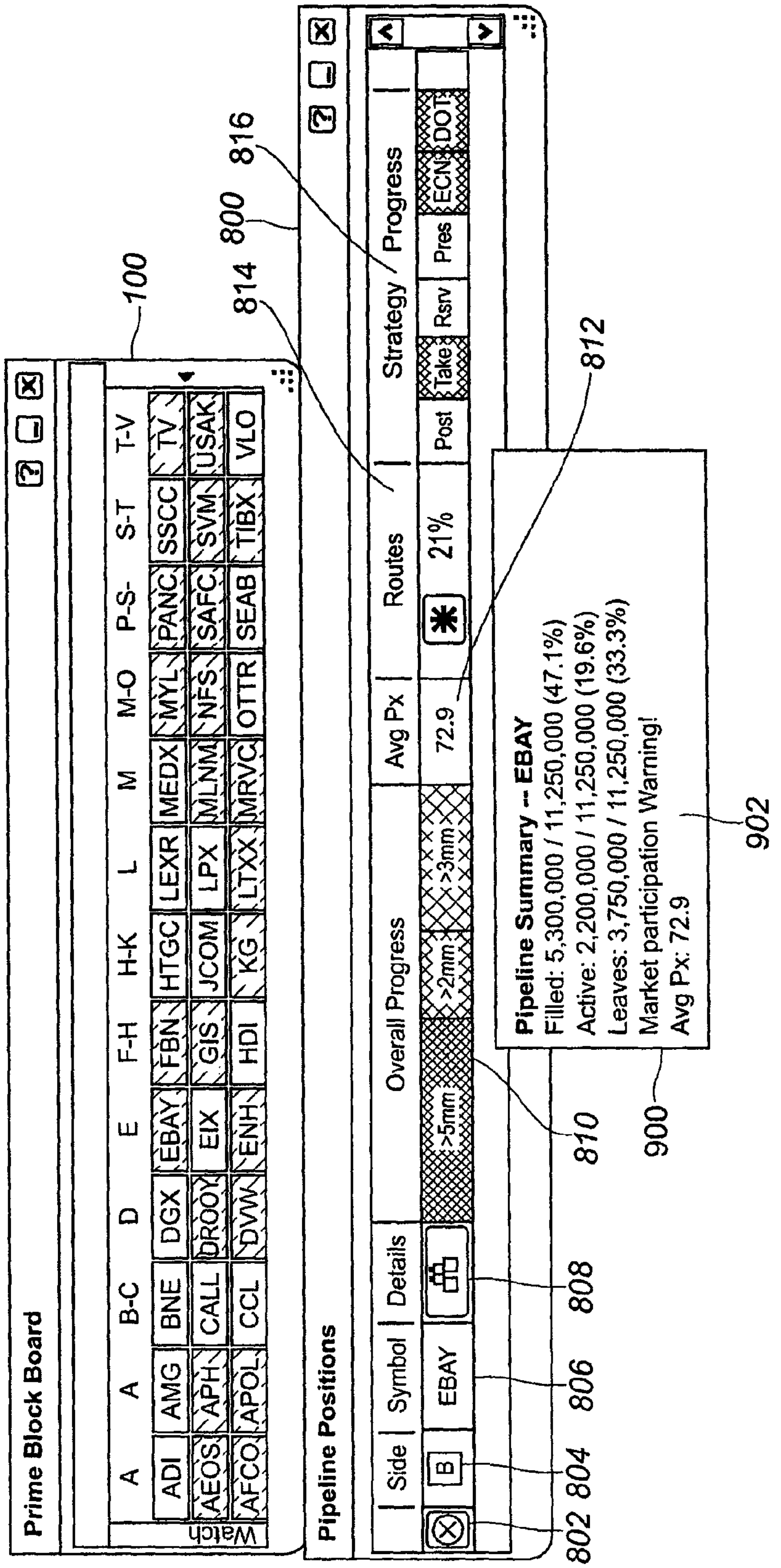

FIG. 66 shows the positions window with an overall-progress information box.

Figure 67:
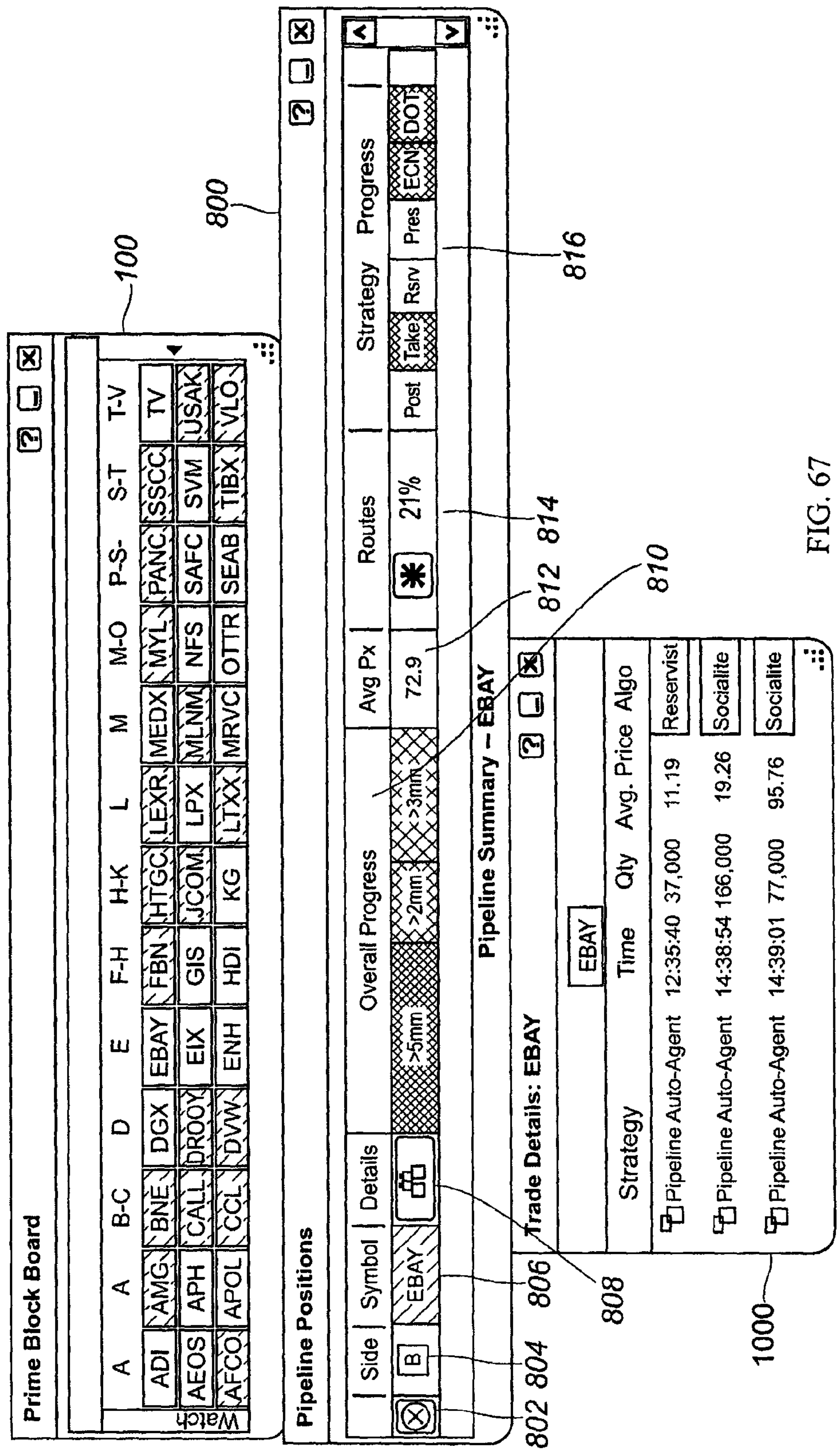

FIG. 67 shows the positions window with a trade-details information box.

FIGS. 68A-68H show examples of tactic update messages in the strategy-progress area.

Figure 69:
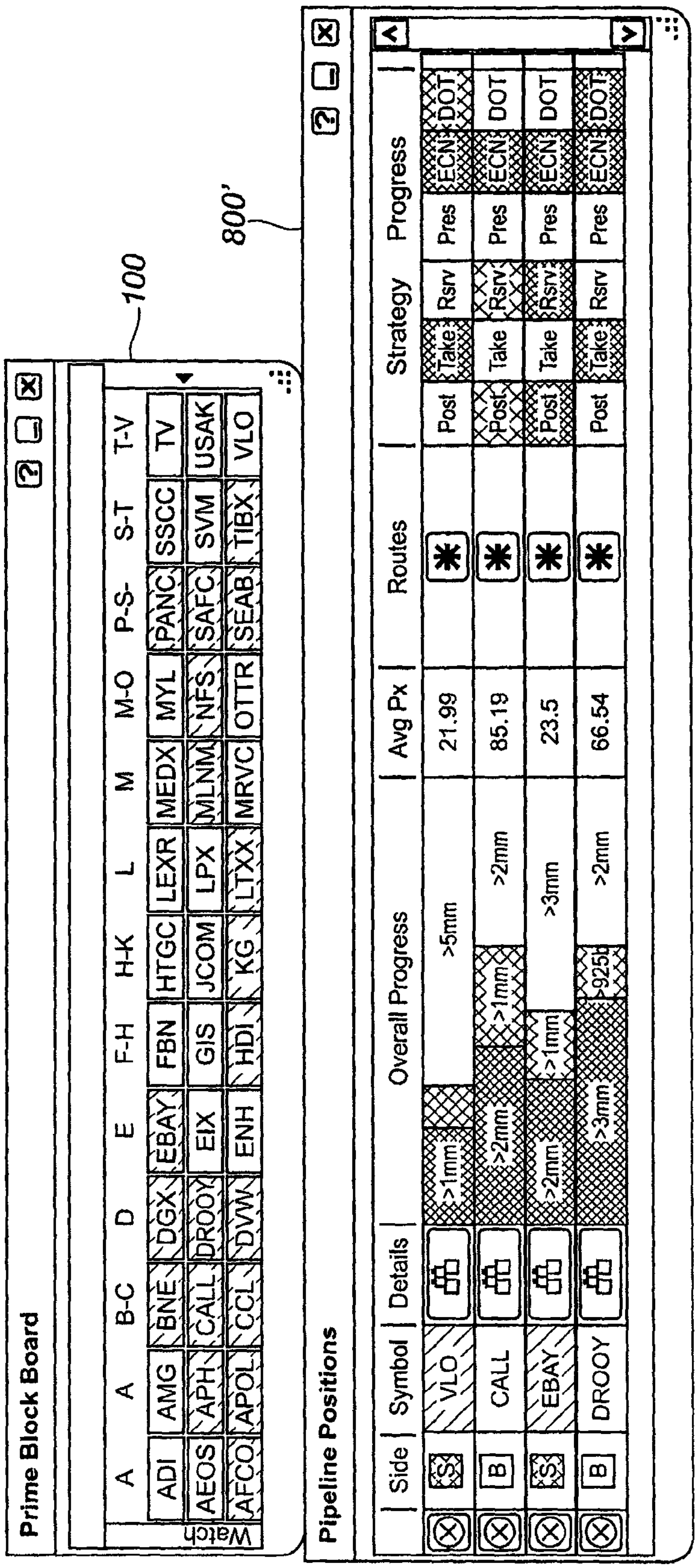

FIG. 69 shows the positions window with active orders in multiple symbols.

Figure 70:
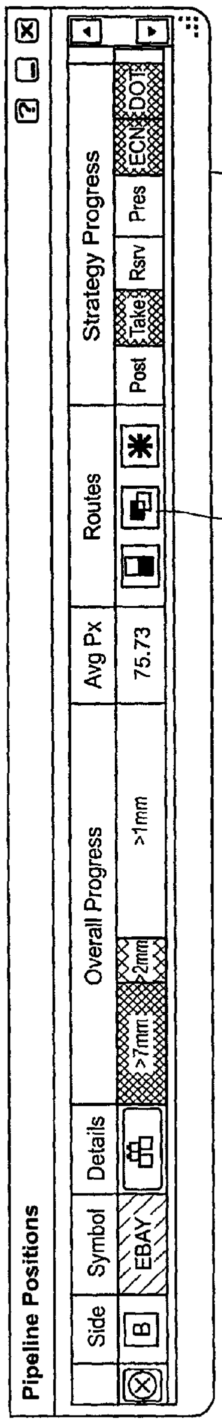

FIG. 70 shows the positions window for a symbol with multiple active algorithms.

Figure 71:
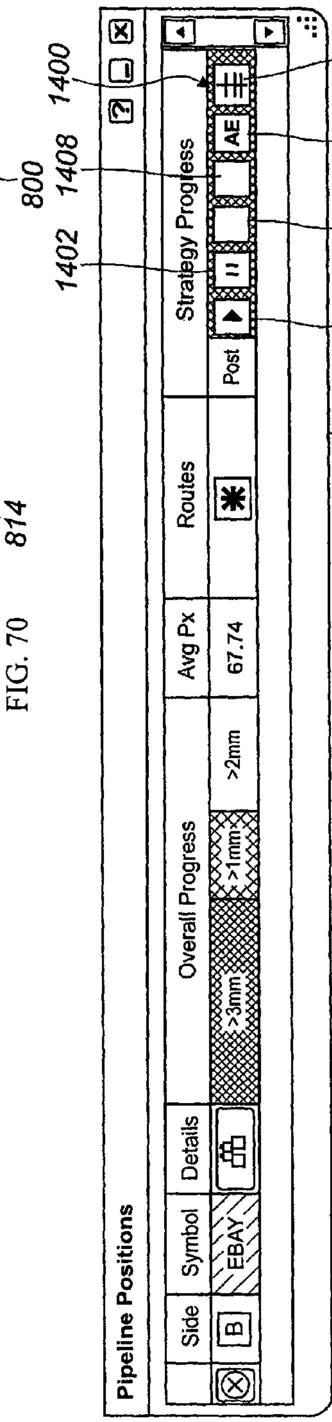

FIG. 71 shows the positions-window toolbar.

Figure 72:
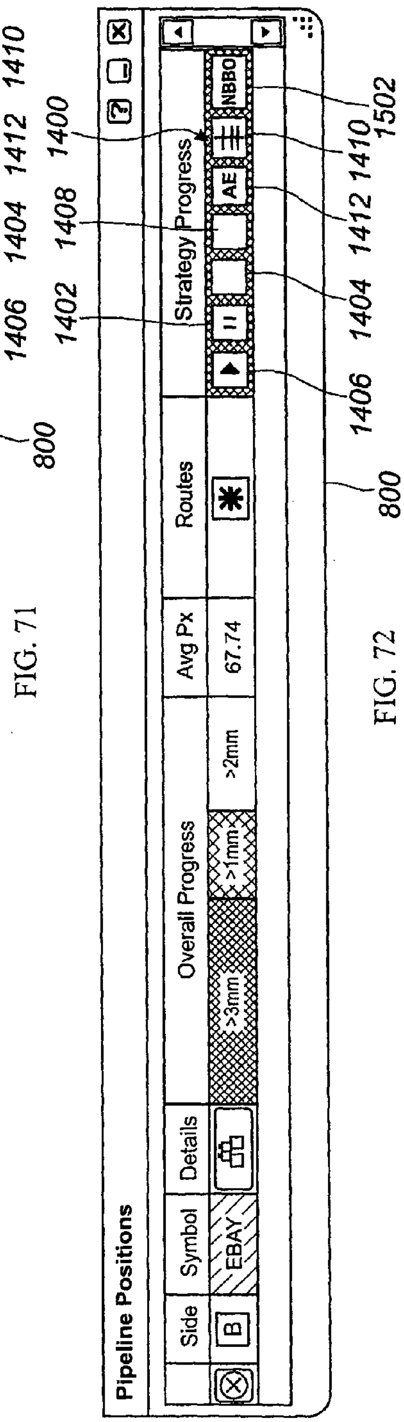

FIG. 72 shows the positions-window toolbar in a pipeline embodiment.

Figure 73:
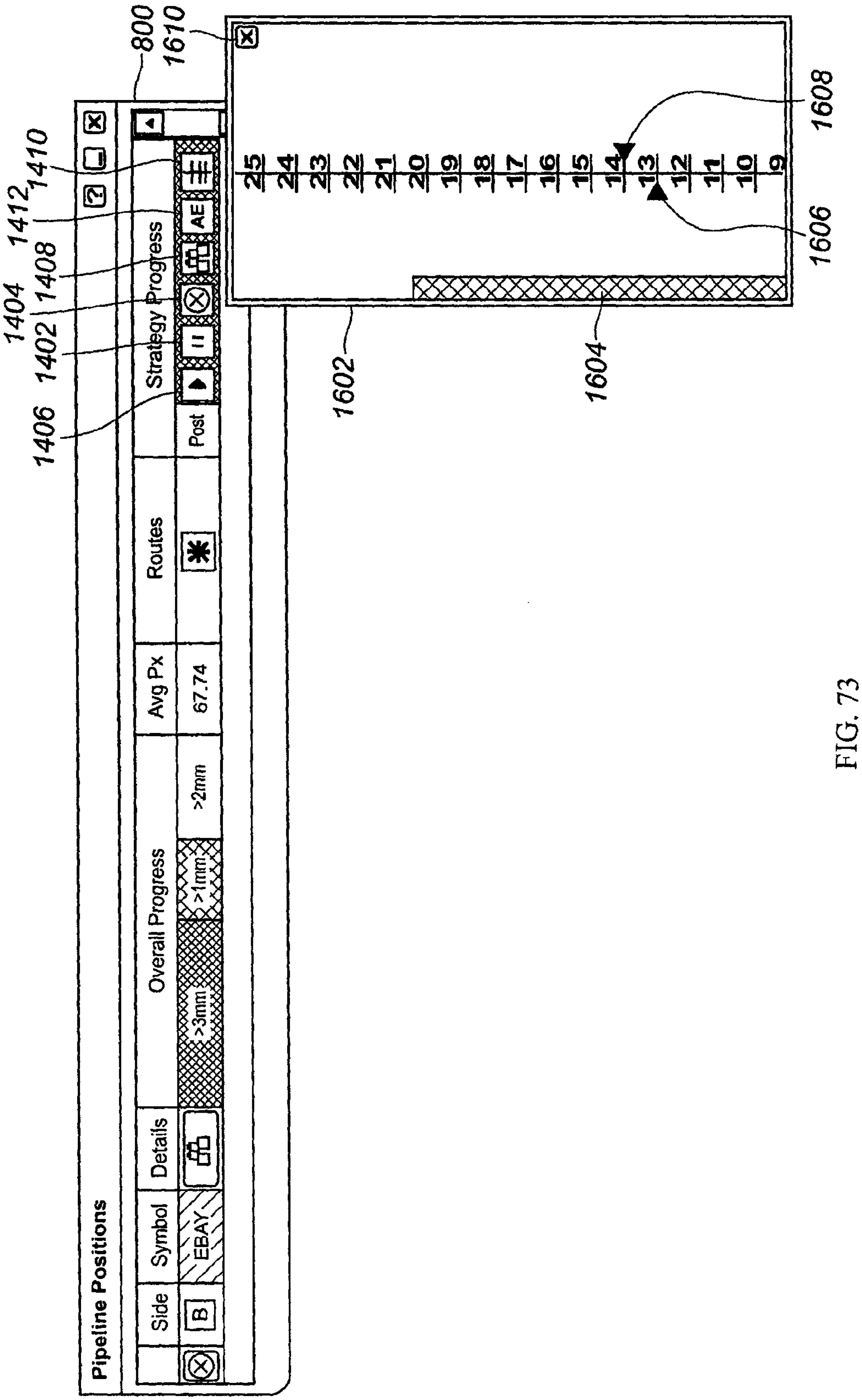

FIG. 73 shows a fishbone for an active algorithm launched from the positions window, in which the fishbone shows a limit price for the active algorithm and the current bid/offer.

Figure 74A:
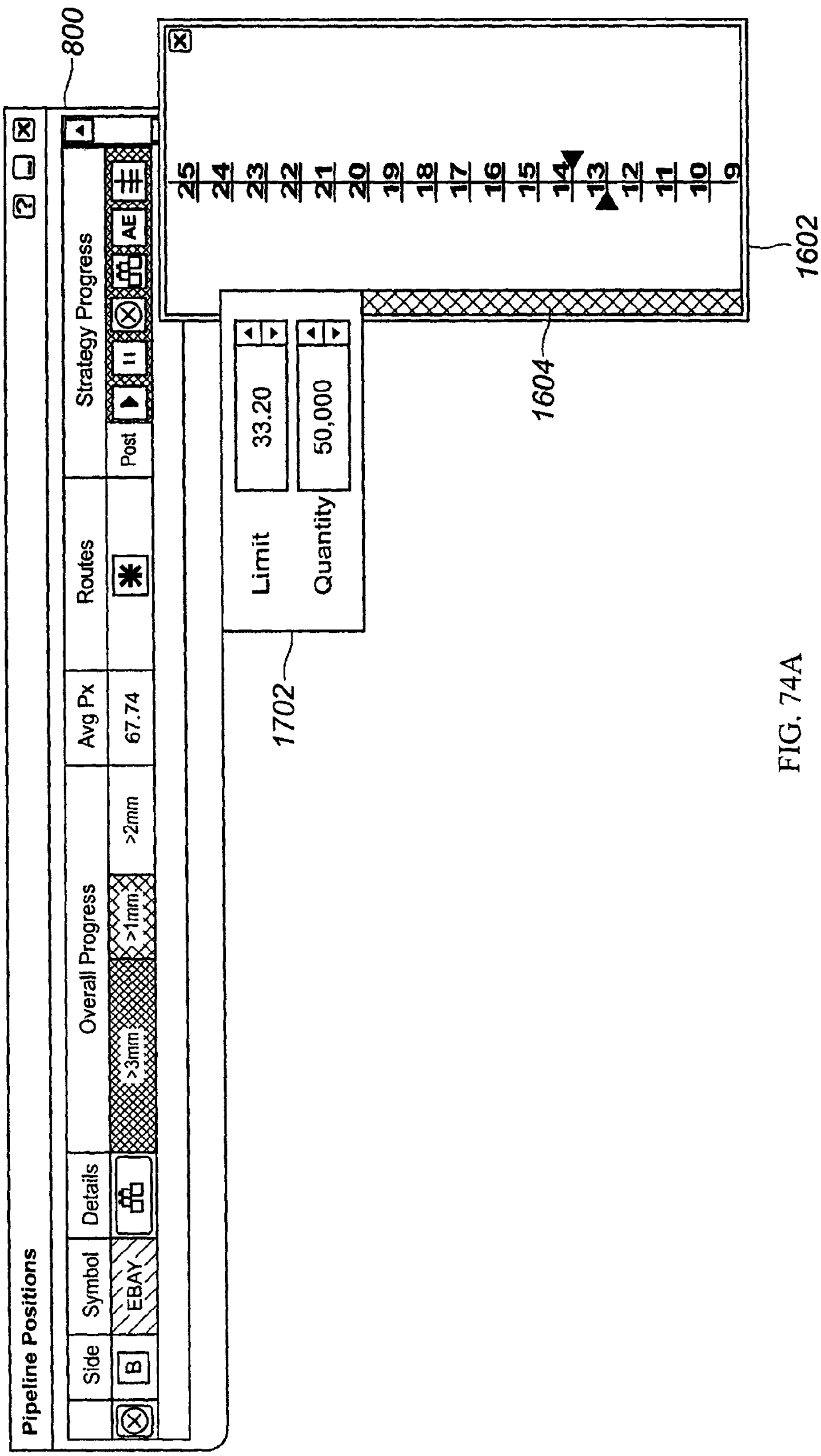
Figure 74B:
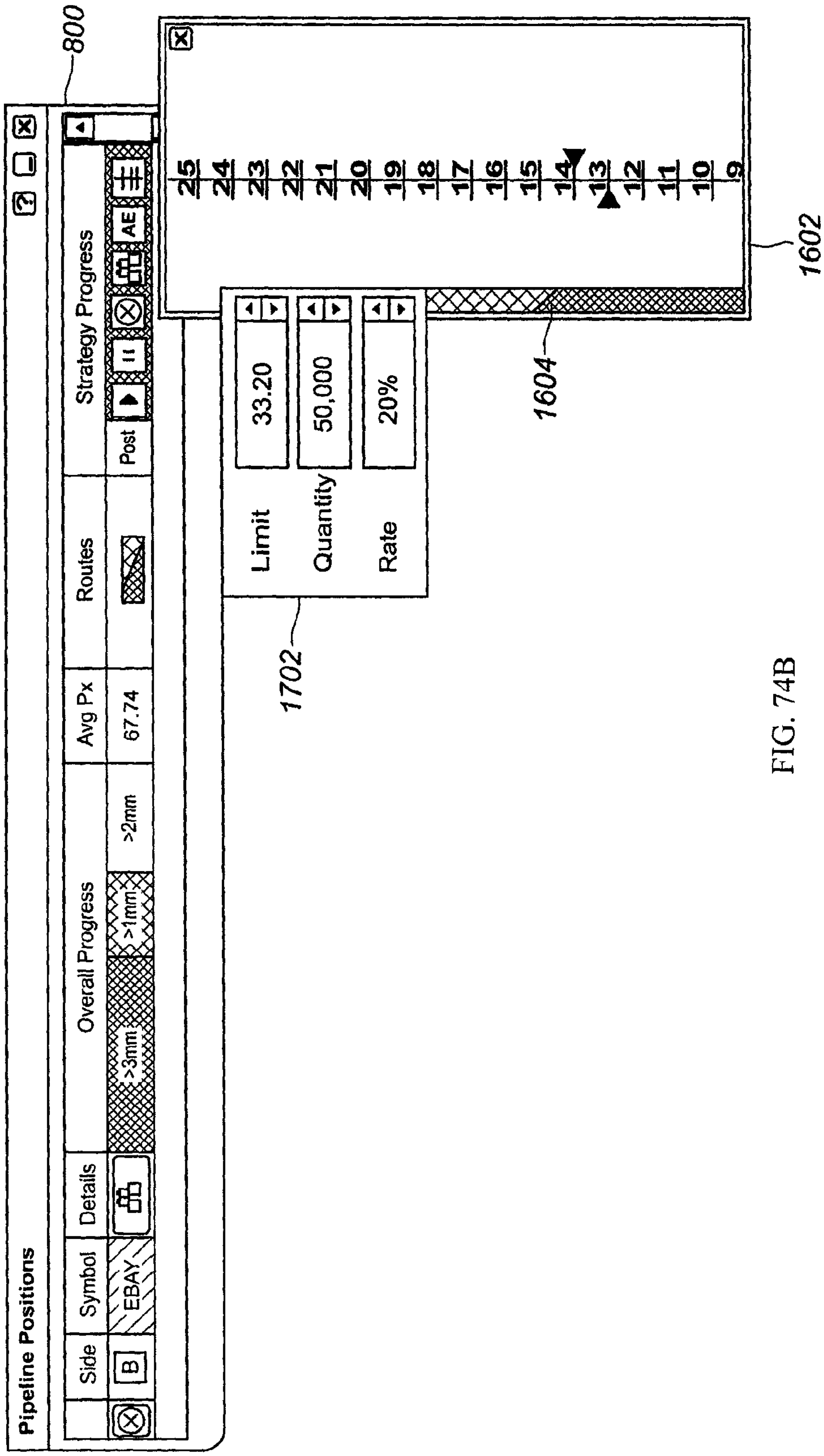

FIGS. 74A and 74B show an order box launched from the active fishbone used to alter the algorithm's operating parameters.

Figure 75:
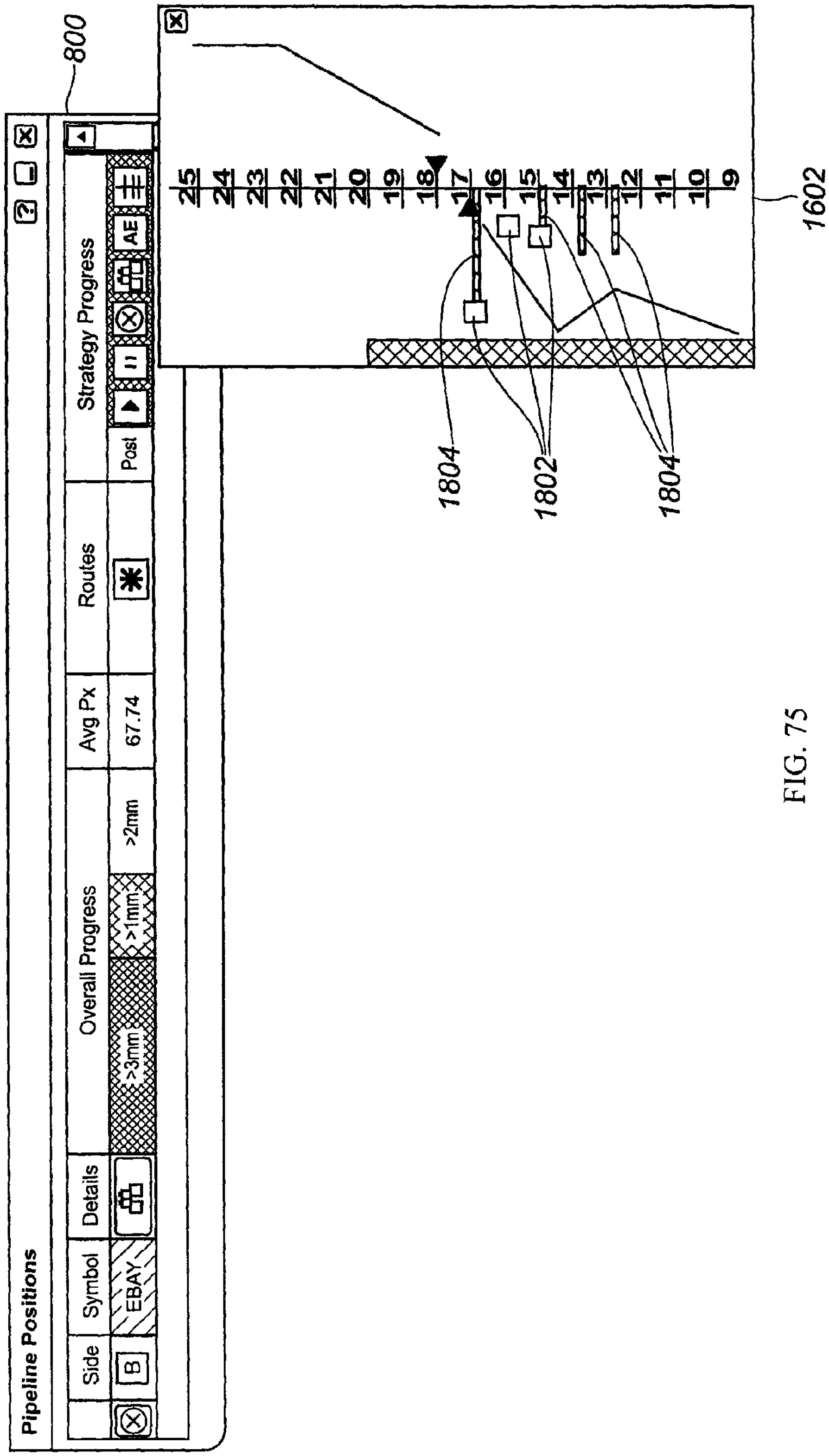

FIG. 75 shows the fishbone for the active algorithm launched from the positions window toolbar, in which the fishbone shows pending and filled orders.

Figure 76:
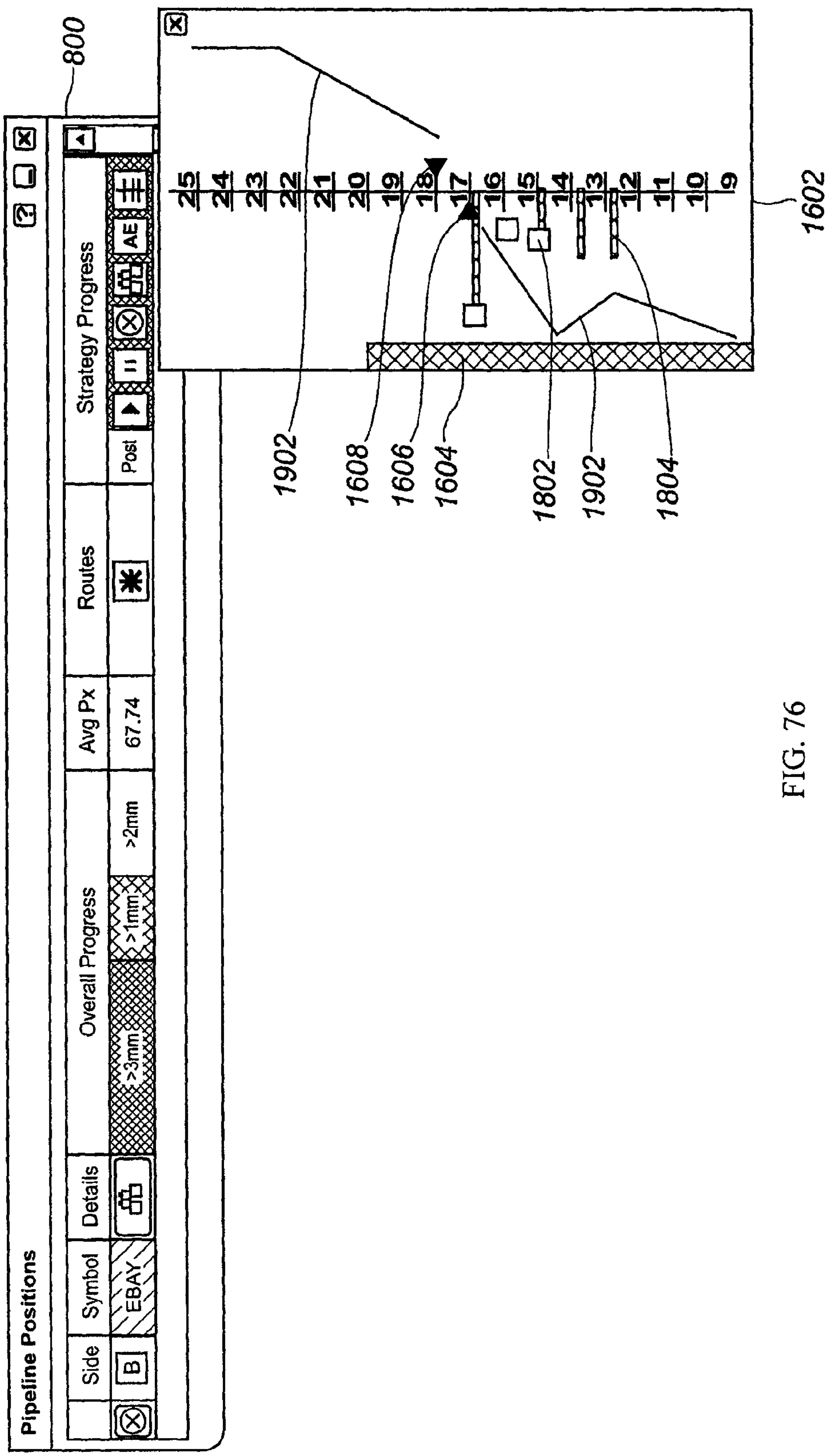

FIG. 76 shows the fishbone for an active algorithm launched from the positions window tool bar, in which the fishbone shows liquidity lines representing the effective depth of the book.

Figure 77:
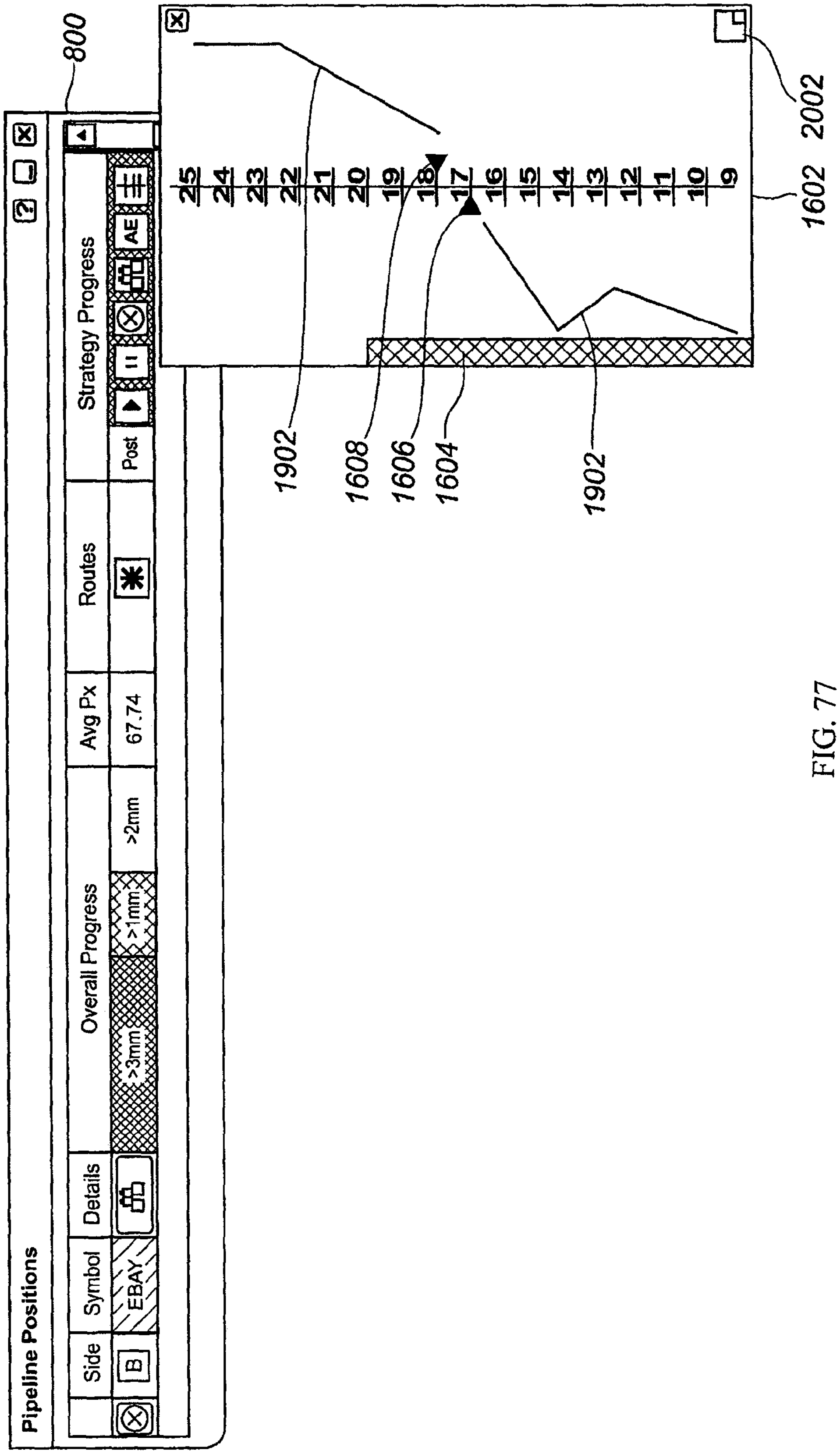

FIG. 77 shows the fishbone in a strategy-progress area with a "Display Benchmark Monitor Dial" button.

Figure 78:
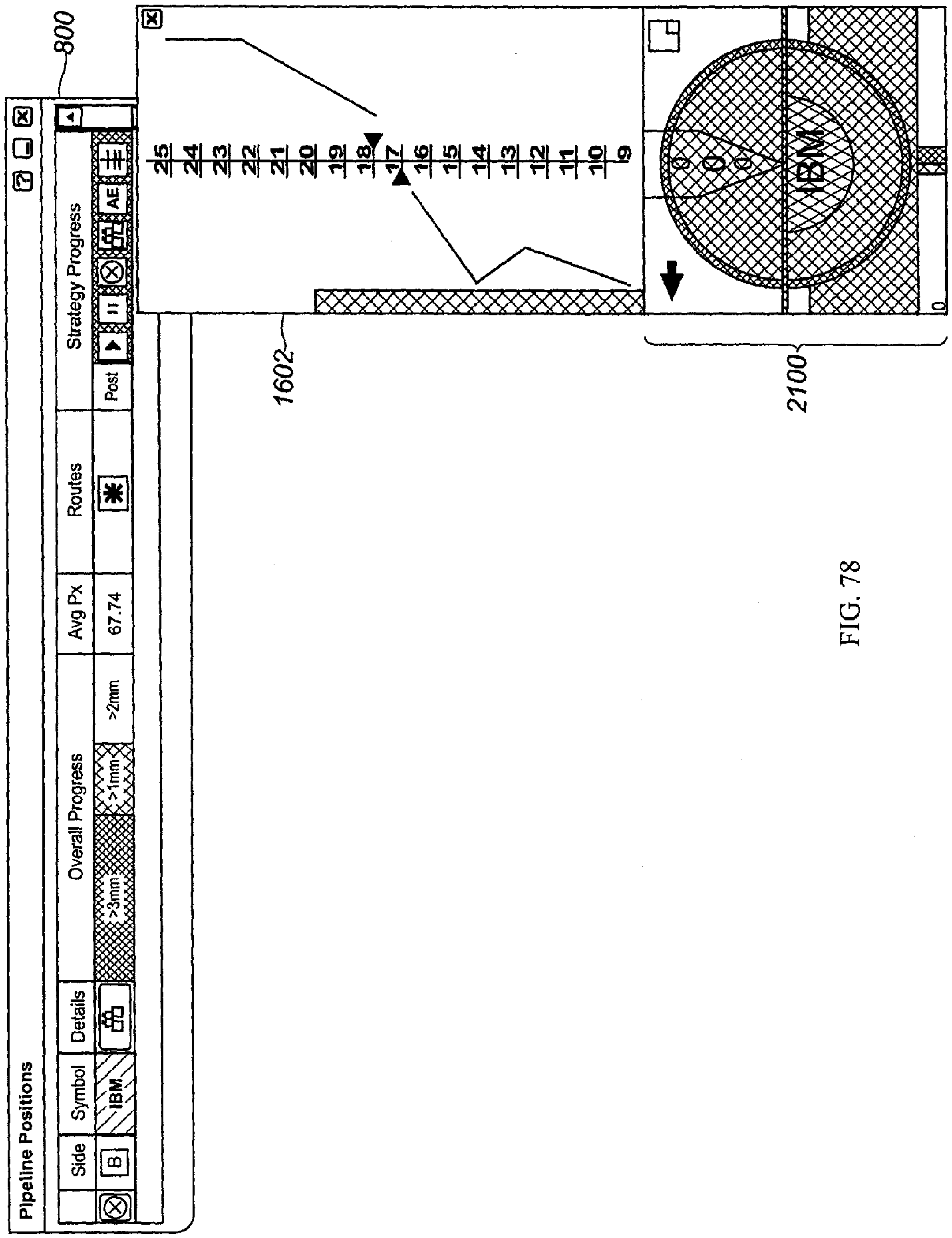

FIG. 78 shows a benchmark dial area below the fishbone in the strategy-process area in a situation in which the benchmark dial is inactive.

Figure 79:
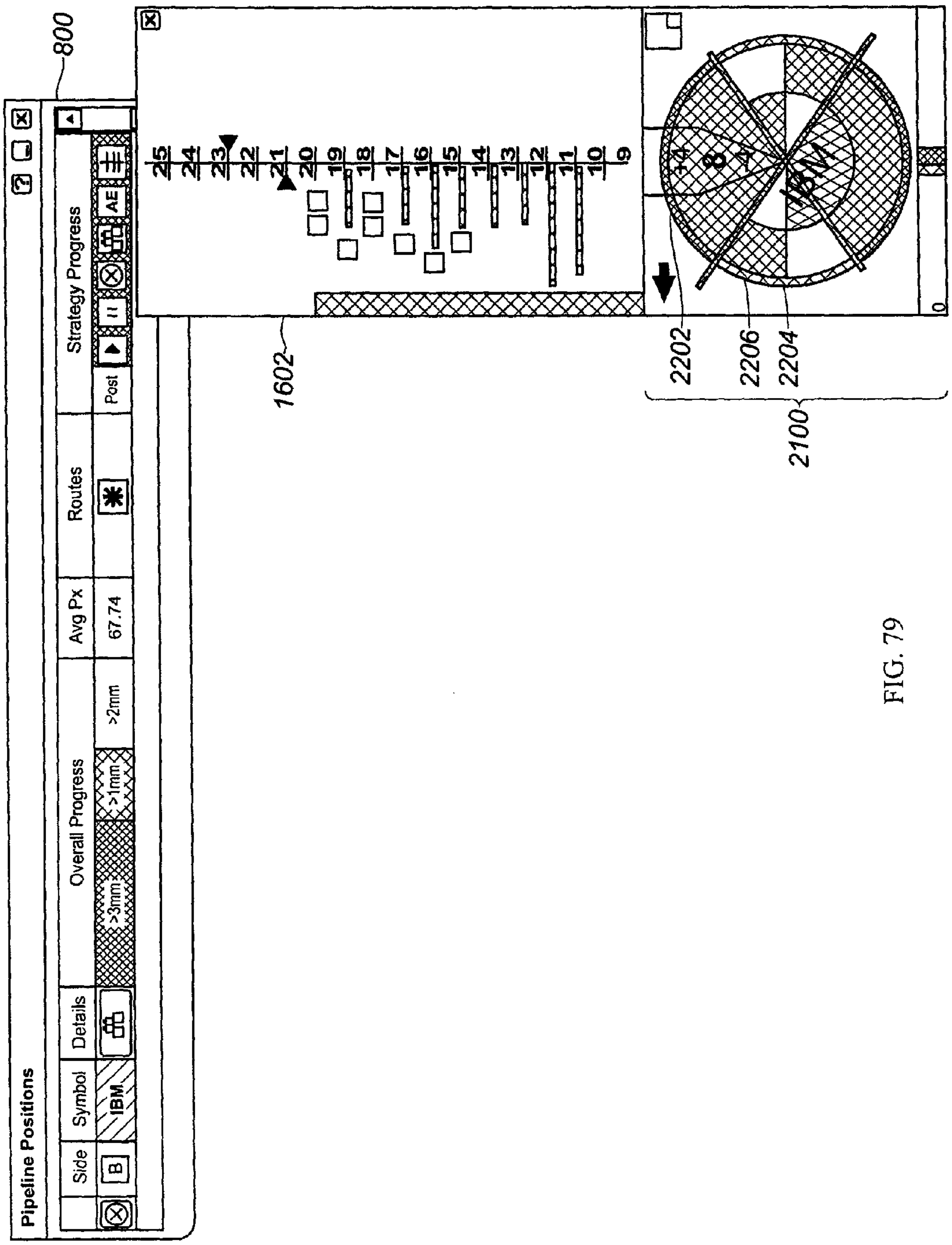

FIG. 79 shows the active benchmark dial below the fishbone in a strategy process area with numeric indicators labeled.

Figure 80:
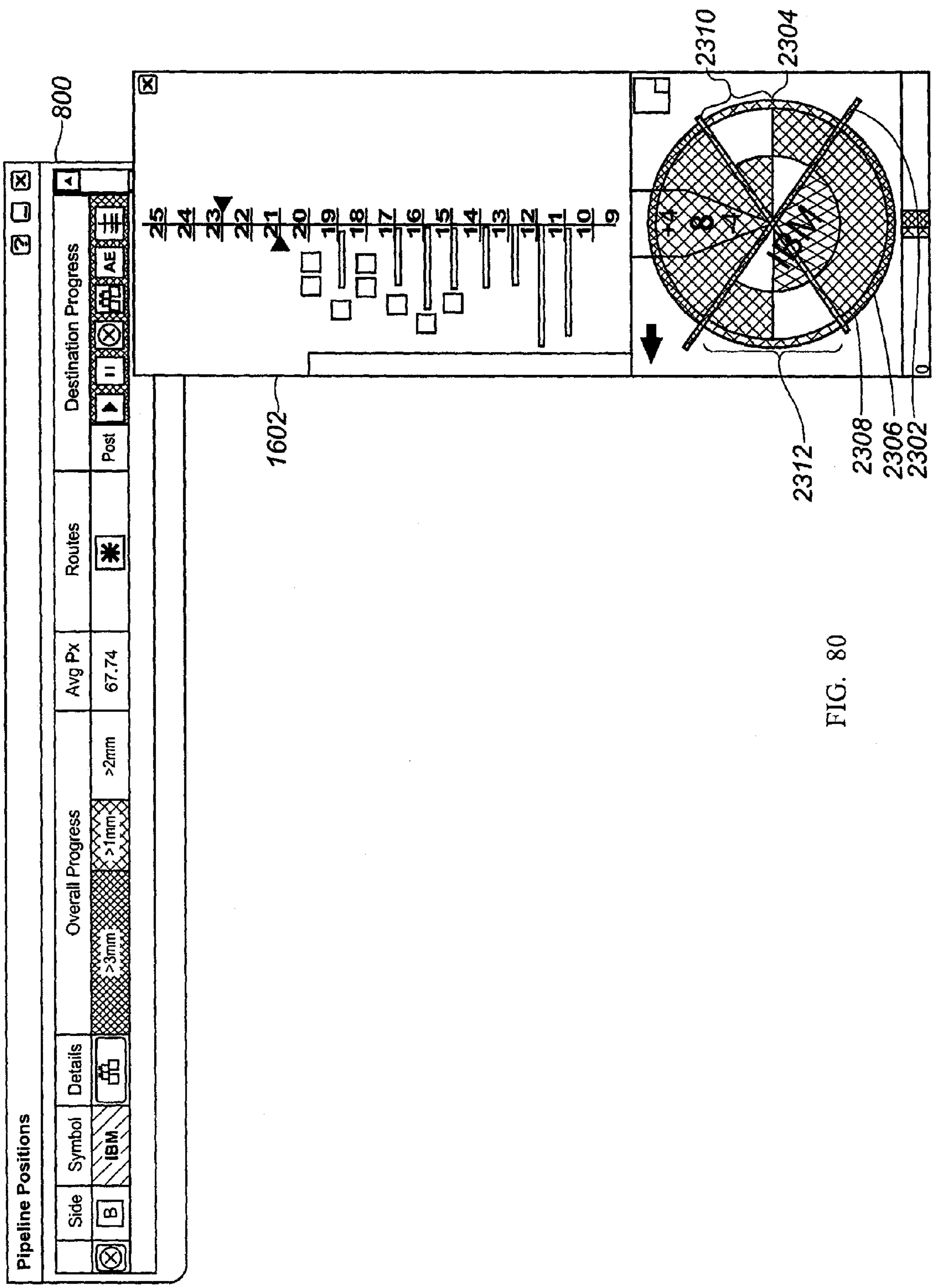

FIG. 80 shows an active benchmark dial below the fishbone in a strategy process area with graphic indicators labeled.

FIGS. 81A-81F show a series of active benchmark dials.

Figure 82B:
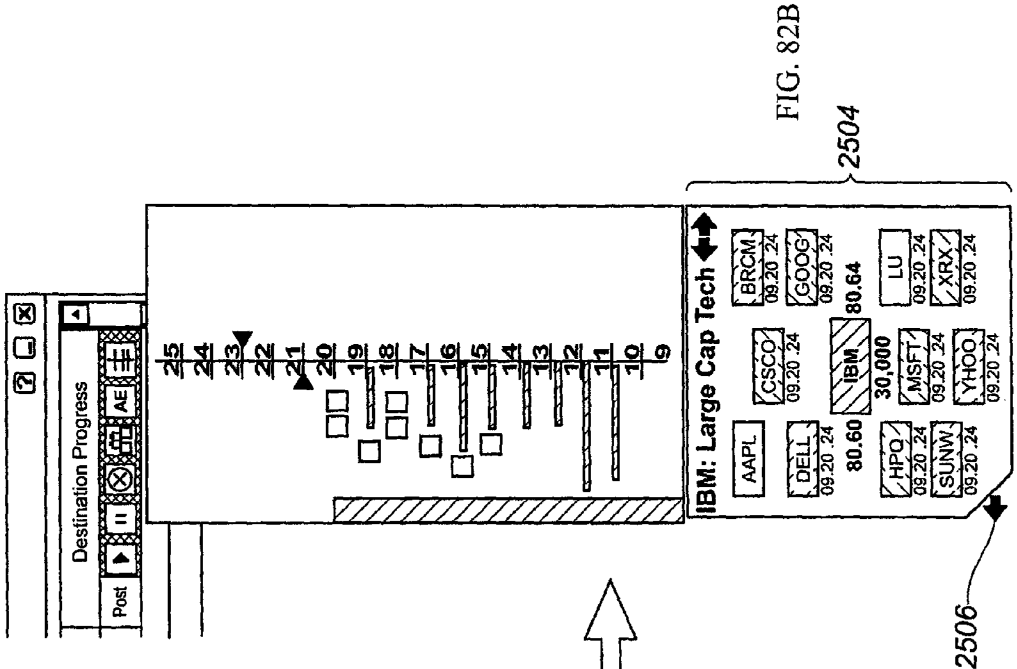
Figure 82A:
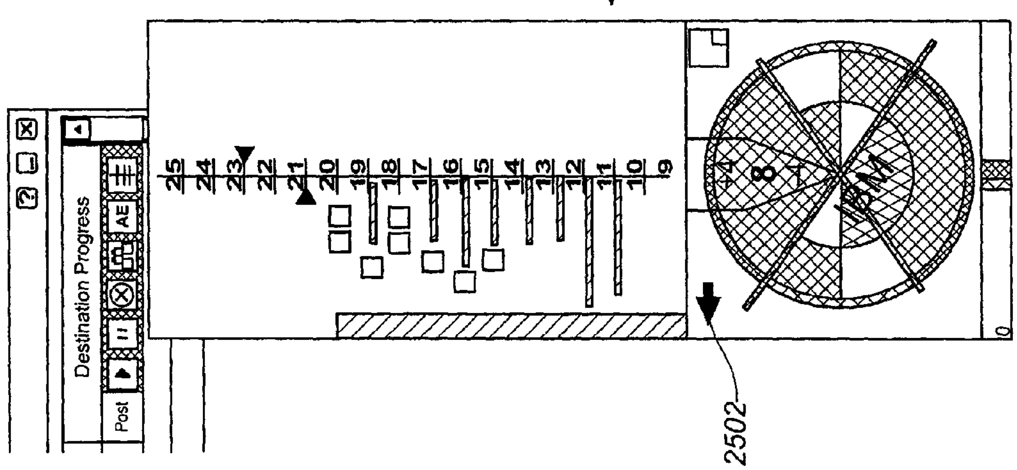

FIGS. 82A and 82B show the use of the "rotate" arrow to flip from the benchmark dial to the market context.

Figure 83:
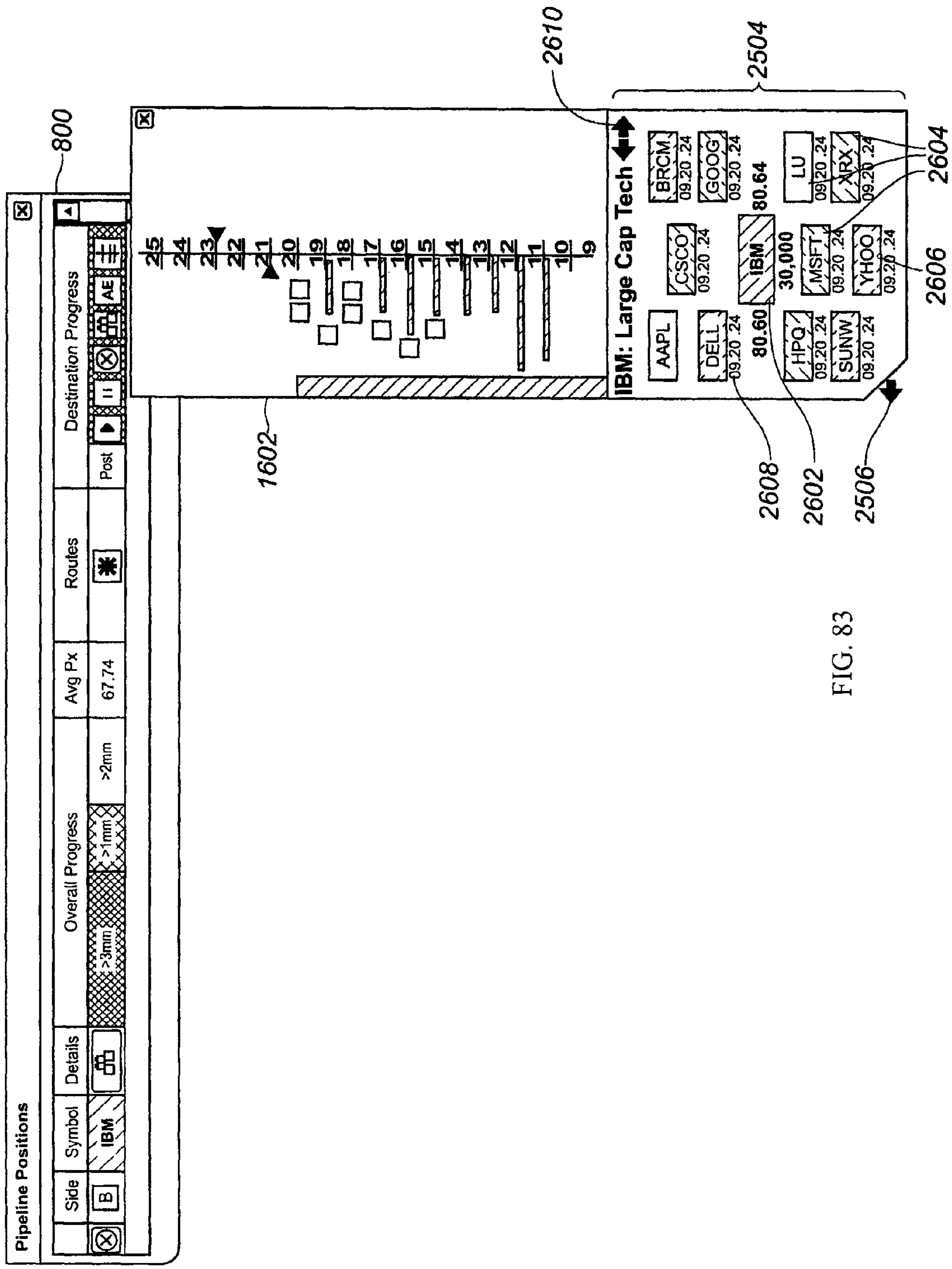

FIG. 83 shows an example of a market context.

Figure 84:
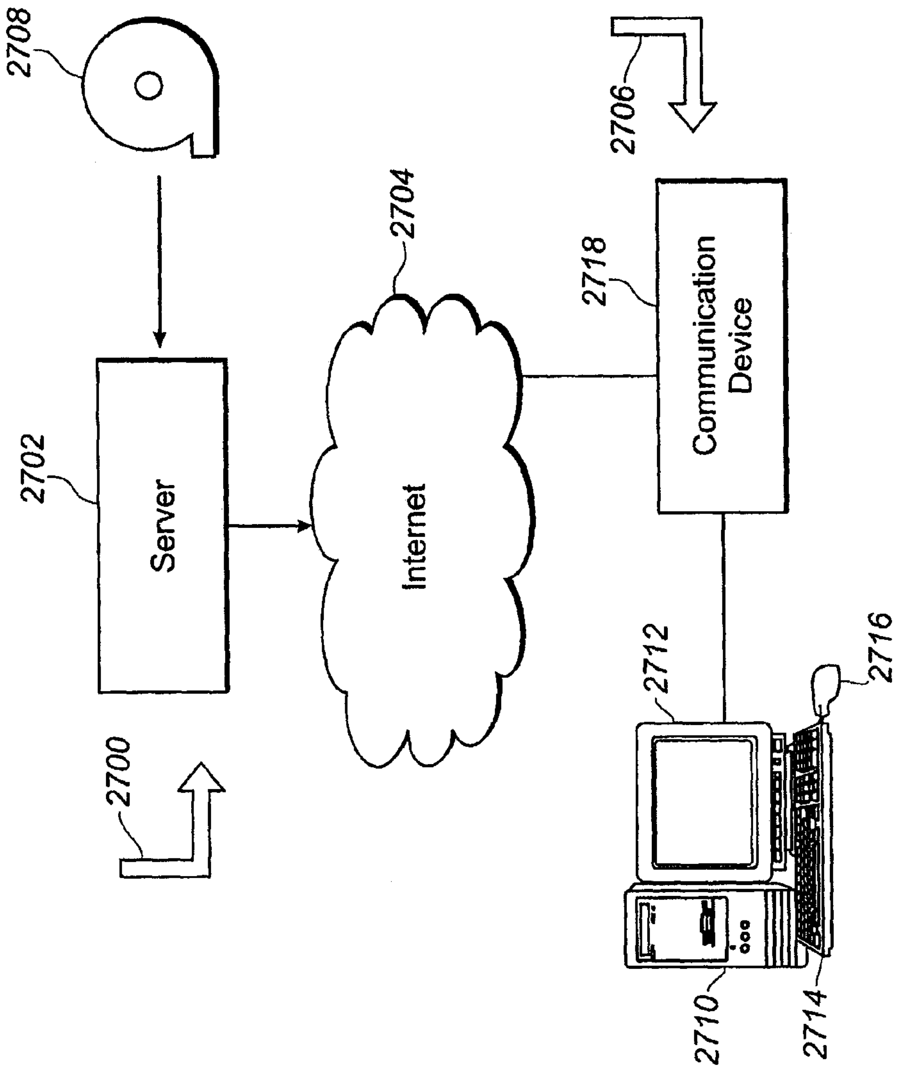

FIG. 84 is a block diagram showing a system on which the preferred embodiments can be implemented.

Figure 85A:
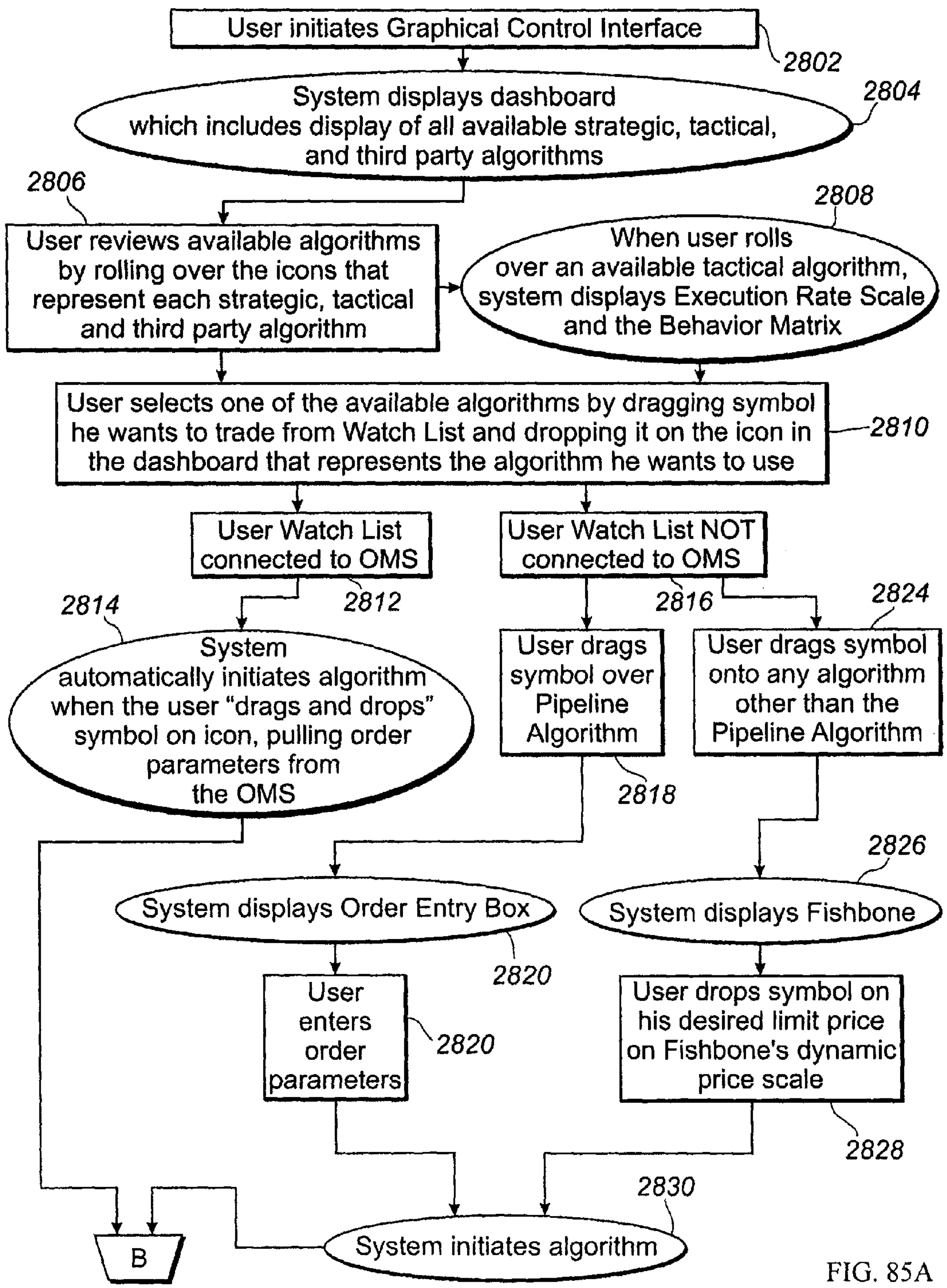
Figure 85B:
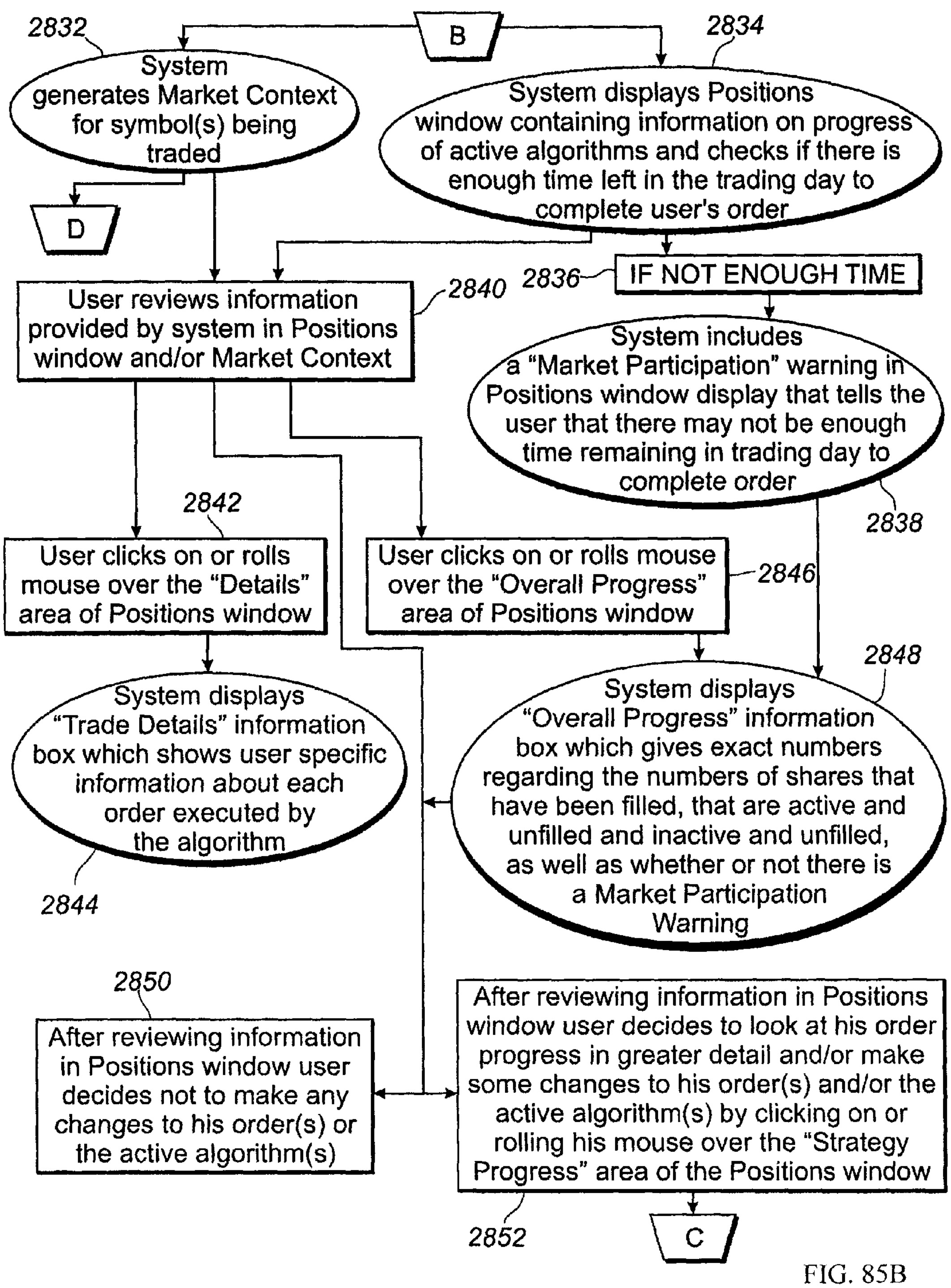
Figure 85C:
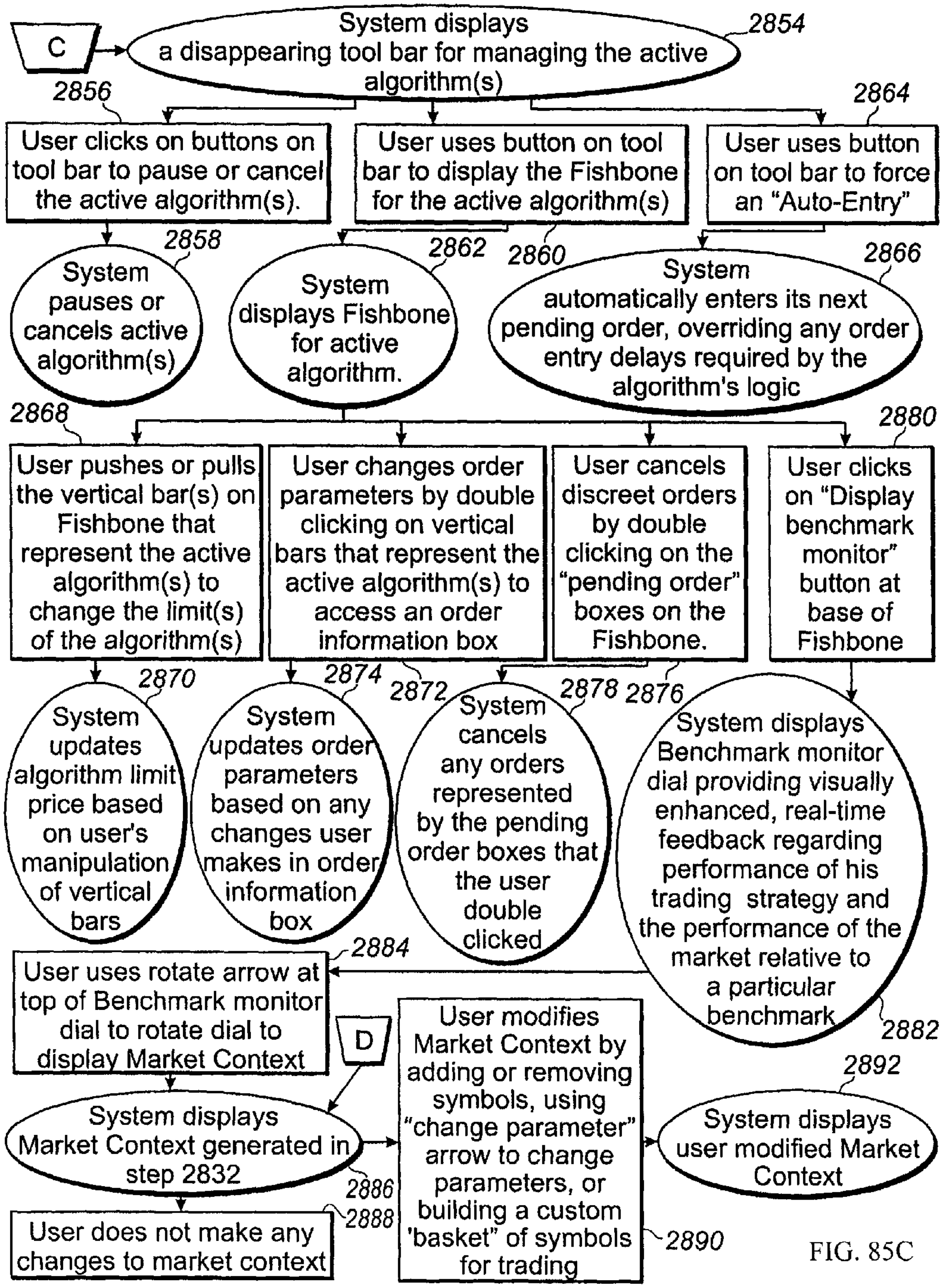

FIGS. 85A-85C are flow charts showing an overview of an exemplary embodiment.

FIGS. 86-90 are screen shots showing a variation of an exemplary embodiment in which the trader can control the speed of an algorithm.

Figure 91:
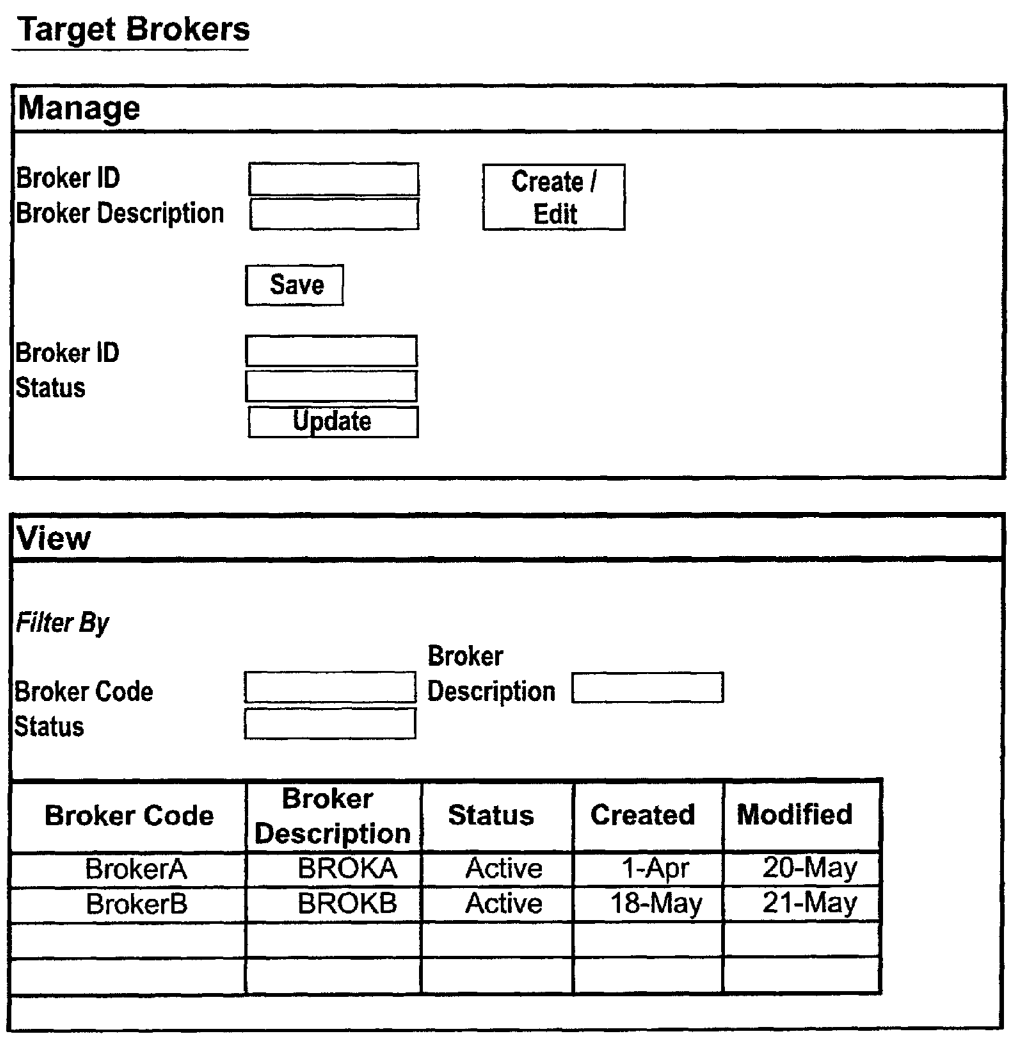

FIG. 91 depicts an exemplary Target Brokers display.

Figure 92:
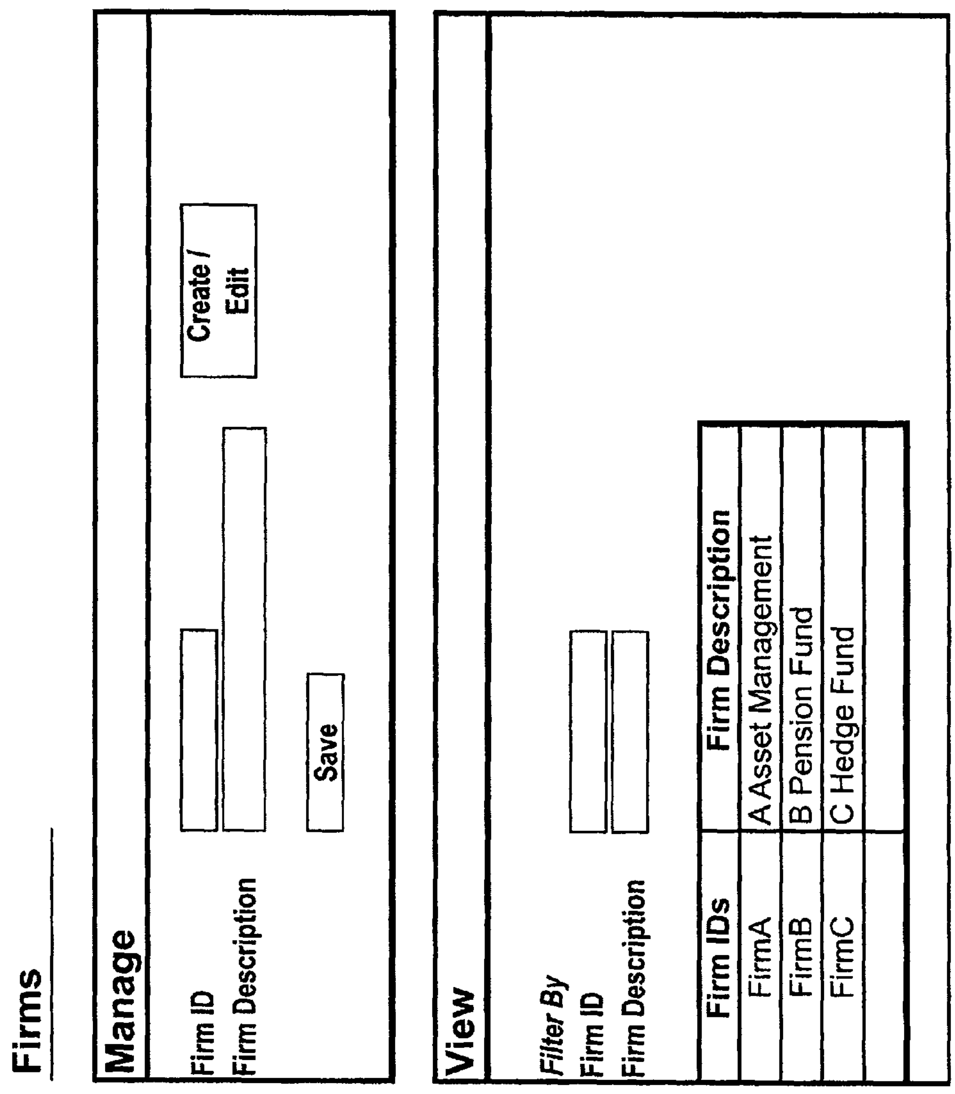

FIG. 92 depicts an exemplary Firms display.

Figure 93A:
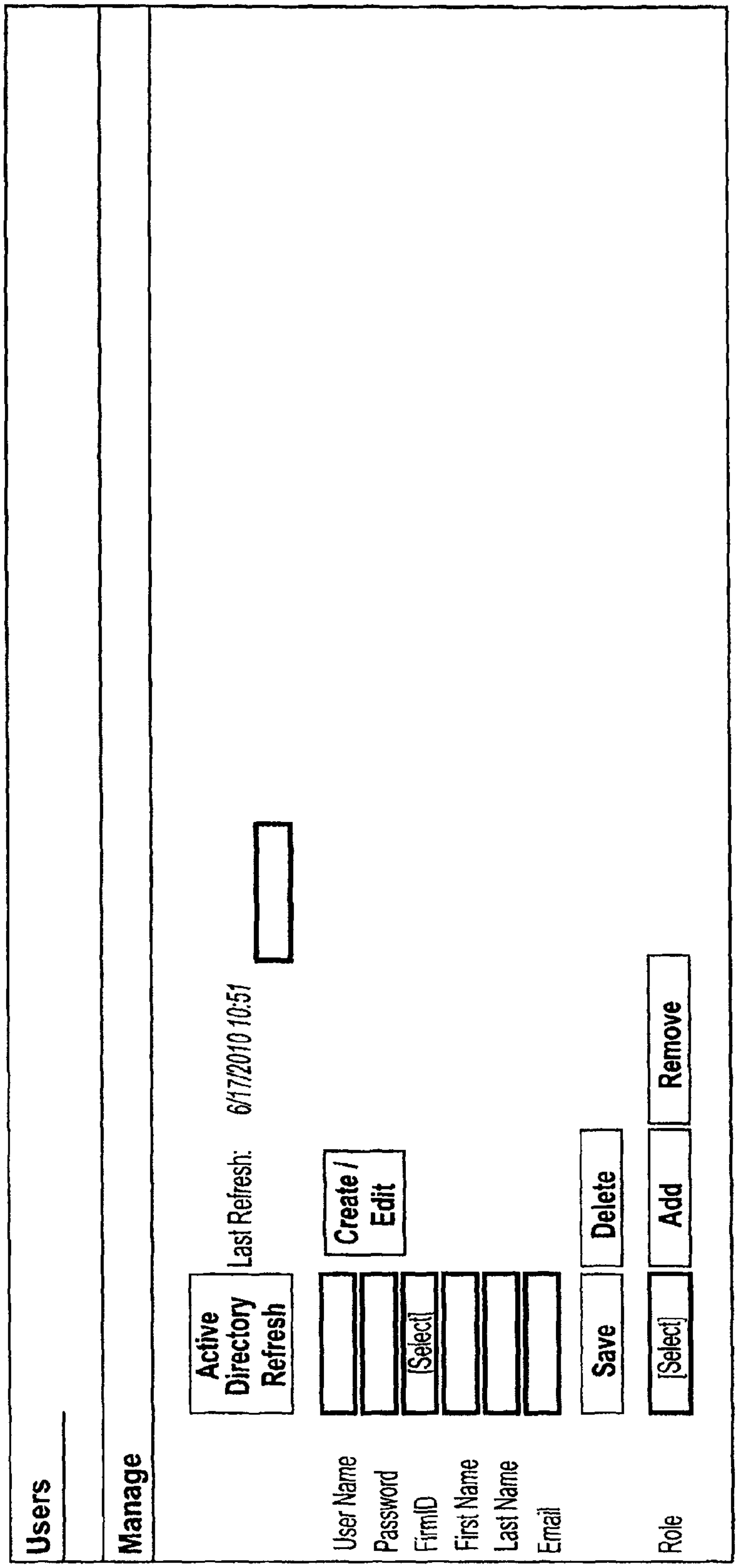

FIG. 93 depicts an exemplary Users display.

FIG. 94 depicts an exemplary Broker-Firm Assignment display.

FIG. 95 depicts an exemplary Target Allocations display.

FIG. 96 depicts an exemplary Trade Volume display.

Figure 97:
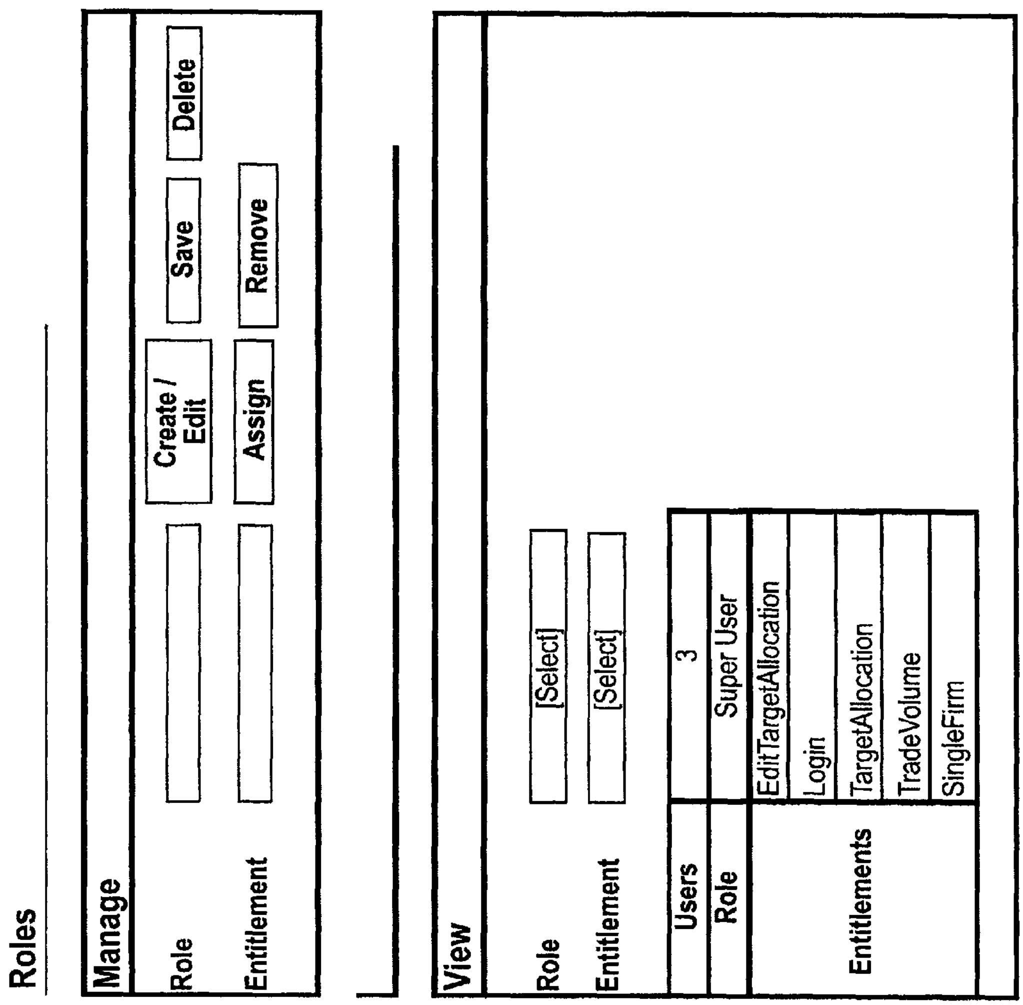

FIG. 97 depicts an exemplary Roles display.

Figure 98:
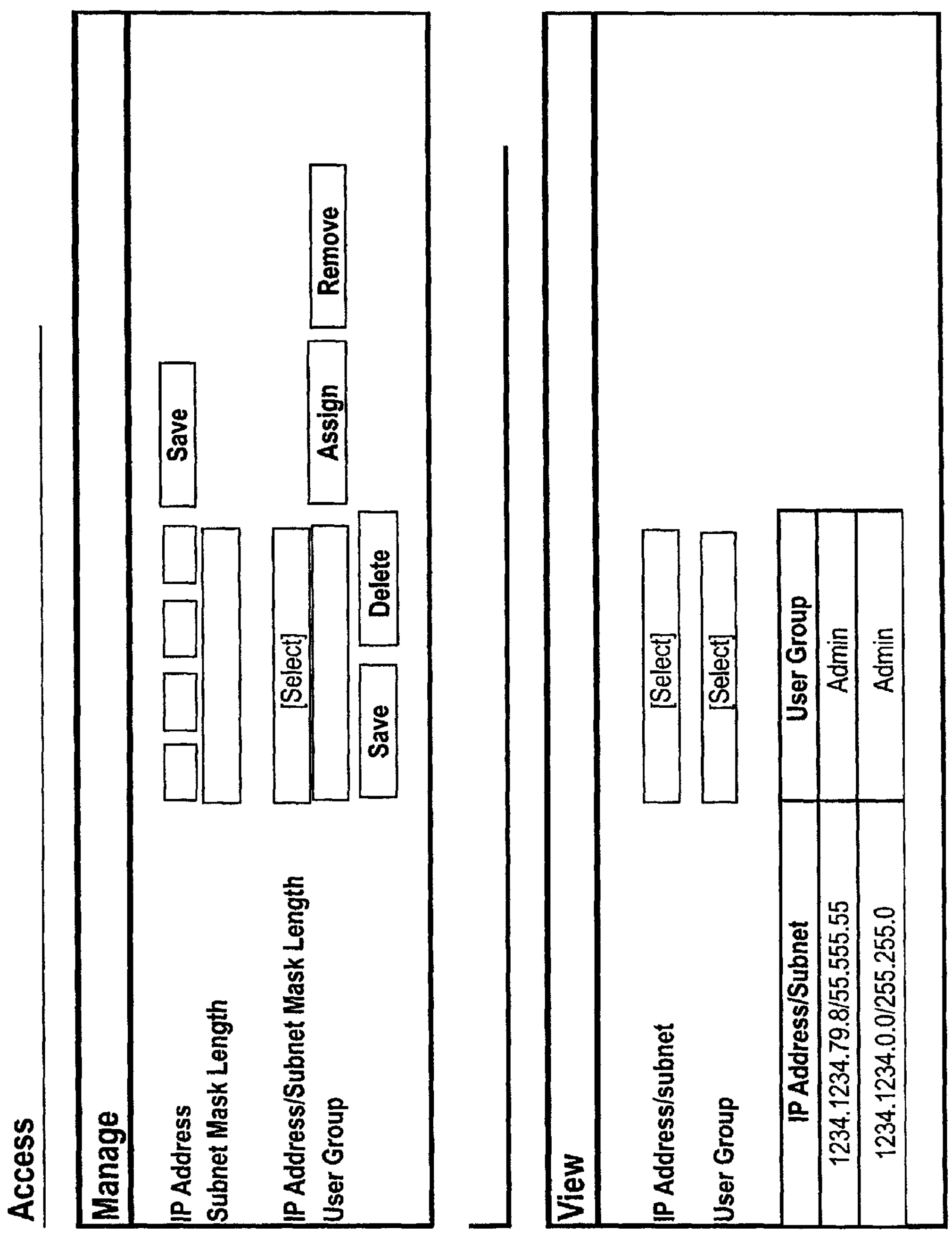

FIG. 98 depicts an exemplary Access display.

Figure 99:
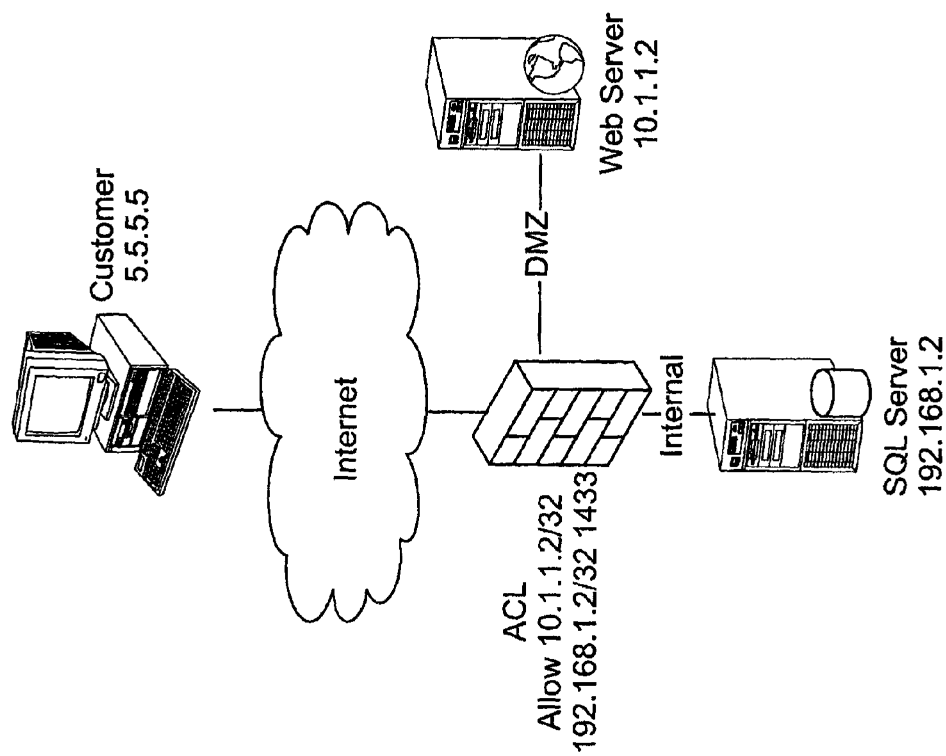

FIG. 99 depicts exemplary network architecture for one or more exemplary embodiments.

Figure 100:
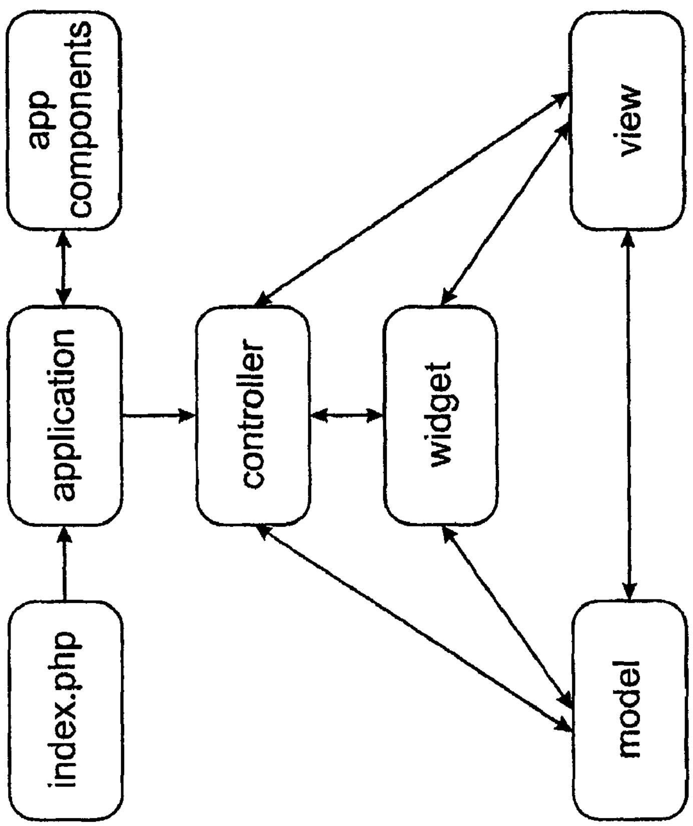

FIG. 100 depicts structure of an exemplary Yii application.

Figure 101:
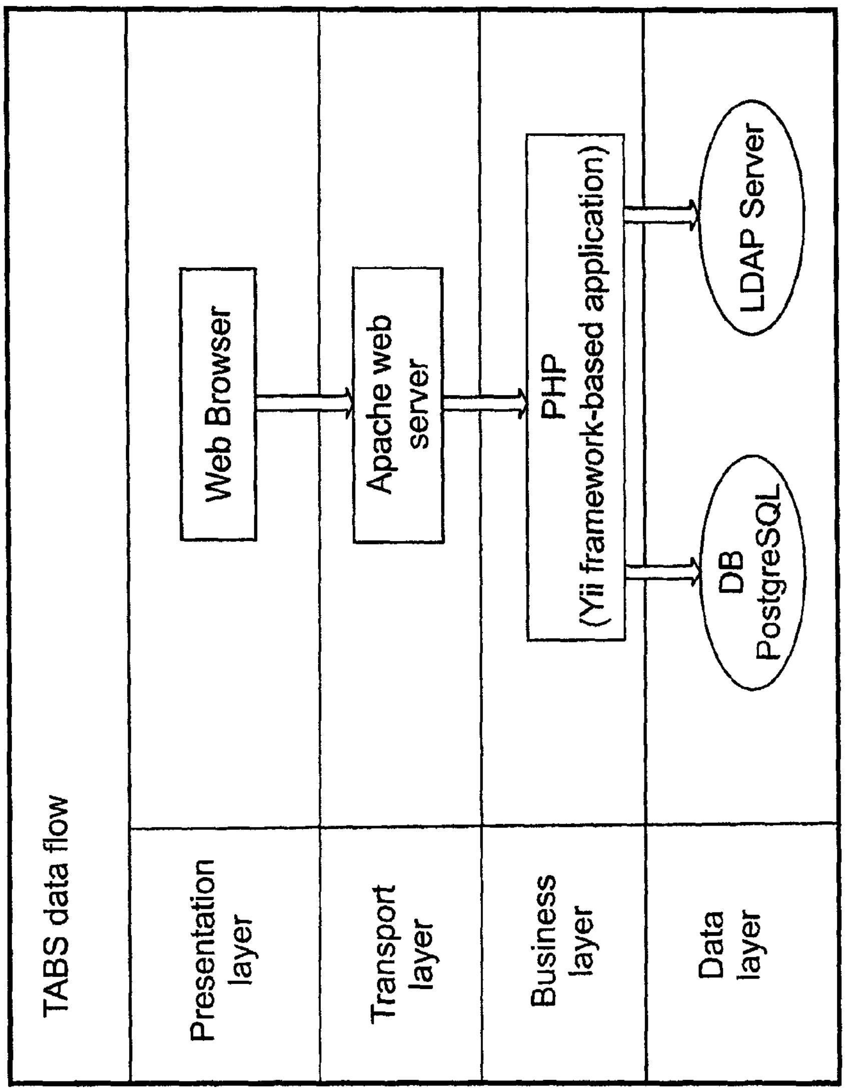

FIG. 101 depicts exemplary TABS data flow.

Figure 102:
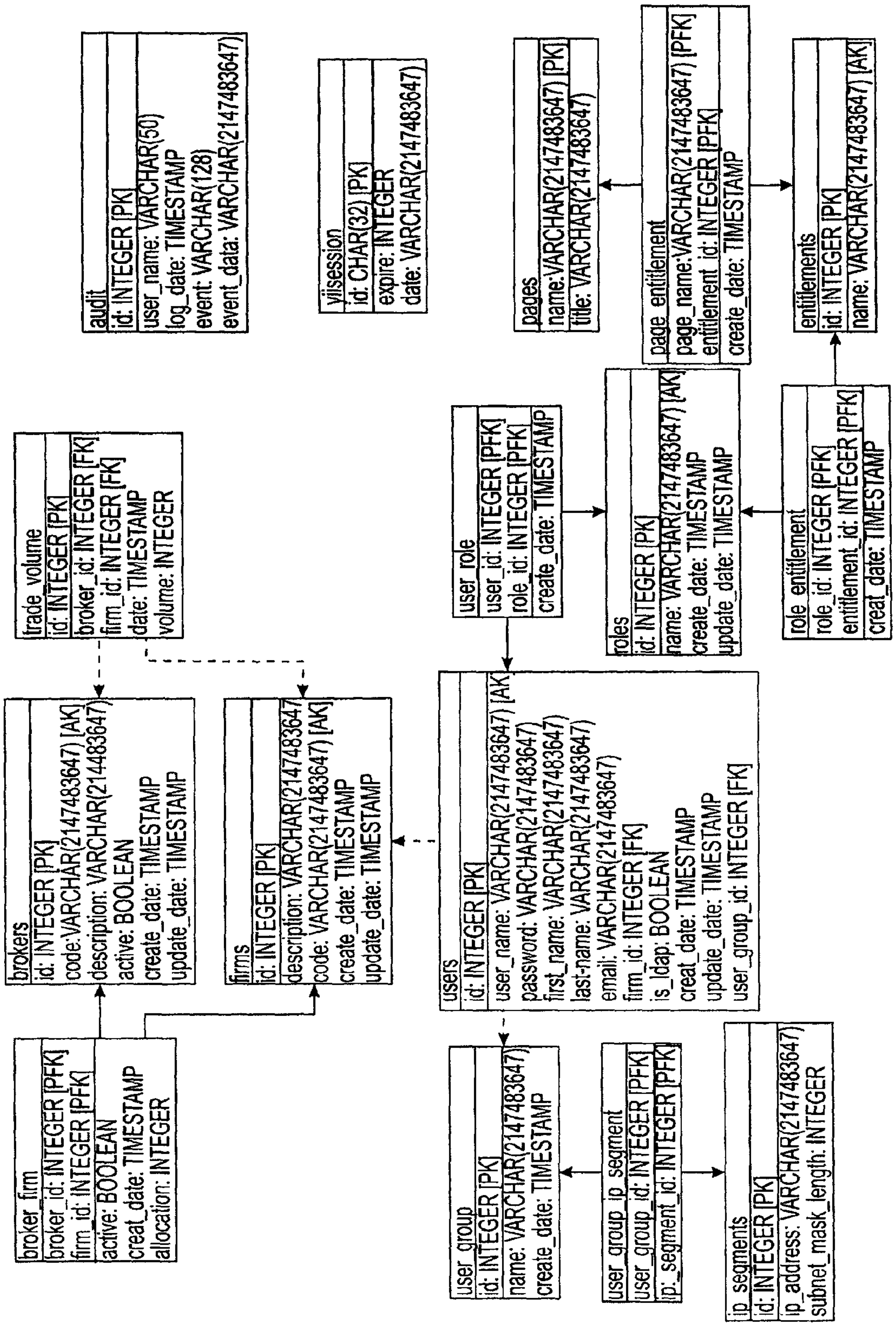

FIG. 102 depicts exemplary database tables and relationships.

Figure 103A:
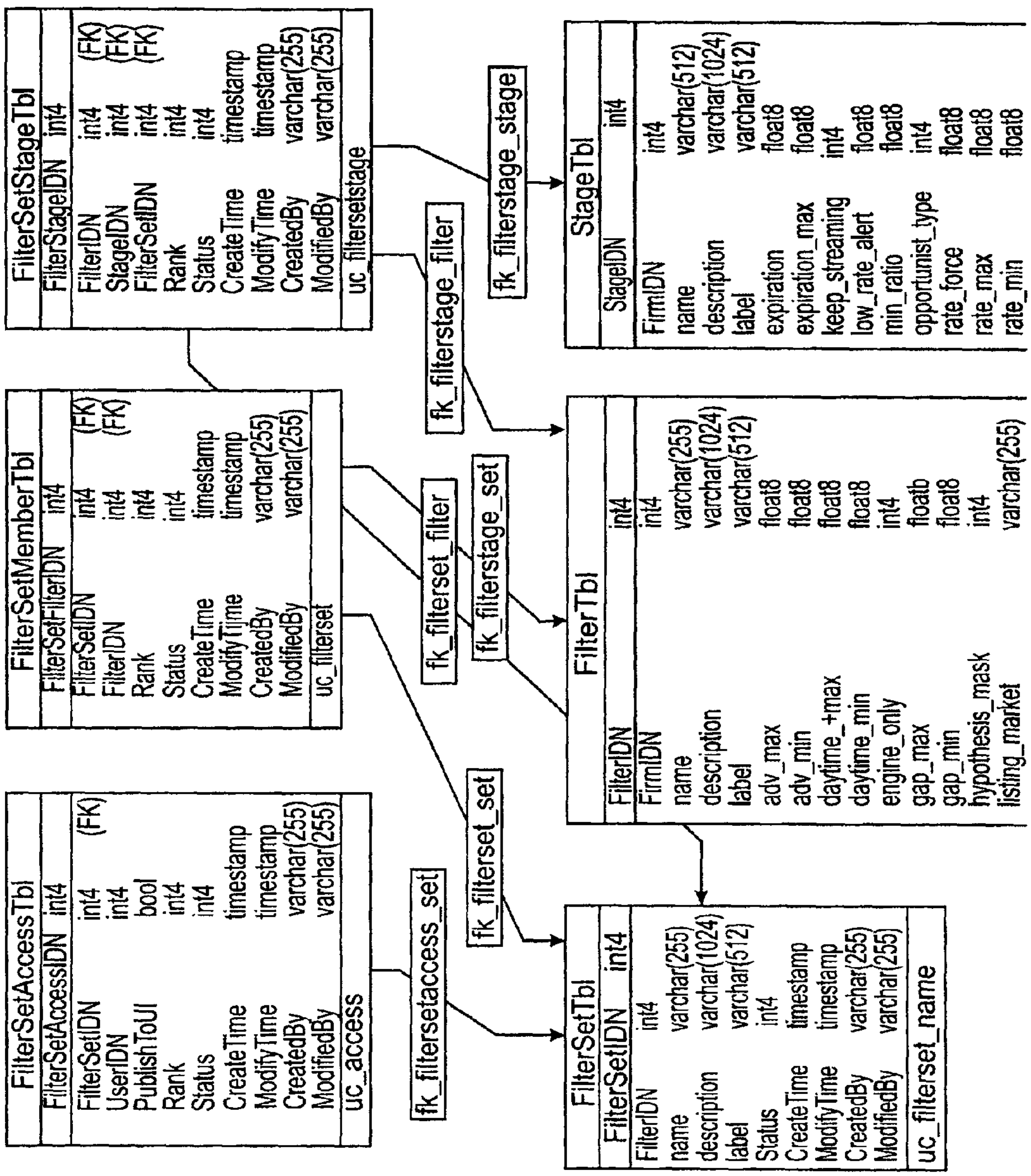

FIG. 103 depicts an exemplary Trading Server filter table relational diagram.

Figure 104:
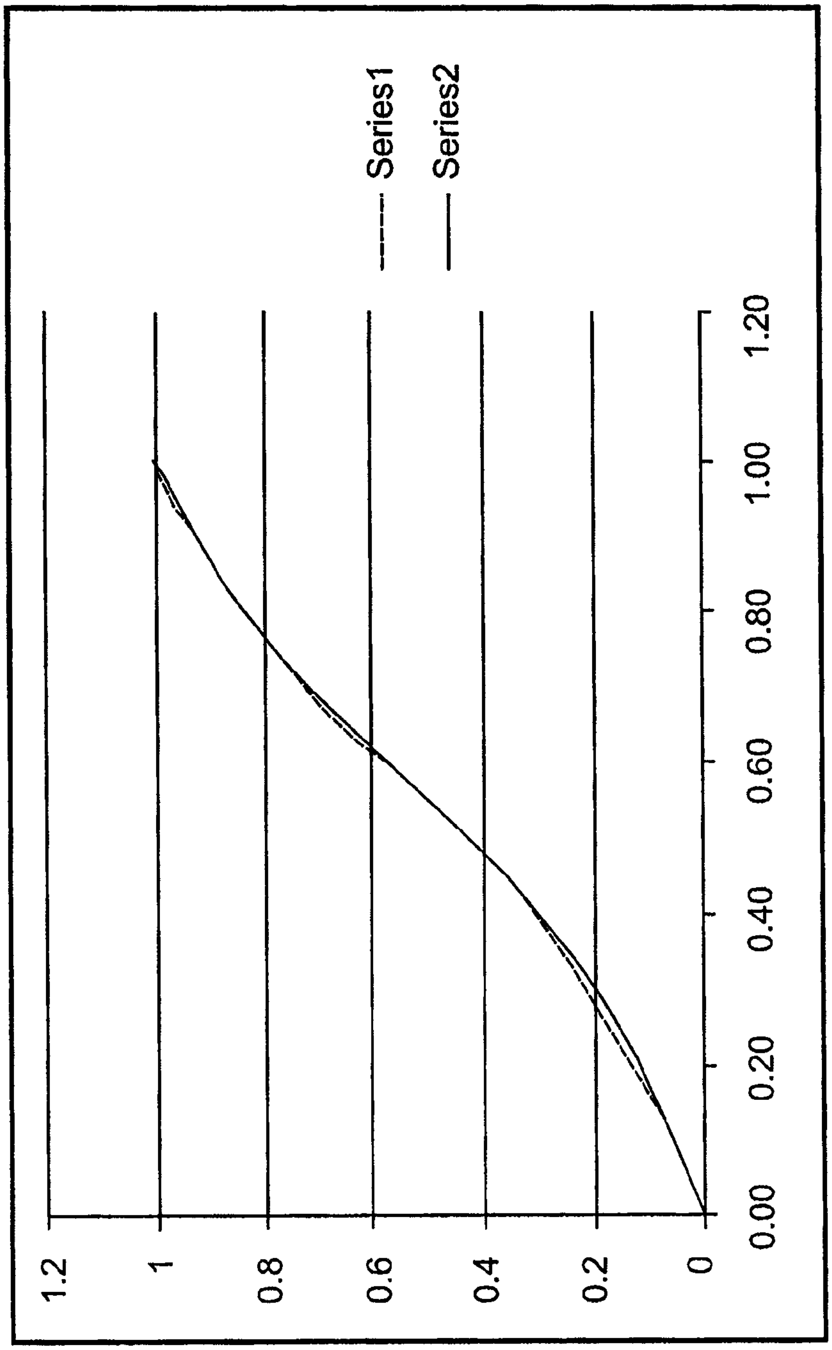
Figure 105:
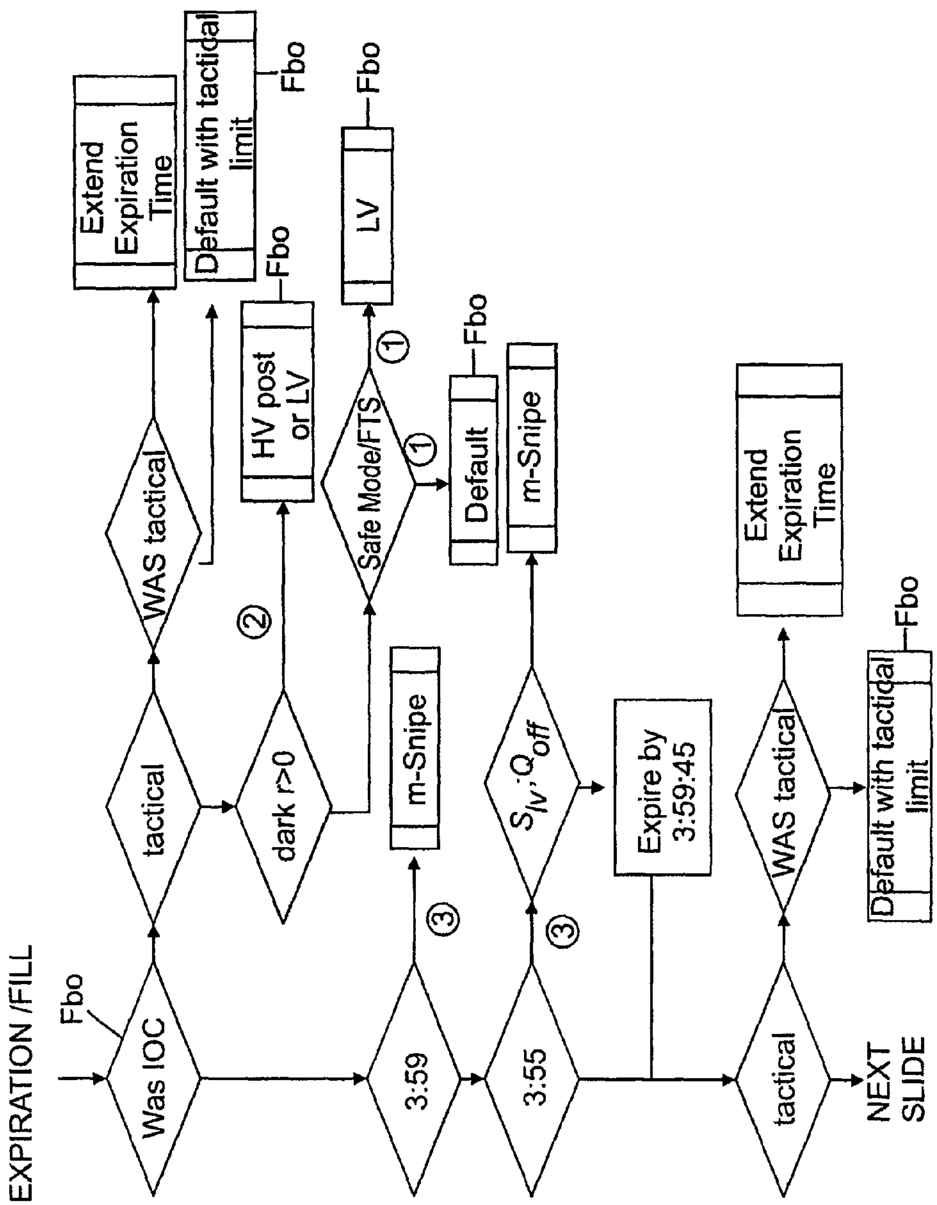
Figure 106:
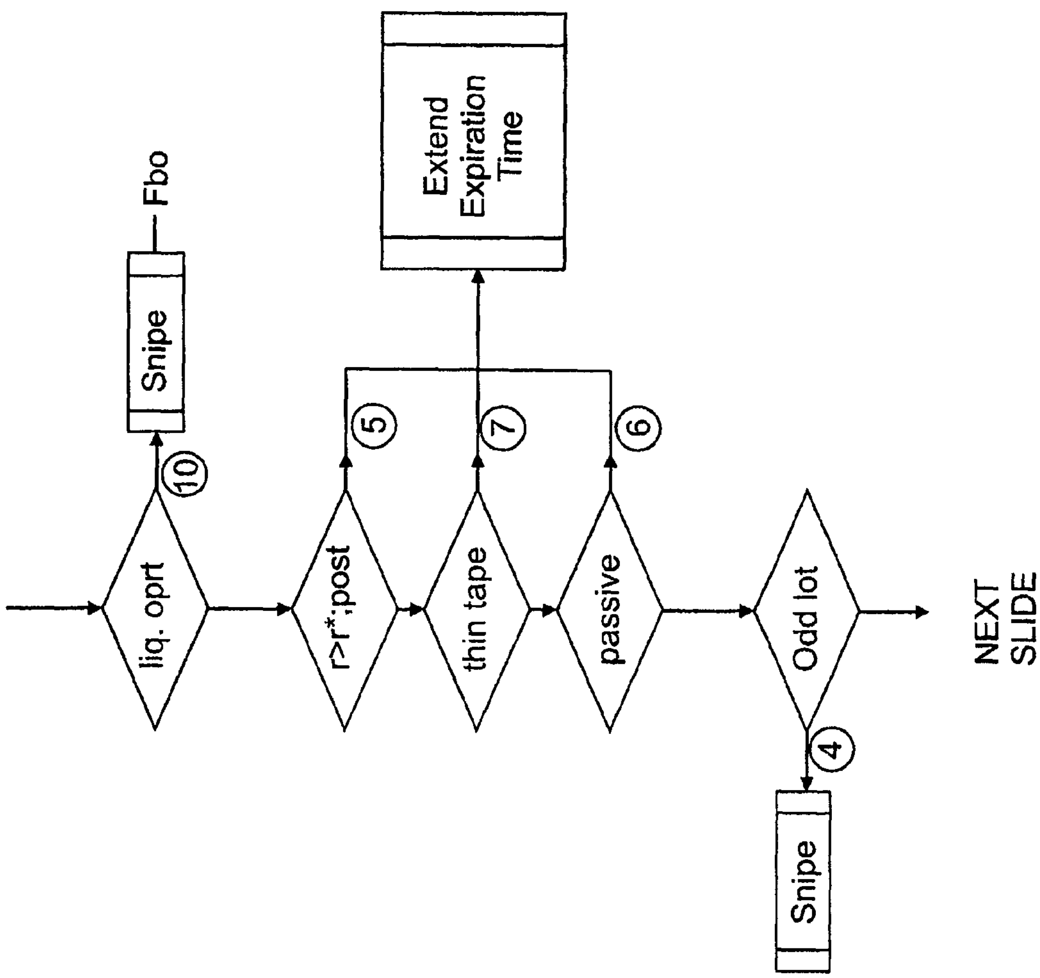
Figure 107:
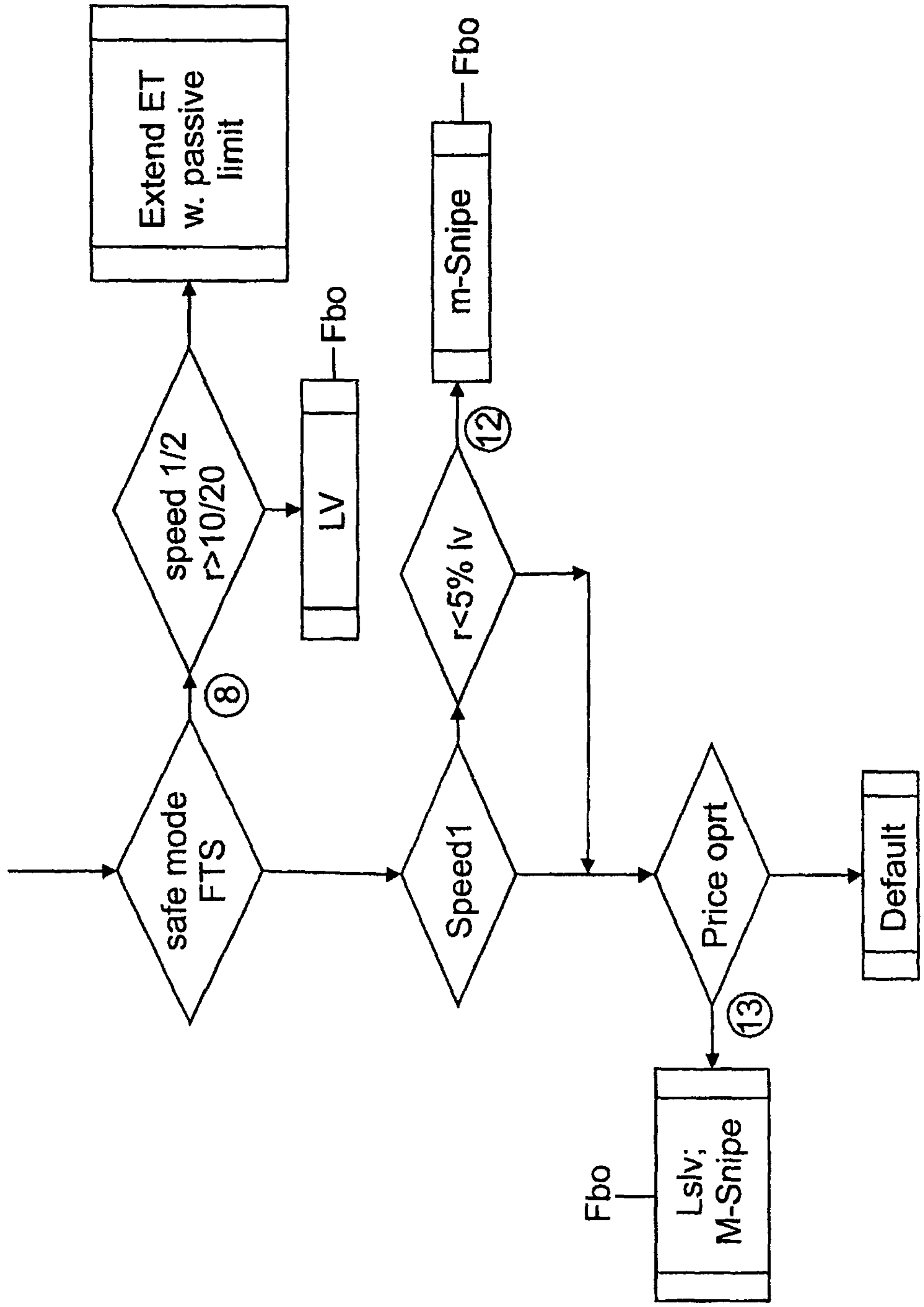
Figure 108:
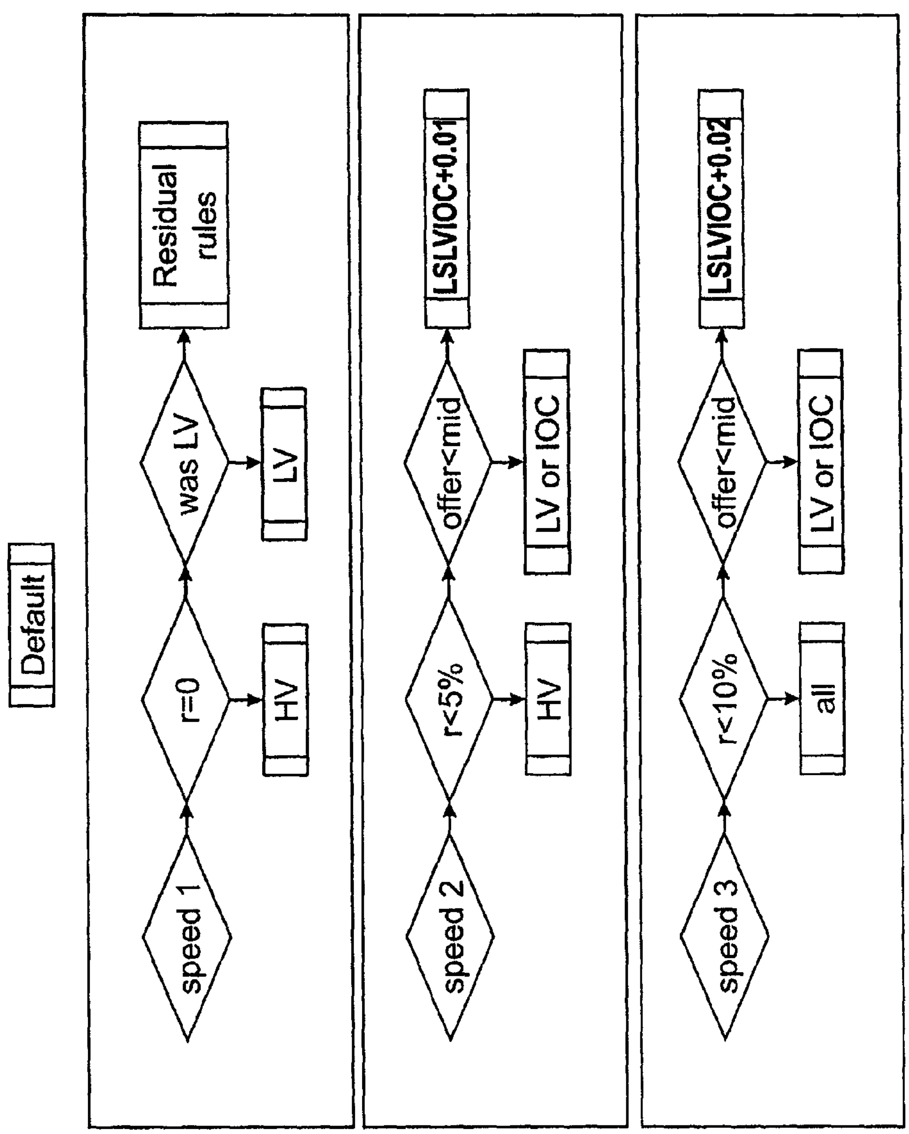

FIG. 104 depicts an exemplary inverse SVD graph.

FIGS. 105-108 depict exemplary steps regarding updated ordering of sortd checks.

FIGS. 109-132 depict statistical data related to Appendix B.

FIGS. 133-140 depict statistical data related to Appendix C.

DETAILED DESCRIPTION OF SELECT EXEMPLARY EMBODIMENTS

At least one exemplary embodiment comprises a system and method for calculation, application, and display of an "impact free" price estimation on an executed trade or group of trades for the purposes of analyzing/judging the quality of the executed trade(s) and/or making and/or aiding in the selection of a trading strategy for a new trade order(s).

In an exemplary embodiment, a user provides data for an impact-free price estimation, including a list of executed partial fills giving the symbol, price, and time of every fill. This data may be automatically loaded from a database or spreadsheet by selecting the trade from a drop list. Tools known in the art for identifying the relevant trade from a set of trades (searching by date, symbol, etc.) may be provided for ease of use.

Having selected a trade of interest, the user may request from the system an impact-free price estimation using action buttons known in the art of user interface design. In a subsequent exemplary step, the system may compare each partial fill to prevailing market quotes at the time of the fill to classify each fill, distinguishing passive executions (buy on the bid or sell on the offer), aggressive executions (buy on the offer or sell on the bid) and intra-spread executions such as midpoint fills from dark pools.

Exemplary algorithms that may be used for this classification are known in the art. See, for example, "Imbalance Vector and Price Returns," Nataliya Bershova, Christopher R. Stephens, and H. Waelbroeck, (paper submitted to J. Financial Markets; copy included in U.S. Prov. App. No. 61/322,637, which is incorporated herein by reference), and "Relating Market Impact to Aggregate Order Flow: The Role of Supply and Demand in Explaining Concavity and Order Flow Dynamics," Christopher R. Stephens, Henri Waelbroeck, Alejandro Mendoza (dated Nov. 20, 2009, and posted to the Social Science Research Network working paper series website (http://papers.ssrn.com/sol3/papers.cfm?abstract_id=1511205) on Nov. 22, 2009; copy included in U.S. Prov. App. No. 61/322,637, which is incorporated herein by reference).

In a third exemplary step, the system may estimate price impact accrued to the time of each tape transaction from the classified fills data and the tape data, as will be described in further detail below.

In a fourth exemplary step, the system may estimate corrected market prices that would have been observed had the price impact not existed, proceeding as follows. For a buy trade, the impact-free price associated with each market transaction is the difference between the observed price and the estimated accrued price impact; for a sell trade, the impact-free price is the sum of the observed price and the estimated accrued impact.

In a fifth exemplary step, the system displays to the user the actual market prices and the hypothetical impact-free prices that would have occurred had the trade not been executed. In an exemplary embodiment these price series may be represented graphically using charts with time on the x-axis and price on the y-axis, as is known in the art. See below for a description of an exemplary system display to a user, where the term "alpha" is used to represent and refer to the calculation of impact free price.

An exemplary embodiment further enables a user to select a group of trades, such as, for example, all trades executed in May whose size was between 1% and 5% of the average daily volume in the stock, using forms known in the art of user interface design. Having selected a set of trades, the user is enabled to request an average impact-free return estimation regarding the impact-free price for this set of trades.

In this step, the system may estimate impact free prices for each trade individually as described herein, then perform the additional step of estimating the average impact free price as follows.

In step "4a" the impact-free price returns of each stock from the midpoint at the start of the trade may be calculated in the following manner: for each print, the return (in basis points) is defined as 10,000 times the natural logarithm of the ratio of the impact-free price of this print to the starting price, multiplying by (−1) for sell trades.

In step "4b" the average and standard deviation of these returns may be calculated, as the average and standard deviation of the return at the first print following the end of minutely time periods counted from each trade start. The user may be enabled to specify whether this average return should be calculated as a flat average, in which case each trade in the selected set is given the same weight, or as a value-weighted average, in which case each return in the average is weighted by the value of the realized trade.

In this exemplary embodiment, the graphic display of impact-free price may be replaced by a similar graphic display of the impact free returns as a function of time. This description may refer to the chart of impact-free returns and standard deviation versus time from trade start below as the impact-free returns profile.

In an exemplary embodiment, the user may be further enabled to test an alternate trading strategy or schedule. In this embodiment, the user selects an alternate strategy or schedule from a drop list. Examples of a set of strategies that may be found in such a drop list include participation at 5%, 10%, 15%, 20%, etc. Another example includes a front-loaded strategy such as those known in the art. As an example, see "Optimal Execution of Portfolio Transactions," Robert Almgren and Neil Chriss, J. Risk 3, pp. 5-39 (2000) (preprint dated Apr. 8, 1999 included in U.S. Prov. Pat. App. No. 61/322,637, which is incorporated herein by reference), and other common "benchmark" strategies such as AVWAP, TWAP, MarketOnClose, etc. Descriptions of such benchmarks can be found in reference texts on the subject—see, for example, "Optimal trading strategies," R. Kissell and M. Glantz, AMACOM (2003).

In this exemplary embodiment, the system may estimate hypothetical prices for executing the alternate strategies in two steps. First, the trading time may be broken down into time intervals (for example, 5 minute intervals). In each interval, the number of shares that would have been filled using the alternate strategy is estimated knowing the tape volume and selected benchmark schedule. For example, if the user had chosen 5% participation, then the number of shares filled in a 5-minute interval would be 5% of the tape volume in that interval.

Second, the price impact of these hypothetical fills may be calculated using one of the methods described below for estimating impact-free price, but in reverse.

Third, the estimated prices using the alternate strategy may be estimated by adding the impact to the impact-free price. This embodiment may further enable a user to view the estimated cost of the execution using the alternate strategy, and corresponding savings or additional cost. This embodiment may also enable a user to specify a different limit price; to estimate the hypothetical prices in presence of an alternate strategy and limit price the system proceeds as above but assumes only those fills that are within the limit price would actually occur; the reduced set of fills may be used to estimate impact of the alternate strategy. Since the limit price may prevent the trade from executing in full, the number of shares filled by the alternate strategy may be displayed to the user in addition to the total cost, and the additional cost required to execute these unfilled shares at the final price may be displayed as opportunity cost associated with this choice of limit price.

In another exemplary embodiment, the system may further enable a user to initiate an automated search for groups of trades that have specific impact-free returns profiles, by selecting a profile from a drop list.

Examples of impact-free return profiles include but are not limited to "high alpha" profiles, where the impact-free returns are positive and larger than a given threshold, "negative alpha" profiles associated with negative values of the impact-free returns, or "reversion" profiles where the impact-free return has an inverted U shape exhibiting positive impact-free returns up to some point followed by reversion back to an aggregate impact-free return that becomes close to or less than zero by the end of the trading day.

In this exemplary embodiment, the system may use historical data about trades from the user, and utilize predictive data mining methods known in the art to classify the historical trades as more likely or less likely to exhibit the requested profile, given available predictive drivers. Such drivers may include the variables that are available for the users in specifying a group of trades (in the example mentioned above, size as a percentage of average daily volume) but also drivers that are calculated using market data, data about the issuer, and other sources of information (news, earnings announcements, time of day, portfolio manger's name, fund name, trader name, urgency instruction from portfolio manager, and other relevant information that can be imagined by those skilled in the art).

In this embodiment the system may display to the user each class by the drivers and values used to define the class, and show the impact-free returns profile in each class.

In an exemplary embodiment of a system that enables a classification of trades by impact-free returns profiles, the system may be further connected to real-time trade data using data feed handlers as known in the art, and enable a user to request a predicted impact-free returns profile for a hypothetical or real order to buy or sell a certain amount of stock in a given security. In this embodiment, the value(s) of all the drivers may be calculated from the data feeds in the first step; the classification model may then be used in a second step to classify the order, and a corresponding impact-free returns profile displayed to the user.

In another embodiment, the system may automatically associate an optimal trading strategy to each impact-free returns profile, selecting for this purpose a strategy that minimizes the cost of the proposed alternate strategy, as described above. For the purposes of this description the terms strategy and algorithm, while not identical in meaning, may sometimes be used interchangeably.

In another embodiment, the impact estimation may be done using mathematical models that take into consideration costs associated with information leakage, and the optimal trading strategy may be determined using an optimization program such as dynamic programming or simulated annealing to minimize a risk-adjusted cost function, as explained below under the section entitled "Optimal Execution of Portfolio Transactions: The Effect of Information Leakage" (see also "Optimal Execution of Portfolio Transactions: The Effect of Information Leakage," Adriana M. Criscuolo and Henri Waelbroeck (copy included in U.S. Prov. Pat. App. No. 61/322,637, which is incorporated herein by reference).

While the basic theory explaining impact from arbitrage arguments is known in the art of arbitrage mathematics (see "The Market Impact of Large Trading Orders: Predictable Order Flow, Asymmetric Liquidity and Efficient Prices," J. Doyne Farmer, Austin Gerig, Fabrizio Lillo, and Henri Waelbroeck; (copy included in U.S. Prov. Pat. App. No. 61/322,637, which is incorporated herein by reference; a version is available at http://www.haas.berkeley.edu/groups/finance/hiddenImpact13.pdf)), its application to optimal execution is innovative as described in detail herein. In an exemplary embodiment, the method may also be applied to matching optimal execution profiles to classes of trades with specific impact-free returns as explained in more detail below.

Other methods for matching optimal execution strategies to impact-free returns profiles will be envisioned by those skilled in the art. An embodiment may further include an interface to a trade execution system, enabling a user who has requested an impact-free returns profile to initiate the execution of an optimal execution strategy. This may be done by means of a FIX interface to deliver an order to a trading server, as is known in the art.

In certain embodiments involving a classification of trades by their impact-free returns profile, the system may also identify hypothesis validation conditions that statistically validate or reject the class membership hypothesis in the course of execution. For example, even though a trade may have been classified as likely to have a flat returns profile (no price movement other than the impact of the trade), if the price in fact increased by more than 40 basis points within the first 15 minutes, this may imply that further impact-free price increases are more likely than a reversal. If this were the case, such an observation would therefore invalidate the initial class membership prediction (flat returns profile) and replace it by another (rising price trend).

While exemplary embodiments of the system can be used as a stand-alone offering per the above-described embodiments; it also may be used in embodiments that combine the functionality of the system with functionality covered in the patent applications listed below to enable dynamic use of impact free price estimation in a trade execution platform.

These embodiments may apply the system's ability to associate optimal trading strategies with impact free price estimations in a dynamic setting whereby the impact free price estimation is used first in a filter based process to help determine the best trading strategy for a given order (see, for example, U.S. patent application Ser. No. 13/070,852, filed Mar. 24, 2011, incorporated herein by reference), then may, in conjunction with hypothesis validation conditions, enable the subject system to monitor its ongoing confidence in its strategy recommendation on a real time basis and automatically switch to different execution strategies when needed (see, for example, U.S. patent application Ser. No. 11/783,250 (Pub. No. 2008/0040254), incorporated herein by reference—in particular, paragraph 0055). Additionally, Appendix A teaches exemplary embodiments wherein the system is able to associate multiple trading strategies with a given order for user directed initiation or automated initiation.

In addition the system may also be used in conjunction with a block execution platform as a mechanism for providing feedback for management and placement of block orders (see, for example, U.S. patent application Ser. No. 12/463,886 (Pub. No. 2009/0281954), incorporated herein by reference, and U.S. patent application Ser. No. 12/181,028 (Pub. No. 2009/0076961), incorporated herein by reference, as well as the electronic signal notifications for order activity and price protection (see, for example, U.S. patent application Ser. No. 12/181,117 (Pub. No. 2009/0089199), incorporated herein by reference, and U.S. patent application Ser. No. 12/419,867 (Pub. No. 2009/0259584), incorporated herein by reference. Finally, embodiments of the system may also be used in conjunction with the risk classification system taught by U.S. patent application Ser. No. 12/695,243 (Pub. No. 2010/0153304), incorporated herein by reference.

Exemplary Impact Free Price Estimation Embodiments

To estimate impact it is useful to capture the fact that most trades are broken down into segments, each of which involves a relatively homogeneous intended participation rate, where segments may or may not be separated by quiet periods with no trading. Research involving data from executed trades shows that impact grows non-linearly during a segment, and reverts exponentially after the completion of a segment that is followed by a quiet period. The following describes exemplary embodiments enabling an estimation of the average market impact by splitting each trade into segments and further breaking down the timeline into 5-minute intervals.

In a first step the number of shares filled in each 5-minute interval may be calculated, and this may be further refined into a number of shares filled passively, aggressively, and inside the spread.

In a second step, the incremental impact from the fills in the segment may be added and reversion from activity in prior segments subtracted, to obtain the net price effects. The incremental impact from fills in the segment may be given for example by a parametric model as follows $$E(I_t)=\alpha\nu\pi^{\delta}(Q_t/\mathrm{ADV})^{\alpha-1}(MktCap[\$])^{-\eta}$$

Where $\pi$ is the participation rate, the impact factor $\alpha$ and exponents $\alpha$, $\delta$, $\eta$ are parameters that may be estimated for different algorithmic trading styles as described below using methods known in the art of non-linear regressions for estimating exponents and taking care to control for selection bias; the shares filled up to time t are $Q_t$; $\nu$ is the stock's volatility and ADV is the average daily volume. The algorithmic trading style characterizes the manner in which an algorithm interacts with the market; this may be an algorithm name or aggression parameter provided by the client together with the fills data; or alternatively, it may be defined for example based on a clustering of aggregate metrics. Such metrics may include, for example, the percentage of prints by classification as aggressive, passive or midpoint. The aggregate metrics may also include short-term performance metrics. An example of such a style clustering analysis is described in Stephens and Waelbroeck, J. Trading, Summer 2009 and available at [www.alphascience.com/Portals/0/Documents/JOT_Summer_2009_Pipeline.pdf].

After a segment is completed, the impact contribution of the segment is the sum of residual temporary impact and permanent impact, as follows. Reversion is the difference between the segment impact at the end of the segment and this residual impact.

Temporary impact at the end of the trade may be estimated, for example, as ⅓ of the total impact. This form of impact decays exponentially. The exponential decay timescale may be estimated, for example, as $\tau=\tau_0+\kappa*\mathrm{LN}(t_0+t[\mathrm{min}])$ where $\tau_0=0$, $\kappa=4.34$, $t_0=3$ are parameters and the time t from the end of the segment is measured in minutes. Thus, t' minutes after segment completion, $$E(I,\ \mathrm{end}+t')=E(I,\ \mathrm{end})\left(1-\frac{1}{3}\exp(-t'/\tau)\right)$$

Permanent impact may be estimated, for example, as ⅔ of total impact at the end of the segment. The manner in which permanent impact decays may itself be estimated as a power of elapsed tape volume. The decay exponent may be taken to be the same value as was introduced previously regarding the scaling of total segment impact to the participation rate. Thus, $$E(PI,\ \mathrm{end}+t')=\frac{2}{3}E(I,\ \mathrm{end})\left(\frac{\mathrm{tape(start}\ {-}{>}\ \mathrm{end)}}{\mathrm{tape(start}\ {-}{>}\ \mathrm{end}+t')}\right)^{0.4}$$

The accrued impact at time t may be calculated as the sum of the impact contribution of each segment.

Impact-free prices may be estimated for buys by subtracting the fill price by the accrued price impact up to the interval that contains each fill, or for sells by adding the accrued price impact.

In an alternate embodiment, the quantities inside the square root functions above may be calculated as a linear sum of weights times the quantity filled in passive, intra-spread, or aggressive executions; the three factors in this sum may be estimated using regression methods. Other embodiments including replacing the square root function with a different function or utilizing different parametric or non-parametric models in each of the steps outlined above may be easily envisioned by those skilled in the art.

Optimal Execution in Presence of Hidden Order Arbitrage

In order to enable an accurate estimation of the impact-free price for strategies with different execution speeds, it is useful to use an impact model that correctly accounts for the effect of execution speed on the cost of trading. As explained below, impact models known in the art fail to account for the possibility that arbitrage traders would be able to observe information about an algorithmic execution in the market data stream and trade on this information: if price were correctly explained by models known in the art, there would be risk-free profits available for such arbitrage strategies. Therefore it is the purpose of the present section to describe an exemplary impact model that is derived from a no-arbitrage argument, within a framework referred to herein as hidden order arbitrage theory.

The equations of hidden order arbitrage theory are a bit difficult to work with. Accordingly, to create a more readily implementable solution this description uses simplified versions in the impact model described above, using first-order expansions of some of the special functions that emerge from the theoretical framework.

It is also a purpose of this section to demonstrate how the framework of hidden order arbitrage theory enables one to calculate optimal execution solutions that minimize a risk-adjusted cost function or optimize performance relative to a VWAP benchmark.

Almgren and Chriss found that to maximize the risk-adjusted liquidation value of an asset it is optimal to trade fastest at the beginning of a trade. This result was based on simplifying assumptions including linear and stationary impact. Of these two assumptions, that of a stationary impact process is most clearly invalidated by observations: practitioners observe more price reversion after completing a long trade than a brief one. This portion of the description considers the optimal execution problem using a zero arbitrage argument for price formulation. Models and methods are described for dealing with a type of information arbitrage referred to herein as hidden order arbitrage.

Arbitrageurs detect the presence of hidden orders through the statistical properties of order flow on the market and formulate statistical models for future price and order flow imbalances. Competition between arbitrageurs keeps prices close to a level that fairly accounts for the information revealed in the order flow. When a hidden order stops, expectations of future order flow imbalances decay, and price reverts accordingly. This portion of the description explains that the shape of the impact function and subsequent reversion can be derived from the basic equations for hidden order arbitrage, the participation rate profile for executing a trade, and the statistical distribution of hidden order sizes. Numerical solutions to the optimal execution problem in the presence of hidden order arbitrage are provided.

This portion of the description considers the optimal execution of a large portfolio transaction that must be split into smaller slices and executed incrementally over time. There are many dimensions to this problem that are potentially important to the institutional trader: liquidity fluctuations, the news stream, and short-term alpha that may be associated with a fund manager's order origination process, to name a few. In response to these variables, traders make decisions including the participation rate, limit price, and other strategy attributes. As explained elsewhere in this description, one may limit the scope of the problem by adopting the definition of optimal execution from Almgren and Chriss (AC 2000): optimal execution is the participation rate profile that minimizes the risk-adjusted cost while completing the trade in a given amount of time.

To optimize the risk-adjusted cost one may first specify a model for market impact. Market impact has been analyzed by different authors as a function of time and trade size. See, for example, (Bertismas and Lo, 1998), (Almgren and Chriss, 2000), (Almgren et al., 2005), (Obizhaeva and Wang, 2006).

AC 2000 derived execution profiles that are optimal if certain simplifying assumptions hold true. These include the hypothesis that the market is driven by a random Brownian motion overlaid with a stationary market impact process. Impact is proposed to be the linear sum of permanent and temporary components, where the permanent impact depends linearly on the number of traded shares and the temporary impact is a linear function of the trading velocity. It follows that total permanent impact is independent of the trade schedule. The optimal participation rate profile requires trading fastest at the beginning and slowing down as the trade progresses according to a hyperbolic sine function.

This type of front-loaded participation rate profile is widely used by industry participants, yet it is also recognized that it is not always optimal. Some practitioners believe that the practice of front-loading executions bakes in permanent impact early in the trade, resulting in higher trading costs on average. A related concern is that liquidity exhaustion or increased signaling risk could also lead to a higher variance in trade results (Hora, 2006), defeating the main purpose of front-loading. In their paper, Almgren and Chriss acknowledge that the simplifying assumptions required to find closed-form optimal execution solutions are imperfect. The non-linearity of temporary impact in the trading velocity has been addressed previously in (Almgren, 2003), (Almgren et al., 2005); the optimization method has also been adjusted for non-linear phenomenological models of temporary impact (Loeb, 1983; Lillo et al., 2003). Most studies however share the common assumptions that short-term price formation in non-volatile markets is driven by an arithmetic Brownian motion and that the effect of trading on price is stationary, i.e., the increment to permanent impact from one interval to the next is independent of time and the temporary impact is a correction that depends only on the current trading velocity but not on the amount of time that the strategy has been in function. There are reasons to doubt the assumption of stationary impact. Practitioners find that reversion grows with the amount of time that an algorithm has been engaged; this suggests that temporary impact grows as a function of time.

Phenomenological models of market impact consistently produce concave functions for total cost as a function of trade size; this is inconsistent with linear permanent impact.

(Farmer et al., 2009) (FGLW) showed that it is possible to derive a concave shape for both temporary and permanent impact of a trade that is executed at a uniform participation rate. The basic assumption in this method is that arbitrageurs are able to detect the existence of an algorithm and temporary impact represents expectations of further activity from this algorithm. The concave shape of market impact follows from two basic equations.

The first is an arbitrage equation for a trader that observes the amount of time an execution has been in progress and uses the distribution of hidden order sizes to estimate the total size of the hidden order.

The second is the assumption that institutional trades break even on average after reversion. In other words, the price paid to acquire a large position is on average equal to the price of the security after arbitrageurs have determined that the trade is finished. The model explains how temporary impact sets the fair price of the expected future demand or supply from the algorithmic trade. When the trade ends and these expectations fade away, the model also explains how price reverts to a level that incorporates only permanent impact. The shape of the impact function can be derived from knowledge of the hidden order size distribution. If one believes the hidden order size distribution to have a tail exponent of approximately 1.5, the predicted shape of the total impact function is a square root of trade size in agreement with phenomenological models including the Barra model (Torre, 1997). See also (Chan and Lakonishok, 1993), (Chan and Lakonishok, 1995), (Almgren et al., 2005), (Bouchaud et al., 2008), (Moro et al., 2009).

This portion of the description extends hidden order arbitrage theory to estimate the impact of trades that execute with a variable participation rate, and uses the extended model to derive optimal execution solutions.

The first section below generalizes the framework for hidden order arbitrage to allow for varying-speed execution profiles. The next section describes trading solutions that minimize total trading cost with and without risk. Section 3 considers optimization with respect to the volume-weighted average price objective and shows that trade optimization with respect to the two benchmarks (implementation shortfall and VWAP) is a frustrated problem. Implications for institutional trading desks are discussed in the concluding section.

1. Hidden Order Arbitrage

This portion of the description addresses the situation of a large institutional trade that is executed over time through a sequence of smaller transactions. For simplicity's sake, one may consider a single institutional trade executing in a market that is otherwise driven by arithmetic Brownian motion. The trade is executed according to an execution schedule with the participation rate $\pi(n(t))$ representing the probability that a market transaction n(t), at time t, belongs to the institutional trade.

1.1 Hypotheses

1. Hidden Order Detection. (H.1)

A hidden order executing during a period $\Delta t$ with an average rate $\pi$ is detected at the end of intervals of $\tau(\pi)=1/\pi^2$ market transactions[1]. The term "detectable interval" is used below to mean each set of $$\tau(\pi_i)=\frac{1}{\pi_i^2}$$

market transactions, for each $i\in\mathbb{N}$, over which a hidden order is detected with a constant participation rate $\pi_i$. A detectable interval i contains $$\frac{1}{\pi_i}$$

hidden order transactions, with $0\leqq\pi_i\leqq 1$, $\forall i$.

[1]If order flow were a random walk with a bias it between buy and sell transactions, the imbalance would be detected with t-stat=1 after $1/\pi^2$ transactions.

In addition, there exists a function $\pi_r(X, \pi_f)$ such that the end of a hidden order can be detected after a reversion time $\pi_r(X, \pi_f)$, where $\pi_f$ is the most recently observed rate. Let be $N^*=N^*(X)\in\mathbb{R}_{>0}$, then $$N^*=q+[N^*],\ [N^*]\stackrel{def}{=}IntegerPart[N^*],\ 0\leq q\leq 1.$$

One may set $\tau_r(X, \pi_f)=q\pi_f^{-2}$. The number N* may be determined by the trade size X and [N*] represents the last detectable interval.

2. Distribution. (H.2)

The total distribution function of the hidden order process is the product of a distribution $p(\vec{\pi}, N^*(X))$ of normalized execution schedules $\vec{\pi}=\{\pi_1, \pi_2, \ldots, \pi_{[N^*]}, \pi_f\}$, and the Gaussian distribution G of an arithmetic random walk.

For constant rate, $$\int_0^1 p(\pi, N^*(X))d\pi\rightarrow p(N^*)\propto\frac{1}{N^{*\alpha+1}},$$

a truncated Pareto distribution of hidden order sizes for $N^*\leqq M$, where the cutoff M is very large and $\alpha=1.5$ is the tail exponent (Gopikrishnan et al., 2000), (Gabaix et al., 2006).

One may call $p(\pi_1, \pi_2, \ldots, \pi_i, i\leqq[N^*])$ the probability that the hidden order was detected at least in i intervals (and i be the last detectable step [N*] or not) with a participation schedule $\vec{\pi}=\{\pi_1, \pi_2, \ldots, \pi_i\}$. By definition of conditional probabilities, $$p(\pi_1, \pi_2, \ldots, \pi_i, i\leqq[N^*])=p(\pi_i, i\leqq[N^*]/\pi_1, \pi_2, \ldots, \pi_{i-1})p(\pi_{i-1}, i-1\leqq[N^*]/\pi_1, \pi_2, \ldots, \pi_{i-2})\ldots p(\pi_2, 2\leqq[N^*]/\pi_1)p(\pi_1, 1\leqq[N^*]).$$

Here $p(\pi_i, i\leqq[N^*]/\pi_1, \pi_2, \ldots, \pi_{i-1})$ is the conditional probability that the hidden order will be detected at the interval i with rate $\pi_i$ given that it was detected in i−1 intervals with rate schedule $\vec{\pi}=\{\pi_1, \pi_2, \ldots, \pi_{i-1}\}$.

One may determine $p(\pi_i, i\leqq[N^*]/\pi_1, \pi_2, \ldots, \pi_{i-1})$ when all the hypotheses are given (see below). By "reversion price", $S_i$, is meant the expected price after the end of the hidden order has been detected at the end of the interval i. One may denote by $\tilde{S}_i$ the expected average price in the interval, where the expectation is over G, with fixed $\{\pi_1, \pi_2, \ldots, \pi_i\}$.

3. Price Efficiency. (H.3)

For the short term, arbitrage opportunities disappear quickly due to the efficiency of the market. This concept translates to the equation:

$$\int_0^1 p(\pi_i, i\leq[N^*]/\pi_1, \pi_2, \ldots, \pi_{i-1})(\tilde{S}_i-\tilde{S}_{i-1})d\pi_i + p(i-1=[N^*]/\pi_1, \pi_2, \ldots, \pi_{i-1})(S_{i-1}-\tilde{S}_{i-1})==0,\ i\geq 2.$$

Here, $$p(i-1=[N^*]/\pi_1, \pi_2, \ldots, \pi_{i-1}) = 1-\int_0^1 p(\pi_i, i\leq[N^*]/\pi_1, \pi_2, \ldots, \pi_{i-1})d\pi_i$$

is the probability that the hidden order stops at the end of the interval i−1, given that it was detected through a schedule $\{\pi_1, \pi_2, \ldots, \pi_{i-1}\}$.

4. Breakeven. (H.4)

The expected reversion price following a trade that completed after k intervals is equal to its weighted average execution price[2]:

[2]The breakeven hypothesis may seem surprising. It states that the implementation cost on average equals the information value of the trade. FLGW shows that this hypothesis is an example of the tragedy of the commons: Portfolio managers understand that their information is not exclusive and other managers will join the trade until the net profit, after impact, goes to zero.

$$S_k = \frac{\sum_{i=1}^{k} \frac{1}{\pi_i} \tilde{S}_i}{\sum_{i=1}^{k} \frac{1}{\pi_i}}, \; k \geq 2.$$

5. Temporary Impact. (H.5)

First Interval Impact:

The impact of first-interval, $\tilde{S}_1$-$S_0$, is equal to the product of a scaling factor that depends only on the volatility σ and an exponent γ of the participation rate in the first interval:

$$\tilde{S}_1 - S_0 = \hat{\mu}(\sigma)\pi_1^{\gamma}.$$

Impact after the First Interval:

The temporary impact out of the first interval $\tilde{S}_{k+1} - S_k$ is a function only of the current participation rate $\pi_{k+1}$ and the total number of shares filled through interval k+1.

1.2 Exemplary Impact Model

One may derive an impact model from the hypotheses above and its simplified form to first order in $k^{-1}$.

By hypothesis 5, temporary impact does not depend directly on the participation rate profile before the interval in consideration. Therefore, it may be modeled as the temporary impact of a constant participation trajectory that has filled the same number of shares at the current participation rate of the variable rate model. Then, one may write:

$$\tilde{S}_{k+1} - S_k = \tilde{S}_{j_{k+1}} - S_{j_{k+1}-1}, \text{ such that}$$

$$\xi_{k+1} = \xi_{j_{k+1}} = j_{k+1}\pi_{k+1}^{-1}. \quad (1)$$

Here, $$\xi_{k+1} \stackrel{def}{=} \sum_{i=1}^{k+1} \frac{1}{\pi_i}$$

is the size executed through the end of interval k+1 in units of the average transaction size.

As shown in [FGLW], the price efficiency condition and breakeven equation in the case of a uniform participation rate and no impact-free returns can be solved recursively for the temporary impact in interval $j_{k+1}$, leading to $$\tilde{S}_{j_{k+1}} - S_{j_{k+1}-1} = \frac{1 - p_1}{(j_{k+1} - 1) \sum_{i=j_{k+1}}^{M} p_i} (\tilde{S}_1 - S_0). \quad (2)$$

Here $$p_i \stackrel{def}{=} p(i = [N^*])$$

the probability that the hidden order stops at the end of the interval i, such as defined in hypothesis 2. For a Pareto distribution of hidden order sizes (hypothesis 2), the sum in the denominator, $$\sum_{i=j_{k+1}}^{M} p_i,$$

is a Hurwitz zeta function $\zeta(\alpha+1, j_{k+1})$. Using equalities (1), (2) and hypothesis 5, one may write:

$$\tilde{S}_{k+1} - S_k = \frac{1 - p_1}{(j_{k+1} - 1)\zeta(\alpha + 1, j_{k+1})} (\hat{\mu}(\sigma)\pi_{k+1}^{\gamma}), \quad (3)$$

$$\text{such that } j_{k+1} = \xi_{k+1}\pi_{k+1}.$$

From the asymptotic form of the Hurwitz zeta function for large j, $$(j-1)\zeta(\alpha+1, j) \underset{j \gg 1}{\longrightarrow} j^{-\alpha+1}.$$

Therefore, one may approximately write the solution to this model as:

$$\tilde{S}_{k+1} - S_k \approx \mu(\sigma)\pi_{k+1}^{\beta} \left( \sum_{i=1}^{k+1} \frac{1}{\pi_i} \right)^{\alpha-1}, \; k \gg 1. \quad (4)$$

Here, $$\beta \stackrel{def}{=} \gamma + \alpha - 1 \text{ and } \mu(\sigma) \stackrel{def}{=} (1 - p_1)\hat{\mu}(\sigma).$$

The temporary impact in Equation (3) only involves the most recent participation rate and shares acquired through the end of interval k+1 and is valid for all $k \geqq 1$. Nevertheless, despite that equation (4) gives the temporary impact for large k, it does not invalidate Hypothesis 5 if one uses it for all the intervals $k \geqq 0$. The parameters μ(σ) and β can be estimated from data on small trades, for which the shortfall $\tilde{S}_1 - S_0$ can be measured with sufficient accuracy to distinguish execution strategies (see for example, Altunata et al. (2009). Trading data is consistent with β=0.3 (Gomes and Waelbroeck, 2008).

2. Optimal Execution

Following the description above, one may write temporary impact as:

$$\tilde{S}_k = S_{k-1} + \mu\pi_k^{\beta} \left( \sum_{i=1}^{k} \frac{1}{\pi_i} \right)^{\alpha-1}, \; k \geq 1. \quad (5a)$$

Here, $$[\mu] = \frac{\$}{\text{share}}, \; \mu > 0$$

for a buy and μ<0 for a sell. Combining (5a) with the breakeven hypothesis, one may derive by recursion the expression for the expected price at k, as a function of the participation rate schedule $\pi_i, 1 \leqq i \leqq k$:

$$\tilde{S}_k = S_0 + \mu\left\{\pi_k^{\beta}\left(\sum_{i=1}^{k}\pi_i^{-1}\right)^{\alpha-1} + \sum_{i=1}^{k-1}\pi_i^{\beta-1}\left(\sum_{j=1}^{i}\pi_j^{-1}\right)^{\alpha-2}\right\}, \quad 2 \le k \le [N^*], \tag{6a}$$

$$\tilde{S}_1 = S_0 + \mu\pi_1^{\beta-\alpha+1}. \tag{6b}$$

$$[N^*] \stackrel{def}{=} IntegerPart[N^*].$$

By (H.1), one is considering the possibility that the total number of detectable steps N* be a non-integer value; which means the institution could finish at an "extra time" $q=N^*-[N^*]$, $0\leqq q\leqq 1$, that it is completed in less than $\pi^{-2}$ market transactions. In the case that $q\neq 0$, the expected price at N* will be:

$$\tilde{S}_{N^*}=S_{[N^*]}+\mu\pi_{N^*}{}^{\beta}\xi_{N^*}{}^{\alpha-1}, \tag{5b}$$

Or expanding as in (6a), $$\tilde{S}_{N^*} = S_0 + \mu\left\{\pi_{N^*}^{\beta}\xi_{N^*}^{\alpha-1} + \sum_{i=1}^{[N^*]}\pi_i^{\beta-1}\left(\sum_{j=1}^{i}\pi_j^{-1}\right)^{\alpha-2}\right\}, \tag{6c}$$

where $\xi_{N^*}$ is the total number of transactions traded until the last detectable interval N* and it is by definition:

$$\xi_{N^*} \stackrel{def}{=} \left(\sum_{i=1}^{[N^*]}\frac{1}{\pi_i} + q\pi_{N^*}^{-1}\right). \tag{7}$$

Furthermore, the expected total cost of the trade (over G) is $$E(\vec{\pi}, N^*) \stackrel{def}{=} n\xi_{N^*}S_0 - \sum_{i=1}^{[N^*]}n_i\tilde{S}_i - qn\pi_{N^*}^{-1}\tilde{S}_{N^*}, \tag{8}$$

where $n_i=n\pi_i^{-1}$ is the number of shares traded in the i-segment and n is the number of traded shares in each institutional transaction with n>0 for a sell and n<0 for a buy.

In addition, one may suppose that there exists $N\in\mathbb{N}$, $N\leqq N^*$, such that from N+1 to N* the institution participates with a constant rate $\pi_f$. Therefore, the variables $(\vec{\pi}, N^*)$ may be reduced to $(\{\pi_i\}_{i=1}^{N}, \pi_f, N^*)$.

After a routine calculation, using equations (6), the expected total cost turns out to be:

$$E(\vec{\pi}, N^*) = |\mu n|\xi_{N^*}\left\{\sum_{k=1}^{[N^*]}\pi_k^{\beta-1}\left(\sum_{i=1}^{k}\pi_i^{-1}\right)^{\alpha-2} + q\pi_f^{\beta-1}\left(\sum_{i=1}^{[N^*]}\pi_i^{-1} + q\pi_f^{-1}\right)^{\alpha-2}\right\}. \tag{9}$$

Note that $E(\vec{\pi}, N^*)>0$ always, for either a buy or a sell.

Additionally, as in (Almgren and Chriss, 2000), one may evaluate the variance of the cost $$V(\vec{\pi}, N^*) \stackrel{def}{=} \left\langle\left(E(\vec{\pi}, N^*) - \left\langle E(\vec{\pi}, N^*)\right\rangle_G\right)^2\right\rangle_G.$$

For that, one may sum the term representing the volatility of the asset $$\sigma\sum_{i=1}^{k}\pi_i^{-1}\varsigma_i, \tag{10}$$

to the equations (6). The $\zeta_{i+1}$ are random variables with zero Gaussian mean and unit variance and σ is a constant with units $$[\sigma] = \frac{\$}{\text{share}\times\sqrt{\text{transaction}}}.$$

Therefore, the variance of $E(\vec{\pi}, N^*)$ takes the form $$V(\vec{\pi}, N^*) = \sigma^2 n^2\sum_{k=1}^{[N^*]}\pi_k^{-2}\left(\xi_{N^*} - \sum_{j=1}^{k}\pi_j^{-1}\right)^2. \tag{11}$$

One may next write the risk-adjusted cost function:

$$U(\vec{\pi}, N^*; \lambda, \mu, n, \sigma, \alpha, \beta, N) \stackrel{def}{=} E(\vec{\pi}, N^*) + \lambda V(\vec{\pi}, N^*), \tag{12}$$

where λ is the risk parameter with units $[\lambda]=\$^{-1}$.

Applying the previous expressions, one obtains:

$$U(\{\pi_i\}_{i=1}^{N}, \pi_f, N^*; \lambda, \mu, n, \sigma, \alpha, \beta, N) == |\mu n|\xi_{N^*}\left\{\sum_{k=1}^{[N^*]}\pi_k^{\beta-1}\left(\sum_{i=1}^{k}\pi_i^{-1}\right)^{\alpha-2} + q\pi_f^{\beta-1}\left(\sum_{i=1}^{[N^*]}\pi_i^{-1} + q\pi_f^{-1}\right)^{\alpha-2}\right\} + \lambda\sigma^2 n^2\sum_{k=1}^{[N^*]}\pi_k^{-2}\left(\xi_{N^*} - \sum_{j=1}^{k}\pi_j^{-1}\right)^2. \tag{13}$$

One may set the constraints on the total number of institutional transactions $$X = \xi_{N^*} \stackrel{def}{=} \left\{\sum_{j=1}^{N}\pi_j^{-1} + (N^* - N)\pi_f^{-1}\right\}, \tag{14}$$

and a maximum for the trading time $t_{N^*}$:

$$T_M \geq t_{N^*} \overset{def}{=} \sum_{i=1}^{N} \pi_i^{-2} + (N^* - N)\pi_f^{-2}. \quad (15)$$

2.1 The Optimal Trajectory for λ=0

First, one may optimize the cost without risk, equation (9) together with the constraints (14) and (15).

Results:

Let N=10, X=100transactions, and $T_M$=1000transactions. One may define the dimensionless cost $$\frac{E}{|\mu n|},$$

which allows an independent solution on the selection of the parameters n and μ.

The optimal solution for 100 traded lots is:

$$\frac{E(\text{minimum})}{|n\mu|} = 755.742,$$

$$\{\pi_1^{-1} = 18.53, \pi_2^{-1} = 11.62, \pi_3^{-1} = 9.64, \pi_4^{-1} = 8.61,$$
$$\pi_5^{-1} == 7.94, \pi_6^{-1} = 7.45, \pi_7^{-1} = 7.08, \pi_8^{-1} = 6.78,$$
$$\pi_9^{-1} == 6.53, \pi_{10}^{-1} = 6.32, \pi_f^{-1} = 6.03, N^* = 11.57\}.$$

It satisfies the constraints $\xi_{N^*}$=100, $t_{N^*}$=1000, the rate in the additional step 11 and in the fractional step q=0.57 is $\pi_f^{-1}$=6.03.

This result shows that, in absence of risk aversion, it is optimal to start the trade more slowly to minimize information leakage early in the trade.

What follows shows an optimal trajectory for the cost function, $$g = \frac{E}{|n\mu|},$$

two variables ($\pi_1^{-1}$, $\pi_2^{-1}$), eight intervals traded with constant rate $\pi_f^{-1}$ and a fraction q of a unitary interval traded with the same constant rate $\pi_f^{-1}$. One may choose $$N^* = 10 + q, X = 100 = \sum_{i=1}^{2} \pi_i^{-1} + (N^* - 2)\pi_f^{-1} \text{ and } t_{N^*} = 1000 = \sum_{i=1}^{2} \pi_i^{-2} + (N^* - 2)\pi_f^{-2}.$$

The example was done with the purpose of showing a graph for the cost in 3D, and to understand the cost function for a number of variables >2. The constraints determine $$q = -8 + \frac{(100 - \pi_1^{-1} - \pi_2^{-1})^2}{1000 - \pi_1^{-2} - \pi_2^{-2}} \text{ and } \pi_f = \frac{100 - \pi_1^{-1} - \pi_2^{-1}}{1000 - \pi_1^{-2} - \pi_2^{-2}}.$$

The optimization gives:

{g(minimum)=758.642,{$\pi_1^{1}$=17.5318,$\pi_2^{-1}$=11.6056}}

Figure 15:
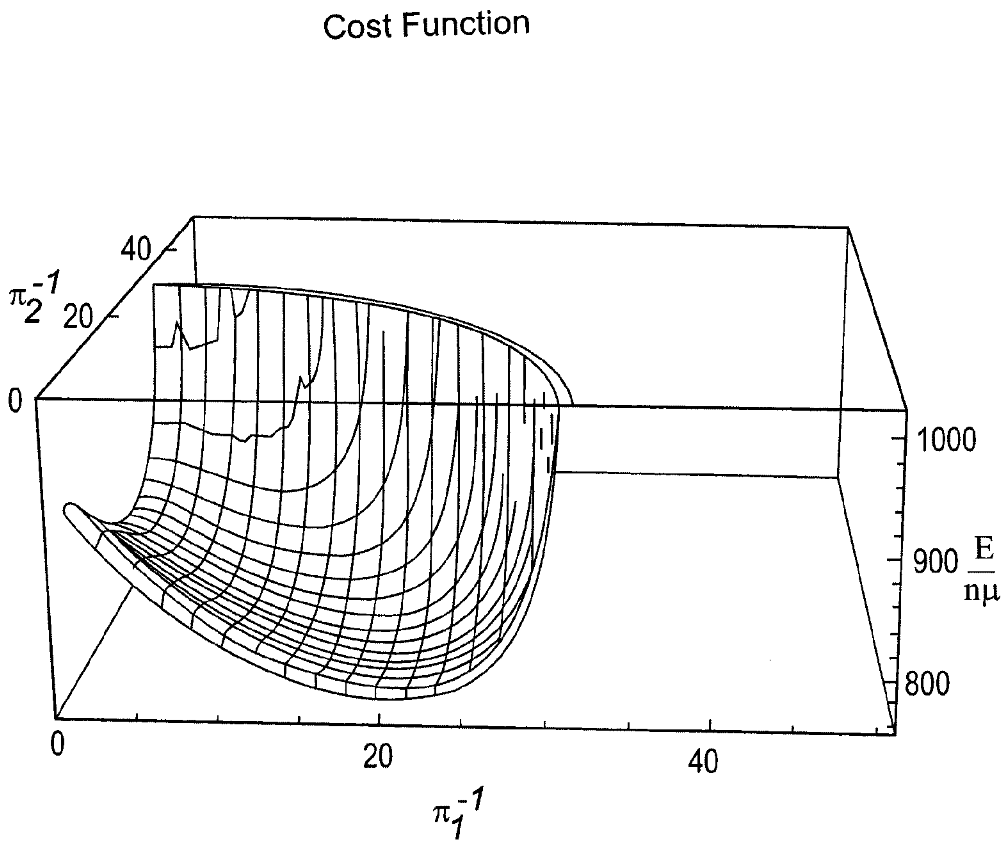
FIG. 15 depicts a graphic representation of cost.

A graphic representation of the cost for the whole domain is given in FIG. 15, which depicts a three-dimensional representation of the dimensionless-cost function $$\frac{E}{|n\mu|},$$

with two variables. The minimum is the point $$\left\{\pi_1^{-1} = 17.5318, \pi_2^{-1} = 11.6056, \frac{E}{|n\mu|} = 758.642\right\}.$$

The quarter of the circumference shows the divergence of the cost at $1000-\pi_1^{2}\pi_2^{-2}=0$.

Figure 16:
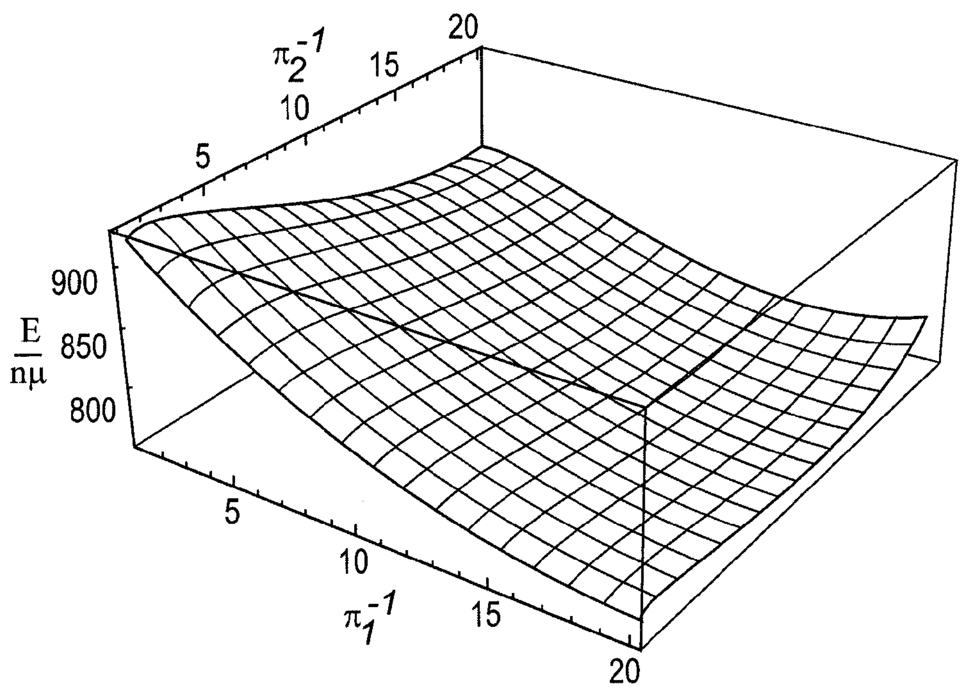
FIG. 16 depicts a closer view.

A closer view around the minimum is shown in FIG. 16.

FIG. 16 depicts a dimensionless-cost function around the optimal point {$\pi_1^{-1}$=17.5318,π2−1=11.6056,En,μ=758,642, following FIG. 15.

The solution satisfies $\xi_{N^*}$=100, $t_{N^*}$=1000, q=1. The participation rate after step 2 is $\pi_f^{-1}$=7.87. This solution is more expensive that the one with N=10, which shows that the observable N*=11.57 minimizes the cost for the selected constraints.

2.2 Risk Adjusted Optimization

Above is provided an analysis of hidden order arbitrage methods for variable speed of trading with zero risk aversion (λ=0). The description below concentrates on finding optimal trading trajectories for a model with varying participation rate and arbitrary risk aversion. That means to minimize the total risk-adjusted cost function (13):

$$\frac{U(\vec{\pi}, N^*; L)}{|\mu n|} = X\left\{\sum_{k=1}^{[N^*]} \pi_k^{-0.7}\left(\sum_{i=1}^{k} \pi_i^{-1}\right)^{-0.5} + q\pi_f^{-0.7}\left(\sum_{i=1}^{[N^*]} \pi_i^{-1} + q\pi_f^{-1}\right)^{-0.5}\right\} + L\sum_{k=1}^{[N^*]} \pi_k^{-2}\left(X - \sum_{j=1}^{k} \pi_j^{-1}\right)^2, \quad (16)$$

with the constraints (14) and (15).

The results are summarized in Table 1 for X=100 lots, $T_M$=1000 transactions, α=1.5, β=0.3, for the different values of the risk constant $L=\lambda\sigma^2|n/\mu|$.

| L | E/\|μn\| | $\frac{E}{\|\mu n\|X}$ | $\frac{\lambda}{\|\mu n\|}V$ | $\frac{U}{\|\mu n\|}$ | $\frac{U}{\|\mu n\|X}$ | N* | $t_N$* |
|---|---|---|---|---|---|---|---|
| 3 × $10^{-4}$ | 925.65 | 9.26 | 527.63 | 1453.29 | 14.53 | 13.14 | 1000 |
| 1 × $10^{-4}$ | 827.97 | 8.28 | 240.12 | 1068.09 | 10.68 | 10.99 | 1000 |
| 0 | 755.74 | 7.56 | 0 | 755.742 | 7.56 | 11.57 | 1000 |

Table 1. Optimal Risk Adjusted Cost. Results are for X=100 lots, $T_M$=1000 transactions, α=1.5,β=0.3, for the different values of the risk constant $L=\lambda\sigma^2|n/\mu|$. Second column is total cost, third column is cost per lot or transaction, the fourth one gives the total risk, the fifth is the total risk-adjusted cost, the sixth is per lot or transaction. N* is the total number of detectable intervals realized by the hidden order. The last column indicates that the number of market transactions reaches the maximum limit $T_M$. All values are dimensionless.

Figure 17:
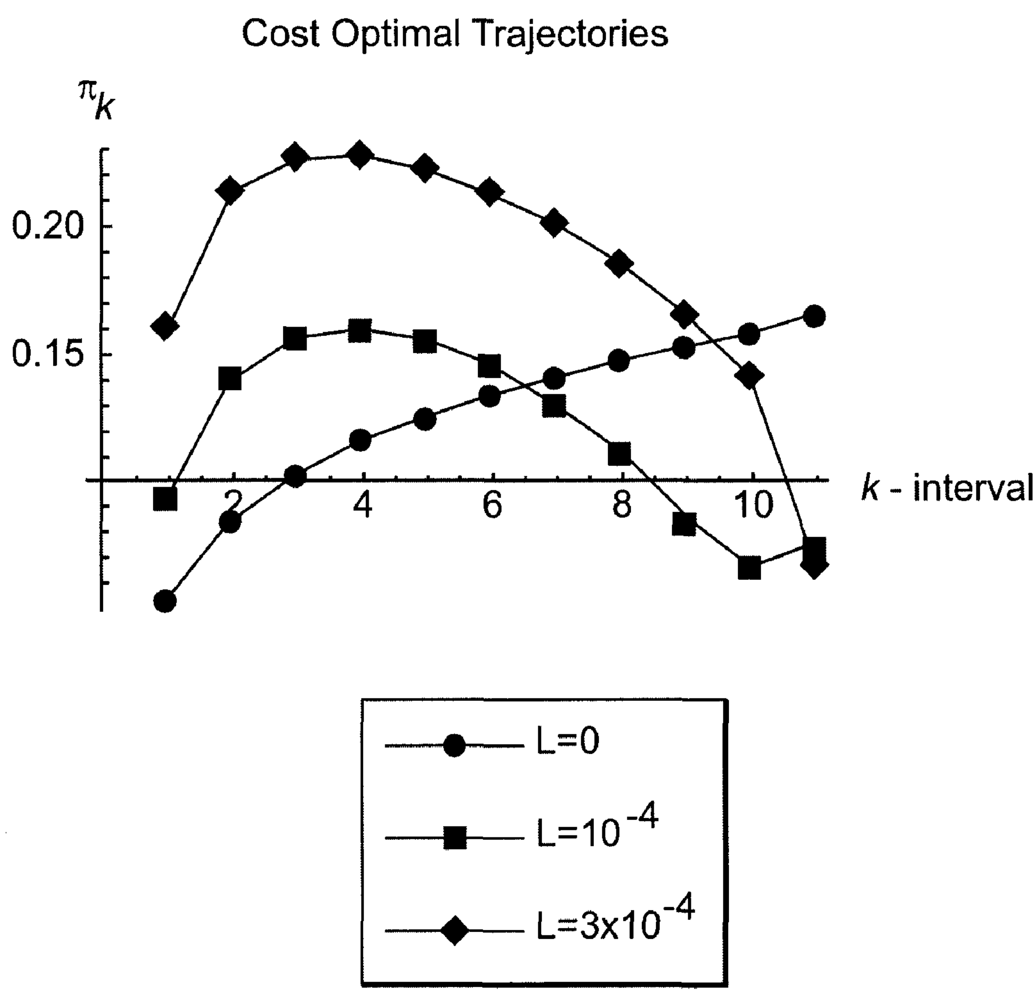
FIG. 17 depicts optimal trajectories representing the participation rate in function of the number of the detectable interval for different values of the risk constant.

FIG. 17 depicts a graph of the participation rate $\pi_k$ versus the detectable step k, in a continuum approximation, for the different values of the risk constant $L=\lambda\sigma^2|n/\mu|$. FIG. 17: Optimal trajectories representing the participation rate in function of the number of the detectable interval for different values of the risk constant.

Figure 18:
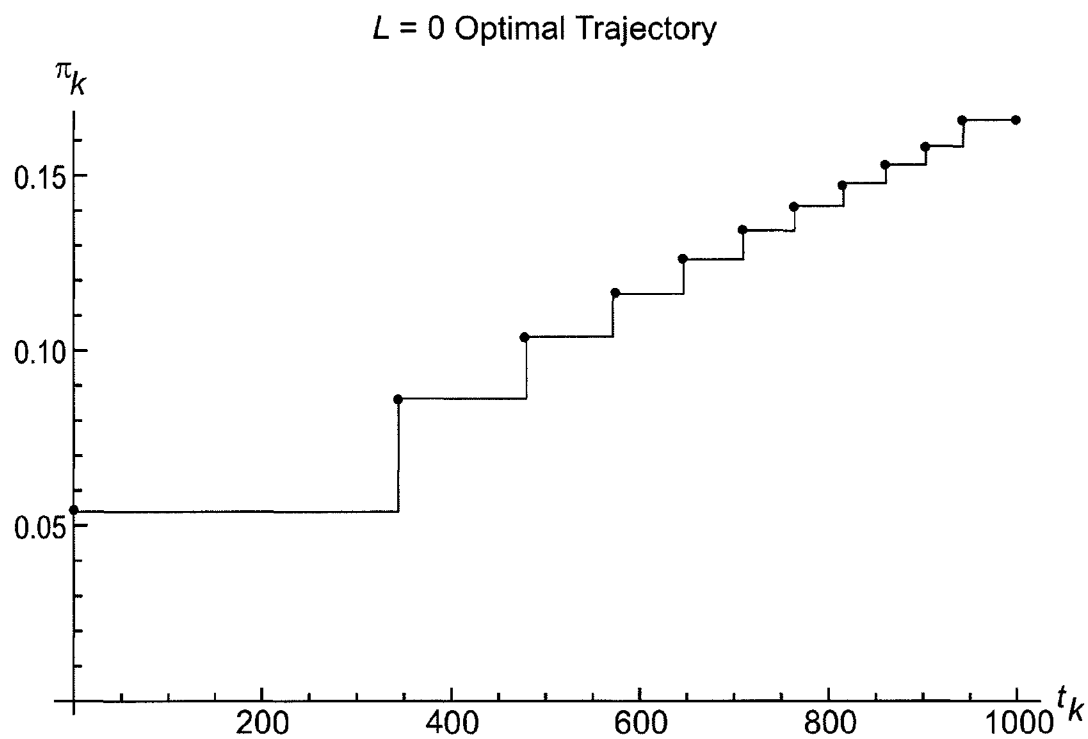
FIG. 18 depicts participation rate in function of the transactional time $$t_k = \sum_{i=1}^{k} \pi_i^{-2},$$

Because in each step the participation rate may be constant, a detailed graph is presented of the participation rate versus the transactional time, $$t_k=\sum_{i=1}^{k}\pi_i^{-2},$$

corresponding to each k-interval, for each L:

FIG. 18. Participation rate in function of the transactional time, $$t_k=\sum_{i=1}^{k}\pi_i^{-2},$$

corresponding to each k-interval, considering zero risk aversion.

FIG. 19. Participation rate in function of the transactional time, $$t_k=\sum_{i=1}^{k}\pi_i^{-2},$$

corresponding to each k-interval, considering risk aversion $L=1\times10^{-4}$.

FIG. 20. Participation rate in function of the transactional time, $$t_k=\sum_{i=1}^{k}\pi_i^{-2},$$

corresponding to each k-interval, considering risk aversion $L=3\times10^{-4}$.

FIG. 21 depicts a comparative graph for the different values of the risk aversion in the quadratic approximation or continuum: FIG. 21 depicts a comparative graph of optimal trajectories in function of the transactional time for the different values of the risk aversion in the quadratic approximation or continuum.

3. Optimizing Performance to the VWAP Benchmark

The section above described optimizing a sum of expected implementation shortfall and its variance. This was called a risk-adjusted cost function and optimal trading trajectories were found.

The implementation shortfall in this context is the difference between the initial book value of the shares, $XS_0$, and the capture of the trajectory $$\sum_{i=1}^{N^*}n_i\tilde{S}_i.$$

Nevertheless, traders may have other objectives or benchmarks rather than $XS_0$. These include:

1) Post reversion price or closing price. This is useful to measure the effect of an entry trade on assets under management marked to market after the trade is done and post-trade reversion is complete.

2) Volume-weighted average price during the transactional period or VWAP. This is the average price transacted by the market, which is useful to evaluate exit trades that are not too large relative to the ADV because it is less exposed to market effects than implementation shortfall.

The reversion price is equal to the average realized price by (H.4); hence, one may not regard this benchmark as being useful for the purpose of the schedule optimization. Therefore, one may analyze the difference Δ between VWAP and the capture. For a buy:

$$\Delta(\text{buy}):=-\text{VWAP}+\text{capture}\overset{def}{=}\overset{def}{=}-\frac{1}{t_{N^*}}\sum_{i=1}^{N^*}\tau_i\tilde{S}_i+\frac{1}{\xi_{N^*}}\sum_{i=1}^{N^*}\pi_i^{-1}\tilde{S}_i. \tag{17a}$$

Here, $t_{N^*}$ is the institutional trade duration and $\xi_{N^*}$ is the total number of institutional orders executed in that period. $\{\pi_i\}^*_{i=1}{}^N$ is the set of participation rates from the first to the last detectable segment and $\tau_i=\pi_i^{-2}$ is the minimum expected transactional market period for the detection of the $i^{th}$ segment. $\pi_i^{-1}$ is the expected value of the number of the institutional transactions executed in the i-detectable segment, and $\tilde{S}_i$ is the price per share paid by the institution in the i-segment. For a sell, $$\Delta(\text{sell}):=\text{VWAP}-\text{capture}. \tag{17b}$$

Following the equations (6), and including the arithmetic Brownian noise, one has:

$$\Delta(\text{buy/sell},\{\pi_i\}_{i=1}^{N^*})=(-/+)\frac{\mu}{t_{N^*}}\left\{\sum_{k=1}^{[N^*]}\pi_k^{\beta-1}\xi_k^{\alpha-2}(\pi_k^{-1}\xi_k-t_k)+q\pi_f^{\beta-1}\xi_{N^*}^{\alpha-2}(\pi_f^{-1}\xi_{N^*}-t_{N^*})\right\}+(-/+)\sigma\sum_{k=1}^{[N^*]}\pi_k^{-1}\varsigma_k\left(\frac{\xi_k}{\xi_{N^*}}-\frac{t_k}{t_{N^*}}\right), \tag{18a}$$

where $$\xi_k\overset{def}{=}\sum_{i=1}^{k}\pi_i^{-1}, \tag{18b}$$

$$t_k\overset{def}{=}\sum_{j=1}^{k}\tau_j=\sum_{j=1}^{k}\pi_j^{-2}, \tag{18c}$$

μ, α, β, σ are constant parameters and $\zeta_i$ are random variables with zero Gaussian mean and unit variance.

Taking μ(sell)=−μ(buy) and the Gaussian mean, equation (18a) is:

$$\Delta(\text{buy or sell}, \{\pi_i\}_{i=1}^{N^*}) = -\frac{|\mu|}{t_{N^*}}\left\{\sum_{k=1}^{[N^*]} \pi_k^{\beta-1}\xi_k^{\alpha-2}(\pi_k^{-1}\xi_k - t_k) + q\pi_f^{\beta-1}\xi_{N^*}^{\alpha-2}(\pi_f^{-1}\xi_{N^*} - t_{N^*})\right\}. \tag{19}$$

Next, one may minimize (19) using Mathematica7 constrained with $$X=\mu_{N^*}=100, t_{N^*}\leqq T_M=1000.$$

The optimal solution is:

$$\Delta(\text{buy or sell,minimum})/|\mu|=-0.666758,$$

with the optimal trajectory:

$$\pi_1^{-1}=9.48, \pi_2^{-1}=7.23, \pi_3^{-1}=6.78, \pi_4^{-1}=6.42, \pi_5^{-1}=6.61, \pi_6^{-1}=6.90, \pi_7^{-1}=7.63, \pi_8^{-1}=9.38, \pi_9^{-1}=11.40, \pi_{10}^{-1}=14.99, \pi_f^{-1}=13.54, N^*=10.97, \kappa_N^*=100, t_N^*=1000.$$

The negative value indicates that the institution buys below the market or sells above the market, and the gain (absolute value) is maximal for the optimal trajectory.

The cost for the solution, which optimizes the VWAP, is $$\frac{E}{|n\mu|} = 837.36.$$

bigger than the optimal cost $$\frac{E}{|n\mu|}(\text{minimum}) = 755.74,$$

for X=100, $t_{N^*}$=1000, L=0, found in section 2.1. Thus, it is possible to beat the VWAP benchmark with that trajectory but at the expense of a higher shortfall[3].

[3]For buys, the increased implementation shortfall is associated with a higher reversion price due to the breakeven condition, so the economic value of shortfall reduction may seem less evident at first glance. However, the dependence of a security price on the execution of a trade will decay over the investment horizon, so the shortfall will ultimately be a net negative contribution to the portfolio value for buys as well as for sells.

Conversely, the value for the VWAP benchmark using the optimal trajectory, which minimizes the shortfall, is:

$$\frac{\Delta(\text{buy or sell, optimal } f \text{ or } L = 0)}{|\mu|} = 3.21403.$$

The positive value means that the institution reduces the shortfall to the minimum at expenses of selling below or buying above the market average price.

FIG. 22 depicts a graph of participation rate versus transactional time for a VWAP-optimal solution: FIG. 22 depicts participation rate in function of the transactional time, $$t_k = \sum_{i=1}^{k} \pi_i^{-2},$$

corresponding to each k-interval. This is the VWAP benchmark optimal trajectory.

4. Discussion

The preceding sections of this portion of the description generalized hidden order arbitrage models and methods to non-flat execution schedules. Hidden order arbitrage methods tie the concavity of the impact function to the predictability of the order flow. As explained by Hasbrouck (Hasbrouck, J. 1991), only the unpredictable component of the order flow can cause incremental market impact. The predictable component is preemptively incorporated into the security price in the form of temporary impact. The methods described herein use this principle to estimate temporary impact: a simplifying assumption may be introduced to the effect that the predictable component of the order flow can be approximated knowing only the current trading velocity and the total number of shares accumulated so far in the trade. When the trade ends, expectations of further order flow subside and price reverts to a level that incorporates only permanent impact.

In contrast, in Kyle's classic paper (Kyle, A. 1985), the informed trader is assumed to know precisely the final price and only buys if price is lower, so there is no reversion. When the market maker sets the price to the expected informed price, since informed traders buy below the informed price and sell above it, the order flow expectations in the next step are evenly balanced. Kyle shows that in this context, where order flow is unpredictable, the participation rate optimal trajectory is constant in time and the impact function is linear in the rate of trading. There is ample evidence that, unlike the informed trades described by Kyle, algorithmic execution of hidden orders leads to a predictable order flow, and there is ample evidence for the concavity of the impact function (Bouchaud et al, 2008). Yet prior to the present invention, there had not been an optimal execution derivation that accounts for these observations.

The above description provides solutions that minimize the risk-adjusted cost for various levels of risk aversion or the performance relative to a VWAP benchmark. The optimal schedules for risk-adjusted cost are strikingly different from the classic Almgren-Chriss solutions. In particular, this description shows that it is optimal to start trades slowly. The VWAP optimal solution is more reminiscent of the A-C solution. However, it beats the VWAP in part by creating impact early in the trade, resulting in a higher price throughout the trade and a higher shortfall. The near VWAP optimality of the A-C solution may help to explain why it is so frequently used by trading desks in spite of its higher average cost. The following description considers the frustration between various optimization objectives using a concrete example.

4.1 Example and Comparisons

Below is considered a mid-cap trade of |Xn|=25000 shares, |n|=250 shares per transaction, in a $S_0$=$50 security, executed at an average participation rate of 10%(π=0.1). If the security's trading volume is $$\frac{400 \text{ transactions}}{\text{hr}},$$

detectable interval will represent 15 minutes of trading. The impact for a 15-minute interval is estimated to be 10 bps for this security. From formula (6b), with β=0.3, α=1.5, one finds that a 10 bps impact for the first interval correspond to $|\tilde{S}_1-S_0|=10^{-3}\times\$50=|\mu|\times 0.1^{-0.2}$, i.e. |μ|=0.0315 $/share. If one take san annual volatility of 30%, $$\sigma = \frac{0.95\left(\frac{\$}{\text{share}}\right)}{\sqrt{\text{day}}}.$$

In this case, one may work with transactions units as measure of time and $$\tau = \frac{1}{\pi^2} = 100$$

is the average number of the market transactions in each detectable interval. If one day consists of 6 hours and 30 minutes and each detectable interval lasts 15 minutes then, 1 day=2600 market transactions. Therefore, $$\sigma = \frac{0.019\frac{\$}{\text{share}}}{\sqrt{\text{transaction}}}.$$

The shortfall and the VWAP benchmark of risk-adjusted cost optimal solutions are listed in Table 2 for this example and different risk aversion parameters.

| L | Risk parameter $\lambda$ ($\$^{-1}$) | Shortfall per share $\left(\frac{\$}{\text{share}}\right)$ | Shortfall E (\$) | Variance $\sqrt{V}$ (\$) | ($\Delta$(buy or sell)) $\left(\frac{\$}{\text{share}}\right)$ |
|---|---|---|---|---|---|
| $1 \times 10^{-4}$ | $3.49 \times 10^{-5}$ | 0.2608 | 6520.5 | 7360.83 | −0.0173 |
| 0 | 0 | 0.2381 | 5953.5 | 9192.27 | 0.1012 |
| $3 \times 10^{-4}$ | $1.05 \times 10^{-4}$ | 0.2917 | 7292.25 | 6290.65 | 0.2418 |

Table 2. Shortfall and VWAP benchmark of Cost Optimal solutions. Consider a mid-cap trade of 25000 shares, in a $S_0$=\$50 security, executed at an average participation rate of 10% ($\pi$=0.1). If the security's trading volume is $$\frac{400 \text{ transactions}}{\text{hr}},$$

detectable interval will represent 15 minutes of trading. The impact for a 15-minute interval is estimated to be 10 bps for this security, i.e. $|\mu|$=0.0315 \$/share. One may take an annual volatility of 30% or $$\sigma = \frac{0.95\left(\frac{\$}{\text{share}}\right)}{\sqrt{\text{day}}}.$$

One day consists of 6 hours and 30 minutes or 2600 market transactions. The last column is the VWAP benchmark calculated with the risk adjusted cost optimal solution.

Exemplary result: Shortfall minimization in absence of alpha requires back-loading, which increases execution risk. Optimal solutions for risk-averse traders are less front-loaded than suggested by AC2000 and avoid an aggressive trade start. FIG. 23 depicts a graph of the optimal risk averse trajectories for the information arbitrage theory with L=$10^{-4}$ in comparison to the Almgren-Chriss formulation (AC2000). For a buy, $$\pi_j^{A-C} = \frac{\sinh(\kappa T)}{2 \times \sinh\left(\frac{\kappa T}{2}\right)\cosh\left(\kappa\left(j - \frac{1}{2}\right)\tau\right)},$$

X=100,T=165 minutes=0.423 day, $$\kappa \sim \frac{3.83}{\text{day}},$$

$\tau$=15 minutes=0.0384 day.

The shortfall calculated with the optimal Almgren-Chriss trajectory for a risk averse constant $$\lambda(\text{Almgren} - \text{Chriss}) = \frac{10^{-5}}{\$}$$

is $E(\{\pi_j^{A-C}\}_{j=1}^{11})$=6879.05\$. This is costlier than the shortfall E(optimal)=6520.5\$ for $$\lambda = 3.49 \times \frac{10^{-5}}{\$}.$$

FIG. 23. Comparative graph of the cost optimal trajectories in function of the transactional time. The dotted line is the solution predicted by Almgren-Chriss formulation with linear impact and risk averse constant $$\lambda(\text{Almgren} - \text{Chriss}) = \frac{10^{-5}}{\$}.$$

The square line is the optimal trajectory for the non-linear information arbitrage theory, as shown in FIG. 19, for risk averse constant L=$10^{-4}$ or $$L = 10^{-4} \text{ or } \lambda = 3.49 \times \frac{10^{-5}}{\$}.$$

Additionally, one obtains a VWAP optimal value in the first column of Table 3, and the shortfall and its variance per share corresponding to the VWAP optimal trajectory in the second and third columns, respectively.

| ($\Delta$(buy or sell, optimal)) $\left(\frac{\$}{\text{share}}\right)$ | Shortfall per share $\left(\frac{\$}{\text{share}}\right)$ | Variance per share $\left(\frac{\$}{\text{share}}\right)$ |
|---|---|---|
| −0.0210 | 0.2638 | 0.2893<br>7233.84\$ for the total |

Table 3. Comparison of optimal VWAP and shortfall. VWAP optimal value is given in the first column, and the shortfall and its variance per share corresponding to the VWAP optimal trajectory in the second and third columns, respectively.

Comparing Tables 2 and 3, VWAP optimization increases shortfall if no risk or low risk aversion is taken into account. However, if high risk aversion applies, then VWAP optimization may be appropriate. On the other hand, to minimize implementation shortfall it is necessary to buy above or sell below the VWAP, when no risk or high risk aversion is considered. This is known in the art of multi-criteria optimization as frustration: one optimizes to one objective at the expense of the other. However, in this case only the implementation shortfall benchmark is relevant to the performance of the portfolio—so the existence of frustration simply implies that funds that create incentives for traders to perform well relative to a VWAP benchmark are in fact promoting trading behaviors that are harmful to the fund returns.

In conclusion, because the shortfalls per share are approximately the same for both optimizations, and the variance estimated with the VWAP benchmark optimal trajectory is lower, VWAP optimization is better at low risk aversion. It also provides lower shortfall and better VWAP performance than the high risk aversion solution; however, the variance of the shortfall is higher by 17% originating uncertainty.

What are the right incentives for a trading desk? The implementation shortfall is the measure of the effect of trade execution on assets under management. Other benchmarks can be used to promote trade behaviors that are more likely to result in lower shortfalls on a particular type of trade. Using the closing price for trades that have negative underlying alpha incentivizes back-loading, and will lead to lower average shortfall for exit trades. For entry trades, using the risk adjusted cost will encourage traders to reduce variance by front-loading and reduce average shortfall. For zero alpha trades VWAP benchmark provides the incentive for trades to pick favorable price points throughout the day. However, for large trades, the VWAP benchmark results in front-loaded executions schedules that increase implementation cost.

4.2 Comments about Price Efficiency

This section shows that the density probability function, $p(\pi_i, i \leqq [N^*]/\pi_1, \pi_2, \ldots, \pi_{i-1})$, is determined by hypotheses 1 to 5 through a functional form. Reciprocally, it will be shown that given the formulae (5-6a) for Price Impact, in which (H.4) for breakeven is included, a specific probability functional form will satisfy Price Efficiency.

Proposition:

Price efficiency is satisfied $$\Leftrightarrow \exists f = f\left(\pi_i, (\pi_j\}_{j=1}^{i-1}\right) \text{ such that}$$

$$f\left(\pi_i\{\pi_j\}_{j=1}^{i-1}\right)\Big|_{\pi_i=0}^{1} = 1 \wedge \frac{\left(\pi_{i-1}^{\beta}\xi_{i-1}^{\alpha-1} - \pi_{i-1}^{\beta-1}\xi_{i-1}^{\alpha-2}\right)}{\left(\pi_i^{\beta}\xi_i^{\alpha-1}\right)}\frac{\partial f(\pi_i)}{\partial \pi_i} = p(\pi_i, i \leq [N^*]/\pi_1, \pi_2, \ldots, \pi_{i-1}),$$

$$\forall\, i > 2; \pi_j \neq 0, 1 \leq j \leq i, \text{ and}$$

$$p(\pi_i = 0, i \leq [N^*]/\pi_1, \pi_2, \ldots, \pi_{i-1}) = 0, \forall\, i.$$

Proof:

Hypothesis of Price Efficiency (H.3) says:

$$\int_0^1 p(\pi_i, i \leq [N^*]/\pi_1, \pi_2, \ldots, \pi_{i-1})\left(\tilde{S}_i - \tilde{S}_{i-1}\right)d\pi_i + p(i-1 = [N^*]/\pi_1, \pi_2, \ldots, \pi_{i-1})\left(S_{i-1} - \tilde{S}_{i-1}\right) = 0, i \geq 2, \tag{H.3}$$

Using $$p(i-1 = [N^*]/\pi_1, \pi_2, \ldots, \pi_{i-1}) = 1 - \int_0^1 p(\pi_i, i \leq [N^*]/\pi_1, \pi_2, \ldots, \pi_{i-1})\,d\pi_i \text{ in } (H.3),$$

one may write:

$$\Leftrightarrow \left(S_{i-1} - \tilde{S}_{i-1}\right) + \int_0^1 p(\pi_i, i \leq [N^*]/\pi_1, \pi_2, \ldots, \pi_{i-1})\left(\tilde{S}_i - S_{i-1}\right)d\pi_i = 0, i \geq 2. \tag{A}$$

Using equations (5a) and (6a), one finds:

$$S_{i-1} - \tilde{S}_{i-1} = -\mu(\pi_{i-1}{}^{\beta}\xi_{i-1}{}^{\alpha-1} - \pi_{i-1}{}^{\beta-1}\xi_{i-1}{}^{\alpha-2}), i \geqq 2, \tag{B}$$

Introducing (B) and (5a) in (A), $$\Leftrightarrow \left(\pi_{i-1}^{\beta}\xi_{i-1}^{\alpha-1} - \pi_{i-1}^{\beta-1}\xi_{i-1}^{\alpha-2}\right) == \int_0^1 p(\pi_i, i \leq [N^*]/\pi_1, \pi_2, \ldots, \pi_{i-1})\pi_i^{\beta}\xi_i^{\alpha-1}\,d\pi_i, i \geq 2. \tag{C}$$

$$\Leftrightarrow \exists f = f\left(\pi_i\{\pi_j\}_{j=1}^{i-1}\right)\Big|\pi_{i-1}^{\beta}\xi_{i-1}^{\alpha-1} - \pi_{i-1}^{\beta-1}\xi_{i-1}^{\alpha-2}\Big)\left[f\left(\pi_i, \{\pi_j\}_{j=1}^{i-1}\right) - f\left(0, \{\pi_j\}_{j=1}^{i-1}\right)\right] == \int_0^{\pi_i} p(\pi_i, i \leq [N^*]/\pi_1, \pi_2, \ldots, \pi_{i-1})\pi_i^{\beta}\xi_i^{\alpha-1}\,d\pi_i, \wedge f\left(\pi_i, \{\pi_j\}_{j=1}^{i-1}\right)\Big|_{\pi_i=0}^{1} = 1. \tag{D}$$

$$\Leftrightarrow \exists f = f\left(\pi_i, \{\pi_j\}_{j=1}^{i-1}\right)\Big|f\left(\pi_i, \{\pi_j\}_{j=1}^{i-1}\right)\Big|_{\pi_i=0}^{1} == 1 \wedge \left(\pi_{i-1}^{\beta}\xi_{i-1}^{\alpha-1} - \pi_{i-1}^{\beta-1}\xi_{i-1}^{\alpha-2}\right)\frac{\partial f(\pi_i)}{\partial \pi_i} == p(\pi_i, i \leq [N^*]/\pi_1, \pi_2, \ldots, \pi_{i-1})\left(\pi_i^{\beta}\xi_i^{\alpha-1}\right), i > 2. \tag{E}$$

Because each detectable step i means by definition that $p(\pi_i=0, i \leqq [N^*]/\pi_1, \pi_2, \ldots \pi_{i-1})=0, \forall i$; then, one may take:

$$\frac{\left(\pi_{i-1}^{\beta}\xi_{i-1}^{\alpha-1} - \pi_{i-1}^{\beta-1}\xi_{i-1}^{\alpha-2}\right)}{\left(\pi_i^{\beta}\xi_i^{\alpha-1}\right)}\frac{\partial f(\pi_i)}{\partial \pi_i} == p(\pi_i, i \leq [N^*]/\pi_1, \pi_2, \ldots, \pi_{i-1}), \forall\, i > 2; \pi_j \neq 0, 1 \leq j \leq i. \tag{F}$$

Examples:

Let $$f\left(\pi_i, \{\pi_j\}_{j=1}^{i-1}\right) = \frac{\sum_{m=1}^{n} a_m\left(\{\pi_j, \xi_j\}_{j=1}^{i-1}\right)\pi_i^{\gamma_m}}{\sum_{m|\gamma_m \neq 0}^{n} a_m}, \tag{G}$$

$$n \in \mathbb{N}, \gamma_m \in \mathbb{R}_{\geq 0} \bigwedge \sum_{m|\gamma_m \neq 0}^{n} a_m \neq 0.$$

The functions $a_m = a_m(\{\pi_j, \xi_j\}_{j=1}^{i-1})$ and coefficients $\gamma_m$ could be partially determined by $$(H.2), \int_0^1 p(\pi, i = N^*(X))d\pi \to p(i = N^*) \propto \frac{1}{i^{\alpha+1}},$$

when $\pi_j$=constant, ∀j. It can be shown that if $a_m$ are constants for all m, then $a_m$ and $\gamma_m$ are arbitrary.

If one takes $f(\pi_i) = \pi_i$ then, $$p(\pi_i, i \leq [N^*]/\pi_1, \pi_2, \ldots, \pi_{i-1}) = \frac{\left(\pi_{i-1}^{\beta}\xi_{i-1}^{\alpha-2}\xi_{i-2}\right)}{\left(\pi_i^{\beta}\xi_i^{\alpha-1}\right)}, i > 2.$$

i>2.

Also, because $$\int_0^1 p(\pi_1, 1 \leq [N^*])d\pi_1 \overset{def}{=} p(1 \leq [N^*]) = C,$$

where C is a normalization constant; then, one may choose $p(\pi_1, 1 \leqq [N^*]) = C$. Let be $p(\pi_2, 2 \leqq [N^*]/\pi_1) = \pi_2^{-\beta}\xi_2^{-\alpha+1}$. Using (H.2), $$p(\pi_1, \pi_2, \ldots, \pi_i, i \leq [N^*]) = C\frac{\pi_1^{-1}}{\pi_i^{\beta}\xi_i^{\alpha-1}\xi_{i-1}}. \tag{H}$$

For constant participation rate, (H) becomes:

$$p(\pi, i \leq [N^*]) = C\frac{\pi^{\alpha-\beta-1}}{i^{\alpha-1}(i-1)}, i > 1. \tag{I}$$

Additionally, $$p(i \leq [N^*]) = \int_0^1 p(\pi, i \leq [N^*])d\pi = \frac{C}{i^{\alpha-1}(i-1)}, i > 1.$$

$$\frac{C}{(k-1)k^{\alpha-1}} = p([N^*] \geq k) \overset{def}{=} \sum_{i=0}^{\infty} p_{k+i}, k > 1. \tag{J}$$

Subtracting $p([N^*] \geqq k+1)$ from $p([N^*] \geqq k)$, one obtains:

$$p_k = C\left[\frac{1}{(k-1)k^{\alpha-1}} - \frac{1}{k(k+1)^{\alpha-1}}\right], \quad k > 1, \tag{K}$$

Equation (K) turns out to be:

$$\frac{C}{k^{\alpha}(1-k^{-1})} - \frac{C}{k^{\alpha}(1+k^{-1})^{\alpha-1}} \xrightarrow{k \gg 1} Ck^{-\alpha}(1+k^{-1}) - Ck^{-\alpha}(1-(\alpha-1)k^{-1}) = \alpha Ck^{-(\alpha+1)},$$

which is the Pareto distribution. It can be shown that results (J), (K) are also valid for any f such as (G), with $a_m \in \mathbb{R}$ for all m.

REFERENCES

Almgren, R. and Chriss, N. (2000). Optimal Execution of Portfolio Transactions. *Journal of Risk,* 3(2):5-39.

Almgren, R. (2003). Optimal execution with nonlinear impact functions and trading-enhanced risk. *Applied Mathematical Finance,* 10, 1-18.

Almgren, R., Thum, C., Hauptmann E., Li, H. (2005). Direct Estimation of Equity Market Impact. *Risk,* 18, 57-62.

Altunata, S., Rakhlin D., Waelbroeck H. (2009). Adverse Selection vs. Opportunistic Savings in Dark Aggregators. *The Journal of Trading*. (Winter2010),5(1).

Bertismas, D., and Lo, A. (1998). Optimal control of execution costs. *Journal of Financial Markets,* 1, 1-50.

Bouchaud, J-P., Farmer, J. D., Lillo, F. (2008) How markets slowly digest changes in supply and demand. *Handbook of Financial Markets: Dynamics and Evolution,* 57-156. Eds. Thorsten Hens and Klaus Schenk-Hoppe. Elsevier: Academic Press, 2008.

Chan, L. K. C., and Lakonishok, J. (1995). The behavior of stock prices around institutional trades. *The Journal of Finance,* 50, 1147-1174.

Chan, L. K. C., and Lakonishok, J. (1993). Institutional trades and intraday stock price behavior. *Journal of Financial Economics,* 33, 173-199.

Farmer, J. D., Gerig, A., Lillo F., Waelbroeck H. (2009). Fair pricing and the market impact of large institutional trades. In preparation.

Gabaix, X., Gopikrishnan, P., Plerou, V. and Stanley, H. E. (2006). Institutional investors and stock market volatility. *Quarterly Journal of Economics,* 121, 461-504.

Gomes, C. and Waelbroeck, H. (2008). *Effect of Trading Velocity and Limit Prices on Implementation Shortfall*. Pipeline Financial Group Preprint PIPE-2008-09-003.

Gopikrishnan, P., Plerou, V., Gabaix, X., Stanley, H. E. (2000). Statistical Properties of Share Volume Traded in Financial Markets. *Physical Review E,* 62(4):R4493-R4496.

Hasbrouck, J. (1991). Measuring the information content of stock trades. *The Journal of Finance,* 46, 179-207.

Hora, M. (2006). The Practice of Optimal Execution. *Algorithmic Trading* 2, 52-60.

Kyle, A. (1985). Continuous auctions and insider trading. *Econometrica,* 53, 1315-1335.

Lillo, F., Farmer, J. D., and Mantegna, R. N. (2003). Master Curve for Price-Impact Function. *Nature,* 421, 129-130.

Loeb, T. F. (1983). Trading Cost: The critical link between investment information and results. *Financial Analysts Journal,* 39(3):39-44.

Moro, E., Moyano, L. G., Vicente, J., Gerig, A., Farmer, J. D., Vaglica, G., Lillo, F., and Mantegna, R. N. (2009). Market impact and trading protocols of hidden orders in stock markets. *Technical Report.*

Obizhaeva, A., and Wang, J. (2006). Optimal trading strategy and supply/demand dynamics. *Technical Report. AFA* 2006 *Boston Meetings Paper.*

Tone, N. (1997). *Market Impact Model Handbook.* Berkeley: Barra Inc.

Order Flow Imbalances and Short-Term Alpha

The previous section described an impact model based on a no-arbitrage argument that fairly accounts for the effect of trading speed on market impact, referred to as hidden order arbitrage theory. That section also described how this framework enables the design of optimal execution schedules, using a simulated annealing optimization method.

One of the hypotheses in that section was that order flow in the absence of the impact from the subject algorithmic trade could be modeled as an unbiased random walk. The corresponding impact-free returns in this case are flat: returns in absence of a bias in order flow are log normal with zero mean. The next two sections challenge this hypothesis by introducing two sources of bias: first, a bias in the order flow itself will cause the realized participation rate of algorithms to differ from the intended target. Second, the bias can cause mean expected returns to be non-zero, a situation known in the art as "short-term alpha." Both observations have implications for the impact model, and for the exemplary methods that enable the calculation of optimal execution profiles. The results of the derivations below may be incorporated into the exemplary impact models described above.

Order Flow Imbalances

To this point, a price method was considered such that as market participants begin to detect the volume a trader is buying (selling), the market participants adjust their offers (bids) upward (downward). This adjustment or "impact" may be modeled using a random walk theory and Information Arbitrage Theory, leading to the equation:

$$\tilde{S}_k = S_{k-1} + \mu\pi_k^{\beta}\left(\sum_{i=1}^{k}\frac{1}{\pi_i}\right)^{\alpha-1}. \tag{40b}$$

The constant $\mu>0$ for a buy and $\mu<0$ for a sell and units $$[\mu] = \frac{\$}{\text{share}}$$

In addition, due to breakeven, one may write:

$$\tilde{S}_k = S_0 + \mu\left\{\pi_k^{\beta}\left(\sum_{i=1}^{k}\pi_i^{-1}\right)^{\alpha-1} + \sum_{i=1}^{k-1}\pi_i^{\beta-1}\left(\sum_{j=1}^{i}\pi_j^{-1}\right)^{\alpha-2}\right\},\ 2\le k\le N, \tag{42a}$$

$\langle S_k \rangle$ is the Gaussian average market price per share at the k-step and $\{\tilde{S}_k\}$ is the Gaussian average cash price one pays per share. Calculating the difference $\langle \tilde{S}_{k+1}-Sk$, one obtains:

$$\langle S_k\rangle - \langle S_{k-1}\rangle = \mu\pi_k^{\beta-1}\left(\sum_{i=1}^{k}\frac{1}{\pi_i}\right)^{\alpha-2}. \tag{42c}$$

The formula above means that the random market price variable can be written as:

$$S_k = S_{k-1} + \mu\pi_k^{\beta-1}\left(\sum_{i=1}^{k}\frac{1}{\pi_i}\right)^{\alpha-2} + \sigma\pi_k^{-1}\varsigma_k, \tag{42d}$$

where the $\zeta_k$ are random variables with zero Gaussian mean and unit variance and $\pi$ is the volatility constant with units $$[\sigma] = \frac{\$}{\text{share}\times\sqrt{\text{transaction}}}.$$

Then, equation (42a) can be written for the random cash price variable as:

$$\tilde{S}_k = S_0 + \mu\left\{\pi_k^{\beta}\left(\sum_{i=1}^{k}\pi_i^{-1}\right)^{\alpha-1} + \sum_{i=1}^{k-1}\pi_i^{\beta-1}\left(\sum_{j=1}^{i}\pi_j^{-1}\right)^{\alpha-2}\right\} + \sigma\sum_{i=1}^{k-1}\pi_i^{-1}\varsigma_i,\quad 2\le k\le N. \tag{42a}$$

Therefore, the random cost variable without risk is:

$$\begin{aligned} U(\lambda=0) &= XS_0 - \sum_{i=1}^{N} n_i\tilde{S}_i \\ &= |\mu X|\sum_{k=1}^{N}\pi_k^{\beta-1}\left(\sum_{i=1}^{k}\pi_i^{-1}\right)^{\alpha-2} - \sigma n\sum_{j=2}^{N}\pi_j^{-1}\sum_{i=1}^{j-1}\pi_i^{-1}\zeta i, \end{aligned} \tag{44b}$$

with the constraints for the total number of traded shares and transaction time:

$$X = n\sum_{i=1}^{N}\pi_i^{-1}, \tag{45}$$

$$T = \sum_{i=1}^{N}\pi_i^{-2}. \tag{46}$$

One may calculate the optimal trajectory $\{\pi_k^*\}_{k=1}^{N}$ that makes minimum the Gaussian average cost $\langle U(\lambda=0)\rangle$. That trajectory may be called static since it will not be modified while trading whatever the circumstances. However, what should one do if prices go downward instead upwards during one's buying? The "Aggressive in the money" trajectories says that one should buy faster. To consider that case in the context of Information Arbitrage Theory, one may adjust the next participation rate $\pi_k$ to the noise ($\zeta_{k-1}$ of the previous step (k−1), which originated the fall in the buying price ($\zeta_{k-1}$ will be negative in this case). Therefore, one may use the static trajectory $\{\pi_j^*\}_{j=1}^{k-1}$ while the prices go upward, and change to an "adaptive trajectory" for j≧k, where the price started to go downward.

From equation (44b), taking k=2, one may optimize the cost for (N−1) variables $\{\pi_k\}_{k=2}^N$:

$$\langle U(\lambda=0,\pi_1^*,\varsigma_1)\rangle = |\mu X|\left\{\pi_1^{*\beta-\alpha+1} + \sum_{k=2}^{N} \pi_k^{\beta-1}\left(\pi_1^{*-1} + \sum_{i=2}^{k} \pi_i^{-1}\right)^{\alpha-2}\right\} - \sigma\pi_1^{*-1}\varsigma_1(X-n_1^*), \quad (44c)$$

Here, $\pi^*_1,\zeta_1$ and the number of shares traded at the first step $n^*_1=n/\pi_1^*$ are known from the last performed trade. One obtains the new optimal trajectory $\{\pi_k^{\#}\}_{k=2}^N$. One may use $\pi_1^*,\zeta_1,\pi^{\#}_2,\zeta_2$ to optimize the Gaussian mean cost for (N−2) variables $\{\pi_k\}_{k=3}^N$, etc, until all the variables are exhausted.

Below is written the average cost for the (N−1) variables $\{\pi_k\}_{k=2}^N$ and for the (N−2) variables $\{\pi_k\}_{k=3}^N$. One may use data from APA dated January 14. The total number of shares is X=176862 shares. The total number of institutional transactions is $$1198 = \sum_{i=1}^{N} \pi_i^{-1},$$

and the total number of market transactions corresponding to the institutional ones is about 5330. The average number of institutional transactions per interval is $$\frac{5330}{1198} = 4.45.$$

Then, N≈270 but to satisfy the constraints one may shorten to N=240. The constant $\mu=(\tilde{S}_{\bar{1}}-S_0)\pi^{*}{}_1^{0.2}=0.017$\$/share, where the actual data was used: $\tilde{S}_{\bar{1}}=107.28$\$/share, $S_0=107.26$\$/share an average for the nominal price of the first three best bid prices and an estimation for the speed rate for the first detectable interval of $\pi^{*}{}_i^{(-1)}=3$, which coincides with the result of the static trajectory as shown above.

The noise term is $\sigma\pi^{*}{}_1^{-1}\zeta_1=S_1-S_0-\mu\pi^{*}{}_1^{(0.2)}=-0.0729$\$/share, where one has proposed $S_1=107.21$\$/share from the best bid price data immediately after the third institutional transaction. The data reflects that, for the first detectable interval of 3 institutional transactions, the actual number of transacted shares by the institution is $n^*_1=400$ shares. One obtains:

$$\langle U(\lambda=0,\pi_1^*,\varsigma_1)\rangle = |\mu X|\left\{\pi_1^{*(-0.2)} + \sum_{k=2}^{N} \pi_k^{(-0.7)}\left(\pi_1^{*-1} + \sum_{i=2}^{k} \pi_i^{-1}\right)^{-0.5}\right\} - \sigma\pi_1^{*-1}\varsigma_1(X-n_1^*), \quad (44c)$$

One may optimize by Simulated Annealing:

```
f=0.016×176862(3^0.2+Sum[n[i]^0.7(3+Sum[n[k],{k,2,
    i}])^-0.5,{i,,2,240}])−0.0729×176462;

c={Sum[n[k],{k,2,240}]≦1195,Sum[n[k]^2,{k,2,240}]
    ≦5241};

v=Table[n[i],{i,2,240}]

NMinimize[{f,c},Table[{n[i],8,10},{i,2,240}],
    Method→"SimulatedAnnealing"]

{U=96506.3$,{n[2]=π*_2^-1=7.75746}}
```

This solution suggests that the institution should transact 7 or 8 times during the second period.

Next, one may resolve for (N−3) or third period. The noise term is $\sigma\pi^{*}{}_2^{-1}\zeta_2=S_2-S_1-\mu\pi^{*}{}_2^{(-0.7)}(\pi^{*}{}_1^{-1}+\pi^{*}{}_2^{-1})^{-0.5}=-0.061$\$/share, where one has proposed $S_2=107.16$\$/share taken from the data immediately after the tenth institutional transaction. Also, from the data, $n^*_2=1500$ shares.

$\pi^{*}{}_1^{-1}$

One may optimize by Simulate Annealing:

```
f=0.016×176862(3^0.2+7^0.7 10^-0.5+Sum[n[i]^0.7(10+
    Sum[n[k],{k,3,i}])^-0.5,{i,3,240}])−0.0729×
    176462−0.061(176862−1900);

c={Sum[n[k],{k,3,240}]≦1188,Sum[n[k]^2,{k,3,240}]
    ≦5192};

v=Table[n[i],{i,3,240}]

NMinimize[{f,c},Table[{n[i],8,10},{i,3,240}],
    Method→"SimulatedAnnealing"]

{U=86671.3$,{n[3]=π*_2^-1 2.49399}}
```

The solution suggests the institution should transact 2 or 3 times during the third period. The total cost is decreasing.

The problem with this method is that the noise does not contribute to the optimal trajectory although it does contribute to the total cost, as one can see from expressions (44c,d) The optimization does not "see" the constant terms in the expression for the cost, so the optimal trajectory is the same with or without the constant noise terms. Nevertheless, these adaptive trajectories are different from the static one. One obtains the result below for the complete problem of N variables (static trajectory):

```
f=0.016×176862(Sum[n[i]^0.7(Sum[n[k],{k,1,i}])^-0.5,
    {i,1,240}]);

c={Sum[n[k],{k,1,240}]≦1198,Sum[n[k]^2,{k,240}]
    ≦5250};

v=Table[n[i],{i,1,240}]

NMinimize[{f,c},Table[{n[i],8,10},{i,1,240}],
    Method→"SimulatedAnnealing"]

{U=109662$.,{n[1]=2.20661,n[2]=5.02312,n[3]
    =7.41884}}
```

The total cost is also bigger than the adaptive one. The total number of institutional transactions is 1003.37, the market transactions T=4678.67.

For the reason given above, one may introduce a modification to the method in order to incorporate a noise component to the participation rate. The disadvantage will be the calculation of the statistical average, because of the non-linear nature of the market impact.

One may start with the introduction of two kinds of participation rates:

a) The requested participation rate $\pi_i$: measure how many times the institution attempts to participate b) The realized participation rate $\tilde{\pi}_i$: measure how many times the institution actually participates.

Exemplary Modification to the Method

1. Hidden orders are detected every $\tau_i=1/\pi_i^2$ transactions, where $\pi_i$ is the requested participation rate.

2. Temporary impact and permanent impact depend only on the requested participation rate, not on the realized rate.

3. In each detectable interval, the number of shares filled is determined by the realized participation rate $\tilde{\pi}_l$, which is a function of market noise.

4. The utility function depends on the realized prices and realized rates $\pi_i$ as $$U = XS_0 - \sum_{k=1}^{n} \tilde{n}_k \tilde{S}_k$$

$$\tilde{n}_k = \tilde{\pi}_k^{-1}$$

5. $\pi_k^{-1} \geqq \tilde{\pi}_k^{-1}$, and $\pi_k^{-1}=\tilde{\pi}_k^{-1}$+no realized transactions Data Analysis Data from a passive algorithm reveals the relationship between realized fills and noise is sigmoidal. The vertical range (16 in this case) is a control parameter for algorithms, additional to the participation rate (often called "discretion"). Therefore, the optimal solution may lead to an optimal schedule for discretion as well as rate—or the optimization can be performed for an optimal schedule given a specified discretion value.

Figure 1:
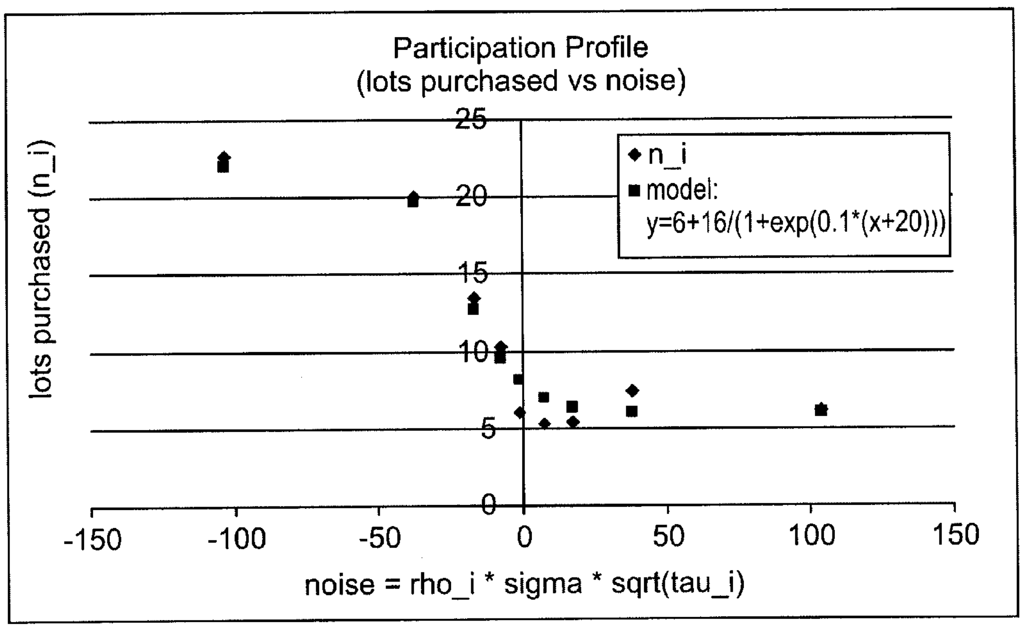
FIG. 1 depicts an exemplary participation profile.

See FIG. 1.

Next step is to calculate the total cost with all this new information and, more difficult, to calculate the average where second order terms of the noise are non-null.

One may introduce a modification to the method in order to incorporate a noise component to the participation rate. In this case, the participation rate becomes a random variable instead of a deterministic one.

One may start with the introduction of two kinds of participation rates:

a) The requested participation rate $\pi_i$: measure the fraction of one detectable interval the institution attempts to participate, b) The realized participation rate $\tilde{\pi}_l$: measure the fraction of one detectable interval the institution actually participates.

Exemplary Modification to the Method

1. Hidden orders are detected every $\tau_i=1/\pi_i^2$ market transactions where $\pi_i$ is the requested participation rate.

2. Temporary impact and permanent impact depend only on the requested participation rate, not on the realized rate, as:

$$\tilde{S}_k = s_0 + \mu\left\{\pi_k^{\beta}\left(\sum_{i=1}^{k} \pi_i^{-1}\right)^{\alpha-1} + \sum_{i=1}^{k-1} \pi_i^{\beta-1}\left(\sum_{j=1}^{i} \pi_j^{-1}\right)^{\alpha-2}\right\} + \sigma\sum_{i=1}^{N} \pi_i^{-1}\varsigma i,$$

$$1 \le k \le N,$$

3. In each detectable interval, the number of shares filled $\tilde{n}_l$ is determined by the realized participation rate $\tilde{\pi}_l$, $$\tilde{n}_i = \frac{n\tilde{\pi}_i}{\pi_i^2},$$

4. $\tilde{\pi}_l$ is a function of the market noise. Data from a passive algorithm reveals that the relationship between realized fills and noise is sigmoidal:

$$\tilde{n}_i = n\left(a + \frac{b}{1 + \mathrm{Exp}[c(x_i - x_0)]}\right)$$

With $$x_i=\zeta_i\sigma\pi_i^{-1}$$

5. The utility function depends on the realized prices $\tilde{S}_i$ and realized rates $\pi_l$ as $$U = SX_0 - \sum_{k=1}^{N} \tilde{n}_i \tilde{S}_i$$

6. One may estimate that $$\pi_k=\langle\tilde{\pi}_k\rangle$$

Therefore, the random cost variable without risk is:

$$\tilde{\pi}_l$$

with the constraints for the total number of traded shares and transaction time:

$$X \ge \sum_{i=1}^{N} \tilde{n}_i, \tag{45}$$

and $$T \ge \sum_{i=1}^{N} \pi_i^{-2}. \tag{46}$$

The statistical average for the cost results:

$$\langle U(\{\langle\tilde{\pi}_i\rangle\}_{i=1}^{N})\rangle = |\mu n|\sum_{k=1}^{N} \langle\tilde{\pi}_k\rangle^{-0.7}\left(\sum_{i=1}^{k}\langle\tilde{\pi}_i\rangle^{-1}\right)^{-0.5}\left(\sum_{i=1}^{N}\langle\tilde{\pi}_i\rangle^{-1}\right) - \sigma\sum_{j=1}^{N}\sum_{i=1}^{j}\langle\tilde{\pi}_i\rangle^{-1}\langle\tilde{n}_j\varsigma_i\rangle,$$

One may calculate the correlation:

$$\langle\tilde{n}_j\varsigma_i\rangle = n\left\{a\langle\varsigma_i\rangle + \delta_{ij}b\left\langle\frac{\varsigma_i}{1 + \mathrm{Exp}[c(x_j - x_0)]}\right\rangle\right\}$$

$$\left\langle\frac{\varsigma_i}{1 + \mathrm{Exp}[c(x_i - x_0)]}\right\rangle \stackrel{def}{=} \frac{1}{\sqrt{2\pi}}\int_{-\infty}^{\infty}\frac{\varsigma_i}{1 + \mathrm{Exp}[c(x_i - x_0)]}e^{-(\varsigma_i-\langle\varsigma_i\rangle)^2/2}d\varsigma_i = \frac{1}{\sqrt{\pi}}\int_{-\infty}^{\infty}\frac{\left(\sqrt{2}\,\upsilon + \langle\varsigma_i\rangle\right)}{1 + \mathrm{Exp}\left[c\left(\left(\sqrt{2}\,\upsilon + \langle\varsigma_i\rangle\right)\sigma\langle\tilde{\pi}_i\rangle^{-1} - x_0\right)\right]}e^{-v^2}dv$$

Using numerical integration, one obtains:

$$\left\langle \frac{\varsigma_i}{1+\mathrm{Exp}[c(x_i-x_0)]} \right\rangle == \text{im}_{\to\infty} \sum_{i=1}^{n} 2^{n-1} n! \sqrt{\pi} \frac{\left(\sqrt{2}\, x_i^* + \langle\varsigma_i\rangle\right)}{n^2 [H_{n-1}(x_i^*)]^2} \left(1+\mathrm{Exp}\left[c\left[\left(\sqrt{2}\, x_i^* + \langle\varsigma_i\rangle\right)\sigma\langle\tilde{\pi}_i\rangle^{-1} - x_0\right]\right]\right)^{-1}$$

Here, the $x_i^*$ are the roots of the Hermite polynomial of order n, $H_n(x)$ For $<\zeta_i>=10^{-3}$, $\forall$i; c=0.2, $x_0=10$, $\sigma<\tilde{\pi}_i>^{-1}=31$, one may evaluate the sum for:

$n=2$, $(\sqrt{\pi}/2)((1+\mathrm{Exp}[8.2062])^{-1}-(1+\mathrm{Exp}[6.2(-1+10^{-3})+2])^{-1})==-0.872812$ $n=6$, $0.7246\times\sqrt{2}\times0.4361((1+\mathrm{Exp}[2+31\times0.2(\sqrt{2}\times0.4361+10^{-3})])^{-1}-(1+\mathrm{Exp}[31\times0.2(-\sqrt{2}\times0.4361+10^{-3})+2])^{-1})+0.1571\times\sqrt{2}\times1.3358((1+\mathrm{Exp}[2+31\times0.2(\sqrt{2}\times1.3358+10^{-3})])^{-1}-(1+\mathrm{Exp}[31\times0.2(-\sqrt{2}\times1.3358+10^{-3})+2])^{-1}+0.0045\times\sqrt{2}\times2.3506((1+\mathrm{Exp}[2+31\times0.2(\sqrt{2}\times2.3506+10^{-3})])^{-1}-(1+\mathrm{Exp}[31\times0.2(-\sqrt{2}\times2.3506+10^{-3})+2])^{-1})=-0.694858$ One sees that for n>2, the sum of the roots becomes smaller in absolute value. One may choose cutting the sum in n=2, because orders of $10^0$ are almost negligible for this cost and it is the maximum variation one can obtain with respect to the problem of the total cost without noise.

Then, for the order of the parameters chosen above, one may write the correlation as:

$$\langle\tilde{n}_j\varsigma_i\rangle = n\Big\{a\langle\varsigma_i\rangle + \delta_{ij}\frac{b}{2}(1+\langle\varsigma_i\rangle)(1+\mathrm{Exp}[c[(1+\langle\varsigma_i\rangle)\sigma\langle\tilde{\pi}_i\rangle^{-1}-x_0]])^{-1} - (1+\mathrm{Exp}[c[(-1+\langle\varsigma_i\rangle)\sigma\langle\tilde{\pi}_i\rangle^{-1}-x_0]])^{-1}\Big\}$$

Finally, the expression for the total cost becomes:

$$\langle U(\{\langle\tilde{\pi}_i\rangle\}_{i=1}^{N})\rangle = |\mu n| \sum_{k=1}^{N} \langle\tilde{\pi}_k\rangle^{-0.7} \left(\sum_{i=1}^{k}\langle\tilde{\pi}_i\rangle^{-1}\right)^{-0.5} \left(\sum_{i=1}^{N}\langle\tilde{\pi}_i\rangle^{-1}\right) - \sigma n \sum_{i=1}^{N}\langle\tilde{\pi}_i\rangle^{-1}\Big\{a(N-i+1)\langle\varsigma_i\rangle + \frac{b}{2}(1+\langle\varsigma_i\rangle)(1+\mathrm{Exp}[c[(1+\langle\varsigma_i\rangle)\sigma\langle\tilde{\pi}_i\rangle^{-1}-x_0]])^{-1} - (1+\mathrm{Exp}[c[(-1+\langle\varsigma_i\rangle)\sigma\langle\tilde{\pi}_i\rangle^{-1}-x_0]])^{-1}\Big\}.$$

Optimal Execution of Portfolio Transactions with Short-Term Alpha

In their 2000 paper ("AC 2000"), Almgren and Chriss found that to maximize the risk-adjusted liquidation value of an asset it is optimal to trade fastest at the beginning of a trade and follow a schedule that is a hyperbolic function. This remarkable closed-form solution was made possible by simplifying assumptions that price is driven by an arithmetic Brownian motion and that impact is linear and stationary.

This portion of the description revisits the optimal execution problem with a different perspective. A recently proposed impact model is used that is derived from a no-arbitrage argument for traders that use statistical models to detect hidden orders. Adjusted cost functions are derived for optimal trade scheduling in presence of risk aversion without a directional bias, as in AC 2000; and in presence of "short-term alpha" with no risk aversion. Numerical solutions of optimal execution problems in the presence of hidden order arbitrage are found for a variety of alpha decay profiles and implications for institutional trading desks are discussed.

Recent years have witnessed an increasing use on quantitative modeling tools and data processing infrastructure by high frequency trading firms and automated market makers. They monetize the value of the options written by institutional trade algorithms with every order placement on the market. This creates a challenge for institutional traders. The result for institutions is that trades with poor market timing typically execute too fast and those that have high urgency tend to execute too slowly and sometimes fail to complete. When the market controls the execution schedule, it is seldom to the advantage of the institutional trader.

To cope with this problem, the trader needs to perform three challenging tasks. First, develop an understanding of how urgent a trade is—i.e., when the benefits of speedier execution outweigh the additional impact costs. Second, map this urgency to an optimal execution schedule; and third, implement the schedule efficiently in the presence of market noise—a stochastic optimization problem. The industry is increasingly working to solve each of these three problems.

This portion of the description addresses the second task: assign an optimal trade schedule given a view on short-term alpha. To this end, an alternative to the AC 2000 framework is based on more realistic assumptions for market impact and explicitly considers the possibility of a directional bias, or "short-term alpha".

This new framework addresses the optimal execution of a large portfolio transaction that it is split into smaller slices and executed incrementally over time. There are many dimensions to this problem that are potentially important to the institutional trader: liquidity fluctuations, news stream, order flow imbalances, etc. In response to these variables, traders make decisions including the participation rate, limit price, and other strategy attributes. This portion of the description limits the scope of the problem by adopting the definition of optimal execution from AC 2000: optimal execution is the participation rate profile that minimizes the cost or risk-adjusted cost while completing the trade in a given amount of time.

To optimize the risk-adjusted cost, one must first specify a model for market impact. Market impact has been analyzed by different authors as a function of time and trade size. See for example (Bertismas and Lo, 1998), (Almgren and Chriss, 2000), (Almgren et al., 2005), (Obizhaeva and Wang, 2006).

AC 2000 derived execution profiles that are optimal if certain simplifying assumptions hold true. These include the hypothesis that the market is driven by an arithmetic Brownian motion overlaid with a stationary market impact process. Impact is proposed to be the linear sum of permanent and temporary components, where the permanent impact depends linearly on the number of traded shares and the temporary impact is a linear function of the trading velocity. It follows that total permanent impact is independent of the trade schedule. The optimal participation rate profile requires trading fastest at the beginning and slowing down as the trade progresses according to a hyperbolic sine function.

This type of front-loaded participation rate profile is widely used by industry participants, yet it is also recognized that it is not always optimal. Some practitioners believe that the practice of front-loading executions bakes in permanent impact early in the trade, resulting in higher trading costs on average. A related concern is that liquidity exhaustion or increased signaling risk could also lead to a higher variance in trade results (Hora, 2006), defeating the main purpose of front-loading. In their paper, Almgren and Chriss acknowledge that the simplifying assumptions required to find closed-form optimal execution solutions are imperfect. The non-linearity of temporary impact in the trading velocity has been addressed previously in (Almgren, 2003), (Almgren et al., 2005); the optimization method has also been adjusted for non-linear phenomenological models of temporary impact (Loeb, 1983; Lillo et al., 2003). However, most studies share the common assumptions that short-term price formation in non-volatile markets is driven by an arithmetic Brownian motion and that the effect of trading on price is stationary, i.e., the increment to permanent impact from one interval to the next is independent of time. In addition, the temporary impact is a correction that depends only on the current trading velocity but not on the amount of time that the strategy has been in operation. There are reasons to doubt the assumption of stationary impact. Practitioners find that reversion grows with the amount of time that an algorithm has been engaged; this suggests that temporary impact grows as a function of time. Phenomenological models of market impact consistently produce concave functions for total cost as a function of trade size; this is inconsistent with linear permanent impact.

(Farmer et al., 2009) (FGLW) showed that it is possible to derive a concave shape for both temporary and permanent impact of a trade that is executed at a uniform participation rate. The basic assumption in this case is that arbitrageurs are able to detect the existence of an algorithm and temporary impact represents expectations of further activity from this algorithm. The concave shape of market impact follows from two basic equations. The first is an arbitrage equation for traders that observe the amount of time an execution has been in progress. They use the distribution of hidden order sizes to estimate the probability that the hidden order will continue in the near future. The second is the assumption that institutional trades break even on average after reversion. In other words, the price paid to acquire a large position is on average equal to the price of the security after arbitrageurs have determined that the trade is finished. The model explains how temporary impact sets the fair price of the expected future demand or supply from the algorithmic trade. When the trade ends and these expectations fade away, the model predicts how price will revert to a level that incorporates only permanent impact. The shape of the impact function can be derived from knowledge of the hidden order size distribution. If one believes the hidden order size distribution to have a tail exponent of approximately 1.5, the predicted shape of the total impact function is a square root of trade size in agreement with phenomenological models including the Barra model (Torre, 1997). See also, (Chan and Lakonishok, 1993), (Chan and Lakonishok, 1995), (Almgren et al., 2005), (Bouchaud et al., 2008), (Moro et al., 2009).

Hidden order arbitrage theory has been extended to varying participation rate profiles by some of the present inventors. This extension adds the assumption that temporary impact depends only on the current trading speed and total number of shares acquired so far in the execution process.

This portion of the description is organized as follows. Section 1 uses the extended hidden order arbitrage theory to derive the cost functions for two optimal execution problems. Section 2.1 describes minimization of trading cost given a specific directional view on short-term alpha decay. Section 2.2 describes minimization of risk-adjusted cost in absence of short-term alpha. It is of interest when risk is a consideration but one has no directional bias on the short-term price trends in the stock. Section 3 provides numerical solutions in cases of some relevance to institutional trading desks. The concluding section discusses implications of these results to the choice of benchmarks used at institutional trading desks to create incentives for traders.

1. Short-Term Alpha Decay and Hidden Order Arbitrage Theory.

The alpha coefficient ($\alpha$) and beta coefficient ($\beta$) play an important role in the capital asset pricing model (CAPM). Both constants can be estimated for an individual asset or portfolio using regression analysis for the asset returns versus a benchmark. The excess return of the asset over the risk-free rate follows a linear relation with respect to the market return $r_m$ as:

$$r_a=\alpha_a+\beta_a r_m+\epsilon_a, \tag{1}$$

where $\epsilon_a$ is the statistical noise with null expectation value. The variance of asset returns introduces idiosyncratic risk, which is minimized by building a balanced portfolio, and systematic risk, for which the investor is compensated through the multiplier beta. The same terminology is used to project future returns: a portfolio manager will assign a to desirable positions based on estimated target prices.

It is common to borrow from this terminology in the trade execution arena. The expected market return over the execution horizon is generally assumed to be zero, so the term "short-term alpha" is used by some to denote either the expected return of a stock or the expected alpha after beta-adjustment as given in (1). To address the optimal execution problem it is important to know not only the total short-term alpha to the end of the execution horizon, but also the manner in which it decays over time. There are four cases of interest 1) Urgent trades (on news or liquidity exhaustion events, for example) can be expected to have an exponential alpha decay with a short time constant, for example 10-60 minutes.
2) Other informed trades may be expected to have slower alpha decay, with an adverse trend persisting throughout the execution horizon—for example if multiple managers are competing to execute similar trades.
3) Some trades have no short-term market timing and no alpha decay is expected on the execution horizon.
4) Contrarian trades (exit trades or value buys aiming to take advantage of selling pressure on the market, for example) are expected to have slow negative alpha over the execution horizon.

All cases above are well modeled with an exponential alpha decay profile, $$\alpha(t)=\alpha_\infty\left(1-e^{\frac{(t-t_0)}{\tau}}\right), \tag{2}$$

with a magnitude $\alpha_\infty$ and decay constant $\tau$. In the presence of a trade, the expected return will be $$E(r;t)=\text{Impact}(t)+\alpha(t), \tag{3}$$

where one considers $E(r_m)\approx 0$, but has added a market impact component as result of the intrinsic dynamics of the trade.

Some of the present inventors have proposed an impact model that assumes that market makers are able to observe imbalances caused by institutional trades. Below is a summary of the hypothesis that may be used for the description of market impact and addition of new components modeling the short-term alpha decay.

Hypothesis I: Hidden Order Detection

A hidden order executing during a period $\Delta t$ with an average rate $\pi$, is detected at the end of intervals of $\tau(\pi)=1/\pi^2$ market transactions[4]. The term "detectable interval" is used below to mean each set of $$\tau(\pi_i) = \frac{1}{\pi_i^2}$$

market transactions, for each $i \in \mathbb{N}$, over which a hidden order is detected with a constant participation rate $\pi_i$. A detectable interval i contains $1/\pi_i$ hidden order transactions, with $0<\pi_i<1$, $\forall i$.

[4]If order flow were a random walk with a bias $\pi$ between buy and sell transactions, the imbalance would be detected with t-stat=1 after $1/\pi^2$ transactions.

In addition, there exists a function $\tau_r(X,\pi_f)$ such that the end of a hidden order can be detected after a reversion time $\tau_r(X,\pi_f)$, where $\pi_f$ is the most recently observed rate. Let be $$N^* = N^*(X) \in \mathbb{R}_{>0},$$

$$\text{then } N^* = q + [N^*],\ [N^*] \stackrel{def}{=} IntegerPart[N^*],\ 0 \le q < 1.$$

One may set $\tau_r(X, \pi_f)=q\pi_f^{-2}$. The number N* will be determined by the trade size X and [N*] represents the last detectable interval.

Hypothesis II: Linear Superposition of Alpha and Impact

Considering the asset return as the difference between the initial price of a share $S_0$ and the price paid at the k-interval, $\tilde{S}_k$, one may write equation (3) as $$\tilde{S}_k - S_0 = \alpha_k + \text{Impact}_{[0,k]}, \tag{4}$$

Here, $\alpha_k$ is a function of the transactional time $t_k$ elapsed from the beginning of the trade to the interval k, and will be called the "short term alpha".

$\text{Impact}_{[0,k]}$, is the impact of the security price from the beginning of the trade to the end of the interval k.

Denote by $\tilde{S}_k$ the expected average price in the interval, where the expectation is over a Gaussian (G) function of an arithmetic random walk, with fixed $\{\pi_1, \pi_2, \ldots, \pi_k\}$.

Hypothesis III: Impact Model

Impact of the security price is related to price formation from the beginning of the trade to the end of the interval k, as $$\text{Impact}_{[0,k]} = \mu\left\{\pi_k^{\beta}\left(\sum_{i=1}^{k}\pi_i^{-1}\right)^{\alpha-1} + \sum_{i=1}^{k-1}\pi_i^{\beta-1}\left(\sum_{j=1}^{i}\pi_j^{-1}\right)^{\alpha-2}\right\}, \tag{5a}$$

$$,\ 2 \le k \le [N^*],$$

$$\text{Impact}_{[0,1]} = \mu\pi_1^{\beta-\alpha+1}. \tag{5b}$$

Here, $\alpha=1.5$ (Gopikrishnan et al., 2000), (Gabaix et al., 2006). Empirical observations suggest $\beta=0.3$ (Gomez and Waelbroeck, 2008), close to theoretical predictions of 0.25, (Bouchaud et al., 2008). The constant $\mu>0$ for a buy and $\mu<0$ for a sell.

By Hypothesis I, one may consider the possibility that the total number of detectable steps N* is a non-integer value; which means the institution could finish at an "extra time" $q=N^*-[N^*]$, $0 \leqq q<1$, that it is completed in less than $\pi^{-2}$ market transactions. In the case that $q \neq 0$, the total impact between the origin 0 and N* will be:

$$\text{Impact}_{[0,N^*]} = \mu\left\{\pi_{N^*}^{\beta}\xi_{N^*}^{\alpha-1} + \sum_{i=1}^{[N^*]}\pi_i^{\beta-1}\left(\sum_{j=1}^{i}\pi_j^{-1}\right)^{\alpha-2}\right\}, \tag{5c}$$

where $\xi_{N^*}$ is the total number of transactions traded until the last detectable interval N* and it is by definition:

$$\xi_{N^*} \stackrel{def}{=} \left(\sum_{i=1}^{[N^*]}\frac{1}{\pi_i} + q\pi_{N^*}^{-1}\right). \tag{6}$$

Hypothesis V: Alpha Decay Model $$\alpha_k = S_0\alpha_\infty\left(1 - e^{-\frac{t_k+t_{k-1}}{2\kappa}}\right), \tag{7}$$

$$t_k = \sum_{i=1}^{k}\pi_i^{-2}. \tag{8}$$

$\kappa$ is a typical time decay and $\alpha_\infty$ is a parameter associated with the information of a trade.

2. Total Cost Definition and Constraints 2.1 Equations without Risk Term

The expected total cost of the trade (over G) is $$E(\vec{\pi}, N^*) \stackrel{def}{=} n\xi_{N^*}S_0 - \sum_{i=1}^{[N^*]}n_i\tilde{S}_i - qn\pi_{N^*}^{-1}\tilde{S}_{N^*}, \tag{9}$$

where $n_i=n\pi_i^{-1}$ is the number of shares traded in the i-segment and n is the number of traded shares in each institutional transaction with n>0 for a sell and n<0 for a buy.

In addition, suppose that there exists $N \in \mathbb{N}$, $N \leqq N^*$, such that from N+1 to N* the institution participates with a constant rate $\pi_f$. Therefore, the variables $(\vec{\pi}, N^*)$ will be reduced to $(\{\pi_i\}_{i=1}^{N}, \pi_f, N^*)$.

After a calculation, using the equations above, the expected total cost turns out to be:

$$\begin{aligned} E\left(\{\pi_i\}_{i=1}^{N}, \pi_f, N^*; \vec{p}\right) = |\mu n|\xi_{N^*}\Bigg\{&\sum_{k=1}^{[N^*]}\pi_k^{\beta-1}\left(\sum_{i=1}^{k}\pi_i^{-1}\right)^{\alpha-2} + q\pi_f^{\beta-1}\left(\sum_{i=1}^{[N^*]}\pi_i^{-1} + q\pi_f^{-1}\right)^{\alpha-2}\Bigg\} - \\ &nS_0\alpha_\infty\Bigg\{\xi_{N^*} - \sum_{i=1}^{N}\pi_i^{-1}e^{-\frac{t_i+t_{i-1}}{2\kappa}} - \\ &\pi_f^{-1}\Bigg(\sum_{i=N+1}^{[N^*]}e^{-\frac{\left(\sum_{j=1}^{N}\pi_j^{-2}+(i-N)\pi_f^{-2}-0.5\,\pi_f^{-2}\right)}{\kappa}} + (N^*-[N^*])e^{-\frac{\left(\sum_{j=1}^{N}\pi_j^{-2}+(N^*-N)\pi_f^{-2}\right)}{\kappa}}\Bigg)\Bigg\}, \end{aligned} \tag{10}$$

with:

$$N^* = q + [N^*],\ [N^*] \stackrel{def}{=} IntegerPart[N^*],$$

$$0 \le q < 1,\ t_k = \sum_{i=1}^{k} \pi_i^{-2},\quad 1 \le k \le N,$$

and the parameter vector:

$$\vec{p} = (\mu, n, N, \alpha, \beta, S_0, \alpha_\infty, \kappa)$$

Set the constraints to be:

$$X/n = \xi_{N^*} \stackrel{def}{=} \left\{ \sum_{j=1}^{N} \pi_j^{-1} + (N^* - N)\pi_f^{-1} \right\}, \tag{11}$$

$$T_M \ge t_{N^*} \stackrel{def}{=} \sum_{i=1}^{N} \pi_i^{-2} + (N^* - N)\pi_f^{-2}. \tag{12}$$

Here, X is the total number of shares fixed to trade and $T_M$ is the time horizon.

Section 3.1 describes find optimal trajectories for the set of the expected trading rates ($\{\pi_i\}_{i=1}^{N}, \pi_f$) and the total number of detectable steps N*, which minimize the total cost. Using Mathematica 8, this may be resolved by simulated annealing.

2.2 Equations Including Risk without Alpha Term

Additionally, as in (Almgren and Chriss, 2000), one may evaluate the variance of the cost $$V(\vec{\pi}, N^*; \alpha_\infty = 0) \stackrel{def}{=} \left\langle \left( E(\vec{\pi}, N^*; \alpha_\infty = 0) - \left\langle E(\vec{\pi}, N^*; \alpha_\infty = 0) \right\rangle_G \right)^2 \right\rangle_G.$$

For that, one may sum the term representing the volatility of the asset $$\sigma \sum_{i=1}^{k} \pi_i^{-1} \varsigma_i, \tag{13}$$

to the equations (5). The $\zeta_{i+1}$ are random variables with zero Gaussian mean and unit variance and σ is a constant with units $$[\sigma] = \frac{\$}{\text{share} \times \sqrt{\text{transaction}}}.$$

Therefore, the variance of $E(\vec{\pi}, N^*; \alpha_\infty = 0)$ takes the form $$V(\vec{\pi}, N^*; \alpha_\infty = 0) = \sigma^2 n^2 \sum_{k=1}^{[N^*]} \pi_k^{-2} \left( \xi_{N^*} - \sum_{j=1}^{k} \pi_j^{-1} \right)^2. \tag{14}$$

One may next write the risk-adjusted cost function:

$$U(\vec{\pi}, N^*; \lambda, \mu, n, \sigma, \alpha, \beta, N) \stackrel{def}{=} E(\vec{\pi}, N^*; \alpha_\infty = 0) + \lambda V(\vec{\pi}, N^*; \alpha_\infty = 0), \tag{15}$$

where λ is the risk parameter with units $[\lambda] = \$^{-1}$.

Applying the previous expressions, one obtains:

$$U(\{\pi_i\}_{i=1}^{N}, \pi_f, N^*; \lambda, \mu, n, \sigma, \alpha, \beta, N) = |\mu n| \xi_{N^*} \left\{ \sum_{k=1}^{[N^*]} \pi_k^{\beta-1} \left( \sum_{i=1}^{k} \pi_i^{-1} \right)^{\alpha-2} + q \pi_f^{\beta-1} \left( \sum_{i=1}^{[N^*]} \pi_i^{-1} + q \pi_f^{-1} \right)^{\alpha-2} \right\} + \lambda \sigma^2 n^2 \sum_{k=1}^{[N^*]} \pi_k^{-2} \left( \xi_{N^*} - \sum_{j=1}^{k} \pi_j^{-1} \right)^2, \tag{16}$$

with the constraints set to be (11) and (12). Section 3.2 provides optimal trajectories.

3. Total Cost Optimization 3.1 Results for λ=0 and Arbitrary Alpha Term

Below are reproduced the results for λ=0 and different values of the parameter $\alpha_\infty$ and the decay parameter in time κ on a graph showing the optimal participation rate $\pi_k$ in function of the transactional time $t_k$. The parameters are set to be:

| $\mu$ | $n$ | $N$ | $\beta$ | $\alpha$ | $S_0$ | $X$ | $T_M$ |
|---|---|---|---|---|---|---|---|
| $\frac{0.0315\$}{\text{share}}$ | −250 shares (buy) | 10 steps | 0.3 | 1.5 | $\frac{50\$}{\text{share}}$ | −25000 shares (buy) | 1000 transactions |

3.1.1. Slow Alpha Decay

This is a case where alpha decay is slow and almost linear over the execution horizon: $\kappa \gg T_M$. When the outlook is for the price to drift in the opposite direction of the trade ($\alpha_\infty<0$), it is optimal to push the execution schedule towards the end of the allowed window as for a market-on-close strategy. In the neutral case ($\alpha_\infty=0$), the optimal strategy starts slowly to minimize information leakage early in the trade and steadily increases the participation rate. In presence of adverse momentum ($\alpha_\infty>0$, the optimal schedule has trading speed reaching a maximum near the middle of the execution horizon, or for very strong directional bias, ramp up quickly to a 20% participation rate to complete the trade early.

Figure 2:
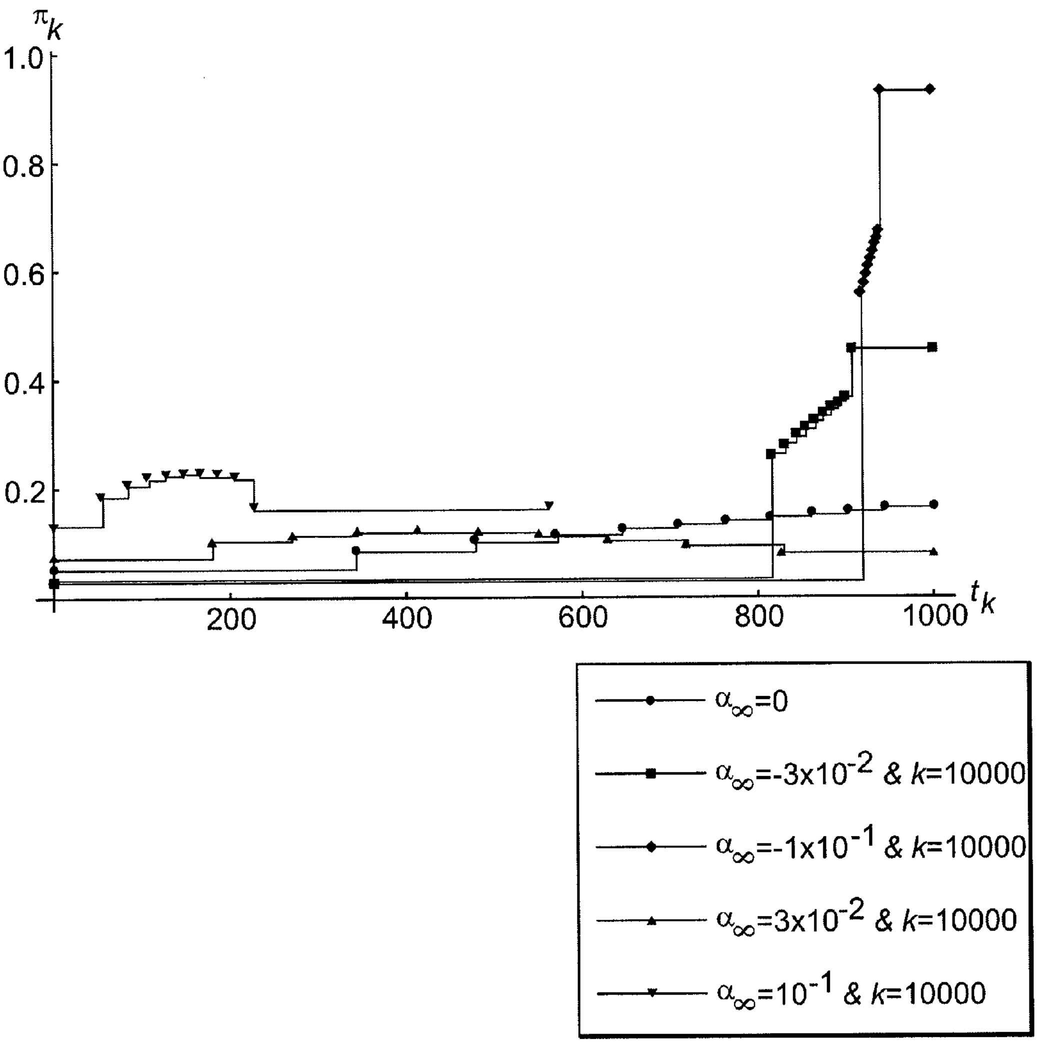
FIG. 2 depicts slow alpha decay with $\kappa >> T_M$.

FIG. 2. Case $\kappa \gg T_M$. The general characteristic is that the participation rate $\kappa_k$ increases with $t_k$ more than ⅓ of the time. The case ($\alpha_\infty>0$) indicates that the price tends to rise. Therefore, it is justified to buy incrementally faster from the beginning but increasing the rate slightly with time to avoid high impact costs. After impact takes place, when $t_k$ is closer to the end of the trade $t_N$*, the rate should decrease slightly with time to about the initial slow rate. The case $\alpha_\infty<0$ represents that prices tends to down. It is convenient to keep the rate very slow and constant more than 80% of the time since the beginning of the trade, passing for a period of fast and constant increment until the end to more than 50% of the original rate. Note that the starting rate $\pi_1$ is slightly higher for $\alpha_\infty>0$, as a consequence of the expectations of higher prices, and slightly lower for $\alpha_\infty<0$, or expectations of lower prices, than the one for $\alpha_\infty=0$.

| $\alpha_\infty$ | Cost – Optimal ($) | Cost at 10% ($) |
|---|---|---|
| 0 | 5953.5 | 6266.72 |
| $-3 \times 10^{-2}$ | −6082.71 | 721.25 |
| $-1 \times 10^{-1}$ | −37608.9 | −12218. |
| $3 \times 10^{-2}$ | 8969.41 | 11812.2 |
| $10^{-1}$ | 12982.5 | 24751.6 |

Table 4. The second column shows the cost of optimal trajectories for different values of the parameter $\alpha_\infty$. The third column is the cost calculated with a constant rate $\pi_i=0.1$, $1 \leqq i \leqq N^*=10$. Negative costs represent gains due to diminishing prices. Costs increase as $\alpha_\infty>0$ increases.

3.1.2. Very High Urgency

Figure 3:
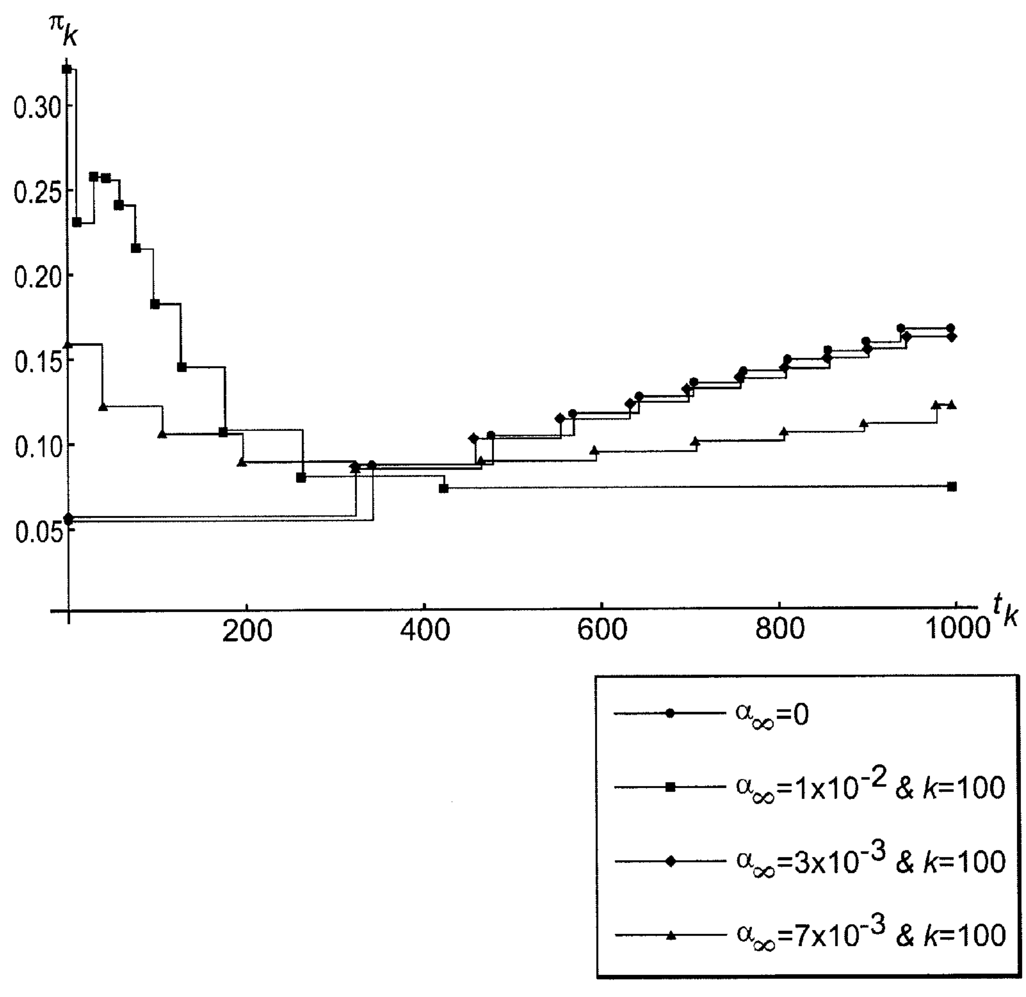
FIG. 3 depicts optimal execution trajectories for very rapid alpha decay: $\kappa << T_M$.

FIG. 3. The figure shows optimal execution trajectories for very rapid alpha decay: $\kappa<<T_M$. The two trajectories $\alpha_\infty=0$ and $\alpha_\infty=3\times10^{-3}$ coincide on this graph: an aggressive trade start is optimal only when short-term alpha is large enough to outweigh the additional impact cost. The value $\alpha_\infty=7\times10^{-3}$ is the critical point for the "phase change," where the trajectory changes radically and stops behaving as $\alpha_\infty=0$.

| $\alpha_\infty$ | Cost – Optimal ($) | Cost at 10% ($) |
|---|---|---|
| 0 | 5953.5 | 6266.72 |
| $1 \times 10^{-2}$ | 17945.1 | 18325.5 |
| $3 \times 10^{-3}$ | 9689.93 | 9884.37 |
| $7 \times 10^{-3}$ | 14686.5 | 14707.9 |

Table 5. The costs of the optimal schedule are shown in comparison to the 10% strategy for different levels of short-term alpha in the case of very rapid alpha decay. Costs increase as $\alpha_\infty>0$ increases; schedule optimization offers little room for profit in this case because alpha decays too rapidly in relation to the trade size: there is too little time to trade.

3.1.3 High Urgency

Figure 4:
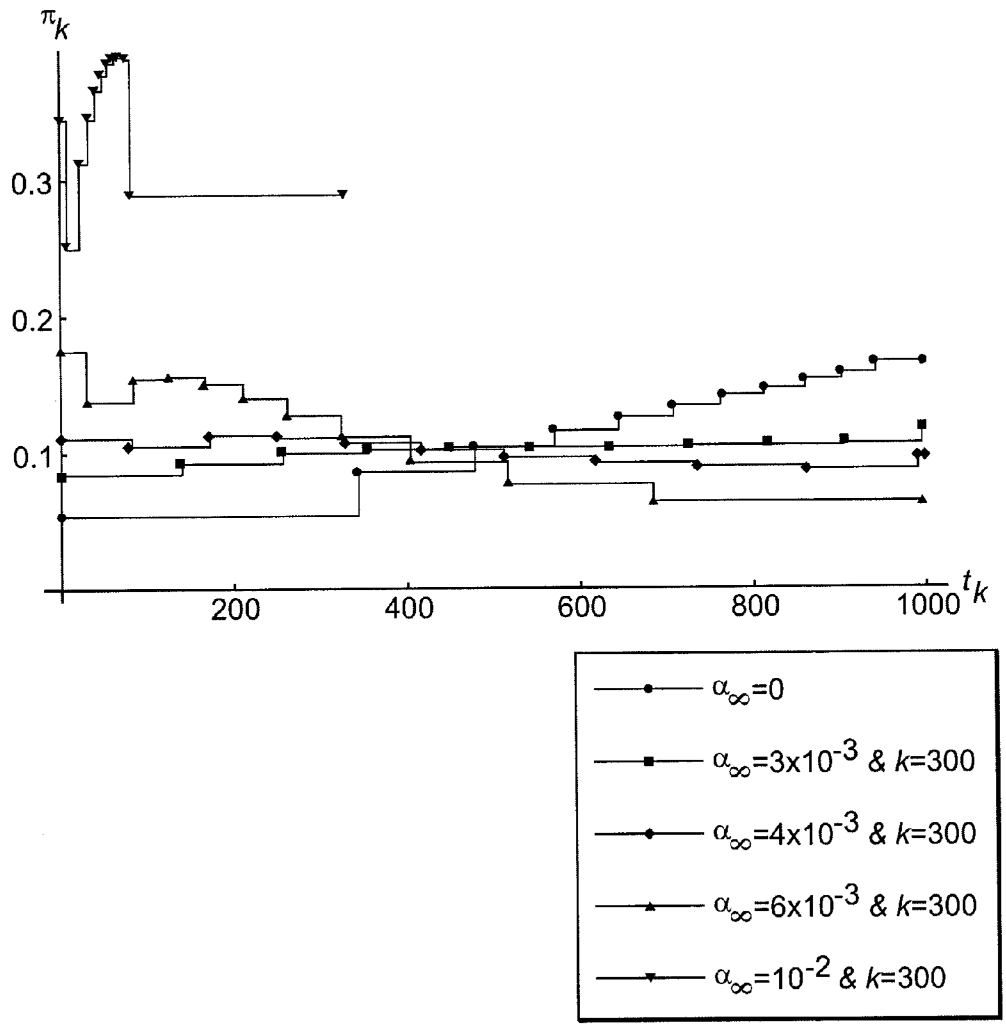
FIG. 4 depicts alpha decay with $\kappa < T_M$.

FIG. 4. This is the case $\kappa<T_M$. For $\alpha_\infty \leqq 3\times10^{-3}$, trajectories are qualitatively very similar to the one for $\alpha_\infty=0$. The case $\alpha_\infty=4\times10^{-3}$ marks the transition from back-loaded schedules to front-loaded ones when short-term alpha is larger. In the extreme case where short-term alpha is 100 bps, ($\alpha_\infty=1\times10^{-2}$), the high expectation of increasing prices suggests a fast start and a short trading time (about 36% of $T_M$). Immediately, the optimization decreases the rate in a 10% to compensate impact costs. It follows a monotonous increase of more than 10% in a lapse of ⅙ of the total trading time. Finally, it reduces 10% to a constant rate during ⅚ of the time, until the end. Those rises and falls in the participation rate are the efforts of the optimization to reach an equilibrium between impact and alpha term increments.

| $\alpha_\infty$ | Cost – Optimal ($) | Cost at 10% ($) |
|---|---|---|
| 0 | 5953.5 | 6266.72 |
| $10^{-2}$ | 14912.4 | 16225.3 |
| $3 \times 10^{-3}$ | 9248.68 | 9254.29 |
| $4 \times 10^{-3}$ | 10241.5 | 10250.2 |
| $5 \times 10^{-3}$ | 11175.6 | 11246 |
| $6 \times 10^{-3}$ | 12037.2 | 12241.9 |

Table 6 Optimal costs are compared to the 10% participation strategy for the case of moderately rapid alpha decay. The 10% strategy is close to optimal for the most common alpha values, 30-50 bps. Back loaded schedules are more economical when expectations are balanced; frontloading provides significant benefits for short-term alpha values in excess of 60 bps.

3.1.4. Moderate Urgency

Figure 5:
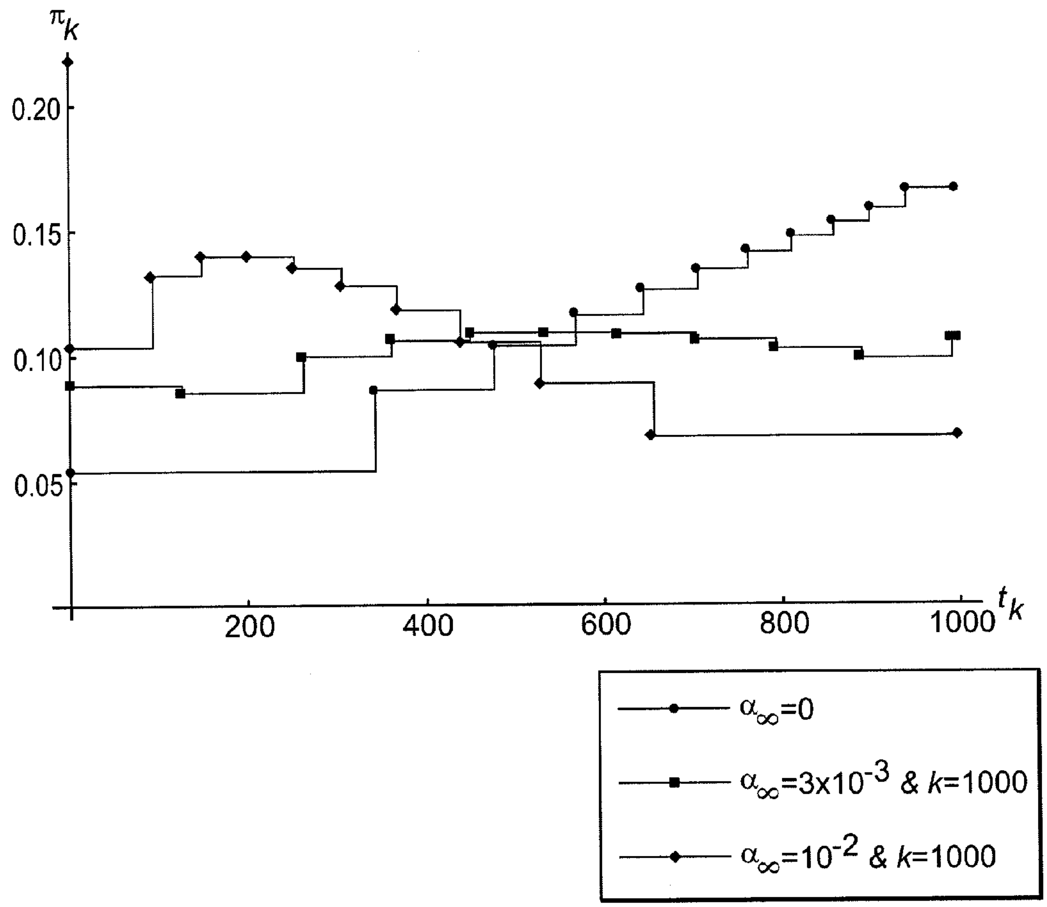
FIG. 5 depicts alpha decay with $\kappa = T_M$.

FIG. 5. This is the case $\kappa=T_M$. Even for the high $\alpha_\infty$ scenario, $\alpha_\infty=100$ bps, it is optimal to extend the execution over the entire window to minimize impact costs.

| $\alpha_\infty$ | Cost – Optimal ($) | Cost at 10% ($) |
|---|---|---|
| 0 | 5953.5 | 6266.72 |
| $3 \times 10^{-3}$ | 7987.48 | 8003.97 |
| $10^{-2}$ | 11348 | 12057.5 |

Table 7 The costs of optimal solutions are compared to the 10% participation strategy for different short-term alpha expectations; the 10% strategy is near optimal when the expected short-term alpha is 30 bps.

3.1.5. Graph Comparison Between Different Time Decay Constants

Very strong momentum

Figure 6:
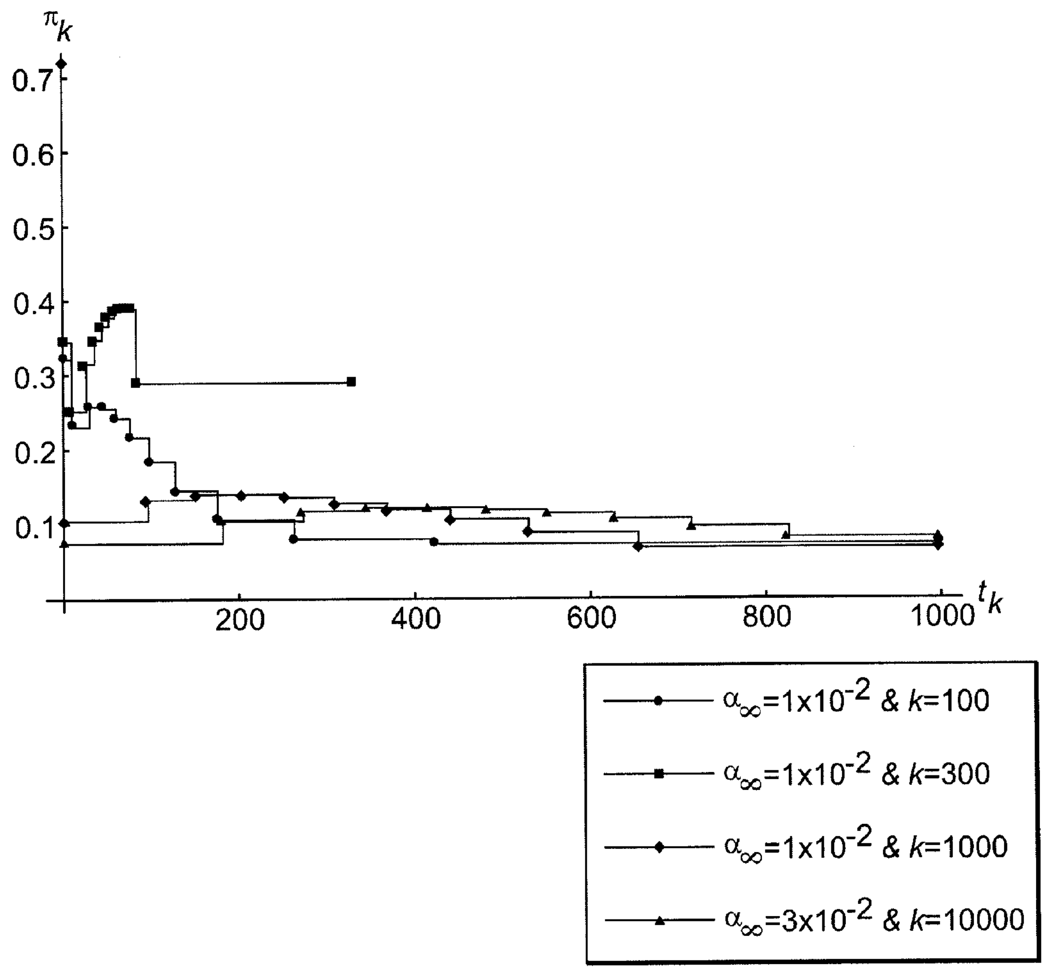
FIG. 6 depicts alpha decay with very strong momentum.

See FIG. 6.

Moderate momentum

Figure 7:
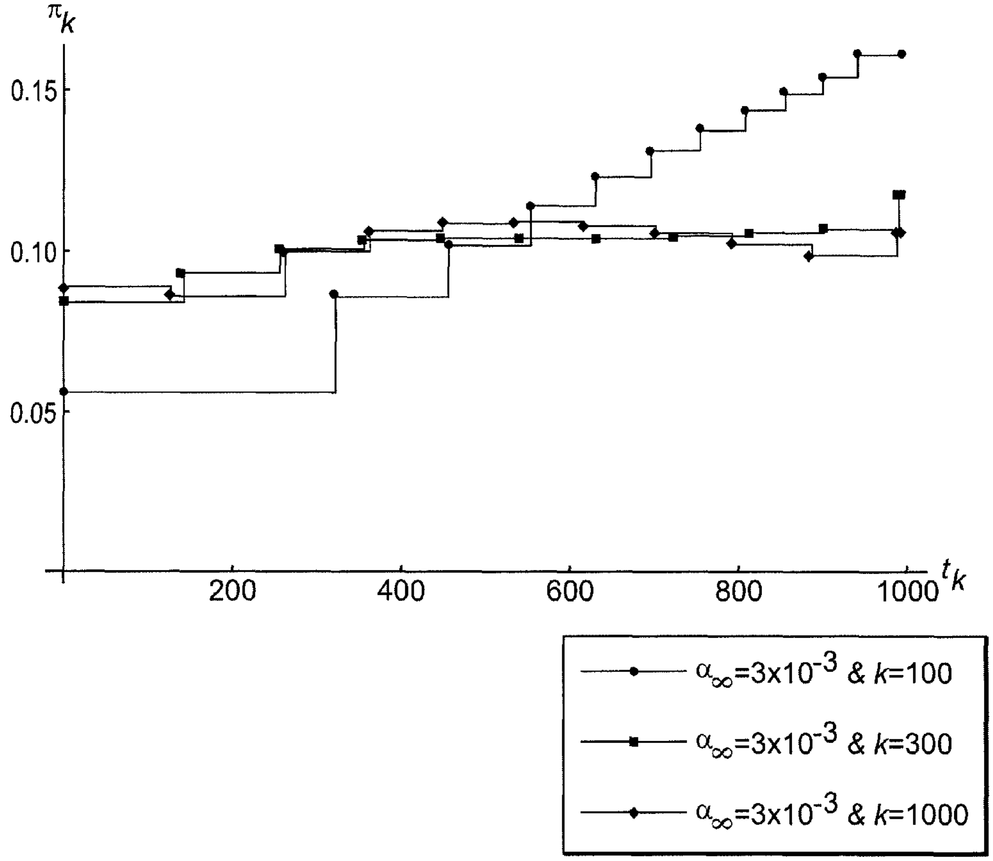
FIG. 7 depicts alpha decay with moderate momentum.
Figure 8:
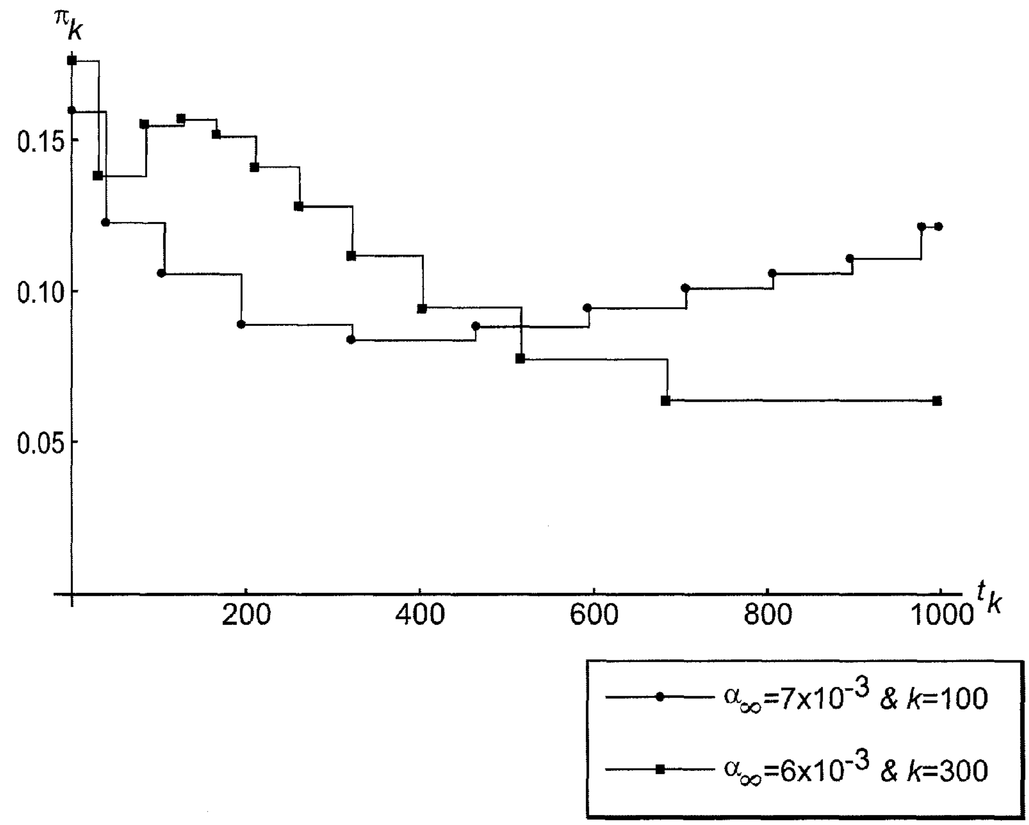
FIG. 8 depicts alpha decay with additional values of $\alpha$ and $\kappa$.

See FIG. 7 and FIG. 8.

3.2. Risk Adjusted Optimization

Above is an analysis of the hidden order arbitrage theory for variable speed of trading with zero risk aversion ($\lambda=0$). In what follows, the description is concentrated on finding optimal trading trajectories for a model with varying participation rate, alpha term zero and arbitrary risk aversion. That means to minimize the total risk-adjusted cost function (16), with the constraints (11) and (12).

If one takes an annual volatility of 30%, $$\sigma = \frac{0.95\left(\frac{\$}{\text{share}}\right)}{\sqrt{\text{day}}}.$$

In this case, one may work with transactions units as a measure of time, with $$\tau = \frac{1}{\pi^2} = 100$$

the average number of the market transactions in each detectable interval. If one day consists of 6 hours and 30 minutes and each detectable interval last 15 minutes then, 1 day=2600 market transactions. Therefore, $$\sigma = \frac{0.019\frac{\$}{\text{share}}}{\sqrt{\text{transaction}}}.$$

The shortfall of risk-adjusted cost optimal solutions is listed in Table 5 for this example and different risk aversion parameters. $L=\lambda\sigma^2|n/\mu|$ is the corresponding dimensionless risk parameter.

| $\alpha_\infty$ | L | Risk parameter $\lambda$ ($\$^{-1}$) | Shortfall per share $\left(\frac{\$}{\text{share}}\right)$ | Shortfall E (\$) | Variance $\sqrt{\nabla}$ (\$) | N* | $t_N$* |
|---|---|---|---|---|---|---|---|
| | $1\times10^{-4}$ | $3.49\times10^{-5}$ | 0.2608 | 6520.5 | 7360.83 | 10.99 | 1000 |
| 0 | 0 | 0 | 0.2381 | 5953.5 | 9192.27 | 11.57 | 1000 |
| | $3\times10^{-4}$ | $1.05\times10^{-4}$ | 0.2917 | 7292.25 | 6290.65 | 13.14 | 1000 |

Table 8. Shortfall of Risk Adjusted Cost Optimal solutions. Consider a mid-cap trade of 25000 shares, in a $S_0$=\$50 security, executed at an average participation rate of 10% ($\pi$=0.1). If the security's trading volume is $$\frac{400\ \text{transactions}}{\text{hr}},$$

a detectable interval will represent 15 minutes of trading. The impact for a 15-minute interval is estimated to be 10 bps for this security, i.e. $|\mu|$=0.0315 \$/share. One may take an annual volatility of 30% or $$\sigma = \frac{0.95\left(\frac{\$}{\text{share}}\right)}{\sqrt{\text{day}}}.$$

One day consists of 6 hours and 30 minutes or 2600 market transactions. Results are for $T_M$=1000 transactions, $\alpha$=1.5, $\beta$=0.3, for the different values of the dimensionless risk constant $L=\lambda\sigma^2|n/\mu|$. The sixth column N* is the total number of detectable intervals realized by the hidden order. The last column indicates that the number of market transactions reaches the maximum limit $T_M$.

Figure 9:
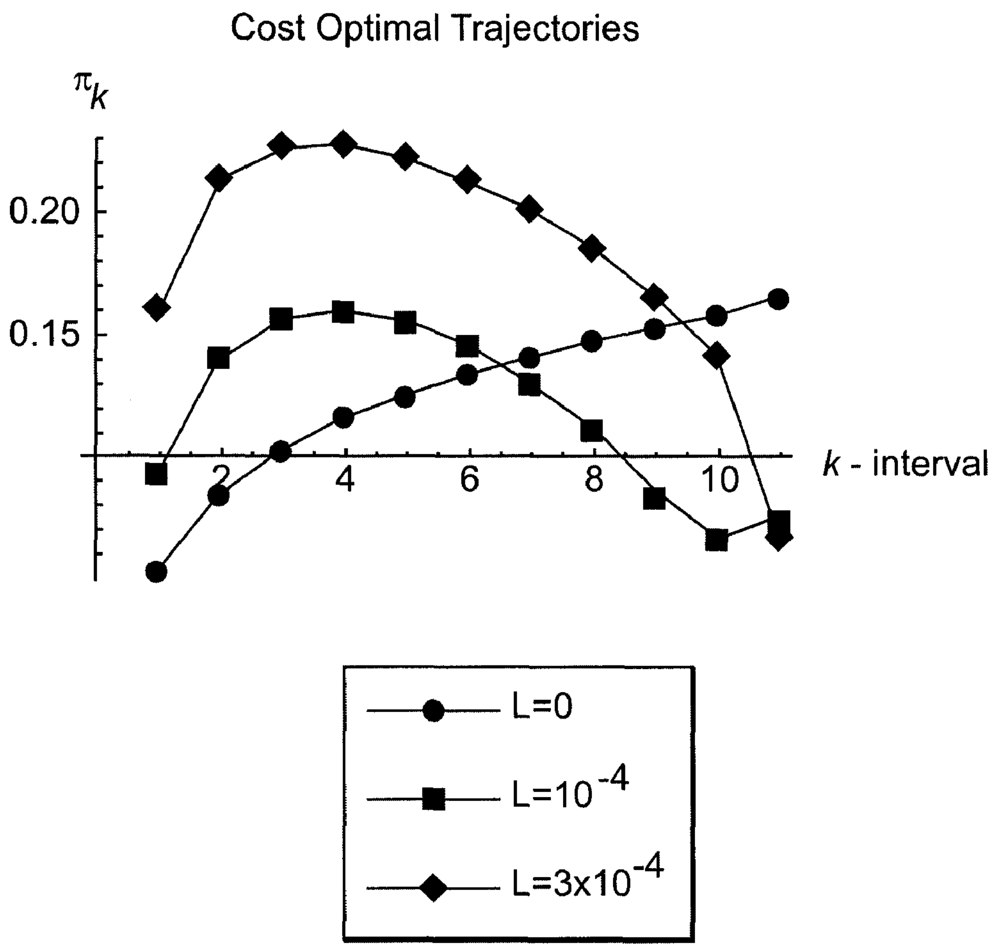
FIG. 9 depicts exemplary cost optimal trajectories.

FIG. 9 depicts a graph of the participation rate $\pi_k$ versus the detectable step k, in a continuum approximation, for the different values of the risk constant $L=\lambda\sigma^2|n/\mu|$ and nule alpha term. Optimal trajectories are shown representing the participation rate in function of the number of the detectable interval for different values of the risk constant and $\alpha_\infty$=0.

In each step the participation rate must be constant.

Figure 10:
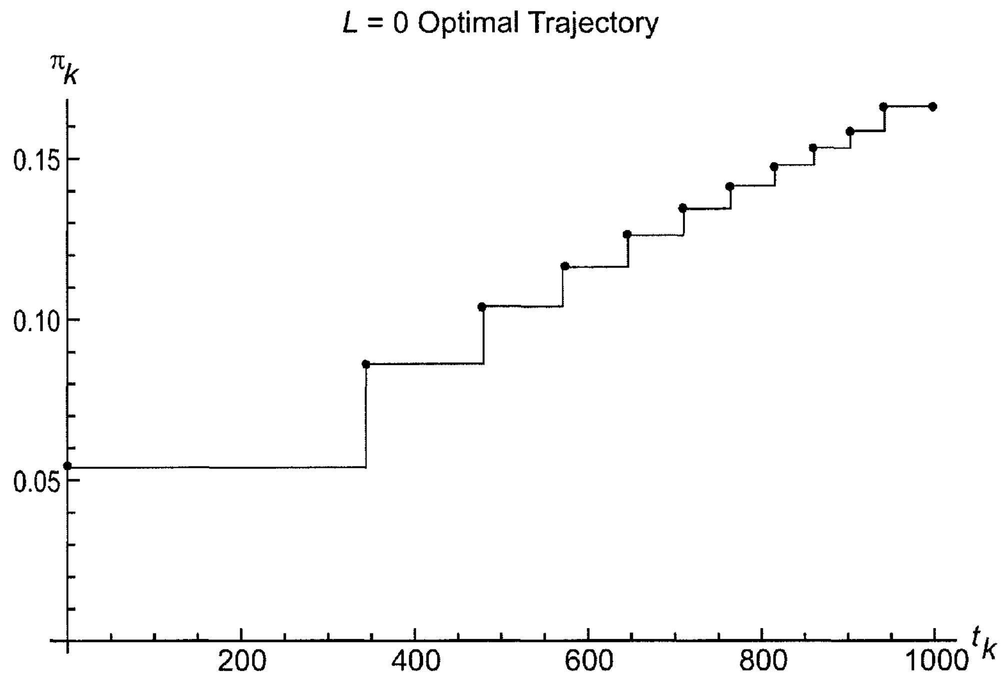
FIGS. 10-12 depict participation rate in function of transactional time.

FIG. 10 depicts a detailed graph of the participation rate versus the transactional time, $$t_k = \sum_{i=1}^{k} \pi_i^{-2},$$

corresponding to each k-interval, for each L. In particular, FIG. 10 depicts Participation rate in function of the transactional time, $$t_k = \sum_{i=1}^{k} \pi_i^{-2},$$

corresponding to each k-interval, considering zero risk aversion and alpha term.

Figure 11:
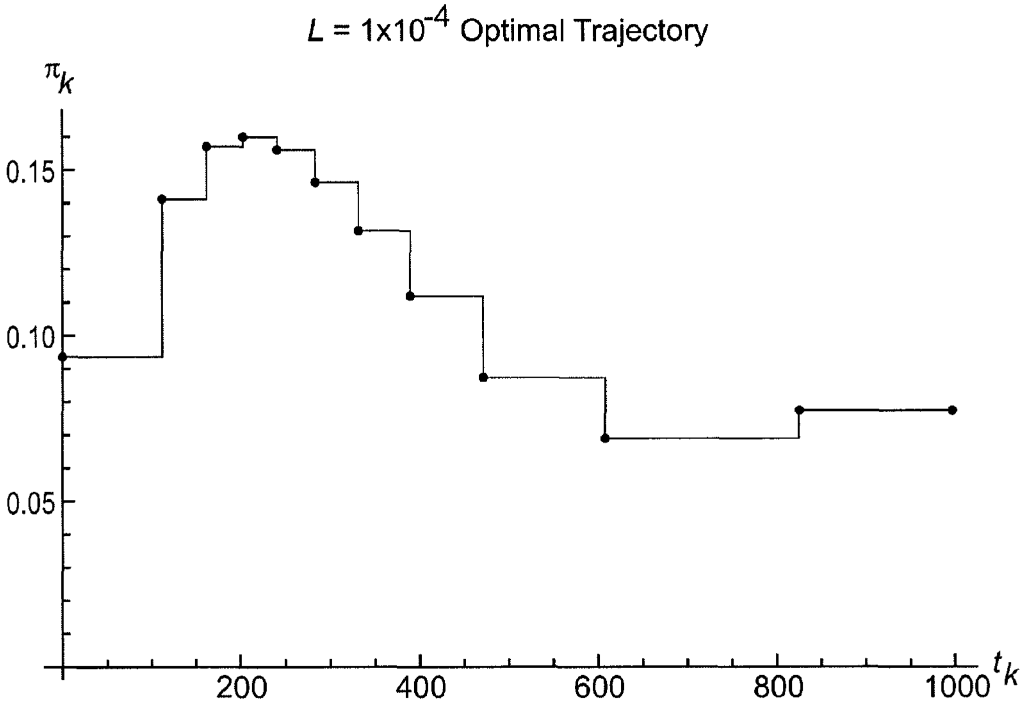

FIG. 11 depicts participation rate in function of the transactional time, $$t_k = \sum_{i=1}^{k} \pi_i^{-2},$$

corresponding to each k-interval, considering risk aversion $L=1\times10^{-4}$ and $\alpha_\infty$=0.

Figure 12:
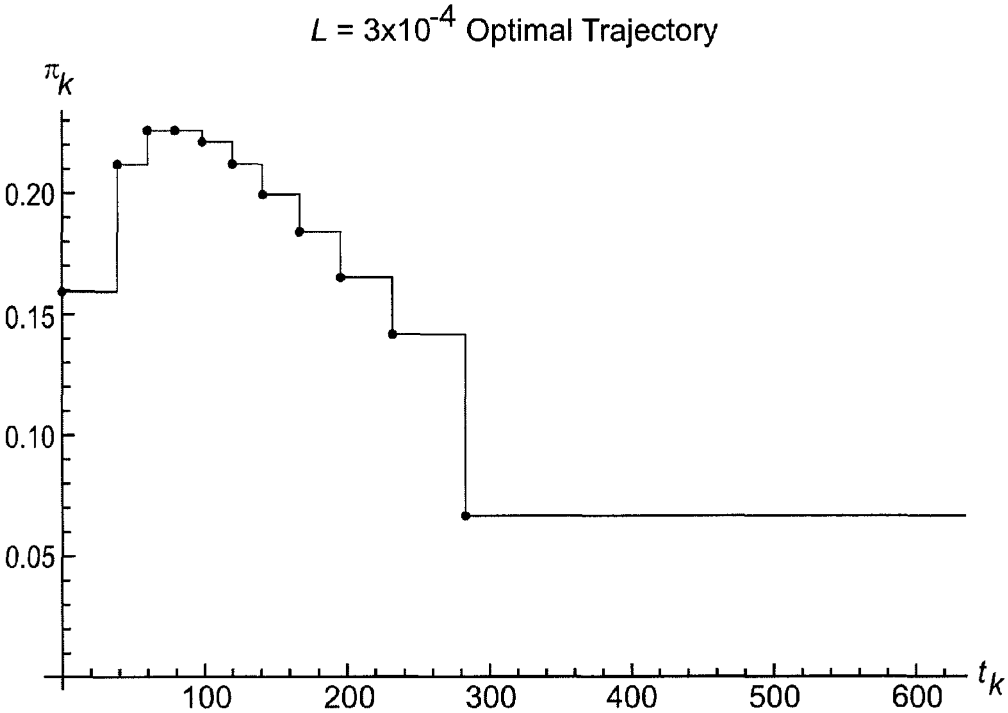

FIG. 12 depicts participation rate in function of the transactional time, $$t_k = \sum_{i=1}^{k} \pi_i^{-2},$$

corresponding to each k-interval, considering risk aversion $L=3\times10^{-4}$ and $\alpha_\infty$=0.

Figure 13:
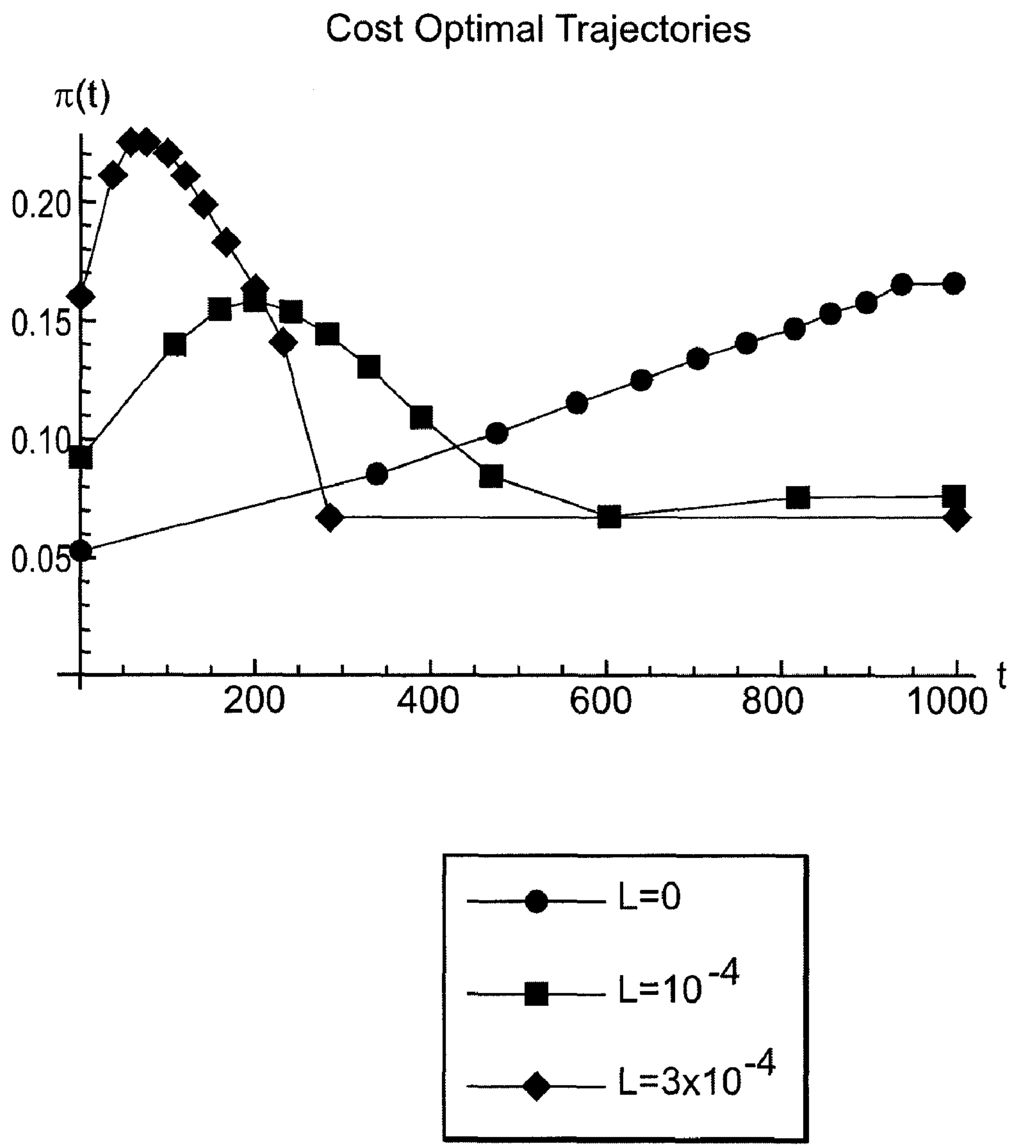
FIG. 13 depicts a comparative graph of optimal trajectories in function of transactional time for different values of risk aversion.

FIG. 13 depicts a comparative graph for the different values of the risk aversion in the quadratic approximation or continuum. In particular, FIG. 13 depicts a comparative graph of optimal trajectories in function of the transactional time for the different values of the risk aversion and $\alpha_\infty$=0 in the quadratic approximation or continuum.

4. Conclusions for this Section

Execution schedules are described above that minimize cost functions originating from the hidden order arbitrage impact model with several optimization objectives: first, considering short-term alpha decay profiles typical of real-world trading situations, and second, considering the risk-adjusted optimization problem in absence of short-term alpha.

4.1 Main Results in Absence of Short-Term Alpha

Shortfall minimization in absence of alpha requires back loading, which increases execution risk. Optimal solutions for risk-averse traders are less front-loaded than suggested by AC2000 and avoid an aggressive trade start.

Figure 14:
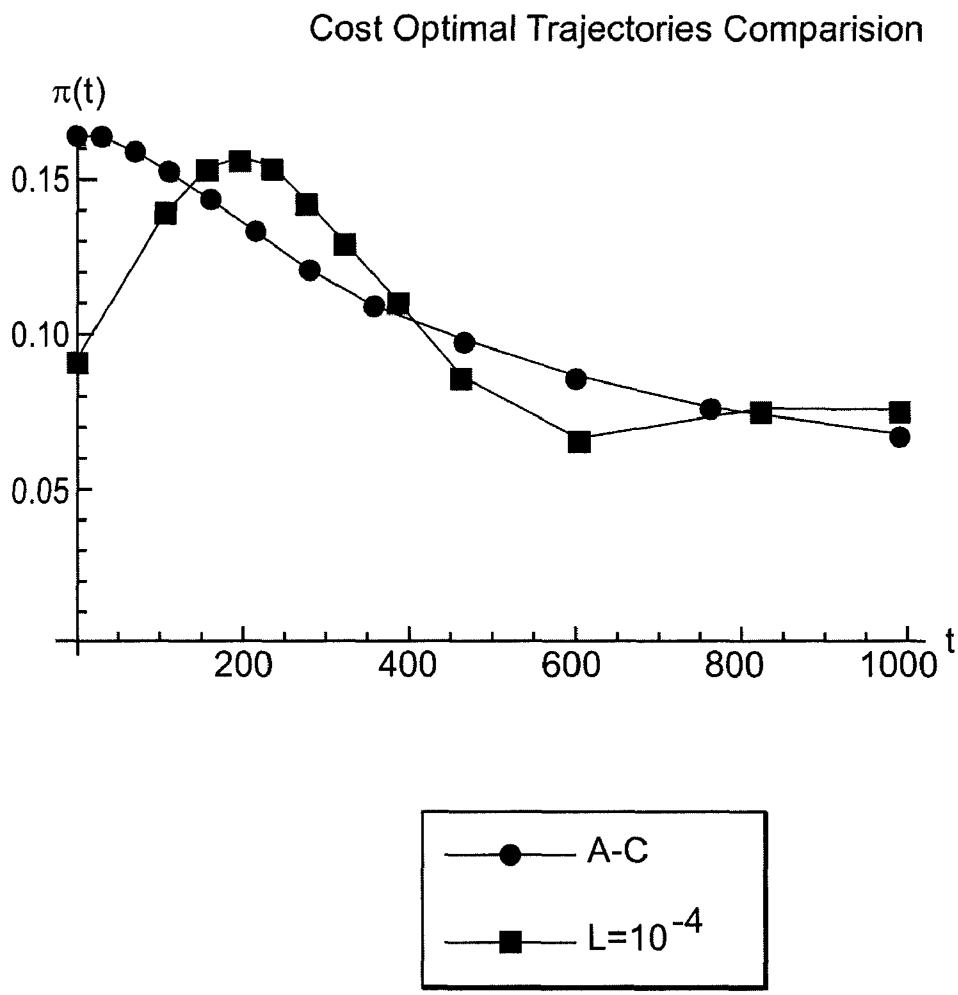
FIG. 14 depicts a comparative graph of cost optimal trajectories in function of transactional time.

FIG. 14 depicts a graph of the optimal risk averse trajectories for the information arbitrage theory with $L=10^{-4}$ in comparison to the Almgren-Chriss formulation (AC2000). For a buy, $$\pi_j^{A-C} = \frac{\sinh(\kappa T)}{2X\sinh\left(\frac{\kappa T}{2}\right)\cosh\left(\kappa\left(j-\frac{1}{2}\right)\tau\right)},\ X = 100,$$

$$T = 165\ \text{minutes} = 0.423\ \text{day},\ \kappa \sim \frac{3.83}{\text{day}},\ \tau = 15\ \text{minutes} = 0.0384\ \text{day}.$$

The shortfall calculated with the optimal Almgren-Chriss trajectory for a risk averse constant $$\lambda(\text{Almgren}-\text{Chriss}) = \frac{10^{-5}}{\$}$$

is $E(\{\pi_j^{A\text{-}C}\}_{j=1}^{11})=6879.05\$$. This is 5.5% costlier than the shortfall $$E(\text{optimal}) = 6520.5\$ \text{ for } \lambda = 3.49 \times \frac{10^{-5}}{\$},$$

and 9.8% costlier than a constant 10% participation rate strategy.

FIG. 14 depicts a comparative graph of the cost optimal trajectories in function of the transactional time. Dot-line is the solution predicted by Almgren-Chriss formulation with linear impact and risk averse constant $$\lambda(\text{Almgren}-\text{Chriss}) = \frac{10^{-5}}{\$}.$$

Square-line is the optimal trajectory for the non-linear information arbitrage theory, as shown in FIG. 11, for risk averse constant $L=10^{-4}$ or $$L = 10^{-4} \text{ or } \lambda = 3.49 \times \frac{10^{-5}}{\$}.$$

4.2 Main Results with Adverse Short-Term Alpha

Cost-optimal strategies are described above with moderate urgency levels that are front-loaded in a manner similar to the optimal solution from hidden order arbitrage theory with risk aversion and no alpha. Large trades with very high urgency gain little from a rapid start due to the insufficient time available to trade before alpha decay takes place; only the strongest short-term alpha decay profiles justify front-loading such large trades. In other cases, it is optimal to ignore the alpha decay and execute using a profile similar to the zero-alpha case.

Comparing these results to the prevalent practices at institutional trading desks, there is support for the common practice of using risk averse execution strategies in presence of short-term alpha. There are two significant differences in the trading solutions:

1) Institutional desks tend to front-load the execution more than is suggested by the above results. They adopt a front-loading profile with a monotonically decreasing participation rate, often explicitly implementing the Almgren Chriss model. This practice increases early signaling and results in higher shortfalls.
2) Uninformed trades are generally executed using constant participation rate schedules such as VWAP algorithms, whereas the above results indicate that using some back loading may be preferable.

Both deviations have the effect of reducing execution risk but increasing trading costs on average. The industry's preference for risk aversion may be motivated, in part, by imperfect communication between the portfolio manager and the trading desk. In the absence of a precise understanding of what the trading desk is doing, portfolio managers naturally respond asymmetrically, blaming the desk for large negative results and not offering corresponding praise for large positive results. Also, contributing to this, a large positive trading P&L for the desk will only occur when the portfolio manager's decision was quite wrong in the short term (a buy order preceding a large drop in the price, or vice versa). If a poor trade decision is executed too fast, the desk is less likely to hear from the manager; but the same is not true for a good trading decision that was started too slowly. A similar economic distortion exists for broker-dealers handling institutional orders—in part, for precisely the same reasons; but also because the broker dealer is compensated by commissions on executed shares. There is an additional incentive to start executions quickly to lock in the commission before the order is canceled.

Ultimately, it is the aggregate shortfall, and not execution risk, that impacts fund performance, and the economic distortions mentioned above contribute negatively to fund rankings. For example, a 10 bps reduction in trading costs would translate to an improvement of 10 places in Bloomberg's ranking of US mutual funds in the "balanced" category. There are 1364 funds in that category for which one-year rate of returns is reported.

These economic distortions may be rectified if institutional desks are able to measure trading costs effectively and rate execution providers accurately. This, however, is complicated by the fact that post-trade data analysis must deal with complex issues that can easily dominate the results and blur interpretation.

First, among these, is the use of limit prices. Limits are used to achieve a better average price for a trade, but occasionally lead to incomplete executions. The opportunity cost of the unfilled shares must be accounted for to evaluate the results, but opportunity costs depend on other decisions made by the manager. For example, were the unfilled shares replaced by an order in a different, correlated security? Or were they no longer needed because of redemptions from the fund?

Second, for large institutions it is common for large trades to execute over a period of weeks or even months. The trade size is likely to be adjusted multiple times, and the adjustments themselves depend on the progress in executing the trade. Again, this greatly complicates the task of measuring opportunity costs. Because of these difficulties, it is common practice to analyze post-trade results mainly in terms of realized shortfalls without accounting for unfilled shares. Unfortunately, this makes post-trade analysis entirely worthless, as may be illustrated with a simple example: if a trader mistrusts a particular broker she is likely to set limit prices close to arrival to avoid impact. Given such a limit, the trade can only complete if price moves favorably, in which case the trading P&L is positive. In this hypothetical situation, the mistrusted broker will most likely be near the top of any ranking of providers by implementation shortfall. The opposite case, where a broker is trusted and given difficult orders with no limit, will result in higher average implementation shortfalls. Trading desks are aware of these issues and mostly ignore post-trade transaction cost analysis (TCA).

Post trade analysis methods that fairly account for opportunity costs do exist, see for example (Gomes and Waelbroeck, 2010), but their implementation by post-trade TCA vendors is complicated by the fact that most post-trade data systems today do not include the limit price used on institutional orders.

REFERENCES

Almgren, R. and Chriss, N. (2000). Optimal Execution of Portafolio Transactions. *Journal of Risk,* 3(2):5-39.

Almgren, R. (2003). Optimal execution with nonlinear impact functions and trading-enhanced risk. *Applied Mathematical Finance,* 10, 1-18.

Almgren, R., Thum, C., Hauptmann E., Li, H. (2005). Direct Estimation of Equity Market Impact. *Risk,* 18, 57-62.

Bertismas, D., and Lo, A. (1998). Optimal control of execution costs. *Journal of Financial Markets,* 1, 1-50.

Bouchaud, J-P., Farmer, J. D., Lillo, F. (2008) How markets slowly digest changes in supply and demand. *Handbook of Financial Markets: Dynamics and Evolution,* 57-156. Eds. Thorsten Hens and Klaus Schenk-Hoppe. Elsevier: Academic Press, 2008.

Chan, L. K. C., and Lakonishok, J. (1995). The behavior of stock prices around institutional trades. *The Journal of Finance,* 50, 1147-1174.

Chan, L. K. C., and Lakonishok, J. (1993). Institutional trades and intraday stock price behavior. *Journal of Financial Economics,* 33, 173-199.

Criscuolo, A. M., and Waelbroeck, H. (2010). Optimal execution in Presence of Hidden Order Arbitrage. Pipeline Preprint PIPE-2011-01.

Farmer, J. D., Gerig, A., Lillo F., Waelbroeck H. (2009). Fair pricing and the market impact of large institutional trades. In preparation.

Gabaix, X., Gopikrishnan, P., Plerou, V. and Stanley, H. E. (2006). Institutional investors and stock market volatility. *Quarterly Journal of Economics,* 121, 461-504.

Gomes, C. and Waelbroeck, H. (2008). *Effect of Trading Velocity and Limit Prices on Implementation Shortfall.* Pipeline Financial Group Preprint PIPE-2008-09-003.

Gomes, C. and Waelbroeck, H. (2010).

Gopikrishnan, P., Plerou, V., Gabaix, X., Stanley, H. E. (2000). Statistical Properties of Share Volume Traded in Financial Markets. *Physical Review E,* 62(4):R4493-R4496.

Hora, M. (2006). The Practice of Optimal Execution. *Algorithmic Trading* 2, 52-60.

Lillo, F., Farmer, J. D., and Mantegna, R. N. (2003). Master Curve for Price-Impact Function. *Nature,* 421, 129-130.

Loeb, T. F. (1983). Trading Cost: The critical link between investment information and results. *Financial Analysts Journal,* 39(3):39-44.

Moro, E., Moyano, L. G., Vicente, J., Gerig, A., Farmer, J. D., Vaglica, G., Lillo, F., and Mantegna, R. N. (2009). Market impact and trading protocols of hidden orders in stock markets. *Technical Report.*

Obizhaeva, A., and Wang, J. (2006). Optimal trading strategy and supply/demand dynamics. *Technical Report. AFA* 2006 *Boston Meetings Paper.*

Torre, N. (1997). *Market Impact Model Handbook.* Berkeley: Barra Inc.

Exemplary Client Data Processing

The sections above describe an impact modeling framework based on hidden order arbitrage theory and demonstrate with some examples how this framework enables the computation of optimal execution strategies given a knowledge of the bias in order flow or short-term alpha.

Order flow bias can be estimated using methods known in the art such as regressions. Other embodiments with greater accuracy for order flow prediction will be envisioned by those skilled in the art. The prediction of short-term alpha, on the other hand, is not known in the art: in fact, the present inventors have argued that price should be arbitrage-free, which appears to preclude the possibility of predicting short-term alpha. Yet embodiments of the present invention are described herein that do in fact predict short-term alpha profiles and additionally associate optimal execution profiles using the methods described above. Predicting a short-term alpha profile rests on two points: first, that the knowledge of a hidden order arrival in itself constitutes private information—there is no reason for the market to be efficient to this information because it is not disclosed. A good example where this may lead to short-term alpha is the case where a stock has been sold heavily and liquidity providers have retreated due to fears of more selling to come—an effect known as liquidity exhaustion; the price at that point accounts for a risk that no buyer will show up in the short-term to meet the liquidity needs of the seller, even though the security may be underpriced relative to the expected worth of the issuer. In this case, the arrival of a buy order from an institutional portfolio manager in itself removes the liquidity exhaustion risk and therefore carries substantial short-term alpha. Second, different portfolio managers are reasonably likely to think coherently, either because a particular investment style is currently in fashion, or because their reasoning is influenced by analysts that publish reports, or because one portfolio manager decides to step in to provide liquidity after observing what she perceives as being excessive impact by another. In all these cases, even though price may be perfectly efficient based on publicly available information, the knowledge of one portfolio manager's trade start informs about the likely actions of other portfolio managers whose actions would not otherwise be known to the market, and whose orders would likely impact prices. The effect of all other portfolio managers on the security price in this case constitutes impact-free returns.

The following two sections describe a methodology that enables the estimation of short-term alpha based on data available at the start of the trade and further during the execution process. Exemplary embodiments of the method may rely on a detailed analysis of historical trade data representing the arrival of institutional orders and the results of their execution. In a first step, the impact-free price is estimated for each historical trade. In a second step, the impact of alternative strategies, such as 5%, 10%, and 20% participation strategies, may be estimated using the same impact model, and the corresponding trade results for each alternative strategy may be computed. In a third step, the historical trade arrivals data may be enriched to add columns representing all the information known at the time of trade start; each information item is known as a "factor" in the art of factor analysis.

In a fourth step, data mining methods may be used to identify the conditions at the time of trade start that are most predictive of any one of the benchmark strategies being optimal. As discussed, the result of the predictive data mining effort may be a set of schemata which are combinations of factors that were historically associated with one of three classes, being the alpha class, negative alpha class, or "others". A factor may be categorical, such as "Buy" or "Sell", or it may be a range of values, such as volatility between 20% and 50%. Each schemata matches with a subset of historical trades, which is the subset of trades for which each factor is present. In a fifth step one may compute the average impact-free return in this subset at different time points such as 5, 15, 30 minutes after arrival and at the close, for example. This average impact-free return as a function of time is the alpha profile for the specified schemata.

In a sixth step the alpha profile may be stored in computer memory. In a seventh step, upon receiving an order from a user of the subject system, the data representing the state of the market at order arrival may be calculated; each schemata may be tested in rank order until one matches in every factor. In step eight, the alpha profile associated with the first matching schemata may be returned to the user together with a description of the factors that led to its selection. In step nine, the system may further select an execution strategy designed as indicated herein to be optimal (or near optimal) given the alpha profile, and in step 10 the system may implement that execution strategy.

In alternate embodiments, all schemata may be evaluated; each schemata may recommend a particular execution strategy. If more than one schemata matches with the state of the market a voting rule may be used to determine which execution strategy should be selected, and the weighted average alpha profile may be sent to the user, where the same voting weights may be used as for selecting the execution strategy.

In an exemplary embodiment, the class of trades for which the 20% participation rate is optimal is called "alpha" class; this constitutes approximately 16% of the sample. Vice versa, the 16% of trades for which the 5% participation rate most outperforms the 10% benchmark is referred to as the "negative alpha" class. The predictive data mining problem is therefore transformed into a classification problem for which methods are known in the art of associative classification. The task therein is to find combinations of factors that best classify alpha or negative alpha. The remainder of this section describes in more detail how the data provided by a client may be transformed to enable the estimation of the impact-free price, and enriched with factors. This sets the stage for the predictive data mining problem.

One or more exemplary embodiments provide a post-trade data enrichment process combining elements from and ultimately replacing an algo_segments_cust table and enriched client data tables. The enriched data enable consultation with clients on how to better use speed controls and limits, and support alpha profiling research.

An "actionable TCA" approach predicts the outcome of various implementable execution strategies given the state of the market, information in the OMS order, and when available, a portfolio manager's trading history. The results may be used to evaluate the past, or in an Alpha Pro environment (one or more embodiment are labeled "Alpha Pro" herein, for ease of reference only), advise optimal execution choices in real time.

When a variety of formats for inputs and outputs leading to difficulties in debugging and enhancements are used, universe comparisons may very difficult to deploy. New columns developed for one client don't automatically apply to others leading to unequal service levels.

The purpose of this section is to describe requirements for exemplary embodiments comprising a standardized process that may consume a standardized input file representing pieces of trades that are of individual interest to a client (such as broker placements, limit price segments of trading system activity, or PM (portfolio manager)-specific orders), and produce standardized output files enabling optimization of the individual trade piece after accounting for the impact of all trades from a given desk.

Corporate Actions

{corporate action data}→daily normalization factors

Corporate actions cause renormalization of stock prices and name changes; in more complex cases custom code may be used to extend a series using calculated prices and volumes. Renormalization factors provide the scale for measuring prices on each day and symbol. See corporate action requirements for details.

Aggregating Impact from a Trading Desk

One client (trading desk) may provide data representing multiple trades on the same symbol and side; various trades may originate from different managers, or be executed via different traders. If one were to look at each trade individually, a recommendation to trade fast is likely, simply to get ahead of other trades from the same desk—impact from other trades gets confused for underlying alpha. To avoid this problem, it is desirable to remove impact from a client's overall activity, rather than only for an individual trade. Impact-free prices may be calculated after removing the impact from the entire trading desk.

FIG. 24 depicts certain exemplary processes and tables.

Enriched Fills Table

Partial fills if provided by the client, may be enriched with quote matching logic to support impact estimation and research.

Trades Table

The trades table is the basic input for analysis, in standardized form. The impact model process consumes trades and produces segments and impact tables. These in turn enable enrichment of the trades table, and of other aggregates. The enriched trades table is used to advise the client on optimal decisions at the aggregation level they choose in their own reporting.

Segments Table

Transforming the raw trade data into segments is an important step in the process of estimating the impact of the trading desk. A segment is a non-overlapping trading periods during which the trading desk is trading continually at a more or less uniform speed.

Client Impact Table

Client impacts tables have estimated impacts at 5-minute timestamps, broken down as estimated permanent impact and estimated temporary impact.

The impact model (described below) may consume segments and 5-minute aggregate market data and produce 5-minute impact values.

Enriched Trades Table; Daily Updates

The main output table may include all the alternate strategy evaluation items required to analyze optimal trading decisions, in addition to the inputs including drivers and model outputs, news drivers, specifics of the order, etc. Care should be taken so that the expected large number of columns does not make access to data exceedingly slow; each trade is likely to have about 1000 relevant variables, counting both inputs and outputs.

Multi-day trades: separate columns will provide the additional information providing the context, minimally including the variables available as filter conditions in sortd "was trading yesterday" requirements.

TCA tables must be able to process new trade information daily. Some fields (like returns to T+5, or PWP5 for a large trade) cannot be computed on the trade day close, but may become available a number of days after the trade. Fields that cannot be computed may be left as missing values or set to temporary values (for example, mark-to-market at the last sale price); a daily process may look for missing values and temporary values and attempt to fill them in.

Trade Segments Table

Derived from segments, this table may have the same structure as the trades table and data may be enriched for analysis.

Trade Megablocks Table

Aggregation of trades into megablocks, in the same format as the trades table.

Enriched Trade Segments Table

Provides enriched data on trade segments. Required to advise clients on broker performance, and the effect of speed and limit decisions.

Enriched Megablocks table

Provides enriched data on megablocks. May be required to advise at the trading desk level on trade urgency, scaling, block exposure and strategic limits.

Systematic QA

All specifications below may have a QA range and Missing value column: if the value cannot be calculated or falls outside the QA Range, the error may be documented in human-readable file for review by Research and flagged as "major". The record in the output file will be flagged as QA=Failed until these errors are resolved so it does not contaminate research results. In addition, researchers may over time submit scripts to check data and flag certain conditions with a specific error code in the QA column.

For optional fields, missing values are simply left blank. In other cases missing values will be set to a specified default value, like 999, when the fact that the value is missing is in itself informative to data mining.

QA checks: some optional fields may have QA ranges; values outside this range will be documented as "minor" error in the human-readable file for review by researchers. Other fields will require checking relative to another, as specified in the QA section of this document. For example, an alert may be required if a price is more than 20% larger or smaller than another price for the same trade record. Such checks may produce human-readable output to an error file for examination by researchers.

Input File Specification

The TCA process requires at least a ticket-level input file[5], and optionally a partial fills file. The partial fills file may contain the basic elements of enriched fills data as defined in a data warehouse, and a ticket-ID indicating to which ticket the fill belongs. One may have various aggregation levels where "tickets" capture bigger or smaller aggregates of partial fills, but each fill may belong to one and only one ticket within a given aggregation level. Thus, partial fills may have several ticket-IDs pointing to their membership in different aggregations.

[5]Occasionally, tickets may be duplicated to reflect multiple allocations to different accounts.

A "ticket" is the basic entity to be analyzed for TCA and optimal execution purposes. A ticket may be any of the following aggregation options: broker placement, segment, PM_Order-ID[6], block-ID, "megablock". The placement, order and block aggregations are defined by the client. One may define segments and megablocks at the desk level; megablocks represent multiple days of trading on the same symbol and side.

[6]In many environments, order_id refers to a placement from the trading desk to the broker, not from the PM to the trading desk.

This section provides an exemplary definition for a data structure representing a "ticket". Downstream processes may be universal—i.e., processing may be the same regardless of whether the ticket represents trade segments, PM trades, or broker placements. The context of a ticket relative to the rest of a trading desk's activity may be captured in two ways.

(1) The impact-free price calculation may strip out impact from the entire desk, and (2) The output table, an enriched ticket-level data, may comprise columns identifying the context of this ticket in a larger block.

TABLE 9

| Field | Description/notes | Type | QA Range | Missing value? |
|---|---|---|---|---|
| PM DECISION | | | | |
| Trade_dt_key | Date at which this trade record started (key) | | | Required |
| Trade_ID | Unique identifier of this trade record (key) | | | Required |
| QA | Flag identifying possible quality issues with this record. Set only if there is a known problem | String | n.a. | Optional |
| Firm | Identifies the firm originating the order (trading desk). All orders on the same symbol/side from the same firm will be considered in estimating impact-free returns | String | n.a. | Required |
| PM_Order_ID | Client-provided order-ID, for cross-validation versus the client's TCA | String | n.a. | Optional |
| Side | The side of the trade | Enum | B, S, BC, SS | Required |
| Symbol | The symbol identifies the security within the trading system environment, and must enable discovery of primary exchange, volatility, beta, currency, etc., and have available market data | String | Must exist in trading system universe | Required |
| PM_Ordered_Qty | Shares ordered by the PM, if known | Long | 1-10^9 | Required |
| PM_Limit | Limit price from the PM, if known. Market = "0". Unavailable means it is unknown whether there was a limit | Float | 0-10^6 | Optional |
| Order_Creator | Name of PM, if available | String | n.a. | Optional |
| Product | | String | n.a. | Optional |
| Sub_Product | | String | n.a. | Optional |
| Type | Classifies the trade by type (cash flow; etc.) Trade intention from OMS data | String | n.a. | Optional |
| Instructions | Execution instructions, if available | String | n.a. | Optional |

TABLE 9-continued

| Field | Description/notes | Type | QA Range | Missing value? |
|---|---|---|---|---|
| Decision Time | Time of the trade decision, if available. First decision time if multiple. Decision time if available is usually in an allocations table where there is a sequence for the multiple accounts under the same PM. | Date Time | n.a. | Optional |
| Creation Time | Time of the trade creation in the OMS | Date Time | n.a. | Optional |
| TRADER DECISION | | | | |
| Trader | Trader name | String | n.a. | Required |
| Block_ID | Client-provided block-ID, if any, revealing the manner in which the trading desk blocks orders from various PMs | String | n.a. | Optional |
| Order_ID | Client-provided order-ID, or for trading system algo segments the combination of order_ID and lpchange_segment | String | n.a. | Required |
| Arrival_Time | Date/Time at which the trade is allowed to start (for example, 9:30AM for continuation of a multi-day trade) This is the creation time if OMS data is available, else the submit time in trading system data. | Date Time | Within market hours | Required |
| Placement_Time | Date/Time at which the trade actually starts (for example, first broker placement time) | Date Time | Within market hours | Required |
| Start_time | Time of First fill | | | |
| Ordered_Qty | Shares ordered | Long | 1-10^9 | Required |
| Broker | Broker the order was originally placed with. For trading system SB trades, concatenate preferred SB broker. Example: “Pipe” “Pipe.GS”, “Citi-Algo”. Broker names may be specific to a given client | String | n.a. | Optional |
| First_Strategy | For trading system trades, the execution strategy the ticket was originally assigned to, if known. For other brokers, enter the broker of record on the first placement. Examples: “TL AlphaT”, “Trickle” “Citi-Algo” | String | n.a. | Optional |
| Second_Strategy | If strategy was modified within the span of the ticket, the second one. Examples: “TL Muni.Mv”,“ANoser” | String | n.a. | Optional |
| Last_Strategy | Strategy in force at completion/cancel of the ticket | String | n.a. | Optional |
| First_Limit_Price | If available, the limit price at start of the trade. 0=MKT, unavailable = don't know | Float | 0-10^6 | Optional |
| Last_Limit_Price | If available, the limit at completion/cancel | Float | 0-10^6 | Optional |
| RESULTS | | | | |
| Filled_Qty | Shares filled | Long | 1-10^9 | Required |
| Filled_Price | Share-weighted average price of executed shares | Float | 0.01-10^6 | Required |
| Limit_Tape | Tape volume below (above) the highest (lowest) known limit price, if available, from start_time to end_time | Long | 1-10^9 | Optional |
| Limit_Participation | If First_Limit_Price = Last_Limit_Price, Filled_Qty/Limit_Tape, else unavailable | Float | 0-1 | Optional |
| End_Time | Date/Time of end of trading | Date Time | Within market hours | Required |
| Total tape | Tape volume from start to end | | | |

Segmenting Client Trade Data

Segments are non-overlapping, trading segments on a firm, symbol, side, (and broker, limit), presumed to be trading with a uniform participation rate and a unique limit price or market. The segment data enables estimating impact to build the "impact-free price" and provides an empirical dataset for ongoing research on impact models. Because trades can overlap, segments do not link to a unique trade_ID, rather they are associated to a firm, day, symbol and side.

TABLE 10

| Name | Description | Type | QA range | Missing value? |
|---|---|---|---|---|
| Trade_dt_key | Date of the segment (key) | | n.a. | Required |
| Segment_ID | Unique identifier of the segment (key) | | n.a. | Required |
| QA | Flag identifying possible quality issues with this record. Set only if there is a known problem | String | n.a. | Optional |
| Firm | Identifies the trading desk whose impact is being estimated | String | n.a. | Required |
| Megablock_ID | Unique identifier for all trades from the same firm, on the same side, symbol and same or consecutive trading days, or with the same client-provided block-ID | | n.a. | Required |
| Start_Time | Start of the segment | Date Time | Market hours | Required |
| End_Time | End of the segment | Date Time | Market hours | Required |
| SVD_Start | Normalized time of day for segment start according to the smile curve (SVD model) | Float | 0-1 | Required |
| SVD_End | | Float | 0-1 | Required |
| Side | The side of the trade | Enum | B, S, BC, SS | Required |
| Symbol | Unique description of the security in the trading system universe | String | Must be in the trading system universe | Required |
| Filled_Shares | Shares filled in the segment | Long | 1-10^9 | Required |
| Filled_Price | Share-weighted average price of shares filled in the segment | Long | 1-10^9 | Required |
| Block_Shares | Shares filled in the segment counting only prints of at least 10000 shares | Long | 1-10^9 | Required |
| Block_Price | Share-weighted average price of block fills in the segment | Long | 1-10^9 | Required |
| Segment_Tape | The tape volume from start to end | Long | 1-10^9 | Required |
| Day_tape | Actual tape volume for this day | Long | Filled Shares-10^10 | Required |
| Prior_tape | Tape volume since the open, prior to start. | Long | | |
| Limit_Price | The presumed limit price, 0=MKT | Float | 0-10^6 | Required |
| Limit_Tape | The tape volume from start to end, counting only prints below (above) the limit price for B or BC (S or SS) | Long | 1-10^9 | Required |
| BB_VOL | Annualized volatility, from Bloomberg, in percent | Float | 1-999 | Required |
| ADV | Average Daily Volume, from Bloomberg | Long | 1-10^10 | Required |
| Beta | Beta, from Bloomberg | Float | 0.01-99 | Required |
| Broker_Code | Identifies the broker | String | n.a. | Optional |
| Algo_Data | Any data about the method used by the broker to execute, such as algo name, broker sub-code, etc. | String | n.a. | Optional |
| Seg_Num | Number of this segment in a sequence of segments from the same trading desk, symbol and side (megablock) | Int | 1-999 | Required |
| Prior_Seg_ID | ID of the most recent segment prior to this one, if any. Segments are ordered by start date/time | Int | 1-999 | Required |
| Tape_Last_Seg | Tape volume elapsed since end of last segment. If the prior segment was on the previous trading day, do not count the overnight tape but instead add 0.25 * ADV for the overnight. NOTE: calendar days will be used for the purpose of overnight information decay measures: the gap from Friday | Long | 0-10^10 | Required |

TABLE 10-continued

| Name | Description | Type | QA range | Missing value? |
|---|---|---|---|---|
| | close to Monday open comprises three overnight steps so one may model the weekend tape as 0.75*ADV, but trade segments on Friday and Monday will belong to the same megablock. Set to 9 if this is the first segment, 0 if the segment immediately follows a previous one. | | | |
| Time_Last_Seg | SVD time elapsed since end of prior segment. If the prior segment was on the previous trading day, add 0.25 for the overnight gap. Set to 9 if this is the first segment, 0 if it is immediately follows a prior segment | Float | 0-9 | Required |
| Last_Filled | Shares filled on the megablock as of the end of the past segment. Values 0 or 9 as above | Long | 0-10^9 | Required |
| Last_Tape | Tape accrued from the start of the megablock to the end of the last segment, + 0.25 * ADV for every overnight gap. Values 0 or 9 as above | Long | 0-10^10 | Required |
| Last_TI | Temporary impact accrued as of the end of the last segment, in basis points | Float | 0-999 | Required |
| Last_PI | Permanent impact accrued as of the end of the last segment, in basis points | Float | 0-999 | Required |
| Start_Price | NBBO Midpoint at start | Float | 0.0-10^6 | Required |
| Start_SPY | SPY Midpoint at start | Float | 10-999 | Required |
| Start_ETF | ETF Midpoint at start | Float | 1-9999 | Required |
| 5min_Price | NBBO Midpoint 5 minutes after start | Float | 0.01-10^6 | Required |
| 5min_SPY | SPY Midpoint 5 minutes after start | Float | 10-999 | Required |
| 5min_ETF | ETF Midpoint 5 minutes after start | Float | 1-9999 | Required |
| 5min_P | Passive fills in the first 5 minutes classified as BUY (i.e. on the offer against displayed liquidity) for a sell trade, or SELL for a buy trade. | Int | 1-10^9 | Required |
| 5min_A | Aggressive Fills in the first 5 minutes, classified as BUY (i.e. on the offer against displayed liquidity) for a buy trade, or SELL for a sell trade. | Int | 1-10^9 | Required |
| 5min_DP | Dark Passive Fills in the first 5 minutes classified as DARK BUY (i.e. on the offer against hidden liquidity) for a sell trade, or DARK SELL for a buy trade. | Int | 1-10^9 | Required |
| 5min_DA | Dark aggressive fills in the first 5 minutes classified as BUY (i.e. on the offer against displayed liquidity) for a sell trade, or SELL for a buy trade. | Int | 1-10^9 | Required |
| 5min_DX | Dark Cross fills in the first 5 minutes, classified as dark cross. | Int | 1-10^9 | Required |
| 5min_Async | Other fills in the first 5 min. | Int | 1-10^8 | Required |
| 10min_(etc-9 columns) | Same columns as for 5 min above, but for the first 10 minutes if the trade is still active beyond the first 5-minute interval, else n.a. | Int | 1-10^8 | Required |
| 15min_(etc) | Same columns as for 5 min above, but for the first 15 minutes, if the trade goes beyond 10. | Int | (as above) | (as above) |
| 20min_(etc) | Same columns as for 5 min above, but for the first 20 minutes if the trade goes beyond 15. | Int | | |
| 30min_(etc) | Same columns as for 5 min above, but for the first 30 minutes if the trade goes beyond 20. | Int | | |
| 60min_(etc) | Same columns as for 5 min above, but for the first 60 minutes if the trade goes beyond 30. | Int | | |
| Spread | | | | |

1. Client Submits Partial Fills Data.

Segments are built using the 1-minute Tickdata and client fills data.

For each symbol, order all fills in chronological order. Step (A) is the identification of a segment start with a measurable participation rate. The first minute interval containing a fill starts the segment. Extend the segment forward minute by minute and read the fills file counting total tape and total number of shares filled until it is determined that a participation rate can be measured reliably. At each step the participation rate is tentatively estimated as rate=(filled shares)/(tape), both counted from the beginning of the segment. A trade is considered to have a measurable participation rate if the number of minute-intervals with fills is at least Max(5, 1/rate), or the number of minute-intervals is at least 5 and the shares filled amount to at least 250/rate. An exemplary algorithm to search for a measurable participation rate will not extend beyond 60 minutes. If at 60 minutes the above conditions are still not met, the segment is deemed to have started at the first partial fill in those 60 minutes and ended at the last fill in the same 60-minute interval.

In other cases, one has an interval with a measurable participation rate; this starts a segment. The next step (B) in the segment algorithm is to determine where the segment ends. For this purpose one may look forward by increments of Max(5, 1/rate) minute intervals. In each step forward, observe the participation rate in the new interval, test to see if it is similar to the previous rate, and if so add it to the segment. The similarity test is based on an approximate formula for the 95% confidence interval of the Poisson distribution. Let x=Max(5, 1/rate). The lower bound of the confidence interval will be violated if the ratio of the rate in the new interval to the previous rate is less than 0.15* power(x, 0.4). The upper bound will be violated if it is greater than 3* Power(x, −0.2).

Thus, for example, if one has observed a participation rate of 10%, x=10, the above ratios are 0.377 and 1.893 respectively, the confidence interval in this example is therefore [3.77%, 18.93%]. If the rate in the new interval lies outside this confidence interval, the segment closes at the last fill in the previous segment and a new segment begins at the first fill in the new interval. Else, the interval is added to the segment, the measured participation rate is updated to incorporate the new interval, and one may go to step (B) above.

The first fill following a closed segment starts a new segment as in step (A) above.

2. Client Submits Placements Data Only

If the placements do not overlap, each placement is a segment. Overlapping placements may be merged and handled as a single segment. In other words, the segment may extend from the start time of the first placement to the end time of the last placement; the filled shares may be the total sum of filled shares of overlapping placements.

3. Client submits placements data and partial fills data (case 2 or 3—never seen case 1 only)

If the placement overlaps with another placement from the same firm, one may ignore the placements information and process partial fill as in 1. above. The description below handles non-overlapping placements.

One may test the assumption that each placement has a uniform participation rate and possibly a limit. First, if the limit price on the placement is not one of the fields, determine empirically whether it seems that there was a limit. For a buy: start with a price 10% from the high of the range within the interval from start to end of the placement. (a) Count the number of tape shares above this price and filled shares above this price. (b) If there are filled shares, assume that the placement was a market order. (c) Else, if the tape shares above this price is at least 5% of the total tape during the placement, the limit will be the highest partial fill price. (d) Else, consider a price 20% from the high of the range and continue as in (a) above. This algorithm stops when one has either determined that the placement was a market order or has a presumed limit price.

Next, one may test the uniform participation rate as follows. Divide the placement in two halves; in each half determine the limit rate as the filled shares divided by the tape counting only prints below the limit (above for sells). If the difference between the first half participation and second half participation is less than 50% of the average, one may consider the placement to be a single segment. Else, one may ignore the placement information and process the partial fills in the placement as in case 1. above.

Client Impact Table

Purpose: produce impact adjustments, in basis points, at 5-minute ticks, up to 10 trading days after the last close following the end of the megablock. Note, if a new megablock starts before these 10 days are expired, there may be multiple records with the same symbol, side and trade_dt_key but with different megablock_IDs; the total impact of the firm in this case is the sum of the overlapping megablock impacts.

Process: (daily,)

read the day's segments and 5-minute aggregate market data read stored data on impact from last segment, if any, today or in the previous trading day estimate impact at each 5-minute segment close for the day The impact mode is based on a breakdown of fills into trade segments. One may count the off-market period as 90 minutes (this correctly accounts for the standard deviation of overnight gaps as a contribution to annualized volatility, after removing 1% outliers). Segments never carry across multiple days.

The impact is the sum of intra-segment total impact decay of temporary impact of prior segments (exponential)

decay of permanent impact of prior segments (power-law)

An exemplary impact model is specified below. The output will give 5-minute impacts up to 10 days after the end of the last segment.

TABLE 11

| Name | Description | Type | QA Range | Missing value? |
|---|---|---|---|---|
| Trade_dt_key | Date of the impact record (key) | | | |
| QA | Flags potential problems with the data; empty if OK | String | n.a. | Required |
| Firm | Identifies the trading desk for which one is examining impact | String | n.a. | Required |
| Megablock-ID | Identifies a megablock comprising segments on the same symbol, side and consecutive trading days | | n.a. | Required |

TABLE 11-continued

| Name | Description | Type | QA Range | Missing value? |
|---|---|---|---|---|
| Symbol | The symbol for which one has impact (key) | String | n.a. | Required |
| Side | Side of the megablock | String | n.a. | Required |
| Time_min | Time from the open, in minutes: {0, 5, 10, 15, . . . }. Use appropriate timelines for foreign markets, breaking down in 5-minute segments. | Int | 0-390 (US) | Required |
| Shares | Shares filled up to this point | Long | 0-10^9 | Required |
| Segment_TI | If inside a segment, the temporary impact at this point, in basis points, from this segment, rounded to the nearest whole number, signed by the trade: Positive for buys, negative for sells | Int | 0-999 | Required |
| Segment_PI | If inside a segment, the permanent impact at this point, in basis points, from this segment, rounded to the nearest whole number, signed by the trade: Positive for buys, negative for sells | Int | 0-999 | Required |
| Residual_TI | Temporary impact at this point from prior segments, or 0 if there are no prior segments, in basis points, rounded to the nearest whole number, signed by the trade: Positive for buys, negative for sells | Int | 0-999 | Required |
| Residual_PI | Permanent impact at this point from prior segments, or 0 if there are no prior segments, in basis points, rounded to the nearest whole number, signed by the trade: Positive for buys, negative for sells | Int | 0-999 | Required |
| Impact | Sum of the above four values | Int | 0-999 | Required |

Market Impact Model

A "parent" order is a set of segments on the same symbol, side and same or consecutive trading days. In an exemplary embodiment, an impact model aims to estimate impacts at 5-minute intervals starting on the day when a parent order starts and continuing up to 10 days after its completion. In day-to-day operation, incomplete parents and parents that have not died over 10 days ago may be updated day to day. This may require persisting some information overnight so microstructure-level calculations do not have to be repeated.

Intra-segment, the total segment impact function may be subject to occasional updates. Initially one may use the following model for the segment impact at time t $E(I_t)=\alpha\nu\pi^{\delta}(Q_t/ADV)^{\alpha-1}(MktCap[\$])^{-\eta}$; the impact factor $\alpha$ will be configurable per impact_client; the shares filled up to time t are $Q_t$, the three exponents will be globally configurable. Initial parameter values will be $\alpha=8,\delta=0.4,\alpha=1.4,\eta=0$.

After the segment is finished, segment impact is the sum of temporary impact and permanent impact.

Temporary impact at the end of the trade is ⅓ of the total impact, and decays with a timescale $\tau=\tau_0\kappa*LN(t_0+t\,[min])$ where $\tau_0=0,\kappa=4.34,t_0=3$ are global system configurable parameters. Thus, t' minutes after segment completion, $$E(I,\,\text{end}+t')=E(I,\,\text{end})\left(1-\frac{1}{3}\exp(-t'/\tau)\right)$$

Permanent impact is ⅔ of total impact at the end of the segment, and decays as a power $\delta$ of elapsed tape volume, where $\delta$ is the same exponent introduced previously for total impact. Thus, $$E(PI,\,\text{end}+t')=\frac{2}{3}E(I,\,\text{end})\left(\frac{\text{tape(start -> end)}}{\text{tape(start -> end}+t')}\right)^{0.4}$$

The impact for a block is the sum of the impact contribution of each segment.

Enriched Trades and Enriched Segments Tables

The enriched trades and segments tables comprise a pointer to the trade or segment data, variables representing the information universe at trade/segment start, pulled in from internal and external sources and variables required to estimate the performance of alternate trading strategies and the returns up to 60 days following the completion of the trade/segment.

Columns may include

PWP benchmarking; tracking error adjustments etc
- Adverse selection/opportunistic savings
- Alternate speeds
- Alternate limit price choices
- Add two-stage strategy benchmarks; make sure all PWPs extend over multiple days where needed PWP_SPY weighted by the tape of the stock, for the core PWP estimations (AVWAP, 5, 10, 15, 20, 30; no limit price)
- Apply reasonable rounding of PWP windows to avoid small residuals at market close; let AVWAP end to the first close where the trade size as a Percent of Available Liquidity to Last close (PALL) is less than 4%
- For volume-weighted average price, show the corresponding volume Prior/post price comparisons.

For historical prices <T−5 or >T+1 show only closing price: stock, ETF and SPY.

T−1 to T−5 add HLOC, stock only. For T+1 add VWAP for stock ETF and SPY, and HLOC.

Price and order flow metrics from the start of execution 5, 15, 30, 60 minute impact anomalies 5, 15, 30, 60 minute order low imbalances 5, 15, 30, 60 minute participation rate anomalies 5, 15, 30, 60 minute sector divergence Impact-adjusted returns 5, 10, 15, 20, 30, 60 minutes after creation, to close, at last fill, last close and post-trade VWAP prices to T+1, T+2, T+5, T+10, T+20, T+60

HLOC prices in date ranges covering T−60 to T+60

All alpha profiling drivers supported in the server

Drivers Existing in Current Data Mining Base Tables

The output table may comprise the same drivers as are currently in the dwh_sys.res_cl_analysis_jpm_daily table and enhanced by other variables available from dwh_sys.res_cl_analysis_jpm_ext table.

TABLE 12

| Nb | Driver's name | |
|---|---|---|
| 1 | TRADE_DT_KEY | NUMBER(8) |
| 2 | ID | NUMBER |
| 3 | PARENT_BLOCKID | VARCHAR2(20) |
| 4 | PRIMARY_STRATEGY | VARCHAR2(50) |
| 5 | SYMBOL | VARCHAR2(20) |
| 6 | SIDE | VARCHAR2(30) |
| 7 | SECTOR | VARCHAR2 (40) |
| 8 | MANAGER | VARCHAR2(50) |
| 9 | PARENT_CREATED_TIME | TIMESTAMP(6) |
| 10 | PARENT_SUBMITTED_QTY[7] | NUMBER |
| 11 | PARENT_START_TIME | TIMESTAMP(6) |
| 12 | PARENT_END_TIME | TIMESTAMP(6) |
| 13 | PARENT_FILLED_QTY | NUMBER |
| 14 | PARENT_AVGPRICE | NUMBER |
| 15 | ORDERID | VARCHAR2(20) |
| 16 | SUBMITTED_QTY | NUMBER |
| 17 | FILLED_QTY | NUMBER |
| 18 | ORDER_AVGPRICE | NUMBER |
| 19 | ORDER_CREATED_TIME | TIMESTAMP(6) |
| 20 | ORDER_START_TIME | TIMESTAMP(6) |
| 21 | ORDER_END_TIME | TIMESTAMP(6) |
| 22 | PARENT_MIDQUOTE_CREATED | NUMBER |
| 23 | MIDQUOTE_CREATED | NUMBER |
| 24 | MIDQUOTE_START | NUMBER |
| 25 | MIDQUOTE_END | NUMBER |
| 26 | MIDQUOTE_5MIN | NUMBER |
| 27 | MIDQUOTE_15MIN | NUMBER |
| 28 | MIDQUOTE_30MIN | NUMBER |
| 29 | MIDQUOTE_60MIN | NUMBER |
| 30 | AVWAP | NUMBER |
| 31 | PWP_5 | NUMBER |
| 32 | PWP_10 | NUMBER |
| 33 | PWP_20 | NUMBER |
| 34 | TAPE | NUMBER |
| 35 | TAPED_QTY_5 | NUMBER |
| 36 | TAPED_QTY_10 | NUMBER |
| 37 | TAPED_QTY_20 | NUMBER |
| 38 | PX_OPEN | NUMBER(30,6) |
| 39 | PX_CLOSE | NUMBER(30,6) |
| 40 | PX_HIGH | NUMBER(30,6) |
| 41 | PX_LOW | NUMBER(30,6) |
| 42 | ALL_DAY_VWAP | NUMBER |
| 43 | TWAP1M | NUMBER |
| 44 | TWAP5M | NUMBER |
| 45 | PRIOR_PX_OPEN | NUMBER(30,6) |
| 46 | PRIOR_PX_CLOSE | NUMBER(30,6) |
| 47 | PRIOR_PX_HIGH | NUMBER(30,6) |
| 48 | PRIOR_PX_LOW | NUMBER(30,6) |
| 49 | PRIOR_ALL_DAY_VWAP | NUMBER |
| 50 | PRIOR_TWAP1M | NUMBER |
| 51 | PRIOR_TWAP5M | NUMBER |
| 52 | NEXT_PX_OPEN | NUMBER(30,6) |
| 53 | NEXT_PX_CLOSE | NUMBER(30,6) |
| 54 | NEXT_PX_HIGH | NUMBER(30,6) |
| 55 | NEXT_PX_LOW | NUMBER(30,6) |
| 56 | NEXT_ALL_DAY_VWAP | NUMBER |
| 57 | NEXT_TWAP1M | NUMBER |
| 58 | NEXT_TWAP5M | NUMBER |
| 59 | END_PWP_20 | TIMESTAMP(6) |
| 60 | END_PWP_10 | TIMESTAMP(6) |
| 61 | END_PWP5 | TIMESTAMP(6) |
| 62 | BID_CREATE[8] | NUMBER |
| 63 | ASK_CREATE | NUMBER |
| 64 | REVERSION_TIME | TIMESTAMP(6) |
| 65 | PART_RATE | NUMBER |
| 66 | PWP_5_SHARES | NUMBER |
| 67 | PWP_10_SHARES | NUMBER |
| 68 | PWP_20_SHARES | NUMBER |
| 69 | PWP_5_INCURRED_IMPACT[9] | NUMBER |
| 70 | PWP_10_INCURRED_IMPACT | NUMBER |
| 71 | PWP_20_INCURRED_IMPACT | NUMBER |
| 72 | TE_5_ADJUSTMENT | NUMBER |
| 73 | TE_10_ADJUSTMENT | NUMBER |
| 74 | TE_20_ADJUSTMENT | NUMBER |
| 75 | TE_5_PERCENT | NUMBER |
| 76 | TE_10_PERCENT | NUMBER |
| 77 | TE_20_PERCENT | NUMBER |
| 78 | TE_20_PERCENT_ADJUSTED | NUMBER |
| 79 | PRICE_20 | NUMBER |
| 80 | AVWAP30 | NUMBER |
| 81 | AVWAP60 | NUMBER |
| 82 | VOL_ELAPSED | NUMBER |
| 83 | FILLED_QTY_5 | NUMBER |
| 84 | FILLED_QTY_15 | NUMBER |
| 85 | FILLED_QTY_30 | NUMBER |
| 86 | FILLED_QTY_60 | NUMBER |
| 87 | TAPE_5 | NUMBER |
| 88 | TAPE_15 | NUMBER |
| 89 | TAPE_30 | NUMBER |
| 90 | TAPE_60 | NUMBER |
| 91 | PART_RATE_5 | NUMBER |
| 92 | PART_RATE_15 | NUMBER |
| 93 | PART_RATE_30 | NUMBER |
| 94 | PART_RATE_60 | NUMBER |
| 95 | FIRM_FILLED_QTY_5 | NUMBER |
| 96 | FIRM_FILLED_QTY_15 | NUMBER |
| 97 | FIRM_FILLED_QTY_30 | NUMBER |
| 98 | FIRM_FILLED_QTY_60 | NUMBER |
| 99 | SUMFILL_QTY | NUMBER |
| 100 | URGENCY | NUMBER(1) |
| 101 | SPY_PARENT_CREATED | NUMBER |
| 102 | ETF_PARENT_CREATED | NUMBER |
| 103 | SPY_CREATED | NUMBER |
| 104 | ETF_CREATED | NUMBER |
| 105 | SPY_START | NUMBER |
| 106 | ETF_START | NUMBER |
| 107 | SPY_END | NUMBER |
| 108 | ETF_END | NUMBER |
| 109 | SPY_5MIN | NUMBER |
| 110 | ETF_5MIN | NUMBER |
| 111 | SPY_15MIN | NUMBER |
| 112 | ETF_15MIN | NUMBER |
| 113 | SPY_30MIN | NUMBER |
| 114 | ETF_30MIN | NUMBER |
| 115 | SPY_60MIN | NUMBER |
| 116 | ETF_60MIN | NUMBER |
| 117 | SPY_CLOSE | NUMBER |
| 118 | SPY_HIGH | NUMBER |
| 119 | SPY_LOW | NUMBER |
| 120 | SPY_ALL_DAY_VWAP | NUMBER |
| 121 | SPY_OPEN | NUMBER |
| 122 | PRIOR_SPY_OPEN | NUMBER |
| 123 | PRIOR_SPY_CLOSE | NUMBER |
| 124 | PRIOR_SPY_HIGH | NUMBER |
| 125 | PRIOR_SPY_LOW | NUMBER |
| 126 | PRIOR_SPY_ALL_DAY_VWAP | NUMBER |
| 127 | NEXT_SPY_OPEN | NUMBER |
| 128 | NEXT_SPY_CLOSE | NUMBER |
| 129 | NEXT_SPY_HIGH | NUMBER |
| 130 | NEXT_SPY_LOW | NUMBER |

TABLE 12-continued

| Nb | Driver's name | |
|---|---|---|
| 131 | NEXT_SPY_ALL_DAY_VWAP | NUMBER |
| 132 | ETF_OPEN | NUMBER |
| 133 | ETF_CLOSE | NUMBER |
| 134 | ETF_HIGH | NUMBER |
| 135 | ETF_LOW | NUMBER |
| 136 | ETF_ALL_DAY_VWAP | NUMBER |
| 137 | PRIOR_ETF_OPEN | NUMBER |
| 138 | PRIOR_ETF_CLOSE | NUMBER |
| 139 | PRIOR_ETF_HIGH | NUMBER |
| 140 | PRIOR_ETF_LOW | NUMBER |
| 141 | PRIOR_ETF_ALL_DAY_VWAP | NUMBER |
| 142 | NEXT_ETF_OPEN | NUMBER |
| 143 | NEXT_ETF_CLOSE | NUMBER |
| 144 | NEXT_ETF_HIGH | NUMBER |
| 145 | NEXT_ETF_LOW | NUMBER |
| 146 | NEXT_ETF_ALL_DAY_VWAP | NUMBER |
| 147 | PRIOR_PX_OPEN2 | NUMBER |
| 148 | PRIOR_PX_CLOSE2 | NUMBER |
| 149 | PRIOR_PX_HIGH2 | NUMBER |
| 150 | PRIOR_PX_LOW2 | NUMBER |
| 151 | PRIOR_ALL_DAY_VWAP2 | NUMBER |
| 152 | PRIOR_PX_OPEN5 | NUMBER |
| 153 | PRIOR_PX_CLOSE5 | NUMBER |
| 154 | PRIOR_PX_HIGH5 | NUMBER |
| 155 | PRIOR_PX_LOW5 | NUMBER |
| 156 | PRIOR_ALL_DAY_VWAP5 | NUMBER |
| 157 | PRIOR_PX_OPEN10 | NUMBER |
| 158 | PRIOR_PX_CLOSE10 | NUMBER |
| 159 | PRIOR_PX_HIGH10 | NUMBER |
| 160 | PRIOR_PX_LOW10 | NUMBER |
| 161 | PRIOR_ALL_DAY_VWAP10 | NUMBER |
| 162 | PRIOR_PX_OPEN20 | NUMBER |
| 163 | PRIOR_PX_CLOSE20 | NUMBER |
| 164 | PRIOR_PX_HIGH20 | NUMBER |
| 165 | PRIOR_PX_LOW20 | NUMBER |
| 166 | PRIOR_ALL_DAY_VWAP20 | NUMBER |
| 167 | PRIOR_PX_OPEN60 | NUMBER |
| 168 | PRIOR_PX_CLOSE60 | NUMBER |
| 169 | PRIOR_PX_HIGH60 | NUMBER |
| 170 | PRIOR_PX_LOW60 | NUMBER |
| 171 | PRIOR_ALL_DAY_VWAP60 | NUMBER |
| 172 | NEXT_PX_OPEN2 | NUMBER |
| 173 | NEXT_PX_CLOSE2 | NUMBER |
| 174 | NEXT_PX_HIGH2 | NUMBER |
| 175 | NEXT_PX_LOW2 | NUMBER |
| 176 | NEXT_ALL_DAY_VWAP2 | NUMBER |
| 177 | NEXT_PX_OPEN5 | NUMBER |
| 178 | NEXT_PX_CLOSE5 | NUMBER |
| 179 | NEXT_PX_HIGH5 | NUMBER |
| 180 | NEXT_PX_LOW5 | NUMBER |
| 181 | NEXT_ALL_DAY_VWAP5 | NUMBER |
| 182 | NEXT_PX_OPEN10 | NUMBER |
| 183 | NEXT_PX_CLOSE10 | NUMBER |
| 184 | NEXT_PX_HIGH10 | NUMBER |
| 185 | NEXT_PX_LOW10 | NUMBER |
| 186 | NEXT_ALL_DAY_VWAP10 | NUMBER |
| 187 | NEXT_PX_OPEN20 | NUMBER |
| 188 | NEXT_PX_CLOSE20 | NUMBER |
| 189 | NEXT_PX_HIGH20 | NUMBER |
| 190 | NEXT_PX_LOW20 | NUMBER |
| 191 | NEXT_ALL_DAY_VWAP20 | NUMBER |
| 192 | NEXT_PX_OPEN60 | NUMBER |
| 193 | NEXT_PX_CLOSE60 | NUMBER |
| 194 | NEXT_PX_HIGH60 | NUMBER |
| 195 | NEXT_PX_LOW60 | NUMBER |
| 196 | NEXT_ALL_DAY_VWAP60 | NUMBER |
| 197 | PRIOR_SPY_OPEN2 | NUMBER |
| 198 | PRIOR_SPY_CLOSE2 | NUMBER |
| 199 | PRIOR_SPY_HIGH2 | NUMBER |
| 200 | PRIOR_SPY_LOW2 | NUMBER |
| 201 | PRIOR_SPY_ALL_DAY_VWAP2 | NUMBER |
| 202 | PRIOR_SPY_OPEN5 | NUMBER |
| 203 | PRIOR_SPY_CLOSE5 | NUMBER |
| 204 | PRIOR_SPY_HIGH5 | NUMBER |
| 205 | PRIOR_SPY_LOW5 | NUMBER |
| 206 | PRIOR_SPY_ALL_DAY_VWAP5 | NUMBER |
| 207 | PRIOR_SPY_OPEN10 | NUMBER |
| 208 | PRIOR_SPY_CLOSE10 | NUMBER |

TABLE 12-continued

| Nb | Driver's name | |
|---|---|---|
| 209 | PRIOR_SPY_HIGH10 | NUMBER |
| 210 | PRIOR_SPY_LOW10 | NUMBER |
| 211 | PRIOR_SPY_ALL_DAY_VWAP10 | NUMBER |
| 212 | PRIOR_SPY_OPEN20 | NUMBER |
| 213 | PRIOR_SPY_CLOSE20 | NUMBER |
| 214 | PRIOR_SPY_HIGH20 | NUMBER |
| 215 | PRIOR_SPY_LOW20 | NUMBER |
| 216 | PRIOR_SPY_ALL_DAY_VWAP20 | NUMBER |
| 217 | PRIOR_SPY_OPEN60 | NUMBER |
| 218 | PRIOR_SPY_CLOSE60 | NUMBER |
| 219 | PRIOR_SPY_HIGH60 | NUMBER |
| 220 | PRIOR_SPY_LOW60 | NUMBER |
| 221 | PRIOR_SPY_ALL_DAY_VWAP60 | NUMBER |
| 222 | NEXT_SPY_OPEN2 | NUMBER |
| 223 | NEXT_SPY_CLOSE2 | NUMBER |
| 224 | NEXT_SPY_HIGH2 | NUMBER |
| 225 | NEXT_SPY_LOW2 | NUMBER |
| 226 | NEXT_SPY_ALL_DAY_VWAP2 | NUMBER |
| 227 | NEXT_SPY_OPEN5 | NUMBER |
| 228 | NEXT_SPY_CLOSE5 | NUMBER |
| 229 | NEXT_SPY_HIGH5 | NUMBER |
| 230 | NEXT_SPY_LOW5 | NUMBER |
| 231 | NEXT_SPY_ALL_DAY_VWAP5 | NUMBER |
| 232 | NEXT_SPY_OPEN10 | NUMBER |
| 233 | NEXT_SPY_CLOSE10 | NUMBER |
| 234 | NEXT_SPY_HIGH10 | NUMBER |
| 235 | NEXT_SPY_LOW10 | NUMBER |
| 236 | NEXT_SPY_ALL_DAY_VWAP10 | NUMBER |
| 237 | NEXT_SPY_OPEN20 | NUMBER |
| 238 | NEXT_SPY_CLOSE20 | NUMBER |
| 239 | NEXT_SPY_HIGH20 | NUMBER |
| 240 | NEXT_SPY_LOW20 | NUMBER |
| 241 | NEXT_SPY_ALL_DAY_VWAP20 | NUMBER |
| 242 | NEXT_SPY_OPEN60 | NUMBER |
| 243 | NEXT_SPY_CLOSE60 | NUMBER |
| 244 | NEXT_SPY_HIGH60 | NUMBER |
| 245 | NEXT_SPY_LOW60 | NUMBER |
| 246 | NEXT_SPY_ALL_DAY_VWAP60 | NUMBER |
| 247 | PRIOR_ETF_OPEN2 | NUMBER |
| 248 | PRIOR_ETF_CLOSE2 | NUMBER |
| 249 | PRIOR_ETF_HIGH2 | NUMBER |
| 250 | PRIOR_ETF_LOW2 | NUMBER |
| 251 | PRIOR_ETF_ALL_DAY_VWAP2 | NUMBER |
| 252 | PRIOR_ETF_OPEN5 | NUMBER |
| 253 | PRIOR_ETF_CLOSE5 | NUMBER |
| 254 | PRIOR_ETF_HIGH5 | NUMBER |
| 255 | PRIOR_ETF_LOW5 | NUMBER |
| 256 | PRIOR_ETF_ALL_DAY_VWAP5 | NUMBER |
| 257 | PRIOR_ETF_OPEN10 | NUMBER |
| 258 | PRIOR_ETF_CLOSE10 | NUMBER |
| 259 | PRIOR_ETF_HIGH10 | NUMBER |
| 260 | PRIOR_ETF_LOW10 | NUMBER |
| 261 | PRIOR_ETF_ALL_DAY_VWAP10 | NUMBER |
| 262 | PRIOR_ETF_OPEN20 | NUMBER |
| 263 | PRIOR_ETF_CLOSE20 | NUMBER |
| 264 | PRIOR_ETF_HIGH20 | NUMBER |
| 265 | PRIOR_ETF_LOW20 | NUMBER |
| 266 | PRIOR_ETF_ALL_DAY_VWAP20 | NUMBER |
| 267 | PRIOR_ETF_OPEN60 | NUMBER |
| 268 | PRIOR_ETF_CLOSE60 | NUMBER |
| 269 | PRIOR_ETF_HIGH60 | NUMBER |
| 270 | PRIOR_ETF_LOW60 | NUMBER |
| 271 | PRIOR_ETF_ALL_DAY_VWAP60 | NUMBER |
| 272 | NEXT_ETF_OPEN2 | NUMBER |
| 273 | NEXT_ETF_CLOSE2 | NUMBER |
| 274 | NEXT_ETF_HIGH2 | NUMBER |
| 275 | NEXT_ETF_LOW2 | NUMBER |
| 276 | NEXT_ETF_ALL_DAY_VWAP2 | NUMBER |
| 277 | NEXT_ETF_OPEN5 | NUMBER |
| 278 | NEXT_ETF_CLOSE5 | NUMBER |
| 279 | NEXT_ETF_HIGH5 | NUMBER |
| 280 | NEXT_ETF_LOW5 | NUMBER |
| 281 | NEXT_ETF_ALL_DAY_VWAP5 | NUMBER |
| 282 | NEXT_ETF_OPEN10 | NUMBER |
| 283 | NEXT_ETF_CLOSE10 | NUMBER |
| 284 | NEXT_ETF_HIGH10 | NUMBER |
| 285 | NEXT_ETF_LOW10 | NUMBER |
| 286 | NEXT_ETF_ALL_DAY_VWAP10 | NUMBER |

TABLE 12-continued

| Nb | Driver's name | |
|---|---|---|
| 287 | NEXT_ETF_OPEN20 | NUMBER |
| 288 | NEXT_ETF_CLOSE20 | NUMBER |
| 289 | NEXT_ETF_HIGH20 | NUMBER |
| 290 | NEXT_ETF_LOW20 | NUMBER |
| 291 | NEXT_ETF_ALL_DAY_VWAP20 | NUMBER |
| 292 | NEXT_ETF_OPEN60 | NUMBER |
| 293 | NEXT_ETF_CLOSE60 | NUMBER |
| 294 | NEXT_ETF_HIGH60 | NUMBER |
| 295 | NEXT_ETF_LOW60 | NUMBER |
| 296 | NEXT_ETF_ALL_DAY_VWAP60 | NUMBER |
| 297 | PRIOR_MIDQUOTE_5MIN | NUMBER |
| 298 | PRIOR_MIDQUOTE_15MIN | NUMBER |
| 299 | PRIOR_MIDQUOTE_30MIN | NUMBER |
| 300 | PRIOR_MIDQUOTE_65MIN | NUMBER |
| 301 | PRIOR_MIDQUOTE_130MIN | NUMBER |
| 302 | PRIOR_MIDQUOTE_195MIN | NUMBER |
| 303 | PRIOR_MO5 | NUMBER |
| 304 | PRIOR_MO15 | NUMBER |
| 305 | PRIOR_MO30 | NUMBER |
| 306 | PRIOR_MO65 | NUMBER |
| 307 | PRIOR_MO130 | NUMBER |
| 308 | PRIOR_MO195 | NUMBER |
| 309 | PRIOR_DO5 | NUMBER |
| 310 | PRIOR_DO15 | NUMBER |
| 311 | PRIOR_DO30 | NUMBER |
| 312 | PRIOR_DO65 | NUMBER |
| 313 | PRIOR_DO130 | NUMBER |
| 314 | PRIOR_DO195 | NUMBER |
| 315 | PRIOR_LCO5 | NUMBER |
| 316 | PRIOR_LCO15 | NUMBER |
| 317 | PRIOR_LCO30 | NUMBER |
| 318 | PRIOR_LCO65 | NUMBER |
| 319 | PRIOR_LCO130 | NUMBER |
| 320 | PRIOR_LCO195 | NUMBER |
| 321 | MO5 | NUMBER |
| 322 | MO15 | NUMBER |
| 323 | MO30 | NUMBER |
| 324 | MO60 | NUMBER |
| 325 | DO5 | NUMBER |
| 326 | DO15 | NUMBER |
| 327 | DO30 | NUMBER |
| 328 | DO60 | NUMBER |
| 329 | LCO5 | NUMBER |
| 330 | LCO15 | NUMBER |
| 331 | LCO30 | NUMBER |
| 332 | LCO60 | NUMBER |
| 333 | PRIOR_TAPE5 | NUMBER |
| 334 | PRIOR_TAPE15 | NUMBER |
| 335 | PRIOR_TAPE30 | NUMBER |
| 336 | PRIOR_TAPE65 | NUMBER |
| 337 | PRIOR_TAPE130 | NUMBER |
| 338 | PRIOR_TAPE195 | NUMBER |
| 339 | SUBPRODUCT | VARCHAR2(300) |
| 340 | BB30ADV | NUMBER |
| 341 | BBVOL | NUMBER |
| 342 | BETA | NUMBER |
| 343 | MARKET_CAP | VARCHAR2(20) |
| 344 | LISTING_EXCHANGE | VARCHAR2(20) |
| 345 | INTENTION | VARCHAR2(20) |
| 346 | PRIOR_SPY_MIDQUOTE_5MIN | NUMBER |
| 347 | PRIOR_SPY_MIDQUOTE_15MIN | NUMBER |
| 348 | PRIOR_SPY_MIDQUOTE_30MIN | NUMBER |
| 349 | PRIOR_SPY_MIDQUOTE_65MIN | NUMBER |
| 350 | PRIOR_SPY_MIDQUOTE_130MIN | NUMBER |
| 351 | PRIOR_SPY_MIDQUOTE_195MIN | NUMBER |
| 352 | PRIOR_ETF_MIDQUOTE_5MIN | NUMBER |
| 353 | PRIOR_ETF_MIDQUOTE_15MIN | NUMBER |
| 354 | PRIOR_ETF_MIDQUOTE_30MIN | NUMBER |
| 355 | PRIOR_ETF_MIDQUOTE_65MIN | NUMBER |
| 356 | PRIOR_ETF_MIDQUOTE_130MIN | NUMBER |
| 357 | PRIOR_ETF_MIDQUOTE_195MIN | NUMBER |
| 358 | IMPACT_5 | NUMBER |
| 359 | IMPACT_15 | NUMBER |
| 360 | IMPACT_30 | NUMBER |
| 361 | IMPACT_60 | NUMBER |
| 362 | PRIOR_DELTAPRICE5 | NUMBER |
| 363 | PRIOR_DELTAPRICE15 | NUMBER |
| 364 | PRIOR_DELTAPRICE30 | NUMBER |

TABLE 12-continued

| Nb | Driver's name | |
|---|---|---|
| 365 | PRIOR_DELTAPRICE65 | NUMBER |
| 366 | PRIOR_DELTAPRICE130 | NUMBER |
| 367 | PRIOR_DELTAPRICE195 | NUMBER |
| 368 | SEGMENTSIZE | NUMBER |
| 369 | CALCULATIONTIME | VARCHAR2(20) |
| 370 | MO15HAT | NUMBER |
| 371 | DO15HAT | NUMBER |
| 372 | LCO15HAT | NUMBER |
| 373 | DX15HAT | NUMBER |
| 374 | BUYCALP | NUMBER |
| 375 | SELLCALP | NUMBER |
| 376 | GAMMAMINUS | NUMBER |
| 377 | GAMMAPLUS | NUMBER |
| 378 | DELTAP15HAT01 | NUMBER |
| 379 | DELTAP15HAT10 | NUMBER |
| 380 | DELTAP15HAT01_DRIVER1 | VARCHAR2(20) |
| 381 | DELTAP15HAT01_STATE1 | NUMBER(2) |
| 382 | DELTAP15HAT01_DRIVERVALUE1 | NUMBER |
| 383 | DELTAP15HAT01_DRIVER2 | VARCHAR2(20) |
| 384 | DELTAP15HAT01_STATE2 | NUMBER(2) |
| 385 | DELTAP15HAT01_DRIVERVALUE2 | NUMBER |
| 386 | DELTAP15HAT01_DRIVER3 | VARCHAR2(20) |
| 387 | DELTAP15HAT01_STATE3 | NUMBER(2) |
| 388 | DELTAP15HAT01_DRIVERVALUE3 | NUMBER |
| 389 | DELTAP15HAT01_DRIVER4 | VARCHAR2(20) |
| 390 | DELTAP15HAT01_STATE4 | NUMBER(2) |
| 391 | DELTAP15HAT01_DRIVERVALUE4 | NUMBER |
| 392 | DELTAP15HAT01_DRIVERS | VARCHAR2(20) |
| 393 | DELTAP15HAT01_STATES | NUMBER(2) |
| 394 | DELTAP15HAT01_DRIVERVALUE5 | NUMBER |
| 395 | DELTAP15HAT10_DRV1 | VARCHAR2(20) |
| 396 | DELTAP15HAT10_STATE1 | NUMBER(2) |
| 397 | DELTAP15HAT10_DRIVERVALUE1 | NUMBER |
| 398 | DELTAP15HAT10_DRV2 | VARCHAR2(20) |
| 399 | DELTAP15HAT10_STATE2 | NUMBER(2) |
| 400 | DELTAP15HAT10_DRIVERVALUE2 | NUMBER |
| 401 | DELTAP15HAT10_DRV3 | VARCHAR2(20) |
| 402 | DELTAP1SHAT10_STATE3 | NUMBER(2) |
| 403 | DELTAP1SHAT10_DRIVERVALUE3 | NUMBER |
| 404 | DELTAP15HAT10_DRV4 | VARCHAR2(20) |
| 405 | DELTAP15HAT10_STATE4 | NUMBER(2) |
| 406 | DELTAP15HAT10_DRIVERVALUE4 | NUMBER |
| 407 | DELTAP15HAT10_DRV5 | VARCHAR2(20) |
| 408 | DELTAP15HAT10_STATES | NUMBER(2) |
| 409 | DELTAP15HAT10_DRIVERVALUES | NUMBER |
| 410 | BUYFINISH | TIMESTAMP(6) |
| 411 | BUYIMPACTBPS | NUMBER |
| 412 | BUYIMPACTSTDDEVBPS | NUMBER |
| 413 | SELLFINISH | TIMESTAMP(6) |
| 414 | SELLIMPACTBPS | NUMBER |
| 415 | SELLIMPACTSTDDEVBPS | NUMBER |
| 416 | NEUTRALMARKETBUYIMPACTBPS | NUMBER |
| 417 | NEUTRALMARKETSELLIMPACTBPS | NUMBER |
| 418 | SECURITYID | NUMBER |
| 419 | MARKET | VARCHAR2(20) |
| 420 | PIPELINELBQ | NUMBER |
| 421 | TS | TIMESTAMP(6) |
| 422 | COMPANYNAME | VARCHAR2(30) |
| 423 | VOLUME | NUMBER |
| 424 | DAYHIGH | NUMBER |
| 425 | DAYLOW | NUMBER |
| 426 | OPENPRICE | NUMBER |
| 427 | CLOSEPRICE | NUMBER |
| 428 | DAYCLOSE | NUMBER |
| 429 | PREVCLOSE | NUMBER |
| 430 | CHANGE | NUMBER |
| 431 | CHGINPCT | NUMBER |
| 432 | WEEK52_LOW | NUMBER |
| 433 | WEEK_52HIGH | NUMBER |
| 434 | CHGFROM52WEEKLOW | NUMBER |
| 435 | CHGFROM52WEEKHIGH | NUMBER |
| 436 | PCTCHGFROM52WEEKHIGH | NUMBER |
| 437 | PCTCHGFROM52WEEKLOW | NUMBER |
| 438 | CHGFROM200DAYMOVINGAVG | NUMBER |
| 439 | PCTCHGFROM200DAYMVAVG | NUMBER |
| 440 | CHGFROM50DAYMOVINGAVG | NUMBER |
| 441 | PCTCHGFROM50DAYMVAVG | NUMBER |
| 442 | LASTTRADEDATE | TIMESTAMP(6) |

TABLE 12-continued

| Nb | Driver's name | |
|---|---|---|
| 443 | DATEFROMYAHOO | TIMESTAMP(6) |
| 444 | AVGDAILYVOL | NUMBER |
| 445 | VOLPCTOFAVG | NUMBER |
| 446 | DAYRANGEPCT | NUMBER |
| 447 | DHIGHPCTCLOSE | NUMBER |
| 448 | DLOWPCTCLOSE | NUMBER |
| 449 | ONEYEARTARGETPRICE | NUMBER |
| 450 | ONEYRTARGMINUSCLOSE | NUMBER |
| 451 | TARGASPCTOFCLOSE | NUMBER |
| 452 | EPS | NUMBER |
| 453 | EPSESTNEXTQUARTER | NUMBER |
| 454 | EPSESTNXQTRPCTEPS | NUMBER |
| 455 | EPSESTCURRENTYEAR | NUMBER |
| 456 | ESPESTCURYRPCTEPS | NUMBER |
| 457 | EPSESTNEXTYEAR | NUMBER |
| 458 | EPSNEXTYRPCTEPS | NUMBER |
| 459 | PRICEEPSESTICURRENTYEARRATIO | NUMBER |
| 460 | PRICEEPSESTNEXTYEARRATIO | NUMBER |
| 461 | MOVINGAVG_200DAY | NUMBER |
| 462 | MOVINGAVG_50DAY | NUMBER |
| 463 | SHORTRATIO | NUMBER |
| 464 | DIVIDENDYIELD | NUMBER |
| 465 | DIVIDENDPERSHARE | NUMBER |
| 466 | BOOKVALUE | NUMBER |
| 467 | MARKETCAPITALIZATION | NUMBER |
| 468 | PRICESALESRATIO | NUMBER |
| 469 | PERATIO | NUMBER |
| 470 | PEGRATIO | NUMBER |
| 471 | EBITDA | NUMBER |
| 472 | PRICEBOOKRATIO | NUMBER |
| 473 | DIVIDENDPAYDATE | TIMESTAMP(6) |
| 474 | EXDIVIDENDDATE | TIMESTAMP(6) |
| 475 | DAYSTODIVPAY | NUMBER |
| 476 | DAYSTOEXDIV | NUMBER |
| 477 | DATEFROMGOOGLE | TIMESTAMP(6) |
| 478 | BETA | NUMBER |
| 479 | DATEFROMSTERN | TIMESTAMP(6) |
| 480 | HILORISK | NUMBER |
| 481 | NETMARGIN | NUMBER |
| 482 | EVTRAILINGSALESRATIO | NUMBER |
| 483 | TOTALDEBT | NUMBER |
| 484 | PRETAXOPERATINGMARGIN | NUMBER |
| 485 | EFFTAXRATE | NUMBER |
| 486 | BVOFASSETS | NUMBER |
| 487 | FIRMVALUE | NUMBER |
| 488 | ENTERPRISEVALUE | NUMBER |
| 489 | BOOKVALUEOFEQUITY | NUMBER |
| 490 | SHARESOUTSTANDING | NUMBER |
| 491 | NONCASHWC | NUMBER |
| 492 | INVESTEDCAPITAL | NUMBER |
| 493 | CAPITALEXPENDITURES | NUMBER |
| 494 | DEPRECIATION | NUMBER |
| 495 | CORRELATION | NUMBER |
| 496 | INSTITUTIONALHOLDINGS | NUMBER |

TABLE 12-continued

| Nb | Driver's name | |
|---|---|---|
| 497 | ROE | NUMBER |
| 498 | BOOKDEBTTOCAPITAL | NUMBER |
| 499 | EVEBITRATIO | NUMBER |
| 500 | SGAEXPENSES | NUMBER |
| 501 | EVINVESTEDCAPITALRATIO | NUMBER |
| 502 | MARKETDEBTTOCAPITAL | NUMBER |
| 503 | CASHPCTTOTALASSETS | NUMBER |
| 504 | EXPFIVEYRREVGROWTH | NUMBER |
| 505 | CHGNONCASHWC | NUMBER |
| 506 | THREEYRPRICESTDDEV | NUMBER |
| 507 | INSIDERHOLDINGS | NUMBER |
| 508 | VALUEBVRATIO | NUMBER |
| 509 | REINVESTMENTRATE | NUMBER |
| 510 | FIVEYREPSGROWTH | NUMBER |
| 511 | PAYOUTRATIO | NUMBER |
| 512 | FORWARDPE | NUMBER |
| 513 | TRAILINGNETINCOME | NUMBER |
| 514 | NETINCOME | NUMBER |
| 515 | FIXEDASSETSTOTALASSETSRATIO | NUMBER |
| 516 | PREVIOUSEBIT | NUMBER |
| 517 | EBIT | NUMBER |
| 518 | SICCODE | NUMBER |
| 519 | DATEFROMDELTANEUTRAL | TIMESTAMP(6) |
| 520 | CALLIMPVOLATILITY | NUMBER |
| 521 | PUTIMPVOLATILITY | NUMBER |
| 522 | PUTMINUSCALLIMPVOLATILITY | NUMBER |
| 523 | MEANIMPVOLATILITY | NUMBER |
| 524 | CALLVOLUME | NUMBER |
| 525 | CALLVOLADVRATIO | NUMBER |
| 526 | PUTVOLUME | NUMBER |
| 527 | PUTVOLADVRATIO | NUMBER |
| 528 | CALLOPENINT | NUMBER |
| 529 | CALLOIADVRATIO | NUMBER |
| 530 | PUTOPENINT | NUMBER |
| 531 | PUTOIADVRATIO | NUMBER |
| 532 | VOLATILITY | NUMBER |
| 533 | MEANIMPVOLMINUSVOLATILITY | NUMBER |
| 534 | MEANIMPVOLPCTVOLATILITY | NUMBER |
| 535 | WEEK52_RANGEPCT | NUMBER |
| 536 | WEEK52_LOWREACHEDYESTERDAY | NUMBER |
| 537 | WEEK52_HIGHREACHEDYESTERDAY | NUMBER |

[7] Parent submitted quantity will be the greater of submitted shares on any trade belonging to the parent, or the filled shares

[8] For pre-open arrivals, this will be the NBBO at the open

[9] Summing over 5-minute intervals within the PWP5 window, the number of shares filled times the average of the impact at the beginning and end of that interval. Divide the total by the total number of shares filled to get the weighted average incurred impact Additional drivers—TCA Support and Datamining Enhancements In addition to the above, the enriched trades table may contain the information required to support TCA services; alternatively this may be a separate table, which may be joined when needed.

TABLE 13

| Field | Description/notes | Type | QA Range | Missing value? |
|---|---|---|---|---|
| Trade_dt_key | Date at which the trade record starts | n.a. | Required | |
| Trade_ID | Links to trade record | n.a. | Required | |
| USER INTENT | | | | |
| User_Speed | Intended speed, time-weighted from a basis of 0,1,2,3, excluding FF, for trading system trades | Float | 0-3 | Optional |
| User_Base_Rate | Intended participation rate not counting block exposure, for trading system trades | Float.4 | 0-1 | Optional |
| User_Rate | Intended participation rate. For trading system trades, see algo_segments_cust; for other types of trades, user_rate will be the flat average | Float.4 | 0-1 | Required |

TABLE 13-continued

| Field | Description/notes | Type | QA Range | Missing value? |
|---|---|---|---|---|
| | Limit_Participation over all trades records from the client with the same (in order, where available) trader, broker, first strategy | | | |
| FF_Shares | For trading system trades, shares filled at speed 4 | Long | 1-10^9 | Optional |
| User_Shares | Max(Filled, Min(Ordered, User_rate * Tape)) | Long | 1-10^9 | Required |
| PWP | Participation-weighted price at user_rate for accumulating user_shares | Float.5 | 0.01-10^6 | Required |
| PWP_SPY | Calculated as for PWP, but substituting the stock price for SPY midpoint price at the time of each print | Float.3 | 10-999 | Required |
| PWP_Shares | Shares actually filled in the above PWP window | Long | 1-10^9 | Required |
| PWP_Tape | Tape volume in the above PWP window | Long | 1-10^9 | Required |
| Tape | Tape volume from trade start to end | Long | 1-10^9 | Required |
| Tape_Limit | Tape volume within the limit price, from trade start to end | Long | 1-10^9 | Required |
| User_Limit_Shares | Max(Filled, Min(Ordered, User_rate * Tape_Limit)) Current: User_limit_shares = Max(Filled, Min(Ordered, User_rate * max {BELOW_LIMIT_PRICE_VOL, below_limit_price_vol_PWP)) where below_limit_price_vol_PWP is volume within the limit between submittime and end of the PWP window. Surprise in filled shares | Long | 1-10^9 | Required |
| Rate_Anomaly | If tape_limit=0, 0, else Rate_anomaly = (Filled/ Tape_Limit) - User_rate | Float.4 | −1 to 1 | Required |
| Rate_anomaly2 | Rate anomaly in PWP window Traded less than expected | | | |
| Limit_Share_Deficit | If the user expected to fill more ignoring his limit, how many shares did he miss due to either his limit or poor performance? Limit_share_deficit = Max(0, User_shares - Max(Filled, User_limit_shares)) | Long | 0-10^9 | Required |
| Share_Deficit | If the user expected to fill more after accounting for his limit, how many shares did he miss due to poor performance? Share_deficit = Max(Filled, User_limit_shares) - Filled | Long | 0-10^9 | Required |
| Reversion_Time | $\tau_r = 7(\mathrm{Ln}(T + 15) - \mathrm{Ln}(15))$ | Float.1 | 0-999 | Required |
| Reversion_Price | The reversion price is the VWAP for the 5 minute period starting from the minute interval that comprises the max {end of the reversion period, closetime}, | Float.4 | 0.01-10^6 | Required |
| Cleanup_Price | The cleanup price is the participation weighted price to fill Share_Deficit shares at User_Rate, starting from the end of the reversion period, and extending across overnight periods if needed | Float.4 | 0.01-10^6 | Required |
| Cleanup_Price_Limit | Same, but for Limit_Share_Deficit | Float.4 | 0.01-10^6 | Required |
| Cleanup_Impact | Estimated market impact for executing Share_Deficit shares at User_Rate. The impact model here and below will be the segment impact model provided herein | Float.1 | 0-999 | Required |

TABLE 13-continued

| Field | Description/notes | Type | QA Range | Missing value? |
|---|---|---|---|---|
| Clean_Price | Clean_price is the average price one would have paid for the shares had one incurred the cleanup cost, including impact, to trade the shares one filled or should have filled given the limit: Clean_price = (Filled * P_fill + (USER_LIMIT_SHARES − Filled)* Cleanup_price * (1 + sign(trade) * Cleanup_impact/ 10000))/ USER_LIMIT_SHARES | Float | 0.01-10^6 | Required |
| Cleanup_Impact_Limit | Same, but for Limit_Share_Deficit . . . this is impact to clean up all shares one should have filled had a limit *not* been used, i.e. the deficit due to the limit Traded more than expected | Float.1 | 0-999 | Required |
| Clean_Price_Limit | Clean_price is the average price one would have paid for the shares had one incurred the cleanup cost, including impact, to trade the shares one filled or should have filled had one not used a limit | Float | .01-10^6 | Required |
| Excess_Shares | The excess shares one took on due to trading faster than user_rate Excess_shares = Filled − Min(Filled, Min(Ordered, User_rate*Tape_limit)) | Long | 0-10^9 | Required |
| Excess_Cost | P&L [in basis points] of excess shares marked-to-market post reversion: Excess_cost = Excess_shares * sign(trade) * (Reversion_price − Filled_price)/ Filled_price*10000 | Float.1 | 0-999 | Required |
| Excess_Impact | Impact of executing excess shares at user speed | Float.1 | 0-999 | Required |
| Excess_Risk | Standard deviation on the cost of executing the excess shares, based on shortfall uncertainty and volatility during the reversion period: Excess_risk = 2.5*Excessimpact + Symbol_ volatility* $\sqrt{\tau_r}$ Surprise in fill price - AS/OS | Float.1 | 0-999 | Required |
| Limit_Savings | 10000 * sign(trade) * ln(PWP/ PWP_limit) | Float.1 | 0-999 | Required |
| Block_TE | Blocks are partial fills of at least 10000 shares. Block_TE = (Block_Filled/ Filled) * 10000 * sign(trade) * ln(Block_Price/PWP_Limit) | Float.1 | 0-999 | Required |
| Algo_TE | Tracking error for non-block fills. (Filled_Shares-Block_Shares)/ Filled_shares * 10000 * sign(trade) * ln(Algo_Price/ PWP Limit), Where Algo_Price = (Filled_Shares * Fill_Price − Block_shares * Bock_Price)/ (Filled_Shares − Block_Shares) | Float.1 | 0-999 | Required |
| Incurred_Impact | Estimated impact of filled shares | Float.1 | 0-999 | Required |
| PWP_Incurred_Impact | Incurred impact of shares filled in the PWP window | Float.1 | 0-999 | Required |
| TE_Adjustment | Incurred_Impact − PWP_Incurred_impact | Float.1 | 0-999 | Required |

TABLE 13-continued

| Field | Description/notes | Type | QA Range | Missing value? |
|---|---|---|---|---|
| Alpha | Alpha is the part of the PWP return not attributable to incurred impact Alpha = 10000 * sign(trade)* Ln(PWP_Limit/Arrival_Price) − PWP_Incurred_impact | Float.1 | 0-999 | Required |
| Residual_Alpha | Return from PWP to reversion price net of incurred impact Residual_alpha = 10000 * sign(trade)* Ln(Reversion_Price/ PWP) − Incurred_impact + PWP_incurred_impact | Float.1 | 0-999 | Required |
| "WHAT IF" SCENARIOS | | | | |
| | Speed choices | | | |
| PWP_5_User | Participation-weighted price for filling User_shares at 5% participation | Float | 0.01-10^6 | Required |
| PWP_10_User PWP_15_User PWP_20_User PWP_30_User | | | | |
| PWP_5_User_shares | Shares actually filled in the PWP5 interval | Long | 0-10^9 | Required |
| PWP_10_User_ shares PWP_15_User_ shares PWP_20_User_ shares PWP_30_User_ shares | | | | |
| PWP_5_User_IF | Impact-free PWP_5, based on the trading desk-wide impact estimates, as a price | Float | 0.01-10^6 | Required |
| PWP_10_User_IF PWP_15_User_IF PWP_20_User_IF PWP_30_User_IF | | | | |
| PWP_5_User_ impact PWP_10_User_ impact PWP_15_User_ impact PWP_20_User_ impact PWP_30_User_ impact | Impact in basis points for a 5% participation strategy | Float.1 | 0-999 | Required |
| PWP_5_User_return | Return in basis points from the impact-free arrival price to PWP_5_IF, plus PWP_5_impact | Float.1 | 0-999 | Required |
| PWP_10_User_ return PWP_15_User_ return PWP_20_User_ return PWP_30_User_ return | | | | |
| | Limit choices | | | |
| Tactical_Limit | Calculate tactical limit price as 20 bps up from the midpoint at arrival for buys, or down for sells | Float | 0.01-10^6 | Required |
| Strategic_Limit_1 | First strategic limit price accounts for the impact of the trade but not normal volatility, calculated from the midpoint with the number of basis points given by 1.5 * PWP_10_impact | Float | 0.01-10^6 | Required |
| Strategic_Limit_2 | Second strategic limit accounts for expected impact plus one standard deviation, approximated as this number of basis points from the midpoint at arrival: 4 * PWP_10_impact | Float | 0.01-10^6 | Required |

TABLE 13-continued

| Field | Description/notes | Type | QA Range | Missing value? |
|---|---|---|---|---|
| Tactical_Deficit | Limit share deficit given tactical limit and 10% participiation This is Max(0, user_shares − 10% of limit tape), where limit tape counts shares within the limit up to the close of the day at which the PWP_5 period ends | Long | 1-10^9 | Required |
| Strategic_Deficit_1 | Limit share deficit given first strategic limit | Long | 1-10^9 | Required |
| Strategic_Deficit_2 | Limit share deficit given second strategic limit | Long | 1-10^9 | Required |
| PWP10_Tactical | PWP_10_limit calculated up to the end of the window described in tactical_deficit | Float | .01-10^6 | Required |
| PWP10_Strategic_1 | | Float | .01-10^6 | Required |
| PWP10_Strategic_2 | | Float | .01-10^6 | Required |
| Cleanup_tactical | Null if Tactical Deficit=0, else this is the 10% PWP for filling tactical_deficit shares after the end of the window described in tactical_deficit | Float | .01-10^6 | Required |
| Cleanup_strategic1 | | Float | .01-10^6 | Required |
| Cleanup_strategic2 | | Float | .01-10^6 | Required |
| Cleanup_impact_ tactical | Null if tactical_deficit=0, else impact of a 10% participation to fill tactical_deficit shares | Float.1 | 0-999 | Required |
| Cleanup_impact_ strategic1 | | Float.1 | 0-999 | Required |
| Cleanup_impact_ strategic2 | | Float.1 | 0-999 | Required |
| Clean_Tactical | Clean price is the cost of the shares filled within the limit + cleanup shares, including impact. Clean_tactical = ((User_shares − Tactical _Deficit)*PWP_tactical + Tactical_ Deficit * Exp(sign(trade)* Cleanup_impact tactical/10000) * Cleanup_tactical)/User_Shares | Float | .01-10^6 | Required |
| Clean_Strategic1 | | Float | .01-10^6 | Required |
| Clean_Strategic2 | | Float | .01-10^6 | Required |
| Tactical_savings | Limit savings from the tactical limit, in basis points 10000 * sign(trade) * ln(PWP/ PWP_tactical) | Float.1 | 0-999 | Required |
| Strategic_savings_1 | | Float.1 | 0-999 | Required |
| Strategic_savings_2 | | Float.1 | 0-999 | Required |
| Clean_savings_tactical | Net savings of using the tactical limit after accounting for cleanup, if any 10000 * sign(trade)* LN(PWP/ Clean_Price_ Tactical) | Float.1 | 0-999 | Required |
| Clean_savings_1 | | Float.1 | 0-999 | Required |
| Clean_savings_2 | | Float.1 | 0-999 | Required |
| ALPHA PROFILE | | | | |
| | y-values for the alpha profile charts, in bps, measured from arrival. All returns described here must be calculated based on adjusted prices using corporate actions tables | | | Required |
| R_T_60 | 10000*trade_sign*LN(T-60 VWAP price/Arrival Price) | Float.1 | 0-999 | Required |
| R_T_20 | | Float.1 | 0-999 | Required |
| R_T_10 | | Float.1 | 0-999 | Required |
| R_T_5 | | Float.1 | 0-999 | Required |
| R_T_2 | | Float.1 | 0-999 | Required |
| R_T_1 | | Float.1 | 0-999 | Required |
| R_T_1_CLOSE | 10000*trade_sign*LN(last close/ arrival price) | Float.1 | 0-999 | Required |
| R_OPEN | 10000*trade_sign*LN(open/ arrival price) | Float.1 | 0-999 | Required |

TABLE 13-continued

| Field | Description/notes | Type | QA Range | Missing value? |
|---|---|---|---|---|
| R_5 | 10000*trade_sign*LN(5 minutes after arrival/arrival price) | Float.1 | 0-999 | Required |
| R_10 | | Float.1 | 0-999 | Required |
| R_15 | | Float.1 | 0-999 | Required |
| R_20 | | Float.1 | 0-999 | Required |
| R_30 | | Float.1 | 0-999 | Required |
| R_60 | | Float.1 | 0-999 | Required |
| R_END | 10000*trade_sign*LN(midpoint at end of today's trading/arrival price) | Float.1 | 0-999 | Required |
| R_CLOSE | 10000*trade_sign*LN(today's close/arrival price) | Float.1 | 0-999 | Required |
| R_LAST_END | 10000*trade_sign*LN(midpoint at end of megablock trade/ arrival price) | Float.1 | 0-999 | Required |
| R_LAST_CLOSE | 10000*trade_sign*LN(close at end of megablock/arrival price) | Float.1 | 0-999 | Required |
| R_T1 | 10000*trade_sign*LN(VWAP price for the first day after the end of megablock/arrival price) | Float.1 | 0-999 | Required |
| R_T2 | | Float.1 | 0-999 | Required |
| R_T5 | | Float.1 | 0-999 | Required |
| R_T10 | | Float.1 | 0-999 | Required |
| R_T20 | | Float.1 | 0-999 | Required |
| R_T60 | | Float.1 | 0-999 | Required |
| RSPY_T_60 | 10000*trade_sign*LN(T-60 SPY VWAP price/SPY at Arrival) | Float.1 | 0-999 | Required |
| RSPY_T_20 | | Float.1 | 0-999 | Required |
| RSPY_T_10 | | Float.1 | 0-999 | Required |
| RSPY_T_5 | | Float.1 | 0-999 | Required |
| RSPY_T_2 | | Float.1 | 0-999 | Required |
| RSPY_T_1 | | Float.1 | 0-999 | Required |
| RSPY_T_1_CLOSE | 10000*trade_sign*LN(SPY last close/SPY arrival) | Float.1 | 0-999 | Required |
| RSPY_OPEN | 10000*trade_sign*LN(SPY open/ SPY arrival) | Float.1 | 0-999 | Required |
| RSPY_5 | 10000*trade_sign*LN(SPY 5 minutes after arrival/SPY arrival) | Float.1 | 0-999 | Required |
| RSPY_10 | | Float.1 | 0-999 | Required |
| RSPY_15 | | Float.1 | 0-999 | Required |
| RSPY_20 | | Float.1 | 0-999 | Required |
| RSPY_30 | | Float.1 | 0-999 | Required |
| RSPY_60 | | Float.1 | 0-999 | Required |
| RSPY_END | 10000*trade_sign*LN(SPY end of today/SPY arrival) | Float.1 | 0-999 | Required |
| RSPY_CLOSE | 10000*trade_sign*LN(SPY day close/SPY arrival) | Float.1 | 0-999 | Required |
| RSPY_LAST_END | 10000*trade sign*LN(SPY end of megablock trade/SPY arrival) | Float.1 | 0-999 | Required |
| RSPY_LAST_CLOSE | 10000*trade_sign*LN(close at end of megablock/SPY arrival) | Float.1 | 0-999 | Required |
| RSPY_T1 | 10000*trade_sign*LN(SPY VWAP price for the first day after the end of megablock/SPY arrival) | Float.1 | 0-999 | Required |
| RSPY_T2 | | Float.1 | 0-999 | Required |
| RSPY_T5 | | Float.1 | 0-999 | Required |
| RSPY_T10 | | Float.1 | 0-999 | Required |
| RSPY_T20 | | Float.1 | 0-999 | Required |
| RSPY_T60 | | Float.1 | 0-999 | Required |
| RETF_T_60 | 10000*trade_sign*LN(T-60 ETF VWAP price/ETF at Arrival) | Float.1 | 0-999 | Required |
| RETF_T_20 | | Float.1 | 0-999 | Required |
| RETF_T_10 | | Float.1 | 0-999 | Required |
| RETF_T_5 | | Float.1 | 0-999 | Required |
| RETF_T_2 | | Float.1 | 0-999 | Required |
| RETF_T_1 | | Float.1 | 0-999 | Required |
| RETF_T_1_CLOSE | 10000*trade_sign*LN(ETF last close/ETF arrival) | Float.1 | 0-999 | Required |
| RETF_OPEN | 10000*trade_sign*LN(ETF open/ ETF arrival) | Float.1 | 0-999 | Required |
| RETF_5 | 10000*trade_sign*LN(ETF 5 minutes after arrival/ETF arrival) | Float.1 | 0-999 | Required |
| RETF_10 | | Float.1 | 0-999 | Required |

TABLE 13-continued

| Field | Description/notes | Type | QA Range | Missing value? |
|---|---|---|---|---|
| RETF_15 | | Float.1 | 0-999 | Required |
| RETF_20 | | Float.1 | 0-999 | Required |
| RETF_30 | | Float.1 | 0-999 | Required |
| RETF_60 | | Float.1 | 0-999 | Required |
| RETF_END | 10000*trade_sign*LN(ETF end of today/ETF arrival) | Float.1 | 0-999 | Required |
| RETF_CLOSE | 10000*trade_sign*LN(ETF day close/ETF arrival) | Float.1 | 0-999 | Required |
| RETF_LAST_END | 10000*trade sign*LN(ETF end of megablock trade/ETF arrival) | Float.1 | 0-999 | Required |
| RETF_LAST_CLOSE | 10000*trade sign*LN(close at end of megablock/ETF arrival) | Float.1 | 0-999 | Required |
| RETF_T1 | 10000*trade_sign*LN(ETF VWAP price for the first day after the end of megablock/ETF arrival) | Float.1 | 0-999 | Required |
| RETF_T2 | | Float.1 | 0-999 | Required |
| RETF_T5 | | Float.1 | 0-999 | Required |
| RETF_T10 | | Float.1 | 0-999 | Required |
| RETF_T20 | | Float.1 | 0-999 | Required |
| RETF_T60 | | Float.1 | 0-999 | Required |
| IMPACT_ARR | Total impact at arrival (or 0 if this is the first trade in a megablock) Use linear interpolation based on the two nearest total impact values in the 5-minute breakdown: if t1 is the time from prior 5-minute marker to arrival, t2 is the time from arrival to next 5-minute marker and x1, x2 are the corresponding total impacts, then t1+t2=5 and the total impact at arrival is Impact=(t2 x1 + t1 x2)/5 | Float.1 | 0-999 | Required |
| IMPACT_T_10 | Average of total impacts at T-10, minus total impact at arrival. | Float.l | 0-999 | Required |
| IMPACT_T_5 | | Float.1 | 0-999 | Required |
| IMPACT_T_2 | | Float.1 | 0-999 | Required |
| IMPACT_T_1 | | Float.1 | 0-999 | Required |
| IMPACT_T_1_ CLOSE | Average of total impacts at T-1, minus total impact at arrival. | Float.l | 0-999 | Required |
| IMPACT_OPEN | Total impact at open, minus total impact at arrival. | Float.1 | 0-999 | Required |
| IMPACT_ARR | Total impact at arrival. | Float.1 | 0-999 | Required |
| IMPACT_5 | Total impact 5 minutes after arrival, minus total impact at arrival. Use linear interpolation based on the two nearest total impact values in the 5-minute breakdown | Float.1 | 0-999 | Required |
| IMPACT_10 | | Float.1 | 0-999 | Required |
| IMPACT_15 | | Float.1 | 0-999 | Required |
| IMPACT_20 | | Float.1 | 0-999 | Required |
| IMPACT_30 | | Float.1 | 0-999 | Required |
| IMPACT_60 | | Float.1 | 0-999 | Required |
| IMPACT_END | Total impact at end, minus total impact at arrival | Float.1 | 0-999 | Required |
| IMPACT_CLOSE | Total impact at close, minus total impact at arrival | Float.1 | 0-999 | Required |
| IMPACT_LAST_END | Total impact at megablock end, minus total impact at arrival | Float.1 | 0-999 | Required |
| IMPACT_LAST_ CLOSE | Total impact at close after megablock end, minus total impact at arrival | Float.1 | 0-999 | Required |
| IMPACT_T1 | Average of total impacts on the day following the last close, minus total impact at arrival | Float.1 | 0-999 | Required |
| IMPACT_T2 | | Float.1 | 0-999 | Required |
| IMPACT_T5 | | Float.1 | 0-999 | Required |
| IMPACT_T10 | | Float.1 | 0-999 | Required |

TABLE 13-continued

| Field | Description/notes | Type | QA Range | Missing value? |
|---|---|---|---|---|
| PRODUCTION DRIVERS | | | | |
| | Non-news, non-HV drivers implemented in strategy selection engine | | | |
| Mom | Momentum from the open 10000* trade_sign * ln(arrival/open) | Float.1 | +/−10^3 | Required |
| Gap | Overnight gap 10000 *trade_sign* ln(open/close) | Float.1 | +/−10^3 | Required |
| Mom_Gap | Mom+Gap | Float.1 | +/−10^3 | Required |
| ETF_Mom | Sector momentum from the open 10000 * trade_sign * ln(ETF_arrival/ETF_Open) | Float.1 | +/−10^3 | Required |
| ETF_Gap | Sector gap | Float.1 | +/−10^3 | Required |
| ETF_Mom_Gap | ETF_mom+ETF_gap | Float.1 | +/−10^3 | Required |
| SPY_Mom | SPY Momentum from open | Float.1 | +/−10^3 | Required |
| SPY_Gap | | Float.1 | +/−10^3 | Required |
| SPY_Mom_Gap | | Float.1 | +/−10^3 | Required |
| Rel_Mom | Mom-SPY_Mom | Float.1 | +/−10^3 | Required |
| Rel_Gap | | Float.1 | +/−10^3 | Required |
| Rel_Mom_Gap | | Float.1 | +/−10^3 | Required |
| SRel_Mom | Mom-ETF_Mom | Float.1 | +/−10^3 | Required |
| SRel_Gap | | Float.1 | +/−10^3 | Required |
| SRel_Mom_Gap | | Float.1 | +/−10^3 | Required |
| Beta | Bbrg beta (derived from daily observations, 60-day trailing) | Float.2 | 0-99 | Required |
| Spread | Average spread, in basis points, as known in the instrument table on the server | Float.2 | 0-999 | Required |
| Volatility | Bbrg trailing 60-day average of annualized volatility [%] | Float.2 | 0-9999 | Required |
| Relative_volatility | Relative Volatility is the relative difference between a stock's theoretical volatility and its actual volatility, RV = (AV-TV)/TV where AV is the Average Volatility in the instrument table, TV is the theoretical volatility calculated as follows: TV=7.5+3500000*Power(TotalDollarQuantity, −0.85) | Float.2 | 0-9999 | Required |
| AV | Average trailing 1-minute volatility, from instrument table | Float.2 | 0-999 | Required |
| Mkt_Cap | Market cap | Enum | "vLarge Cap", . . . | Required |
| ADV | Bbrg 60-day trailing average daily volume | Long | 0-10^10 | Required |
| Value | Trade value at arrival price, rounded to nearest | Long | 0-10^10 | Required |
| Size | Ordered_Shares/ADV | Float.4 | 0-99 | Required |
| PAL | Ordered Shares as a fraction of Available Liquidity | Float.4 | 0-99 | Required |
| Daytime | x ∈ [0,1] argument of SVD smile curve | Float.4 | 0-1 | Required |
| Listing_Market | NYSE, Nasdaq, etc | Enum | | Required |
| Sector | Sector the instrument belongs to | Enum | | Required |
| WAS TRADING YESTERDAY | | | | |
| First_Arrival | Date Time of start of megablock, or Null if this trade is the start | Date Time | Within market hours | Optional |
| Momentum_since_original_arrival | Signed return from original arrical to today's arrival price [bps] | Float.4 | 0-99 | Optional |
| Relative_Momentum_since_original_arrival | Signed return from original arrical to today's arrival price, relative to SPY [bps] | Float.4 | 0-99 | Optional |
| Sector_Relative_Momentum_since_original_arrival | Signed return from original arrical to today's arrival price, relative to ETF [bps] | Float.4 | 0-99 | Optional |
| Yesterday_Filled_Quantity | Shares/ADV filled yesterday, or Null if this is the first day of the megablock | Float.4 | 0-99 | Optional |

TABLE 13-continued

| Field | Description/notes | Type | QA Range | Missing value? |
|---|---|---|---|---|
| All_Filled_Quantity | Shares/ADV filled on megablock since original start and up to the new arrival, or Null if this is the first day of the megablock | Float.4 | 0-999 | Optional |
| Yesterday_Impact | Impact of shares filled yesterday, using the basic model called g(X) in the trading server requirements. $g(X) = a(\sigma 10000)^b \sqrt{X}$, where X is the number of shares filled for the order so far, including trading system block fills, divided by the stock's ADV; a and b are system configurable global parameters. These parameters were calculated from the standard Bloomberg model as: a= 0.08 b = 0.11 | Float.1 | 0-999 | |
| All_Impact | Impact of all shares up to the new arrival | Float.1 | 0-999 | |
| Elapsed_SVD | SVD time elapsed since end of last segment yesterday, or null | Float.4 | 0-1 | Optional |
| Yesterday_Shortfall | Shortfall of shares filled yesterday, relative to the original arrival price, or Null | Float.1 | 0-999 | Optional |
| All_Shortfall | Shortfall of all shares filled in days prior to this day on the megablock, or Null | Float.1 | 0-999 | Optional |
| NEWS | | | | |
| News | Was news between last close and arrival time with relevance > 0.4 | Boolean | T/F | Required |
| Recent_News | Was news with relevance > 0.4 within last 15 minutes prior to arrival, with relevance > 0.4 | Boolean | T/F | Required |
| News_30 | News with relevance > 0.4 occurs during the first 30 minutes of the trade | Boolean | T/F | Required |
| News_Close | News with relevance > 0.4 occurs after the first 30 minutes of the trade but before the close | Boolean | T/F | Required |
| Post_News | News with relevance > 0.4 occurs after the close and before midnight of that same day | Boolean | T/F | Required |
| DRIVERS IN QUEUE TO BE ADDED IN PRODUCTION | | | | |
| | Technicals | | | |
| HL_1 | Price relative to yesterday's High Low range, signed by the trade (Arrival − (H1+L1)/2)/((H1 − L1)/2) * trade_sign | Float.2 | +/−10^3 | Required |
| HL_Range_1 | Yesterday's High Low range, relative to BBVol (H1-L1)/(VWAP_1 *BBVol/100) | Float.2 | 0-99 | Required |
| HL_2 | Price relative to last 2 days' High Low range, signed by the trade NOTE: here and below use the highest high and lowest low in the window | | | Required |
| HL_Range_2 | | | | Required |
| HL_5 | Price relative to last 5 days' high low range, signed by the trade | | | Required |
| HL_Range_5 | | | | Required |
| HL_10 | | | | Required |
| HL_Range_10 | | | | Required |
| HL_20 | | | | Required |
| HL_Range_20 | | | | Required |
| HL_60 | | | | Required |
| HL_Range_60 | | | | Required |

Trade Segments Table

Each limit-price segment (as defined for the algo_segments and algo_segments_cust tables) may be considered as a "trade" and submitted as input to the process described herein for purposes of enrichment and to analyze the effect of trader decisions (or Alpha Pro decisions) regarding speed and limit price. Here are provided exemplary specifications for creating a trade record from a segment. The structure of this table may be identical to the trades table; either one can serve as input to the enrichment process.

When a limit-price segment is associated to a single trade, references to a trade record below are unambiguous; when a segment represents overlapping trades the segment will be associated with the first trade to start. Note: the field names may be a bit strange in this case since the underlying data is different, the description/notes column has been updated.

TABLE 14

| Field | Description/notes | Type | QA Range | Missing value? |
|---|---|---|---|---|
| PM DECISION | | | | |
| Trade_dt_key | Date of this trade segment (key) | | | Required |
| Trade_ID | Unique identifier of this trade record (key) | | | Required |
| QA | Flag identifying possible quality issues with this record. Set only if there is a known problem | String | n.a. | Optional |
| Firm | Identifies the firm originating the order (trading desk). All orders on the same symbol/side from the same firm will be considered in estimating impact-free returns | String | n.a. | Required |
| PM_Order_ID | Client order-ID on the parent order, if known from the OMS integration, to enable cross-validation versus the client's TCA. | String | n.a. | Optional |
| Side | The side of the trade | Enum | B, S, BC, SS | Required |
| Symbol | The symbol identifies the security within the Pipeline environment, and must enable discovery of primary exchange, volatility, beta, currency, etc., and have available market data | String | Must exist in Pipeline universe | Required |
| PM_Ordered_Qty | Shares ordered by the PM, if known, from the OMS integration | Long | 1-10^9 | Optional |
| PM_Limit | Limit price from the PM, if known, from the OMS integration. Market = "0". Unavailable means it is unknown whether there was a limit | Float | 0-10^6 | Optional |
| Order_Creator | PM, if available from the OMS integration | String | n.a. | Optional |
| Product | n.a. | String | n.a. | Optional |
| Sub_Product | n.a. | String | n.a. | Optional |
| Type | n.a. | String | n.a. | Optional |
| Instructions | If available from the OMS integration | String | n.a. | Optional |
| Decision Time | Time of the trade decision, if available from the OMS integration | Date Time | n.a. | Optional |
| Creation Time | Time of the trade creation in the OMS | Date Time | n.a. | Optional |
| TRADER DECISION | | | | |
| Trader | Trader name | String | n.a. | Required |
| Block_ID | n.a. | String | n.a. | Optional |
| Order_ID | Pipeline order ID | String | n.a. | Required |
| Arrival_Time | Time the order received by Pipeline. For staged workflows this may not be the same as start_time | Date Time | Within market hours | Required |
| Start_Time | Date/Time at which the trade actually starts (activated in the block market or in the Engine) | Date Time | Within market hours | Required |
| Ordered_Qty | Shares ordered | Long | 1-10^9 | Required |
| Broker | Pipe, or for Pipeline SB trades, concatenate preferred SB broker. Example: "Pipe", "Pipe.GS" | String | n.a. | Optional |

TABLE 14-continued

| Field | Description/notes | Type | QA Range | Missing value? |
|---|---|---|---|---|
| First_Strategy | Label of the execution strategy the ticket was originally assigned to, if known. For OMS data, broker of record is the default, absent specific info. Examples: "TL AlphaT", "Trickle" | String | n.a. | Optional |
| Second_Strategy | If strategy was modified within the span of the ticket, the second one. | String | n.a. | Optional |
| Last_Strategy | Strategy in force at completion/cancel of the ticket | String | n.a. | Optional |
| First_Limit_Price | The limit price at start of the trade. 0=MKT | Float | 0-10^6 | Required |
| Last_Limit_Price | Same as first, by design | Float | 0-10^6 | Required |
| RESULTS | | | | |
| Filled_Qty | Shares filled | Long | 1-10^9 | Required |
| Filled_Price | Share-weighted average price of executed shares | Float | 0.01-10^6 | Required |
| Limit_Tape | Tape volume below (above) the limit price | Long | 1-10^9 | Optional |
| Limit_Participation | Filled_Qty/Limit_Tape | Float | 0-1 | Optional |
| End_Time | Date/Time of end of segment | Date Time | Within market hours | Required |
| Last fill time | | | | |
| Tape | Tape volume | | | |

FIGS. 25-28 depict exemplary alpha profile displays.

Figure 25:
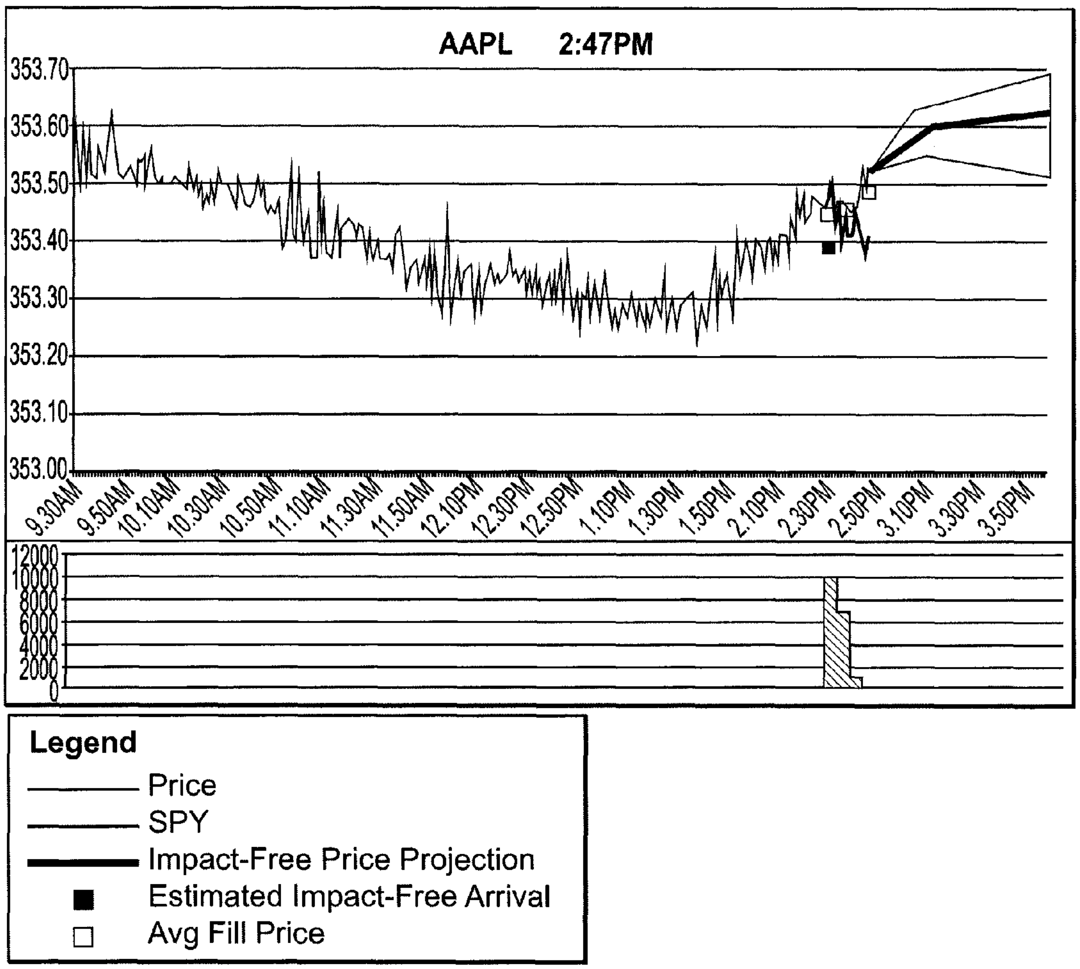
Figure 26:
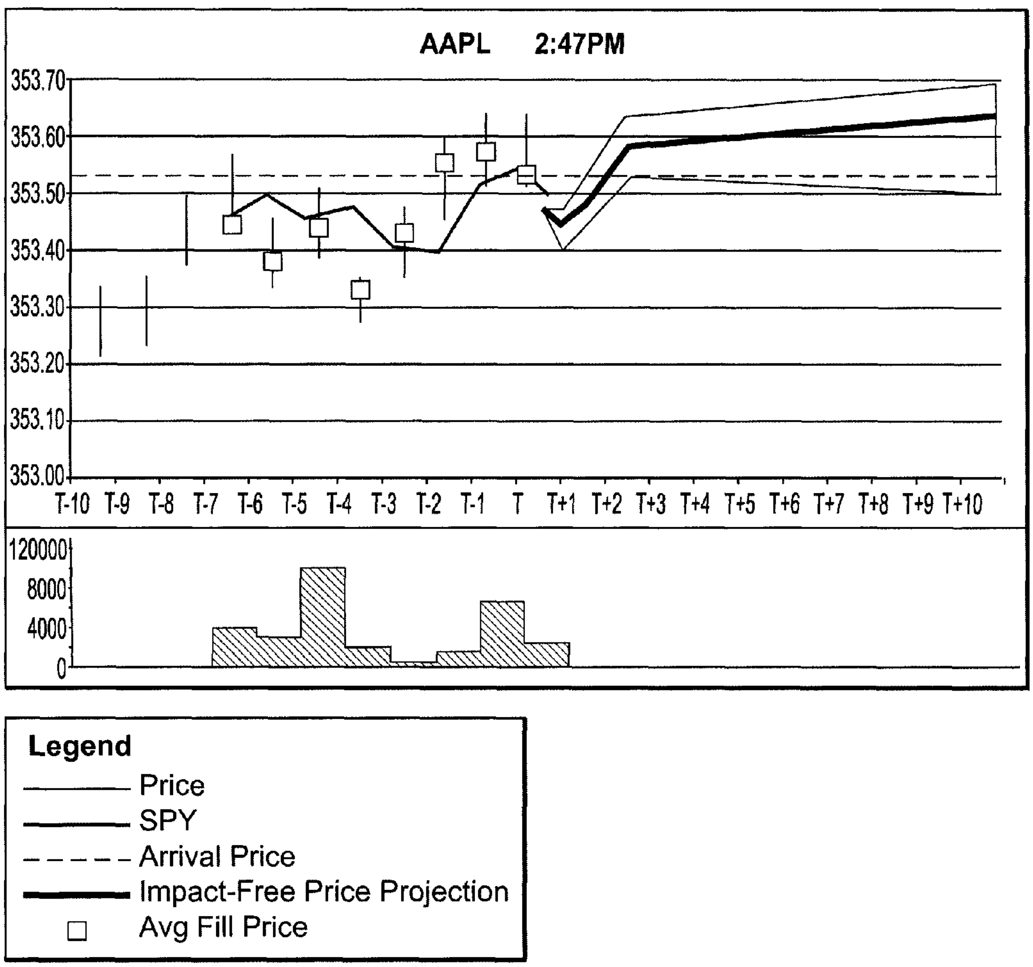
Figure 27:
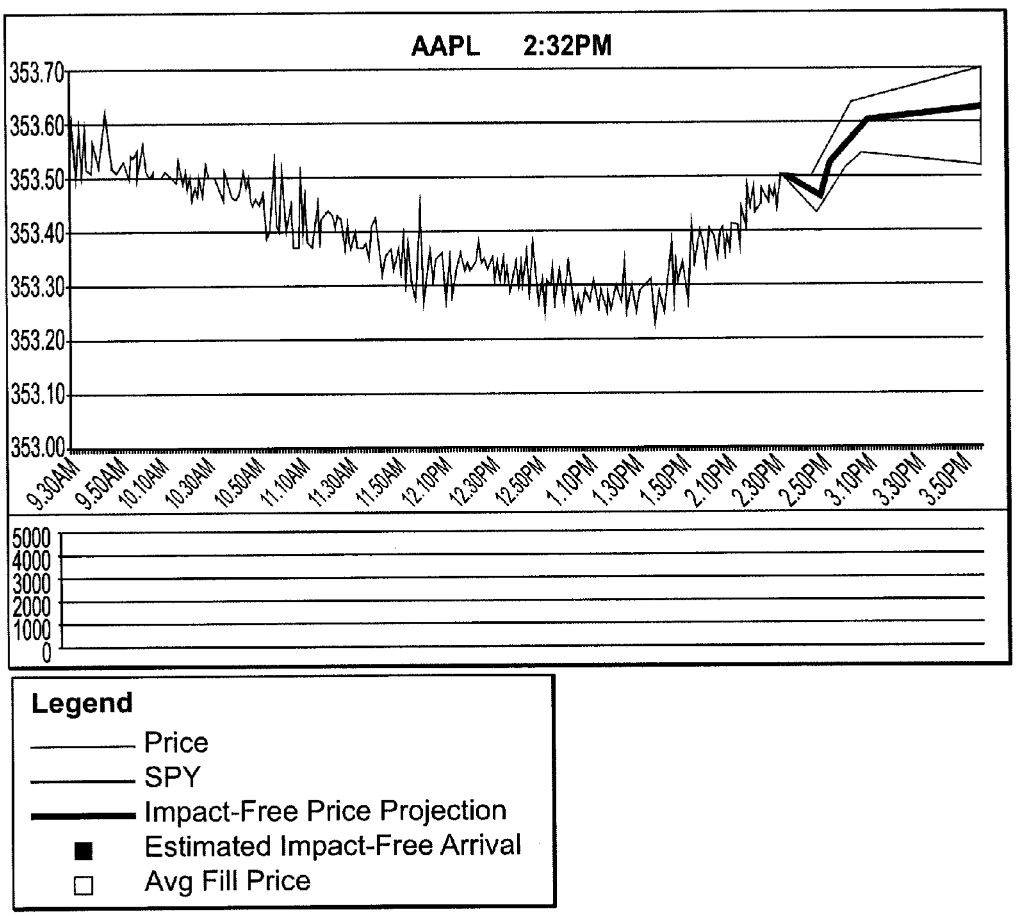
Figure 28:
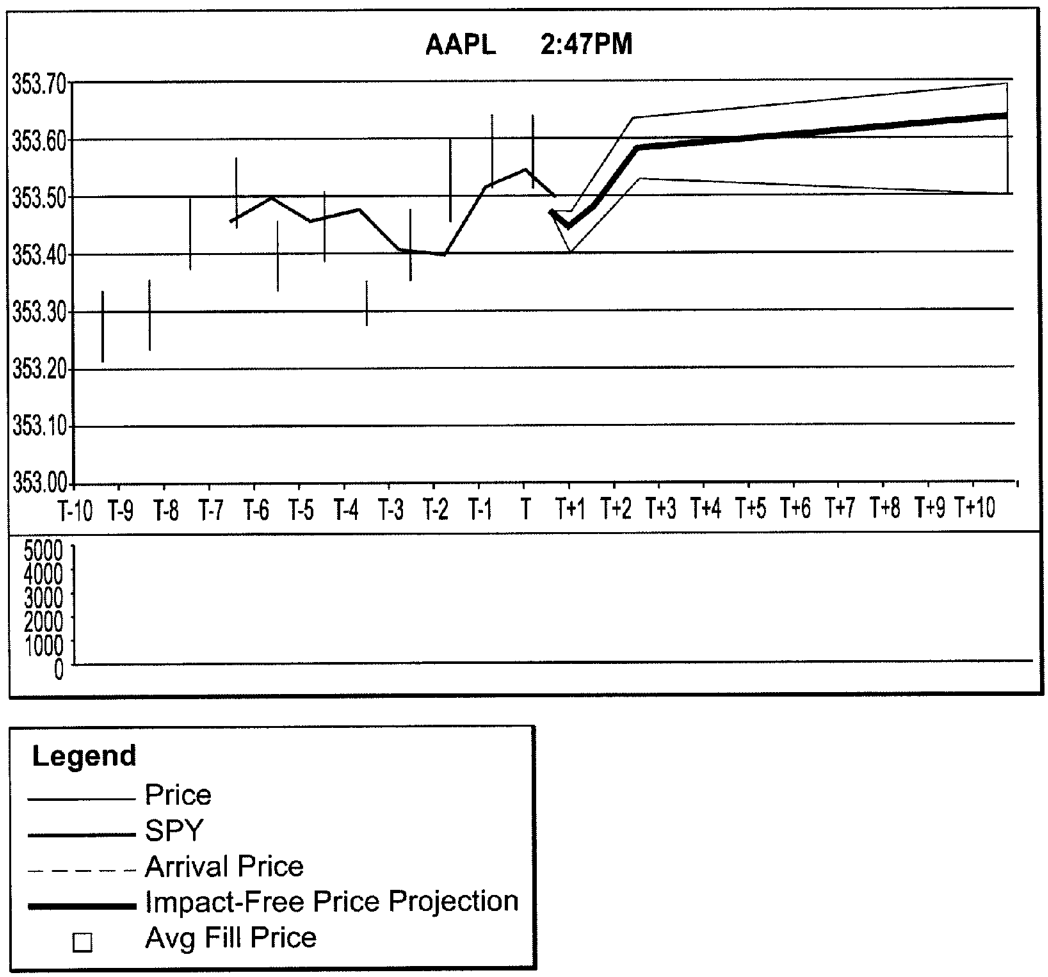
Figure 32:
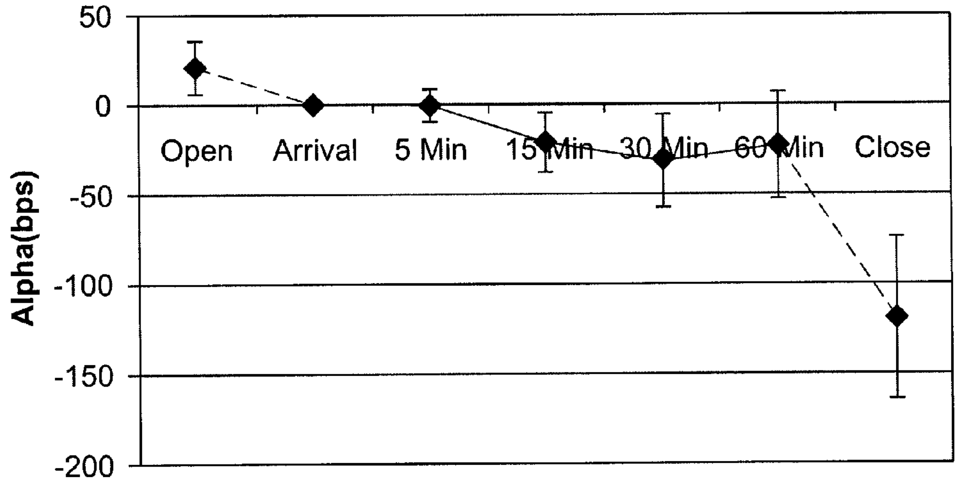

FIGS. 25-26 depict alpha profile displays for an active order, and FIGS. 27-28 depict alpha profile displays for an inactive order.

The AlphaT strategy is designed for trades with short-term alpha and a bias towards trend continuation. The strategy starts at 20% participation to capture the expected short-term alpha, then starts using tactical limits to seek best price with a completion time estimated based on a 7% minimum participation rate for the rest of the order.

Strategy Overview

Stage 1: work the first 20% of the order with a scheduled completion time based on an average 15% participation. This is historically matched to the short-term alpha for this profile.

Stage 2: tactical price selection with completion scheduled on the close or sooner based on a 7% min rate. The trailing rate will also be kept above 7% and the delay between partial fills will not exceed 30 minutes.

Opportunistic behavior: relative to S&P500.

Block exposure: 30% of the residual or 100% on price opportunities.

Additional Exemplary Strategies

AlphaStealth

Strategy designed to capture relative value vs. a benchmark in large trades where early impact would prevent alpha capture on the larger residual. This strategy will start softly to avoid triggering arbitrage strategies then increase participation to capture alpha, and maximize opportunistic liquidity capture. When expected alpha is exhausted it uses tactical pull-backs to avoid overshoot. The system will automatically activate the "AlphaS" strategy when it detects the subset of market conditions specific to this type of profile. Alternatively, the trader may choose to activate this strategy based on their present view of the market. See FIG. 29.

Stage 1: work the first 10% of the order with a scheduled completion time based on an average 6% participation. This may be historically matched to the short-term alpha for this profile.

Stage 2: tactical price selection with completion scheduled on the close or sooner based on a 10% min rate. The trailing rate will also be kept above 10% and the delay between partial fills will not exceed 30 minutes.

Opportunistic behavior: none.

Block exposure: on arrival, then 30% of the residual.

AlphaTrend

Strategy designed for trades with short-term alpha and a bias towards trend continuation. This strategy will front load the execution as it tries to capture the expected underlying alpha to the close. The system will automatically activate the "AlphaT" strategy when it detects the subset of market conditions specific to a trending alpha profile. Alternatively, the trader may choose to activate this strategy based on their present view of the market. See FIG. 30.

Stage 1: work the first 20% of the order with a scheduled completion time based on an average 15% participation. This may be historically matched to the short-term alpha for this profile. Stage 2: tactical price selection with completion scheduled on the close or sooner based on a 7% min rate. The trailing rate will also be kept above 7% and the delay between partial fills will not exceed 30 minutes.

Opportunistic behavior: relative to S&P500.

Block exposure: 30% of the residual or 100% on price opportunities.

AlphaRevert

Strategy designed for trades with short-term alpha and a bias towards subsequent mean reversion. This strategy will front load the execution initially and then make use of tactical limits to capture the expected partial reversion to the close. The system will automatically activate the "AlphaR" strategy when it detects the subset of market conditions specific to a mean reverting alpha profile. Alternatively, the trader may choose to activate this strategy based on their present view of the market. See FIG. 31.

Stage 1: work the first 20% of the order with a scheduled completion time based on an average 15% participation. This may be historically matched to the short-term alpha for this profile.

Stage 2: tactical price selection with completion scheduled on the close or sooner based on a 1% min rate. The trailing rate will also be kept above 1% and the delay between partial fills will not exceed 30 minutes.

Opportunistic behavior: relative to S&P500.

Block exposure: 30% of the residual or 100% on price opportunities.

Munitions Manager

Strategy designed to tactically manage munitions as prices become more favorable towards the day close. An execution path will be determined dynamically to minimize adverse selection while completing the trade. The system will automatically activate the "MunitionsMan" strategy when it detects the subset of market conditions specific to a no short-term (intraday) alpha profile. Alternatively, the trader may choose to activate this strategy based on their present view of the market. See FIG. 32.

Tactical price selection with completion scheduled on the close. There will not be a minimum rate maintained for the trade, but the delay between subsequent fills will not exceed 30 minutes.

Block exposure: 30% of the initial order size throughout the execution.

In order to reach completion time objectives, the strategy may transition into moderate or high speed.

Large orders that would require overall participation rates higher than 30% for completion may not finish by the end of the day.

FIG. 33 depicts an exemplary graphical user interface that may be used with one or more aspects and embodiments.

FIG. 34 provides an exemplary block color description. More details may be found in U.S. patent application Ser. No. 12/463,886 (Pub. No. 2009/0281954) and U.S. patent application Ser. No. 12/181,028 (Pub. No. 2009/0076961)), as well as U.S. patent application Ser. No. 12/181,117 (Pub. No. 2009/0089199) and U.S. patent application Ser. No. 12/419,867 (Pub. No. 2009/0259584).

Implementation Shortfall Decomposition for Market Orders

The description below describes an exemplary implementation shortfall decomposition into its primary components for the case of market orders. This description is then extended to the case of limit orders, where limit price savings need to be weighed against opportunity costs associated with the delay of the execution. Examples are provided of how post-trade TCA can be applied to trade profiles with distinct short-term alpha loss characteristics.

Short-term Alpha Loss, Market Impact and Adverse Selection

FIG. 35 depicts an example with the main components of implementation shortfall in terms of Profit/(Loss). As the execution progresses, there is usually a deterioration of the execution price which results not only from the alpha loss but also from the market impact of the execution. Potential delays in the execution which may exacerbate the total loss in the presence of short-term alpha fall into the category of adverse selection costs.

Let $S_{exec}$ be the number of shares executed and $P_{exec}$ the average execution price for an order with arrival price equal to $P_{arrival}$. The P/(L) can be broken down into its main components as follows:

$$-1\times\ln(P_{exec}/P_{arrival}) = \tag{1}$$

$$-1\times\underbrace{\left(\ln\left(\frac{PWP}{P_{arrival}}\right)-MI(S_{PWP})\right)}_{Alpha\ Loss}-$$

$$\underbrace{MI(S_{exec})}_{MI}-\underbrace{\left(\ln\left(\frac{P_{exec}}{PWP}\right)-MI(S_{exec})+MI(S_{PWP})\right)}_{AS-OS}$$

PWP is the participation weighted average price, calculated as the VWAP for the time period starting at order arrival until the time that is required to complete the order at the selected participation rate. $S_{PWP}$ is the number of shares executed in this same PWP evaluation time window.

MI is the market impact, a widely recognized source of trading costs for institutional orders, whose main determinants are the volatility of the stock and executed size relative to average daily volume. The appropriate functional form of market impact function depends to a large extent on the pattern of the execution strategy being considered and is out of the scope of this paper. Gomes and Waelbroeck (2008) provide a model estimated for Switching Engine executions (see, e.g., U.S. Pat. No. 7,908,203).

What remains of implementation shortfall after taking out the contribution of short-term alpha and market impact is the net balance between adverse selection (AS) and opportunistic savings (OS) (see Altunata, Rakhlin and Waelbroeck, 2010). AS and OS refer to the results of decisions made by an algorithm to trade at specific price points, as opposed to tracking a volume-weighted average price. Good price selection results in opportunistic savings, whereas an algorithm that gets "picked off" at poor price points suffers from adverse selection.

Accordingly, AS and OS measure the negative and positive deviations between the average execution price and the PWP, respectively. Here, the PWP must be adjusted to take into account the difference between the market impact of the realized trade and the hypothetical impact of a pure PWP strategy, as shown in Eqn (1) of this section. An algorithm's ability to control the participation rate and generate OS can have dramatic consequences on the implementation shortfall.

For example, a particular algorithm switching engine (see U.S. Pat. No. 7,908,203) can eliminate 70% of adverse selection costs with only a small reduction in opportunistic savings, resulting in a 40% lower implementation shortfall relative to continuous use of a dark aggregator.

Alpha loss is measured as the difference between the arrival price and the PWP net of the market impact of the shares that were executed in the PWP window.

Determining Optimal Speed

The decomposition of implementation shortfall can be extended to include the relative performance of the selected speed (R) as compared to a benchmark speed level. For example, for a 10% participation rate benchmark, the alpha loss and market impact can be expressed as the combination of their respective values at the benchmark and the marginal effect of the elected speed.

The example depicted in FIG. 36 illustrates the case of considering a 20% participation rate, rather than 10%, in the presence of significant short-term alpha. The market impact at 20% is equal to the market impact at 10% plus the additional impact from executing at 20%. Alpha loss over a 20% participation window is the alpha loss over a 10% window net of the alpha capture from completing the order earlier.

In the example shown in FIG. 36, due to the significant short-term alpha loss, the increase in market impact is more than compensated for by the gains in alpha capture, so 20% would be the better choice of execution speed.

A P/(L) decomposition that accommodates a speed benchmark can be written as:

$$-1\times\ln(P_{exec}/P_{arrival}) = \underbrace{\underbrace{-\left(\ln\left(\frac{PWP_{10}}{P_{arrival}}\right)-MI(S_{PWP_{10}})\right)}_{\text{Short-term Alpha Loss}}-\underbrace{\left(\ln\left(\frac{PWP}{PWP_{10}}\right)-MI(S_{PWP})+MI(S_{PWP_{10}})\right)}_{\text{Speed Alpha Capture/Loss}}}_{\text{Alpha Loss at Selected Speed}} \tag{2}$$

$$\underbrace{\underbrace{-MI(S_{exec},\, r=10\%)}_{MI(10\%)}-\underbrace{MI(S_{exec},\, r=R)+MI(S_{exec},\, r=10\%)}_{\text{Speed Impact}}}_{\text{MI at Selected Speed}}-(AS-OS)$$

Speed Impact is the net market impact cost of the selected speed, measured as the difference between the market impact at the corresponding participation rate and the market impact at 10%.

FIG. 36 shows an example of how to decide the optimal trading speed: is it the 20% participation rate that the customer has chosen or an alternative 10% participation rate? The y axis of FIG. 36 is Profit/(Loss) in basis points. The x axis is time. The customer chose a 20% participation rate, and one observes the P/(L) of 20%. It The customer has a loss of 15 bps.

Would the customer have had a lower loss if he had picked a 10% participation rate? To answer that question entails simulating the P/(L) the customer would have gotten if the customer had picked the 10% participation rate.

And for that one may:

i) take the observed prices (curve with the triangles);

ii) subtract from observed prices the impact of the execution at 20% to see what the impact-free price is (see dotted curve for Alpha Loss);

iii) calculate the average impact-free price for the execution at 10% (still on the dotted curve for Alpha Loss, but going further to the right in time because an execution at 10% takes more time than an execution at 20%); iv) to get the P/(L) at 10% one then needs to add to the impact-free price the impact of the execution at 10% at the 10% benchmark, adjusted for the differential market impact in the two PWP evaluation windows.

The combined result of alpha capture and speed impact provides an assessment of the adequacy of the speed choice. As a rule, a less significant alpha loss is associated with higher potential gains from executing at a lower speed level, given that moderate adverse price movements throughout a longer execution can be more than compensated for by lower market impact costs.

Alpha capture and speed impact can be calculated for any speed level {r}. The optimal participation rate R* is such that the net cost of the speed choice is minimized:

$$\ln\left(\frac{PWP_{R^*}}{PWP_{10}}\right)-MI(S_{PWP_{R^*}})+MI(S_{PWP_{10}})+MI(S_{exec},\, r=R^*)-MI(S_{exec},\, 10\%)=\mathrm{Min}\left\{0,\ \ln\left(\frac{PWP_r}{PWP_{10}}\right)-MI(S_{PWP_r})+MI(S_{PWP_{10}})+MI(S_{exec},\, r)-MI(S_{exec},\, 10\%)\right\}_r \tag{3}$$

Determining Optimal Limit Price

In the case of limit orders, the P/(L) decomposition adjusts for the price limit as follows:

$$-1\times\ln(P_{exec}/P_{arrival}) = -1\times(\text{Short term Alpha Loss}+\text{Speed Alpha Capture/Loss}+MI(10\%)+\text{Speed Impact} \tag{4}$$

$$\underbrace{-1\times\left[\ln\left(\frac{P_{exec}}{\text{PWP\_lim}}\right)-(MI(S_{exec})-MI(S_{PWP}))\right]}_{AS-OS}+\underbrace{\ln\left(\frac{PWP}{\text{PWP\_lim}}\right)}_{\text{Limit Savings}}$$

If one didn't take impact into account, the only thing that one would notice is that 10% takes more time, and if the stock moves away the customer will incur more losses. If the impact is not taken into account, one won't see how much is saved in impact by lowering the speed. Indeed, in this particular case of FIG. 36, what the customer lost in terms of impact is more than compensated for by what he gains by getting the order done earlier. But the size of the cost and benefits could have been different and the only way to know is by calculating both.

Or, in other words, transaction cost analysis is based on historical data in which what is observed is to some extent affected by the customer's strategies. To make a good assessment of alternative strategies, one needs to first subtract out the impact of those strategies to then be able to simulate accurately alternative strategies. This applies not only to speed analysis but also to limit price analysis.

Speed Alpha Capture/Loss is the effect of the selected speed on the timeliness of the trading with respect to the alpha loss. This is measured by the tracking performance of the PWP at the chosen participation rate as compared to the PWP The algorithm's performance in terms of AS/OS is isolated from the effect of the limit price by comparing the average execution price against the PWP within the range of the limit (PWP_lim).

The difference between PWP_limm and PWP reflects the savings from imposing the limit price, which need to be weighed against the cost of executing any unfilled shares due to the limit in order to properly evaluate the adequacy of the limit price strategy. Assume that the order completion (clean-up) occurs after the reversion period at an execution price that accounts for the market impact of the execution of this residual. The resulting overall execution price for the total order size is:

$$P_{total}=\underbrace{\frac{S_{exec}}{S_{total}}}_{W_{exec}}*P_{exec}+\underbrace{\frac{(S_{total}-S_{exec})}{S_{total}}}_{1-W_{exec}}*\underbrace{P_{post-rev}*(1+MI(S_{total}-S_{exec}))}_{P_{cl}} \tag{5}$$

The overall P/(L) associated with this average execution price is:

$$-1\times\ln(P_{total}/P_{arrival}) = -\ln(P_{exec}/P_{arrival}) - \underbrace{\ln\left(1+\frac{1-W_{exec}}{W_{exec}}x\frac{P_{cl}}{P_{exec}}\right)}_{Opportunity\ Costs} \quad (6)$$

The net savings of the limit order over a market order are measured as $\ln(PWP/P_{total})$. When the alpha loss is not significant, the limit price generates savings that are likely to outweigh the opportunity costs. Otherwise, the cost associated with the clean-up of the unfilled shares due to the lower tape volume within the limit will over-compensate for the limit savings. The example depicted in FIG. 37 illustrates this case. Although the loss associated with the execution of the limit order is in general lower than that of the market order, the limit price in this example prevents completion of the execution early on, causes delays and forces a clean-up at much less favorable prices.

FIG. 38 depicts an example of P/(L) decomposition for a set of limit orders placed by an institutional client. Market impact is the largest component of implementation shortfall. In this particular case, since the alpha loss is weak, the impact cost of an average speed higher than 10% does not outweigh the gains from alpha capture. The opportunistic savings generated by the algorithm switching engine outweigh the adverse selection costs. The opportunity costs from imposing a limit price outweigh the limit savings, suggesting that more aggressive limit prices will produce a better performance on average.

The limit price P* over a set of limit prices {l} that maximizes the benefit of limit price savings net of opportunity costs is such that:

$$\ln(PWP/P_{total}(P^*))=\max\{\ln(PWP/P_{total}(l)\}_l \quad (7)$$

FIG. 39 depicts exemplary net limit price savings associated with the customer limit along with three other alternatives: a tactical limit, defined as a price limit 20 basis points away from the arrival price, and moderate and aggressive strategic limits, defined as limit prices that allow for, respectively, 2 times and 4 times the market impact of the execution. The results indicate than an aggressive strategic limit is the best of the four alternatives and in fact generates savings over market orders. In this example, net limit price savings over a market order are maximized with an aggressive strategic price limit.

Optimal Trading Decisions for High Urgency Versus Low Urgency Trades

The profit/(loss) decomposition described above in this section provides an immediate performance evaluation of all the relevant sources of trading costs, as well as an assessment of the short-term alpha loss during the term of the execution. The results of this exemplary TCA methodology may suggest whether a determined set of orders has high alpha loss and can benefit from executions with higher urgency or instead exhibits less significant alpha, presenting opportunities to manage it more tactically.

In most cases, recognizing heterogeneity in the order flow is an important step. Clusters that exhibit similar characteristics should be identified and analyzed separately so that the estimates of their respective components of implementation shortfall can be more informative. This clustering can be done in consultation with a trader or portfolio manager, using fields in the data such as urgency instructions if available, or inferred from the data—however, to be useful the trade urgency must be defined ex-ante so as to enable an optimal trading decision at the start of a trade. The profiling of trade arrivals by urgency is a difficult predictive classification problem that lies outside the scope of this description.

FIG. 40 displays an alpha loss profile for two clusters in the order flow of an institutional client, after subtracting market impact from the observed price returns. Despite the variation within each cluster, the differences in alpha loss between the two groups are statistically significant. Two classes of trading strategies were implemented based on the established trade arrival profiles associated with these disparities: a more aggressive trading strategy for orders identified as high urgency, and a more tactical one for low urgency orders. The identified clusters in order flow with respect to alpha loss are statistically different.

FIGS. 41 and 42 depict a P/(L) decomposition for the two types of strategies. The results show that low urgency orders were executed with an average speed below 10% without significant alpha loss. On the other hand, although high urgency orders are inevitably associated with higher trading implementation losses due to the significant short-term alpha, the additional market impact cost of a speed level over 10% was compensated by the benefit of alpha capture. FIG. 43 displays the market impact cost net of the alpha capture benefit of each benchmark speed level suggesting 5% for low urgency orders and 20% for high urgency orders as the optimal speed levels.

Low urgency orders were executed with an average speed below 10% without significant alpha loss. Although high urgency orders are inevitably associated with higher trading implementation losses due to the significant short-term alpha loss, the additional market impact cost of a speed level over 10% was compensated by the benefit of alpha capture.

FIG. 43 depicts an example of cost of benchmark speed levels versus selected target rate. A 5% participation rate minimizes the implementation shortfall cost for low urgency orders whereas 20% or 40% are better choices for high urgency orders.

While traders have advanced trading tools available, they still need to have access to solutions that help them determine how to use these tools effectively in light of their order flow in order to meet their specific objectives. The standard TCA methods fail to take into account the specific circumstances of each trade and often produce results that are not relevant for each particular set of institutional orders. This description provides a new methodology for TCA that provides an accurate assessment of each term of the profit/(loss) associated with trade execution. This description explains how to identify the impact on performance of the algorithms deployed separately from the impact of the trader's decisions with regard to trading speed and limit prices. At the same time, the methodology described herein also helps in the assessment of the short-term alpha nature of the order flow, which is relevant to higher level trading decisions.

Aspects of a TCA that can successfully assist in the design of optimal trading strategies may be based on the following:

- Understanding the efficiency of an algorithm requires measuring adverse selection and opportunistic savings
- Strategy decisions depend on estimating short-term alpha loss. To estimate alpha loss from post-trade data requires subtracting out the market impact of the trading strategy. To evaluate an alternate strategy requires adding the impact of the strategy under consideration
- Profiling orders based on their arrival characteristics is a valuable first step to determine systematic disparities in short-term alpha loss and identify opportunities to enhance performance The exemplary analytical framework proposed herein that relates to one or more aspect and exemplary embodiments offers opportunities to enhance the investment process by breaking down the implementation shortfall into its root causes and tackling these individually through better algo design or better execution schedules. Armed with this level of analysis, a trading desk can separately assess the value added by the traders' decisions from the underlying quality of the algorithmic trading tools provided by each broker.

References for this Section

Altunata, S., Rakhlin D. and Waelbroeck, H "Adverse Selection vs. Opportunistic Savings in Dark Aggregators", Journal of Trading 5 (1) (2010).

Gomes, C. and Waelbroeck, H. "Effect of Trading Velocity and Limit Prices on Implementation Shortfall", Pipeline Financial Report, PIPE-2008-09-003, September 2008.

As an example with respect to algorithm and filter design (see, e.g., U.S. patent application Ser. No. 13/071,992), incorporated herein by reference), if one determines that a 20% participation rate is indeed the optimal for a well-defined set of order profiles, one can design strategies that optimize around this participation rate and make them available to traders. The execution strategy may be designed to automatically select and manage the most adequate algorithms for a 20% target rate.

Subsequent orders that meet that profile may be automatically assigned to this strategy. In that case, the graphical interface may inform the trader of the name of the strategy being deployed, to which subset of order characteristics it applies, and the respective impact-free price profile.

Alternatively, one may suggest the strategy to the trader and then allow the trader to decide whether to follow the suggestion. Strategies may be selected through drag and drop.

Exemplary Analysis of Trade Profile

The following section describes an exemplary analysis of trades between April 2010 and September 2010 and describes associated optimal trading strategies. See FIGS. 44-51, described in more detail below.

- In general, buy orders exhibit higher impact-free returns than sell orders and, accordingly, may be executed with front loaded strategies to minimize risk, especially for the case of orders above 1% ADV.
- Orders following a prior Close-to-Open gap exhibit continuing trend in impact-free returns whereas the remaining orders exhibit reversion. For the case of buy orders larger than 1% with no gap, the Alpha strategy may be designed to take advantage of the probable price improvement later in the trade. Sell orders with no gap may be executed with a strategy that will extend the execution to the close.
- Orders between 0.01 and 1% ADV are associated with weaker impact-free returns to the close than the larger orders and, in general, may be executed with less urgency.
- Small trades (<0.01% ADV) may be handled using a tactical price-selection alpha-capture strategy, using, for example, an algorithm switching engine in a low-adverse-selection trickle mode, with a minimum participation of 2% to avoid unnecessary execution delays.
- Orders of size larger than 15% ADV are subject to high uncertainty and execution risk. These trades may be executed with a strategy that has a minimum 10% rate to test the market while avoiding adverse selection. In the case of difficult trading conditions with bias to trend continuation, the strategy may increase participation in the market to minimize risk. If a short term decoupling from the sector index or excessive impact occur, the strategy may respond by pausing the execution for 15 minutes and then continuing with a patient execution schedule aiming to minimize impact. The executions may become aggressive in the money on price opportunities; if the stock completely reverts, the strategy may proceed with a 10% rate.

TABLE 15

Overview of exemplary execution strategies

| Strategy | Trade Size, % ADV | Gap | Side | Obs. # | Strategy |
|---|---|---|---|---|---|
| AS Control | <=0.01 | Y/N | B/S | 1,669 | Execute on arrival; dark if possible |
| Alpha T | 0.01-15 | Y | B | 1,870 | 1) Moderate to fill 40%/30 min; 2) Tactical with 7% min rate |
| Alpha R | 1-15 | N | B | 581 | 1) Moderate to fill 20%/15 min 2) Tactical with 1% min rate |
| Alpha | 1-15 | Y | S | 452 | 1) Moderate to fill 20%/15 min 2) Tactical with 7% min rate |
| 10% | 0.01-1 | Y | S | 1,477 | Schedule completion with 10% target rate, using tactical limits to seek good price points. |
| Muni. M | 0.01-1<br>0.01-15 | N | B<br>S | 3,331 | All day munitions management with a minimum rate according to order size. |
| Mega | 15-30 | Y/N | B/S | 406 | Minimum 10% rate, responding to real-time market conditions as described above. |

Descriptive Statistics

TABLE 16

First Day Trades

| Variables | Observations Buy | Observations Sell | Mean Buy | Mean Sell | Median Buy | Median Sell |
|---|---|---|---|---|---|---|
| Order Duration (minutes) | 4,065 | 4,052 | 516 ± 37 | 417 ± 38 | 66 | 52 |
| Trade Duration (minutes) | 4,065 | 4,052 | 484 ± 37 | 407 ± 38 | 61 | 48 |
| Delay Time (minutes) | 4,065 | 4,052 | 32 ± 6 | 10 ± 3 | 2 | 2 |
| Trade Size (% adv) | 4,065 | 4,052 | 5 ± 1 | 5 ± 1 | .4 | .3 |
| BB Pretrade | 4,065 | 4,052 | 94 ± 2* | 100 ± 2* | 14 | 11 |
| Shortfall (bps vs. arrival price) | 4,065 | 4,052 | 64 ± 2* | 62 ± 2* | 7 | 3 |
| Delay Costs (bps vs. arrival price) | 4,065 | 4,052 | −1 ± 1 | −1 ± 1 | 0 | 0 |
| Participation Rate (%) | 4,065 | 4,052 | 10 ± .2 | 10 ± .2 | 6 | 6 |
| Adjusted Tracking Error 5% PWP (bps) | 4,065 | 4,052 | 7 ± 1 | 4 ± 1 | 2 | 1 |
| Adjusted Tracking Error 10% PWP (bps) | 4,065 | 4,052 | 4 ± 1 | 0 ± 1 | 0 | −1 |
| Adjusted Tracking Error 20% PWP (bps) | 4,065 | 4,052 | 2 ± 1 | −2 ± 1 | −1 | −3 |

(*) Value-weighted averages

Methodology and Key Parameters

This subsection considers the classification of trade arrivals by impact-free returns. Impact-free returns may be determined by subtracting expected impact from the observed post-trade prices, using a speed-adjusted model and assuming uniform trading speed within each execution window.

One may define a class C of orders where the sector trader has significant impact-free returns to close, and define X to be a potential filter; the sector trader is statistically likely to have positive impact-free returns if the likelihood of class C is enhanced by applying the filter X. This is the case when:

$$\varepsilon = \frac{N_X(P(C\mid X) - P(C))}{(NX(P(C)(1 - P(C)))^{1/2}} > 2,$$

where P(C|X) is the probability that the sector has positive impact-free returns given X, and there are Nx observations associated with X.

Summary of Findings Class C defines trades with significant impact-free returns to close and X defines the filter

TABLE 17

| First Node | | | |
|---|---|---|---|
| Factor | X | ∊ | $Alpha_{arrival,close}$ \|X, C |
| Trade Size (% ADV) | >1% | 3.4 | 201 ± 5 |

TABLE 18

| Second Node (orders > 1% ADV) | | | |
|---|---|---|---|
| Factor | X | ∊ | $Alpha_{arrival,close}$ \|X,C |
| Prior Close to Open Gap, SPY | $R_{SPY,open,prior\_close}$ > 10bPs | 4.3 | 200 ± 6 |
| Time of Day | Arrival time before 10 A.M | 3.6 | 236 ± 7 |
| Prior Close to Open Gap | $R_{open,prior\_close}$ > 10bps | 2.9 | 215 ± 8 |

1. Trades >1% ADV. Impact-Free to Return Close (prices adjusted for expected impact)

A. Buy orders with prior Close-to-Open gap larger than 10 bps exhibit continuing trend of impact-free returns to the close. Order with gap lower than 10 bps exhibit momentum for the first 60 minutes, which is then followed by some reversion to the close. See FIGS. 44 and 45.

Figure 44:
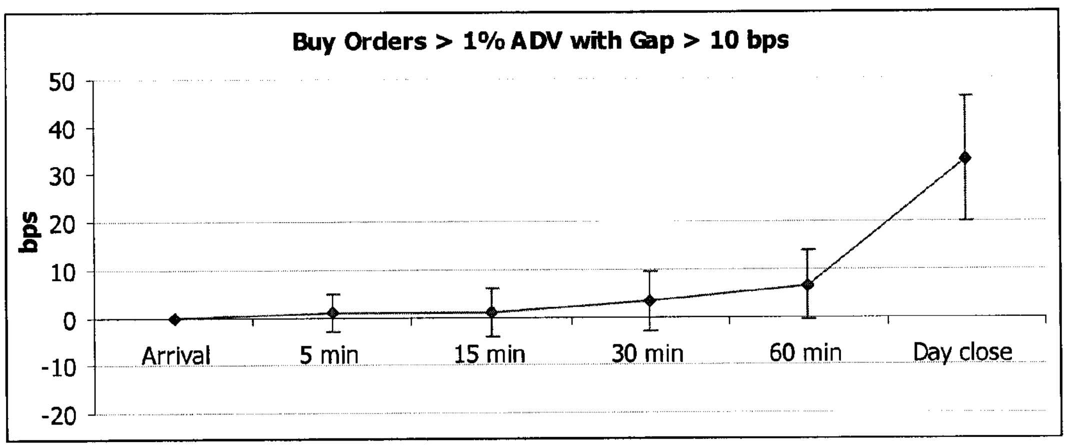
Figure 45:
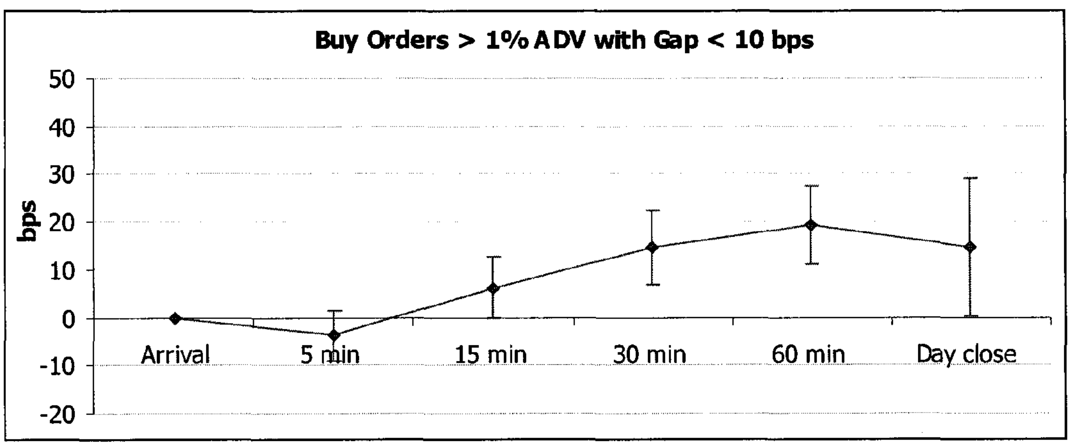
Figure 46:
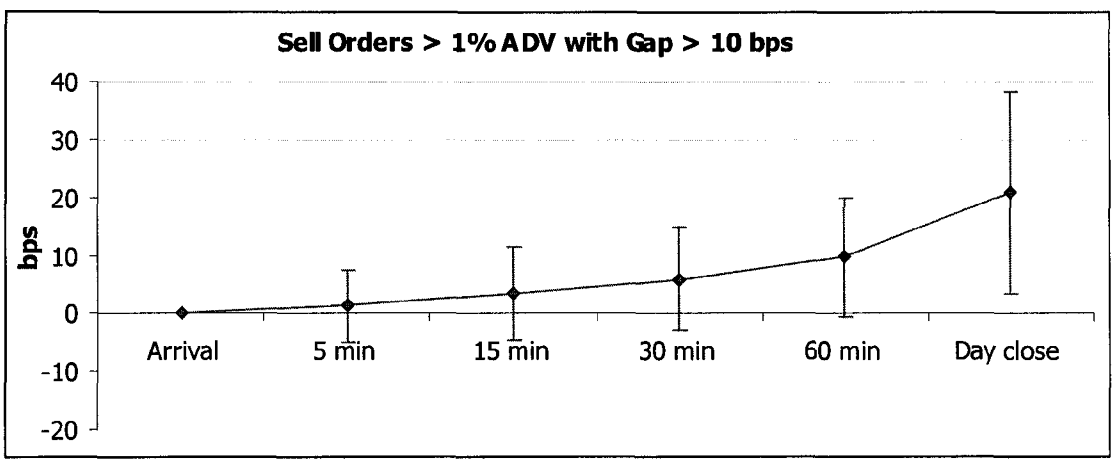
Figure 47:
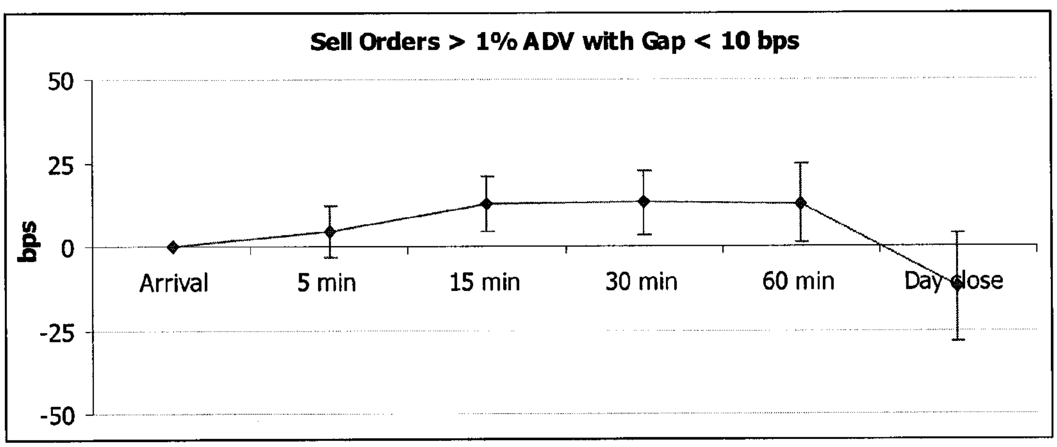
Figure 48:
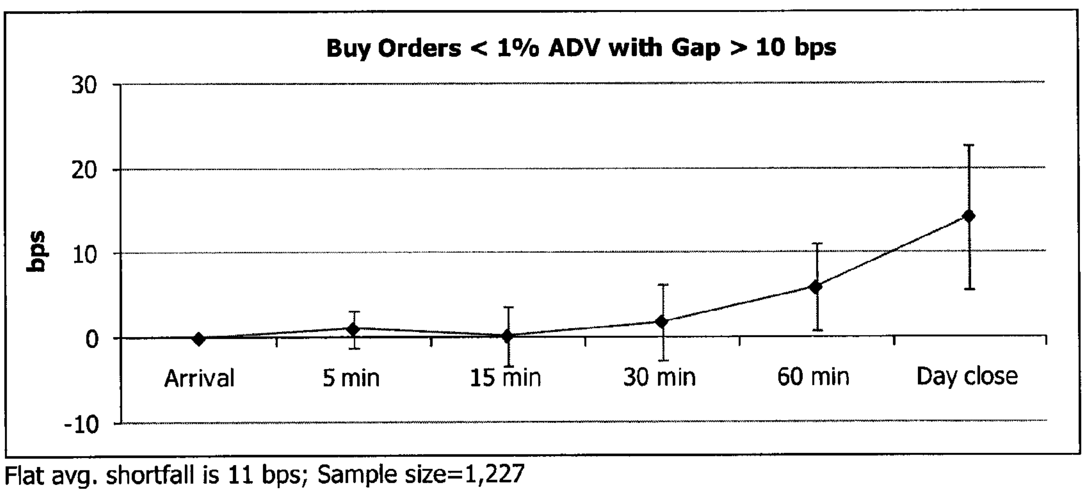
Figure 49:
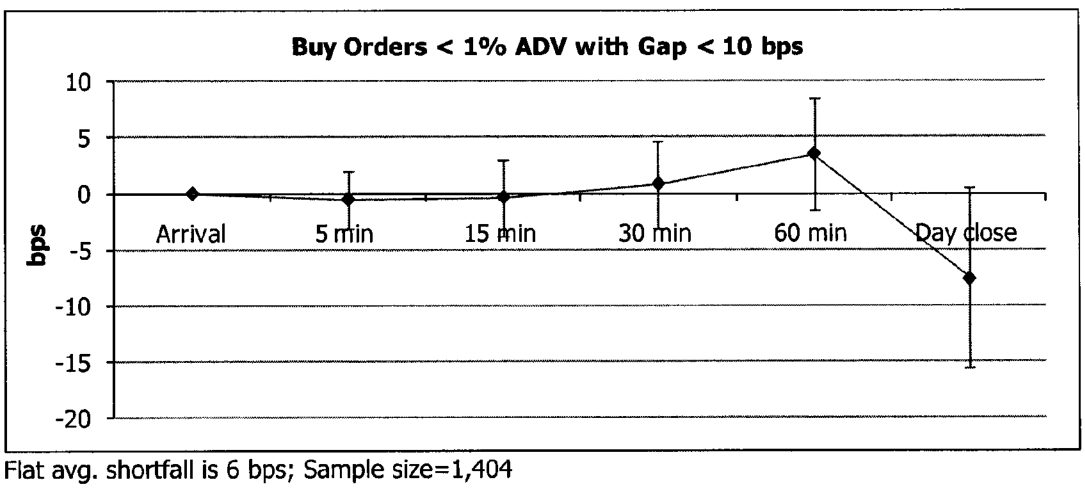
Figure 50:
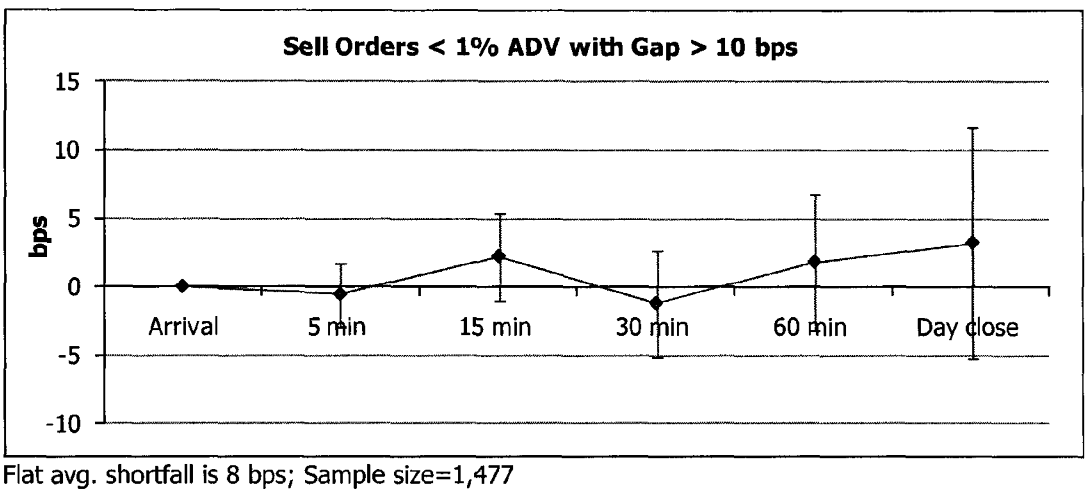
Figure 51:
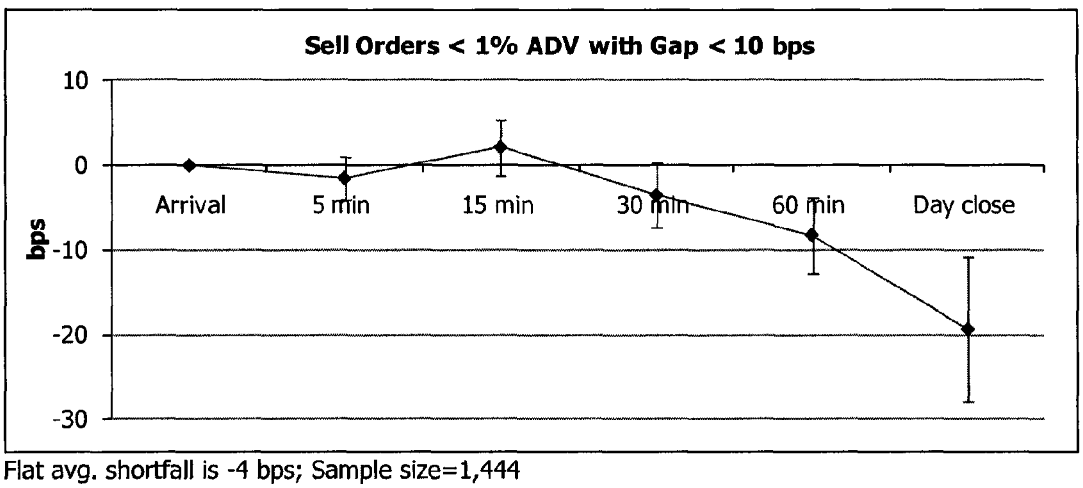

FIGS. 44 and 45 depict two subsets of orders from a customer for which the 20% participation rate is optimal: orders received before 10 A.M. and orders in Large or Mid caps placed later in the day on price reversion. For all other orders from this customer a 5% participation rate appears to be the most adequate.

B. Sell orders with prior Close-to-Open gaps larger than 10 bps also exhibit continuing trend of impact-free returns to the close. Orders with gaps lower than 10 bps exhibit a reversion more pronounced than buy orders. See FIGS. 46 and 47.

2. Trades <1% ADV. Impact-Free to Returns to Close (prices adjusted for expected impact)

C. Smaller buy orders with prior Close-to-Open gap larger than 10 bps also exhibit continuing trend of impact-free returns to the close, whereas those with gap lower than 10 bps exhibit a reversion even more pronounced than large buy orders. See FIGS. 48 and 49.

D. Smaller sell orders with prior Close-to-Open gap larger than 10 bps do not exhibit significant impact-free returns to the close, whereas those with gap lower than 10 bps exhibit a reversion even more pronounced than buy orders. See FIGS. 50 and 51.

Exemplary Report Regarding Trade Profile and Execution Performance

This exemplary report section summarizes findings from an analysis of order placement and execution data from August, 2009 to June, 2010. The first subsection below describes the trade profiles identified in the order flow analysis and suggests the most adequate speed level for each profile. The second subsection presents the execution performance results for each profile.

The most significant underlying alpha to close and short-term underlying alpha are found in orders placed before 10 am as well as in Large/Mid Cap orders with size >0.5% ADV, placed after 10 am on reversion. All other orders do not exhibit strong alpha.

The selected participation rate is optimal for the two above-mentioned order profiles with significant alpha. For the other orders, a lower speed seems to be more appropriate.

Executing orders with no significant alpha at a lower participation rate would likely generate impact savings that more than compensate for the alpha decay. Cash balancing or other PM constraints may require aggressive execution in spite of these recommendations.

For orders with no significant alpha, the chosen limit price is appropriate. For order profiles associated with a strong alpha decay, an aggressive strategic limit price or even a market order are more appropriate.

Subsection 1: Profiling Trade Arrivals: Underlying Alpha and Speed Analysis

One may identify underlying alpha to the close and short-term underlying alpha by measuring price returns net of market impact. This methodology allows one to identify opportunities to trade tactically, managing munitions to take advantage of opportunities while minimizing impact. This exemplary report considered several classifications of trades using variables such as trade size, trade side, start time and prior momentum. These exemplary findings suggest that orders placed before 10 am as well as Large/Mid Cap orders with size >0.5% ADV, placed after 10 am on reversion exhibit strong alpha. All other orders do not exhibit substantial alpha decay.

For each exemplary group of trade profiles, in order to understand the potential costs of using a participation rate other than the selected participation rate, one may consider the tracking performances against 5%, 10%, 20%, and 40% benchmarks. Positive tracking performances may be considered as the costs of the speed benchmarks in question vs. the selected target rates. In contrast, negative tracking performances indicate the savings that would have been achievable had that speed level been used instead of the selected average speed level. The results of the analysis suggest that the selected average participation rates are optimal for the trade profiles associated with significant alpha decay. A 5% participation rate seems to be the most appropriate for the orders with no significant alpha.

FIGS. 52 and 53 depict orders placed before 10 am and Large/Mid Cap orders with size >0.5% ADV, placed after 10 am on reversion are associated with strong alpha decays. A rate around 20% minimizes cost for these trade profiles. For all other orders, which do not exhibit significant alpha decay, 5% is the speed that minimizes cost.

TABLE 19

Underlying Alpha Decay to Close and Short-term Underlying Alpha Decay, Net of Impact (bps)

| | | # | Mean | Std Error | Median |
|---|---|---|---|---|---|
| Orders placed before 10 am | Underlying Alpha Decay to Close | 27 | −58 | 32 | −57 |
| | Short-term Underlying Alpha Decay | 146 | −15 | 6 | −11 |

TABLE 19-continued

| Underlying Alpha Decay to Close and Short-term Underlying Alpha Decay, Net of Impact (bps) | | | | | |
|---|---|---|---|---|---|
| | | # | Mean | Std Error | Median |
| Large/Mid Cap orders with size > 0.5 %ADV, placed after 10 am on reversion | Underlying Alpha Decay to Close | 113 | −32 | 15 | −17 |
| | Short-term Underlying Alpha Decay | 228 | −5 | 2 | −2 |
| Other orders | Underlying Alpha Decay to Close | 123 | 24 | 13 | 24 |
| | Short-term Underlying Alpha Decay | 708 | 4 | 1 | 3 |

TABLE 20

| Impact-Adjusted Cost of Benchmark Speed Levels against Selected Target Rate (bps) | | | | | | |
|---|---|---|---|---|---|---|
| | # | Selected Target Rate (%) | Track-ing to 5% | Track-ing to 10% | Track-ing to 20% | Track-ing to 40% |
| Orders placed before 10 am | 146 | 19<br>(0.8) | 8.3<br>(3.3) | 7.9<br>(1.8) | 4.7<br>(1.6) | 6.9<br>(2.6) |
| Large/Mid Cap orders with size > 0.5% ADV, placed after 10 am on reversion | 228<br>(0.7) | 21<br>(2.1) | 2.1<br>(1.2) | 2.2<br>(0.5) | 1.9<br>(0.9) | 5.3 |
| Other orders | 708 | 27<br>(0.8) | −2.6<br>(1.3) | −1.0<br>(0.9) | 1.6<br>(0.7) | 5.7<br>(0.7) |

Note:
Standard errors in parenthesis

Subsection 2: Descriptive Statistics and Profit/(Loss) Analysis

This subsection presents an analysis of trade execution performance separately for each order profile identified in the prior subsection.

TABLE 21

| Descriptive Statistics | | | | | | |
|---|---|---|---|---|---|---|
| | Orders placed before 10 am | | Large/Mid Cap orders with size >0.5% ADV, placed after 10 am on reversion | | Other orders | |
| | Mean | Std. Error | Mean | Std. Error | Mean | Std. Error |
| # | 146 | | 228 | | 708 | |
| Trade Size (% ADV) | 1.7 | 0.3 | 1.2 | 0.1 | 1.0 | 0.1 |
| Trade Duration (min) | 47 | 6.8 | 28 | 2.7 | 17 | 1.2 |
| Performance to VWAP (cents) | 1.7 | 0.6 | 0.9 | 0.3 | 0.4 | 0.1 |
| Performance to VWAP (bps) | 7.8 | 2.4 | 3.6 | 1.0 | 1.7 | 0.5 |
| P/(L) (bps) | −16 | 5.3 | −9 | 1.8 | −6 | 1.0 |
| Bloomberg Pre-trade (bps) | −24 | 2.0 | −21 | 0.8 | −18 | 0.8 |
| Participation Rate (%) | 18 | 1.6 | 23 | 1.2 | 30 | 1.0 |
| Participation Rate within Limit (%) | 21 | 1.7 | 28 | 1.2 | 32 | 1.0 |

In an exemplary embodiment, an algorithm switching engine's opportunistic savings more than compensate for adverse selection costs. Market impact costs are more than compensated by savings from alpha capture for the trade profiles associated with significant alpha decay. The opportunity costs associated with the incompletion of limit orders are compensated by the limit savings for most orders. See FIGS. 54-56.

TABLE 22

| Value-weighted Profit/(Loss) Decomposition (bps) | | | | | | | | | |
|---|---|---|---|---|---|---|---|---|---|
| Market | | + Participation Rate | | | Vendor Performance | + | Limit Price | | Clean Up |
| Alpha Decay | + Alpha Capture | Market Impact@ 10% | + Speed Impact | + Spread Cost | + Adverse Selection | Opportu ni-stic Savings | + Limit Savings | = Profit/ (Loss) | Oppor tu-nity Cost |
| Orders placed before 10 am | | | | | | | | | |
| −12.3 | 2.2 | −8.5 | −1.9 | −4.2 | −2.4 | 8.7 | 4.3 | −14.1 | −6.1 |
| Large/Mid Cap orders with size > 0.5% ADV, placed after 10 am on reversion | | | | | | | | | |
| −6.4 | 3.4 | −10.5 | −3.1 | −2.1 | −2.9 | 3.4 | 3.2 | −15.0 | −3.4 |
| Other orders | | | | | | | | | |
| 3.1 | −0.8 | −8.5 | −2.6 | −2.6 | −2.3 | 3.5 | 1.3 | −8.9 | −1.1 |

The imposition of a limit price generates overall net savings over a market order which can be measured by subtracting the opportunity cost from the limit savings. In FIG. 57 and the following Table the net savings achieved with the customer limit price are compared against the potential net savings from alternate limit price strategies. Three alternatives are considered: a tactical limit price of 20 bps above the NBBO on entry, a moderate strategic limit that accounts for two times the impact of the execution, and an aggressive strategic limit which accounts for 4 times the impact of the execution.

These exemplary results show that for orders with no significant alpha decay, the limit price chosen by the trader is the most appropriate. For profiles associated with the strongest alpha decays, an aggressive strategic limit price or market orders appear to be the most adequate.

TABLE 23

Value-weighted Limit Price Savings (bps)

| | # | | Mean | Std. Error |
|---|---|---|---|---|
| Orders placed before 10 am | 146 | Tactical Limit | −3.8 | 2.5 |
| | | Moderate Strategic Limit | −2.7 | 2.3 |
| | | Aggressive Strategic Limit | 1.4 | 2.1 |
| | | Customer Limit | −1.6 | 1.0 |
| Large/Mid Cap orders with size > 0.5% ADV, placed after 10 am on reversion | 228 | Tactical Limit | −5.4 | 1.5 |
| | | Moderate Strategic Limit | −4.7 | 1.4 |
| | | Aggressive Strategic Limit | −1.3 | 0.6 |
| | | Customer Limit | −0.1 | 0.6 |
| Other orders | 708 | Tactical Limit | −1.2 | 0.6 |
| | | Moderate Strategic Limit | −0.6 | 0.5 |
| | | Aggressive Strategic Limit | −0.3 | 0.3 |
| | | Customer Limit | 0.2 | 0.3 |

Exemplary Profit/(Loss) Analysis Decomposition

Let $S_{exec}$ be the number of shares executed and $P_{exec}$ the average execution price for an order with arrival price equal to $P_{arrival}$. The Implementation shortfall (IS) can be broken down into its main components as follows:

$$\ln(P_{exec}/P_{arrival}) = \underbrace{\ln\left(\frac{PWP_{10}}{P_{arrival}}\right) - MI\left(\frac{S_{PWP_{10}}}{ADV}\right)}_{Alpha(10\%)} + \underbrace{\left[\ln\left(\frac{P_{exec}}{\text{PWP\_lim}}\right) - \left(MI\left(\frac{S_{exec}}{ADV}\right) - MI\left(\frac{S_{PWP}}{ADV}\right)\right)\right]}_{AS/OS} + \underbrace{MI\left(\frac{S_{exec}}{ADV}, r = 10\%\right)}_{MI(10\%)} +$$

$$\underbrace{\left[\ln\left(\frac{PWP}{PWP_{10}}\right) - \left(MI\left(\frac{S_{PWP}}{ADV}\right) - MI\left(\frac{S_{PWP20}}{ADV}\right)\right)\right]}_{AlphaCapture} + \underbrace{\left[MI\left(\frac{S_{exec}}{ADV}, r = Ru\right) - MI\left(\frac{S_{exec}}{ADV}, r = 10\%\right)\right]}_{Speed\ Impact} + \underbrace{\ln\left(\frac{\text{PWP\_lim}}{PWP}\right)}_{Limit\ Savings}$$

PWP is the participation weighted average price, calculated as the VWAP for the time period starting at order arrival until the time that is required to complete the order at the selected participation rate. $S_{PWP}$ is the number of shares executed in this same PWP evaluation time window. The PWP benchmark is adjusted for the half-spread and for the customer limit price.

MI is the market impact function, estimated using a model calibrated to the Engine's historical performance.

The tracking error TE represents the net difference between adverse selection (AS) and opportunistic savings (OS).

AS and OS refer to disproportionate executions at, respectively, unfavorable and favorable prices points due to variations in participation rates before substantial price movements.

Short-term underlying alpha is measured as the difference between the arrival price and the 10% PWP net of the market impact of the shares executed in the 10% PWP execution window.

Speed Effect is the net market impact cost of the selected speed, measured as the difference between the market impact at the corresponding participation rate and the market impact at 10%.

Alpha capture is the cost of the selected speed in terms of capturing deterioration in alpha. This is measured by the tracking error between the PWP at the chosen participation rate and the PWP at the 10% benchmark, adjusted for the differential market impact of the two speed levels.

The Limit savings may be weighed against the cost of executing any unfilled shares due to the price limit. One may assume the order completion (clean-up) will occur after the reversion period at an execution price that accounts for the market impact of the execution of this residual.

While certain specific exemplary embodiments of the invention have been described herein for illustrative purposes, the invention is not limited to the specific details, representative devices, and illustrative examples shown and described herein. As will be understood by those skilled in the art, various modifications may be made without departing from the spirit or scope of the invention defined by the appended claims and their equivalents.

APPENDIX A

A "tactical" algorithm is a computerized process to execute a large order by repeatedly placing smaller buy or sell orders until the total quantity is completed, wherein the algorithm is optimized to be most effective in specific market conditions, without regard to the possibility that it may not function properly in other market conditions. As such, a tactical algorithm is invoked to execute part but possibly not all of an order, with the limited tactical objective such as minimizing informational market impact in the current market environment. A "strategic" algorithm is a computerized process to execute a large order by invoking one or more tactical algorithms, depending on the market conditions, to ensure that the process functions optimally at any time. A strategic algorithm is invoked to execute an entire order, and maintain a strategic objective such as minimizing overall market impact costs for the entire order.

In one or more exemplary embodiments, a user can choose between a selection of "strategic" algorithms and a selection of "tactical" algorithms when deciding on which algorithm to use for his trading strategy. For the purposes of this description, a "strategic" algorithm is defined an algorithm capable of automatically selecting, initiating, and then managing a group of tactical algorithms according to pre-programmed logic that dictates which algorithms are best suited to respond to specific market conditions or specific changes in market conditions. In at least one embodiment, the subject system offers three strategic algorithms: the "Adaptive" algorithm, the "Execution Rate" algorithm, and the "Pipeline" algorithm.

In this exemplary embodiment, all three strategic algorithms use expected rate of execution to select and initiate the algorithm best suited to fill a user's order given existing market conditions. Then, all three of these strategic algorithms use a measure of market impact—the difference between expected and actual rates of execution—as an indication of whether or not the selected tactical algorithm is succeeding and should be left "on," or if it is failing and must be turned "off." However, while this embodiment employs strategic algorithms that use execution rate and execution rate anomaly to drive the selection and management of tactical algorithms, one skilled in the art will easily envision embodiments wherein the strategic algorithms employ other logic and feedback mechanisms to drive the process of selecting and managing their available universe of tactical algorithms.

While a strategic algorithm is an algorithm capable of initiating and then managing a complete trading strategy in the face of changing market conditions, a tactical algorithm can only place and manage a series of discreet orders according to pre-programmed instructions. A specific example of a tactical algorithm is an algorithm that posts 100 shares on the bid, cancels if unfilled after 2 minutes, posts again on the new bid, and so on until the total desired quantity has been purchased. Therefore a tactical algorithm is a relatively simple algorithm that follows a single behavior which is characterized in how it reacts to events and data from the market.

It is important to note the distinction between strategic algorithms and tactical algorithms. When a user selects a strategic algorithm, he does not have to decide which tactical algorithms are best suited for the existing market conditions, nor does he have to manage the level of the tactical algorithm's aggression as the market moves. The only pieces of information the trader needs to provide when he uses a strategic algorithm are his trading parameters, for example (but not limited to): size and price. On the other hand, when a trader uses a tactical algorithm he must both select the algorithms and set the parameters for the algorithm's operation. In addition, he must manually change these operating parameters to maintain his strategy as market conditions change.

In this description, a system using one or more strategic algorithms to coordinate and potentially switch between a plurality of tactical algorithms may be referred to as an "algorithm switching engine" or simply "switching engine."

As noted above, one or more exemplary embodiments of the subject system offers users three strategic algorithms: the Adaptive algorithm, the Execution Rate algorithm and the Pipeline algorithm. As a strategic algorithm, the Adaptive algorithm is an algorithm that uses a measurement of market impact as defined in the summary section to automate the selection and management of a set of tactical algorithms in keeping with a strategy that can be summarized in two goals: ensuring that an order is completed and minimizing market impact while the order is being worked.

To translate these high-level goals into order executions, the Adaptive algorithm uses a calculation of expected execution rate to determine which tactical algorithm is best suited for the current market and to define a set of operating parameters for that tactical algorithm. These operating parameters include but are not limited to limit price and aggression level. Then once the selected tactical algorithm begins to work the order; the subject system monitors both changes in market conditions and the algorithm's actual rate of execution, and adjusts its operational parameters or selects a new tactical algorithm to ensure that the rate of order executions stays in line with the Adaptive algorithm's two primary goals. More specifically, the Adaptive algorithm may select and then manage its tactical algorithms such that the actual rate of execution does not fall more than one standard deviation below or two standard deviations above the expected rate of execution, based upon the assumption that a strong mismatch between expected and actual rate of execution is a reflection of informational leakage. Furthermore it may always terminate any tactical algorithms that result in actual execution rates below 5%.

To calculate the expected rate of execution within existing market conditions for each of the tactical algorithm within its universe of control, the Adaptive algorithm uses the current value of a technical price momentum indicator which the subject system pulls from a table stored in the computer's memory. To populate this table, a historical database of past trades is used to calculate the historical average rate of each tactic for various ranges of values of price momentum. Then once the Adaptive Algorithm accesses this table containing the expected rate of execution calculated for each of its tactical algorithms within the existing market conditions; it compares such expected rates to the overall average rate of execution of the tactical algorithms, in order to determine the marginal effect of the momentum on the expected execution rate. This difference between the expected rate given the current market conditions and the overall average rate for this tactic is called the "rate anomaly" below. The Adaptive algorithm selects the tactical algorithm with the lowest rate anomaly—and by correlation the lowest rate of market impact. Tactical agents are classified as "slow", "normal" and "aggressive" according to their designed speed of execution; the expected rate of the "normal" rate tactic with the lowest rate anomaly will be referred to below as "red-line" rate: it is a proxy for the highest rate one would expect to accomplish without making the algorithmic trading activity easily detectable by other market participants.

Once the tactical algorithm is operating, its actual rate of execution is then compared with the expected rate of execution at the end of every minute interval. The actual rate of execution is determined by the shares executed by the tactical algorithm divided by the total shares printed to the tape; usually provided as a percentage. If the actual execution rate falls more than one standard deviation or rises more than two standard deviations from expectations, that particular tactical algorithm is disabled and replaced by a new tactical algorithm selected via the same mechanism as described above. To prevent itself from selecting the same tactical algorithm twice in a row, the Adaptive algorithm remembers the three most recently disabled tactics and will not select them as long as they are on the list of the last three tactical algorithms selected. While this embodiment of the Adaptive algorithm employs this measurement of execution rate anomaly as a mechanism for driving the selection and management of tactical algorithms, other mechanisms for selecting tactical algorithms envisioned by those skilled in the art also apply.

The "Execution Rate" algorithm also is a strategic algorithm. However, while the purpose of the Adaptive algorithm is to automate a trading strategy based on minimal market impact (measured as the difference between actual execution rate and the expected rate for that tactic given the current market conditions), the purpose of the Execution Rate algorithm is to give the user the flexibility to automate a trading strategy according to the specific level of market impact with which he is comfortable. For instance, the Execution Rate algorithm would be ideal for a trader who has more time to complete his order and wants to use an execution rate that is lower than the Adaptive algorithm's stated participation rate target (for example, 20% execution rate), or for a trader who has less time, is not worried about market impact, and is willing to accept a more aggressive execution rate in order to get more done in a shorter timeframe.

Just like the Adaptive Algorithm, the Execution Rate algorithm uses a measurement of market impact to select and then manage the universe of tactical algorithms at its disposal. However, when a user initiates the Execution Rate algorithm, the system does not assume that the user's preferred execution rate is the posted value (20% in the above example) for the Adaptive algorithm. Instead, when the user initiates the Execution rate algorithm, he must select his preference for expected execution rate; anywhere from 5% up to 40%. Then once the user indicates his preferred execution rate, the system selects the tactical algorithm and associated operating parameters that will best meet the user's input given the existing market conditions. Again, the system uses the same methods for calculating the expected rate of execution for each of the available tactical algorithms described above.

Then, as the tactical algorithm begins to work the order, the subject system monitors the actual rate of execution, determined by the number of shares executed by an algorithm divided by the total shares printed to the tape, at the end of each minute interval. It then compares the expected execution rate selected by the user and the actual execution rate, and if the difference between the two numbers is greater than one standard deviation, it makes adjustments to the operating parameters and/or the tactical algorithm in use to ensure that the Execution Rate algorithm maintains the rate selected by the user.

The Pipeline Algorithm is the subject system's third strategic algorithm, but is only available in embodiments associated with the Pipeline alternative trading system. While there are many figures, examples and elements in this application that reference an embodiment of the subject system adapted for use with the Pipeline Trading system, the subject system is designed to work as an adjunct to any proprietary trading system or trading platform, and the use of examples from the embodiments developed for Pipeline in no way limits the scope of the invention.

The purpose of the Pipeline algorithm is to allow users to initiate a strategy which will place block orders on the Pipeline trading system when certain conditions are met. For example, a user can indicate specific prices or price ranges when he would want to place or cancel a block order on Pipeline. A user can also specify the size of the blocks that are placed, as well as the frequency with which blocks are replenished after fills. In addition, the Pipeline Algorithm allows the user to coordinate the entry and cancellation of blocks on Pipeline with the user's other algorithmic activity conducted via the subject system in the same symbol.

Finally, to further reduce the number of times a trader must respond to the Pipeline system, a trader can use the Pipeline algorithm to set a price limit for automatically accepting passive counter-offers that fail to execute at the reference price but fall within the NBBO, and/or to designate the specific circumstances when he would be willing to accept a trade outside of the midpoint—for example where the current offered price is below the 10-minute trailing average price, or other price validation methods that can be imagined to those skilled in the art.

In addition, those skilled in the art will envision other order entry elements related to trading on the Pipeline System that are not described herein but are included within the scope of the invention. When used in conjunction with either the Adaptive algorithm, the Participation rate algorithm or any of the tactical algorithms, the Pipeline algorithm ensures that a user will not miss the opportunity for a block cross while he works his order in smaller increments through the subject system's other algorithmic offerings.

Finally, while some exemplary embodiments only incorporate these three strategic algorithms, other embodiments which include other algorithms, either those associated with the subject system or offered by third parties (e.g. brokers and independent vendors), will easily be envisioned by those skilled in the art and are included in the scope of the invention.

While some of the embodiments discussed above allow a user to select from a set of strategic algorithms, one or more alternate exemplary embodiments automate the step of strategy selection by employing a complex set of filters referred to colloquially herein as "Filter B." The purpose of these Filter B embodiments is to add an additional layer of automation and "intelligence" to the system that is capable of assigning a strategy type to an order based on the system's knowledge of the submitting trader's trading patterns, information about the order, and current market conditions. Then after Filter B has determined the best strategy for a given order, it is capable of making the necessary communications to initiate the process described above wherein a strategic algorithm selects and switches among a particular universe of tactical algorithms. In an exemplary embodiment, a Filter B component operates as a "frontal cortex" to an algorithm switching engine, but this description of a Filter B component's ability to initiate the appropriate strategic algorithm is not limited to a particular algorithm switching engine or the three specific strategic algorithms described above. Rather it is a reference to a Filter B component's ability to communicate with, interact with, and initiate a system capable of automatically selecting, initiating, and then managing a group of strategic and/or tactical algorithms according to an analysis or evaluation of which algorithms are best suited to handle the market conditions or the changes in market conditions over a given period of time.

For example, after reviewing an order and the related trader and market information, a Filter B component may determine that a strategy such as the "Munitions Manager," strategy described herein is the best strategy for that order given the system's knowledge about the initiating trader and the market conditions at that moment in time. After making that determination, the Filter B component would then tell the switching engine that it assigned the "munitions manager" strategy to the order and then switching engine would know that it needed to narrow its universe of available algorithms to the subset of algorithms tagged as acceptable for an order designated to the "munitions manager" strategy. The "munitions manager" strategy is meant only for the purpose of illustration, and any other strategy described herein or as could be imagined by one skilled in the art could also be used.

Then once the algorithm switching engine begins to execute the order, any one of a number of triggers can initiate a "hypothesis validation" check whereby the Filter B component reviews and either confirms or rejects the strategy previously assigned to the original order. These triggers can include but are not limited to: decisions made by the Algorithm Switching Engine, movements in the market, actions taken by the trader, or the passage of a certain amount of time. If the hypothesis validation check determines that the previously assigned strategy is either no longer valid or is no longer the best strategy for the remainder of the order given existing market conditions, Filter B has the ability to cancel the active strategy, assign a new strategy, and communicate the change and all associated requirements to the algorithm switching engine.

These Filter B embodiments seek to maximize efficiency of storage and re-use of data to the largest extent possible. This may be accomplished, for example, by breaking the data out into three primary entities:

Stage—A collection of settings that direct the trading of an order at a given point along its overall execution plan.

Filter—A collection of attributes that define the types of orders that fall under the filter, along with an associated collection of Stages that direct the trading of the order.

Filter Set—A logical collection of 1 to N Filters.

A Stage may be used in one or more Filters. A Filter may belong to one or more Filter Sets. Filter Sets may be accessed by one or more Firms/Traders in the trading system.

This may be implemented via a secondary set of relational entities

Filter Stage—Maps a Stage to a particular Filter, along with a rank against other Stages for that Filter.

Filter Set Member—Maps a Filter to a Filter Set, along with a rank against other Filters in that Set.

Filter Set Access—Associates a Filter Set to a Firm, Trader, or a Firm's Order Route (FIX Session).

Trading Server

An exemplary Trading Server filter table relational diagram is depicted in FIG. 103.

Primary Entity Tables

FilterTbl

The FilterTbl holds data to a uniquely defined Filter. The design allows for a Filter to be used by a single Filter Set, or to be reused by multiple Filters Sets. See Tables 24 and 25.

TABLE 24

| Columns | Data Type | Comment |
|---|---|---|
| FilterIDN | int4 | Unique identifier for this Filter. |
| FirmIDN | int4 | Optional to restrict ownership of the Filter to a single Firm. If > 0, the stage will only be available for Filter Sets created for the specified Firm. |
| name | varchar(255) | Name of the Filter. Used as a unique human readible identifer. |
| description | varchar(1024) | Description of the Filter. |
| label | varchar(512) | Optional label for the Filter to be used in UI elements (GUI/Reports/CIS). If not set, will default to Name. |
| adv_max | float8 | |
| adv_min | float8 | |
| daytime_max | float8 | |
| daytime_min | float8 | |
| engine_only | int4 | |
| gap_max | float8 | |
| gap_min | float8 | |
| hypothesis_mask | int4 | |
| listing_market | varchar(255) | |
| market_cap | int4 | |
| max_block_share | float8 | |
| max_iday_abs_momentum | float8 | |
| max_iday_rel_momentum | float8 | |
| max_pal_on_replace | float8 | |
| momentum_max | int4 | |
| momentum_min | int4 | |
| pal_max | float8 | |
| pal_min | float8 | |
| pm_name | varchar(512) | |
| rel_momentum_max | int4 | |
| rel_momentum_min | int4 | |
| rel_volatility_max | float8 | |
| rel_volatility_min | float8 | |
| sfall_anomaly_max | float8 | |
| sfall_anomaly_min | float8 | |
| side | int4 | |
| spread_max | int4 | |
| spread_min | int4 | |
| startup_mask | int4 | |
| tactical_pullback | int4 | |
| volatility_max | float8 | |
| volatility_min | float8 | |
| Status | int4 | Status of the Record (Active\|DELETE). |
| CreateTime | timestamp | Time the record was created. |
| ModifyTime | timestamp | Time the record was modified. |
| Created By | varchar(255) | Operator who created the record. |
| ModifiedBy | varchar(255) | Operator who last modified the record. |

TABLE 25

| Constraints | Kind | Columns | Comment |
|---|---|---|---|
| | PRIMARY KEY | FilterIDN | |
| uc_name | UNIQUE | name,FirmIDN | Each Filter must have a unique name within a given firm. |

StageTbl

The StageTbl holds data to a uniquely defined Filter Stage. The design allows for a Stage to be used by a single Filter, or to be reused by multiple Filters. See Tables 26 and 27.

TABLE 26

| Columns | Data Type | Comment |
|---|---|---|
| StageIDN | int4 | Unique identifier for this Filter Stage. |
| FirmIDN | int4 | Optional to restrict ownership of the Stage to a single Firm. If > 0, the stage will only be available for Filters created for the specified Firm. |
| name | varchar(512) | Name of the Stage. Used as a unique human readible identifer. |
| description | varchar(1024) | Description of the stage. |
| label | varchar(512) | Optional label for the Stage to be used in UI elements (GUI/Reports/CIS). If not set, will default to Name. |
| expiration | float8 | |
| expiration_max | float8 | |
| keep_streaming | int4 | |
| low_rate_alert | float8 | |
| min_ratio | float8 | |
| opportunist_type | int4 | |
| rate_force | float8 | |
| rate_max | float8 | |
| rate_min | float8 | |
| reversion | float8 | |
| reversion_holdback | float8 | |
| Status | int4 | Status of the Record (Active\|DELETE). |
| CreateTime | timestamp | Time the record was created. |
| ModifyTime | timestamp | Time the record was modified. |
| CreatedBy | varchar(255) | Operator who created the record. |
| ModifiedBy | varchar(255) | Operator who last modified the record. |

TABLE 27

| Constraints | Kind | Columns | Comment |
|---|---|---|---|
| | PRIMARY KEY | StageIDN | |
| uc_name | UNIQUE | name,FirmIDN | Each Stage must have a unique name within a given Firm. |

FilterSetTbl

The Filter SetTbl holds data to a uniquely defined Filter Set, comprised of one or more Filters. The design allows for a Filter Set to be used by a single Finn/Trader, or to be reused by multiple Firm/Traders. See Tables 28 and 29.

TABLE 28

| Columns | Data Type | Comment |
|---|---|---|
| FilterSetIDN | int4 | Unique identifier for this Filter Set. |
| FirmIDN | int4 | Optional to restrict ownership of the Filter Set to a single Firm. If > 0, the Filter Set will only be available for the specified Firm. |
| name | varchar(255) | Name of the Filter Set. Used as a unique human readible identifer. |
| description | varchar(1024) | Description of the Filter Set. |
| label | varchar(512) | Optional label for the Filter Set to be used in UI elements (GUI/Reports/CIS). If not set, will default to Name. |
| Status | int4 | Status of the Record (Active\|DELETE). |
| CreateTime | timestamp | Time the record was created. |
| ModifyTime | timestamp | Time the record was modified. |
| CreatedBy | varchar(255) | Operator who created the record. |
| ModifiedBy | varchar(255) | Operator who last modified the record. |

TABLE 29

| Constraints | Kind | Columns | Comment |
|---|---|---|---|
| | PRIMARY KEY | FilterSetIDN | |
| uc_name | UNIQUE | name,FirmIDN | Each Filter Set must have a unique name within a given firm. |

Relational Tables

FilterStageTbl

The FilterStageTbl holds the mappings of unique Stages to Filters. See Table 30 and 31.

TABLE 30

| Columns | Data Type | Comment |
|---|---|---|
| FilterStageIDN | int4 | Unique identifier of the Stage to Filter mapping. |
| FilterIDN | int4 | Unique identifier of the related Filter. |
| StageIDN | int4 | Unique identifier of the related Stage. |
| FilterSetIDN | int4 | FilterSet that this Filter/Stage ranking is associated. |
| Rank | int4 | Optional rank within the Filter Stages. NOTE: Rank is not enforced to be unique within a set of Filter Stages. |
| Status | int4 | Status of the Record (Active\|DELETE). |
| CreateTime | timestamp | Time the record was created. |
| ModifyTime | timestamp | Time the record was modified. |
| CreatedBy | varchar(255) | Operator who created the record. |
| ModifiedBy | varchar(255) | Operator who last modified the record. |

TABLE 31

| Constraints | Kind | Columns | Comment |
|---|---|---|---|
| | PRIMARY KEY | FilterStageIDN | |
| uc_filterstage | UNIQUE | FilterIDN,StageIDN,FilterSetIDN | Unique mapping of a Stage to a Filter within a FilterSet. NOTE: Rank is not enforced to be unique within that Filter's Stages. This means all of the Stages within a set can have the same Rank, but a Stage can only be included in a set once. It is up to the application to enforce rules for Rank. |

FilterSetMemberTbl

The FilterSetMemberTbl holds the mappings of one or more Filters to a given Filter Set. It also provides a mechanism for Ranking a Filter within a given Filter Set. See Tables 32 and 33.

TABLE 32

| Columns | Data Type | Comment |
|---|---|---|
| FilterSetFilterIDN | int4 | Unique identifier of Filter to Set mapping. |
| FilterSetIDN | int4 | Unique Id of related Filter Set. |
| FilterIDN | int4 | Unique Id of related Filter. |
| Rank | int4 | Numeric rank within the set. NOTE: Uniqueness of the rank within the set is NOT enforced. |
| Status | int4 | Status of the Record (Active\|DELETE). |
| CreateTime | timestamp | Time the record was created. |
| ModifyTime | timestamp | Time the record was modified. |
| CreatedBy | varchar(255) | Operator who created the record. |
| ModifiedBy | varchar(255) | Operator who last modified the record. |

TABLE 33

| Constraints | Kind | Columns | Comment |
|---|---|---|---|
| | PRIMARY KEY | FilterSetFilterIDN | |
| uc_filterset | UNIQUE | FilterSetIDN, FilterIDN | Unique mapping of a Filter to a Set. NOTE: Rank is not enforced to be unique within that set. This means all of the Filters within a set can have the same Rank, but a Filter can only be included in a set once. It is up to the application to enforce rules for Rank. |

FilterSetAccessTbl

The FilterSetAccessTbl maps a Filter Set to a given Firm (required) and optionally Trader or Order Route (FIX Session). See Tables 34 and 35.

TABLE 34

| Columns | Data Type | Comment |
|---|---|---|
| FilterSetAccessIDN | int4 | Unique identifier of the Filter Set Access record. |
| FilterSetIDN | int4 | Foreign Key to unique identifier of the Filter Set. |
| UserIDN | int4 | Optional. If set, a specific trader assignment (as opposed to a firm level default). |
| PublishToUI | bool | If true, the Filter Set will be available to the Trader's GUI. |

TABLE 34-continued

| Columns | Data Type | Comment |
|---|---|---|
| Rank | int4 | Ordering of this FilterSet for the Firm/User/Route. |
| Status | int4 | Status of the Record (Active\|DELETE). |
| CreateTime | timestamp | Time the record was created. |
| ModifyTime | timestamp | Time the record was modified. |
| CreatedBy | varchar(255) | Operator who created the record. |
| ModifiedBy | varchar(255) | Operator who last modified the record. |

TABLE 35

| Constraints | Kind | Columns | Comment |
|---|---|---|---|
| | PRIMARY KEY | FilterSetAccessIDN | |
| uc_access | UNIQUE | FilterSetIDN, UserIDN | The access association is unique to a combination of Filterset and User values. |

Other Exemplary Tables

Order Summary (routed) and Fill Summary records should store the applicable FilterStageIDN.

Exemplary Data Structures

At StartOfDay sortd loads three hashes with the primary filter data.

- Hash of FilterSets with key=FilterSetIDN
- Hash of Filters with key=FilterIDN
- Hash of Stages with key=StageIDN Each FilterSet preferably has a:

- Vector of pointers to Filter Wrapper Objects, ordered using the FilterSetMemberTbl.

Filter Wrapper Object has 4 members

- FilterSetMemberIDN—used for processing updates from the Help Desk.
- Status—used for handling intraday deletes.
- Pointer to a Filter Object.
- A vector of Stage Wrapper Objects
  - A Stage Wrapper Object has 3 members
  - FilterStageIDN (this will be needed for Order Summary records)
  - Status—used for handling intraday deletes.
  - Pointer to a Stage Object.

Each User has a:

- Vector of FilterSet Wrapper Objects ordered by Rank using the FilterSetAccessTbl.
- A FilterSet Wrapper Object has 3 members:
  - A FilterSetAccessIDN—used for processing updates from the Help Desk.
  - Status—used for handling intraday deletes.
  - Pointer to a FilterSet Object.

Intraday Updates

- When Filters and Stages are removed from FilterSets or FilterSets are removed from Stages sortd will receive FilterStage, FilterSetMember, or FilterSetAccess updates from CIS.
- These updates will be compared against the IDN's in the Wrapper Objects.
- FilterSets, Filters, and Stages can be set to a "DELETE" status during the day based on Live Updates from CIS.
- Nothing is actually deleted until the end of the day.

Exemplary Help Desk Embodiments

In CIS, Stages, Filters, and FilterSets will be treated similarly to FIX Sessions.

FilterSets can only be Added/Deleted/Copied/Modified from a Filter Management Screen.

FilterSets will be referenced and assigned to Firm/Users in Firm/User screens, but not modified.

Permissions

- Filters, Stages, and FilterSets all have an optional FirmIDN field.
- If the FirmIDN is "0", the Filter, Stage, or Set can be accessed by any firm/user.
- If the FirmIDN is >0, the Filter, Stage, or Set can only be referenced by members of that firm.

FilterSet References

Determining the affected Filters/Sets/Users/Firms can be accomplished via the following queries.

If there is a modification requested, the system must verify if that change should be applied to all Users that are referencing the Stage/Filter/FilterSet or whether these changes are for an individual.

Query1—Stage References

List Firms, FilterSets, and Filters that are referencing a specific Stage.

```
SELECT f.description as firm, ft.name as filterset, fr.name as filter
FROM filterstagetbl fs
INNER JOIN stagetbl s ON fs.stageidn=s.stageidn
INNER JOIN filtertbl fr ON fs.filteridn=fr.filteridn
INNER JOIN filtersettbl ft ON fs.filtersetidn=ft.filtersetidn
INNER JOIN filtersetaccesstbl fa ON fs.filtersetidn=fa.filtersetidn
INNER JOIN usertbl u ON u.useridn=fa.useridn
INNER JOIN firmtbl f ON f.firmidn=u.firmidn
WHERE
s.name='Tactical 01'
GROUP BY ft.name, fr.name, f.description
ORDER BY f.description, ft.name, fr.name
```

Query2—Filter References

List Firms, FilterSets, that are referencing a specific Filter.

```
SELECT f.description as firm, ft.name as filterset
FROM filtersetmembertbl fm
INNER JOIN filtertbl fr ON fm.filteridn=fr.filteridn
INNER JOIN filtersettbl ft ON fm.filtersetidn=ft.filtersetidn
INNER JOIN filtersetaccesstbl fa ON fm.filtersetidn=fa.filtersetidn
INNER JOIN usertbl u ON u.useridn=fa.useridn
INNER JOIN firmtbl f ON f.firmidn=u.firmidn
WHERE
fr.name='MunitMgr 01'
GROUP BY ft.name, f.description
ORDER BY f.description, ft.name
```

Query3—FilterSet References

List Firms, Users, that are referencing a specific FilterSet.

```
SELECT f.description as firm, u.logonid as logon
FROM filtersettbl ft
INNER JOIN filtersetaccesstbl fa ON ft.filtersetidn=fa.filtersetidn
INNER JOIN usertbl u ON u.useridn=fa.useridn
INNER JOIN firmtbl f ON f.firmidn=u.firmidn
WHERE
ft.name='JPMIM-Auto'
ORDER BY f. description, u.logonid
```

FilterSet Copy

If the change to the Filter/Stage setting is global, the workflow is simple. Modify the setting and send the appropriate updates to the system.

If the modification is not global then affected FilterSet must be copied before the change can be made.

Copying a FilterSet can be broken down into three basic steps.

Step 1—Duplicate the FilterSet Record.

This example creates a copy of "CEF-Auto", renaming it "CEF-Trader X".

The description and label values are kept from the original.

INSERT INTO filtersettbl(name,description,label,firmidn,status,createtime, createdby)

VALUES('CEF-Trader X', (SELECT description FROM filtersettbl WHERE name='CEF-Auto'), (SELECT label FROM filtersettbl WHERE name='CEF-Auto'), (SELECT firmidn FROM filtersettbl WHERE name='CEF-Auto'), 1, timezone('UTC'::text, now( )), 'scottl'

);

Live Update

1. CIS sends new FilterSet record to sortd, Action=ADD.

2. Sortd Creates new FilterSet Object.

3. Sortd stores new FilterSet Object in FilterSet Hash.

Step 2—Duplicate FilterSet Members

This step will copy references of all "CEF-Auto" Filters to "CEF-Trader X", preserving their rank.

INSERT INTO filtersetmembertbl(filtersetidn,filteridn,rank,status,createtime,createdby)

SELECT (SELECT filtersetidn FROM filtersettbl WHERE name='CEF-Trader X') as filtersetidn,fm.filteridn, fm.rank ,1, timezone('UTC'::text, now( )), 'scottl'

FROM filtersetmembertbl fm

INNER JOIN filtersettbl ft ON fm.filtersetidn=ft.filtersetidn

WHERE ft.name='CEF-Auto';

Live Update

1. CIS sends a list of FilterSetMember records to sortd, action=ADD.

2. Sortd gets FilterSet Object based on FilterSetIDN in FilterSetMember list.

3. Create vector of Filter Wrapper Objects for FilterSet based on FilterSetMember list.

Step 3—Duplicate Filter Stages

This step will copy references of all "CEF-Auto" Stages to "CEF-Trader X", preserving their rank within each filter.

INSERT INTO filterstagetbl(filtersetidn,filteridn,stageidn,rank,status, createtime,createdby)

SELECT (SELECT filtersetidn FROM filtersettbl WHERE name='CEF-Trader X') as filtersetidn,fs.filteridn, fs.stageidn,fs.rank ,1, timezone('UTC'::text, now( )), 'scottl'

FROM filterstagetbl fs

INNER JOIN filtersettbl ft ON fs.filtersetidn=ft.filtersetidn

WHERE ft.name='CEF-Auto';

Live Update

1. CIS sends a list of FilterStage records to sortd, action=ADD.

2. Sortd gets FilterSet Object based on FilterSetIDN in FilterStage list.

3. Create hash of vectors of Stage Wrapper Objects for FilterSet based on FilterStage list.

Working with FilterSets

FilterSet assigned to/removed from a User.

These two examples (A and B) show how FilterSets can be assigned/removed to/from a trader. These specific examples illustrate how following a FilterSet Copy, the original FilterSet may be removed.

(A) Assigning a FilterSet to a User.

This query adds the CEF Trader X FilterSet to the logon autoclient@citadel, ranking it behind existing FilterSets assigned to the logon.

INSERT INTO filtersetaccesstbl (filtersetidn,useridn,rank,publishtoui,status,createtime,createdby)

VALUES ( (SELECT filtersetidn FROM filtersettbl WHERE name='CEF-Trader X'), (SELECT useridn FROM usertbl WHERE logonid='autoclient@citadel'), (SELECT max(rank)+1 FROM filtersetaccesstbl WHERE useridn=(SELECT useridn FROM usertbl WHERE logonid='autoclient@citadel')), 't'::bool,1,timezone('UTC'::text, now( )), 'scottl')

);

Live Update

1. CIS sends FilterSetAccess record to sortd, action=ADD.

2. Sortd gets user based on FilterSetAccess record.

3. Sortd creates a FilterSet Wrapper Object and inserts into the users's Filter vector, based on rank in FilterSetAccess record.

(B) Removing a FilterSet from a User.

First, set the status of the 'CEF-Auto' FilterSet to DELETE (2).

UPDATE filtersetaccesstbl set status=2, modifytime=timezone('UTC'::text, now( )), modifiedby='scottl'

WHERE filtersetaccessidn=

(

SELECT fa.filtersetaccessidn

FROM filtersetaccesstbl fa

INNER JOIN filtersettbl ft ON fa.filtersetidn=ft.filtersetidn

INNER JOIN usertbl u ON fa.useridn=u.useridn

AND ft.name='CEF-Auto' AND u.logonid='autoclient@citadel')

);

Then, update the rank of the user's other FilterSets.

UPDATE filtersetaccesstbl

SET rank=rank−1, modifytime=timezone('UTC'::text, now( )), modifiedby='scottl'

WHERE useridn=(SELECT useridn from USERTBL where logonid='autoclient@citadel')

AND rank >

(

SELECT fa.rank

FROM filtersetaccesstbl fa

INNER JOIN filtersettbl ft ON fa.filtersetidn=ft.filtersetidn

INNER JOIN usertbl u ON fa.useridn=u.useridn

AND ft.name='CEF-Auto' AND u.logonid='autoclient@citadel')

);

Live Update

1. CIS sends FilterSetAccess record to sortd, action=DELETE.

2. Sortd gets user based on FilterSetAccess record.

3. Sortd finds the FilterSet Wrapper object in its vector based on FilterSetAccessIDN and sets status to DELETE.

Filter added to/removed from a FilterSet.

This example will replace the Filter 'CT 8pct' with 'SmlCap Md 02' in the CEF-Trader X FilterSet.

Adding a Filter to a FilterSet.

First add the new Filter to the set.

```
INSERT INTO
filtersetmembertbl(filtersetidn,filteridn,rank,status,createtime,createdby)
VALUES(
(SELECT filtersetidn from filtersettbl where name='CEF-Trader X'),
(SELECT filteridn from filtertbl where name='SmlCap Md 02'),
(
SELECT fm.rank
FROM filtersetmembertbl fm
INNER JOIN filtersettbl ft ON fm.filtersetidn=ft.filtersetidn
INNER JOIN filtertbl fr ON fm.filteridn=fr.filteridn
WHERE ft.name='CEF-Trader X' AND fr.name='CT 8 pct')
),
1, timezone('UTC'::text, now( )),'scottl')
);
```

Live Update

1. CIS sends FilterSetMember record to sortd, action=ADD.

2. Sortd gets FilterSet based on FilterSetIDN from FilterSetMember record.

3. Sortd creates a Filter Wrapper Object and adds to vector for FilterSet.

Removing the Filter from the FilterSet.

Next, remove the unwanted filter, by setting its status to 2 (DELETE).

```
UPDATE filtersetmembertbl
SET status=2, modifytime=timezone('UTC'::text, now( )), modifiedby='scottl'
WHERE filtersetfilteridn=
(
SELECT fm.filtersetfilteridn
FROM filtersetmembertbl fm
INNER JOIN filtersettbl ft ON fm.filtersetidn=ft.filtersetidn
INNER JOIN filtertbl fr ON fm.filteridn=fr.filteridn
WHERE ft.name='CEF-Trader X' AND fr.name='CT 8 pct')
);
```

Live Update

1. CIS sends FilterSetMember record to sortd, action=DELETE.

2. Sortd gets FilterSet based on FilterSetIDN from FilterSetMember record.

3. Sortd finds the FilterSet Wrapper object in its vector based on FilterSetMemberIDN and sets status to DELETE.

Stage added to/removed from a FilterSet Filter.

This example adds two stages to CEF-Trader X's SmlCap Md 02 filter. It then removes the first stage and fixes the ranking of the second.

Adding a Stage to a Filter in a FilterSet.

This adds the Tactical 01 Stage to the SmlCap Md02 Filter for CEF-Trader X.

```
INSERT INTO filterstagetbl
(filteridn,stageidn,filtersetidn,rank,status,createtime,createdby)
VALUES
(
(SELECT filteridn FROM filtertbl WHERE name='SmlCap Md 02'),
(SELECT filtersetidn FROM filtersettbl WHERE name='CEF-Trader X'),
(SELECT stageidn FROM stagetbl WHERE name='Tactical 01'),
1,
1,
timezone('UTC'::text, now( )),
'scottl')
);
```

This adds the Trickle 03 Stage to the SmlCap Md02 Filter and ranks it behind Tactical 01.

```
INSERT INTO filterstagetbl
(filteridn,stageidn,filtersetidn,rank,status,createtime,createdby)
VALUES
(
(SELECT filteridn FROM filtertbl WHERE name='SmlCap Md 02'),
(SELECT stageidn FROM stagetbl WHERE name='Trickle 03'),
(SELECT filtersetidn FROM filtersettbl WHERE name='CEF-Trader X'),
2,
1,
timezone('UTC'::text, now( )),
'scottl')
);
```

Live Update

1. CIS sends FilterStage record to sortd, action=ADD.

2. Sortd gets FilterSet based on FilterSetIDN from FilterStage record.

3. Sortd finds the Filter Wrapper Object in the FilterSet based on FilterIDN from FilterStage record.

4. Sortd creates a Stage Wrapper Object and adds to Stage Wrapper vector for Filter Wrapper.

Removing a Stage from a Filter in the FilterSet.

First set the status of the Filter Stage to 2 (DELETE).

```
UPDATE filterstagetbl
SET status=2 modifytime=timezone('UTC'::text, now( )), modifiedby='scottl'
WHERE filterstageidn=
(
SELECT fs.filterstageidn
FROM filterstagetbl fs
INNER JOIN filtersettbl ft ON fs.filtersetidn=ft.filtersetidn
INNER JOIN filtertbl fr ON fs.filteridn=fr.filteridn
INNER JOIN stagetbl s ON fs.stageidn=s.stageidn
WHERE
s.name='Tactical 01'
AND fr.name='SmlCap Md 02'
AND ft.name='CEF-Trader X'
);
```

Next update the ranks for all of the Filter Stages that come after it.

```
UPDATE filterstagetbl
SET rank=rank-1, modifytime=timezone('UTC'::text, now( )), modifiedby='scottl'
WHERE
filtersetidn=(SELECT filtersetidn FROM filtersettbl WHERE name='CEF-Trader X')
```

```
AND filteridn=(SELECT filteridn FROM filtertbl WHERE name='SmlCap Md 02')
AND rank >
(
SELECT fs.rank
FROM filterstagetbl fs
INNER JOIN filtersettbl ft ON fs.filtersetidn=ft.filtersetidn
INNER JOIN filtertbl fr ON fs.filteridn=fr.filteridn
INNER JOIN stagetbl s ON fs.stageidn=s.stageidn
WHERE
s.name='Tactical 01'
AND ft.name='SmlCap Md 02'
AND ft.name='CEF-Trader X'
);
```

Live Update

1. CIS sends FilterStage record to sortd, action=DELETE.
2. Sortd gets FilterSet based on FilterSetIDN from FilterStage record.
3. Sortd finds the Filter Wrapper Object in the FilterSet based on FilterIDN from FilterStage record.
4. Sortd finds the Stage Wrapper Object based on FilterStageIDN.
5. Sortd sets the Stage Wrapper Object status to DELETE.

Order/Trade Activity

Display Filter and Stage Labels on Order Views.

Display Filter and Stage Labels on Fill Views.

Further Exemplary Filter B Requirements

FIX Workflow

Support FIX tag to identify aggression/speed. For "optimize for tif", standard use of VWAP instruction should be supported. Support FIX expiration time. If the FIX tag is not provided, assume market close.

GUI Workflow

User configuration to map optimize for TIF to the VWAP strategy. Expiration time provided per order from the GUI.

Filter B configuration For GUI users, filterB order handling can apply to all GUI orders from a user, to GUI orders from a user entered as Optimize for TIF. For FIX users (no GUI), Filter-B order handling can apply to all orders or to orders identified as "optimize for TIF".

Cancel/Replace

If PAL rises above ReplaceMaxPAL % [filter condition] following a cancel/replace, 1. Check new order to see if it matches a different filter; if so, initiate trading per the new filter stage 1 instructions.
2. If the new order fails to pass any filter, reject replace and cancel unfilled shares back to the client.

Cancel/replace to a different price or to a different speed is handled as a cancel and new order. The new share quantity may be used in switch events, in deciding whether to start a new stage and in initializing a new stage. These include the logic that calculates stage expiration time based on the new number of shares and target PAL calculations. On cancel/replace to a different number of shares, re-trigger only a subset of the stage initialization variables to preserve duration/min ratio continuity. The variables to be re-initialized are those depending on Q:

1. Stage PAL
2. Min PAL
3. Max Route Quantity
4. Stage Expiration
5. Qtgt

Manual Speed Control and Filter-B Recovery Filters

This item concerns the cases when an order is initially engaged in FilterB then paused or changed to a manually-selected speed 1, 2 or 3 (not a complete cancellation) and then restarted in FilterB. When filter-B logic is resumed the order will be assigned to a strategy that has the filter condition WasFilterB=True. This strategy will be initiated as though it were a new order for the remaining shares, without remembering any attributes of the prior order such as the original order quantity.

Fast Forward

Fast forward actions return to the original strategy. If the shares acquired through FF take one into the next stage, initialize next-stage trading normally. In other cases, on the subsequent switch event the stage parameters must be recalculated as follows to initiate trading.

1) Set StagePAL to FilterB_SystemStagePALFactor*CurrentPAL, where SystemStagePALFactor=0.99 is a global parameter.
2) If this violates MinRate or MaxRate instructions, adjust stage expiration accordingly (as specified below); if the trade extends through the close due to MaxRate then calculate the number of shares we expect to fill today.
3) Set MinPAL=Min(Prior MinPAL, FilterB_SystemMinPALFactor*StagePAL), where SystemMinPALFactor=0.9 is a global parameter
4) Show new stage completion estimate/shares expected to fill today on the GUI (as specified below).

The Arrival Price is not reset on a FF strike, opportunistic thresholds relevant to the Engine and block market exposures remain as before.

CIS Sorting of Filters

The filters in CIS may be sorted in ascending numerical order. Also, for the hypothesis validation logic to work, the user needs the ability to insert ahead of and after the current set of filters on CIS. An example of this logic would be as follows:

Suppose the original set of filters have the following format:

Filter 1
Filter 2
Filter 3
Filter 4

Now we make the following set of inserts:

Filter 1
Insert
Filter 2
Filter 3
Insert
Filter 4

The new numbering on the filters becomes:

Filter 1
Insert→Filter 2
Filter 2→Filter 3
Filter 3→Filter 4
Insert→Filter 5
Filter 4→Filter 6

Thus, the filters get re-ordered on rank, where the rank is determined by the order in which it is entered on CIS.

Stage Trailing Rate

Stage trailing rate becomes defined at the beginning of the fourth switch event of a given stage. This ensures that participation rate alerts are submitted at different intervals based on the stock's liquidity.

Global Parameters Associated with Filter-B Logic

TacticalPullbackMinutes=1
MaxFilters=10
InitialTacticalAdjustment=1
TacticalLearning=0.1

Filter B

A user can have zero or n<=MaxFilters ranked filters, ordered from 1 to n. A filter comprises a set of conditions on an incoming order and trading instructions; if all conditions are true then the filter is activated and the corresponding trading instructions will apply.

The user also has a default instruction, which is to apply when all filters fail. The default instruction can be (a) execute according to normal sortd logic, or (b) reject the order. The default instruction will be (a) for zero filters, (b) for n>0.

In certain exemplary embodiments, a "winner take all" approach may be used, wherein an incoming order may be checked against filters in order, and the first activated filter defines the trading instructions such that only one filter is activated. However, in other exemplary embodiments, a multi-filter (also referred to herein as a multi-agent, multi-factor, or multi-driver) process may be used, wherein multiple filters are either automatically activated in parallel, or a user is presented via a graphical user interface with a selection of filters that the system has determined may be acceptable to trade the order and given the opportunity to use that information to make a determination as to which filter or filters should be used to define the trading instructions.

In at least some of those or other embodiments, then hypothesis validation conditions specific to each filter may cause a filter to kick back on a switch event or cancel/replace event. The default hypothesis validation check looks at execution instructions (currently ReplaceMaxPAL); custom hypothesis validation checks are hard-coded and available through an enumeration. Should a filter kick back, the residual will be checked against filters in order and re-assigned to a new filter or rejected back to the user if no filter passes.

Some filters invoke intra-trade conditions and are intended to pick up trades that have been kicked back. Research will assign these filters a higher priority in the ordered list of filters so they are checked before the order entry filters. Orders picked up by a secondary filter after a kick-back will be re-tagged with a new arrival price for purposes of price opportunist functionality etc.

Upon initiating execution with a given filter, an event will be displayed on the GUI showing the filter name and description. If no filter passed, retain the first failing condition from the first filter that had the correct MinPAL/MaxPAL range, and report an event to the GUI giving the name of the condition that failed (as listed below) concatenated with the value and threshold. If no filter has the right MinPAL/MaxPAL range, report an event reporting the reject due to PAL and mentioning the bound that was violated, for example, "Order Rejected: PAL was 42%>30%"

For example if it is a range failure,

"Order Rejected: Relative Momentum was −235<−150"

or if it is a value check,

"Order Rejected: Market Cap is not Small"

Execution proceeds in stages with instructions specific to each stage. If the trailing rate in any stage is below the stage LowRateAlert threshold, alert customer service. The alert email will contain the alert threshold and stage trailing rate.

1) Filter Name
2) Filter descriptive string (60 characters)
3) Filter Conditions (additional filter conditions may also include but are not limited to the filters listed above in Table 12.)
   a. MinPAL
   b. MaxPAL
   c. MinMomentum (open to arrival in basis points *)
   d. MaxMomentum *
   e. MinRelativeMomentum (open to arrival in basis points, relative to SPY)*
   f. MaxRelativeMomentum *
   g. MinDayTime (x∈[0,1] argument of SVD smile curve)
   h. MaxDayTime
   i. MinADV (minimum ADV value allowed for the symbol; values are in millions i.e. 1 implies 1 million)
   j. MaxADV (same as above, but refers to the max value)
   k. MinSpread (relative spread=10000*ln(Spread/LastSale))*
   l. MaxSpread*
   m. Side (Buy, Sell, Short, BuyLong, BuyCover, *; wildcard "*" is default) Note: Buy will activate on both B and BC as today, BuyLong will activate on B only, Buy Cover will activate only on BC trades
   n. MarketCap (Large, Mid, Small, Micro, *)
   o. Portfolio Manager Name
   p. MinGap (min return from prior close to open, signed by the trade)
   q. MaxGap (max of same)
   r. MaxIntradayAbsoluteMomentum (arrival to current price, signed)**
   s. MaxIntradayRelativeMomentum (same relative to SPY)**
   t. MinShortfallAnomaly (ShortfallAnomaly=Shortfall−Abs(g(x)) where g(x) is the expected impact), (Shortfall=sign(trade)*10000*Ln(AvgPrice/ArrivalPrice) where ArrivalPrice is measured from the beginning of the order arrival ignoring all C/R events)**
   u. MaxShortfallAnomaly(ShortfallAnomaly=Shortfall−Abs(g(x)) where g(x) is the expected impact), (Shortfall=sign(trade)*10000*Ln(AvgPrice/ArrivalPrice) where ArrivalPrice is measured from the beginning of the order arrival ignoring all C/R events)**
   v. MinVolatility (Min AV value from analyticstbl that will be allowed in the Filter)
   w. MaxVolatility (Max AV value from analyticstbl that will be allowed in the Filter)
   x. MinRelativeVolatility***
   y. MaxRelativeVolatility
   z. Listing Market (Can take on the values NASDAQ, NYSE)
   aa. Sector (can take on any sector name as value; accept specified sector or all sectors by default)
   bb. Other derived drivers (Min/Max) Trade_Value=shares*midpoint
(Min/Max) Size=shares/ADV
(Min/Max) Price_To_Close=Gap+Momentum
(Min/Max) ETF_Gap=Sign*10000*ln(ETF_Open/ETF_Close)
(Min/Max) ETF_Momentum=Sign*10000*ln(ETF_Mid/ETF_Open)
(Min/Max) ETF_To_Close=ETF_Gap+ETF_Momentum
(Min/Max) SPY_Gap=Sign*10000*ln(SPY_Mid/SPY_Open)
(Min/Max) SPY_Momentum=Sign*10000*ln(SPY_Mid/SPY_Open)
(Min/Max) SPY_To_Close=SPY_Gap+SPY_Momentum
(Min/Max) Sector_Relative_Momentum=Momentum−ETF_Momentum
(Min/Max) Sector_Relative_Gap=Gap−ETF_Gap
(Min/Max) Sector_Relative_To_Close=Price_To_Close−ETF_To_Close
(Min/Max) Beta cc. GUI Filter-ID. Value of code sent in from the GUI; this will be used when the GUI wants to point to a particular filter, usually with all other conditions defaulted to accepting all values [this may only be needed when one deploys GUIs that offer a menu of customized strategies]

dd. Have block fills been received (Y, N or "*")**

ee. WasFilterB (True, False). True if the order was already in Pipeline (in either a paused state or a manual speed state) and is now being activated into the automated strategy.

ff. WasReplaced (True/False). True if the order was rejected following a size increase that tripped MaxPALonReplace.

gg. PriorFilter [Enum] if set to a HV rule, the filter will activate only if we are recovering from precisely this HV rule.

hh. RecoveringFrom[FilterName] In analogy to the Prior Filter Hypothesis type these would be used to catch kick-backs from primary filters based on the prior filters name. For example if RecoveringFrom=AlphaT 12 is set, this filter would catch kick backs from the filter with the unique name AlphaT 12 If condition in gg is also set, both the conditions in gg and hh need to be true.

ii. Was_traded_yesterday (Boolean): the same firm had an order yesterday in the same symbol and side. The following filter conditions will be used only when Was_traded_yesterday=True Momentum_since_original_arrival: return from original arrival to today's arrival price [bps].

Relative_momentum_since_original_arrival: return from original arrival to today's arrival price [bps].

Sector_relative_momentum_since_original_arrival: return from original arrival to today's arrival price [bps].

All_filled_quantity [relative to ADV, in %]

Yesterday_filled_quantity [relative to ADV, in %]

SVD_delay: 1+SVD(new arrival)−SVD(last fill time), measures the delay since we stopped trading, in units of ADV All_incurred_shortfall: shortfall on shares filled so far relative to the original arrival price [bps]

Yesterday_shortfall: shortfall on shares filled so far [bps]

Yesterday_impact: estimated impact of shares filled yesterday, based on yesterday's average participation All_incurred_impact: estimated impact on whole order so far [See Overnight Storage and end of document for more information]

jj. Same_Symbol_Side. Boolean. If set to true and we are already working the symbol and side for another PM, same firm, then activate the filter. False activates only when we are not already working the symbol and side and symbol side. When set to wildcard this condition can be ignored.

kk. Special_Instructions. Boolean, optional. If set to true and the "special instructions" field in the oms scan was not empty, then activate the filter. If set to false then activate only if the special instructions field WAS empty. When set to wildcard this condition can be ignored.

ll. News Today. Three options: "Yes" if there were news today, "No" jf there were no news today, and "WildCard" meaning we don't care if there is news or not so we can ignore this filter condition mm. Recent News. Three options as in ll: "Yes", "No" and "WildCard" Recent News is "Yes" if there were relevant news received within the last Actionable_News_Timeout seconds where Actionable_News_Timeout is a server configurable quantity.

* Condition only checked if order entered when market is open

** On initial order arrival, these variables are set to null values and will not cause rejects; "normal" filters will have Min/Max ranges such that 0 fails.

*** Relative Volatility is the relative difference between a stock's theoretical volatility and its actual volatility, RV=(AV−TV)/TV where AV is the Average Volatility in the instrument table, TV is the theoretical volatility calculated as follows:

$$TV=7.5+3500000*Power(TotalDollarQuantity,-0.85)$$

4) Trading Instructions a. Number of stages b. Reject ("None", "Alert", "Reject"). If "Reject", the order will be rejected to the user with an error message pop-up giving the first reject reason. If "Alert", the GUI will display an error message popup "No optimized strategy configured for this order". Note for research: filters with reject="Alert" will be configured with rate force=9 (see below) to switch off the Engine. The default for all filters is "None"

c. Tactical Pullback [bps from last sale price]

c. ReplaceMaxPAL (PAL cap on cancel/replace)

d. Hypothesis Validation Type (Enum). This could be none, 1 condition, or a list of conditions. Individual conditions are listed below.

d. [for each stage]

i. Rate Force (sets the Engine speed to a specific value, e.g. 0.1, translates to a trading speed to be used instead of PAL) Use 9 for a block only stage. 0 means no rate force.

ii. Expiration [minutes]

iii. Min Ratio [fraction of total initial entered shares]

iv. Low Rate Alert v. KeepStreaming [Boolean] (See keep streaming and AIM streaming section for implementation)

vi. AIMStreaming[Boolean] (See keep streaming and AIM streaming section for implementation)

vii. EnforceMinPAL [Boolean]

viii. ReversionHoldBack [Float, in [0,1] interval]

ix. Stage Name x. Opportunist Type (AR=Arrival, R=relative, A=absolute, B=both, N=none)

xi. MaxBlockShare xii. Stage Descriptive String xiii. MaxExpirationTime: This is the expiration time for the stage that overrides the max rate changes. It is specified in terms of normalized time such as 0.85 to correspond to 3:00 pm. Daytime max config variable should be less than or equal to this value.

xiv. Reversion (set to 0 for the first stage if filter has multiple stages)

xv. Initialization: PAL Factor (defaulted to 0.99)

xvi. Initialization: MinPAL Factor (defaulted to 0.9)

xvii. ScheduleAdvanceFactor (default 1.5)

xviii. ScheduleLagFactor (default 0)

xix. Strategy Matrix: When set the wildcard, the value will be ignored. When set to a numerical value, sortd will only route to the subset of algos with strategy matrices set in the routing table that match exactly the strategy matrix set here. In this enforced routing, full remaining customer order size will be used on the outbound order and the limit price will either be set to the customer limit price or 500 bps away from the current mid-quote if the order is a market order. Furthe notes: Whenever the superfast DNA bit is set in a stage, we will no longer apply the timeout override logic that kicks in for the 3:55 and 3:59 completion snipes. This will allow the order to remain in the Must Complete algo without cancellations.

Sortd 1.1 Engine Requirements Changes (Applicable Only to Filter-B Handling)

Opportunist Cap

The system will set a cap on the number of shares that can be filled opportunistically in the block market or using the price and liquidity opportunists. Initially the block market shares will be capped at MaxBlockShare*Q, where Q is the number of shares initially ordered. This cap is later decremented by block market fills and by opportunistic strikes; it is acceptable to estimate the opportunistic fills as the NBBO available shares at the time of a strike, if helpful.

Filter Switching Logic

On Stage Initiation

On order arrival or start of a new stage i, calculate and store the stage target rate as follows.

1. Calculate

Desired stage i expiration time Expiration_i=earlier of Now+Stage.Expiration, 4 PM or Stage.MaxExpirationTime.

Define:

$$\text{PAL\_init} = \frac{MinRatio_i * Q - q_{i-1}}{AL(t_{i-1}) - AL(t_{i-1} + \text{Expiration}_i)}$$

2. Prior to the iterative adjustment in step #3 analytically estimate Stage Expiration as follows.

If PAL_init >MaxRate_i

{

Calculate:

$$\chi = \text{Min}\left(\frac{MinRatio_i * Q * (1 - SVD(t_{i-1}))}{MaxRate_i * RADV(t_{i-1})} + SVD(t_{i-1}),\ 1\right)$$

The inverse of SVD in the US is defined as:

$$DVS(X) = 7.2585X^6 - 17.2066X^5 + 11.7617X^4 - 1.4485X^3 + 0.0637X^2 + 0.5712X$$

FIG. 60 depicts an Inverse SVD graph.

Finally, re-initialize stage expiration in minutes as:

$\text{Expiration}_i$=int(DVS(X)*390)+1

}

Else If PAL_init<MinRate_i

{

Calculate:

$$\chi = \text{Min}\left(\frac{MinRatio_i * Q * (1 - SVD(t_{i-1}))}{MaxRate_i * RADV(t_{i-1})} + SVD(t_{i-1}),\ 1\right)$$

and set $\text{Expiration}_i$=int(DVS(X)*390)−1

}

Else

{

No changes to Expiration_i.

}

Exception: EU

Initially the European server will not pre-estimate stage expiration; proceed to next step (iterative adjustments). One may make use of an alternate formula for DVS(X) in EU to account for the European market volume profiles.

3. Iteratively adjust Stage Expiration to implement Min/Max rate (Step #2 should largely reduce the number of iterations needed here; in the US, a cap on the number of iterations will be set to 10 instead of current 1000; cap will remain at 1000 in Europe. An alert will be generated if the cap is hit).

If ForceRate is non-zero

Let

MinRate2=MinRate/(1−MinRate)

MaxRate2=min(ForceRate, MaxRate/(1−MaxRate))

Else

MinRate2=MinRate/(1−MinRate)

MaxRate2=MaxRate/(1−MaxRate)

If PAL_init<MinRate2, then try reducing stage Expiration by 1 minute increments until the re-calculated PAL_init exceeds MinRate or Expiration is less than 5 minutes from current time.

If PAL_init>MaxRate2, try increasing Expiration by 1 minute increments until the re-calculated PAL_init falls below MaxRate or the recalculated expiration is beyond 3:55 PM.

If MaxRate="*" then eliminate the Min( ) condition above; if MinRate="*" then eliminate the Max( ) condition above.

From here forward, use the corrected Expiration_i for the remainder of this stage.

If Expiration for the current stage is 4:00 PM after the iterative adjustment above and PAL_init>=MaxRate

{

Set PAL_init=MaxRate;

Calculate $$Q_{tgt} = \text{Min}\left(Q,\ \frac{\text{PAL\_init} * Al(t_{i-1}) + q_{i-1}}{MinRatio_i * \text{FilterB\_SystemTargetqtyALFactor}}\right)$$

where FilterB_SystemTartgetQtyAlFactor is a system configurable parameter defaulted to 0.99. Set Q=$Q_{tgt}$ and use this corrected value of Q in the remainder of the calculations below.

}

In cases in which Qtgt is calculated at stage initialization but filled before the close, one may re-run the above calculation to avoid negative values of PAL and obtain a new Qtgt (which may equal Q). One may use this corrected value in the remainder of the calculation. One may also set $$\text{PAL\_}i = \text{Initialization\_PALFactor*PAL}$$

to phase PALi and PAL and secondary or higher iteration of the Qtgt logic.

4. Calculate the stage PAL tracking bounds $\text{PAL}_i$=PAL_init*stage.Initialization:PAL Factor $$\text{MinPAL}_i = \text{PAL\_}i\text{*stage.Initialization:MinPALFactor}$$

where AL(t) is the Pipeline Available Liquidity projection from time t to the expiration time specified on the order (end of day by default), $t_0$ is the initial order arrival time, t, is the time where we calculated $\text{PAL}_i$, $q_0=0$, $q_i$ is the number of shares filled at the time we calculated $\text{PAL}_i$.

5. Initialize stage variable FirstRecoveryPrice to be equal to the average of arrival price and the current midpoint.

The stage start event may be communicated on the GUI with target rate=CurrentPAL for the stage concatenated in the message as well as the stage completion time or shares expected to be filled. There are 3 cases (a) Final stage, all shares expected to fill today. The event name will show the expected completion time, example: “Compl 2:15 PM”. The description will show the stage name, the stage PAL, and the stage expiration time, for example, “Tactical price selection for alpha capture. Estimated completion 2:15 PM at rate=4.7%.

(b) Final stage, target shares <Q. The event name will show the target shares in thousands, the description will show the stage name, stage PAL, target shares and Q. for example “230k/500K to 4 PM”, where 230K=Qtgt and 500K=Q. Event log will display: “Tactical price selection for alpha capture. Expected to complete 230,000/500000 shares today at rate=8%”

(c) Not final stage. If stage expiration is earlier than the market close then the event name will show the stage name and the description will show the expected stage completion time. For example, “Jump Start”, “Jump Start. Rate=30%; transition to Tactical at 11:45 AM”. Else the event name will show the target shares calculated as $\text{MinRatio}_i * Q_{tgt}$ and will display the number of shares we expect to fill to the close. For example “230k/500K to 4 PM”, where 230K=MinRatio_i*Qtgt and 500K=MinRatio_i*Q. Event log will display: “Moderate mode to minimize opportunity cost. Expected to complete 230,000/500000 shares today at rate=20%”

NOTE: In cases (b) and (c) above, for I-Iv recovery filters the expected fill shares and ordered shares will be those of the parent. For example, if one had an order for 570,000 shares, after 70,000 shares it kicked out due to hypothesis validation and in the new filter one may estimate that one will complete 230,000 shares today, the message will say “300k/570k to 4 PM” and “ . . . expected to complete 300,000 of 570,000 shares today”)

(d) If the activated filter is of type “Reject” or “Alert” the description will show the order state as inactive by concatenating stage name+description of first stage. For example, if Reject then “Blocks”, “Blocks. Optimizer disengaged, order only activate in the block market”. If Alert, then “Alert”, “Alert. Order inactive in both the optimizer and the block market”.

(e) If WasHV (i.e. we kicked back from a prior filter), then GUI text will indicate the hypothesis validation by concatenating, the stage name with “HV Recovery Mode:” For example name=“JumpStart”, description=“HV Recovery Mode: Jump Start. Rate=30%; transition to Tactical at 11:45 AM”

In addition to getting recorded in the event log, the texts in (a)-(e) may remain visible on the GUI throughout a stage as mouse-over texts over the stage name. For example, if the action of placing the mouse over the text “JumpStart” will show the text ““HV Recovery Mode: Jump Start. Rate=30%; transition to Tactical at 11:45 AM”. To achieve this, the server will send a strategy message with the completion time estimate concatenated in the filter descriptive string. For example, for “TL AlphaT” the descriptive string might be “High alpha with trend continuation bias”; when the second stage initiates (a completion time is available) the string will become “High alpha with trend continuation bias; Estimated completion 2:15 PM at rate=4.7%”.

If the stage MaxExpirationTime is prior to the stage expiration calculated here, show the time corresponding to MaxExpirationTime on the GUI. If the rate calculated above is greater than 35%, show 35% on the GUI.

On Switch Event

Check hypothesis validation criteria. If validation fails, check filters to see if the order can be assigned to a different filter, otherwise reject it back to the user. Each validation reason comes with a descriptive string.Multiple hypothesis validation criterions can be applied to the same order as a list of conditions.

Update FirstRecoveryPrice to be the higher (lower) for a buy (sell) of FirstRecoveryPrice or the average between the arrival price and the current midpoint.

Exemplary Hypothesis validation rules

1. Excessive impact: if all the below conditions are true, the average price so far in the trade is more than twice the expected impact of the shares filled so far in the trade (known as g(X) in the safe mode logic)

current price is more than 30 bps away from arrival we are in stage 2, then kick out of filter. Descriptive string=“Excessive price move, manage munitions”

2. Excessive First/Second-stage impact: if all the below conditions are true, the average price so far in the trade is more than twice the expected impact of the shares filled so far in the trade (known as g(Q in the safe mode logic)

current price is more than 40 bps away from arrival current filled shares exceed MinRatio times ordered shares we are in stage 1/stage 2, then kick out of filter. Descriptive string=“Adverse price move in first stage, avoid excessive impact”

3. Adverse selection: if all the below conditions are true, the participation rate so far in the trade is >30% we are in stage 2 current price relative to arrival is less than half the expected impact of the shares filled so far in the trade kick out of filter. Descriptive string=“Alpha capture more likely than trend”

4. Sector Divergence: if the below condition is true, the difference between the symbol return and the corresponding ETF return signed by the trade sign is greater than x bps, then kick out of filter. Descriptive string=“Symbol diverging from sector, changing strategy”

5. Sector Convergence: if the below condition is true, the difference between the symbol return and the corresponding ETF return signed by the trade sign is less than x bps (x will be a negative number)

then kick out of filter. Descriptive string=“Symbol recovered relative to sector, changing strategy”

6. News today: If there was news today kick-out of the filter after the first switch event.

7. Recent News: If there was news within Actionable_News_Timeout seconds kick out of the filter.

8. Block HV Reject: On switch event, if there was a block fill since the last route, kick back from the filter that will be captured by WasFilterB.

9. Relative impact anomaly: if the signed return so far in the trade relative to SPY is more than the greater of a) twice the expected impact of the shares filled so far in the trade (known as g(X) in the safe mode logic)

b) 30 bps then kick out of filter. Descriptive string=“Unexpected price move relative to S&P500 index”

Exemplary Tactical Trading Logic

PAL and Pushing Back Completion Time

Define PAL for this exemplary section as the ratio between the number of shares yet to be filled in this stage and the amount of liquidity available until the close of the stage (same formula as for stage MinPAL_i above).

$$\text{PAL}=(\text{MinRatio}_i*Q-q_t)/(\text{AL}(t)-\text{AL}(t_{i-1}+\text{Expiration}_i))$$

If (the number of shares filled since initial order arrival, $q_t$ is greater than the minimum shares required to transition into the next stage $q_i$>MinRatio$_i$*Q or the stage speed is zero) and the time consumed since initial order arrival (in minutes) is greater than the minimum stage expiration time, $t-t_0$>Expiration$_i$, or current PAL is negative (i.e. we have exhausted the shares we intended to trade in the first stage) then we begin the next stage and calculate PAL as above.

If RateForce is nonzero

If Expiration_i<3:55 PM and PAL (as calculated above) is greater than Min(RateForce, MaxRate)+0.1 or the current time already exceeds Expiration_i, then we will adjust Expiration_i as above in step 2 of the stage initiation process, but for PAL instead of StagePAL.

Else

If Expiration_i<3:55 PM and PAL (as calculated above) is greater than MaxRate+0.1 or the current time already exceeds Expiration_i, then one may adjust Expiration_i as above in step 2 of the stage initiation process, but for PAL instead of StagePAL.

This logic is repeated here for completeness:

If ForceRate is non-zero

Let

MaxRate2=min(ForceRate, MaxRate/(1−MaxRate))

Else

MaxRate2=MaxRate/(1−MaxRate)

If PAL >MaxRate2, try increasing Expiration by 1 minute increments until the re-calculated PAL falls below MaxRate2 or the recalculated expiration is beyond 3:55 PM.

This new expiration time will be stored and used in the remainder of this stage. If Stage.MinRatio=1 then post an event to the GUI, Event Name="Compl 3:47 PM"

Description="Order completion re-estimated to 3:47 PM based on current progress".

and send a strategy message with the filter name and filter descriptive string with the completion data concatenated in. For example, Filter name="TL AlphaT"

Description="High alpha with trend continuation bias; Estimated completion 2:35 PM at rate=3.9%"

If the corrected expiration hit the 3:55 limit then post the event:

Event Name="Compl 4 PM"

Description="Order expected to complete in the last 5 minutes of the trading day; use Fast Forward if needed to complete the trade"

Advancing Completion Time

If current PAL falls below MinRate2=MinRate/(1−MinRate), then re-initialize the stage and publish the new completion time to the GUI. This will lock in the schedule advance and reset the stage start price for purposes of the schedule advance logic. Example of GUI message:

Event Name="Compl 3:17 PM"

Description="Order completion re-estimated to 3:17 PM based on current progress"

Adjusting Stage PAL

If not in safe mode, PAL_i will be ratcheted down when liquidity is unexpectedly large, to take advantage of the liquidity opportunity, as follows. Let $t_{i-1}$,$q_{i-1}$ be the time and filled shares at the stage initialization, and tape the actual tape volume since the stage was initialized (same as is used also in the stage trailing rate calculation). The current estimate of available liquidity since stage start is tape($t_{i-1}$→t)+AL(t), therefore if we were to calculate PAL_i at time t we would find $$PAL_i(t)=(MinRatio_i*Q-q_{i-1})/(AL(t)+tape(t_{i-1}\rightarrow t)-AL(t_{i-1}+Expiration_i))*stage\_initialization{:}PALFactor$$

If not in safe mode and PAL$_i$>1.01*PAL$_i$(t), let PAL$_i$→PAL$_i$(t), and similarly adjust MinPAL_i, using the same expression as above but with stage_initialization:MinPALFactor. If PAL_i falls below MinRate2, advance stage expiration as indicated above in "advancing completion time".

Choosing the Trading Speed

Speed-up logic: If (current PAL>1.1*PAL_i AND current PAL>0.1 AND current price is better than average fill price) OR (price is an opportunity) then set the trading speed to Min(0.3, max(rateForce, current PAL)+0.1)

If t>Expiration_i, use high speed (this may happen after 3:55 PM).

Else, select the speed as the user speed or (if Optimize for TIF is used) calculate the speed using the rules for "Optimize for TIF" based on PAL, i.e. the current PAL for the stage as opposed to the stage PAL. If rate_force is specified, then it will set the speed if rate_force >PAL or if price is not an opportunity. For opportunistic prices we allow PAL to override rate_force . . . the effect is that very large orders with rate force 0.2 or 0.1 may trade in higher speeds to complete today but only at opportunistic prices.

Keep Streaming and AIM Streaming Logic

If the last route was a tactical pull back event and (that route has been active for more than Reversion minutes or PAL_i is larger than 0.30 for the current stage, or (current PAL <stage PAL_i and trailing rate <MinPal_i)), and KeepStreaming=TRUE then set the value of stage PAL_i PAL_i=FilterB_SystemPALFactor*PAL and MinPAL_i to the lesser of MinPAL_i or FilterB_SystemMinPALFactor*PAL_i where FilterB_SystemPALFactor and FilterB_SystemMinPALFactor are system configurable parameters set to 0.99 and 0.9 respectively.

note: with this change, tactical limit will be removed . . . reversion sets an upper bound on the delay before we resume trading as well as a max allowed value of max_speed for stagePAL, which corresponds to the current maximum engine speed. max_speed will be a server configurable parameter with a default of 0.30.

Addendum: The timer that measures of the active time duration of a tactical sequence will reset to zero if any tactically limited route receives fills while within the tactical sequence.

Else If

{

The current route has been active for more than Stage.MAXTIME minutes

And

The participation rate for this route is <PAL$_i$

And

Current MidQuote is better then the incremental trailing price x as calculated in the tactical limits section below And AIM streaming is set to true Then Set the value of stage PAL_i PAL_i=FilterB_SystemPALFactor*PAL and MinPAL_i to the lesser of MinPAL_i or FilterB_SystemMinPALFactor*PAL_i

}

Trailing Rate Correction

1) If trailing rate_i<MinPAL_i/2 and at least two minutes have elapsed since the start of stage_i, use LSLV 2) If trailing rate_i<MinPAL_i/4 and at least two minutes have elapsed since the start of stage_i:

a. If speed=1 or 2, use LSLV one speed higher b. If speed=3 and the previous route was not IOC, snipe the inside quote+1 cent for the shares required until trailing_rate_i>=2*MinRate/3 c. If speed=3 and the previous route was IOC, use speed 3 LSLV

Tactical Limits

We will impose a tactical limit unless

Fewer than 2 minutes have elapsed in the current stage and order is not "small" as defined by the FTS logic time is >=3:55 PM, or we have too much ammo [May 6 opportunist rules follow]. This condition will be determined from the outcome of the following set of calculations:

For buys, define $$\Delta S=10000*\text{Ln}(\text{Current\_MidPoint}/\text{StageStartPrice})$$

and for sells:

$$\Delta S=-10000*\text{Ln}(\text{Current\_MidPoint}/\text{StageStartPrice})$$

Where StageStartPrice is the midpoint price at the last time the stage parameters were calculated (start of the stage; after the user clicked on FF; etc).

Define T=total minutes in from now to estimated trade completion

If the price change since arrival ΔS<0 for a buy, or ΔS>0 for a sell, we will calculate the desired schedule advance as follows $$\tau = \text{FilterB\_ScheduleAdvanceFactor} \times \text{Max}\left(0, \frac{|\Delta S|}{AV\sqrt{\frac{T-t}{60\ \text{min}}}}\right)$$

where FilterB_ScheduleAdvanceFactor is a stage execution instruction. For example, a value of 1.5 means we will advance the schedule by 15 minutes when the stock improves by 10 AV basis points.

If the price change since arrival ΔS>0 for a buy or ΔS<0 for a sell, we will calculate the desired schedule lag as follows $$\tau = -\text{FilterB\_ScheduleLagFactor} \times \text{Max}\left(0, \frac{|\Delta S|}{AV\sqrt{\frac{T-t}{60\ \text{min}}}}\right)$$

One may further define:

$$\text{PAL'\_i} = \text{PAL\_i} * \left(\frac{T-\tau}{T}\right)$$

We have too much ammo if currentPAL>PAL'_i or price is an opportunity and we are in the US. An opportunity is If Absolute, better than the first non-SPY-adjusted opportunistic level S__

If Relative, better than the first SPY-adjusted opportunistic level,

If Both, better than both of these two levels

In Null, there are no opportunities and this condition does not apply, or

If Arrival then the current price is better than arrival the lagging rate in the current stage is behind target [note change in formula to use MinRate]

$$\frac{q_t - q_{i-1}}{\text{tape}(t_{i-1} \to t)} < MinRate \text{ and } Stage.EnforceMinPAL = \text{True}$$

price is better than FirstRecoveryPrice and PAL is greater than ReversionHoldBack*PAL_i and opportunist type is "absolute" or "arrival"

The target PAL from now to the end of day is higher than min(max speed,stage.rateforce) and max speed is defaulted to 30%. Here we define target PAL as:

$$PAL_{tgt} = \frac{\hat{Q} - \text{Overall\_Filled}}{AL(t)}$$

where Overall_Filled is the number of shares filled in the overall order so far and $$\hat{Q} = MinRatio_i * Q_{tgt} \text{ if there exists } Q_{tgt} = Q \text{ else}$$

Furthermore if the above condition for skipping a pullback applies an alert will be generated to the helpdesk indicating that PAL is growing beyond the max engine threshold. This will have the format:

"Alert PAL 32.5%>30%"

If a tactical limit applies, select a non-IOC algorithm according to the default continuation rules appropriate to the working speed level and set a passive tactical limit as specified below The tactical limit price logic will come right after the 3:55 PM check (see Appendix A1), ahead of the liquidity opportunist and everything else. The tactical limit conditions must also be checked on IOC expirations, but without the expiration time extension.

On switch event that meets conditions for imposing a tactical limit,

If prior route was not tactical,

Determine tactical limit based on one unit of volatility as today

Set x=tactical limit

If prior route was already tactical,

Update x using a weighted average $$x \to (1-\epsilon)x + \epsilon P_t$$

$$\epsilon = \text{LastRouteDuration}/\text{reversion[stage]}$$

Where P_t is the current midpoint price, LastRouteDuration is the time elapsed since the last non-IOC order was routed out in minutes.

Calculate Delta based on PAL_i, user_speed, stock's trailing average minute volatility (from InstrumentTbl) and Filter-B tactical gap adjustment parameter λ (globally-defined across all filters, initialized at λ=InitialTacticalAdjustment at start of day)

$$\hat{\sigma} = \sigma\lambda(1 + (\text{Expected\_Rate[speed]} - \text{current\_PAL})/\text{Expected\_Rate[speed]})$$

$$\Delta = S_{mid}\frac{\tilde{\sigma}\sqrt{TacticalPullbackMinutes}}{10^4}$$

If PAL >=MinPAL_i, calculate tactical limit to be Delta more passive than the trailing average: for a buy, $$P_{limit} = x\left(1 + \frac{\sigma\sqrt{TacticalPullbackMinutes}}{10^4}\right) - \Delta.$$

For a sell, $$P_{limit} = x\left(1 - \frac{\sigma\sqrt{TacticalPullbackMinutes}}{10^4}\right) + \Delta$$

If this results in a more aggressive (strictly higher for buys, lower for sells) tactical limit, or it results in a more passive limit (strictly lower for buys, higher for sells) and the participation rate so far with this tactical limit is greater than PAL_i, replace the outbound order accordingly.

If PAL<MinPAL_i and the previous route resulted in fills,

The tactical limit will be the less aggressive of the above and the tactical limit calculated as follow

[more exemplary opportunist rules]

Step 1: calculate Adjusted_MinPAL

Normally Adjusted_MinPAL=MinPAL_i, however, if price is better than FirstRecoveryPrice and opportunist type is "absolute" or "arrival" then Adjusted_MinPAL=ReversionHoldBack*PAL_i if the price change since arrival ΔS<0 for a buy, or ΔS>0 for a sell and FilterB.ScheduleAdvanceFactor >0 then Adjusted_MinPAL=PAL'_i (note: there is no similar logic for schedule lag . . . in that case MinPAL_i remains the low bound we simply widen the sweet zone between MinPAL_i and PAL_i where tactical limits can be used.)

Step 2:

Calculate $$\text{Pullback} = \text{Min}\left(0.005, \frac{\tilde{\sigma}\sqrt{TacticalPullbackMinutes}}{10^4}\right)$$

$$\tilde{\sigma} = \left(1 + 10 * \frac{AdjustedMinPAL - PAL}{AdjustedMinPAL}\right)\sigma$$

For buys, $$S_{pullback} = S_{mid}(1-\text{Pullback}).$$

For sells, $$S_{pullback} = S_{mid}(1+\text{Pullback})$$

If this results in a different tactical limit, replace the outbound order accordingly. If $$0.005 < \frac{\tilde{\sigma}\sqrt{TacticalPullbackMinutes}}{10^4},$$

the outbound routed size will be reduced by a factor $$x = 0.005 \Big/ \left(\frac{\tilde{\sigma}\sqrt{TacticalPullbackMinutes}}{10^4}\right).$$

Thus, for example, if the calculation based on TacticalPullbackMinutes were to give a 200 bps pullback we will instead use 50 bps and route 50/200=¼ as many shares. This logic will provide a controlled schedule advance in cases like the May 6 technical "flash crash".

Increment λ→λ+TacticalLearning

If PAL >ReversionHoldBack*PAL_i and opportunist type is either "Absolute" or "Arrival", then adjust the above limit price to be no lower (higher) than FirstRecoveryPrice for a buy (sell)

Cancel/replace outbound order to set the new tactical limit, and make sure the new limit is displayed on the GUI If PAL >PAL_i and last route was tactical, Of course don't use a tactical limit (per prior requirements)

Decrement λ→λ−TacticalLearning

Block Exposure/Liquidity Opportunities

On switch event: adjustment to block/liquidity opportunist exposure

If price is an opportunity and we are in the US [as defined in tactical limit section above], then all shares not routed out to an algorithm are eligible to execute in the block market.

If price is better than first reversion price and opportunist type is either "Absolute" or "Arrival", then the number of shares available to the block market will be the lesser of the non-routed shares or the following number of shares:

$$-x = \frac{\text{current\_PAL} - \text{stage\_PAL} \times \text{Re }versionHoldBack}{\text{current\_PAL}}\text{Leaves}$$

If price is not a first reversion opportunity (i.e., if price is worse than the first reversion price or the opportunist type is neither "Absolute" nor "Arrival"), then the block market shares will be set by the Opportunistic Cap rules but in no event be allowed to be greater than MaxBlockShare*Leaves.

Rounding of the Block Market Shares

After the block shares are calculated, if they are below 1 LBQ we will round up if 1 LBQ is less than MaxAfterRounding=BlockShares+Min(BlockShares, (½)*(Leaves−BlockShares))

Routed Shares

This logic may apply to all filter-B routed orders with the exceptions of the 3:55 and 3:59 m-snipes and client FFs.

For completeness, the current set of events where the below filterB order size will be used for a filterB enabled order are as follows:

Default

Dark IOC

Tactical

Safemode

Liquidity Opportunist Strike

Price Opportunistic Strike

Final Trading Segment Strike

The locations of these events where filterB order size will be used are marked in the UML diagram below with the text "Fbo."

In all situations except 3:55, 3:59 and manual FF requests, the routed quantity of a filter-B managed order should not exceed MaxRouteQty=$Q$*Stage.MinRatio/NBINS, where MaxRouteQty is rounded up to the nearest whole lot and $$NBINS=Max(26(SVD(Expiration_i)-SVD(t_{i-1})),FilterB\_MinNBINS).$$

NBINS measures the number of intervals available to complete the trade, where an interval is the tape equivalent of 15 minutes and MaxExpirationTime is the stage instruction variable and FilterB_MinNBINS is a server configurable parameter defaulted to 4.

In addition to the "winner take all" exemplary embodiments described herein, other exemplary embodiments may use the same or similar processes and calculations to provide a system with a multi-filter (multi-agent, multi-factor, or multi-driver) process wherein multiple filters may be either automatically activated in parallel, or a user is presented via a graphical user interface with a selection of filters that the system has determined may be acceptable to trade the order and given the opportunity to use that information to make a determination as to which filter or filters should be used to define the trading instructions.

In at least one exemplary embodiment, an agent voting system is employed to enable the consideration or automatic initiation of multiple filters for a given order. In this embodiment (as in certain other embodiments) a complementary set of agents may be generated and "trained" (for example, through research, data analysis and alpha profile generation/assignment processes such as those described herein) to recognize certain features within certain characterized or classified sets of order data, order related data, or trading data.

By way of a specific example, the processes of alpha profile generation and assignment via historic and real-time research and data analysis described herein may generate a complementary set of agents composed of a few tens (or hundreds or even thousands) of rules in association with a given characteristic of the data (such as, but not limited to, trader ID, PM, market cap, sector, etc.). Then once an agent within that set sees the features it has been trained to recognize, the agent can produce a prediction for the order associated with the data the agent has analyzed. The predictive output could be, for example, whether if the order were to be traded, the order would achieve positive alpha or negative alpha. However any number of additional predictive outputs may be used, as will be understood by those skilled in the art.

Again by way of example, if a particular agent is associated with a data set characterized by PM, then in analyzing data for a particular PM, the agent would "know" that if the agent "saw" a large debt-to-capital ratio combined with sharply negative short-term momentum within that data set, then the agent could predict positive alpha for that order in that situation.

In a multi-agent system, each agent within a set may be assigned a voting weight that corresponds, for example, to the significance of the features it has been trained to recognize. These voting weights may be used to enable the system to take into account the situation where multiple agents are valid for the same order. The voting weights may be updated periodically based on new data; and agents with low weights may be retired and replaced with new ones. Furthermore, if the data supports their validity, input from the PM or traders may lead to design and training of new agents.

When a new trade arrives (in an exemplary multi-agent or multi-filter embodiment), agents within a set may be given an opportunity to review the trade and issue an opinion in the form of a vote. For any given trade, typically fewer than 10% of the agents will have an opinion; in an exemplary embodiment only those that have an opinion cast a vote. The total score of all of the votes may be calculated according to the weight given to each agent and that score is then evaluated relative to the predictive output for that situation.

For example, in an embodiment that uses positive/negative alpha as the predictive output, the score of agent votes may be evaluated for positive and negative alpha. The net difference between these may be compared against positive and negative thresholds; breaching either threshold classifies the trade as positive or negative alpha. The remaining trades have undetermined alpha and an execution risk measured by the absolute sum of positive and negative scores.

Once all of the agent opinions have been translated to weighted "scores"" the system may use the information from the agent voting process to either automatically initiate a corresponding strategy or enable the user to initiate manually one or more corresponding strategies via a graphical user interface (for example, as detailed below).

Exemplary GUI Requirements

The GUI will show the strategy and relevant events. Clicking on the strategy/event will pop up a rolling messages window showing relevant messages.

Relevant messages are order received and assigned to a given filter. Give filter descriptive string order rejected—failed to pass any filter on arrival filter kick-back: On filter kick-back we will show the text "Strategy Validation" as opposed to "Strategy Reject". Descriptive string will be the reason the filter kicked back start of new stage. Descriptive string for the stage; if final stage the expected expiration time will be appended trailing rate is more than 25% below the min rate for the given stage: SLOW The detailed description of the event will give the target and realized rates and the time period over which the rate was evaluated, e.g.

"Slow participation rate: 4.6% from 11:10 to 11:25, versus target=30%" Here, the displayed target rate (30% in the example) will be the Min Rate. If the min-rate is zero the very slow participation rate message can be suppressed.

If we displayed a "SLOW" text on the last switch event and the trailing rate is recovered in the current switch event then:

(A) If the current stage extends to the close we display "xK to 4:00 PM" where x is the number of shares we expect to complete today.

(B) If we are in the final stage but we expect to complete before the close, we display Compl: xPM where x is the time the trade is expected to finish.

(C) If we are not in the final stage and the current stage doesn't extend to the close then we display the stage name like "Cruise"

The text "Compl: xK to 4 PM" gets displayed under the event column on the switchboard and in the event log we display (as an example).

"Participation tate has recovered. Current rate: % num", where % num is the current trailing rate for the stage (B) safe mode operation switched ON or OFF. Display reason why it is being switched ON or OFF. Reasons will be [please see update to these requirements in point 21 above]

a. Small trade: "Small trade: use low variance algos to avoid adverse selection"

b. Final trading segment "End of trade: use low variance algos to avoid adverse selection"

c. Excessive price move: "Unusual price move: use low variance trading to manage munitions in high volatiltiy"

d. Trailing rate to fast "High participation rate; avoid posting to allow price to move freely"

When safe mode is "ON" display "Rate Control" when operating under filter-B, display "Safe Mode" when operating under the plain-vanilla engine.

(C) The tactical limit price will be shown on the GUI. When using tactical pull-backs, the GUI will not show the strategy. The strategy will be shown again when we receive a fill; at that point it will be shown continuously regardless of prices until we pull back again on a subsequent switch event. All "tactical" indicator messages from the server after switch events in tactical pullbacks, which get displayed on the switchboard and the event log, will be suppressed.

Example . . . showing 3 rows in the switchboard

| Strategy | Events | Tactic |
|---|---|---|
| Trader A-15 | JumpStart | passive ($20.35) |
| Trader B-1 | Tactical - | ($31.45) |
| Trader A-5 | SLOW | stealth ($51.22) |

Scroll over Tactical shows text message "Tactical price selection for alpha capture. Estimated completion 2:15 PM at rate=4.7%"

Both the "winner take all" and multi-agent voting systems for alpha profile assignment and prediction may have embodiments that employ a graphical user interface to communicate information about agents available for selection or agents actively working orders. In an embodiment that uses positive/negative alpha as the predictive output, an agent's vote for positive or negative alpha on a given order may be reflected by the GUI. For example the agent name may carry "Alpha" if it views a given trade as a positive alpha trade, or "Muni" if it views the trade as negative alpha trade, or "x_pct" if it views the trade as neutral and carries execution risk and would therefore be maintained at a certain minimum rate which could be reflected by its name.

In a multi-agent embodiment, the GUI may also be used to reflect a list of agents that issued a vote on a given order, along with their voting weights. In addition, the GUI may reflect or allow access to more detailed reports indicating the features within the data set that each agent "recognized", along with information in form of equations, charts and graphs that reflect the data used in the process of alpha profile generation and assignment related to a particular order, set of orders, or set of trading data. For example the GUI may reflect the kind of information described in Appendix B and/or Appendix C below.

In addition, a GUI may be used to display real-time performance attributes—for example, performance broken down by agent and displayed graphically or within a table; real-time performance charting including unrealized, realized, and total gains; and real-time performance vs. a benchmark, which may also be reflected via a comparison of user specific agents vs. benchmark agents.

Furthermore, a GUI may also incorporate any of the exemplary TCA related analysis and displays described above.

Events Priority and Display

Event messages will have a given priority level and a "minimum lifespan". We will cache the "best event" based on priority then time (most recent is better, higher priority wins).

Lower priority messages will overwrite for a specified lifespan; the best event will then be resent on the first switch event after the weaker event's lifespan is exhausted.

TABLE 36

| Event | Priority | Lifespan [min] |
|---|---|---|
| Stage start | 3 | 3 |
| Rebalancing | 2 | 2 |
| Completion time | 1 | 999 |
| Shares to be filled today | 5 | 999 |
| Safe mode | 1 | 2 |
| Rate control | 1 | 2 |
| Slow | 1 | 2 |
| End of Slow - show completion time | 1 | 999 |
| End of Slow - show shares fill today | 5 | 999 |
| Strategy validation | 2 | 2 |
| News | 4 | 5 |
| Paused, etc (order status) | 1 | 999 |

Story Line

Initial strategy selection . . . user sees "Rebalancing", then after 2 minutes sees "Cruise"

Safe mode; rate control; SLOW events show up for 2 minutes, then fall back to "Cruise"

Normal rate recovered . . . user sees completion time

News . . . user sees "News", that sticks until a new event comes along unless there was previously a Shares today Final stage transition . . . user sees "Compl. 2:15 PM"

Re-estimate completion . . . user sees "Compl 4 PM"

HV reject/recover→user sees "Validation"; after 2 minutes user will see "Cruise"

go to Initial Strategy Selection above . . .

Overnight Storage and Recovery of Trading Information

Filter Condition was_traded_yesterday (Boolean): the same firm had an order yesterday in the same symbol and side.

When a trade is continuing from a prior day, some variables pertinent to the original arrival may factor into the strategy decisions.

One may have the following filter conditions:

Momentum_since_original_arrival: return from original arrival to today's arrival price [bps].

Relative_momentum_since_original_arrival: return from original arrival to today's arrival price [bps].

Sector_relative_momentum_since_original_arrival: return from original arrival to today's arrival price [bps].

All_filled_quantity [relative to ADV, in %]

Yesterday_filled_quantity [relative to ADV, in %]

SVD_delay: 1+SVD(new arrival)−SVD(last fill time), measures the delay since we stopped trading, in units of ADV All_incurred_shortfall: shortfall on shares filled so far relative to the original arrival price [bps]

Yesterday_shortfall: shortfall on shares filled so far [bps]

Yesterday_impact: estimated impact of shares filled yesterday, based on yesterday's average participation All_incurred_impact: estimated impact on whole order so far Overnight Storage Per Multi-Day Block-ID Every symbol/side/firm with activity in the trading day will create or update an entry for overnight storage in a multiday trade information table with an associated multi-day block-ID. Prior entries that did not have new activity will be deleted. The overnight data will be recovered on the next system startup; if there is further activity on the same symbol/side/firm the entry will be updated based on the day's activity; entries with no new activity will be deleted.

Original arrival price

Original SPY midpoint

Original ETF midpoint

Original arrival date/time

Shares filled in the day

Average price on the day's fills

Shares filled so far in the trade since the original arrival

Average price so far since original arrival

Time of last fill

Tape volume in the day

Tape volume since original arrival

Priority

Filter condition was_traded_yesterday is an urgent priority to support TBC and Cap Re. The remaining requirements will enable more refined strategy design but are not urgent and can be scheduled after LNET integration.

Data Warehousing

Orders handled per special trading instructions will be identified as such in the orders table The multi-day trade information table history will be data-warehoused.

End of Day Reporting

Option to add AVWAP and VWAP benchmark comparisons to the daily reports for users who request these Help Desk FilterName column to be available in order scan If we are in the last stage, trading at trickle speed and PAL >15% a major alert should be sent to Customer Service making it clear they are to notify the account rep that the client should use speed controls to click into a higher speed if desired.

Logging

Show on route events

Tactical pullback price if used

In stage 1 routes, show PAL0

In stage 2 routes, show lagging rate, MinPAL1 and PAL1, in percent as integers Testing Defaultconfiguration will be tested, as well as every single-parameter modification thereto.

Test behavior in last 15 minutes of trading day. Test behavior with odd lot orders; with orders in extremely thin names where 20-40% LBQ can be greater than the order size; and small orders in extremely liquid names.

Updated Ordering of Sortd Checks (see FIGS. 70-74).

Startup and Default Routing

Fill rate below refers to the filled quantity/tape for the most recent non-IOC route, or if this is the first continuation route, the fill rate for the initial route.

Basic switching logic: pull routing table entries using TOD, LiqRisk and Speed. Select amongst these as follows:

a) draw quantity from Min Max % LBQ and set price using customer limit and safety b) exclude inactive vendors c) if last route was IOC, exclude IOCs d) exclude the algorithm that was most recently employed e) if result set is empty, skip to step (g)

f) exclude in accordance with the flow charts given herein a. if result set is not empty then adjust price and quantity if required b. if the result set is empty, undo exclusions (c)

g) if there are multiple entries in the result set, apply score-weighted roulette selection

TABLE 37

| Speed Setting | Startup | Continuation |
|---|---|---|
| Low | Dark IOC Or LV that is not LSLV if Cancel-Replace from a higher speed | If r = 0, if was HV algo, switch to LV Algo that is not LSLVIOC else, modify low speed to medium and use LSLV that is not LSLVIOC Else HV |
| Medium | Live Start that is not LSLVIOC, Or LV that is not LSLV if cancel-replaced from a higher speed | If r < 5%, it the offer price is less than the midpoint at the time of the last route, route to LSLVIOC algo limited to offer + $0.01 else switch to LV or IOC algo that is not LSLVIOC. Else HV |
| High | Live Start that is not LSLVIOC | If r < 10%, If offer < midpoint at the time of the last route, then use LSLVIOC limited to offer + $0.02 else switch to LV algo that is not LSLVIOC Else exclude only LSLVIOC |

FIG. 71

1. Safe mode for fast-moving stocks (low rate variance for adverse selection control): If price exceeds Max($S_f^+$, $S_{70}$) where $S_{70}=S_0+0.7*(S_{max}-S_0)$ and $S_{max}$ is the max price since arrival (vice versa for sells, using Min( ), and $S_{min}$ in the equation above), we will
   a. Use only low variance algorithms that are not live start.
   b. If on expiration of a non-IOC route, if speed=1 or 2 and we find that it filled more than the expected fill quantity $Q_{EFQ}$, then replenish TIF to the same algorithm but with a limit price set to $S_f^+$ (cancel and new order to same algorithm with this limit price).
   c. This "safe mode" behavior will persist as long as the stock does not revert back to a "normal" price.
2. Adverse selection in dark pools. If dark IOC returned one or more fills, route to strategy with Take=0 or low variance that is not live start.
3. Trade Completion. On non-IOC switch event after 3:55 PM and residual <10% of OrderQty and Offer Qty >residual (for a buy) and offer price is lower than Low Variance Enforcement limit, then snipe offer. Else id 3:55 PM or later, let the TIF be the lesser of that given by the routing table or the number of seconds from the present time to 3:59:45, rounded down to the nearest multiple of 10 seconds. On non-IOC switch event after 3:59 PM, if Offer Qty >residual (for a buy) then snipe offer. Here and elsewhere in this document, the term "snipe" means route to an algorithm with Speed=4. The time parameters (3:55 PM and 3:59 PM) and the 10% parameter for residual versus order quantity are configurable; the residual % may be increased to 100% and times set to 3:30 PM and 3:45 PM to facilitate testing.
4. Odd lots. On non-IOC switch event, if aggregate Filled Qty is odd lot then route lot completion to Very Fast algorithm.

FIG. 72

5. Continue successful post. If rate >5%, 10% or 20% for Low Medium or High speed and take=0, extend expiration time
6. Extend TIF if passive. If limit price is below the bid for a buy, or above the offer for a sell, reset expiration time 7. Extend expiration time for slow stocks. On expiration, if aggregate tape volume has not changed by more than 100/x shares where x is our target speed, reset expiration time. Target speed is 0.08/0.15/0.22 for low/med/high.
8. Max rate for safe mode. If in safe mode, speed=1 or 2 and last route filled more than 10% or 20% of the ETQ, respectively, repeat same route with limit price set to threshold for safe mode operation
9. Limit price and mean reversion. While *not* in safe mode, limit price will not be more aggressive than $S_m$.

FIG. 73

10. Liquidity opportunist. On every non-IOC route expiration event. If the current offer price for a buyer is no higher than $S_{lo}$, Liquidity <=3 (configurable Max Liquidity Class), and the offered size is at least equal to $Q_{LOT}$, then route to speed 4 IOC algorithm limited to the current offer price. Likewise for sell orders when a large size is displayed on the bid and the bid is at least as high as fair price, apply Very Fast algo limited to the bid
11. Price opportunist for speed 1. On non-IOC expiration event. If speed is "Low", offer price (for buy) is lower than $S_{lpo}$, use Very Fast IOC algorithm with limited to the current displayed offer and price limited to the current offer price.
12. Staying in the game for speed 1. On non-IOC expiration of a Low Variance algorithm. If speed is "Low", the last route returned r<5% and the current offer is no greater than $S_{iv}$, then route to speed 4 algo locked to the offer price with a quantity limited not to exceed $Q_{iv}$.
13. AIM trading for speed 2, 3. On non-IOC expiration event. If speed=2 or 3, offer price (for buy) is lower than $S_f^-$), whenever prior requirements called for low variance algos use live start low variance algos instead (lslv).

In addition to the above-described embodiments, one skilled in the art also may envision an embodiment wherein the subject system includes a strategic algorithm which employs the same mechanisms used by the Adaptive and Execution Rate algorithms to select, manage and switch between the subject system's universe of proprietary tactical algorithms to select, manage and switch between a set of third party algorithms. Such a strategic algorithm would eliminate the need for a user to have to choose which of the (potentially hundreds of) broker-sponsored/third party algorithms are best suited to work an order under existing market conditions. Rather, he could rely on the subject system's real time selection and management mechanisms to choose and then switch between a set of third party algorithms as the order parameters and market conditions evolve over time.

More specifically, one or more exemplary embodiments which incorporate the use of broker-sponsored algorithms also enables traders to incorporate Broker preferences into the subject system's automated selection, management and cancellation of algorithms. Certain of these exemplary embodiments are referenced colloquially herein as "Service Bureau." In one or more of these Service Bureau embodiments, the subject system is able to incorporate consideration of the Broker preferences driven by issues such as research votes, broker restrictions and settlement restrictions into both its decisions related "Filter B" strategy and filter selection as well as the automated selection and management of algorithms via strategic algorithms. As a result this exemplary embodiment gives traders the benefits of the subject system's automated strategy and algorithm selection and management without forcing a trader to use the subject trading system as an intermediating Broker/Dealer. Traders can exploit the predictive switching offered by the subject system while still directing trades to a specific Broker or set of Brokers, thereby enabling clearing and settlement directly with the Broker of choice.

To accomplish one or more of these goals, exemplary embodiments of the subject system support a configuration of a strategic algorithm that allows orders that are routed by the subject trading system using the subject system's automated process for algorithm selection and management, to be routed and executed in such a manner that for the purposes of settlement and clearing they appear to be sent directly from the initiating trader. Executions returned from these Service Bureau orders may also be passed back to the customer as coming from the executing broker/dealer. Therefore, from a clearing and compliance perspective the subject trading system in this Service Bureau embodiment is acting as a technology provider only, not as a broker/dealer.

Furthermore, in an exemplary embodiment the subject system may combine a Service Bureau configuration with a mechanism for tracking the trading obligations of the buy-side customer. Then the subject system can use this information when selecting broker algorithms to guide a customer's order flow toward satisfying its trading obligations.

In exemplary embodiments, a Service Bureau configuration may work in two modes:

Manual—The system may support receiving target broker information on a customer order, initially as a default configuration based on order route. This target broker will be the primary algorithm vendor when selecting algorithms to work the customer order. When the system is unable to find a valid algorithm from the target broker it may fall back to using non Service Bureau logic for selecting the algorithm. Orders routed to the target broker are "service bureau" orders. Orders routed to other vendors are "normal routed" orders. A customer sending an order with a Manual target broker may not be guaranteed to receive all of their executions from that broker. For the perspective of clearing and settlement, executions that are not from the target broker will appear as trades from the subject system.

Automated—This expands upon the Manual logic to enable the subject system to automate the application of the target broker to the order. The system may receive a list of target brokers at the start of day and manage the ratio of order flow to the brokers on the list.

The Service Bureau may, in one or more exemplary embodiments, be implemented via the following exemplary enhancements to the implementations described above.

1. A trading system FIX engine may enable all orders received over a given FIX session to be mapped to a target broker.

2. The system is configuredto implement Automated target broker instructions. If no target broker is mapped to an order entry channel, this logic may initially set the target broker to "trading system." Alternatively, more complex mapping algorithms may be used, as will be clear to those skilled in the art.

3. Extensions to the system route selection logic to constrain choices to the algorithms provided by a specific target broker when that target broker has a live algorithm of the classification (Stealth, Hidden, Participate, . . . ) selected by the system. When the system chooses a style for which there is no active algorithm provided by the target broker, it may route to the best algorithm in that class, regardless of broker.

4. The system may send a customer identifier to the algorithm broker/dealer on child (routed) orders sent to the target broker specified on the parent order. This identifier allows the target broker to recognize the order as coming from the buy-side customer (not the trading system).

5. Updating execution reports sent back to a customer to identify a chosen algorithm broker/dealer on the execution reports of the subset of fills that come back from the target broker specified.

Note that 4 and 5 may not apply to a child order that has a target broker specified, but is filled by a different broker than the one specified as target broker.

6. Updates to the trading system web help-desk, clearing systems, data warehouse, business intelligence, and compliance reporting to properly recognize that some child orders and fills will be processed as service bureau child orders and fills. Such updates are relatively routine to those skilled in the art.

Trading Server

Configuration

Exemplary configuration settings listed below preferably are “live updatable.”

Enable Automated Service Bureau—A firm/trader level configuration that may allow the trader’s order activity to be “managed” based on a configured list of target broker commitments.

Enable Manual Service Bureau—A firm/trader level configuration that may allow the target broker to be accepted on individual orders.

Enable Manual Service Bureau Grouping—A firm/trader level configuration that may allow FIX Orders submitted with a target broker to be grouped by that target broker in a switch board.

Broker Customer ID—A Firm Destination Channel level setting that may allow a trading system to identify a customer when sending an order on their behalf to a specific Algo (algorithm) Broker.

Customer Broker ID—A Firm Destination Channel level setting that may allow a trading system to report an Algo Broker when sending an execution from that Broker back to the Customer.

Customer ID Tag—A FIX Session Setting that identifies which tag to use to specify the Customer ID on Service Bureau orders.

Exec Broker ID Tag—A FIX Session Setting that identifies which tag to use to specify the executing Broker on Service Bureau executions back to the customer.

Target broker ID Tag—A FIX Session Setting that identifies which tag to use to specify the target broker on customer orders that may manually specify a target broker for Service Bureau orders. The target broker ID Tag value may match a preconfigured-Customer Broker ID.

Default target broker—A Firm order route setting that enables a target broker to be assigned to all orders sent via a Firm Order Route, if otherwise unspecified.

Target Broker

A target broker can be assigned to an order manually by the Trader or automatically by the trading system. A trading system order in one or more embodiments may only have one target broker (but certain other embodiments allow for more than one). The trading system database may capture the target broker ID, and how the target broker was assigned (manual or automatic).

If an order has a target broker, the subject system implementation may attempt to use algorithms associated with that broker first, when generating a routed order.

If the system is able to use the target broker, the routed order will be flagged as a Service Bureau Order in the system. If the system is unable to use the target broker, the routed order will be sent as a standard trading-system-to-broker routed order.

Manual Target Broker Assignment

If the customer has been configured with a default target broker, that broker may be used for all orders over the configuredOrder Route.

Moreover, in an exemplary embodiment, the trading system may use a “sticky broker” feature for the Service Bureau. This enables the system to ensure that once a Target Broker executes for a customer on a given Symbol/Side, subsequent orders in that Symbol/Side will flow back to that broker. This reduces the possibility of split tickets for a customer between multiple service bureau brokers.

In this embodiment:

(a) The Target Broker of the first Service Bureau execution for that Firm/Symbol/Side may receive all subsequent Service Bureau flow from that Firm/Symbol/Side for the remainder of the day.

(b) When assigning a Target Broker the server may check whether a Target Broker has already executed a Service Bureau order for that Firm/Symbol/Side.

(c) If there is an existing Target Broker for the Order’s Firm/Symbol/Side, the server may apply the same Target Broker.

(d) The Sticky Broker logic may override all other system Target Broker Assignment logic.

(e) If the currently “sticky” Target Broker for the Firm/Symbol/Side has been removed/deactivated for the Firm:

(i) The previous Sticky Broker for the Firm/Symbol/Side will be removed and a new Target Broker will be assigned.

(ii) The system will Log an Alert. For example:

LOGMINOR(funcname,“[Firm:%][Trader:% s][Symbol:% s][OrderId:% s]–Sticky Target Broker [BrokerId:% s] is no longer available as a Service Bureau Broker. New Sticky Target Broker is [BrokerId % s].”);

If the customer does not have a default target broker configured, the following requirements may apply.

To specify target brokers on FIX orders, a trader may be configured to have the following: (a) the trader must have the Enable Manual Service Bureau entitlement to access the Service Bureau functionality; (b) the trader must have a FIX Session configured with a target broker Tag; and (c) the trader must be configured with the correct target broker ID mappings.

If the Trader’s FIX Session has been configured to receive target broker information, but the system cannot identify the target broker, the order may be rejected. If the Trader’s FIX Session has been configured to receive target broker information, but the trader is not entitled to specify target brokers, the order may be rejected.

Service Bureau Orders

The system may add a new Order Option Flag: ServiceBureauOrder. Subject system orders sent to a target broker for a parent order using the Manual or Automated Service Bureau may be marked as ServiceBureauOrders. Service Bureau Orders may be ignored by OATs reporting logic and by compliance related audits.

Executions against ServiceBureauOrders may be ignored by compliance audits and may not be reported to ACT, specifically in end of day aggregate reports (by firm or destination).

ServiceBureauOrder Executions may be reported to ARS, with a flag identifying them as such.

When sending a ServiceBureauOrder out to an Algo Broker, the trading server may include the applicable Broker Customer ID to the order. When sending an Execution from a ServiceBureauOrder back to the Customer, the executing Algo Broker may be identified on the FIX Execution Report.

When sending a Service Bureau Execution report to the GUI, the target broker may be identified as the Execution Source (rather than the subject trading system).

Order Grouping By Target Broker

If Enable Manual Service Bureau Grouping is turned on, when FIX Orders are received with a target broker, the server may pre-fix the target broker ID into the Sender Sub ID sent down to the GUI. If the Trader is already using List Grouping, the target broker ID may be attached as a Prefix after the List Group ID has been applied. The result is that a List Trader would see MLCO-B/MLCO-S as their groups, assuming that MLCO is the target broker ID.

Subject System and the Block Market

Block Market fills preferably are reported as subject trading system fills, not fills by the target broker.

In an embodiment, the system may recognize the target broker Order Identifier. If the system is able to find an algorithm from the target broker it may flag the routed child order as a Service Bureau Order. This will allow the trading system to properly apply the correct identifiers and handling for compliance and clearing.

If the system is unable to find an algorithm from the target broker, the order may be treated as a normal trading system Routed Order to a Broker algorithm.

Target Broker Handling

In an embodiment, the system may recognize the target broker Order Identifier and the route selection logic will not be modified to prioritize the target broker in the algorithm selection. If the system picks an algorithm with a broker that matches the target broker, it will flag the Order as a ServiceBureauOrder.

Target Broker Overrides

A Target Broker assigned to orders may be overridden based on the trading filter applied to an Order.

Target Broker Filter Settings (a) Blank/Missing—There is no Target Broker override. The system may use the Default Target Broker assigned to the order. This may be the default for all Filters.

(b) BROKERID—The order may use the configured BROKERID for the Target Broker.

(c) "#SBOFF"—This special command may designate the order to have no Target Broker. The Default Target Broker may be removed, and the order may trade as a normal host trading systemOrder.

Assigning the Filter Target Broker to an Order (a) If/when the first filter has been applied to a New Order, the server will check for an existing Sticky Target Broker. If one exists, that Target Broker will be used for the order and the Filter Target Broker will be ignored.

(b) If there is no Sticky Target Broker, the system will check the Target Broker Filter Setting and determine whether the Target Broker assigned to the order needs to be adjusted.

(c) If the Target Broker Filter Setting is Blank, there will be no changes to the order.

(d) If the Target Broker Filter Setting is #SBOFF, the Target Broker will be stripped off the order and it will trade outside the Service Bureau as a normal host trading system order.

(e) If the Target Broker Filter Setting has a Broker ID, the server will check the Firm's Service Bureau Broker configuration to find a Target Broker that matches that ID.

(i) If a match is found, the server will apply the Filter's Target Broker ID to the order.

(ii) If a match is NOT found the server will: (1) leave the Order's existing Target Broker in place; and (2) log an alert (e.g.:

LOGMINOR(funcname,"[Firm:%][Trader:% s][Symbol:% s][OrderId:% s]−Filter Target Broker [Brokerld:% s] is not a Service Bureau Broker. Using existing Target Broker [Brokerld]:% s.").

Multiple Target Brokers

As discussed above, in one or more embodiments the system supports the configuration of multiple Target Brokers for a firm, but the customer is limited to trading with only one of these Brokers at a time. In an exemplary embodiment described below, the system may allocate orders to multiple Target Brokers based on targets established to direct the trading of a certain percentage of parent Orders to each Broker.

Trading Server Configuration

Target Broker Set: a collection of settings for configuring Target Broker allocations.

Target Broker Set Repeating Settings:

Target Broker Id—The identifier of a Broker configured as a Service Bureau Target Broker.

Target Broker Alloc %—Percentage of order-flow that should be allocated to the Target Broker.

(b) Target Broker Assignments

Target Broker assignments may be made at the time a New Order is received.

Once an Order has been assigned a Target Broker, that Target Broker may remain for the lifetime of the order.

Target Broker may be maintained across Cancel/Replaces in Quantity for that Order.

(c) Target Broker Assignment Logic

This section describes the calculations for ensuring Orders are distributed across Target Broker based on the ratios configured in the Target Broker Set.

Scope

The Terms described below may be unique to each Customer Firm using multiple Target Brokers.

Terms for Distribution Calculation.

The Distribution Logic will work with the following terms.

[N]=Index of Broker within a Target Broker Set. N can be 0 to (Number_of_Target_Brokers−1).

[!N]=Index of each Broker within a Target Broker Set that is NOT the current [N].

tbAlloc[N]=Percentage of Order Flow configured for Target Broker [N].

tbqtyAlloc[N]=Sum shares Assigned to Target Broker [N].

qtyTotalAlloc=Sum of all shares Assigned to all Target Brokers.

qtyOrder=Shares to allocate on New Order.

Standard Deviation Squared Calculation

For each Target Broker, calculate the following. Note the SUM is for all Target Brokers that are not the current N.

$$tbStdev[N]=(((qtyOrder+tbqtyAlloc[N])/qtyTotalAlloc)-tbAlloc[N])2+SUM[!N](((tbqtyAlloc[!N]/qtyTotalAlloc)-tbAlloc[!N])2)$$

Select the Target Broker based on lowest tbStdev[N].

Target Broker=MIN(tbStdev[N]).

Increment tbqtyAlloc[N], qtyTotalAlloc by qtyOrder.

(d) Recovery

In the event of a system failure, the following may need to be recovered for each Customer Firm:

tbqtyAlloc[N]—The sum of shares allocated to each Target Broker. The sum of shares executed by the customer with each Target Broker.

qtyTotalAlloc—Total shares allocated across all Target Brokers. Sum of shares executed by the customer across all Target Brokers.

Error Trades

Error Trades are primarily generated when the subject system employs Optimistic Cancel Logic (routes Cancel of old and sends New order simultaneously).

In an embodiment, the subject system preferably will not use Optimistic Cancel if: either the Currently Routed Order or the Pending New Order would be flagged as Service Bureau Orders, and the Currently Routed Full Quantity (regardless of Remaining shares left on the order)+Pending New Order Quantity are Greater Than the Leaves of the Parent Order.

In another embodiment, Error Trades are generated if AMD uses its OverCommit functionality. In this embodiment, the subject system preferably will not use OverCommit Logic if either the Currently Routed order or the Pending New Order are flagged as ServiceBureauOrders.

Unexpected Error Trades

If despite the requirements listed above the system does generate an Error trade against a ServiceBureau flagged order, a system alert preferably will be generated: "WARNING Error Trade Generated for Firm [FIRM MNEMONIC] with Broker [BROKER MNEMONIC] for [EXECID] [SIDE] [EXECQTY] [EXECPRICE]."

Minimum Quantity Requirement

The Optimistic Cancel feature may allow the Subject system to submit multiple orders, or replace existing orders where the Pending New Quantity+Pending Cancel Quantity may be greater than the Order Remaining Quantity. If the Optimistic Cancel results in an Over-Fill of the Customer's Parent Order, those shares may be taken into the Error Count.

The Service Bureau presents a challenge to this functionality since the trading system is no longer the broker/dealer for all of the executions. An overfill on a Service Bureau order can create a fill known to the Target Broker but not to the Customer.

Described below is a Minimum Quantity requirement used in one or more exemplary embodiments for service bureau orders that should decrease the chance of service bureau Error Fills.

Trading Server (a) Configuration

SB_MIN_QTY_LBQ_FACTOR−Float−Multiplied against a Security's LBQ to set the MIN_SB_QUANTITY for an order.

Default=1 (The LBQ.)

Valid Range=0 (No SB Min Quantity)−9999 (Effectively turns off SB as order quantity would likely always be below the minimum).

This setting may be applied to Firms/Traders.

This setting may be live updatable. Live updates may apply to Orders submitted after the change.

(b) Service Bureau Min Quantity

Service Bureau Min Quantity (SB_MIN_QUANTITY) may be calculated as Order.Security.LBQ×Trader.SB_MIN_QTY_LBQ_FACTOR.

IF an Order has a Target Broker AND the Order Remaining Quantity (Total Quantity−(Filled+Routed))<SB_MIN_QUANTITY THEN LOGDETAIL(funcname,"Customer [Firm/Trade ID]Order [OrderID]Remaining Quantity [Order.RemQty] is less than [Instrument Ticker/LBQ], remove order from Service Bureau routing.");

Suspend use of the Target Broker for making routing decisions.

All subsequent Child Orders should be routed as host trading system orders.

(c) Service Bureau and Small Orders

IF a new Order arrives with Quantity <SB_MIN_QUANTITY THEN it will be ineligible for trading via the Service Bureau.

IF the Parent Order is Cancel/Replaced to a Quantity such that its Remaining Shares are >=SB_MIN_QUANTITY THEN the Target Broker can be applied for routed Children until such time that the Remaining Shares fall below 1×LBQ.

(d) Quality Assurance

For the following scenarios assume the following:

Customer is setup with default Target Broker=XX.

Lare Block Quantity (LBQ) for MSFT=100K.

Customer SB_MIN_QTY_LBQ_FACTOR=1.0

SB_MIN_QTY=100K

Scenario 1

1. Customer submits Buy 10K MSFT.

2. Server does NOT assign Target Broker.

3. Subject Trading System Routes 10K to DEEPVALUE as "Trading System" Order.

4. DEEPVALUE fills Order, Customer receives 10K from Subject Trading System.

Scenario 2

1. Customer submits Buy 120K MSFT.

2. Subject System Routes 10K to XX as Service Bureau Order, Fills.

3. Subject System Routes 5K to XX as Service Bureau Order, Fills.

4. Subject System wants to Route 10K, (120K−(15K [filled]+10K [pending new])==95K<SB_MIN_QTY [100k]).

5. Server removes Target Broker.

6. Subject System Routes 10K to DEEPVALUE as "Trading System" Order.

Scenario 3

1. Customer submits Buy 50K MSFT.

2. Server does NOT assign Target Broker.

3. Subject Trading System Routes 10K to DEEPVALUE as "Trading System" Order.

4. DEEPVALUE fills Order, Customer receives 10K from Subject Trading System.

5. Customer Cancel/Replaces to 200K.

6. Subject Trading System applies XX as Target Broker.

7. Subject Trading System Routes 100K to XX as Customer.

8. XX fills Order, Customer receives 100K from XX.

9. Order Leaves==90K<SB_MIN_QTY (100K), Target Broker is removed.

10. Subject Trading System Routes remaining 90K to Subject System Trading Brokers (including XX) as "Trading System".

Allocations System

Service Bureau Execution Handling

ARS may recognize the ServiceBureauExecution flag on trades from the trading system Trading System and store in its Trade table.

ARS may recognize the target broker mnemonic on ServiceBureauExecutions from the subject trading system and store in its Trade table.

ARS may map a combination of the Execution's ClearingID+target broker mnemonic to form a mapping to a unique firm/clearing record for commission tracking purposes.

Trade Blocks

If a trade has the Service Bureau flag it may be blocked into a separate Trade Block from normal Trades. Blocking Logic preferably includes: Service Bureau Flag; Firm; Symbol; Side; Trade Date; Exchange; and ISIN. Service Bureau Trade blocks will be auto-allocated at the trade price. The allocations may compute the revenue based on commission rate set for the Firm/target broker combination.

Trade Block Allocations may have a new NeverSubmit status. ServiceBureau Trade Blocks may be set with status=NeverSubmit and submitted=TRUE which indicates the trades are locked but may be pulled for revenue computations.

ARS GUI will not allow submission (checkbox) when status=NeverSubmit.

Clearing Account

New clearing account type: SBTYPE is just a place holder so that no bad data gets into the allocations.

Clearing Broker: (a) may hold a dummy record to be mapped to SBFirms where we do not actually clear the trades; (b) may be of status=Inactive (where it may never be sent); and (c) may be displayTag=True where this broker's tab will be displayed and allocations displayed.

Firms

New FirmType may be added—SBFirm, to hold the FirmID/target broker ID mappings. Billing Firms will work with SB (service bureau) Firms.

User Interface: Allocations may appear in their own tab (SB Broker). Trades may have a new filter (SB Trades).

Data Warehouse

ETL—Trading Server

Order Fields: Target Broker ID; Target Broker Assignment Type (Automatic/Manual); and ServiceBureauOrderFlag. Execution Broker for ServiceBureauOrder fills.

ETL—ARS

Service Bureau Flag on Trades. Service Bureau Flag on Trade Blocks.

Reports

Fills resulting from Service Bureau Orders may be counted in daily volume/Engine reports.

Service Bureau Orders/Fills preferably are not included in compliance reporting.

Exemplary Service Bureau Scenario

10:00 am Customer routes block order for 220K to subject trading system.

10:01 Subject Trading system routes 5K to BrokerXX as a Service Bureau Order, identifying the Buy-Side Customer as the sender of the order.

10:05 5K, filled, all executions forwarded back to Customer with ExecSource=XXXX.

10:05 Subject Trading system routes additional 15K to XX as Service Bureau Order.

10:06 Block Fill in trading system for 100K. Executions back to customer with ExecSource=BLOK.

10:06 Order now has 105K Filled, 15K in Engine to XX.

10:07 15K order is filled at XX (Leaves=100K).

10:09 Subject Trading system routes 25K to Broker YY as "trading system" (XX does not have appropriate algorithm).

10:11 YY fills 25K.

10:12 Customer clicks "Fast Forward" in GUI, subject trading system routes 75K to Trading Platform AAA as "Trading system."

10:12 AAA fills 75K.

16:00 Customer Allocates/Clears 200K with BLOK.

16:00 Customer Allocates/Clears 20K with XXXX.

What preferably is reported to OATS:

10:00 New Order from Customer for 220K Received by BLOK (BLOK=example clearing name for subject trading system.

10:06 Exec in BLOK for 100K.

10:09 BLOK routes 25K to YY.

10:12 BLOK routes 75K to AAA.

10:12 Order Canceled in BLOK by BLOK (not customer), Leaves=20K.

What Broker XX to OATS:

10:01 New Order from Customer for 5K Received by XXXX.

10:05 Exec in XXXX for 5K.

10:05 New Order from Customer for 15K Received by XXXX.

10:07 Exec in XXXX for 15K.

What YY Reports to OATS:

10:09 New Order from BLOK for 25K Received by YY.

10:11 Exec in YY for 25K.

What AAA Reports to OATS:

10:12 New Order from BLOK for 75K Received by AAA.

10:12 Exec in AAA for 75K.

Do not report routed orders to XXXX, or send any XXXX fills to the clearing firm associated with BLOK.

Trade Allocations to Brokers System Exemplary Embodiments

One or more Service Bureau embodiments allow clients to clear trades with target brokers while still leveraging a trading system for execution quality. These embodiments may be used to route customer orders to valid service bureau brokers, so that the resulting trade is cleared between the client and the broker, with the trading system acting as the technology provider.

Clients may be expected to require the ability to manage the flow of service bureau trades as the list of target brokers increases.

In one or more exemplary embodiments (referenced herein, for convenience only, as a Trade Allocations for Brokers System (TABS)) a system provides a web interface that allows trading system clients to actively manage the percentages of Service Bureau order flow to valid brokers. This front-end may collect information from the client to be used by the subject trading system in routing Service Bureau orders to specific brokers.

An objective of one or more of the TABS embodiments is to allow a client to self-manage their Service Bureau order flow to each of their available Service Bureau brokers via a trading system. The client also should be able to view the historical volume executed by each Service Bureau broker.

Exemplary Application Components

The following exemplary components provide an understanding of how a client may direct their order flow to available Service Bureau brokers.

Client Firm

The client is the entity sending Service Bureau orders to the trading system.

- A client firm in the Service Bureau UI represents a firm in the Trading System.
- The Firm IDs of the clients may be specified so they may be sent to the Trading System along with the applicable target broker.

Target Broker

A target broker is a broker of the trading system client that has been setup to electronically receive Service Bureau orders from the subject trading system as if they came from the client, so that any resulting trades are cleared between the broker and client.

- A Target Broker may be accessible to multiple clients or just a single client.
- Firms may have their own set of Target Brokers, which will be a subset of an internal Target Broker list.
- Target Brokers may need to be managed through the application.

The status of target brokers may need to be managed through the application interface Target Brokers may need to be assigned to each client.

Target Allocations

Target allocations are based on a client's firm-wide strategy to direct order flow to each broker.

Allocations represent targeted percentages of the client's potential trade volume. This may determine how much of their order flow should be sent to the targeted broker.

Allocations may be applicable firm-wide.

Trade Volume

Service Bureau volume by the client may be viewable and updated intraday in the application by these defining elements:

Trade Volume

Broker

Trade Date

Functional Specifications

This section describes what may be implemented one or more embodiments of the TABS application. The specifications support the primary function of assigning target allocations to brokers and peripheral functions around setup, maintenance, and searching for data.

Setup

The following components may be created through the application interface.

Target Brokers

Target Brokers will be created through the interface with the following traits:

Broker ID: This string id is a code that may be used on Import/Export files to synchronize Brokers between the Service Bureau System and other host trading system Systems.

Broker Description: This is a user-friendly name for the Broker.

Status: This reflects whether a broker is active or not.

The general functionality may be as follows:

A Target Broker can be added.

The status of a Target Broker can be updated between active/inactive.

The Broker Description can be edited.

A record with a duplicate Broker ID cannot be created.

An error message should be displayed explaining that a Broker with the same ID already exists.

An exemplary Target Brokers Screen is depicted in FIG. 91.

Firms

Firms may be created in the system with the following traits.

Firm ID: This string id is a code that may be used on Import/Export files to synchronize Firms between the Service Bureau System and other Subject system trading Systems. It may also identify what information an external user can view in the system.

Firm Description: This is a user-friendly name for the Firm.

The general functionality may be as follows

Firms can be created.

A record with a Firm ID that already exists in the application cannot be created.

An error message should be displayed explaining that a duplicate Firm ID exists.

A Firm Description can be edited.

An exemplary Firms Screen is depicted in FIG. 92.

Users

User administration functionality may be used to grant access to the TABS system. Users can be internal to the trading system or external clients. Below in Table 38 is a list of exemplary system properties for each user record.

TABLE 38

| Field | Description | Internal User | External User |
|---|---|---|---|
| ID | The internal database id | Automatically set to a unique value | Automatically set to a unique value |
| UserName | This is the username used for login to the system | Set by Active Directory | Manually created or taken from subject trading system GUI |
| Password | This is the password used by a user for login. It should be encrypted in the database. A manually created password must fit the following criteria: Length >= 8 chars Must contain 3 of the following 4 groups: (1) uppercase alpha, (2) lowercase alpha, (3) numbers, or (4) symbols. | Set by Active Directory | Manually created or taken from subject trading system GUI |
| First Name | This is the First Name of the user | Set by Active Directory | Manually created |
| Last Name | This is the Last Name of the user | Set by Active Directory | Manually created |
| Email | This is the email address of the user | Set by Active Directory | Manually created |
| FirmID | The ID of the firm the user belongs to | Automatically set to DEFAULT | Manually created |
| Role | This is the security profile assigned to the user that determines what the user has access to. The user can belong to more than one role; its access being the aggregate access of the combined roles. | Manually assigned | Manually assigned |
| In Active Directory | A flag that indicates True if the user was pulled from Active Directory, False if the user was created directly in the database | Automatically set to True | Automatically set to False |
| Created | The time the record was created. | Automatically set | Automatically set |
| Modified | The time the record was last modified | Automatically set | Automatically set |

Internal Users

In one or more exemplary embodiments, TABS may require integration with Active Directory for users on the host trading system network. TABS may support an interface for allowing some users to be created, and authenticated during sign-on, via Active Directory.

Internal users may be added from Active Directory through a "Refresh Users" link which may synchronize the user list with the current Active Directory ("AD").

It may be assumed that the "Refresh Users" button will be used infrequently, so that situations where, for example, three different users refresh users at the same time do not have to be handled.

A timestamp for when Active Directory was last refreshed may be displayed.

A unique database ID may be created to reference the user record.

The following fields may be automatically populated from Active Directory and read-only for internal users.

UserName—The Windows Active Directory username of the user.

Password—The Windows Active Directory password of the user.

First Name—The Windows Active Directory first name of the user.

Last Name—The Windows Active Directory last name of the user.

Email—The Windows Active Directory email of the user.

The FirmID of the user may automatically be set to TRADING SYSTEM.

The In Active Directory flag may be set to True.

The user may be assigned a Role to access the system.

Passwords may not have to be brought into the system from Active Directory. Login credentials may only have to be authenticated against Active Directory.

External Users

External client users may be created through the application interface. The external users may fall into two buckets: (1) users who have a subject trading system GUI login and (2) users who do not have a subject trading system GUI login (their logins may be created in TABS).

The following user data may be manually entered into the application.

UserName—The TABS username of the user; it may be brought in from the Trading System GUI if the user has a login.

Password—The TABS password of the user; it may be brought in from the Trading System GUI if the user had a login.

First Name—The first name of the user.

Last Name—The last name of the user.

Email—The email of the user.

FirmID—The FirmID of the firm the user is associated with; this identifier may be a valid FirmID in the system and preferably selected from a dropdown.

A unique database ID may be created to reference the user record.

The In Active Directory flag may be set to False.

A user may not be created if a value for one of the traits below is duplicated for another user record.

UserName

Email

General User Functionality

A User may be created

If the user is internal, all the user information may be retrieved from AD.

If the user is external and has a Trading System GUI, all information except the UserName and Password may need to be manually entered.

If the user is external and does not have a Trading System GUI, all the information may have to be manually entered.

A user may not be created if the username already exists in the application

Users may be deleted when they have no roles assigned.

A user may not have access to the system unless a role is assigned; this especially applies to users available via Active Directory who may not be able to access the system unless a role is assigned If a user is removed from Active Directory, the user may not be able to log in, since the password will be inaccessible.

A user may have a firm associated to it using the Firm ID.

Database Tables users—a table of users and their encrypted passwords. password is only set used for non-active-directory users. is_ldap is set to true for active directory users.

```
CREATE TABLE users
(id integer NOT NULL,
created timestamp without time zone,
modified timestamp without time zone,
username character varying(20) NOT NULL,
"password" character varying(50),
is_ldap bit(1),
is_active bit(1)))
);
```

role_assignments—the table that maps users to roles.

```
CREATE TABLE role_assignments
(id integer NOT NULL,
created timestamp without time zone,
modified timestamp without time zone,
user_id integer,
role_id integer)
```

An exemplary Users Screen is depicted in FIG. 93.

Broker-Firm Assignment

Brokers may be assigned to Firms after each are created. This functionality may have the following traits.

Firm ID—the ID of the Firm.

Broker Code—the Broker Code of the Target Broker being assigned to the Firm.

Status—the status of the relationship (active/inactive).

The general functionality may be as follows:

A Broker-Firm assignment may be created only if the Target Broker status is Active.

The status of a new Broker-Firm assignment may default to Active.

The status may be updated (Active/Inactive) for an existing Broker-Firm assignment.

A Broker-Firm relationship may not be deleted; however the status can be set to Inactive.

If a Broker-Firm assignment already exists, a new entry may not be saved.

An error message may be displayed saying there is a duplicate entry.

An exemplary Broker-Firm Assignment Screen is depicted in FIG. 94.

Target Allocations

A Target Allocations screen may house the target percentages for broker volume, historical broker volume, and the host trading system's volume. It may be maintained by the following specifications:

Target Allocations

Each Target Allocation may be a whole number between 0 and 100.

The total of a firm's broker target allocations may equal 100.

For each client firm there may be only one set of Target Broker Allocations directly reflected in the interface. The allocations may be universal for users, regardless of user or permissions.

A target allocation may only be assigned to a non-host trading system broker

Allocations may not be configurable by time range; they will be current until changed.

If target allocations for a client do not add to 100, the distribution set may not be applied.

Brokers

Any target broker may show up in a firm's list of brokers and be able to receive a target allocation value if the following three conditions are met:

1. The broker status=active.
2. The broker is assigned to the firm.
3. The broker-firm assignment=active.

When a new broker is made available for a target allocation to be specified, the target allocation may be defaulted to 0.

If the broker status or the broker-firm assignment becomes inactive, the following may occur:

The text for the broker and target allocation should be highlighted (either asterisked or colored in red text).

A message should be displayed on the screen indicating that either the broker was made inactive or the broker-firm relationship was made inactive.

The target allocation value becomes 0 and read-only.

The target allocation total should deduct the inactive broker's portion.

Historical trade volume should be displayed by broker

Aggregate volumes for the predetermined periods should be shown by broker.

The % of the total volume (by non-host trading system brokers) for the period should be shown by broker.

Trade volume will be displayed by broker by the following predetermined time periods:

Current Trade Date (with intraday updates)

Week-to-Date

Month-to-Date

Qtr-to-Date

Year-to-Date

Table 39 below displays exemplary effects of the broker status, the broker-firm status, and the broker-firm assignment on the target distribution and whether the target broker displays for the client.

TABLE 39

| Broker Status | Broker-Firm Assigned | Broker-Firm Status | Target Allocation | Target Broker Displays |
|---|---|---|---|---|
| Active | Yes | Active | Write | Yes |
| Active | Yes | Inactive | Read | Yes |
| Active | No | Inactive | Read | No |
| Inactive | No | Inactive | Read | No |
| Inactive | Yes | Active | Read | Yes |
| Active | No | Active | Read | No |

Trading system

Historical volume should be displayed for host trading system by the following predetermined time periods.

Current Trade Date (with intraday updates).

Week-to-Date.

Month-to-Date.

Qtr-to-Date.

Year-to-Date.

No % numbers are needed.

An exemplary Target Allocations Screen is depicted in FIG. 95.

Trade Volume

Users may be able to access historical volume data for their firm through a screen in the application.

Historical volume data by date and broker should be viewable.

Data should be exportable from the interface in XLS and/or CSV.

Standard search criteria should be provided for the client:

Date Range.

Broker (optional).

Period Grouping: Daily, Weekly, Monthly, Quarterly, Yearly, YTD.

An exemplary Trade Volume Screen is depicted in FIG. 96.

Permissions

The ability to configure roles and permissions may be created. This provides flexibility in configuring what application components and functionality each role has.

Roles

A role is a grouping of entitlements that can be assigned to users.

A "Roles" screen that adds and removes roles for each user may be made available. A role assignment is a mapping of a user to a particular role.

Roles may be created with customizable batches of entitlements (access to different functionality).

A role may be deleted if the role is not assigned to any users.

The number of users assigned to the role and the number of entitlements assigned to the role may be displayed A user may be assigned to multiple roles. The user's rights may be the sum of the rights of the individual roles.

A role may have the following properties:

ID—The internal database id.

Created—The time the record was created.

Modified—The time the record was last modified.

Name—The name of the role being defined.

Database Tables roles—the table that holds the roles.

```
CREATE TABLE roles
(id integer NOT NULL,
created timestamp without time zone,
modified timestamp without time zone,
name character varying(50) NOT NULL)
```

entitlements_roles—the table that maps entitlements to roles

```
CREATE TABLE entitlements_roles
(id integer NOT NULL,
created timestamp without time zone,
modified timestamp without time zone,
entitlement_id integer,
role_id integer NOT NULL)
```

An exemplary Roles Screen is depicted in FIG. 97.

Entitlements

An Entitlement is a basic building block of permissions. There may be multiple entitlements within a TABS webpage and an entitlement may refer to functionality across multiple pages. Entitlements may be configured in the application and may be added to Roles.

Base entitlements may allow a user to view a page/screen.

Other entitlements may need to be programmed into the application.

When a user accesses a page, the system may check whether the user has the entitlement(s) to view the page and possibly use functionality within it.

If there is functionality within the page that can only be accessed by certain users, logic may be built into the application to check whether the user has those entitlements.

To allow a role to edit a page, both the view and the edit entitlements may be assigned to the role.

If a user belongs to multiple roles, the entitlements may be compounded to grant more entitlements to the user than each separate role would. The specific user's entitlements may be an OR of the entitlements in each role. The user may not have entitlements stripped by being assigned to multiple roles.

The number of roles the entitlement belongs to may be displayed.

An entitlement may not be deleted/added/edited

An Entitlement may have the following fields:

ID—The internal database id.

Created—The time the record was created.

Modified—The time the record was last modified.

Name—The name of the entitlement being defined.

Database Tables entitlements—Each page may require a particular entitlement for a user to access it.

CREATE TABLE entitlements
(id integer NOT NULL,
created timestamp without time zone,
modified timestamp without time zone,
entitlement character varying(50))

pages—a table that tracks system pages in the database

CREATE TABLE pages
(id integer NOT NULL,
created timestamp without time zone,
modified timestamp without time zone,
page character varying(50),
description character varying entitlements_pages—the table that maps entitlements to a specific page. Entries in this table may specify which entitlement is required for any page logic to be accessed. This table preferably only controls base level entitlements—which users have access to the basic version of the page.

CREATE TABLE entitlements_pages
(id integer NOT NULL,
created timestamp without time zone,
modified timestamp without time zone,
page_id integer,
entitlement_id integer NOT NULL)

Below in Table 40 is a list of the required entitlements in the application.

TABLE 40

| Entitlement | Screen | Functionality |
|---|---|---|
| Login | Login | Login to application |
| EditTargetAllocation | Target Allocations | Edit Target Allocations |
| TargetAllocation | Target Allocations | View Target Allocations |
| TradeVolume | Trade Volume | View Trade Volume |
| QueryTradeVolume | Trade Volume | Query Trade Volume |
| TargetBrokers | Target Brokers | View Target Brokers |
| Users | Users | View Users |
| Firms | Firms | View Firms |
| Broker-Firm | Broker-Firm Assignment | View Broker-Firm Assignment |
| SetupUsersFirmsBrokers | Target Brokers, Users, Firms, Broker-Firm Assignment | Edit Target Brokers, Users, Firms, and Broker-Firm Assignment screens |
| Roles | Roles | View Roles |
| Access | Access | View Access |
| Configure Security | Roles, Access | Edit Roles, Access |
| AllFirms | NA | Gives the user access to see data for all firms |
| SingleFirm | NA | Restricts the user to data associated to one firm |

Access

Preferably a user of the system is provided with the ability to:

1. specify IP addresses/networks that user groups can login from; and 2. reject logins for these user groups from IP addresses outside the specified IP addresses/networks.

The IP Address/subnet may be of the format X.X.X.X/Y, where X is the first through fourth octet and Y is the subnet mask length.

The values of the octets may be verified to be within a certain range (0-256).

All 4 IP Address fields and the Subnet Mask Length may be filled out before an entry is created.

A User Group may be assigned to an IP Address/subnet entry.

Multiple User Groups may be assigned to an IP Address/subnet entry.

Multiple IP Address/subnet entries may be assigned to a user group.

An IP Address/subnet entry can be deleted.

The associated links to User Groups may be deleted.

For any user that belongs to multiple user groups, if one of the user groups is restricted to an IP Address/subnet, then the user may be restricted to only that IP Address/subnet. The most restrictive access may be applied.

An exemplary Access interface display is depicted in FIG. 98.

Navigation

User preferably are able to navigate between pages easily. If a user does not have the proper Role (with entitlements) to view the page, the page may not be visible to be clicked on in the navigation panel.

Interface Overview (Exemplary Embodiments)

Table 41 provides a summary of the exemplary screens in one or more exemplary embodiments of the application and their intended purposes.

TABLE 41

| Purpose | Screen | Description |
|---|---|---|
| Security Portal | Login Page | Login page where credentials are entered and access is requested |
| Client Inputting | Target Allocations | Allows target allocations to be input for brokers and real-time volume to be viewed by predetermined time periods. |
| Searching/ Exporting Data | Trade Volume | A page where users can query for and export historical Service Bureau volume by broker and date. |
| Setup/ Configuration | Target Brokers | Allows a target broker to be created and properties to be specified. |
| | Users | Allows a user to be created, by user login and basic identifying information, for access to the system. In addition allows the role to be assigned |
| | Firms | Allows a firm to be created in the system. |
| | Broker-Firm Assignment | Allows a broker to be assigned to a firm and the status of the assignment to be specified. |
| | Roles | Allows roles to be configured with entitlements. |
| | Access | Allows IP Address/subnet entries to be made which serve as access points for certain users to login to the application through. |

Inputs/Outputs

One or more exemplary embodiments of a Service Bureau application may interface with other trading systems via import and export of two comma delimited data files in CSV format.

The application may support the ability for an external scheduler to invoke the import or export function on demand.

Import—Trade Data Import File Specification

A Trade Data import file provides the Service Bureau application with Service Bureau trade volume data.

The Import process may over-write existing database volume records for a Date/Firm/Broker combination found in the file. See Table 42.

TABLE 42

| Data | Type |
|---|---|
| Date | Timestamp |
| Broker ID | String |
| Firm ID | String |
| Volume | Integer |

Import—User Login Import File Specification

The User Login Import file provides the application with trading system GUI login credentials that would allow it to be launched off the GUI and external users with GUI logins to be authenticated without the user having to login separately.

The Import process may overwrite existing GUI login records for a user if a record for the user is found in the file. The Firm ID may be recognized by both the Trading System and TABS. See Table 43.

TABLE 43

| Data | Type | Encrypted |
|---|---|---|
| Date | Timestamp | |
| Username | String | |
| Password | String | ✓ |
| First Name | String | |
| Last Name | String | |
| Firm ID | String | |
| Email | String | |

Export—Firm/Target Broker Allocation File Specification

The Firm/Target Broker Allocation File may be exported to the trading system to manage the Firm's trading based on the configured allocations. The Firm ID and Broker ID will both be recognized by the trading system and TABS. See Table 44.

TABLE 44

| Data | Type |
|---|---|
| Date | Timestamp |
| Broker ID | String |
| Firm ID | String |
| Target Allocation | Integer |

FIG. 99 depicts exemplary network architecture for one or more exemplary embodiments.

Exemplary TABS Software Architecture

Definitions, Acronyms, and Abbreviations (see Table 45).

TABLE 45

| ACCR. | Description |
|---|---|
| DB | Database |
| FS | File system |
| MVC | Model-View-Controller |
| ORM | Object-Relational Mapping |
| TABS | Trade Allocation to Brokers System |

For the exemplary embodiments described below, the following architecture constraints may be taken into consideration for TABS architecture design:

Linux used as operating system.

Apache used as Webserver.

PostgreSQL used as DB server.

PHP used as implementation language.

Logical View

This section describes certain architecturally significant parts of the design model, such as its decomposition into subsystems and packages.

Overview

TABS may be built using Yii (http://www.yiiframework.com/) which is a high-performance component-based PHP framework.

From a file system point of view, the application may consist of 3 main folders:

"Yii framework" folder containing the framework distribution.

"Public" folder which may be the only folder accessible from Web. The only PHP code located in the folder may be index.php file acting as a front controller calling Yii to handle page requests. Apart from the front controller, the folder may contain CSS, JavaScript and image files used by TABS.

"Protected" folder containing TABS-specific configurations, models, view, controllers, components, libraries, and extensions used by the application.

Architecturally Significant Design Packages

This section covers significant parts of code located in a "Protected" folder.

Configuration folder

Configuration files are packaged in "config" folder. These may include:

main.php—contains general settings like application name, homepage path, login path, DB connection credentials, logs configuration, etc.

ldap.php—contains LDAP-specific configuration like access credentials.

console.php—contains configuration specific to executing code from console (e.g. by Cron)

test.php—configuration specific to Unit tests running

Components

Classes located in a "components" folder may be either service classes or classes extending default Yii behavior to meet TABS-specific requirements. The more significant classes are:

AccessManager—provides authorization-specific methods.

Controller—base class for all controllers being used throughout the application. For instance, the class performs authorization checks prior to executing a controller.

LdapUser—a service class for LDAP authentication and data synchronization.

UserIdentity—extends Yii's CUserIdentity class and contains TABS-specific authentication method code that checks if the provided data can identify the user.

Controllers

Controller classes may reside in a "controllers" folder. All these may extend components. Controller class for consistency.

Extensions

An "extensions" folder may contain code extending built-in Yii components—e.g., "mbmenu" extension (http://www.yliframework.com/extension/mbmenu/) provides a drop-down JavaScript menu.

Models

A "models" folder may contain both ORM PHP classes (e.g. Firm, Broker) and models for forms (e.g., LoginForm).

Libraries

External libraries may be placed in a "vendors" folder:

Addendum—provides support for annotations mechanism.

Zend—parts of Zend Framework will be used, e.g. code operating with LDAP.

Views

A "views" folder may contain HTML code with PHP injections forming visual output. The views may be grouped by controller, a view for each action is in a separate file—e.g., views/user/create.php is a view for "create" action of UserController.

Filters

Filters in this context are classes implementing Yii's CFilter class and may be used to perform specific actions before/after a controller is processed.

AccessFilter—checks if current user can access specific action of a controller.

HttpAuthFilter—is used for automatic log in using Basic HTTP Auth.

Deployment View

An exemplary minimal configuration includes a web server and a DB server, which may run on separate computers.

Hardware requirements:
- Server running TABS application:
  - 256 MB RAM or greater
  - about 50 MB HDD space
  - CPU: 32 bit
- Server running PostgreSQL server: at least 100 Mb space available for DB Software requirements:
- OS: Linux
  - CentOS, RedHat or other server-oriented distribution
  - Cron
- Apache web server:
  - version 1.3 or 2.2
  - with mod_ssl module
  - with mod_php5 module
  - with mod_rewrite module
- PHP:
  - latest PHP 5.2.x branch version
  - with php_pdo extension
  - with php_pdo_pgsq1 extension
  - with php_ldap extension Deployment procedure EPAM provides a package including application files, SQL dump and detailed instructions. An exemplary deployment procedure may include copying three folders to web server FS, setting up DB/LDAP connection credentials and importing a SQL dump to Postgres database.

Implementation View

In an exemplary embodiment, the application follows a MVC paradigm and its implementation is provided by Yii. More details can be found here: http://vvww.yiiframework.com/doc/guide/basics.mvc.

Overview

Structure of an exemplary Yii application appears as depicted in FIG. 100. Index.php is the Front Controller, which executes Yii code (application) by retrieving a controller which, in turn, operates with views, models and widgets (if any).

Layers (see FIG. 101).

An exemplary Presentation tier preferably consists of HTML pages interacting with user input and transferring collected data to the server. All communications between client and server may be based on HTTPS protocol. Business logic processing may be implemented using PHP which may be called by an Apache web server. It interacts with all other application parts. This is the brain of the system. A Data layer is represented by 2 data storages: database and LDAP server.

Data View

FIG. 102 depicts exemplary database tables and relationships.

Exemplary TABS User Guide

1. Introduction

The Trade Allocations for Brokers System (TABS) is a web interface that allows our clients to actively manage the percentages of Service Bureau order flow to valid brokers.

2. Authentication

There are 2 ways a user can log into TABS:

Automatically—if the user is authenticated in the GUI application and accesses TABS from the GUI, the system will try to automatically log him/her in. If authentication from the GUI fails, the user is redirected to a login page, having a respective error message displayed.

Manually, from login page—if the user does not have a GUI account or has failed to automatically log in according to the previous scenario.

3. Authorization 3.1. Roles and entitlements

Authorization in TABS is done in terms of entitlements, which are assigned to roles, which, in turn, are assigned to users.

Entitlements are basic building blocks of the authorization system. They are hard-coded into the application and cannot be managed via UI.

Entitlements are assigned to roles via a Setup/Configuration menu (please refer to section "4.1 Roles" for details). Roles are assigned to users via Setup/Configuration menu as well; this is covered in section "4.4 Users".

NB. There is a special "Login" entitlement, which should be present for all users which able to log in, otherwise they will see a "User is not allowed to log in" error. Two predefined roles "Internal User" and "External User" have this role.

3.2. IP address-based access

A special case of authorization is that related to IP access rules.

If there is a need for some users to be able to access the system only from specific IP range(s), a new user group should be created for them. The user group(s) is (are) assigned to required users on User Edit page. An access rule is created, by specifying IP Address, Subnet mask length (the 2 values will determine allowed range of IP-addresses) and user group(s) for which the access rule should be applied.

If a user does not belong to any user groups, or his user groups do not have any related IP Access rules, he/she is not restricted by IP-addresses and can access TABS from any IP address.

NB. If a user has user groups which in turn have IP Access rules, he'll be able to use TABS only if his IP address is within the IP-addresses range of every rule. So if a user has 3 related Access rules, and one of these cannot be applied to his IP, the user won't be able to access TABS and a "User is not allowed to log in" error will be shown to him during login.

For information on managing users, user groups and access rules, refer to sections "4.4 Users", "4.3 User Groups" and "4.2 Access" respectively.

4. Setup/Configuration menu 4.1. Roles

Users having "Roles" entitlement can see the page in main menu and view the list of roles and related entitlements as well as number of users having the role and its create and modification dates.

Users having "Configure Security" entitlement can create new roles, edit existing ones and delete roles which are not assigned to any user.

4.2. Access

Users having "Access" entitlement can see the page in main menu and view the list of IP access rules.

Users having "Configure Security" entitlement can create new access rules, edit and delete existing ones.

4.3. User Groups

Users having "Access" entitlement can see the page in main menu and view the list of user groups and number of users assigned to every group.

Users having "Configure Security" entitlement can create new user groups, edit existing ones and delete user groups which are not assigned to any user.

4.4. Users

Users having "Users" entitlement can see the page in main menu and view the list of users with information about associated firm, roles and user groups. Internal users (having AllFirms entitlement) can see information about all users, while External users (having SingleFirm entitlement) are restricted only to information related to an associated firm.

Users having SetupUsersFirmsBrokers entitlement can create new users, edit existing ones and delete users which do not have any role assigned.

It's only possible to create a non-LDAP user manually. During user creation, unique user name, password and associated firm must be entered, all other fields are optional.

Password must fit the following criteria:

Length >=8 characters

Must contain 3 of the following 4 groups:

uppercase alpha lowercase alpha numbers symbols

When a non-LDAP user is being edited, and its password is not to be changed, it should be left blank. Otherwise, the new password has to comply with the criteria specified above.

A User create/edit page has an "Active Directory Refresh" button, which allows importation of users from LDAP into a TABS database. During the import, information related to existing TABS user (basing on username) is overwritten by LDAP data.

For LDAP users, it's only possible to edit information about the associated firm and assign roles/user groups.

4.5. Brokers

Users having "TargetBrokers" entitlement can see the page in main menu and view the list of brokers.

Users having "SetupUsersFirmsBrokers" entitlement can create new brokers, update descriptions for the existing ones and toggle their statuses (active/inactive). When a broker is set to inactive, all related target allocations are set to 0.

When a broker is created, its ID should be recognizable by both the Trading System and TABS, because it's being used for trade volume import and target allocations export (see the "6 Import/Export console tasks" section below).

4.6. Firms

Users having "Firms" entitlement can see the page in main menu. If a user has "AllFirms" entitlement, the list of all firms is shown to him, otherwise the user will see only an associated firm.

Users having "SetupUsersFirmsBrokers" entitlement can create new firms and update descriptions for the existing ones.

When a firm is created, its ID should be recognizable by both the Trading System and TABS, because it's being used for all imports and exports (see the "6 Import/Export console tasks" section below).

4.7. Broker-Firm Assignment

Users having "Broker-Firm" entitlement can see the page in main menu. If a user has "AllFirms" entitlement, the list of all assignments is shown to him/her; otherwise the user will see only assignments related to an associated firm.

Users having "SetupUsersFirmsBrokers" entitlement can create new (unique broker-firm assignments) and toggle their statuses (active/inactive). When a broker-firm assignment is set to inactive, the related target allocation value is set to 0.

The application contains a broker with ID=TRADING SYSTEM which cannot be assigned to any of the firms. The broker is used to import non-service bureau data to be shown on target allocations page (see the section "5 Target allocations page" below for details).

4.8. Audit Log

An Audit log page is available for users having "Configure Security" entitlement, the page allows to viewing information about what user has performed the following actions and when:

Logged In

Add Broker

Add Firm

Add User

Add Role

Add User Group

Add Access

Edit Broker

Edit Firm

Edit User

Edit Role

Edit User Group

Edit Access

Delete User

Delete Role

Delete User Group

Delete Access

Edit Broker-Firm Assignment

Broker-Firm Target Allocation Update

Add Broker-Firm Assignment

Inactive Broker

Inactive Broker-Firm Assignment

Assign User To Firm

Search Trade Volume

5. Target allocations page

A Target allocations page is intended for viewing and managing target broker volume percentage per firm.

The page is visible and accessible for users having TargetAllocation entitlement; only users with EditTargetAllocation entitlement can manage the allocations. Internal users should have "AllFirms" entitlement, he/she has a possibility to view/edit data for any company. External users should have a "SingleFirm" entitlement which will restrict them only to data for associated firm.

The page consists of 2 parts:

The first one shows a current target allocation percentage for brokers assigned to the firm, as well as information about Current Trade Day, Week-to-Date, Month-to-Date, Qtr-to-Date and Year-to-Date volume and percentage based on the actual volume.

Allocations are manageable only for active brokers and broker-firm relations (inactive brokers are shown in red).

In order to successfully update target allocations, they must total 100%, else the system won't allow to update the figures.

6. Import/Export console tasks

Importing and exporting of data is done by executing protected/data/impex.php from console.

Console tasks provide basic help on their usage:

$ php {path_to_impex.php}

Yii command runner (based on Yii v1.1.3)

Usage: php {path_to_impex.php}<command-name>[parameters . . . ]

The following commands are available:

export import

To see individual command help, use the following:

{path_to_impex.php} help <command-name>

Import/export processes write quite verbose logs (protected/logs/tabs_impex* files) which can be checked for errors occurred during the processes.

Importing is done within a single transaction, so if a file to be imported contains invalid record, the other records won't be applied as well.

6.1. Importing users

Users can be created/updated from a CSV file having the following columns (without a header row):

Date—will be used as user's create date

Username—login, required

Password—encoded password, required

Salt—salt used in password encoding logic, required

First Name

Last Name

Firm ID—ID of firm to be associated with the user, required

Email

The import will be aborted if any of the required columns are empty/invalid.

To import users from file /home/tabs/users.csv:

$ php {path_to_impex.php} import users /home/tabs/users.csv 6.2. Importing trade volume Records indicating trade volume processed by a broker for specific firm on specific day can be created/updated from a CSV file having the following columns (without a header row):

Date—date to which the trade volume applies

Broker ID

Firm ID

Volume

The import will be aborted if any of the columns is empty/invalid and/or if there's no specific broker-firm assignment (unless data for HOST TRADING SYSTEM broker is imported).

To import trade volume from file /home/tabs/trade-volume.csv:

$ php {path_to_impex.php} import trade-volume /home/tabs/trade-volume.csv 6.3. Exporting target allocations To export target allocations into file /home/tabs/allocations.csv:

$ php {path_to_impex.php} export allocations /home/tabs/allocations.csv

The CSV file will contain data about allocations for all firms for active brokers and active broker-firm assignments. The following columns will be present in the file:

Date—the date broker-firm assignment was created

Broker ID

Firm ID

Allocation, %

Tactical Algorithms:

In addition to the "Strategic" algorithms described above, the subject system also offers the user a selection of tactical algorithms. Direct access to these tactical algorithms are provided for the user who wants to use algorithms to automate order entry but does not want to turn over the selection and management of tactical algorithms to a strategic algorithm. As previously defined, a tactical algorithm is an algorithm concerned with placing and canceling orders according to a single set of pre-programmed instructions. Providing a selection of tactical algorithms allows the user to automate his trading while maintaining a higher degree of control over the placement and cancellation of orders. It is important to note that when the user employs tactical algorithms, he must both select the algorithms and set the parameters for the algorithm's operation. In addition, he must manually change these operating parameters to maintain his strategy as market conditions change. The subject system enables the user to set and alter these parameters through simple drag and drop motions, as will be described in more detail below.

However, while the use of these tactical algorithms does require greater involvement from the user, a trader can use these tactical algorithms to automate a complex trading strategy by initiating a plurality of tactical algorithms for the same stock. Here is an example: a user initially activates a single algorithm to buy 800,000 shares of EBAY up $30.55. However, let's say that after he initiated that algorithm, he realized that the stock was more volatile than he originally thought. Instead of canceling that first buy algorithm, he decides to layer a few more tactical algorithms to create a more nuanced strategy to match the volatility of the market. So in addition to the original buy algorithm, he adds another algorithm to buy aggressively when the price drops below $30.48, another to sell passively when the price moves up to $31.57, and another to sell aggressively if the price moves above $31.60.

Once the user has initiated all four of these tactical algorithms for EBAY, the subject system's "unified" setting ensures that the user can manage all these individual tactical algorithms as part of unified strategy. This unified setting treats every order from a user-initiated tactical algorithm associated with a given symbol as part of a larger aggregate order. For example, as soon as two or more algorithms are associated with a single symbol, the subject system automatically coordinates the activity of each of those algorithms against a single, aggregate position goal. That aggregate position goal is always established when the trader launches the first algorithm for that particular symbol—in this example the order to buy 800,000 shares of EBAY. This coordination is preferably enabled by keeping track of all open orders, the position goal, the achieved position, and limit the size of new orders to be placed on the market in such a way that the sum of the achieved position plus open orders never exceeds the initial, aggregate position goal.

In cases where both buy algorithms and sell algorithms are being used, the algorithms that are working in the opposite direction to the stated position goal are limited to place orders that will never in aggregate exceed the original aggregate position goal. For example, if the user's initial aggregate position goal is to buy 800,000 shares of EBAY, and the achieved position is 500,000 shares of EBAY, with 100,000 shares pending (potentially leading to a position of 600,000) at the time the additional three algorithms are initiated; then an algorithm seeking to place a new buy order will be limited to a maximum of 200,000 shares, and an algorithm seeking to sell will be limited to 500,000 shares.

Therefore as a result of this "unified" setting, the subject system automatically coordinates the order activity driven by all user-initiated tactical algorithms for a particular symbol such that those algorithms will only place orders that both follow their pre-programmed logic and keep the trader's position inline with that original position goal. This feature enables the trader to employ a plurality of algorithms with specialized tactics in a coherent strategy without having to micromanage his order position. In addition, the subject system provides the trader with multiple high-level visual cues (described in detail below) that allow him to track his progress relative to his aggregate position goal. As a result, the subject system is able simultaneously to pull the trader away from order level micro-management while enhancing his capabilities for higher level strategy management.

Deciding on an Algorithm

As previously noted, a user has the ability to choose between strategic and tactical algorithms when using the subject system to automate his trading strategy. Because the direct selection of tactical algorithms requires more thought and management by the trader, the subject system includes two tools to help the users who decide to select manually tactical algorithms rather than relying on the strategic algorithms to mange this selection for them. These two tools are the Execution Rate Scale and the Behavior Matrix, both of which are designed to help the trader understand how each tactical algorithm will interact with the market.

The Execution Rate Scale is a tool that provides users with a comparative measure of the expected rate of execution for each of the different tactical algorithms. The purpose of this scale is to help users understand how aggressive each tactical algorithm is on a relative basis by presenting a scale that indicates where each of the available tactical algorithms falls on a scale of aggressiveness-both relative to the other tactical algorithms and as compared to a percentage scale that represents expected rates of execution. The scale appears on the subject system's Dashboard whenever a user drags a symbol from a Watch List over one of the tactical algorithms, with the selected tactical algorithm highlighted in yellow to ensure the user knows which algorithm he is considering at the time.

For the purpose of this application, "Watch List" is defined as a representation 100 of a collection of symbols 102 the user is interested in monitoring (FIG. 58). The Watch List may also be connected to the user's Order Management System (OMS) in such a way that the symbol-representing cells within the Watch List are linked to information about the user's order(s) in that symbol. The example shown in FIG. 58 is a Watch List used in Pipeline Trading System's Graphic User Interface (GUI), but any other version of a "Watch List" as known or could be imagined by those skilled in the art can also be used in conjunction with the subject system.

When the user rolls over the symbol 102 in the Watch List that he wants to trade, that symbol is shown as an enlarged symbol 202, so as to make it clear to the user which symbol he is selecting (FIG. 59). Then if the user clicks on that enlarged symbol, the "Dashboard" 300 appears at the base of the Watch List (FIG. 60). For the purposes of this application, the "Dashboard" is the element of the subject system's user interface where the available algorithms are presented to the user. In the preferred embodiment the dashboard only appears when a user clicks on an enlarged symbol in the Watch List so as to limit the amount of terminal real estate occupied by the subject system's user interface. However in an alternate embodiment the dashboard is a permanent aspect of the subject system's user interface, visible whenever the subject system's user interface is open on a user's desktop or terminal.

In the example shown in FIG. 60, the dashboard 300 includes the following elements. The icons for algorithms include those for strategic algorithms (an adaptive algorithm 302, a pipeline algorithm 304, and an execution rate algorithm 306) and for tactical algorithms (a socialite algorithm 308, a reservist algorithm 310, a spray algorithm 312, and a sloth algorithm 314). The various algorithms are explained elsewhere in the present disclosure.

FIG. 61 shows what it looks like when a user has dragged a symbol (here EBAY) over one of four available tactical algorithms, the "Socialite" tactical algorithm, revealing both the Execution Rate Scale 402 (described above) and the Behavior Matrix 404. It is important to note that while FIG. 61 depicts an embodiment with four tactical algorithms (the "Socialite," "the Reservist", "the Spray," and "the Sloth,") limitless other embodiments with any number and variety of tactical algorithms, both proprietary to the subject system and provided by third party providers, can easily be imagined by those skilled in the art and should be understood as encompassed within the present invention.

The second tool for helping users select a tactical algorithm is The Behavior Matrix 404. The Behavior Matrix is an element of the subject system's user interface that gives the user information about the characteristic behaviors of the tactical algorithms available via the subject system. Examples of these behavior-defining characteristics might be whether the algorithm "posts" orders or "takes" orders, places "reserve" orders or maintains a visible "presence," or if it places orders on "ECNs" or on "DOT." Other examples could be whether an algorithm "kicks" or "punches," "ducks" or "blocks," "stands" or "runs."

It is important to note the terms used above are only examples of characteristic descriptors, and that any set terms can be used to describe behavior-defining factors, assuming they have meaning for the traders and serve to describe how the algorithms will behave in different market conditions. The purpose of the matrix, regardless of the terms used, is to give the trader information about how each algorithm will operate without requiring him to understand the specific, detailed logic that drives the algorithm's operation.

To access the Behavior Matrix, the user can either roll the mouse or drag a symbol from the watch list over one of the icons that represent a tactical algorithm (Again, see FIG. 61). When the user takes this action, that tactical algorithm's Behavior Matrix will appear behind the algorithm's icon. For example, in FIG. 61, the user has dragged the EBAY symbol over the "Socialite" icon, one of subject system's the tactical algorithms. By looking at which cells the "dots" of the Socialite's icon occupy in the matrix, the user knows which combination of factors characterize the behavior of that algorithm. Looking at the Socialite example, the user knows that that algorithm will "post" orders rather than "take" orders, place orders on both "ECNs" and "DOT" depending on the available liquidity, and that it will maintain a visible "presence" on the market rather than just placing "reserve" orders. If a dot falls inside a middle cell with a double arrow, (as it does in this example), it means the algorithm will display both of the characteristics within that row depending on the circumstances. It is important to note that the Behavior Matrix solves one of the most pressing problems in algorithmic trading: the need for traders to understand the general behaviors of a particular algorithm without having to know or understand the algorithm's underlying logic.

Drag and Drop Algorithm Selection and Initiation

Once a user has decided which algorithm he wants to use and is ready to initiate an algorithm, all he has to do is drag the symbol he wants to trade from his Watch List and drop it onto the icon on the dashboard that represents the algorithm he wants to use. To ensure the user is aware which algorithm he is selecting, the background of the selected algorithm is highlighted. If the user's Watch List is connected to his OMS in the preferred embodiment, this action of dropping the symbol on an algorithm representing icon automatically launches the algorithm. As a result, the subject system allows traders to initiate complex trading strategies with a single motion; here a "drag and drop," but other single motion techniques as can be imagined by one skilled in the art also apply. With a simple drag and drop on one of the three strategic algorithms, the user of the subject system is able to set in motion a complete trading strategy which automatically selects, initiates and then adjusts the algorithm or set of algorithms required to execute the user's order based on the user's order inputs, real-time analysis of market conditions, and reinforcement feedback on the algorithms' impact on the market.

Alternatively, if the user's OMS is not connected to his Watch List, or if it is connected but the user has deactivated the auto-launch feature; dragging the symbol over any of the algorithm-representing icons (except the Pipeline Algorithm) will reveal a "Fishbone" 502 at the base of the algorithm's icon or its behavior matrix 404 (FIG. 62). For the purposes of this application, the Fishbone is a dynamic, vertical price scale that represents the current bids and offers for the selected symbol. The trader can then drop the symbol at his limit on the price scale; thereby setting the algorithm's limit and initiating the algorithm. In the instances where the user's OMS is connected to the subject system but the user has disabled the auto-launch feature, the Fishbone allows the user to set a limit for the algorithm that is more passive than the limit contained in his OMS. However, as a price-protection precaution, the user cannot use the Fishbone to set a limit for an algorithm that is more aggressive than the limit contained in his OMS. To make the limit more aggressive, the user must make that change within the OMS itself.

While dragging and dropping a symbol anywhere on the icons that represent the Adaptive algorithm or any of the tactical algorithms will either initiate the algorithm (if watch list is connected to the OMS) or launch the fishbone (if the OMS is not connected to the watch list or if the OMS is connected but auto-launch feature is disabled); to initiate the Execution Rate algorithm or to launch its Fishbone, the user must drag and drop the symbol onto the specific execution rate that he wants to set for the algorithm (FIG. 63). In addition, dragging and dropping a symbol onto the Pipeline Algorithm in the instances where the watch list is not connected to the OMS or it is but the auto-launch feature is disabled will not launch a Fishbone. Instead it will launch an order entry box 700 where the user can set all of the parameters that relate to the timing, frequency and circumstances (as detailed above) for when a block order should be placed or canceled on Pipeline (FIG. 64).

In the cases where the watch list if not connected to the user's OMS or it is connected but the user has disabled the auto-launch feature, the user can initiate an algorithm by hitting the buy (or sell) button inside the Fishbone or the order entry box for the algorithm he has selected.

The Provision of Real-Time Feedback Regarding Algorithm Operation and Order Execution Once an algorithm is initiated, either automatically or by the user, a "Positions" window 800 replaces the dashboard and fishbone at the base of the Watch List (FIG. 65). For the purpose of this application, the "Positions" window is defined as the aspect of the subject system that provides users with real-time feedback regarding the algorithms' order activity, the execution tactics being used by the active algorithms, and the effectiveness/impact of these tactics.

In the first column within the Positions window, users are given a button 802 that they can use to cancel all of the orders that have been placed by the algorithms working on that order. Looking at the remaining columns in the Positions window from left to right, the user can see: the side of the order being worked by the algorithm (804), the symbol being worked by the algorithm (806), a list of trade details for executed orders (808—revealed when the user clicks on the binocular icon, more detail below), how much of the order has been completed vs. how much of the order remains unfilled (810), the average price across all executed orders in that symbol (812), the algorithm or set of algorithms being used to work a particular symbol along with its average execution rate (814), and feedback regarding the tactics in use and whether or not these tactics are successful or need updating (816).

This Positions window is unique in the world of algorithmic trading products in that it providers users with the "Details," "Overall Progress," "Routes", and "Strategy Progress" columns to give the user information about which algorithms are working a particular symbol, the shares those algorithms have filled, the tactics being used by the active algorithm or algorithms, the impact of these tactics on the market, and the effectiveness of these active algorithms; rather than expecting users to trust what an algorithm is doing without giving them any specific information about what it is actually doing. In addition, the Position window also provides the user with quick and easy access to a range of functionality for managing active algorithms.

In the column labeled "Overall Progress," the subject system uses dynamic bars in different colors to provide a real-time representation of how much of the user's order has been completed and how much of the order remains unfilled. In FIG. 65, in the overall progress monitor 810, the blue bar 818 represents the portion of the order that has already been filled by the algorithm, the orange bar 820 represents the portion of the order that is active, but has yet to be filled, and the red bar 822 represents the portion of the order that is unfilled and inactive. While blue, orange and red coloring is used in this example, any other colors or patterns could be used for the same effect.

In addition, each of the colored bars 818, 820, 822 contains an inequality that gives an approximation of the number of shares represented by that bar. As shown, there are a ">5 mm" on the blue bar, ">2 mm" on the orange bar, and ">3 mm" on the red bar; meaning that on the EBAY order represented in this line of the Positions window in FIG. 65, more than five million shares have been filled, more than two million are unfilled and active, and more than three million shares are unfilled and inactive.

In addition to seeing the approximate values for shares filled, active unfilled and inactive unfilled on a particular order; the user can also use the Overall Progress column 810 to see the exact number of shares and the percentage of the total order represented by each of these three categories. When the user scrolls over and pauses on any area of the Overall Progress column 810, an information box 900 appears (FIG. 66) with the following information: the exact number of shares that the algorithm has filled versus the total number of shares in the order, the exact number of shares that are active, unfilled versus the total number of shares in the order, the exact number of shares that are inactive, unfilled versus the total number of shares in the order, the percentage for each of these categories, the average price across all of the filled shares and whether or not there is a "Market Participation Warning" 902.

A Market Participation warning 902 is an indication that the subject system uses to let the trader know that the number of unfilled shares on the order is greater than the subject system's projected remaining volume in the market for that symbol for the remainder of the trading day. To calculate whether or not it needs to issue the warning, the subject system calculates the number of shares it expects would be executed over a time period extending from the current time to the close of the market. To this end, it multiplies the expected execution rate as previously defined herein, by the historical average volume traded during the time period in days past, taking the average over the last 60 trading days. The Market Participation Warning is issued if the number of unfilled shares is less than the number of shares it expects to execute. In addition to inserting the Market Participation Warning at the base of the information box, the red bar that represents the unfilled, inactive portion of the order in the Overall Progress column also flashes red where there is a Market Participation Warning.

Taken together, the elements contained within the Overall Progress column offer the user a fast yet detailed perspective on the status of his order. However, if the user wants even more detailed information about his executed orders, he can click on the icon located in the "Details" column of the Positions window 808. Clicking on this icon launches a "Trade Details" information box 1000 (FIG. 67). The purpose of this information box is to give the user specific information on each order executed by the algorithm. For each executed order, the Trade Details information box gives the user the "Strategy" that executed the order (in FIG. 67 this is the Adaptive algorithm), the time the order was executed, the number of shares in the order, the average price of the order, and the name of the specific tactical algorithm that executed the order.

In some instances, e.g., when a user has initiated a tactical algorithm, the "Strategy" information and the "Algorithm" information will be the same since as a "strategy" a tactical algorithm only follows one set of behaviors. However in the instances when the user initiates a strategic algorithm, the strategy and algorithm information will be different. For example, if the user initiates the Adaptive algorithm, the Strategy column will reflect that it is the Adaptive algorithm at work, while the "Algorithm" column will reflect which of the specific tactical algorithms the Adaptive algorithm used to complete that segment of the larger order. In the example of FIG. 66, the Adaptive Algorithm used the "Reservist" tactical algorithm to execute the first portion of the order, while it used the "Socialite" tactical algorithm to execute the second and third portions of the order. Providing this level of information regarding a strategic algorithm's logic and execution is a revolutionary development in the world of algorithmic trading products—for the first time, the user is being informed about the specific tactics the algorithm is using to complete the order, not simply expected to trust a "black box."

For even more specific information about the tactics being used by the algorithm, the user can turn to the Behavior Matrix included in the "Strategy Progress" column 816 on the Positions window. While the Behavior Matrix is used in the Dashboard to allow the user to review the characteristic behaviors of the tactical algorithms before they are active, when it is used in the Strategy Progress column, it allows the user to see the characteristic behaviors of the algorithms after they have been initiated. As previously noted, examples of the behavior-defining characteristics that can be used in the matrix are whether the algorithm "posts" orders or "takes" orders, places "reserve" orders or maintains a visible "presence," or if it places orders on "ECNs" or on "DOT."

In the "Strategy Progress" area 816, each of these characteristics is represented by a cell labeled with the name of the characteristic. FIG. 65 shows a Post call 824, a Take call 826, a Reserve call 828, a Pres cell 830, an ECN cell 832, and a DOT cell 834. As a particular tactical algorithm works an order, the cells that define the tactics of that algorithm are highlighted, letting the user know what kinds of tactics the algorithm is using at a given moment in time. If, for example, the user has employed the "Adaptive Algorithm" as described above, and the automated selection function determines that the level of market impact caused by an active algorithm is too high; then the system notifies the user of the algorithm's (or tactic's) failure to meet the order requirements and its pending cancellation by outlining in red the cell(s) in the Behavior Matrix that represent the failing tactic/algorithm. When the subject system cancels that algorithm or that tactic, the same characteristics that were outlined in red are highlighted with red backgrounds. Then once the subject system has selected and initiated a new algorithm or a tactic better suited to the new market conditions/dynamics, the characteristics of that newly initiated algorithm/tactic are highlighted in green.

By using the black background highlights in conjunction with the red and green color signals, the user knows which tactics are being used to complete his order, as well as which tactics are successful or need updating. Plus, the user is given valuable information regarding market color (feedback on how the market is performing in real time) each time he see that the subject system has made a change in tactics/algorithms—he knows there has been a change in the market or a market event significant enough to warrant an entirely new tactic. In addition, the user can enable a feature which uses the strategy progress area to display which tactical algorithm is active, when there is a change in tactics, and the reason for that change. For example the user might see a message stating, "Transition to Sloth due to sensitivity to postings on ECNs."

Figure 68A:
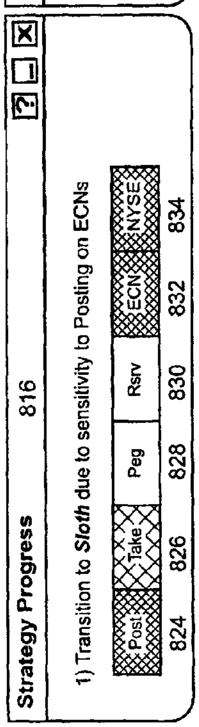
Figure 68B:
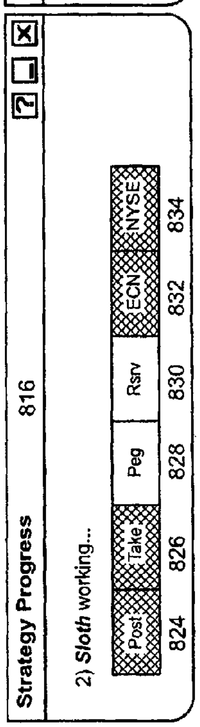
Figure 68C:
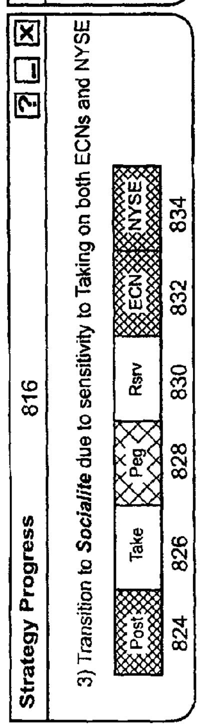
Figure 68D:
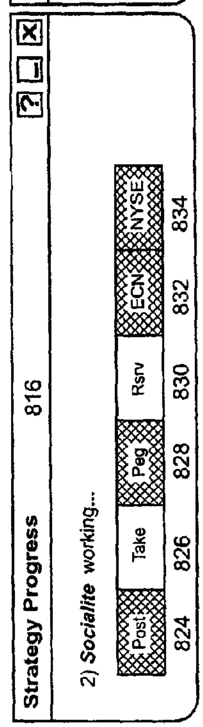
Figure 68E:
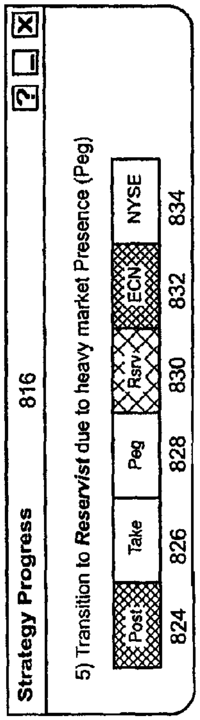
Figure 68F:
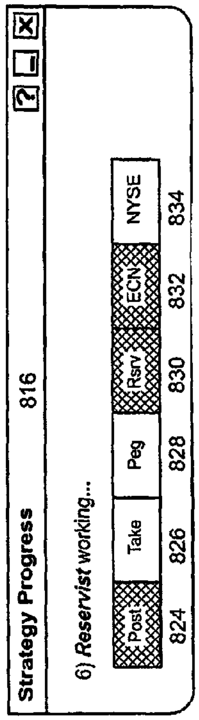
Figure 68G:
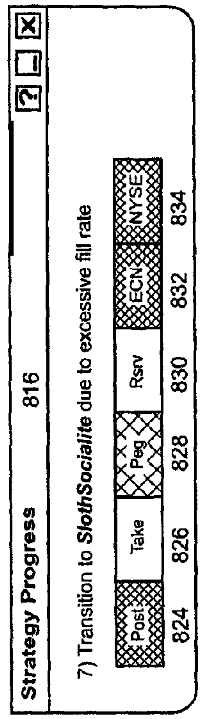
Figure 68H:
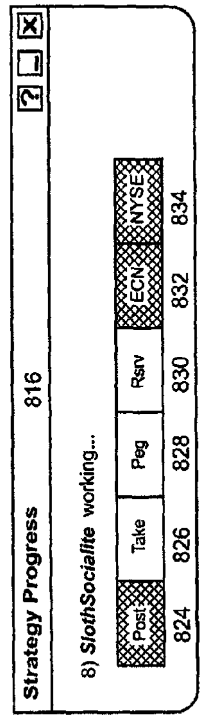

FIGS. 68A-68H give a series of examples as to what a user might see while the Adaptive algorithm was working his order. FIG. 68A shows a transition to Sloth due to sensitivity to posting on ECNs. FIG. 68B shows Sloth working. FIG. 68C shows a transition to Socialite due to sensitivity to taking on both ECNs and NYSE. FIG. 68D shows Socialite working. FIG. 68E shows a transition to Reservist due to heavy market presence. FIG. 68F shows Reservist working. FIG. 68G shows a transition to SlothSocialite due to excessive fill rate. FIG. 68H shows SlothSocialite working.

In addition to these fairly simplistic measures of effectiveness provided by the red and green signaling mechanism and the pop-up messaging system, the Strategy Progress column can also expand to provide the user with access to a range of more complicated, continuous measures of effectiveness. While the red/green signaling lets the user know if an individual tactic or algorithm is working; these more complex measures of effectiveness serve to provide the user with a real-time assessment of the overall success/failure of the strategy as a whole. For example, the Strategy Progress column could also include a graphical element that displays a particular algorithm's participation rate in the market since initiation. Or, it could include a ratio between the achieved participation rate and the expected participation rate. An even more sophisticated example would be the absolute value of the logarithm of the ratio of achieved participation rate to expected participation rate, which would provide a measure of the relative difference between actual and expected rates—a good indication of how well the strategy is meeting the user's intended goal. In addition, other continuous measures of effectiveness can easily be imagined, including any number of the benchmarks known to those skilled in the art.

However an important point is that the subject system allows traders to employ complex algorithms to automate their trading and gives them insight into how the algorithms work and how well they are performing when active. Other systems fail to anticipate either automatic tactic switching or the provision of market color feedback. In addition, other systems known in the art fail to anticipate providing guidance on the expected rate of execution or expected market impact in order to help a trader decide which algorithm to use given the current state of the market.

FIG. 69 has been provided to give a specific example of a Positions Window 800' for a user with orders in multiple stocks. FIG. 69 also offers a good example of what the Strategy Progress area looks like when the Adaptive Algorithm is executing orders and making tactical adjustments across many symbols. Looking specifically at FIG. 69, as the Adaptive Algorithm works the user's order in VLO, it has selected aggressive tactical algorithms that are "taking" rather than "posting" orders. In addition these aggressive tactical algorithms had been placing orders on both ECNs and DOT, but the Adaptive Algorithm determined that the tactic of placing orders on DOT was failing, so that tactical was cancelled, as indicated by the red background in the cell labeled DOT.

In the next order, an Adaptive Algorithm working the user's order in CALL initiated a passive tactical algorithm that is "posting" rather than taking orders, and is only maintaining orders as "reserves" rather than maintaining a visible "presence" on the market. This tactical algorithm has also been using both ECNs and DOT when it places orders, but the red outline around the DOT cell indicates that the Adaptive Algorithm is about to adjust tactics and stop placing orders on DOT. In addition, this Strategy Progress window indicates the algorithm responsible for "posting" "reserve" orders in CALL has been recently initiated because the backgrounds of these cells are green.

By simply looking at the Strategy Progress Window, the user has access to a lot of information about both the algorithms working his order and the effectiveness of their tactics. In addition, the user can gain valuable information about market color and changing market dynamics by watching and considering which tactics are failing and which are succeeding in light of market impact tolerance. As a result, users can look to the subject system as both a sophisticated automated trading system and an indicator of changing market dynamics.

It is also important to note that if the user has initiated multiple algorithms for a specific symbol, all of the active algorithms will be represented by their icons in the "Routes" column 814 as in FIG. 70. To see the specific information offered by the other columns about each algorithm, all the user has to do is click on the icon in the "Routes" column that represents the algorithm he wants to see. Once he has clicked on that icon, the information provided in each of the other columns will reflect the information about that particular algorithm.

Providing User Easy Access to Tools for Algorithm and Order Management.

A final aspect of the Strategy Progress area is the ability to use this section of the Positions Window to manage the algorithm working that particular order. Scrolling over any of the cells in the Strategy Progress area reveals a tool bar for managing the active algorithm(s) related to that order (FIG. 71). This tool bar gives users access to a range of functionality with the click of the mouse: it allows users to pause (1402) any algorithms working the order, cancel (1404) any algorithms working the order, re-start (1406) any algorithms that have been paused, launch (1408) the Trade Details Information Box for that order, open (1410) a Fishbone for the active algorithm, or force an "Auto-entry" (1412). In addition, in the embodiment designed for the Pipeline alternative trading system, the tool bar also contains a button 1502 that allows the user to accept a passive counter offer at the NBBO (FIG. 72).

An auto-entry is when the user forces the active algorithm to enter its next pending order immediately, overriding any order-entry delays required by the algorithm's logic. This feature is useful in the instances when a trader knows there is size that he wants to take and does not wait to wait for the algorithm's logic to determine that the time is right to enter the order. It also ensures that even if a trader employs a passive algorithm, or an algorithm with a low participation rate that he still has the ability to enter orders aggressively if circumstances require him to do so.

Opening a Fishbone for an active algorithm gives the user the ability to see filled and pending orders, cancel pending orders, or adjust the algorithm's limit price. As soon as a user initiates an algorithm, either through the auto-launch or by manually dropping a symbol onto a Fishbone in the Dashboard, that algorithm is represented visually on the Fishbone with a color-specific vertical column that extends up or down along the vertical price scale (depending if it is buying or selling) to the algorithm's limit price. In the example in FIG. 73, an order in EBAY is being worked by the Adaptive algorithm with a limit to buy up to twenty cents. To help the user track which algorithm is represented on the fishbone 1602, the color of the vertical column 1604 matches the color of the algorithm's icon on the Dashboard. Again, looking at the example in FIG. 73, the color of the vertical algorithm representing column is green to match the background of the Adaptive Algorithm's icon. If there is more than one algorithm working on a symbol, these vertical columns are placed next to each other along the top (or bottom) of the price scale such that the columns do not overlap or obscure each other. These algorithm-representing columns are also interactive tools that can be used to manage the algorithms. To change the limit of an algorithm, all the user needs to do is catch the bottom (or top) of the bar and pull (or push) the bar to the new limit. Alternatively, the user can alter the algorithm's operating parameters by double-clicking on any of the algorithm representing bars. Double-clicking on a bar will display a box 1702 (FIGS. 74A and 74B) which contains information about all of the parameters that the user can set/alter for that particular algorithm. The two examples in FIGS. 74A and 74B illustrate the boxes 1702 displayed to a user when he double clicks on a column representing the adaptive algorithm (the first image) or the Execution Rate algorithm (second image).

Once an algorithm is active, the Fishbone also displays the orders that each of the algorithms have placed and executed. When an algorithm places an order, a small block 1802 appears on the price scale next to the price point of the order (FIG. 75). Therefore a block represents a collection of pending (active, unfilled) shares at single price point. Users can manually cancel any pending order by double clicking on a pending-order block. Then, once an order or part of an order has been filled, the block or blocks that represented those shares when they were pending orders disappears, and a horizontal bar representing the filled shares appears (FIG. 75).

In addition to the features already noted, the Fishbone also includes an indication of the bid/ask spread and a representation of the effective Depth of Book. Small grey arrows (1606, 1608 in FIG. 73) appear on the price scale next to the price points that represent the bid and ask, while the Effective Depth of Book is represented as a gray line (1902 in FIG. 76) indicating the amount of size likely to be available at each price point at and above the current best offer and at and below the best bid. The effective depth can be defined as the displayed quote sizes aggregated over multiple market destinations, as is known in the art. However, this representation of book depth fails to capture hidden liquidity (reserve orders) or latent liquidity (orders that have not yet been placed on the market). For a long time the trading community has expressed the need for a depth of book indicator that incorporates an estimate of reserve and latent liquidity along with the aggregated displayed liquidity. The subject system preferably attends to this need by calculating the amount of liquidity that would be needed to push the price of the stock through various price points. More specifically, the number of shares that would trade at a $20.01 offer before the price moved up to $20.02 would be the “effective offer size” at $20.01. While this amount may be considerably larger than the displayed liquidity, it could also be smaller that the displayed amount if it turns out that the displayed size was only a fleeting quote. In order to calculate an effective offer size at a given offer price, the subject system looks back at price and quote changes to find most recent time in the past when this same offer price was the best offer and the best offer was completely filled leading subsequently to a new higher best offered price. It then calculates the total number of shares that traded while the original offer price was available, counting shares printed at any price but only during the period of time during which the offer was available. This total number of shares is the effective offer size; it represents the total number of shares required to push a security's price through that offered price level. Similarly for the effective bid, the subject system identifies the most recent time that this bid was completely consumed and counts the number of shares that traded before the bid was dropped. If there is no prior example in the same day of pushing through the given bid or offer, the subject system assumes the effective bid (offer) size is the average effective bid (offer) size over all other price points for which there are prior examples. A more elaborate model for calculating the effective liquidity at each price point is given in Appendix A1. Other algorithms for inferring the likely number of shares that can be executed before pushing the price through a given bid or offer price level will be understood by those skilled in the art to be within the scope of the claimed invention.

To calculate “effective quote size,” as defined above the subject system employs an algorithm that is connected to a real time feed of market prints which includes information about every trade, including the trade price and the size of the trade as reported to the tape. Prints are aggregated into buckets, each bucket will be later labeled as a “buy bucket” (next price move is up) or a “sell bucket” (next price move is down). Each bucket has a low price and a high price. The first two prices traded are the low and high of the first bucket. While a bucket is open, add all shares printed to the total share count for that bucket. The first print above the bucket high price (or below the bucket low price) closes the bucket; the high (low) price is the “effective offer price” (effective bid price) and the total quantity in the bucket is the effective offer quantity (effective bid quantity). In addition, a pair of in-memory vectors keeps the most recent value of the effective bid size and effective offer size at each price point.

To close a Fishbone launched from the “Strategy Progress Toolbar,” the user can click on the “x” (1610, FIG. 73) in the upper right hand corner of the window. Finally, if the Strategy progress tool bar is not used and the user moves his cursor away from the Strategy Progress area, the tool bar disappears until the user scrolls over the area again. This “disappearing tool bar” is a useful feature within the Strategy Progress area as it gives the user immediate access to a wide range of functionality without requiring use of permanent desktop real estate.

Provision of Real Time Benchmark Monitoring

In addition to providing real time feedback regarding the operations of the active algorithms and order executions, the subject system also provides the user with real time benchmark monitoring. This real time benchmark monitoring is provided via a dynamic dial that can be displayed directly below the fishbone in the strategy progress area by clicking on the “Display Benchmark Monitor” button (2000, FIG. 77) if the user has elected to turn this feature “on.” While active, the purpose of the dial is to provide the trader with visually-enhanced, real-time feedback regarding the performance of his trading strategy and the performance of the market relative to a particular benchmark through real-time alterations in spatial orientation, shape, size, color, shade, and texture within the dial and its surrounding area. It is also important to note that the user can customize the benchmarks he uses to monitor his trading, and some examples include but are not limited to: market price, market average price, P&L, volume-weighted average price, time-weighted average price, closing price, opening price, or one standard deviation of short term volatility.

FIG. 78 depicts the benchmark dial 2100 in its “inactive” state before an algorithm or algorithms have begun to place orders to work an order. Then once an algorithm begins to work a user's order, the dynamic benchmark monitor moves from this “inactive” state to an “active” state (FIG. 79). For illustrative purposes the following description of the operation of the dial will use VWAP (volume weighted average price) as the benchmark, but as previously indicated this is just one possible benchmark a trader could use and is in no way intended to limit the scope or application of the subject system.

Looking at the active dial in FIG. 79, there are three numbers at the top of the dial, “+4” “8” and “−4.” The number closest to the fishbone, here a “+4” represents a measure 2202 of the trader's executions against the benchmark he has chosen for the dial. Because this example uses VWAP as the benchmark, in this case the number represents how much the trader is beating or missing VWAP on an average price per share basis over some predetermined period of time. In this particular example, the trader is beating VWAP by four cents per share, and the fact that he is beating, rather than missing VWAP is communicated by both the green color of the font as well as the “+” sign in front of the number four.

The number closest to the dial, here a “−4” represents a measure 2204 of the market's current performance relative to the same benchmark. Again, because this example is using VWAP, this means that at this point in time the market is missing VWAP by four cents a share, and the fact that this is a loss is reflected in both the “-” sign in front of the number and the red color of the font.

And finally, the third (middle) number represents the spread 2206 between the other two numbers, and serves as a relative indicator for the user of how his position compares to the market's current position. Again, because this example is using VWAP as the benchmark, this number represents how much money the trader is making on a per share basis relative to where the market is currently trading. Here the number is a positive eight, indicating that at the moment, the trader is making eight cents per share.

Because these numbers represent calculations that use the trader's average price and the market's current price, they are dynamic metrics that change along with movements in the market's position and the trader's aggregate position. In addition, the information communicated by these numbers is also displayed graphically inside of the monitor. First, as the metrics fluctuate, the bars that run through the center of the dial rotate about the central axis. By looking at the rotation of each bar relative to its horizontal or “0” position in the inactive state, the trader can quickly assess both how the market is currently performing relative to the benchmark and how the his algorithms are performing relative to the benchmark. To assess the market relative to the benchmark, the user can look at the displacement of the red bar 2302 from the “0” position 2304 and the size and color of the pie-shaped area 2306 at the center of the dial. In FIG. 80, this area is labeled, and with a quick glance it is evident that the market is missing VWAP by a significant margin, indicated by both the size of the pie shaped wedge and the red shading inside that wedge.

Then to assess his position relative to the benchmark, the trader can look at the displacement of the blue bar 2308 from the "0" position 2304 and the size and color of the trapezoid shaped area 2310 along the outer edge of the dial. This area is also labeled on FIG. 80. With a quick glance at this area, it is also easy to see that the trader is beating VWAP by a significant margin, indicated by both the size of the trapezoidal area and the green shading within that area. As the difference between the market or the trader's position and the benchmark increases, both the size of the area and the severity of the shading within the area increase. Likewise, as the difference between the market or the trader's position and the benchmark decreases, both the size of the area and the severity of the shading within the area decrease.

Finally, the trader can also get a quick visual indication of how well he is doing relative to the market by looking at the size and color of the band 2312 formed along the perimeter of the dial in between the red market representing and the blue trader representing bars. Both the size and color of this band help communicate to the trader if he is making or losing money relative to the market, as well as the degree of this gain or loss.

In addition to FIG. 80, FIGS. 81A-81F are included to help illustrate the dynamic nature of the benchmark dial and demonstrate how the benchmark dial would look over time as changes occurred in both the market and the trader's position.

Figure 81A:
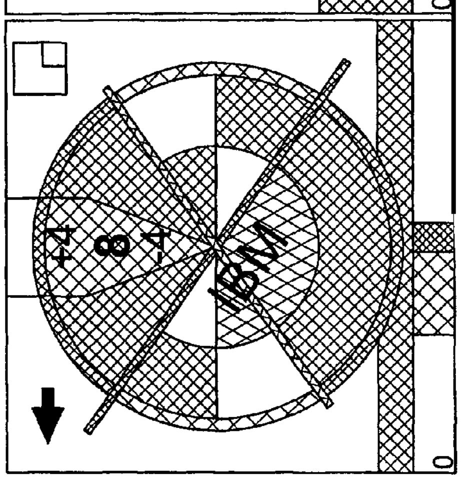

In FIG. 81A, the trader is beating VWAP by 4 cents, the market is missing VWAP by 4 cents, and, as a result, the trader is making 8 cents per share.

Figure 81B:
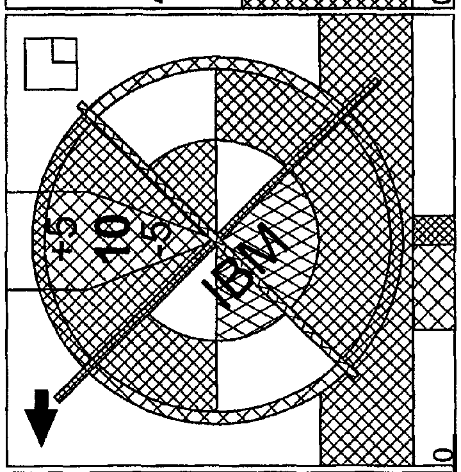

In FIG. 81B, the market has moved further in the trader's favor. Now the trader is beating VWAP by 5 cents, the market is missing VWAP by 5 cents, and the trader is making 10 cents per share. The market-representing wedge and the trader-representing trapezoid are larger, and the red and green shadings are darker.

Figure 81C:
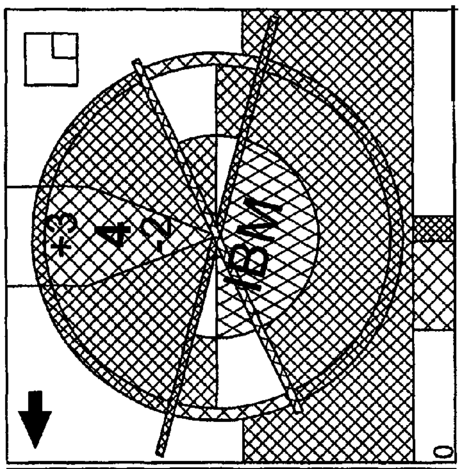

In FIG. 81C, the market has turned. Now the trader is beating VWAP by only 3 cents, the market is missing VWAP by 2 cents, and the trader is only making 4 cents per share. Also, the sizes and color depths in the shaded areas have changed.

Figure 81D:
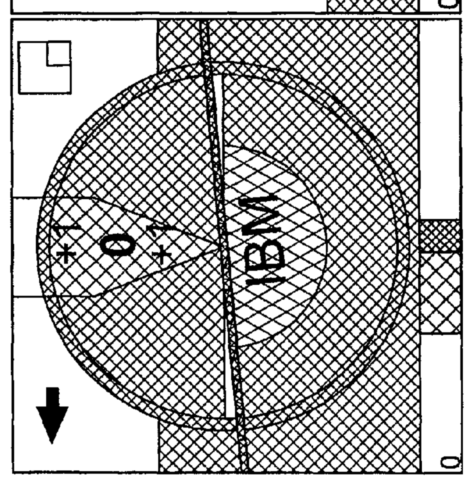

In FIG. 81D, with continued movement, the trader and the market are now even, both beating VWAP by one cent. As a result, the trader is now even with the market.

Figure 81E:
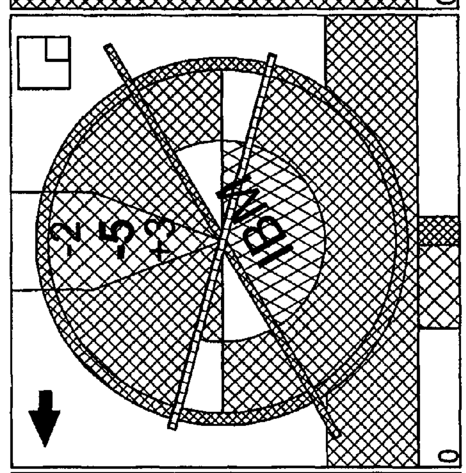

In FIG. 81E, as the market continues to move, the trader is now missing VWAP by 2 cents, while the market is beating VWAP by 3 cents. As a result, the trader is now losing 5 cents a share.

Figure 81F:
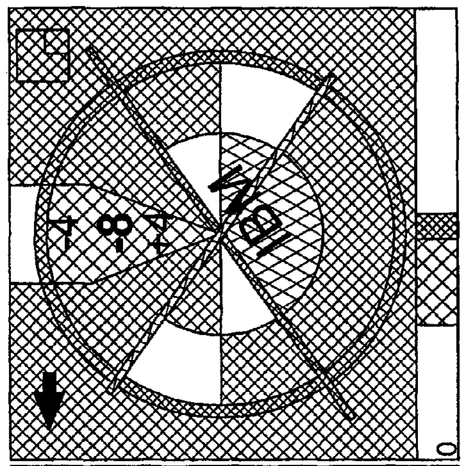

In FIG. 81F, in a total reversal of fortune, the market has moved such that the trader is in the very opposite position from where he started. He is missing VWAP by four cents, the market is beating VWAP by 4 cents, and the trader is losing 8 cents per share.

In certain embodiments, the color of the background behind the benchmark dial also changes in color and depth of color to reflect the trader's positive or negative deviation from the benchmark. In these embodiments the specific color and shade matches that of the trapezoidal area formed on the outer edge of the dial by the displacement of the blue bar from the "0" position and simply serves as a visual reinforcement of whether or not the trader's selected strategy is succeeding (a green background) or is failing and in need of an update (a red background.)

Together, all of these elements give a user real-time numeric and visual feedback regarding the status of his position relative to a benchmark and the market. In addition, the benchmark also gives the trader a visual depiction of how close he is to meeting his aggregate position goal in a particular symbol at any given point in time. To display this information, the background area "behind" the monitor's dial "fills up" or "drops down" as the trader's overall position in a symbol moves closer or father from meeting the initial aggregate position goal. It is important to note that this indicator is based on the assumption the base of the monitor's background area represents the "zero" position where the trader has made no progress towards meeting his aggregate position goal, while the top of the dial's background area represents the 100% mark where the trader has complete that goal. FIGS. 81A-F demonstrate this feature, as the gray-colored background area behind the dial is higher in each successive imagine as the trader's aggregate goal is gradually met over the course of these six images until it is totally filled in the final image, FIG. 81F.

In addition to the real-time trading performance feedback, the monitor also provides traders with a graphic that indicates the liquidity ratio between the number of shares available to buy (green) and the number of shares available to sell (red) at the NBBO. A green area represented to the left of a mid-line is as wide as the available shares on the bid (with each millimeter in width representing 100 shares); a red area to the right represents the shares available on the offer. This graphic can also be seen at the base of each of the "active" dial images in FIGS. 81A-F. The purpose of the liquidity ratio is twofold: to give the trader a sense of the balance (or imbalance as the case may be) in the available shares on the bid and the offer, and by extension to give him a sense of the volatility of the stock. If there is an even (or close to even) number of shares on the bid and the offer, then it is reasonable for the trader to assume that it is a fairly stable stock that will be hard pressed to move in either direction. On the other hand, if there is a distinct imbalance, it lets the trader know that the stock has the potential to be volatile and serves as a warning to plan accordingly.

Alternate embodiments also include a measure of "price inertia" for the symbol. The price inertia, as defined by the inventors, is the number of shares required to move the stock one cent, and the purpose of this indicator is to supplement the liquidity ratio by giving the trader a more specific understanding of the overall volatility of the stock he is trading. To calculate the price inertia, the subject system tracks the cumulative number of shares that print to the tape as long as the best bid and best offer have not both changed. When both changed this number of shares is recorded as the last available measure of instant effective liquidity at this point, and the cumulative share counter is reset. The price inertia is the trailing average of the five most recent effective liquidity values, signed by the direction of the aggregate price change over these five periods (positive if the price has risen and negative if it has fallen). Other measures of price inertia can easily be imagined to those skilled in the art.

Providing users with market contexts for symbols traded

While the purpose of the dynamic benchmark monitor is to give the trader real-time feedback as to the success of his algorithmic trading strategy, the flip side of the dial provides the user with a customized view of market data that gives the user a unique perspective on how a particular stock fits into the larger context of the market. In the subject system, this customized view of market data is called a "market context," and it is specifically designed to give the user a perspective on a stock's position and movement in the market relative to other stocks that meet certain parameters. These parameters can be customized by the user, and include but are not limited to: market sector, correlation, market cap, affinity, blotter, trading style and basket. More detailed descriptions of these parameters are provided below.

To access this "market context," in FIG. 82A, a user simply clicks on the "rotate" arrow 2502 at the top of the benchmark monitor. When he does this, he will flip the benchmark monitor over and reveal a "market context" 2504, or a group of cells oriented around a central, enlarged cell (FIG. 82B). In the illustration in FIG. 83 this central, enlarged cell 2602 is IBM. Each of the cells 2604 included in the market context represents a particular stock, indicated by the symbol name inside the cell. The central cell, also called the reference cell or the reference symbol, represents the stock being traded on the associated fishbone and benchmark monitor, again in this example IBM. The specific group of symbols displayed on a particular context is based on the parameters selected by the user, while the particular arrangement of those cells relative to the reference cell represents the degree of parameter correlation between each cell and the reference cell. In the preferred embodiment, the subject system uses visual cues to transmit information in a way consistent with "self organizing map technology" as known to those skilled in the art.

The user can return to the view of FIG. 82A by clicking on the arrow 2506. There is also a green and red liquidity ratio 2606 at the base of each cell in the market context. The market context includes either the NBBO or in the embodiment for Pipeline Trading Systems, as displayed in FIG. 83 as 2608, the Block Price Range. Clicking the "change parameter" arrow 2610 allows the user to scroll through the various context parameters that are available.

The number of stocks the subject system displays in any given market context can be customized by the user and the map will auto-resize to accommodate the number of stocks the user chooses to include. If at any point a user decides that he wants to add a stock that is not included in a context, all he needs to do is drag and drop that symbol from the watch list onto the market context. When the symbol is dropped onto the context, it automatically "snaps" into the appropriate place relative to the other symbols.

In addition to showing the relationships between the reference symbol and the other symbols, every market context also provides the user with specific information about each symbol included in the context. More specifically, every market context displays the National Best Bid and Offer (NBBO) for each symbol included in the context or in the version of the subject system specifically designed for Pipeline Trading Systems (as in FIG. 83), the Block Price Range replaces the NBBO. Each context also includes a "liquidity ratio" for every symbol. This ratio looks and operates in the same manner as the liquidity ratio at the base of the benchmark dial and is represented graphically at the base of each cell in the market context. As on the benchmark monitor side, the purpose of the liquidity ratio is to give the user a rough indication of how many shares are available on the bid and on the offer at the current NBBO, and serves as a high level indication of volatility of the stock. In an alternate embodiment, the market context also displays directionality of each stocks price movement through the color of each symbol's font. If the average movement of a stock's price over a user-specified period is upward, the symbol's font is blue. On the other hand, if the average movement of a stock's price over that period is downward, the symbol's font is orange.

Finally, in the version of the subject system adapted for Pipeline Trading Systems, the market maps also convey information from Pipeline's proprietary watch list, called the Pipeline Block Board. Looking at a market context like the example in FIG. 83, the user can tell for each symbol whether or not the stock is currently active on the Pipeline Block Board (the symbol's cell has an orange background), if it is currently inactive but was active earlier in the day (the symbol's cell has a grey background), or if it is inactive now and has been inactive all day (the symbol's cell has a white background). In addition, the context indicates if Pipeline has printed a block in a particular stock by giving those cells a three dimensional appearance.

Individually, each of these indicators presents a very high level of information. However, when these indicators are presented in concert, across multiple stocks organized by relational parameters, they provide the trader with a valuable snapshot of the market's position and its relative movement.

As noted above, the user can choose from a range of parameters when customizing a market context. These parameters include, but are not limited to: market sector, correlation, market cap, affinity, blotter, trading style and baskets. The concepts behind the market sector, correlation, and market cap parameters will be obvious to those skilled in the art; however for the sake of clarity we will provide more detailed explanations for the affinity, blotter, and trading style parameters. The basket parameter is described in a separate section as it enables functionality that is distinctly different from the functionality of the other parameters.

The "affinity" parameter refers to grouping securities based on clustering in a multi-factor model. For example, a set of stocks representing companies with divergent business models, but which are subject to the same systemic economic risks (i.e. interest-rate movements, energy prices, etc.)

The "blotter" parameter simply creates a context that includes all of the symbols in a user's blotter. This map offers the user a quick way to get a high level perspective on the movement and position of all of the stocks in his blotter, or to build a basket with symbols from his blotter (as described below).

The "trading style" parameter is a concept specific to the subject system. This parameter displays the set of stocks that "behave" in a similar manner to the reference stock when traded by the same algorithm or algorithms. The subject system's historic, collective information about how a stock reacts when it is traded by one of the subject system's algorithms is used to inform this parameter. In addition, when a user selects this context, right clicking inside the context displays a ranked list of the subject system's algorithms according to their success in trading that set of stocks. This context is a particularly innovative feature as it simultaneously gives the trader a group of stocks that share common trading characteristics and tells him the best algorithms to use on those stocks. It is important to note that any combination of parameters can be used in a single market context. When more than one parameter is used, the subject system simply aggregates and correlates the data from each parameter, and then builds a context based on the final output of that correlation. Because of this feature, the subject system's customized market contexts can range from simple, single-parameters contexts like "Large Cap Tech" in FIG. 83 to extraordinarily complex, multi-parameter contexts.

When the user configures the subject system, he chooses a default set of parameters for his market contexts. This default setting is automatically used to build a context as soon as the user initiates an algorithm. Therefore, when the user flips over the benchmark monitor to access a market context, he automatically sees a context based on those default parameters. If the user decides he wants to change parameters and see a different context, all he has to do is right click the "change parameter" arrow on the top of the market context (FIG. 83). Clicking on this arrow automatically shifts the parameter for the market context and the new parameter is indicated in the title to the left of the arrows. In an alternate embodiment a "change parameter" button is used instead of the arrows. Clicking on this button launches a list of all of the parameters with check boxes next to each parameter. The trader can then select all of the parameters he wants to include in his new context, and then hit the "rebuild context" button at the base of the list to create a new context.

In an alternate exemplary embodiment, a trader can launch a market context before he initiates an algorithm, allowing him to bypass the default settings and build a context based on a different set of parameters. To launch a market context directly from the watch list, the user drags the "market context" icon located on the dashboard and drops it onto the stock in his watch list that he wants to use as the reference symbol for the context. In our example, the user would drop the "market context" icon on top of IBM in his watch-list to make a market context for IBM. After the user drops the "market context" icon onto the reference cell (in our case IBM) in the watch-list, the reference cell expands while the surrounding cells in the list simultaneously slide and shrink to accommodate the expansion of the reference cell without impacting the specific order or arrangement of the watch list. (The purpose of this enlargement is to make it clear to the trader which symbol he had put in "market context mode.") At this point, the "market context" feature has been engaged, and the user can customize the parameters for his market context. Right-clicking inside the expanded reference cell in the watch-list displays a list of the context parameters along with a check-box for each parameter. Once the user has selected the parameters he wants to use in his context, he clicks the "build context" button at the base of the parameter list, and a market context is launched in a separate window. It is important to note that there is no limit to the number of market contexts that a user can have active at any given time. When a user is not looking at a particular context, he can either minimize the context or close it completely, but in the course of a trading day a user can activate and maintain as many contexts, for as many reference symbols as he sees fit.

In the same way that a trader can use the benchmark monitor to access the market context if he launches the monitor first; he can use the market context to access the benchmark monitor if he launches the market context first. By clicking the green "rotate" arrow at the bottom of the market context, the user can flip over the map and see the benchmark monitor for the reference symbol.

An additional feature of the subject system allows the user to streamline the process of launching customized "market contexts." Every time a user chooses a combination of parameters, he has the option to save and name that particular combination. For example, a user might choose to build a context based on the market sector, affinity, market cap and trading styles parameters knowing that he will use that particular combination on a regular basis. To avoid repeating the process of dropping the "market context" icon and selecting that combination each time he wants to build that particular context, he can choose to name and save that combination, using the "save as" feature at the parameter selection step. Once he has named and saved that combination, it will appear as a labeled icon next to the "market context" icon on the watch list. Then the next time he wants to use that same parameter combination to build a context all he has to do is drop that combination's icon onto a reference symbol, automatically generating a context with that combination of parameters in one, easy step.

A final feature related to the market contexts is the ability to use the contexts to build baskets which can then be traded using the available algorithms. If a user selects the "basket" parameter in conjunction with any of the other parameters (market sector, correlation, market cap, affinity, blotter, trading style), he activates the feature that enables him to create a customized basket. To build a basket when the "basket" feature is enabled, the user simply left-clicks on each of the symbols in his market context that he wants to include in the basket. If a user wants to include a stock that is not displayed on his context, all he has to do is "drag and drop" the symbol from the watch list onto the context. When the new symbol is dropped on the context, it automatically "snaps" into the appropriate place relative to the other stocks, and can then be included in the basket. Once the user selects all of the symbols he wants to include, he uses the "save as" feature on the market context to name and save the basket. This "save as" feature is always present on the market context; however it is only "active" when the basket parameter is enabled.

Once the basket has been named and saved, that basket becomes the reference cell, replacing the original reference cell. In our example, if the user created a basket and named that basket MONEY, the reference cell would become MONEY replacing IBM. At the same time, the name of the basket also appears as symbol on the watch list, ensuring that a user only has to create a particular basket one time. Once the basket becomes a symbol on the watch list, it can be treated in the same manner as a single-stock cell on the board; thereby allowing a user to apply the functionality behind any icon to the entire basket of stocks with a single click.

For example, if a user has created an icon for a particular combination of market context parameters, dropping that icon onto the MONEY basket symbol will create a market context with those parameters for the entire set of stocks in that basket. Or in another example, if a user drops the MONEY basket symbol on one of the algorithm representing icons, the system will automatically begin trading every stock in that basket with the same algorithm. A user is preferably enabled to set a percentual tolerance level for proceeding at different rates with various constituents of the basket. The target number of shares of a given item in the basket (e.g. IBM) is the total number of shares to be acquired at completion multiplied by the average completion rate of the entire basket (dollars traded versus marked-to-market dollar value of the basket); the lower and upper bounds on the desirable position in IBM is set by applying plus or minus the tolerance percentage to this target number of shares. Again taking the above example if the IBM order for 100,000 shares is part of a basket that has achieved 15% completion by dollar value and the tolerance level is set to 20%, then the subject system's current target completion for IBM would be 15,000 shares and orders will be placed on the market in such a way that the sum of achieved position plus open buy orders will not exceed 18,000 shares and the sum of achieved plus open sell orders will not fall below 12,000 shares. In that way, the activity of a plurality of agents on both sides of each constituent of a basket can be coordinated towards achieving a unique execution trajectory with set tolerance on relative rates of execution of the constituents.

FIG. 84 shows a block diagram of a system 2700 on which any of the disclosed embodiments can be implemented. A server 2702 communicates over the Internet 2704, or another suitable communication medium, with a user's computer (or other device such as an Web-enabled cellular telephone) 2706. The software to implement any of the embodiments can be supplied on any suitable computer-readable medium 2708. The computer preferably includes a microprocessor 2710, a display 2712 for displaying the user interface described herein, input devices such as a keyboard 2714 and a mouse 2716, and a communication device 2718, such as a cable modem, for connecting to the Internet 2704.

An overview of the operation of the preferred embodiment will be set forth with reference to the flow chart of FIGS. 85A-85C, which should be understood in relation to the disclosure given above. Rectangles represent user actions, while ellipses represent system actions.

In FIG. 85A, step 2802, the user initiates the graphical control interface, which is then displayed to the trader. In step 2804, the system displays the dashboard, which includes a display of all available strategic, tactical and third-party algorithms. In step 2806, the user reviews the available algorithms by rolling over the icons which represent each strategic, tactical and third-party algorithm. When the user rolls over an available tactical algorithm, then, in step 2808, the system displays the execution rate scale and the behavior matrix. From either step 2806 or 2808, the user proceeds to step 2810, in which the user selects one of the available algorithms by dragging the symbol which the user wants to trade from the watch list and dropping it on the icon in the dashboard which represents the algorithm which the trader wants to use.

If it is determined in step 2812 that the user watch list is connected to the OMS, then, in step 2814, the system automatically initiates the algorithm when the user drags and drops the symbols onto the icon, pulling order parameters from the OMS. If it is determined in step 2816 that the user watch list is not connected to the OMS, then one of the following sequences of events occurs, based on the user's choice. If the user drags the symbol over the Pipeline algorithm in step 2818, then, in step 2820, the system displays the order entry box, and in step 2822, the user enters the order parameters. If the user drags the symbol onto any algorithm other than the Pipeline algorithm in step 2824, then, in step 2826, the system displays the fishbone, and, in step 2828, the user drops the symbol onto the desired limit price on the fishbone's dynamic price scale. Either way, the system initiates the algorithm in step 2830, and the overall process proceeds to FIG. 85B.

The system generates the market context for the symbol(s) being traded in step 2832 and/or, in step 2834, displays the positions window containing information on the progress of the active algorithms and checks to see whether there is enough time left in the trading day to complete the user's order. If it is determined in step 2836 that there is not enough time, then in step 2838, the system issues a "market participation" warning in the positions window display which tells the user that there may not be enough time remaining in the trading day to complete the order.

After step 2832, 2834 or (if applicable) 2838, the user reviews the information provided by the system in the positions window and/or the market context in step 2840.

The user can then click on or roll the mouse over the "Details" area of the positions window in step 2842. In step 2844, the system displays a "Trade Details" information box which shows user-specific information about each order generated by the algorithm. Alternatively, the user can click on or roll the mouse over the "Overall Progress" area of the Positions window in step 2846. In response to step 2846, the system displays an "overall progress" information box in step 2848, which gives exact numbers regarding the numbers of shares which have been filed, which are active and unfilled and which are inactive and unfilled, as well as whether or not there is a market participation warning (as determined in step 2838).

After step 2840, 2844 or 2848, the user can do either of the following. In step 2850, after reviewing the information in the positions window, the user can decide not to make any changes to the orders or the active algorithms. Alternatively, in step 2852, after reviewing the information in the positions window, the user can decide to look at the order progress in greater detail and/or make some changes to the orders and/or the active algorithms by clicking on or rolling the mouse over the "Strategy Progress" area of the positions window, whereupon the process proceeds to FIG. 85C.

In step 2854, the system displays a disappearing tool bar for managing the active algorithms. In response, the user can do one of three things. In step 2856, the user can click on the buttons in the tool bar to pause or cancel the active algorithm(s), whereupon the system pauses or cancels them in step 2858. In step 2860, the user can use the buttons in the tool bar to display the fishbone for the active algorithm(s), whereupon the system displays the fishbone in step 2862. In step 2864, the user can use the buttons on the tool bar to force an "auto-entry," whereupon, in step 2866, the system automatically enters its next pending order, overriding any order entry delays required by the algorithm's logic.

In response to step 2862, the user can do one of the following four things. In step 2868, the user can push or pull the vertical bar(s) on the fishbone which represent the active algorithm(s) to change the limit(s) of the algorithm(s), whereupon, in step 2870, the system updates the algorithm limit price based on the user's manipulation of the vertical bars. In step 2872, the user can change the order parameters by double clicking on the vertical bars which represent the active algorithm(s) to access an order information box, whereupon, in step 2874, the system updates the order parameters based on any changes which the user has made in the order information box. In step 2876, the user can cancel discreet orders by double clicking on the "pending order" boxes on the fishbone, whereupon, in step 2878, the system can cancel any orders represented by the pending order boxes which the user has double-clicked.

The fourth option is more involved. In step 2880, the user can click on the "display benchmark monitor" button at the base of the fishbone. In response, in step 2882, the system displays the benchmark monitor dial, providing visually enhanced, real-time feedback regarding the performance of the user's trading strategy and the performance of the market relative to a particular benchmark. In step 2884, the user uses the rotate arrow at the top of the benchmark monitor to rotate the dial to display the market context. In step 2886, the system displays the market context generated in step 2832.

The user can choose not to make any changes to the market context in step 2888. Alternatively, in step 2890, the user can modify the market context by adding or removing symbols, using the "change parameter" arrow to change the parameters, or building a custom basket of symbols for trading. In step 2892, the system displays the user-modified market context.

Figure 86:
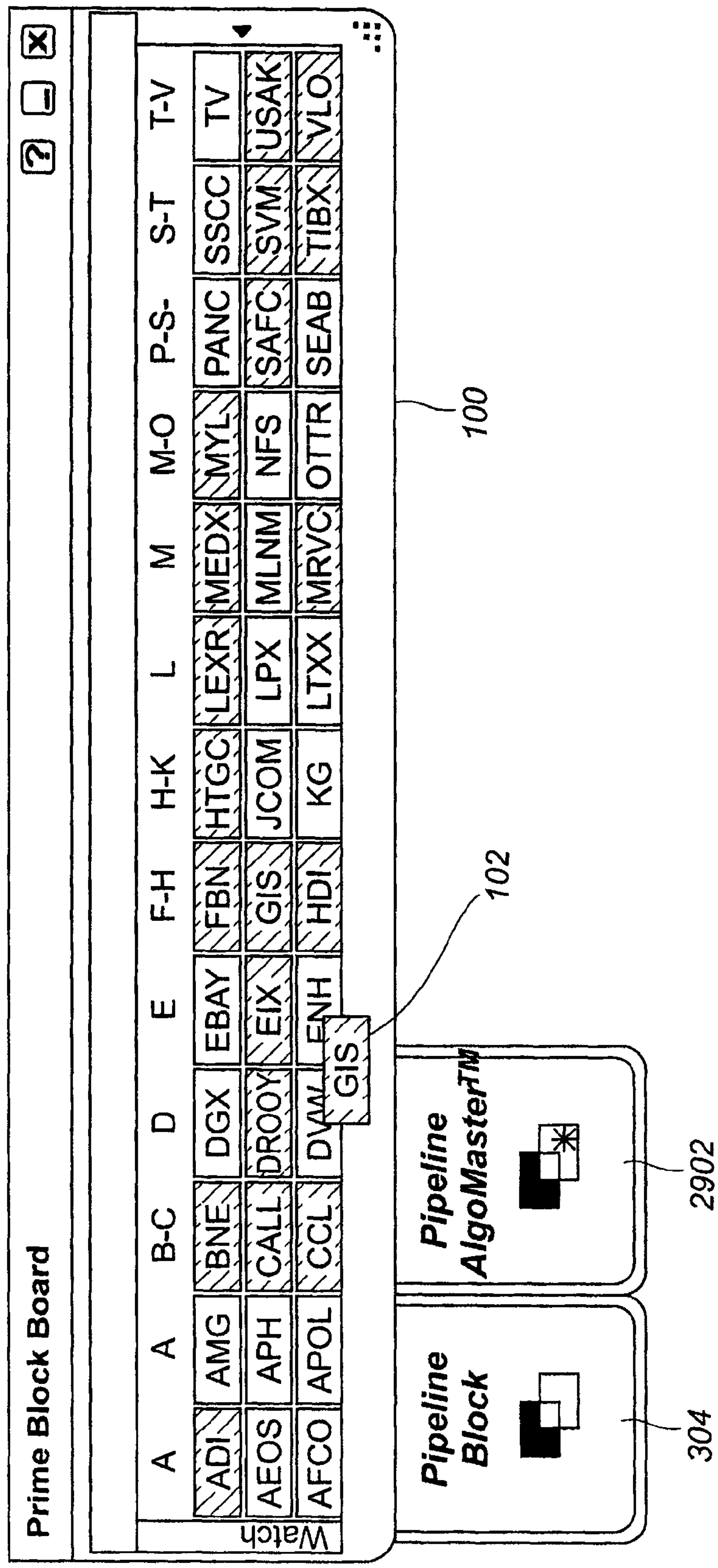

Another variation of the preferred embodiment will be set forth in detail with reference to FIGS. 86-90. As shown in FIG. 86, the trader clicks and drags a symbol onto the Pipeline Block icon 304 or action icons in a toolbar to participate in the market. The trader can configure an optional delay to start participating with trader settings dialog. The following action icons appear when scrolling over the AlgoMaster icon 2902: The Pipeline Block 304 places a block order on Pipeline, and the Pipeline AlgoMaster 2902 places a block order on Pipeline and simultaneously accesses the market using algorithms. Additional icons can be provided to bring up news wires or technical charts via strategic partnerships.

Figure 87:
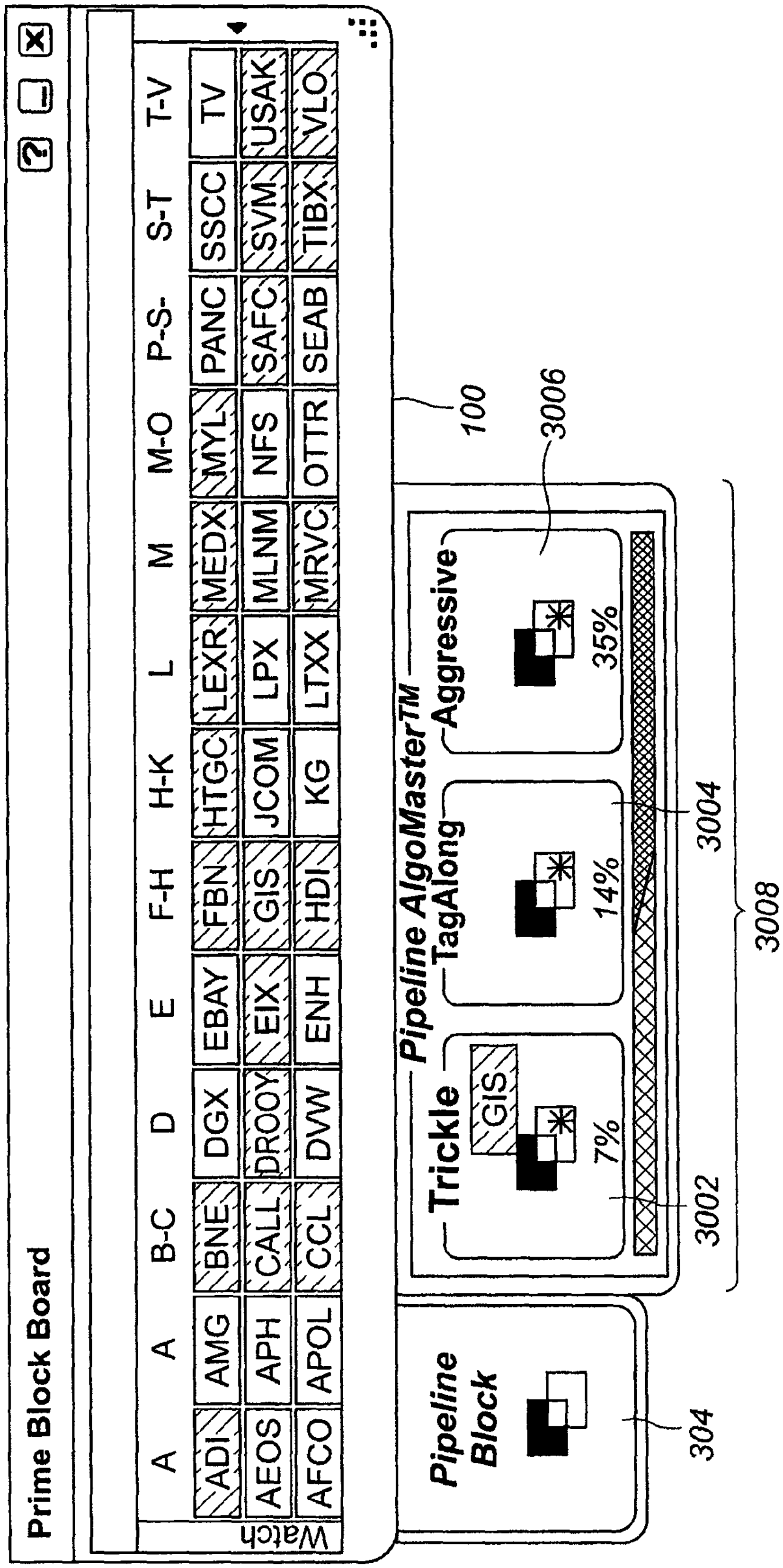

FIG. 87 shows the operation of dropping on an icon to launch Pipeline+Algorithms. Three speed settings are based on the current "red-line rate" (as defined in paragraph 0057)

for the stock. Red-line values are available if symbol is on the BPR watch list. "Trickle" 3002 indicates Pipeline+best tactic for low-market impact routing (3-10%). "TagAlong" 3004 indicates Pipeline+market participation as fast as we can go without becoming the "axe". Expect 10-30% depending on market conditions "Aggressive" 3006 takes 30-60% of the market until half the order is done or substantial resistance is encountered, then alternates with "tag along" methods to allow price to find an equilibrium but averaging at least 20% of the market. A red-line bar 3008 shows the red-line rate; of course, other indicators could be used as well, such as a car tachometer.

Figure 88:
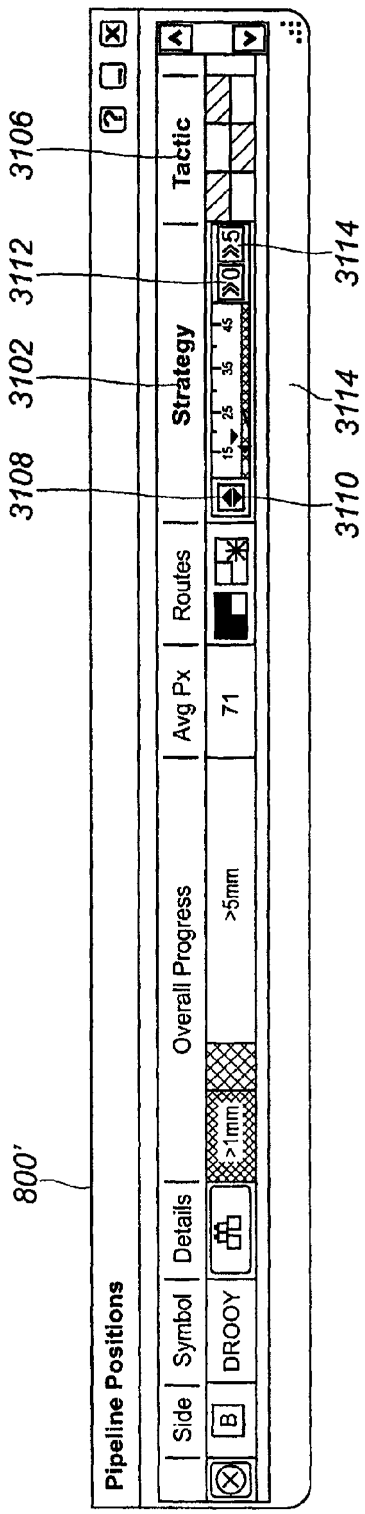

Referring to FIG. 88, in a modified Pipeline Positions bar 800', the Strategy graphic 3102 shows a market color (red-line) graphic 3104 similar to the red-line bar 3008 just described. The trader can click on the Pipeline route icon to see an alternative display showing a Bollinger band/XVA graphic and Pipeline-specific controls. The switching action is visible on the Market Color graphic (Tactic) 3106. Automatic algorithm switching minimizes information leaks by cutting out some of six possible actions (such as "Peg", or "Take", . . . ). The interface provides trader controls to switch up/down in speed, such as the up/down arrow buttons 3108 and 3110, and Fast Forward buttons to launch very aggressive trading (smart sweep) to the offer (bid) (button 3112) or up (down) 5 cents (button 3114). The trader can right-click to change number of cents, as explained below, or save other default in trader configuration.

Figure 89:
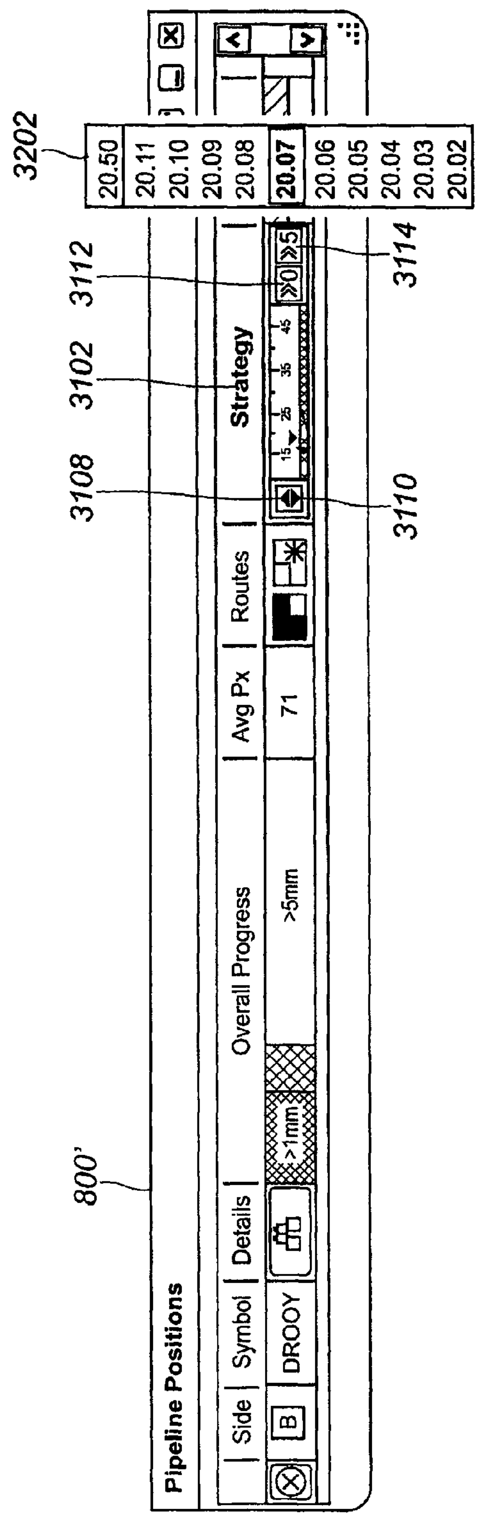

As shown in FIG. 89, the trader can use a fast-forward limit price override using a drag and drop paradigm. The default limit is 5 cents (configurable) from NBBO. The trader can right-click to change the number of cents; in one example, a pick list 3202 appears. The limit price graphic will remain steady; market prices may fluctuate. The price scale can change with price (e.g., ticks should be 2 cents for PG, 5 cents for GOOG). The fast-forward button graphic toggles to simple forward to revert back to normal mode or when the offer is above the limit.

Figure 90:
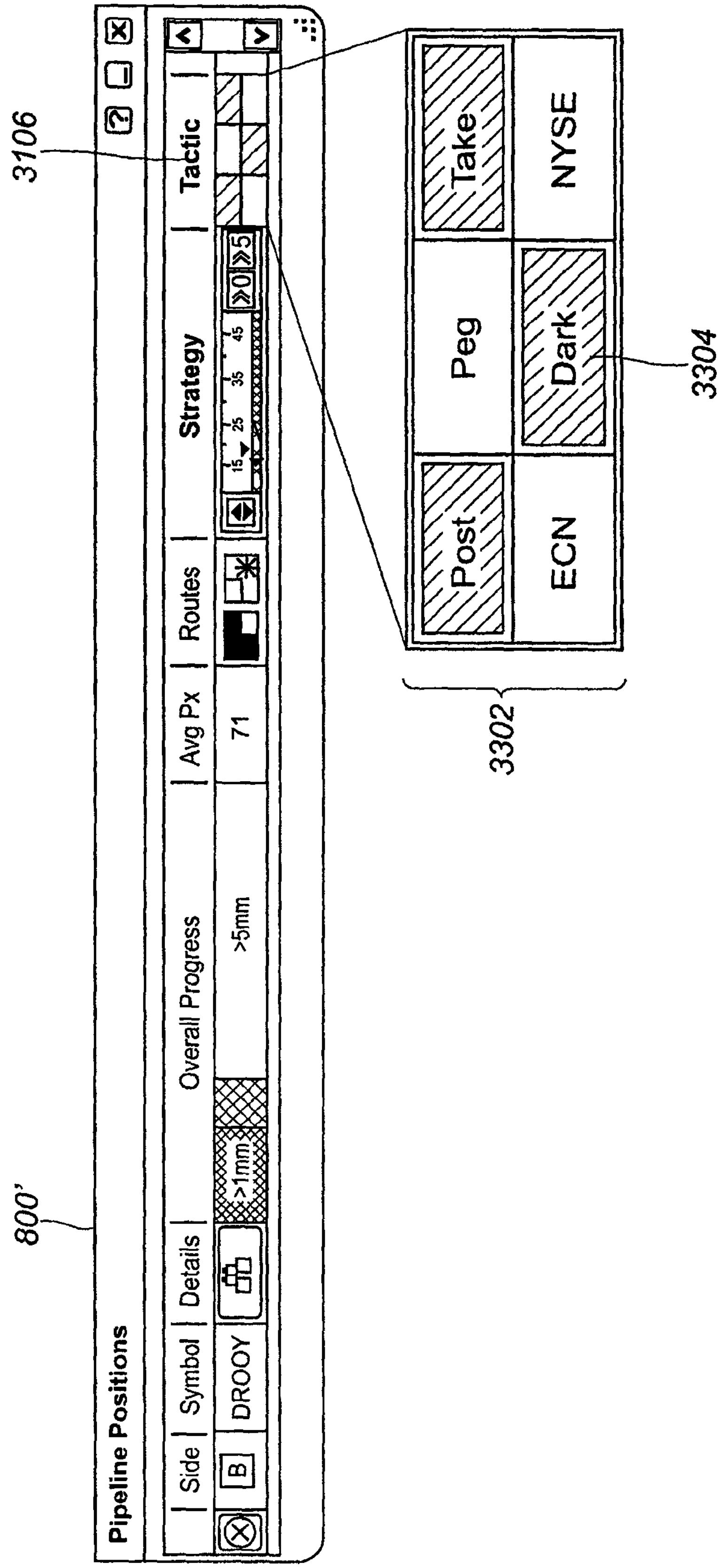

As shown in FIG. 90, a mouse scroll over the market color graphic reveals the meaning of the tactic display in a display 3302. On switching, the elements switched off show a red outline 3304 for 5 seconds, and new elements are shared green. The interface uses color rather than gray to convey that this is market color. In other embodiments, the colors can convey additional information, such as the market response to the algorithm's orders. This can be defined as a flag where "sensitive" indicates a stronger-than-average response, "normal" is average and "two-sided" indicates an increase in counter-party activity or a decrease in competition. Alternatively the market response can be measured as the ratio of the aggregate third-party order size triggered by the algorithm's orders to the algorithm's own aggregate order size; for example a response factor of 50% means that every 1000 shares placed by the algorithm prompts other market participants to either place an additional 500 shares on the same side or cancel 500 shares on the contra side. Of course, both the use of color rather than grayscale and the specific colors used are illustrative rather than limiting.

While preferred and alternative embodiments have been set forth above, those skilled in the art who have reviewed the present disclosure will readily appreciate that other embodiments can be realized within the scope of the present invention. Some possible variations have been disclosed above. Also, features of the embodiments that have been disclosed separately can be used together, while those disclosed together can be used separately. In particular, all or only some of the disclosed functionality can be used in any given embodiment. Therefore, the present invention should be construed as limited only by the appended claims.

APPENDIX A1

An Empirical Study of Resistance and Support on Liquidity Dynamics

The purpose of this empirical study is twofold. Firstly, we examine whether there is evidence of liquidity clustering around reference price levels. In a second step, we test whether the predictors similar to those of liquidity also determine price direction. The bulk of the existing literature on trade clustering focuses on how trades tend to gather around prices that are round numbers (Osborne, Niederhoffer, Harris) or psychological barriers (Sonnemans, Donaldson and Kim). Sonnemnans develops an empirical strategy to test between the odd price hypothesis, according to which humans attribute more weight to the first digit of each number, and the alternative hypothesis that investors have target prices for their holdings. His findings suggest that prices can indeed turn into psychological references to the traders and act as resistance and support levels. Donaldson and Kim find evidence that price levels at multiples of 100 are psychological barriers to the Dow Jones Industrial Average and act, at least temporarily, as support and resistance levels.

This study focuses on intraday fluctuations in liquidity as measured by the number of shares traded required to push a stock through a certain price level. Resistance and support levels are not asymptotic prices at which trigger strategists buy or sell a stock (as in Krugman) but, instead, prices that can be crossed, although perhaps with more difficulty, if the number of shares is large enough to push the price through such levels (as in Donaldson and Kim or Bertola and Caballero). The proposed estimation model of liquidity dynamics is a more general one than those found in existing literature since, for each price level, we consider major prior events and associated quantities as potential determinants of accumulation of liquidity. Resistance and support levels, in which an unusual amount of liquidity is available on one side of the market, are a particular case of historical price levels under consideration.

After proposing a set of potential key predictive drivers of liquidity at each price level, we fit empirical models explaining its fluctuations in order to estimate the impact and test the significance of each individual predictor.

Data and Methods:

We analyze market data for the period between Dec. 18 and Dec. 28, 2006, excluding after-hours trading due to the lower liquidity levels and frequency of trades at that time. For these same reasons, and to assure a fairly homogenous set of tickers where liquidity dynamics is more likely to occur, we restricted the universe of stocks to those with an average volume-weighted price over 1 dollar and an average daily number of executed shares over 400,000. The resulting subset includes 1,519 stocks over 8 trading days.

With the premise that the higher the volatility of a stock, the more likely it is for two consecutive prices levels to be treated as the same, we cross-grain market data into buckets that include all prints within a price interval defined by the mean and variance of the spread of each stock.

We excluded from the analysis all odd single prints (n) that were out of line with adjacent prints i.e.

$$|P_n - P_{n-1}| > (\text{spread}+\text{std})$$

AND $$|P_{n+1} - P_{n-1}| < (\text{spread}+\text{std}) \quad (1)$$

where spread is the average difference between the prices of two subsequent prints and std is its standard deviation. For first and last prints in the day, the exclusion criteria are, respectively, $|P_n - P_{n+1}|$>(spread+std) and $$|P_n - P_{n-1}| > (\text{spread}+\text{std})$$

After filtering, we take the first print of each symbol on each trading day and include in its bucket all subsequent prints n that satisfy the condition:

$$n \in \text{bucket}: |\text{Max}\{P_n\} - \text{Min}\{P_n\}| <= (\text{spread}+\text{std}) \quad (2)$$

Every time a print does not satisfy condition (2) a new bucket is started. All buckets are classified according to the price movement of the print that initiated it i.e. a bucket is classified as an uptick (U) when it is started with a price increase, otherwise it is classified as a downtick (D). We then classify each bucket as a type of event according to its tick and that of the subsequent bucket: If the bucket's price is an uptick and the last price change was also an uptick then we classify the event as a double-uptick. Likewise, a downtick that follows a downtick is classified a double-downtick. When price changes direction from an uptick to a downtick it is classified as a resistance level or, in the reverse case, as a support level.

The empirical implementation involves the pooling of all stocks for model fitting, which requires the preliminary step of correcting for the heterogeneity of stocks. For this purpose, instead of looking at the absolute value of number of shares executed, we consider instead the adjusted volume in each bucket by taking its ratio to the average traded volume in each symbol in each trading day. Table 44 displays the frequency of each type of event as well and the number of executed shares at each event in absolute value (quantity), relatively to the average volume of the stock on each specific date (q/qavg) and in logarithms of the relative value to the average (Log(q/qavg)).

In our sample, price movements are more likely to change direction from one bucket to another than to persist. When price movements persist, the number of executed shares is higher on average that at turning points. This finding is consistent with the fact that turning points reflect one-sided liquidity that was not exhausted, whereas double upticks and downticks are persistent price movements driven by a higher than average number of executed shares. Our estimation models explore this evidence more thoroughly by looking at the fluctuations in volume within each type of event and testing its correlation with prior clustering at a similar price.

TABLE 46

Type of Event and Executed Shares

| | Freq | Quantity | Q/Qavg | Log(Q/Qavg) |
|---|---|---|---|---|
| U | 23% | 10,678 | 1.085 | −0.561 |
| D | 23% | 10,698 | 1.065 | −0.583 |
| R | 27% | 9,602 | 0.948 | −0.761 |
| S | 27% | 9,072 | 0.906 | −0.804 |

In the empirical specification, we hypothesize that volume traded in each bucket may be affected by the immediately preceding event and respective volume and events and quantity traded at similar historical price levels. In an analogous process to the construction of bins, we consider two prices to be similar when the absolute difference between the two is smaller than the spread plus its standard deviation. The proposed set of determinants includes the following variables:

Event type of the prior bucket: $E_{t-1}(S)$ where $S \in \{U, D, R, S\}$ is an indicator variable for double uptick, double downtick, resistance and support, respectively. For example, $E_{t-1}(U)$ is equal to 1 if event type was a double uptick and equal to 0 otherwise.

Quantity traded in the preceding bucket interacted with respective event type $Q \times E_{t-1}(S)$ where $S \in \{U, D, R, S\}$. This term allows quantity traded in immediately prior event to have a different impact on current number of shares traded depending on whether that event was a double uptick, a double downtick, a resistance or a support level.

Event type around latest price similar to current price $E_{price}(S)$ where $S \in \{U, D, R, S\}$. $E_{price}(U)$ is equal to 1 if event was a double uptick and equal to 0 otherwise. In reference case, current price has not been visited in the past 24 hours.

Interaction of the quantity traded in latest bucket around current price with associated event type $Q \times E_{price}(S)$, where $S \in \{U, D, R, S\}$.

Whether it is the case that there is an extraordinary number of shares traded around current price at any instance within the prior 24 hours (Bigg). We consider volume to be extraordinarily high if quantity is strictly larger than two times the average for that symbol that day. The indicator variable of very high volume around current price is interacted with an indicator variable for event type of latest instance. (BigQ×E) $S \in \{U, D, R, S\}$. BigQ×E(U) is strickly positive if it is the case that current price has been visited within the prior 24 hours and the latest instance of that type of event was a double tick.

Whether current price is in the neighborhood of the maximum or minimum volume-weighted prices of the prior trading day buckets. Max and Min are indicator variables for each case.

Whether current price is in the neighborhood of the first and last volume-weighted price of the prior trading day buckets. Open and Close are indicator variables for each case.

Whether current price is in the neighborhood of the whole dollar or 50 cents. Dollar and Halves are indicator variables for each respective case.

Table 47 displays either the mean of each proposed variable by type of event, which for indicator variables corresponds to the frequency of the event in question.

TABLE 47

Table of means by type of event

| | U | D | R | S |
|---|---|---|---|---|
| E t-l(U) | −0.332 | — | 0.438 | — |
| E t-l(D) | — | 0.485 | — | 0.441 |
| E t-l(R) | — | 0.51 | — | 0.55 |
| E t-l(S) | −0.373 | — | 0.553 | — |
| Q*E t-l(U) | −0.332 | — | −0.329 | — |
| Q*E t-l(D) | — | −0.317 | — | 0.441 |
| Q*E t-l(R) | — | −0.376 | −0.428 | 0.55 |
| Q*E t-l(S) | −0.373 | — | — | — |
| E price(U) | 0.143 | 0.187 | 0.135 | 0.168 |
| E price(D) | 0.189 | 0.145 | 0.171 | 0.137 |
| E price(R) | 0.33 | 0.299 | 0.374 | 0.281 |
| E price(S) | 0.297 | 0.324 | 0.281 | 0.374 |
| QxE price (U) | −0.097 | −0.109 | −0.096 | −0.103 |
| QxE price (D) | −0.116 | −0.102 | −0.11 | −0.101 |
| QxE price (R) | −0.262 | −0.221 | −0.321 | 0.225 |
| QxE price (S) | −0.236 | −0.266 | −0.238 | −0.338 |
| BigQ*E (U) | 0.179 | 0.184 | 0.178 | 0.18 |
| BigQ*E (D) | 0.179 | 1.174 | 0.174 | 0.172 |
| BigQ*E (R) | 0.173 | 0.171 | 0.184 | 0.175 |
| BigQ*E (S) | 0.157 | 0.158 | 0.161 | 0.17 |
| Open | 0.023 | 0.023 | 0.024 | 0.024 |

TABLE 47-continued

| Table of means by type of event | | | | |
|---|---|---|---|---|
| | U | D | R | S |
| Close | 0.035 | 0.036 | 0.037 | 0.036 |
| Max | 0.018 | 0.019 | 0.02 | 0.019 |
| Min | 0.035 | 0.035 | 0.035 | 0.035 |
| Dollar | 0.075 | 0.075 | 0.078 | 0.079 |
| Halves | 0.146 | 0.146 | 0.149 | 0.15 |

The proposed set of explanatory variables of volume traded is included in a linear regression, predicting number of shares traded relatively to the average that day for that symbol. For each specific event, only two immediately prior events are possible: a for example double uptick can only be preceded by another double uptick or a support. For this reason, only one indicator variable for lagged event is defined when a constant is included in the model. As for interaction with associated quantity, only two lagged indicator variables can be identified.

In the linear estimation model we calculate the Huber/White "sandwich" estimators of variance, which are robust in the sense that they give accurate assessments of the sample-to-sample variability of the parameter estimates even when the model is mis-specified in several instances, such as when there are minor problems about normality, heteroscedasticity, or some observations that exhibit large residuals.

Results: Table 44 displays results of the least squares estimation. The findings indicate that almost all proposed variables have a statistically significant effect on volume traded. Quantity traded in the previous bucket, as well as quantity traded in the preceding bucket around current price, have a significant positive effect on volume. There is also a significantly higher quantity traded in the cases where there was a prior major clustering of volume around the current price.

Although proximity to resistance or support price levels has a negative impact on quantity traded, when a resistance or support price level is revisited, volume is significantly higher. Furthermore, the larger the prior volume traded at a turning point around a certain price, the bigger the impact on volume in a subsequent event around that price.

The fraction of times the current price has been revisited as a turning point (over the total number of events around that price) has a very different impact on current volume depending on whether the current event is a double tick or a turning point. Volume is lower when price is revisited in a turning point, but is much higher when price is passed on a double tick.

Surprisingly, volume traded around the reference prices of the prior trading day is higher in the cases where there is a change of price direction, but not when current event is a double tick.

TABLE 48

| Linear Regression. Explained variable: Log [Q/avg(Q)] | | | | |
|---|---|---|---|---|
| | (1) U | | (2) U | |
| | Coeff. | SE | Coeff. | SE |
| E t-l (U) | — | — | — | — |
| E t-l (D) | — | — | — | — |
| E t-l (R) | — | — | — | — |
| E t-l (S) | −0.033 | 0.008 | −0.138 | 0.004 |
| QxE t-l (U) | −0.156 | 0.018 | 0.201 | 0.002 |
| QxE t-l (D) | — | — | — | — |
| QxE t-l (R) | — | — | — | — |
| QxE t-l (S) | −0.106 | 0.018 | 0.255 | 0.022 |
| E price (U) | 0.546 | 0.065 | — | — |
| E price (D) | 0.58 | 0.065 | — | — |
| E price (R) | 0.478 | 0.065 | — | — |
| E price (S) | 0.65 | 0.065 | — | — |
| QxE price (U) | 0.314 | 0.018 | — | — |
| QxE price (D) | 0.312 | 0.018 | — | — |
| QxE price (R) | 0.382 | 0.018 | — | — |
| QxE price (S) | 0.389 | 0.018 | — | — |
| BigQxE (U) | 0.144 | 0.005 | 0.145 | 0.005 |
| BigQxE (D) | 0.157 | 0.005 | 0.153 | 0.005 |
| BigQxE (R) | 0.191 | 0.005 | 0.193 | 0.005 |
| BigQxE (S) | 0.212 | 0.006 | 0.228 | 0.005 |
| Open | −0.035 | 0.012 | −0.035 | 0.012 |
| Close | −0.036 | 0.009 | −0.04 | 0.009 |
| Max | 0.033 | 0.013 | 0.034 | 0.013 |
| Min | −0.056 | 0.01 | −0.058 | 0.01 |
| Dollar | 0.058 | 0.009 | 0.057 | 0.009 |
| Halves | 0.064 | 0.007 | 0.064 | 0.007 |
| Constant | −1.075 | 0.065 | −0.467 | 0.004 |
| R2 | 0.08 | | 0.075 | |
| N | 460,004 | | | |

Note 1:
Coeff. is point estimate and SE is standard error
Note 2:
gray-shaded estimates are not statistically significant at 5% significance level

TABLE 49

| Linear Regression. Explained variable: Log [Q/avg(Q)] | | | | |
|---|---|---|---|---|
| | (1) D | | (2) D | |
| | Coeff. | SE | Coeff. | SE |
| E t-l (U) | — | — | — | — |
| E t-l (D) | — | — | — | — |
| E t-l (R) | −0.143 | 0.004 | −0.073 | 0.008 |
| E t-l (S) | — | — | — | — |
| QxE t-l (U) | — | — | — | — |
| QxE t-l (D) | 0.198 | 0.002 | −0.188 | 0.018 |
| QxE t-l (R) | 0.25 | 0.002 | −0.148 | 0.019 |
| QxE t-l (S) | −0.106 | 0.018 | — | — |
| E price (U) | — | — | 0.46 | 0.065 |
| E price (D) | — | — | 0.454 | 0.065 |
| E price (R) | — | — | 0.54 | 0.065 |
| E price (S) | — | — | 0.418 | 0.065 |
| QxE price (U) | — | — | 0.341 | 0.018 |
| QxE price (D) | — | — | 0.345 | 0.018 |
| QxE price (R) | — | 0.415 | 0.018 | — |
| QxE price (S) | — | — | 0.423 | 0.018 |
| BigQxE (U) | 0.157 | 0.005 | 0.158 | 0.005 |
| BigQxE (D) | 0.15 | 0.005 | 0.172 | 0.005 |
| BigQxE (R) | 0.226 | 0.005 | 0.433 | 0.015 |
| BigQxE (S) | 0.203 | 0.006 | 0.589 | 0.06 |
| Open | −0.032 | 0.012 | −0.025 | 0.012 |
| Close | −0.055 | 0.009 | −0.047 | 0.009 |
| Max | −0.026 | 0.013 | −0.026 | 0.013 |
| Min | −0.033 | 0.009 | −0.019 | 0.009 |

TABLE 49-continued

Linear Regression. Explained variable: Log [Q/avg(Q)]

| | (1) D | | (2) D | |
|---|---|---|---|---|
| | Coeff. | SE | Coeff. | SE |
| Dollar | 0.053 | 0.009 | 0.05 | 0.009 |
| Halves | 0.071 | 0.007 | 0.063 | 0.006 |
| Constant | −0.503 | 0.004 | −0.993 | 0.068 |
| R2 | 0.074 | | 0.078 | |
| N | 458,883 | | | |

Note 1:
Coeff. is point estimate and SE is standard error
Note 2:
gray-shaded estimates are not statistically significant at 5% significance level

TABLE 50

Linear Regression. Explained variable: Log[Q/avg(Q)]

| | (1) R | | (2) R | |
|---|---|---|---|---|
| | Coeff. | SE | Coeff. | SE |
| E t-l (U) | — | — | — | — |
| E t-l (D) | — | — | — | — |
| E t-l (R) | — | — | — | — |
| E t-l (S) | −0.033 | 0.008 | −0.203 | 0.004 |
| QxE t-l (U) | −0.156 | 0.018 | 0.216 | 0.002 |
| QxE t-l (D) | — | — | — | — |
| QxE t-l (R) | — | — | — | — |
| QxE t-l (S) | −0.106 | 0.018 | 0.275 | 0.002 |
| E price (U) | 0.546 | 0.065 | — | — |
| E price (D) | 0.58 | 0.065 | — | — |
| E price (R) | 0.478 | 0.065 | — | — |
| E price (S) | 0.65 | 0.065 | — | — |
| QxE price (U) | 0.314 | 0.018 | — | — |
| QxE price (D) | 0.312 | 0.018 | — | — |
| QxE price (R) | 0.382 | 0.018 | — | — |
| QxE price (S) | 0.389 | 0.018 | — | — |
| BigQxE (U) | 0.144 | 0.005 | 0.156 | 0.005 |
| BigQxE (D) | 0.157 | 0.005 | 0.171 | 0.005 |
| BigQxE (R) | 0.191 | 0.005 | 0.208 | 0.005 |
| BigQxE (S) | 0.212 | 0.006 | 0.247 | 0.005 |
| Open | −0.035 | 0.012 | 0.002 | 0.011 |
| Close | −0.036 | 0.009 | −0.031 | 0.009 |
| Max | 0.033 | 0.013 | 0.011 | 0.012 |
| Min | −0.056 | 0.01 | −0.03 | 0.009 |
| Dollar | 0.058 | 0.009 | 0.045 | 0.008 |
| Halves | 0.064 | 0.007 | 0.069 | 0.006 |
| Constant | −1.156 | 0.06 | −0.614 | 0.004 |
| R2 | 0.092 | | 0.086 | |
| N | 539,399 | | | |

Note 1:
Coeff is point estimate and SE is standard error
Note 2:
gray-shaded estimates are not statistically significant at 5% significance level

TABLE 51

Linear Regression. Explained variable: Log[Q/avg(Q)]

| | (1) S | | (2) S | |
|---|---|---|---|---|
| | Coeff. | SE | Coeff. | SE |
| E t-l (U) | — | — | — | — |
| E t-l (D) | — | — | — | — |
| E t-l (R) | −0.225 | 0.004 | −0.073 | 0.008 |
| E t-l (S) | — | — | — | — |
| QxE t-l (U) | — | — | — | — |
| QxE t-l (D) | 0.215 | 0.002 | −0.188 | 0.015 |

TABLE 51-continued

Linear Regression. Explained variable: Log[Q/avg(Q)]

| | (1) S | | (2) S | |
|---|---|---|---|---|
| | Coeff. | SE | Coeff. | SE |
| QxE t-l (R) | 0.274 | 0.002 | −0.148 | 0.015 |
| QxE t-l (S) | — | — | — | — |
| E price (U) | — | — | 0.52 | 0.064 |
| E price (D) | — | — | 0.471 | 0.064 |
| E price (R) | — | — | 0.582 | 0.064 |
| E price (S) | — | — | 0.47 | 0.063 |
| QxE price (U) | — | — | 0.359 | 0.015 |
| QxE price (D) | — | — | 0.365 | 0.015 |
| QxE price (R) | — | — | 0.437 | 0.015 |
| QxE price (S) | — | — | 0.457 | 0.015 |
| BigQxE (U) | 0.17 | 0.005 | 0.173 | 0.005 |
| BigQxE (D) | 0.147 | 0.005 | 0.151 | 0.005 |
| BigQxE (R) | 0.23 | 0.005 | 0.216 | 0.005 |
| BigQxE (S) | 0.204 | 0.005 | 0.195 | 0.005 |
| Open | −0.029 | 0.011 | −0.028 | 0.011 |
| Close | −0.039 | 0.009 | −0.036 | 0.009 |
| Max | −0.003 | 0.012 | −0.002 | 0.012 |
| Min | −0.023 | 0.009 | −0.022 | 0.009 |
| Dollar | 0.048 | 0.009 | 0.048 | 0.008 |
| Halves | 0.082 | 0.006 | 0.082 | 0.006 |
| Constant | −0.641 | 0.004 | −1.182 | 0.064 |
| R2 | 0.089 | | 0.095 | |
| N | 536,466 | | | |

Note 1:
Coeff is point estimate and SE is standard error
Note 2:
gray-shaded estimates are not statistically significant at 5% significance level

TABLE 52

Linear Regression. Explained variable: Log [Q/avg(Q)]

| | (1) U/R | | (2) U/R | |
|---|---|---|---|---|
| | Coeff. | SE | Coeff. | SE |
| E t-l (U) | — | — | — | — |
| E t-l (D) | — | — | — | — |
| E t-l (R) | — | — | — | — |
| E t-l (S) | 0.008 | 0.007 | −0.062 | 0.004 |
| QxE t-l (U) | −0.119 | 0.016 | 0.182 | 0.002 |
| QxE t-l (D) | — | — | — | — |
| QxE t-l (R) | — | — | — | — |
| QxE t-l (S) | −0.058 | 0.016 | 0.235 | 0.002 |
| E price (U) | 0.479 | 0.059 | — | — |
| E price (D) | 0.511 | 0.059 | — | — |
| E price (R) | 0.487 | 0.059 | — | — |
| E price (S) | 0.602 | 0.059 | — | — |
| QxE price (U) | 0.314 | 0.016 | — | — |
| QxE price (D) | 0.312 | 0.016 | — | — |
| QxE price (R) | 0.382 | 0.016 | — | — |
| QxE price (S) | 0.389 | 0.016 | — | — |
| BigQxE (U) | 0.166 | 0.005 | 0.164 | 0.005 |
| BigQxE (D) | 0.184 | 0.005 | 0.179 | 0.005 |
| BigQxE (R) | 0.253 | 0.005 | 0.261 | 0.005 |
| BigQxE (S) | 0.26 | 0.005 | 0.279 | 0.005 |
| Open | 0.005 | 0.011 | 0.004 | 0.011 |
| Close | −0.018 | 0.009 | −0.023 | 0.009 |
| Max | 0.07 | 0.012 | 0.07 | 0.013 |
| Min | −0.034 | 0.009 | −0.037 | 0.009 |
| Dollar | 0.081 | 0.009 | 0.081 | 0.009 |
| Halves | 0.063 | 0.006 | 0.064 | 0.006 |
| Constant | −0.303 | 0.059 | 0.252 | 0.004 |
| N | 999,403 | | | |

Note 1:
Coeff. is point estimate and SE is standard error
Note 2:
gray-shaded estimates are not statistically significant at 5% significance level The results from the estimation of the quantile regressions for the 80$^{th}$ percentile are shown in Table 45. The evidence suggests that large accumulation of volume is predicted in a very similar way to average quantity. All point estimates are higher than those obtained from the least squares regression, except for the proportion of turning points around the current price. These findings imply that the 80th quartile of volume is, as expected, higher than the average and more affected by each predictor than the average. Nonetheless, the qualitative findings are virtually the same.

TABLE 53

| Linear Regression. Explained variable: Log [Q/avg(Q)] | | | | |
|---|---|---|---|---|
| | (1) D/S | | (2) D/S | |
| | Coeff. | SE | Coeff. | SE |
| E t-l (U) | — | — | — | — |
| E t-l (D) | — | — | — | — |
| E t-l (R) | −0.077 | 0.004 | −0.055 | 0.007 |
| E t-l (S) | — | — | — | — |
| QxE t-l (U) | — | — | — | — |
| QxE t-l (D) | 0.183 | 0.002 | −0.118 | 0.016 |
| QxE t-l (R) | 0.225 | 0.002 | −0.079 | 0.016 |
| QxE t-l (S) | −0.058 | 0.016 | — | — |
| E price (U) | — | — | 0.468 | 0.06 |
| E price (D) | — | — | 0.468 | 0.06 |
| E price (R) | — | — | 0.557 | 0.06 |
| E price (S) | — | — | 0.512 | 0.065 |
| QxE price (U) | — | — | 0.264 | 0.016 |
| QxE price (D) | — | — | 0.268 | 0.016 |
| QxE price (R) | — | — | 0.326 | 0.016 |
| QxE price (S) | — | — | 0.323 | 0.016 |
| BigQxE (U) | 0.175 | 0.005 | 0.182 | 0.005 |
| BigQxE (D) | 0.151 | 0.005 | 0.154 | 0.005 |
| BigQxE (R) | 0.265 | 0.005 | 0.248 | 0.005 |
| BigQxE (S) | 0.259 | 0.005 | 0.246 | 0.005 |
| Open | −0.009 | 0.011 | −0.008 | 0.011 |
| Close | −0.044 | 0.009 | −0.041 | 0.009 |
| Max | −0.012 | 0.012 | −0.012 | 0.012 |
| Min | −0.02 | 0.009 | −0.019 | 0.009 |
| Dollar | 0.075 | 0.009 | 0.074 | 0.009 |
| Halves | 0.077 | 0.006 | 0.077 | 0.006 |
| Constant | 0.225 | 0.004 | −0.29 | 0.06 |
| N | 995,349 | | | |

Note 1:
Coeff. is point estimate and SE is standard error
Note 2:
gray-shaded estimates are not statistically significant at 5% significance level

TABLE 54

| Logistic Regression Explained: P[Reverse] | | | | |
|---|---|---|---|---|
| | (1) U/R | | (2) U/R | |
| | Coeff. | SE | Coeff. | SE |
| Q t-l | 1.035 | 0.046 | −1.024 | 0.043 |
| Change | 1.053 | 0.006 | 1.062 | 0.006 |
| E price(U) | 2.596 | 0.188 | 0.811 | 0.057 |
| E price(D) | 0.949 | 0.068 | 2.196 | 0.156 |
| E price(R) | 1.432 | 0.107 | 1.058 | 0.075 |
| E price(S) | 1.252 | 0.09 | 1.287 | 0.095 |
| QxE price(U) | 0.995 | 0.045 | 0.94 | 0.039 |
| QxE price(D) | 0.924 | 0.041 | 0.987 | 0.042 |
| QxE price(R) | 0.937 | 0.043 | 0.929 | 0.039 |
| QxE price(R) | 0.926 | 0.041 | 0.957 | 0.041 |
| BigQxE(U) | 1.016 | 0.007 | 1.001 | 0.006 |
| BigQxE (D) | 1.023 | 0.006 | 0.996 | 0.007 |
| BigQxE (R) | 1.102 | 0.007 | 1.081 | 0.007 |
| BigQxE (S) | 1.106 | 0.007 | 1.095 | 0.007 |
| Open | 1.054 | 0.014 | 1.018 | 0.014 |

TABLE 54-continued

| Logistic Regression Explained: P[Reverse] | | | | |
|---|---|---|---|---|
| | (1) U/R | | (2) U/R | |
| | Coeff. | SE | Coeff. | SE |
| Close | 1.014 | 0.011 | 1.022 | 0.011 |
| Max | 1.06 | 0.016 | 1.023 | 0.016 |
| Min | 1.009 | 0.011 | 1.004 | 0.011 |
| Dollar | 1.042 | 0.011 | 1.032 | 0.011 |
| Halves | 1.027 | 0.008 | 1.027 | 0.008 |
| N | 996,061 | | 992,719 | |
| R2 | 0.01 | | 0.01 | |

TABLE 55

| Logistic Regression Explained: P[Reverse] | | |
|---|---|---|
| | (3) ALL | |
| | Coeff. | SE |
| Up | 0.993 | 0.003 |
| Q t-l | 1.028 | 0.031 |
| Pchange | 1.086 | 0.004 |
| E price(U) | 0.966 | 0.053 |
| E price(D) | 0.958 | 0.052 |
| E price(R) | 0.923 | 0.056 |
| E price(S) | 0.93 | 0.057 |
| QxE price(U) | 0.966 | 0.029 |
| QxE price(D) | 0.957 | 0.029 |
| QxE price(R) | 0.923 | 0.028 |
| QxE price(R) | 0.93 | 0.28 |
| BigQxE(U) | 1.013 | 0.004 |
| BigQxE (D) | 1.015 | 0.005 |
| BigQxE (R) | I.104 | 0.005 |
| BigQxE (S) | 1.112 | 0.005 |
| Open | 1.032 | 0.01 |
| Close | 1.006 | 0.008 |
| Max | 1.04 | 0.011 |
| Min | 1 | 0.008 |
| Dollar | 1.04 | 0.008 |
| Halves | 1.028 | 0.008 |
| N | 1,997,208 | |
| R2 | 0.002 | |

Our findings suggest that a change in direction around a price level is a significant predictor of subsequent volume traded at that same price. Specifically, a resistance (support) price might be an indicator of a significant amount of liquidity on the supply (demand) side. If the subsequent event also results in a change of direction, we can infer that the opposite side of the market did not exhaust the liquidity available. Our estimates are certainly consistent with this hypothesis since the volume traded at this point is either the same or lower than that observed in events occurring at prices that were not identified either as resistance or support. In the case that the subsequent event results in price changes in the same direction, we can infer that the liquidity available on the supply (demand) side was exhausted, which implies that the volume traded was unusually large. Both our specifications support this finding.

APPENDIX B

Example Report

Summary of Analysis of Trade Profile

This report presents an analysis of a representative sample of trades executed in Pipeline:

The sample exhibits negative impact-free returns. We find an asymmetry between buy and sell orders. Sell orders are more likely to be associated with negative impact-free returns.

Larger sell orders (>5% ADV) exhibit more significant negative returns whereas the smaller sell orders exhibit positive returns to t+1.

Larger sell orders following momentum exhibit stronger impact-free returns. The orders placed under market neutral conditions or reversion exhibit negative returns.

Small buy orders (<2% ADV) exhibit negative returns until t+2. The larger buy orders exhibit nonnegative returns.

The larger buy orders placed on reversion exhibit the strongest impact-free returns. The larger buy orders placed on momentum exhibit negative returns until t+2.

Section 1: Descriptive Statistics

Figure 109:
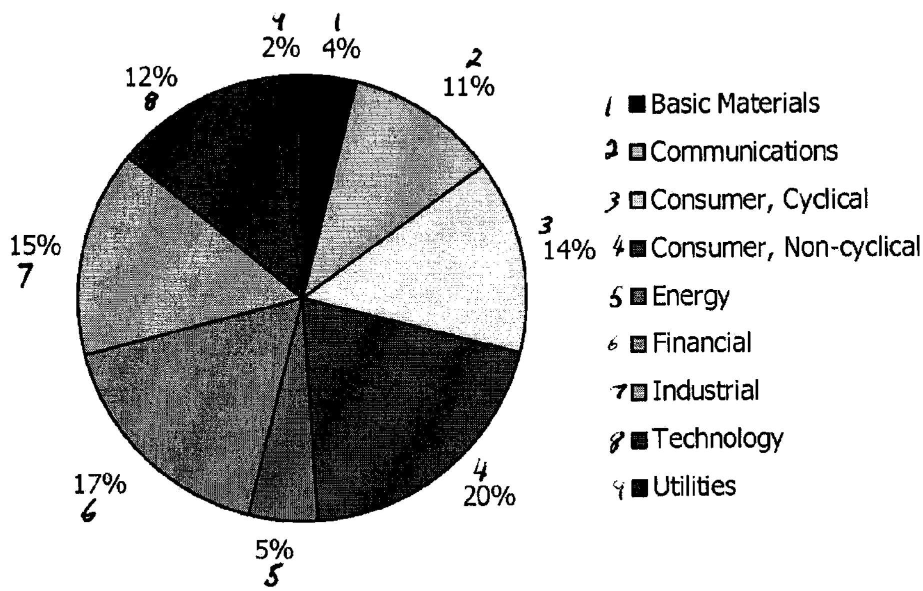

FIG. 109 depicts sector distribution.

Figure 110:
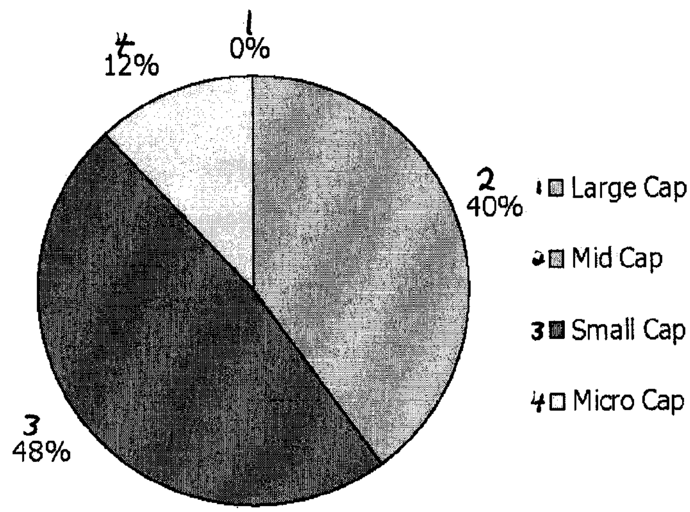

FIG. 110 depicts market capitalization distribution.

Figure 111:
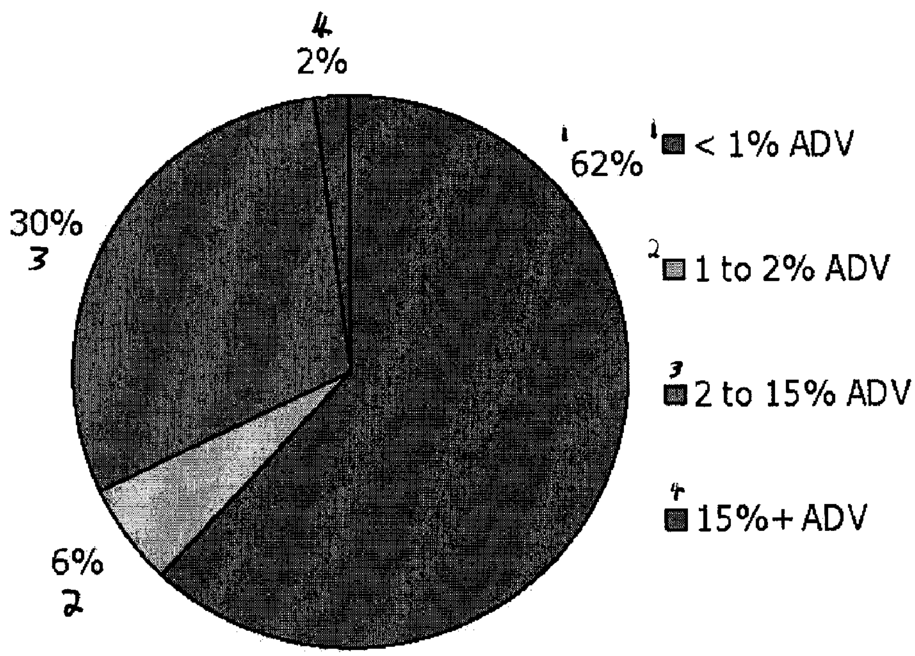

FIG. 111 depicts order size distribution.

TABLE 56

Execution and Performance Summary Statistics

| Variables | Mean Buy | Mean Sell | Median Buy | Median Sell |
|---|---|---|---|---|
| Observations # | 3,670 | 2,856 | 3,670 | 2,856 |
| Order Duration (minutes) | 231 ± 2 | 184 ± 3 | 230 | 42 |
| Trade Duration (minutes) | 195 ± 2 | 142 ± 3 | 176 | 34 |
| Delay Time (minutes) | 32 ± 1 | 23 ± 1 | 25 | 13 |
| Trade Size (% adv) | 2.5 | 3.1 | 1.3 | .1 |
| Participation Rate (%) | 12 | 15 | 5 | 10 |
| Value-Weighted Delay Costs (bps) | 9 ± 2 | 0 ± 2 | 4 | 0 |
| Value-Weighted Pre-trade (bps) | 59 ± 2 | 92 ± 1 | 51 | 75 |
| Value-Weighted Difficulty (bps) | 37 ± 2 | 36 ± 3 | 23 | 33 |
| Value-Weighted Shortfall (bps) | 23 ± 2 | 15 ± 3 | 12 | 7 |
| Adjusted Tracking Error 5% PWP (bps) | 3 ± 1 | 12 ± 2 | 1 | 2 |
| Adjusted Tracking Error 10% PWP (bps) | −4 ± 1 | −4 ± 1 | −6 | −3 |
| Adjusted Tracking Error 20% PWP (bps) | −5 +2 | −9 ± 1 | −6 | −5 |

Note: Descriptive statistics are based on trades greater than 0.01% ADV and trade duration of at least 1 minute.

Figure 112:
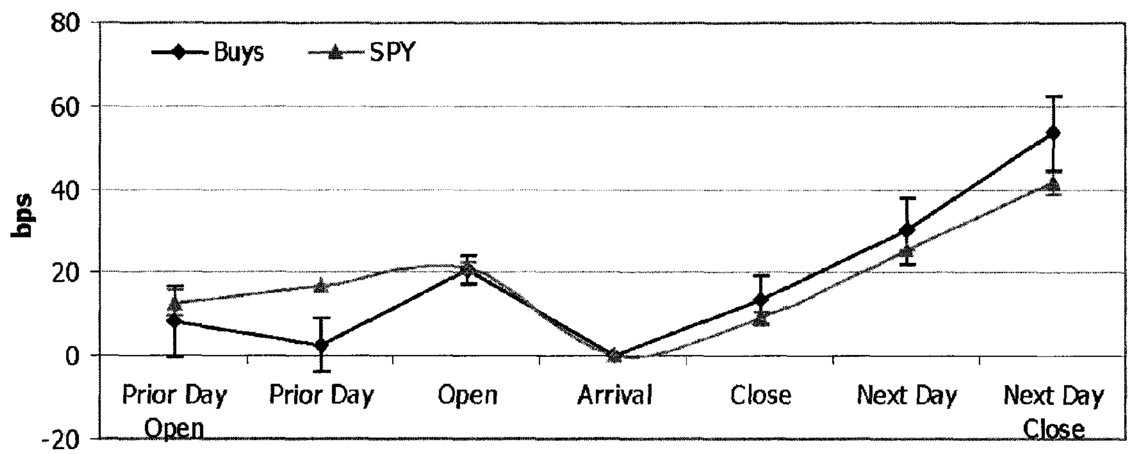
Figure 113:
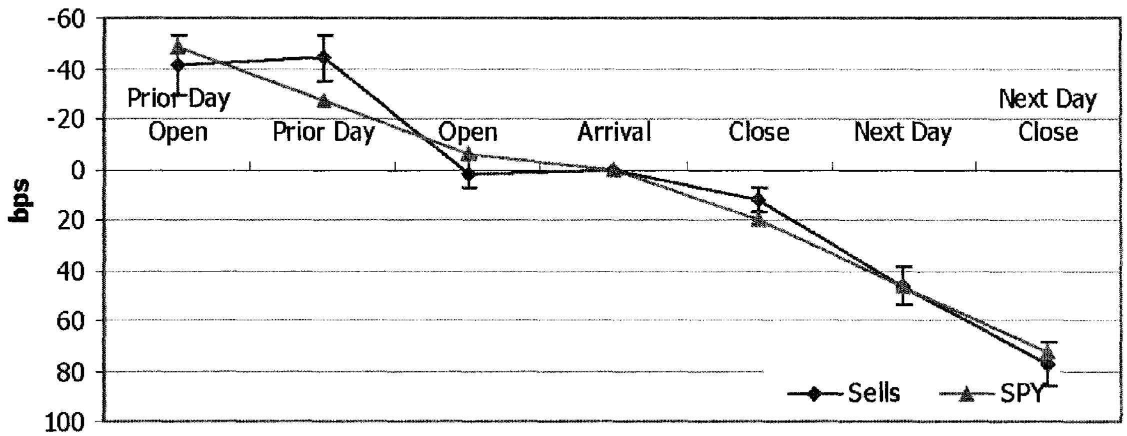

FIGS. 112 and 113 depict gross returns. FIG. 112 depicts Gross Returns and SPY—Buy Orders. FIG. 113 depicts Gross Returns and SPY—Sell Orders.

Section 2: Trade Arrival Profiling—Methodology and Key Parameters

Our study follows these steps:

Enrich the set of historical trades with drivers that are most likely to be associated with trade urgency.

Remove estimated impact to model "impact-free price", using Pipeline's models based on order flow and fill aggregates to model the creation and decay of temporary impact and permanent impact across multi-segment trades.

We define a class C of orders where the sector trader has significant impact-free returns to close, and define X to be a potential filter; the sector trader is statistically likely to have positive impact-free returns if the likelihood of class C is enhanced by applying the filter X This is the case $$\varepsilon += \frac{N_X(P(C|X) - P(C))}{(Nx(P(C)(1-P(C)))^{1/2}} > 2$$

when:

where P(C|X) is the probability that the sector has positive impact-free returns given X, and there are Nx observations associated with X We define a class D of orders where the sector trader has significant negative impact-free returns to close, and define X to be a potential filter; the sector trader is statistically likely to have negative impact-free returns if the likelihood of class D is enhanced by applying the filter X. This is the case when:

$$\varepsilon -= \frac{N_X(P(D|X) - P(D))}{(Nx(P(D)(1-P(D)))^{1/2}} > 2$$

where P(D|X) is the probability that the sector has positive impact-free returns given X, and there are Nx observations associated with X.

Summary of Findings

Class C defines trades with significant impact-free returns to close and X defines the filter.

TABLE 57

| Factor | X | ϵ+ | ϵ− |
|---|---|---|---|
| Side | Sell | −1.2 | 3.7 |
| Order Size | Trade_size <0.09% ADV | 2 | −5.5 |
| | Trade_size between 1% and 15% ADV | −2.1 | 6.5 |
| | Trade_size > 15% ADV | 2.2 | 12.5 |
| Prior Close to Arrival relative to market | Sign × ($R_{arrival, prior\_close}$− $R_{SPY, arrival, prior\_close}$) < 60bps | −0.7 | 4.8 |
| Prior Close to Open Gap relative to market | Sign × ($R_{open, prior\_close}$− $R_{SPY, open, prior\_close}$) < −77bPs | 0.2 | 3.1 |
| Prior Low to Close | Sign × $R_{prior\_close, prior\_low}$ > 200bPs | 2.2 | 0.1 |
| Prior 5 days VWAP to Close | Sign × $R_{prior_close,}$VWAP − 5 > 500bps | 3.2 | 1 |

Figure 114:
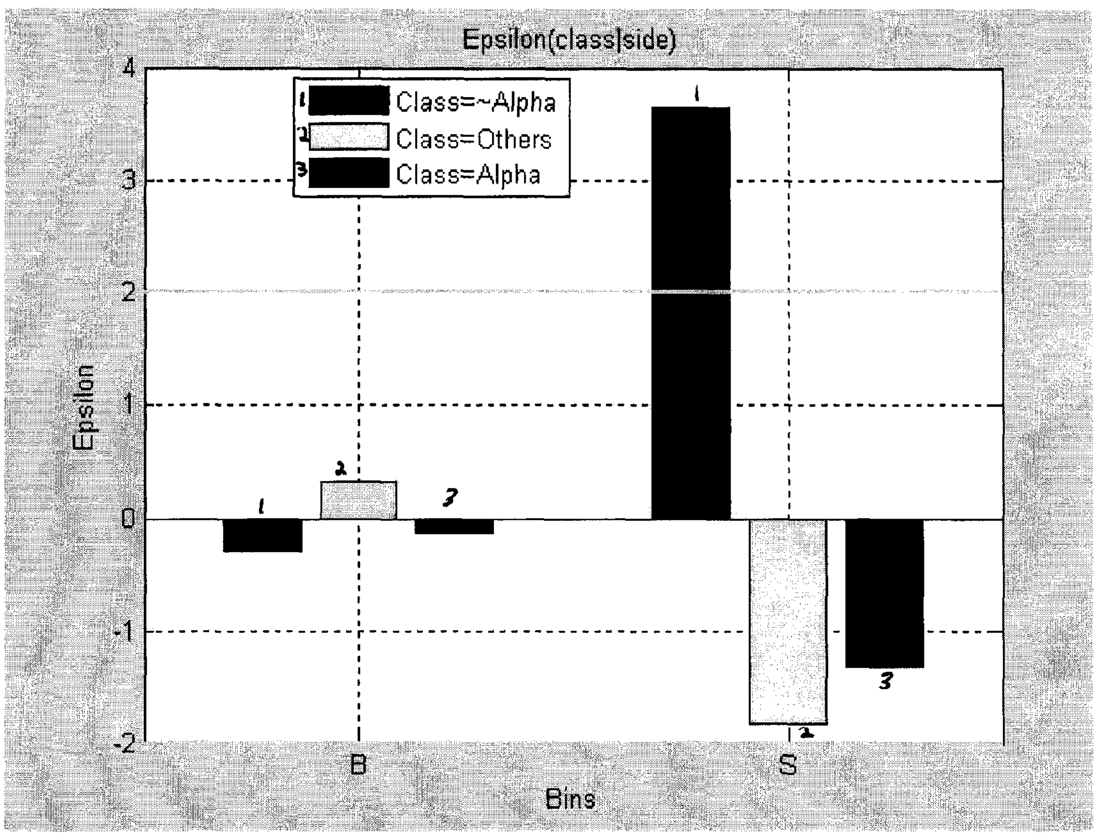

FIG. 114: Sell orders are more likely to be associated with negative impact-free returns.

Figure 115:
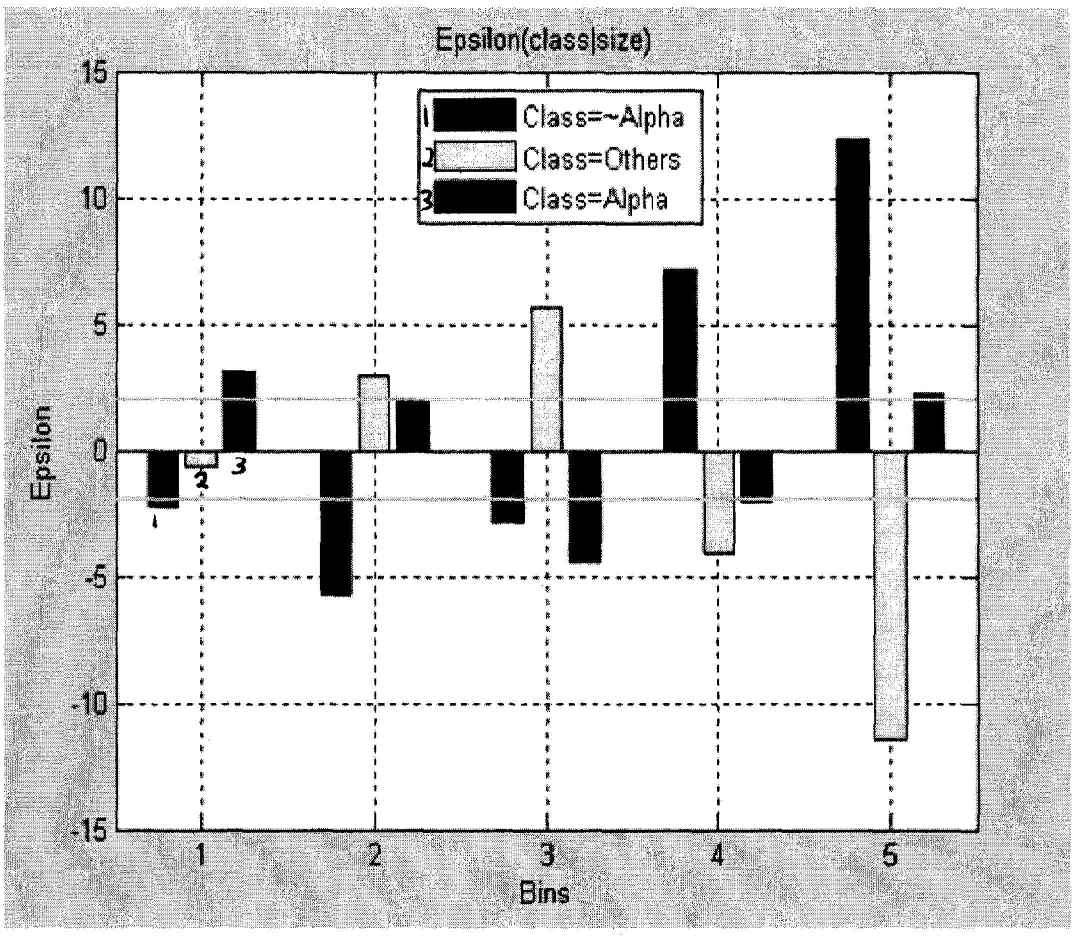

FIG. 115: Large order sizes are more likely to be associated with negative impact-free returns.

Figure 116:
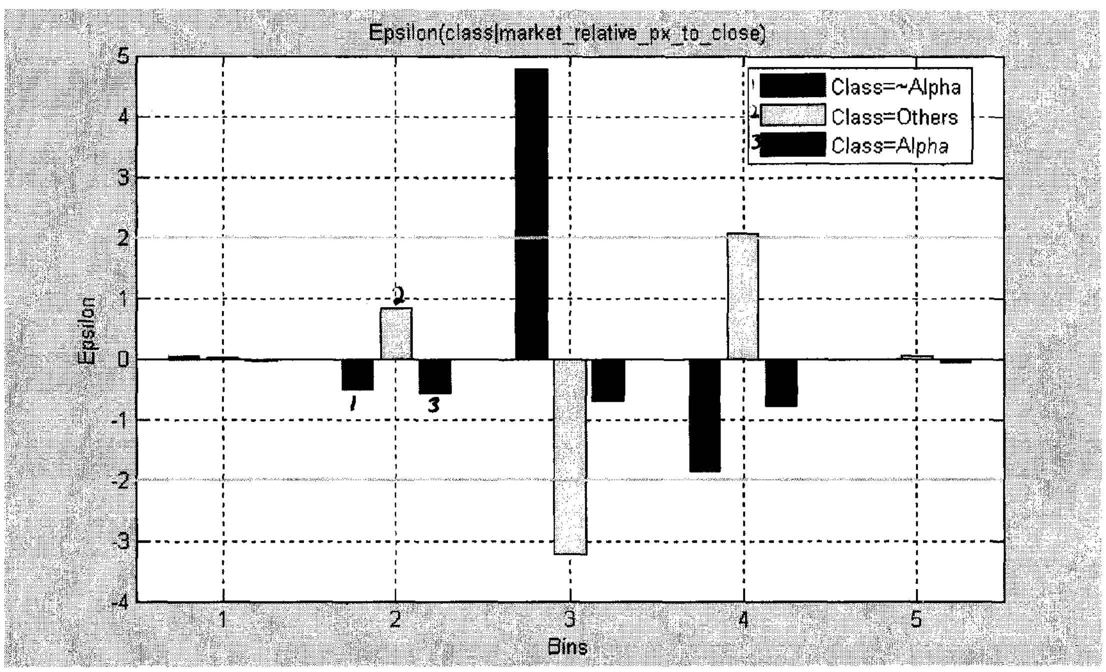

FIG. 116: Market relative returns from prior close to order entry are more strongly associated with negative impact-free returns at the center of the distribution than at the tails.

Figure 117:
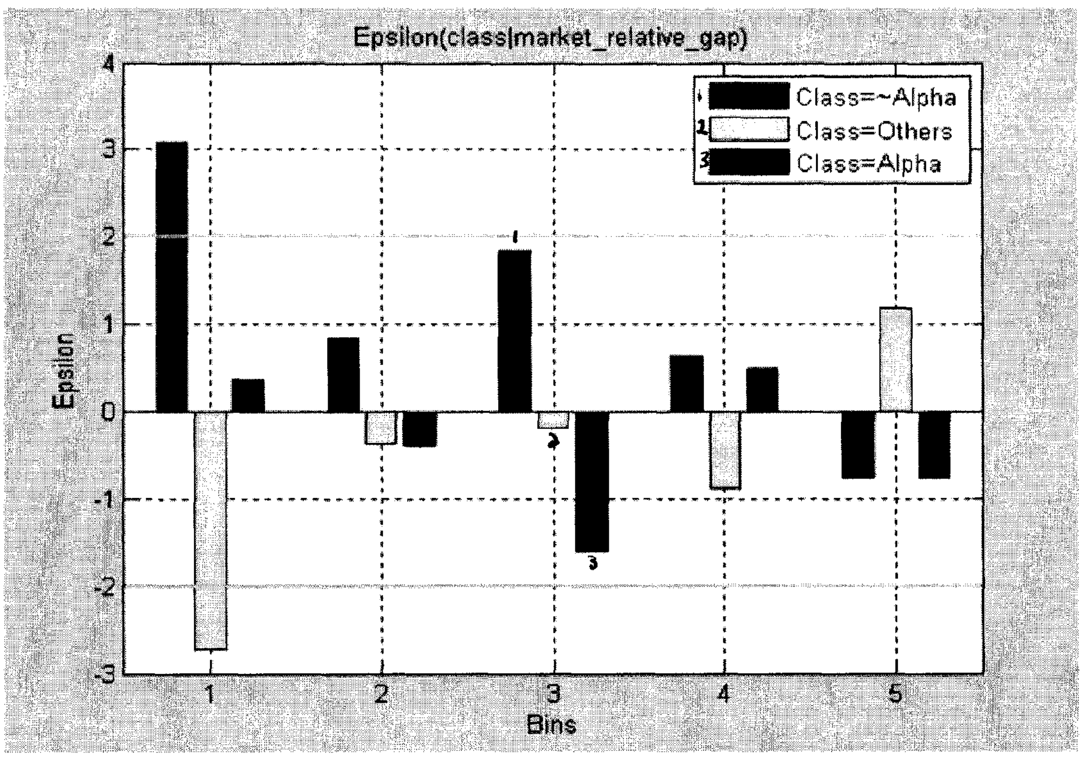

FIG. 117: Negative gap is associated with negative impact-free returns.

Figure 118:
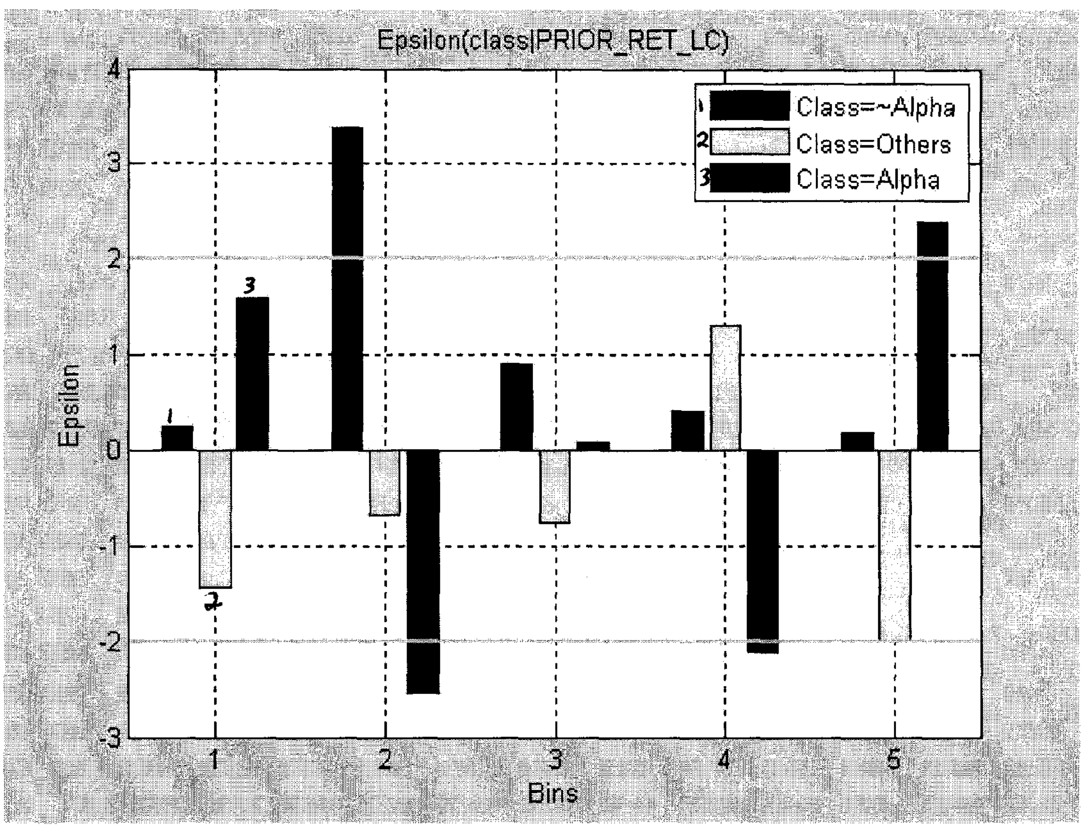

FIG. 118: Larger returns from prior day low to close are associated with more significant impact free returns.

Figure 119:
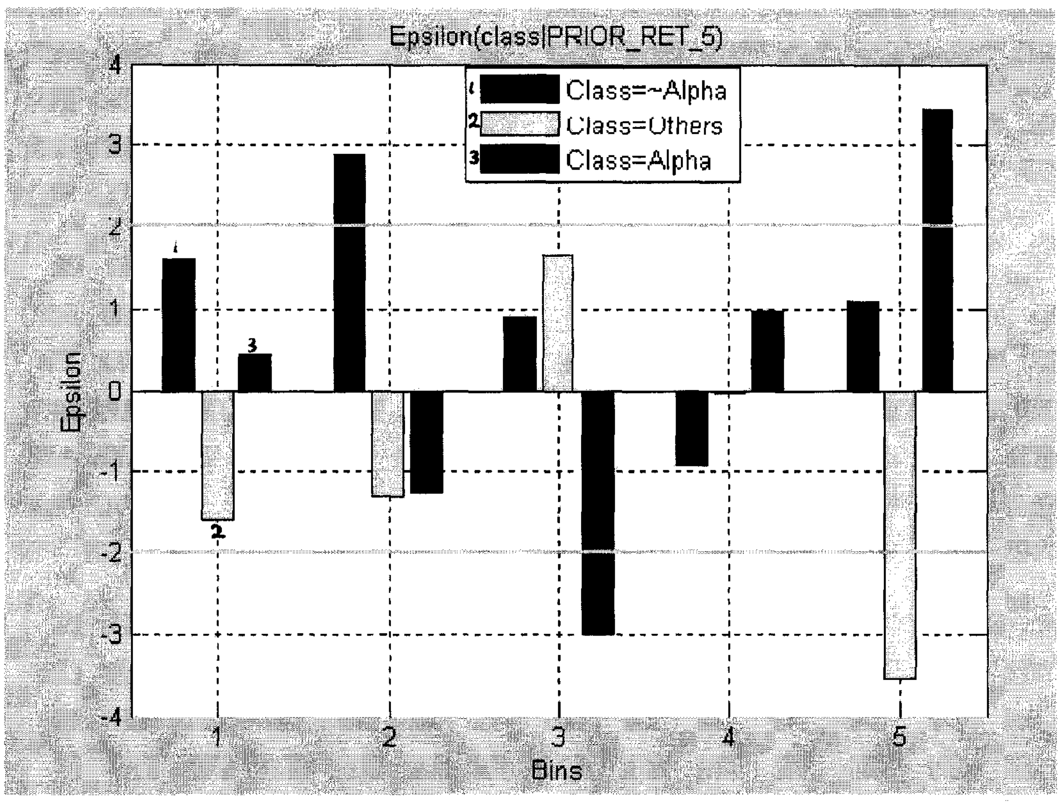

FIG. 119: Larger returns from prior 5 days are associated with more significant impact free returns.

Figure 120:
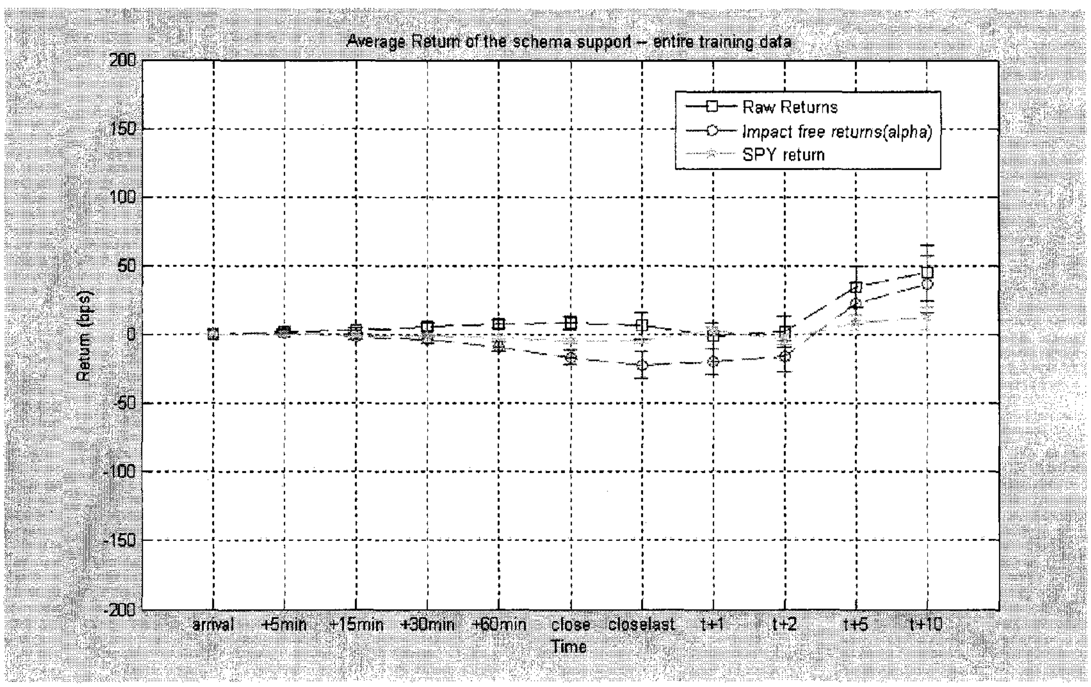

FIG. 120: Full sample including all trades above $250,000 (top 20%) exhibits negative impact-free returns until t+2.

Figure 121:
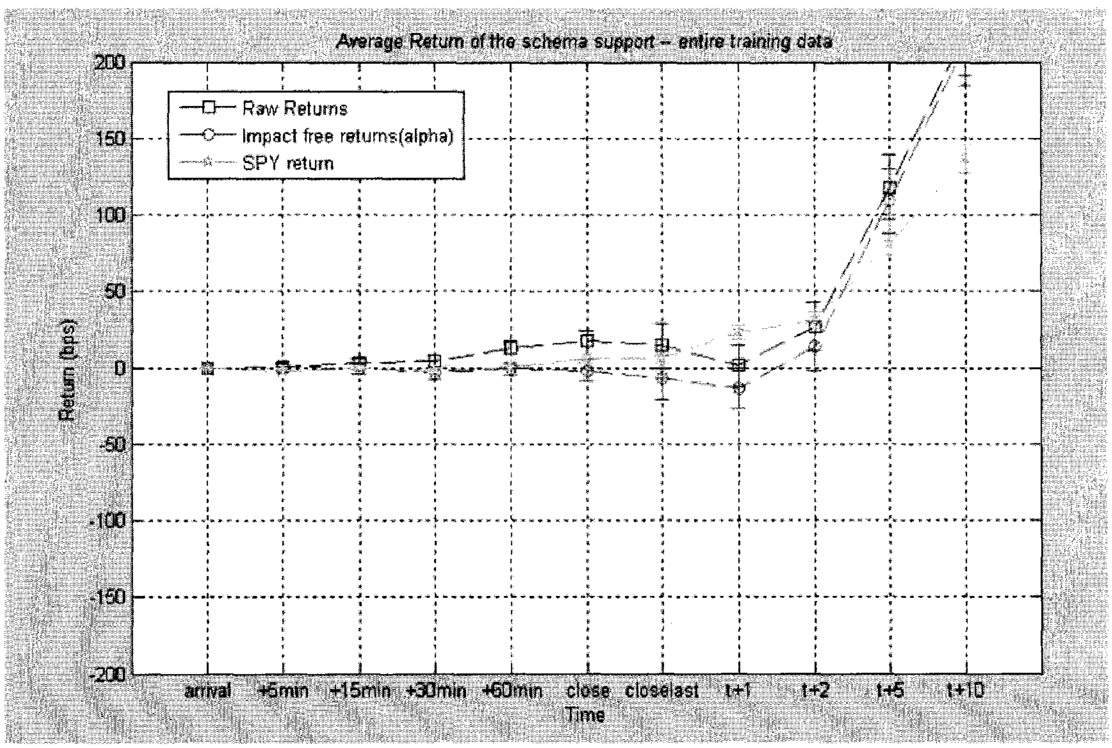

FIG. 121: Buy orders exhibit nonnegative impact-free returns to the close.

Figure 122:
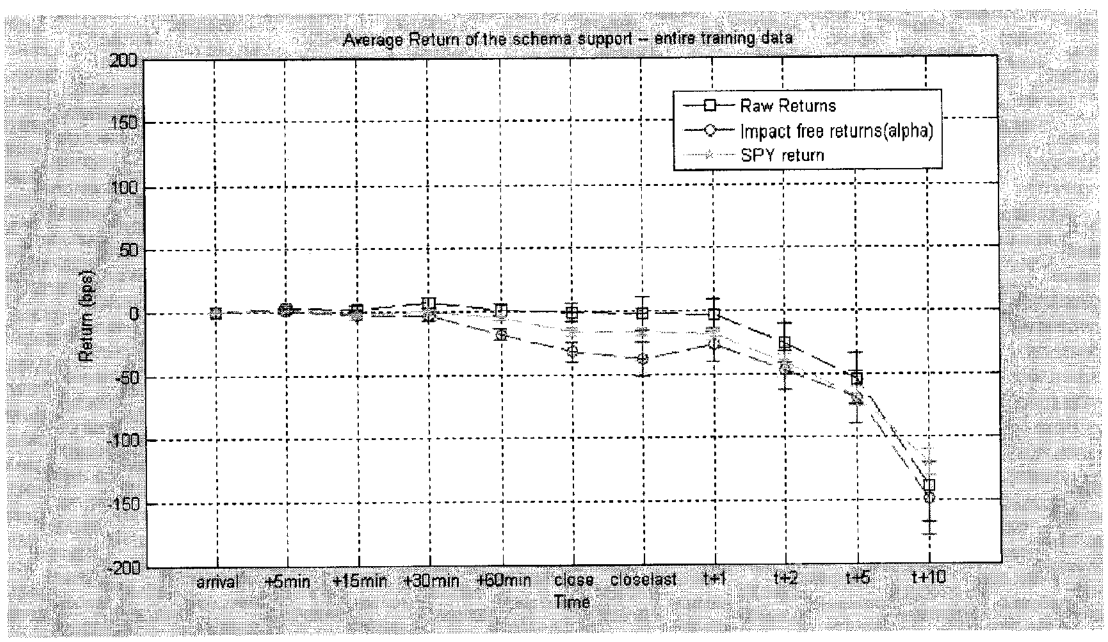

FIG. 122: Sell orders exhibit negative impact-free returns to the close following the SPY more closely on t+1 and later. Negative returns for sell refer to stock price increases.

Figure 123:
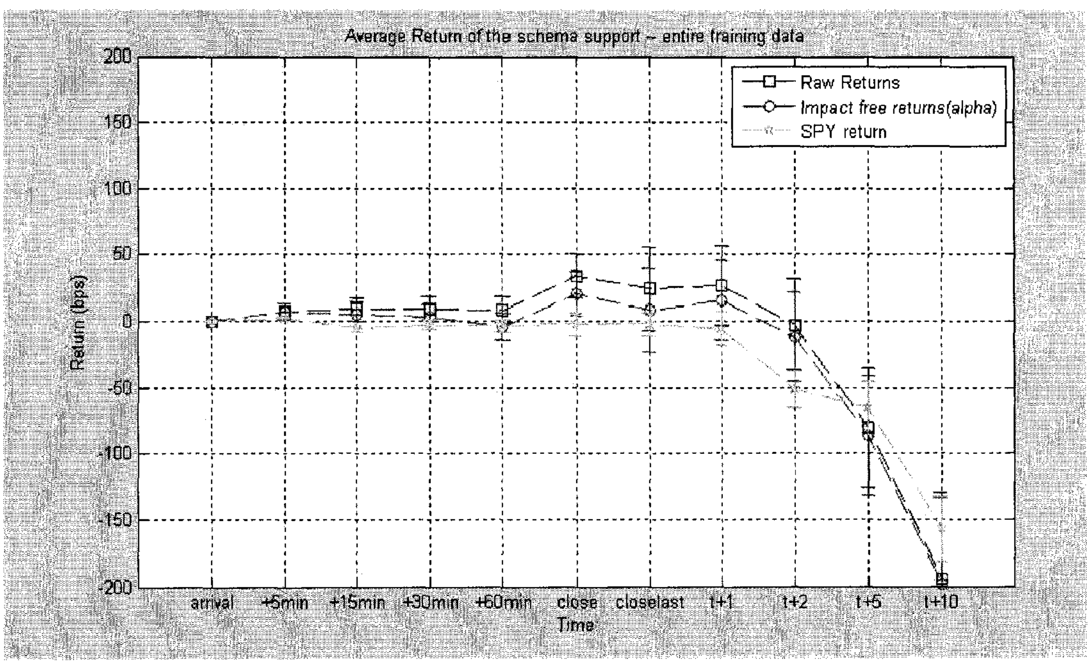

FIG. 123: Sell orders <5% ADV exhibit positive impact-free returns to the close which implies no benefit in extending execution to the close.

Figure 124:
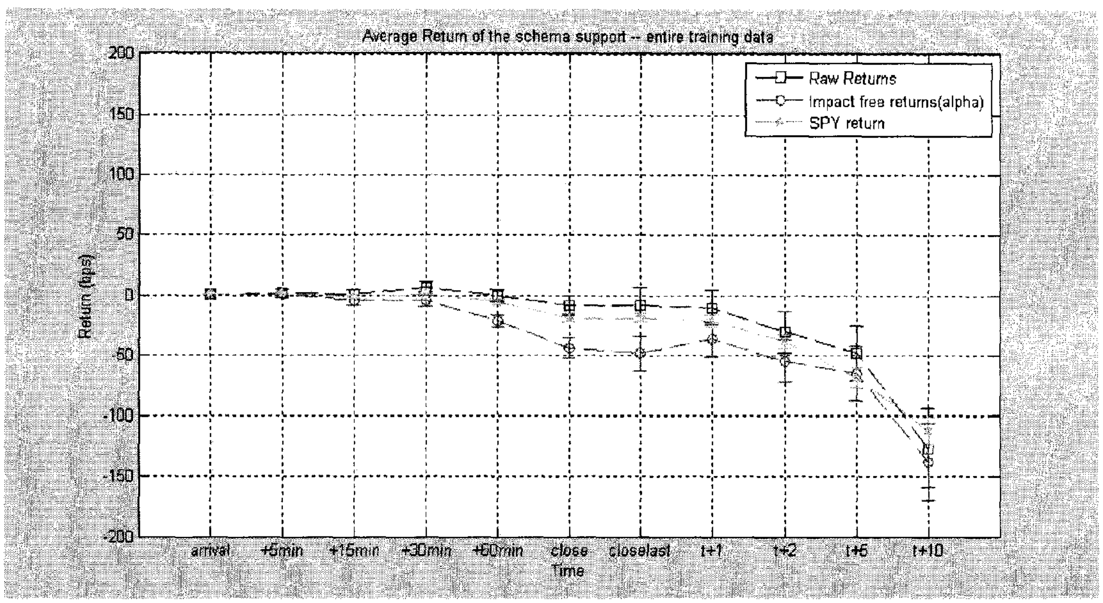

FIG. 124: Sell orders >5% ADV exhibit negative impact-free returns on average.

Figure 125:
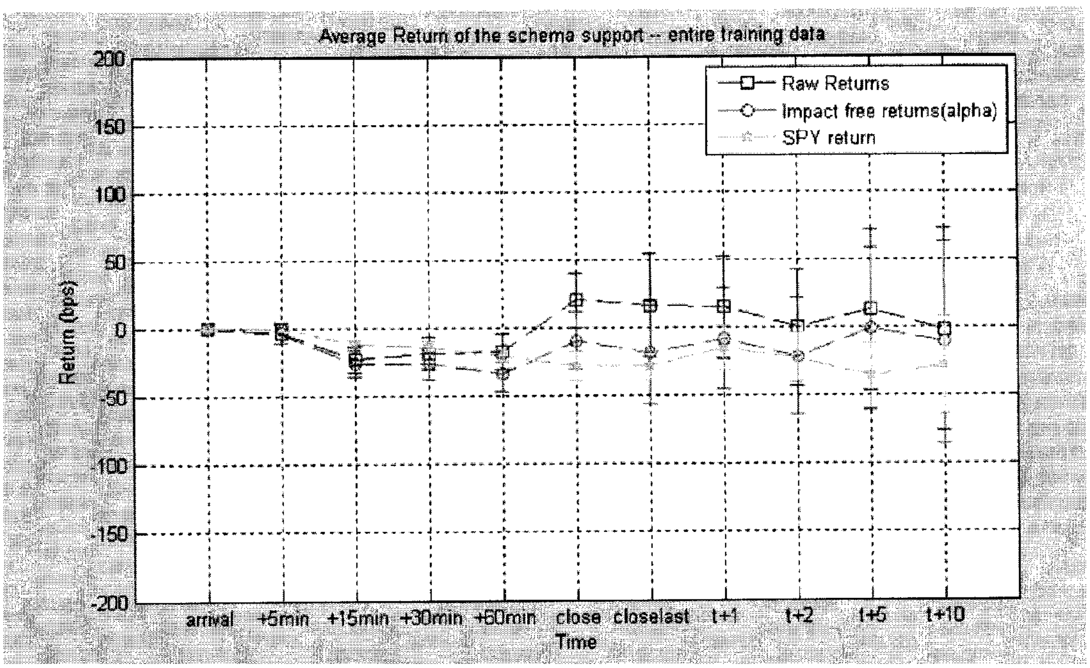

FIG. 125: Sell orders >5% ADV placed on momentum (market relative PX to close >60 bps) exhibit stronger imact-free returns and end up outperforming the SPY.

Figure 126:
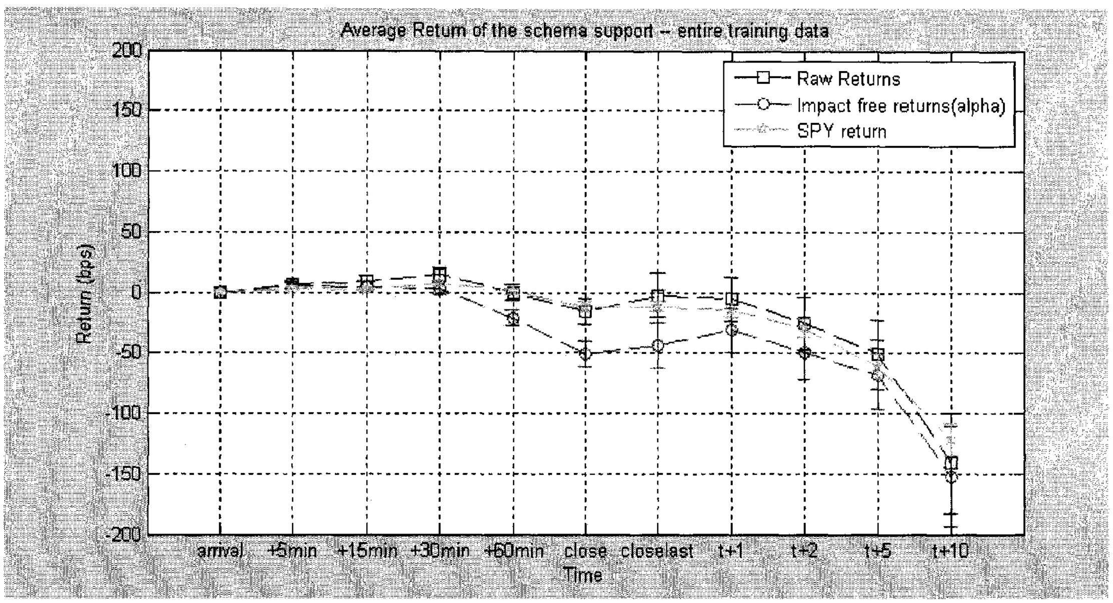

FIG. 126: Sell orders >5% ADV placed on neutral market conditions (market relative PX to close between −60 and 60 bps) exhibit price improvement after 30 minutes and to the close.

Figure 127:
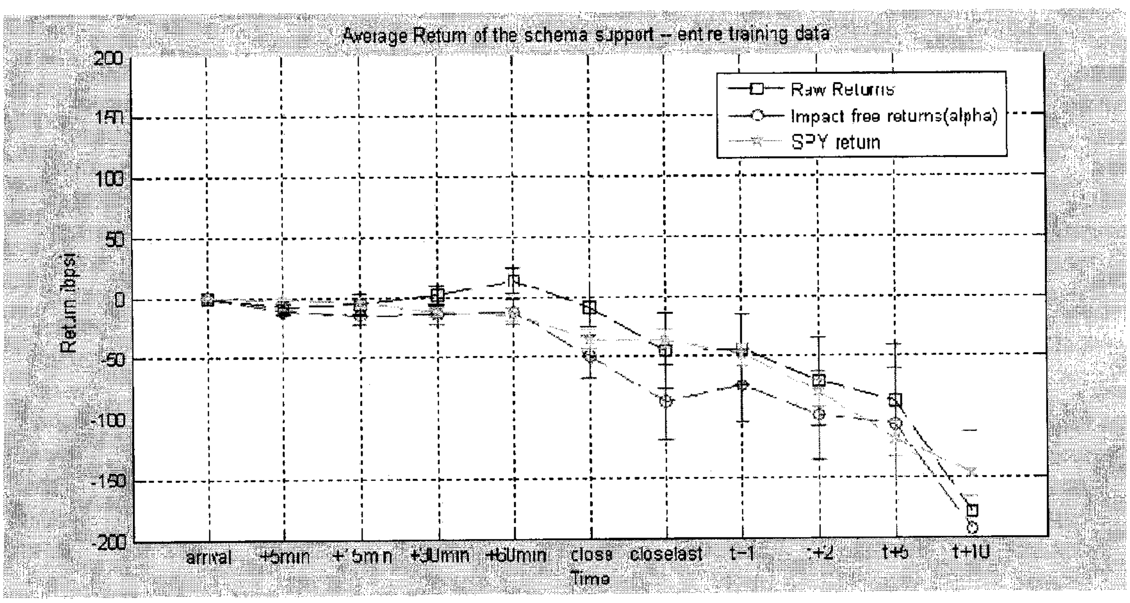

FIG. 127: Sell orders >5% ADV placed on reversion (market relative PX to close <−60 bps) exhibit a more drastic price improvement after 60 minutes, to the close and to the following days.

Figure 128:
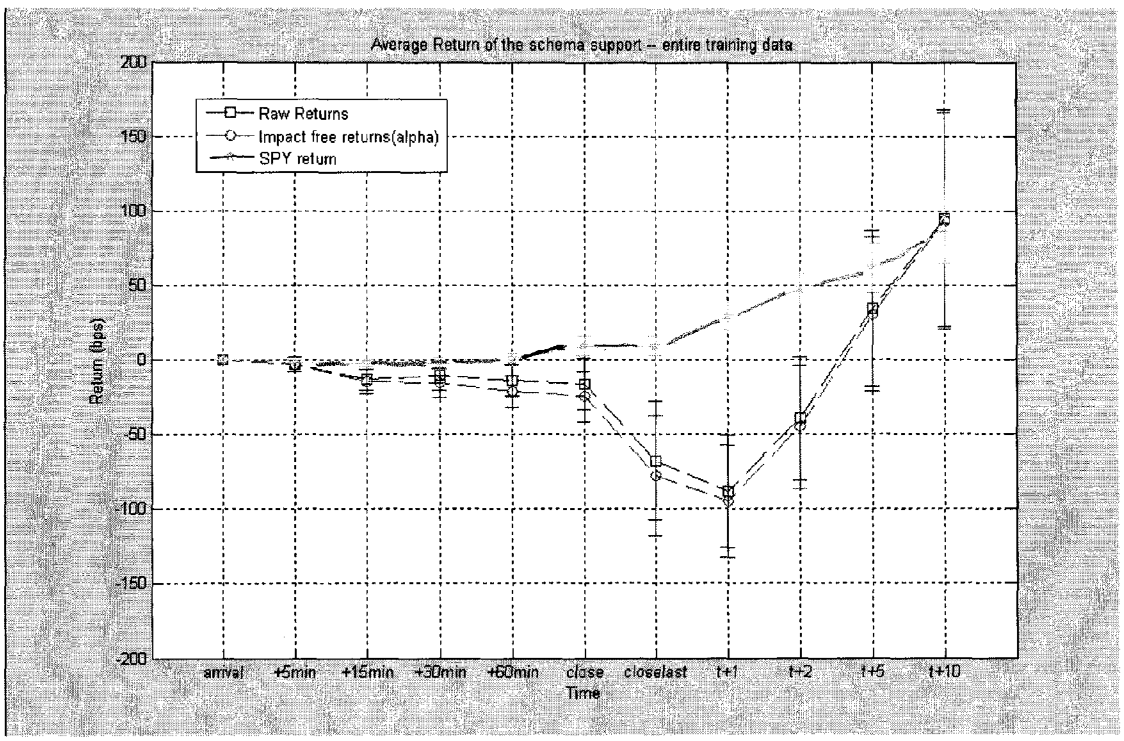

FIG. 128: Buy orders <2% ADV exhibit negative impact-free returns to t+1. These executions can be extended to the close.

Figure 129:
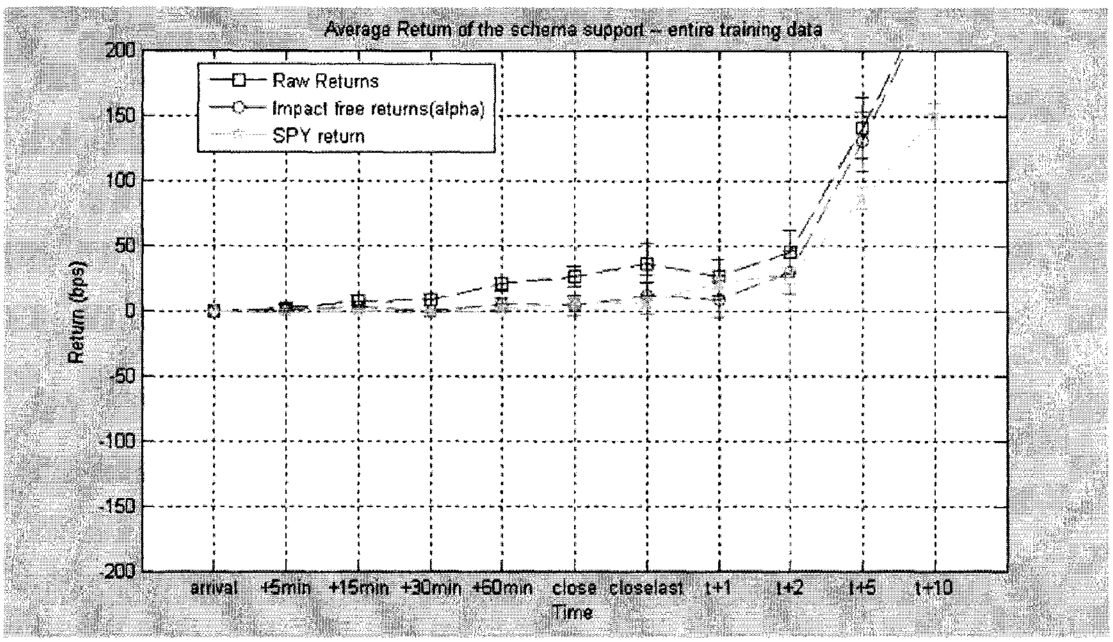

FIG. 129: Buy orders >2% ADV exhibit positive impact-free returns to t+1.

Figure 130:
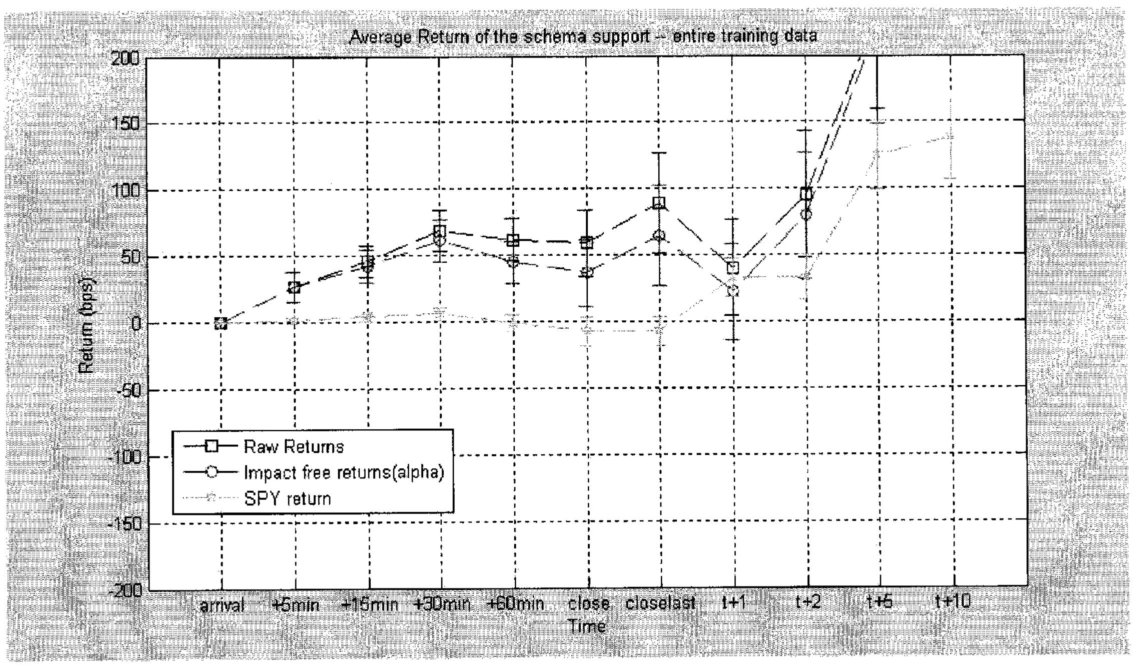

FIG. 130: Buy orders >2% ADV placed on reversion (market relative PX to close <−60 bps) exhibit significant impact-free returns.

Figure 131:
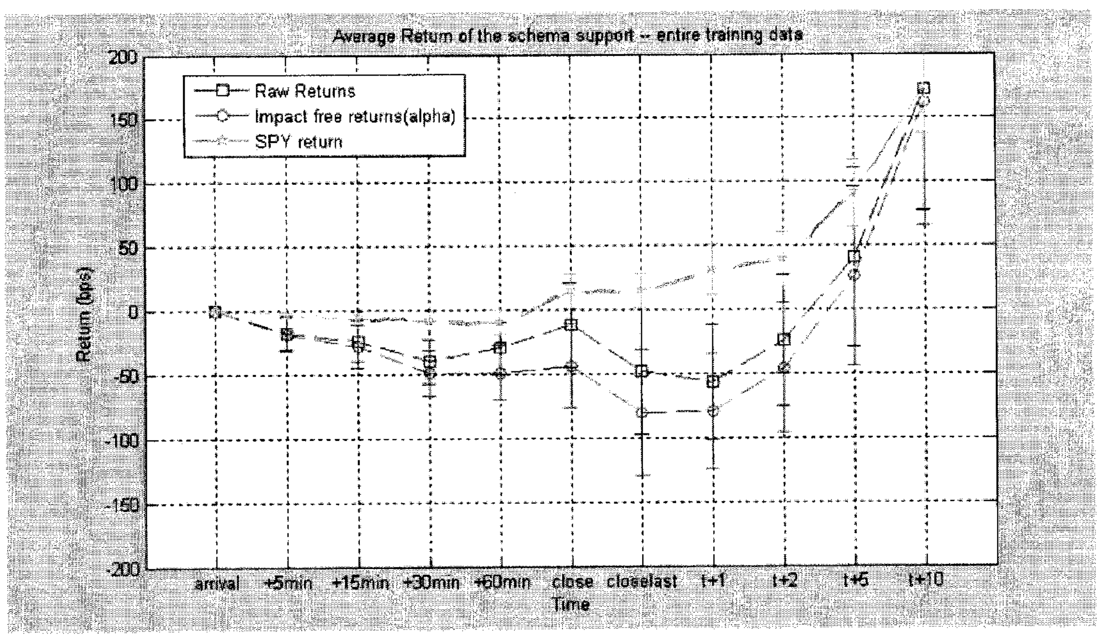

FIG. 131: Buy orders >2% ADV placed on momentum (market relative PX to close <60 bps) exhibit negative impact-free returns until t+2.

Figure 132:
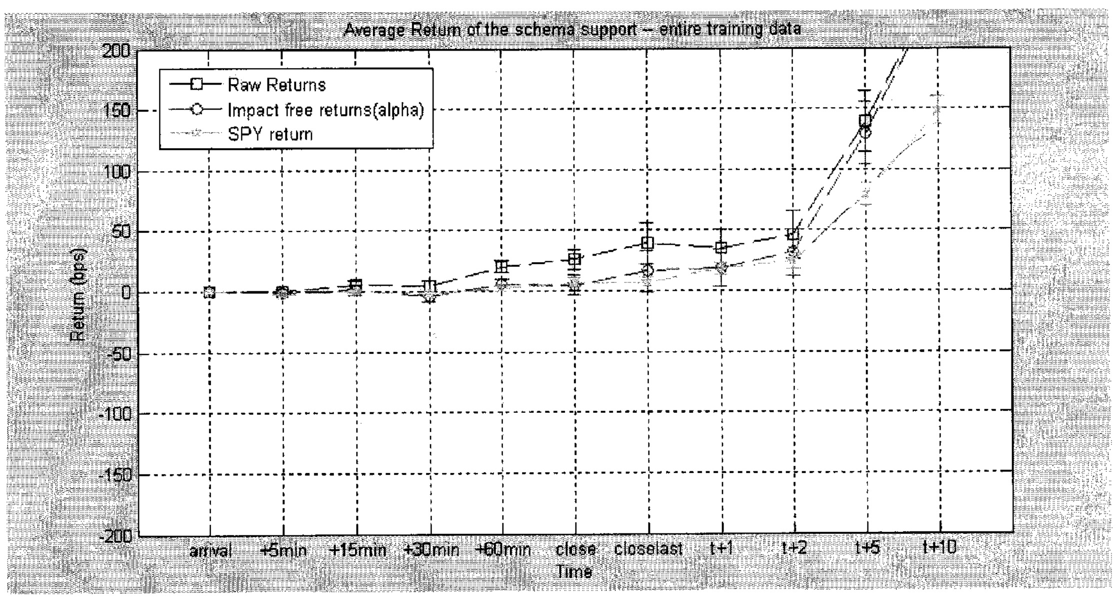
Figure 133:
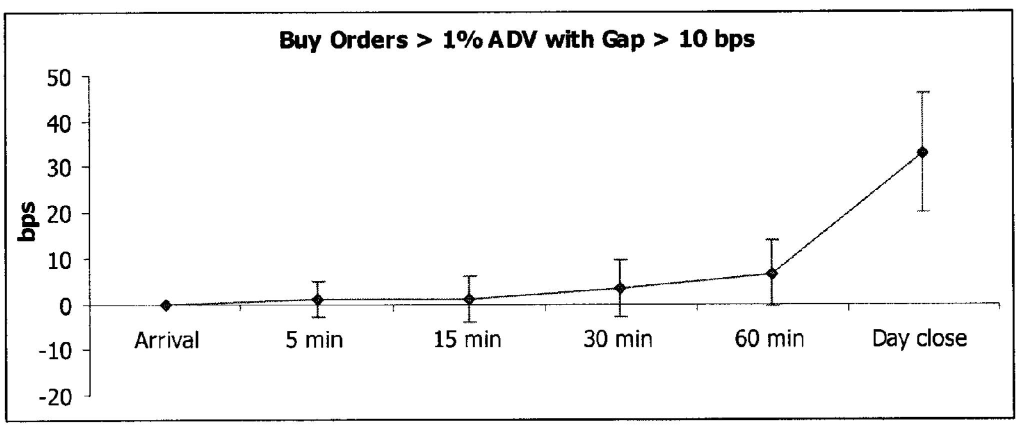
Figure 134:
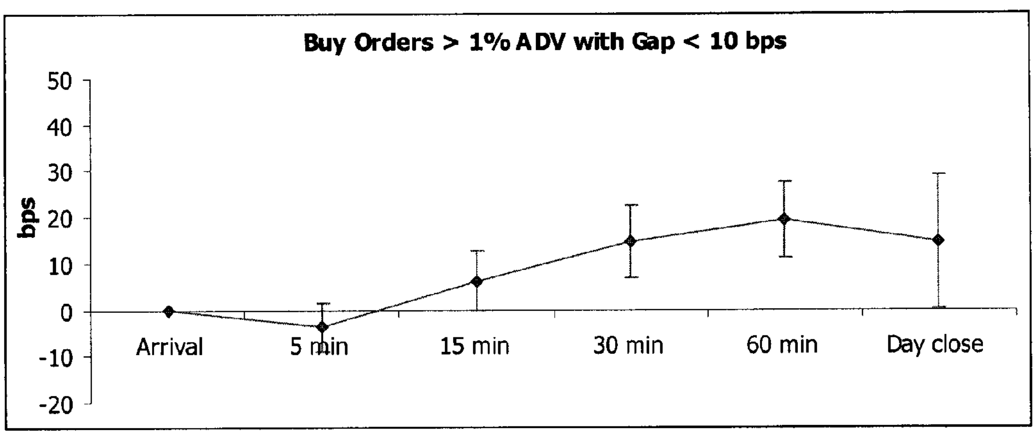
Figure 135:
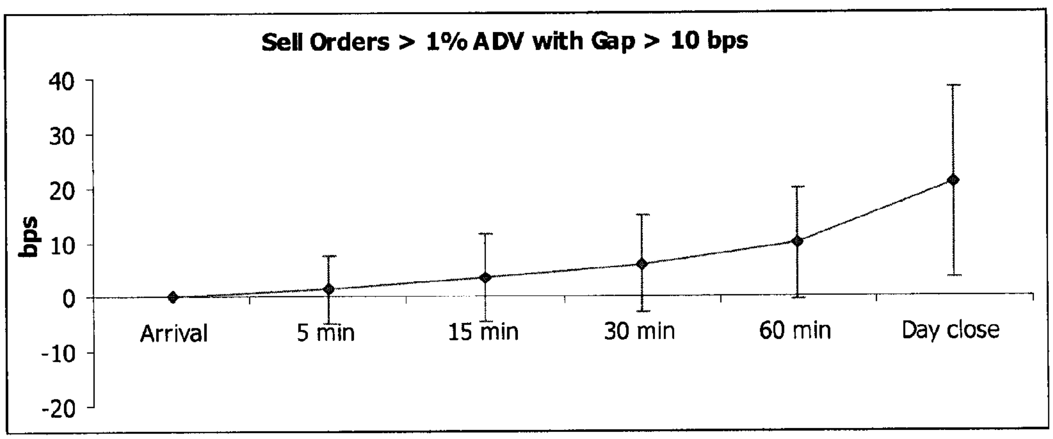
Figure 136:
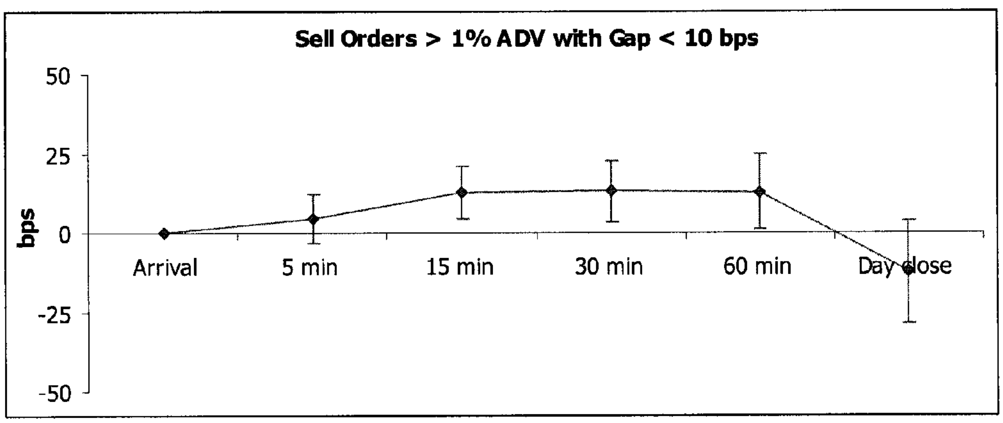
Figure 137:
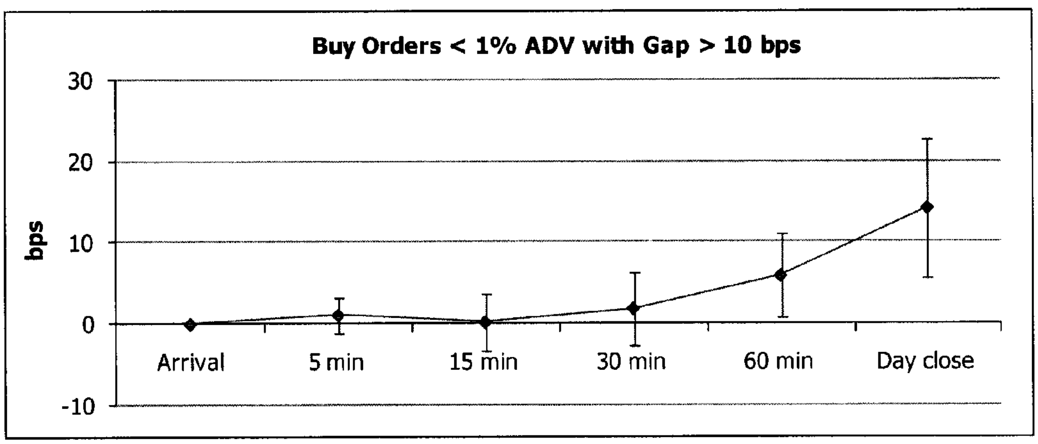
Figure 138:
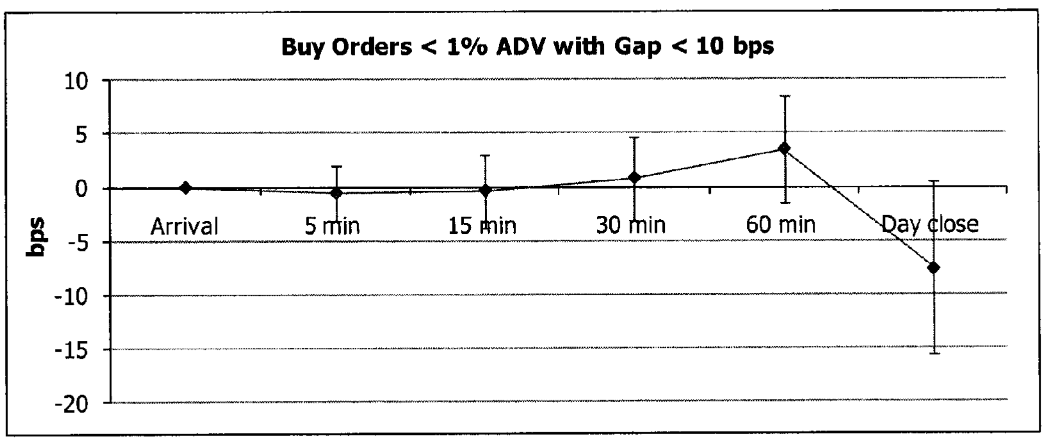
Figure 139:
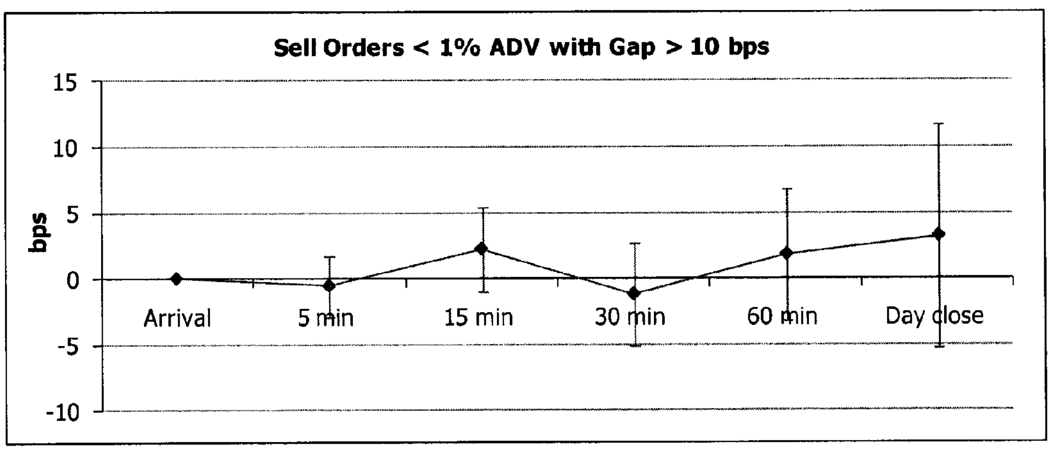
Figure 140:
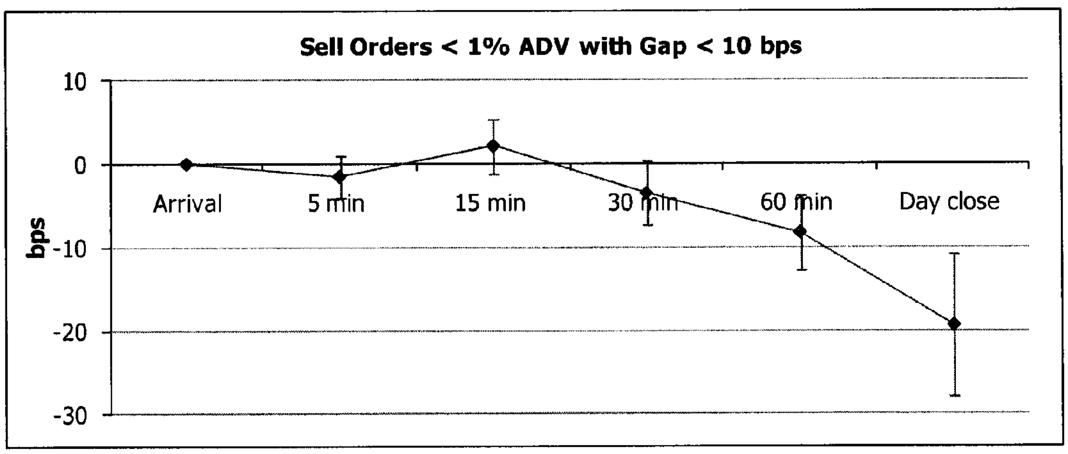

FIG. 132: Buy orders >2% ADV placed on market neutral conditions (market relative PX to close between −60 bps and 60 bps) exhibit positive impact-free returns.

APPENDIX C

Exemplary Report

Analysis of Trade Profile

This report presents an analysis of trades between April 2010 and September 2010 and describes associated optimal trading strategies.

- In general, buy orders exhibit higher impact-free returns than sell orders and, accordingly, will be executed with front loaded strategies to minimize risk, especially for the case of orders above 1% ADV.
- Orders following a prior Close-to-Open gap exhibit continuing trend in impact-free returns whereas the remaining orders exhibit reversion. For the case of buy orders larger than 1% with no gap, the Alpha strategy will be designed to take advantage of the probable price improvement later in the trade. Sell orders with no gap will be executed with Munitions Manager that will extend the execution to the close.
- Orders between 0.01 and 1% ADV are associated with weaker impact-free returns to the close than the larger orders and, in general, will be executed with less urgency.
- Small trades (<0.01% ADV) will be handled using a tactical price-selection alpha-capture strategy, using the Algorithm Switching Engine in its low-adverse-selection trickle mode, with a minimum participation of 2% to avoid unnecessary execution delays.
- Orders of size larger than 15% ADV are subject to high uncertainty and execution risk. These trades will be executed with the Mega strategy, which has a minimum 10% rate to test the market while avoiding adverse selection. The strategy may transition based on the market color. In the case of difficult trading conditions with bias to trend continuation, the strategy will increase participation in the market to minimize risk. If a short term decoupling from the sector index or excessive impact occur, the strategy will respond by pausing the execution for 15 minutes and then continuing with a patient execution schedule aiming to minimize impact. The executions will become aggressive in the money on price opportunities; if the stock completely reverts, the strategy will proceed with a 10% rate.

TABLE 58

Overview of execution strategies

| Strategy | Trade Size, ADV | Gap | Side | Obs. # | Strategy |
|---|---|---|---|---|---|
| AS Control | <=0.01 | Y/N | B/S | 1,669 | Execute on arrival; dark if possible |
| Alpha T | 0.01-15 | Y | B | 1,870 | 1) Moderate to fill 40%/30 min; 2) Tactical with 7% min rate |
| Alpha R | 1-15 | N | B | 581 | 1) Moderate to fill 20%/15 min 2) Tactical with 1% min rate |
| Alpha | 1-15 | Y | S | 452 | 1) Moderate to fill 20%/15 min 2) Tactical with 7% min rate |
| 10% | 0.01-1 | Y | S | 1,477 | Schedule completion with 10% target rate, using tactical limits to seek good price points. |
| Muni. M | 0.01-1<br>0.01-15 | N | B<br>S | 3,331 | All day munitions management with a minimum rate according to order size. |
| Mega | 15-30 | Y/N | B/S | 406 | Minimum 10% rate, responding to real-time market conditions as described above. |

Section 1: Descriptive statistics

TABLE 59

First Day Trades

| Variables | Observations Buy | Observations Sell | Mean Buy | Mean Sell | Median Buy | Median Sell |
|---|---|---|---|---|---|---|
| Order Duration (minutes) | 4,065 | 4,052 | 516 ± 37 | 417 ± 38 | 66 | 52 |
| Trade Duration (minutes) | 4,065 | 4,052 | 484 ± 37 | 407 ± 38 | 61 | 48 |
| Delay Time (minutes) | 4,065 | 4,052 | 32 ± 6 | 10 ± 3 | 2 | 2 |
| Trade Size (% adv) | 4,065 | 4,052 | 5 ± 1 | 5 ± 1 | .4 | .3 |
| BB Pretrade | 4,065 | 4,052 | 94 ± 2* | 100 ± 2* | 14 | 11 |
| Shortfall (bps vs. arrival price) | 4,065 | 4,052 | 64 ± 2* | 62 ± 2* | 7 | 3 |
| Delay Costs (bps vs. arrival price) | 4,065 | 4,052 | −1 ± 1 | −1 ± 1 | 0 | 0 |
| Participation Rate (%) | 4,065 | 4,052 | 10 ± .2 | 10 ± .2 | 6 | 6 |
| Adjusted Tracking Error 5% PWP (bps) | 4,065 | 4,052 | 7 ± 1 | 4 ± 1 | 2 | 1 |

TABLE 59-continued

| First Day Trades | | | | | | |
|---|---|---|---|---|---|---|
| | Observations | | Mean | | Median | |
| Variables | Buy | Sell | Buy | Sell | Buy | Sell |
| Adjusted Tracking Error 10% PWP (bps) | 4,065 | 4,052 | 4 ± 1 | 0 ± 1 | 0 | −1 |
| Adjusted Tracking Error 20% PWP (bps) | 4,065 | 4,052 | 2 ± 1 | −2 ± 1 | −1 | −3 |

(*) Value-weighted averages

Section 2: Filter B—Methodology and Key Parameters

This section considers the classification of trade arrivals by impact-free returns. Impact-free returns are determined by subtracting expected impact from the observed post-trade prices, using a speed-adjusted model and assuming uniform trading speed within each execution window.

We define a class C of orders where the sector trader has significant impact-free returns to close, and define X to be a potential filter; the sector trader is statistically likely to have positive impact-free returns if the likelihood of class C is enhanced by applying the filter X. This is the case when:

$$\varepsilon = \frac{N_X(P(C \mid X) - P(C))}{(Nx(P(C)(1 - P(C)))^{1/2}} > 2,$$

where P(C|X) is the probability that the sector has positive impact-free returns given X, and there are Nx observations associated with X.

Exhibit 1: Summary of Findings

Class C defines trades with significant impact-free returns to close and X defines the filter:

TABLE 60

| Factor | X | ϵ | $\text{Alpha}_{arrival,close}$\|X,C |
|---|---|---|---|
| First Node | | | |
| Trade Size (% ADV) | >1% | 3.4 | 201 ± 5 |
| Second Node (orders > 1% ADV) | | | |
| Prior Close to Open Gap, SPY | $R_{SPY,open,prior\_close}$ > 10 bps | 4.3 | 200 ± 6 |
| Time of Day | Arrival time before 10 A.M | 3.6 | 236 ± 7 |
| Prior Close to Open Gap | $R_{open,prior\_close}$ > 10 bPs | 2.9 | 215 ± 8 |

Exhibit 2: Trades >1% ADV. Impact-Free to Return Close (Prices Adjusted for Expected Impact).

Buy orders with prior Close-to-Open gap larger than 10 bps exhibit continuing trend of impact-free returns to the close. Order with gap lower than 10 bps exhibit momentum for the first 60 minutes, which is then followed by some reversion to the close. See FIGS. 133 and 134.

Sell orders with prior Close-to-Open gap larger than 10 bps also exhibit continuing trend of impact-free returns to the close. Order with gap lower than 10 bps exhibit a reversion more pronounced than buy orders. See FIGS. 135 and 136.

Exhibit 3: Trades <1% ADV. Impact-Free to Returns to Close (Prices Adjusted for Expected Impact).

Smaller buy orders with prior Close-to-Open gap larger than 10 bps also exhibit continuing trend of impact-free returns to the close, whereas those with gap lower than 10 bps exhibit a reversion even more pronounced than large buy orders. See FIGS. 137 and 138.

Smaller sell orders with prior Close-to-Open gap larger than 10 bps do not exhibit significant impact-free returns to the close, whereas those with gap lower than 10 bps exhibit a reversion even more pronounced than buy orders. See FIGS. 139 and 140.

We claim:

1. A method comprising:

(a) receiving electronic data describing a trading order for a market-traded security;

(b) checking said data describing said trading order against one or more sets of conditions, and identifying one or more of said one or more sets of conditions that is satisfied;

(c) based on said identified one or more of said one or more sets of conditions that is satisfied, identifying a class of trading algorithms appropriate for execution of said trading order;

(d) selecting with a processing system one or more trading algorithms from said identified class of trading algorithms, for execution of said trading order; and (e) commencing with said processing system execution of said trading order via said selected one or more trading algorithms;

wherein said processing system comprises one or more processors.

2. A method as in claim 1, wherein one or more of said sets of conditions relate to parameters of trading orders.

3. A method as in claim 1, wherein one or more of said sets of conditions relate to current market conditions.

4. A method as in claim 1, wherein one or more of said sets of conditions relate to trading patterns of a market participant placing said trading order.

5. A method as in claim 1, wherein one or more of said sets of conditions relate to minimum or maximum measurements of available liquidity.

6. A method as in claim 1, wherein one or more of said sets of conditions relate to absolute momentum.

7. A method as in claim 1, wherein said step of identifying a class of trading algorithms appropriate for execution of said trading order is based on an impact-free price estimate which estimates a price of said market traded security if said potential trading order were not to be executed.

8. A method as in claim 1, wherein said step of selecting with a processing system one or more trading algorithms from said identified class of trading algorithms for execution of said trading order is based on an impact-free price estimate which estimates a price of said market traded security if said potential trading order were not to be executed.

9. A method as in claim 1, wherein said step of identifying a class of trading algorithms appropriate for execution of said trading order is based on one or more predictive factors.

10. A method as in claim 1, wherein said step of selecting with a processing system one or more trading algorithms from said identified class of trading algorithms for execution of said trading order is based on one or more predictive factors.

11. A method as in claim 1, wherein said step of identifying a class of trading algorithms appropriate for execution of said trading order is based at least in part on polling two or more software agents.

12. A method as in claim 11, wherein each of said two or more software agents is assigned a weight.

13. A method as in claim 1, wherein said step of identifying a class of trading algorithms appropriate for execution of said trading order is based at least in part on receiving input from each of two or more software agents.

14. A method as in claim 13, wherein said input received from each of said two or more software agents is assigned a weight.

15. A method as in claim 1, wherein said step of identifying a class of trading algorithms appropriate for execution of said trading order is based at least in part on relative predicted alpha.

16. A method as in claim 13, wherein said input received from each of said two or more software agents relates to predicted alpha.

17. A method as in claim 13, further comprising associating a score with each input received from each of said two or more software agents.

18. A method as in claim 17, wherein said step of identifying a class of trading algorithms appropriate for execution of said trading order is based at least in part on a comparison of said two or more scores.

19. A method as in claim 1, further comprising:

(f) checking with said processing system, during execution of said trading order via said selected one or more trading algorithms, status of said trading order and said satisfied set of conditions;

(g) if said satisfied set of conditions is no longer being satisfied, checking whether another set of conditions is satisfied; and (h) if said another set of conditions is satisfied, switching with said processing system execution of said trading order to one or more other trading algorithms associated with said another set of conditions.

20. A method comprising:

(a) receiving electronic data describing a trading order for a market-traded security;

(b) checking said data describing said trading order against one or more sets of conditions, and identifying one or more of said one or more sets of conditions that is satisfied;

(c) based on said identified one or more of said one or more sets of conditions that is satisfied, identifying a class of trading algorithms appropriate for execution of said trading order; and (d) transmitting, to said user computer, data sufficient to cause a graphical user display displayed by said user computer to display representations of one or more trading algorithms in said class of trading algorithms appropriate for execution of said trading order, for selection by a user.

21. A method as in claim 20, further comprising receiving from said user computer a selection of one or more of said one or more trading algorithms for execution of said trading order.

22. A method comprising:

(a) receiving electronic data describing a trading order for a market-traded security;

(b) checking said data describing said trading order against one or more sets of conditions, wherein each set of conditions in said one or more sets of conditions is associated with one or more trading algorithms, and identifying one or more of said one or more sets of conditions that is satisfied;

(c) selecting with a processing system one or more trading algorithms associated with said one or more of said one or more sets of conditions that is satisfied, for execution of said trading order; and (d) commencing with said processing system execution of said trading order via said selected one or more trading algorithms;

wherein said processing system comprises one or more processors.

* * * * *